US005999525A

United States Patent [19]

Krishnaswamy et al.

[11] Patent Number: 5,999,525

[45] Date of Patent: Dec. 7, 1999

[54] METHOD FOR VIDEO TELEPHONY OVER A HYBRID NETWORK

[75] Inventors: Sridhar Krishnaswamy, Cedar Rapids, Iowa; Isaac K. Elliott, Colorado Springs, Colo.; Tim E. Reynolds; Glen A. Forgy, both of Iowa City, Iowa; Erin M. Solbrig, Cedar Rapids, Iowa

[73] Assignee: MCI Communications Corporation, Washington, D.C.

[21] Appl. No.: 08/751,215

[22] Filed: Nov. 18, 1996

[51] Int. Cl.[6] .......................... H04L 12/66; H04L 12/28; H04L 12/56

[52] U.S. Cl. .......................... 370/352; 370/389; 370/392; 379/90.01; 379/93.07; 379/114

[58] Field of Search .................................... 370/352, 383, 370/389, 390, 392, 401, 468, 463, 493, 410; 379/100.13, 93.08, 93.07, 93.14, 93.29, 90.01, 114; 455/5.1, 6.3; 348/14, 17, 10, 15

[56] References Cited

U.S. PATENT DOCUMENTS

| | | | |
|---|---|---|---|
| 4,100,377 | 7/1978 | Flanagan | 370/435 |
| 4,771,425 | 9/1988 | Baran et al. | 370/458 |
| 4,969,184 | 11/1990 | Gordon et al. | 379/100.13 |
| 5,068,888 | 11/1991 | Scherk et al. | 379/100.11 |
| 5,526,353 | 6/1996 | Henly et al. | 370/392 |
| 5,541,927 | 7/1996 | Kristol et al. . | |
| 5,561,670 | 10/1996 | Hoffert et al. | 370/410 |
| 5,590,181 | 12/1996 | Hogan et al. | 379/114 |
| 5,604,737 | 2/1997 | Iwarni et al. | 370/352 |
| 5,608,786 | 3/1997 | Gordon | 370/352 |
| 5,610,910 | 3/1997 | Focsaneanu et al. | 370/351 |
| 5,636,216 | 6/1997 | Rox et al. | 370/402 |
| 5,646,982 | 7/1997 | Hogan et al. | 379/89 |
| 5,712,907 | 1/1998 | Wegner et al. | 379/112 |
| 5,724,355 | 3/1998 | Bruno et al. | 370/401 |

OTHER PUBLICATIONS

Computer Telephony, CT and the 'Net, Mar. 1996, pp. 219–221.
tele.com, Internet Telephony, Jun. 1996, pp. 68–72.
Newton, The Personal Side of CT, Jan. 1997, pp.12,14.
Retkwa, Telephone Politics, Jun. 1996 pp. 54–60.
Kim, Talk is Cheap, Jul. 1996, pp. 34–39.
Platt, Why Iso Ethernet Will Change the Voice and Video Worlds, Apr. 1996, pp. 55–59.
Margulies, CT's Cyberdate With The 'Net, Aug. 1996, pp. 28–29.
Telephony on the Internet Workshop Information.
Bethony, HAHTSite Gives Pros Everything They Need, Mar. 1997, pp. 36–37.
'Net Telephony Spec Recommended, Mar. 1997, pp. 12–13.
Civanlar et al., FusionNet: Joining the Internet & Phone Networks for Multimedia Applications, 1996, pp.431–432.
Serrano, Evolution of a Hybrid Fibre Coaxial Network for Multimedia Interactive Services, Oct. 1996, pp.249–253.
Hurwicz, Faster, Smarter Nets, Apr. 1997, pp. 83–89.
Internet By Satellite.

(List continued on next page.)

*Primary Examiner*—Wellington Chin
*Assistant Examiner*—Melissa Kay Carman

[57] ABSTRACT

Telephone calls, data and other multimedia information including video, audio and data is routed through a switched network which includes transfer of information across the internet. Users can transmit video, audio and data communications of designated quality over the internet to other registered video telephony users. Users can manage more aspects of a network than previously possible, and control network activities from a central site.

30 Claims, 134 Drawing Sheets

OTHER PUBLICATIONS

Low, WebIN–An Architecture for Fast Deployment of IN–based Personal Services, Apr. 1996, vol. 1.
The Intelligent Web, Apr. 1996, vol. 2.
Grami, et al., The Role Of Satellites In The Information Superhighway, Jun. 1995, pp. 1577–1581.
Chen et al., ATM and Satellite Distribution of Multimedia Educational Courseware, Jun. 1996, pp. 1133–1137.
Sunaga et al., A Reliable Communication Switching Platform for Quick Service Provisioning, Feb. 1995, pp. 77–82.
Tsuchida et al., Intelligent Dynamic Service Provisioning Architecture in the Multimedia Era, Apr. 1996, pp. 1117–1122.
Schreyer et al., Least Cost Call Routing, Apr. 1996, pp. 12–.
Jain, Evolving Existing Narrowband Networks Towards Broadband Networks with IN Capabilities, Apr. 1996.
Gupta et al., Technical Assessment of (T)INA–TMN–OSI Technology For Service Management Applications, Feb. 1994, pp. 877–887.
Ejiri, For Whom The Advancing Service/Network Management, Feb. 1994, pp. 422–433.
Ely, The Service Control Point as a Cross Network Integrator, Apr. 1996, pp. 1–8.
Perret et al., MAP: Mobile Assistant Programming for Large Scale Communications Networks, Apr. 1996, pp. 1128–1132.
Cobbold et al., Enhancements for Integrated Wireless Personal Communications over Metropolitan Area Networks, Apr. 1996, pp. 1370–1376.
Sclavos et al., Information Model: From Abstraction to Application, Feb. 1994, pp. 183–195.
Aidarous et al., The Role Of The Element Management Layer In Network Management, Feb. 1994, pp. 59–69.
Inamori et al., Applying TMN to a Distributed Communications Node System with Common Platform Software, Feb. 1995, pp. 83–87.
Kolarov et al., End–to–end Adaptive Rate Based Congestion Control Scheme for ABR Service in Wide Area ATM Networks, Feb. 1995, pp. 138–143.
Duan et al., Efficient Utilization of Multiple Channels between two Switches in ATM Networks, Feb. 1995, pp. 1906–1911.
Kishimoto, Agent communication system for multimedia communication services, Mar. 1996, pp. 10–17.
Elia et al., Skyplex: Distributed Up–link for Digital Television via Satellite, Dec. 1996, pp. 305–313.
Kelly, Mountaintop office keeps skiers in touch, USA Today, vol. 15 No. 112.
Schulzrinne et al., RFC 1890—RPT Profile for Audio and Visual Conferences With Minimal Control, Jan. 1996.
Eriksson, Mbone: The Multicast Backbone, Aug. 1994.
Sullivan, Videoconferencing Arrives on the Internet, Aug. 1996.
Kahn, Videoconferencing Debuts on the Internet, Feb. 1995.
Macedonia, M.R. and Brutzman, D.P., "MBone Provides Audio and Video Across the Internet", IEEE Computer, pp. 30–36, Apr. 1994.
Kumar, V., "Internet Multicasting: Internet's Next Big Thing", ICAST White Paper, pp. 1–11, Jan. 1996.
Schulzrinne, H. et al., "RFC 1889—RTP: A Transport Protocol for Real–Time Applications", Jan. 1996.

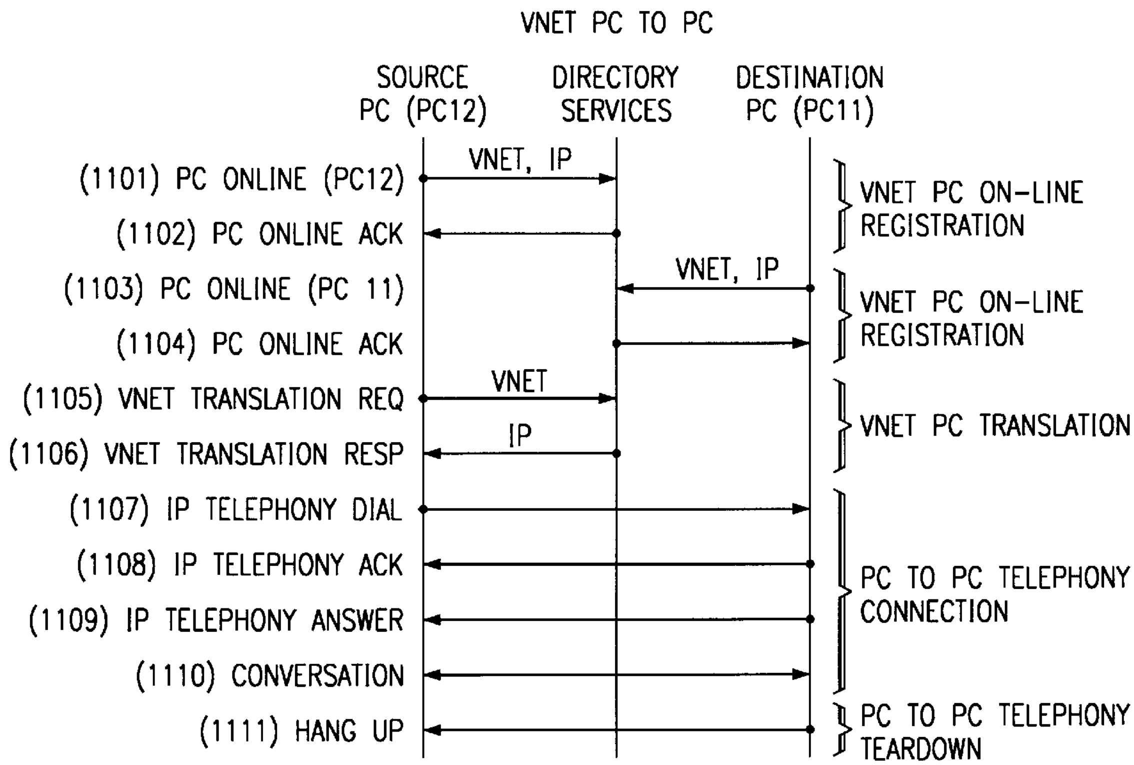

FIG. 11

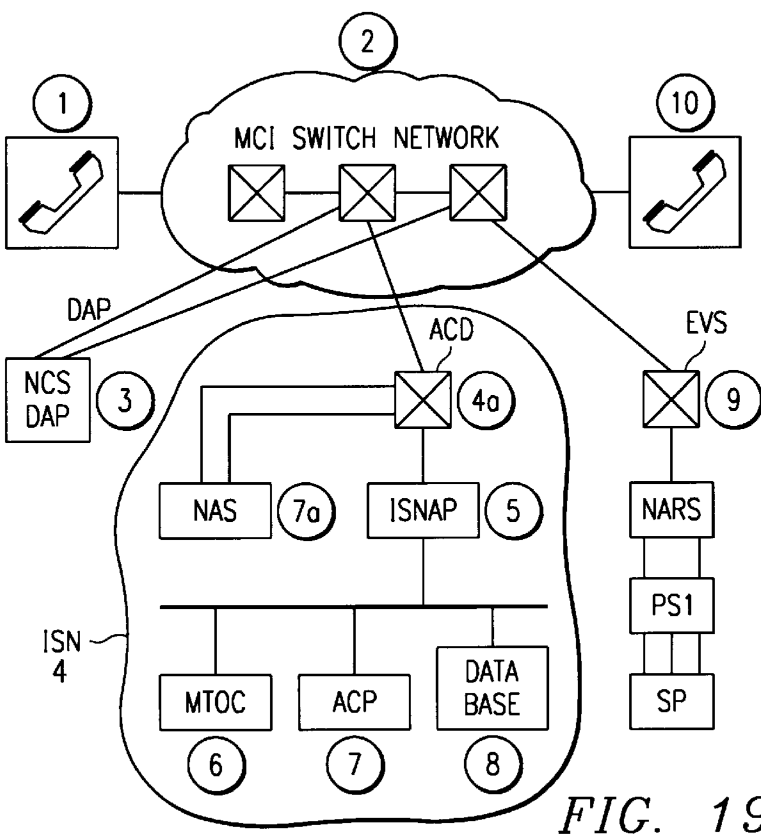

INTELLEGENT NETWORK FUNCTIONS:

OFF-SWITCH CONTROL
CALL ROUTING
GROUP SELECT
MANUAL OPERATORS
AUTOMATED OPERATORS
VOICE RECOGNITION
CUSTOMER VERIFICATION
CUSTOMER PROFILE
CALL TERMINATION
BILLING
FRAUD MONITORING
OPERATIONAL MEASUREMENTS
FAX DELIVERY
VOICE MAIL
MENU BASED ROUTING
AUDIO CONFERENCE
RESERVATIONS
VIDEO CONFERENCE
RESERVATIONS
USAGE STATISTICS REPORTING

<table>
<tr><td></td><td>MSB</td><td></td><td></td><td></td><td></td><td></td><td></td><td></td><td></td><td></td><td></td><td></td><td></td><td></td><td></td><td>LSB</td></tr>
<tr><td>BITS</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
<tr><td>WORD 00</td><td colspan="4">CRID</td><td colspan="12">CDID</td></tr>
<tr><td>01</td><td colspan="16">TP1 BITS 0-15</td></tr>
<tr><td>02</td><td colspan="16">TP1 BITS 16-31</td></tr>
<tr><td>03</td><td colspan="13">TP3 BITS 0-12</td><td colspan="3">TP6 0-2</td></tr>
<tr><td>04</td><td colspan="10">TP6 BITS 3-12</td><td colspan="6">TP7 BITS 0-5</td></tr>
<tr><td>05</td><td colspan="16">TP7 BITS 6-21</td></tr>
<tr><td>06</td><td colspan="16">OPL, ORIGINATING PORT 0-15</td></tr>
<tr><td>07</td><td>OP</td><td colspan="15">TPL, TERMINATING PORT 0-14</td></tr>
<tr><td>08</td><td colspan="2">TP</td><td colspan="13">OTG, ORIGINATING TRUNK GROUP</td><td>TT</td></tr>
<tr><td>09</td><td colspan="12">TERMINATING TRUNK GROUP (1-12)</td><td colspan="4">TP3Q</td></tr>
<tr><td>10</td><td colspan="2">TP6Q</td><td colspan="6">ACTION CODE</td><td colspan="4">OTC</td><td colspan="4">TTC</td></tr>
<tr><td>11</td><td colspan="4">ID1</td><td colspan="4">ID2</td><td colspan="8">ANI INDEX</td></tr>
<tr><td>12</td><td colspan="4">CLI 1</td><td colspan="4">CLI 2</td><td colspan="4">CLI 3</td><td colspan="4">CLI 4</td></tr>
<tr><td>13</td><td colspan="4">CLI 5</td><td colspan="4">CLI 6</td><td colspan="4">CLI 7</td><td colspan="4">CLI 8</td></tr>
<tr><td>14</td><td colspan="4">CLI 9</td><td colspan="4">CLI 10</td><td colspan="4">A1</td><td colspan="4">A2</td></tr>
<tr><td>15</td><td colspan="4">A3</td><td colspan="4">A4</td><td colspan="4">A5</td><td colspan="4">A6</td></tr>
<tr><td>16</td><td colspan="4">A7</td><td colspan="4">A8</td><td colspan="4">A9</td><td colspan="4">A10</td></tr>
<tr><td>17</td><td colspan="4">A11</td><td colspan="4">A12</td><td colspan="4">A13</td><td colspan="4">A14</td></tr>
<tr><td>18</td><td colspan="4">A15</td><td colspan="4">A16</td><td colspan="4">A17</td><td colspan="4">A18</td></tr>
<tr><td>19</td><td colspan="4">A19</td><td colspan="4">A20</td><td colspan="4">A21</td><td colspan="4">A22</td></tr>
<tr><td>20</td><td colspan="4">D1</td><td colspan="4">D2</td><td colspan="4">D3</td><td colspan="4">D4</td></tr>
<tr><td>21</td><td colspan="4">D5</td><td colspan="4">D6</td><td colspan="4">D7</td><td colspan="4">D8</td></tr>
<tr><td>22</td><td colspan="4">D9</td><td colspan="4">D10</td><td colspan="4">D11</td><td colspan="4">D12</td></tr>
<tr><td>23</td><td colspan="4">D13</td><td colspan="4">D14</td><td colspan="4">D15</td><td colspan="4">D16</td></tr>
<tr><td>24</td><td colspan="4">D17</td><td colspan="4">PTO1</td><td colspan="4">PTO2</td><td colspan="4">PTO3</td></tr>
<tr><td>25</td><td colspan="4">PTO4</td><td colspan="4">PTO5</td><td colspan="4">PTO6</td><td colspan="4">PTO7</td></tr>
<tr><td>26</td><td colspan="4">PTO8</td><td colspan="4">PTO9</td><td colspan="4">PTO10</td><td colspan="4"></td></tr>
<tr><td>27</td><td colspan="4">PC</td><td colspan="4">TMC</td><td colspan="4">KMP</td><td colspan="4">TP70</td></tr>
<tr><td>28</td><td colspan="7">EC, ENTRY CODE</td><td colspan="3">PO</td><td colspan="3">MDID</td><td colspan="3">DIVID</td></tr>
<tr><td>29</td><td>DO</td><td></td><td>CC</td><td>IN</td><td></td><td>SC</td><td>CD</td><td>DE</td><td>DT</td><td></td><td></td><td>SA</td><td colspan="4">MOCLI</td></tr>
<tr><td>30</td><td colspan="4">CN1</td><td colspan="4">CN2</td><td colspan="4">CN3</td><td colspan="4">CN4</td></tr>
<tr><td>31</td><td colspan="4">ACIF</td><td colspan="7">SS7 RELEASE CODE</td><td colspan="3">MCIDSEQ</td><td>NL</td><td>RS</td></tr>
<tr><td>BIT</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
</table>

*FIG. 84*

<table>
<tr><td></td><td>MSB</td><td></td><td></td><td></td><td></td><td></td><td></td><td></td><td></td><td></td><td></td><td></td><td></td><td></td><td></td><td>LSB</td></tr>
<tr><td>BITS</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
<tr><td>WORD 00</td><td colspan="4">CRID</td><td colspan="12">CDID</td></tr>
<tr><td>01</td><td colspan="16">TP1 BITS 0-15</td></tr>
<tr><td>02</td><td colspan="16">TP1 BITS 16-31</td></tr>
<tr><td>03</td><td colspan="13">TP3 BITS 0-12</td><td colspan="3">TP6 0-2</td></tr>
<tr><td>04</td><td colspan="10">TP6 BITS 3-12</td><td colspan="6">TP7 BITS 0-5</td></tr>
<tr><td>05</td><td colspan="16">TP7 BITS 6-21</td></tr>
<tr><td>06</td><td colspan="16">OPL, ORIGINATING PORT 0-15</td></tr>
<tr><td>07</td><td>OP</td><td colspan="15">TPL, TERMINATING PORT 0-14</td></tr>
<tr><td>08</td><td colspan="2">TP</td><td colspan="13">OTG, ORIGINATING TRUNK GROUP</td><td>TT</td></tr>
<tr><td>09</td><td colspan="12">TERMINATING TRUNK GROUP (1-12)</td><td colspan="4">TP3Q</td></tr>
<tr><td>10</td><td colspan="2">TP6Q</td><td colspan="6">ACTION CODE</td><td colspan="4">OTC</td><td colspan="4">TTC</td></tr>
<tr><td>11</td><td colspan="4">ID1</td><td colspan="4">ID2</td><td colspan="8">ANI INDEX</td></tr>
<tr><td>12</td><td colspan="4">CLI 1</td><td colspan="4">CLI 2</td><td colspan="4">CLI 3</td><td colspan="4">CLI 4</td></tr>
<tr><td>13</td><td colspan="4">CLI 5</td><td colspan="4">CLI 6</td><td colspan="4">CLI 7</td><td colspan="4">CLI 8</td></tr>
<tr><td>14</td><td colspan="4">CLI 9</td><td colspan="4">CLI 10</td><td colspan="4">CLI 11</td><td colspan="4">CLI 12</td></tr>
<tr><td>15</td><td colspan="4">CLI 13</td><td colspan="4">CLI 14</td><td colspan="4">CLI 15</td><td colspan="4">A1</td></tr>
<tr><td>16</td><td colspan="4">A2</td><td colspan="4">A3</td><td colspan="4">A4</td><td colspan="4">A5</td></tr>
<tr><td>17</td><td colspan="4">A6</td><td colspan="4">A7</td><td colspan="4">A8</td><td colspan="4">A9</td></tr>
<tr><td>18</td><td colspan="4">A10</td><td colspan="4">A11</td><td colspan="4">A12</td><td colspan="4">A13</td></tr>
<tr><td>19</td><td colspan="4">A14</td><td colspan="4">A15</td><td colspan="4">A16</td><td colspan="4">A17</td></tr>
<tr><td>20</td><td colspan="4">A18</td><td colspan="4">A19</td><td colspan="4">A20</td><td colspan="4">A21</td></tr>
<tr><td>21</td><td colspan="4">A22</td><td colspan="4">A23</td><td colspan="4">A24</td><td colspan="4">A25</td></tr>
<tr><td>22</td><td colspan="4">A26</td><td colspan="4">A27</td><td colspan="4">A28</td><td colspan="4">A29</td></tr>
<tr><td>23</td><td colspan="4">A30</td><td colspan="4">A31</td><td colspan="4">A32</td><td colspan="4">A33</td></tr>
<tr><td>24</td><td colspan="4">A34</td><td colspan="4">A35</td><td colspan="4">A36</td><td colspan="4">A37</td></tr>
<tr><td>25</td><td colspan="4">A38</td><td colspan="4">A39</td><td colspan="4">A40</td><td colspan="4">A41</td></tr>
<tr><td>26</td><td colspan="4">A42</td><td colspan="4">A43</td><td colspan="4">A44</td><td colspan="4">A45</td></tr>
<tr><td>27</td><td colspan="4">PC</td><td colspan="4">TMC</td><td colspan="4">KMP</td><td colspan="4">TP70</td></tr>
<tr><td>28</td><td colspan="7">EC, ENTRY CODE</td><td colspan="3">PO</td><td colspan="3">MDID</td><td colspan="3">DIVID</td></tr>
<tr><td>29</td><td>DO</td><td>MN</td><td>CC</td><td>IN</td><td></td><td>SC</td><td>CD</td><td>DE</td><td>DT</td><td></td><td></td><td>SA</td><td colspan="4">MOCLI</td></tr>
<tr><td>30</td><td colspan="4">CN1</td><td colspan="4">CN2</td><td colspan="4">CN3</td><td colspan="4">CN4</td></tr>
<tr><td>31</td><td colspan="4">ACIF</td><td colspan="7">SS7 RELEASE CODE</td><td colspan="3">MCIDSEQ</td><td>NL</td><td>RS</td></tr>
<tr><td>BIT</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
</table>

*FIG. 85A*

<table>
<tr><td></td><td>MSB</td><td></td><td></td><td></td><td></td><td></td><td></td><td></td><td></td><td></td><td></td><td></td><td></td><td></td><td></td><td>LSB</td></tr>
<tr><td>BITS</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
<tr><td>32</td><td colspan="4"></td><td colspan="4"></td><td colspan="4"></td><td colspan="4"></td></tr>
<tr><td>33</td><td colspan="4"></td><td colspan="4"></td><td colspan="4"></td><td colspan="4"></td></tr>
<tr><td>34</td><td colspan="4">D1</td><td colspan="4">D2</td><td colspan="4">D3</td><td colspan="4">D4</td></tr>
<tr><td>35</td><td colspan="4">D5</td><td colspan="4">D6</td><td colspan="4">D7</td><td colspan="4">D8</td></tr>
<tr><td>36</td><td colspan="4">D9</td><td colspan="4">D10</td><td colspan="4">D11</td><td colspan="4">D12</td></tr>
<tr><td>37</td><td colspan="4">D13</td><td colspan="4">D14</td><td colspan="4">D15</td><td colspan="4">D16</td></tr>
<tr><td>38</td><td colspan="4">D17</td><td colspan="4">D18</td><td colspan="4">D19</td><td colspan="4">D20</td></tr>
<tr><td>39</td><td colspan="4">D21</td><td colspan="4">D22</td><td colspan="4">D23</td><td colspan="4">D24</td></tr>
<tr><td>40</td><td colspan="4">D25</td><td colspan="4">PTD1</td><td colspan="4">PTD2</td><td colspan="4">PTD3</td></tr>
<tr><td>41</td><td colspan="4">PTD4</td><td colspan="4">PTD5</td><td colspan="4">PTD6</td><td colspan="4">PTD7</td></tr>
<tr><td>42</td><td colspan="4">PTD8</td><td colspan="4">PTD9</td><td colspan="4">PTD10</td><td colspan="4">PTD11</td></tr>
<tr><td>43</td><td colspan="4">PTD12</td><td colspan="4">PTD13</td><td colspan="4">PTD14</td><td colspan="4">PTD15</td></tr>
<tr><td>44</td><td colspan="8">EIR CALL TYPE</td><td colspan="7">OVFVAL</td><td>CB</td></tr>
<tr><td>45</td><td colspan="4">OVFCL</td><td colspan="4">DTA 1</td><td colspan="4">DTA 2</td><td colspan="4">DTA 3</td></tr>
<tr><td>46</td><td colspan="4">DTA 4</td><td colspan="4">DTA 5</td><td colspan="4">DTA 6</td><td colspan="4">DTA 7</td></tr>
<tr><td>47</td><td colspan="4">DTA 8</td><td colspan="4">DTA 9</td><td colspan="4">DTA 10</td><td colspan="4">DTA 11</td></tr>
<tr><td>48</td><td colspan="4">DTA 12</td><td colspan="4">DTA 13</td><td colspan="4">DTA 14</td><td colspan="4">DTA 15</td></tr>
<tr><td>49</td><td colspan="7">OVFC</td><td colspan="6">DTAC</td><td></td><td colspan="2">MCID</td></tr>
<tr><td>50</td><td colspan="16">NETWORK CALL IDENTIFIER (NCID)</td></tr>
<tr><td>51</td><td colspan="16">NETWORK CALL IDENTIFIER (NCID)</td></tr>
<tr><td>52</td><td colspan="16">NETWORK CALL IDENTIFIER (NCID)</td></tr>
<tr><td>53</td><td colspan="16">NETWORK CALL IDENTIFIER (NCID)</td></tr>
<tr><td>54</td><td colspan="16">NETWORK CALL IDENTIFIER (NCID)</td></tr>
<tr><td>55</td><td colspan="4"></td><td colspan="4"></td><td colspan="4"></td><td colspan="4"></td></tr>
<tr><td>56</td><td colspan="4"></td><td colspan="4"></td><td colspan="4"></td><td colspan="4"></td></tr>
<tr><td>57</td><td colspan="4"></td><td colspan="4"></td><td colspan="4"></td><td colspan="4"></td></tr>
<tr><td>58</td><td colspan="4"></td><td colspan="4"></td><td colspan="4"></td><td colspan="4"></td></tr>
<tr><td>59</td><td colspan="4"></td><td colspan="4"></td><td colspan="3"></td><td colspan="3">USE TYPE</td><td colspan="2">UUIE</td></tr>
<tr><td>60</td><td colspan="14">UUIE COUNT CONT.</td><td colspan="2">OVFCS</td></tr>
<tr><td>61</td><td colspan="16">ORIGINATING NX64 BITMAP (1-16)</td></tr>
<tr><td>62</td><td colspan="8">ORIG NX64 BITMAP (17-24)</td><td colspan="8">TERM NX64 BITMAP (1-8)</td></tr>
<tr><td>63</td><td colspan="16">TERMINATING NX64 BITMAP (9-24)</td></tr>
<tr><td>BIT</td><td>00</td><td>01</td><td>02</td><td>03</td><td>04</td><td>05</td><td>06</td><td>07</td><td>08</td><td>09</td><td>10</td><td>11</td><td>12</td><td>13</td><td>14</td><td>15</td></tr>
</table>

*FIG. 85B*

| | MSB 00 | 01 | 02 | 03 | 04 | 05 | 06 | 07 | 08 | 09 | 10 | 11 | 12 | 13 | 14 | LSB 15 |
|---|---|---|---|---|---|---|---|---|---|---|---|---|---|---|---|---|
| WORD 00 | CRID | | | | CDID | | | | | | | | | | | |
| 01 | TP1 BITS 0-15 | | | | | | | | | | | | | | | |
| 02 | TP1 BITS 16-31 | | | | | | | | | | | | | | | |
| 03 | TP4 BITS 0-12 | | | | | | | | | | | | | TP6 0-2 | | |
| 04 | TP6 BITS 3-12 | | | | | | | | | | TP7 BITS 0-5 | | | | | |
| 05 | TP7 BITS 6-21 | | | | | | | | | | | | | | | |
| 06 | OPL, ORIGINATING PORT 0-15 | | | | | | | | | | | | | | | |
| 07 | OP | TPL, TERMINATING PORT 0-14 | | | | | | | | | | | | | | |
| 08 | TP | | OTG, ORIGINATING TRUNK GROUP | | | | | | | | | | | | | TT |
| 09 | TERMINATING TRUNK GROUP (1-12) | | | | | | | | | | | | TP3Q | | | |
| 10 | TP6Q | | ACTION CODE | | | | | | OTC | | | | TTC | | | |
| 11 | ID1 | | | | ID2 | | | | ONACC | | | | TNACC | | | |
| 12 | CLI 1 | | | | CLI 2 | | | | CLI 3 | | | | CLI 4 | | | |
| 13 | CLI 5 | | | | CLI 6 | | | | CLI 7 | | | | CLI 8 | | | |
| 14 | CLI 9 | | | | CLI 10 | | | | A1 | | | | A2 | | | |
| 15 | A3 | | | | A4 | | | | A5 | | | | A6 | | | |
| 16 | A7 | | | | A8 | | | | A9 | | | | A10 | | | |
| 17 | A11 | | | | A12 | | | | A13 | | | | A14 | | | |
| 18 | A15 | | | | A16 | | | | A17 | | | | A18 | | | |
| 19 | A19 | | | | A20 | | | | A21 | | | | A22 | | | |
| 20 | D1 | | | | D2 | | | | D3 | | | | D4 | | | |
| 21 | D5 | | | | D6 | | | | D7 | | | | D8 | | | |
| 22 | D9 | | | | D10 | | | | D11 | | | | D12 | | | |
| 23 | D13 | | | | D14 | | | | D15 | | | | D16 | | | |
| 24 | D17 | | | | OPIN | | | | | | | | | | | |
| 25 | OPIN | | | TPS BITS 0-12 | | | | | | | | | | | | |
| 26 | RN1 | | | | RN2 | | | | RN3 | | | | RN4 | | | |
| 27 | FC | | | | TMC | | | | NAT | | | | TP7Q | | | |
| 28 | EC, ENTRY CODE | | | | | | | PO | | | MDID | | | DIVID | | |
| 29 | DO | | CC | IN | | SC | CD | DE | DT | PP | XC | SA | MOCLI | | | |
| 30 | CN1 | | | | CN2 | | | | CN3 | | | | CN4 | | | |
| 31 | ACIF | | | | SS7 RELEASE CODE | | | | | | | MCIDSEQ | | | NL | RS |
| BIT | 00 | 01 | 02 | 03 | 04 | 05 | 06 | 07 | 08 | 09 | 10 | 11 | 12 | 13 | 14 | 15 |

*FIG. 86*

| WORD | 00 (MSB) | 01 | 02 | 03 | 04 | 05 | 06 | 07 | 08 | 09 | 10 | 11 | 12 | 13 | 14 | 15 (LSB) |
|---|---|---|---|---|---|---|---|---|---|---|---|---|---|---|---|---|
| 00 | CRID | | | | CDID | | | | | | | | | | | |
| 01 | TP1 BITS 0-15 | | | | | | | | | | | | | | | |
| 02 | TP1 BITS 16-31 | | | | | | | | | | | | | | | |
| 03 | TP3 BITS 0-12 | | | | | | | | | | | | | TP6 0-2 | | |
| 04 | TP6 BITS 3-12 | | | | | | | | | | TP7 BITS 0-5 | | | | | |
| 05 | TP7 BITS 6-21 | | | | | | | | | | | | | | | |
| 06 | OPL, ORIGINATING PORT 0-15 | | | | | | | | | | | | | | | |
| 07 | OP | TPL, TERMINATING PORT 0-14 | | | | | | | | | | | | | | |
| 08 | TP | | OTG, ORIGINATING TRUNK GROUP | | | | | | | | | | | | | TT |
| 09 | TERMINATING TRUNK GROUP (1-12) | | | | | | | | | | | | TP3Q | | | |
| 10 | TP6Q | | ACTION CODE | | | | | | OTC | | | | TTC | | | |
| 11 | ID1 | | | | ID2 | | | | ORIG1 | | | | TERM1 | | | |
| 12 | CLI 1 | | | | CLI 2 | | | | CLI 3 | | | | CLI 4 | | | |
| 13 | CLI 5 | | | | CLI 6 | | | | CLI 7 | | | | CLI 8 | | | |
| 14 | CLI 9 | | | | CLI 10 | | | | CLI 11 | | | | CLI 12 | | | |
| 15 | CLI 13 | | | | CLI 14 | | | | CLI 15 | | | | A1 | | | |
| 16 | A2 | | | | A3 | | | | A4 | | | | A5 | | | |
| 17 | A6 | | | | A7 | | | | A8 | | | | A9 | | | |
| 18 | A10 | | | | A11 | | | | A12 | | | | A13 | | | |
| 19 | A14 | | | | A15 | | | | A16 | | | | A17 | | | |
| 20 | A18 | | | | A19 | | | | A20 | | | | A21 | | | |
| 21 | A22 | | | | A23 | | | | A24 | | | | A25 | | | |
| 22 | A26 | | | | A27 | | | | A28 | | | | A29 | | | |
| 23 | A30 | | | | A31 | | | | A32 | | | | A33 | | | |
| 24 | A34 | | | | A35 | | | | A36 | | | | A37 | | | |
| 25 | A38 | | | | A39 | | | | A40 | | | | A41 | | | |
| 26 | A42 | | | | A43 | | | | A44 | | | | A45 | | | |
| 27 | PC | | | | TMC | | | | MAT | | | | TF7Q | | | |
| 28 | EC, ENTRY CODE | | | | | | | PD | | | MDID | | | DIVID | | |
| 29 | DO | MN | CC | IN | | SC | CD | DE | DT | PP | XC | SA | MOCLI | | | |
| 30 | CN1 | | | | CN2 | | | | CN3 | | | | CN4 | | | |
| 31 | ACIF | | | | SS7 RELEASE CODE | | | | | | | MCIDSEQ | | | NL | RS |

BIT 00 01 02 03 04 05 06 07 08 09 10 11 12 13 14 15

EOSR/EPOSR FORMAT

*FIG. 87A*

| BITS | 00 (MSB) | 01 | 02 | 03 | 04 | 05 | 06 | 07 | 08 | 09 | 10 | 11 | 12 | 13 | 14 | 15 (LSB) |
|---|---|---|---|---|---|---|---|---|---|---|---|---|---|---|---|---|
| 32 | T&C GUEST 1 | | | | | | | | T&C GUEST 2 | | | | | | | |
| 33 | T&C GUEST 3 | | | | | | | | T&C GUEST 4 | | | | | | | |
| 34 | D1 | | | | D2 | | | | D3 | | | | D4 | | | |
| 35 | D5 | | | | D6 | | | | D7 | | | | D8 | | | |
| 36 | D9 | | | | D10 | | | | D11 | | | | D12 | | | |
| 37 | D13 | | | | D14 | | | | D15 | | | | D16 | | | |
| 38 | D17 | | | | D18 | | | | D19 | | | | D20 | | | |
| 39 | D21 | | | | D22 | | | | D23 | | | | D24 | | | |
| 40 | D25 | | | | PTD1 | | | | PTD2 | | | | PTD3 | | | |
| 41 | PTD4 | | | | PTD5 | | | | PTD6 | | | | PTD7 | | | |
| 42 | PTD8 | | | | PTD9 | | | | PTD10 | | | | PTD11 | | | |
| 43 | PTD12 | | | | PTD13 | | | | PTD14 | | | | PTD15 | | | |
| 44 | EIR CALL TYPE | | | | | | | | OVFVAL | | | | | | | CB |
| 45 | OVFCL | | | | DTA 1 | | | | DTA 2 | | | | DTA 3 | | | |
| 46 | DTA 4 | | | | DTA 5 | | | | DTA 6 | | | | DTA 7 | | | |
| 47 | DTA 8 | | | | DTA 9 | | | | DTA 10 | | | | DTA 11 | | | |
| 48 | DTA 12 | | | | DTA 13 | | | | DTA 14 | | | | DTA 15 | | | |
| 49 | OVFC | | | | | | | DTAC | | | | | | | MCID | |
| 50 | NETWORK CALL IDENTIFIER (NCID) | | | | | | | | | | | | | | | |
| 51 | NETWORK CALL IDENTIFIER (NCID) | | | | | | | | | | | | | | | |
| 52 | NETWORK CALL IDENTIFIER (NCID) | | | | | | | | | | | | | | | |
| 53 | NETWORK CALL IDENTIFIER (NCID) | | | | | | | | | | | | | | | |
| 54 | NETWORK CALL IDENTIFIER (NCID) | | | | | | | | | | | | | | | |
| 55 | T&C ROOM 1 | | | | | | | | T&C ROOM 2 | | | | | | | |
| 56 | T&C ROOM 3 | | | | | | | | T&C ROOM 4 | | | | | | | |
| 57 | T&C ROOM 5 | | | | | | | | T&C ROOM 6 | | | | | | | |
| 58 | KAC1 | | | | KAC2 | | | | KAC3 | | | | KAC4 | | | |
| 59 | KAC5 | | | | KAC6 | | | | KAC7 | | | | KAC8 | | | |
| 60 | KAC9 | | | | KAC10 | | | | KAC11 | | | | KAC12 | | | |
| 61 | OPIN | | | | | | | | | | | | | | OVFCS | |
| 62 | TPS – OPERATOR RELEASE | | | | | | | | | | | | | | | |
| 63 | RN1 | | | | RN2 | | | | RN3 | | | | RN4 | | | |
| BIT | 00 | 01 | 02 | 03 | 04 | 05 | 06 | 07 | 08 | 09 | 10 | 11 | 12 | 13 | 14 | 15 |

*FIG. 87B*

BIT 00 (MSB) – 15 (LSB)

| WORD | Fields (MSB → LSB) |
|---|---|
| 00 | CRID \| SYNC WORD (MINUS 2, OCTAL 7776) |
| 01 | CDID, CALL DISCONNECT I.D. NUMBER (0-15) |
| 02 | CDID, CALL DISCONECT I.D. NUMBER (16-31) |
| 03 | SWID 1 \| SWID 2 \| SWID 3 |
| 04 | ST - SWITCH TYPE \| EQ - EVENT QUALIFIER |
| 05 | SERET - SER EVENT TIME (0-15) |
| 06 | SERET - SER EVENT TIME (16-31) |
| 07 | (blank) \| FCDID - FIRST RECORD CDID (12 LSBs) |
| 08 | (blank) \| LCDID - LAST RECORD CDID (12 LSBs) |
| 09 | (blank) \| NCDID - NEXT RECORD CDID (12 LSBs) |
| 10 | NBSM - NEXAS BLOCK SEQUENCE MONSTER |
| 11 | PT - PREVIOUS TIME (0-15) |
| 12 | PT - PREVIOUS TIME (16-31) |
| 13 | SI \| TIME OFFSET \| (blank) |
| 14 | (blank) |
| 15 | (blank) |
| 16 | SOFTWARE LOAD ID1 \| SOFTWARE LOAD ID2 |
| 17 | SOFTWARE LOAD ID3 \| SOFTWARE LOAD ID4 |
| 18 | SOFTWARE LOAD ID5 \| SOFTWARE LOAD ID6 |
| 19 | LAST PATCH/PR RLS1 \| LAST PATCH/PR RLS2 |
| 20 | QCDR \| QICDR \| (blank) |
| 21 | QPMR \| QEPMR \| (blank) |
| 22 | QOER \| QEOMR \| (blank) |
| 23 | QPOER \| QEPOER \| (blank) |
| 24 | QSER \| CRYN \| (blank) \| SU |
| 25 | CIR THROTTLE START TIME (0-15) |
| 26 | CIR THROTTLE START TIME (16-31) |
| 27 | CIR THROTTLE STOP TIME (0-15) |
| 28 | CIR THROTTLE STOP TIME (16-31) |
| 29 | (blank) \| FORMAT VER. |
| 30 | THROTTLE COUNT (0-15) |
| 31 | THROTTLE COUNT (16-31) |

BIT 00 01 02 03 04 05 06 07 08 09 10 11 12 13 14 15

*FIG. 88*

STATE TRANSITION DIAGRAM FOR
VOCONNECTION'S STATE VARIABLE

STATE TRANSITION DIAGRAM FOR VOCONFERENCE'S STATE VARIABLE

CLASS HIERARCHY FOR VIDEO OPERATOR SOFTWARE SYSTEM

STATE TRANSITION DIAGRAM FOR VOCALL'S STATE VARIABLE

STATE TRANSITION DIAGRAM FOR VORECORDER'S STATE VARIABLE

STATE TRANSITION DIAGRAM FOR VOPLAYER'S STATE VARIABLE

VIDEO OPERATOR DATABASE SCHEMA

GUI CLASS HIERARCHY

MAIN CONSOLE WINDOW

METHOD FOR VIDEO TELEPHONY OVER A HYBRID NETWORK

FIELD OF THE INVENTION

The present invention relates to the marriage of the Internet with telephony systems, and more specifically, to a system, method and article of manufacture for using the Internet as the communication backbone of a communication system architecture while maintaining a rich array of call processing features.

The present invention relates to the interconnection of a communication network including telephony capability with the Internet. The Internet has increasingly become the communication network of choice for the consumer marketplace. Recently, software companies have begun to investigate the transfer of telephone calls across the internet. However, the system features that users demand of normal call processing are considered essential for call processing on the Internet. Today, those features are not available on the internet.

SUMMARY OF THE INVENTION

According to a broad aspect of a preferred embodiment of the invention, telephone calls, data and other multimedia information including audio and video are routed through a switched network which includes transfer of information across the internet. Users can transmit video, audio and data communications of designated quality over the internet to other registered video telephony users. Users can manage more aspects of a network than previously possible and control network activities from a central site, while still allowing the operator of the telephone system to maintain quality and routing selection.

DESCRIPTION OF THE DRAWINGS

The foregoing and other objects, aspects and advantages are better understood from the following detailed description of a preferred embodiment of the invention, with reference to the drawings, in which:

FIG. 11 illustrates a VNET Personal Computer (PC) to PC Information call flow in accordance with a preferred embodiment;

FIGS. 19A and 19B illustrate an Intelligent Network in accordance with a preferred embodiment;

FIG. 79B illustrates a number of applications for caller-initiated consumer transactions in accordance with a preferred embodiment;

FIG. 84 illustrates the CDR and PNR call record formats in accordance with a preferred embodiment;

FIGS. 85(A) and 85(B) collectively illustrate the ECDR and EPNR call record formats in accordance with a preferred embodiment;

FIG. 86 illustrates the OSR and POSR call record formats in accordance with a preferred embodiment;

FIGS. 87(A) and 87(B) collectively illustrate the EOSR and EPOSR call record formats in accordance with a preferred embodiment;

FIG. 88 illustrates the SER call record format in accordance with a preferred embodiment;

DETAILED DESCRIPTION

TABLE OF CONTENTS

Figure 1A:
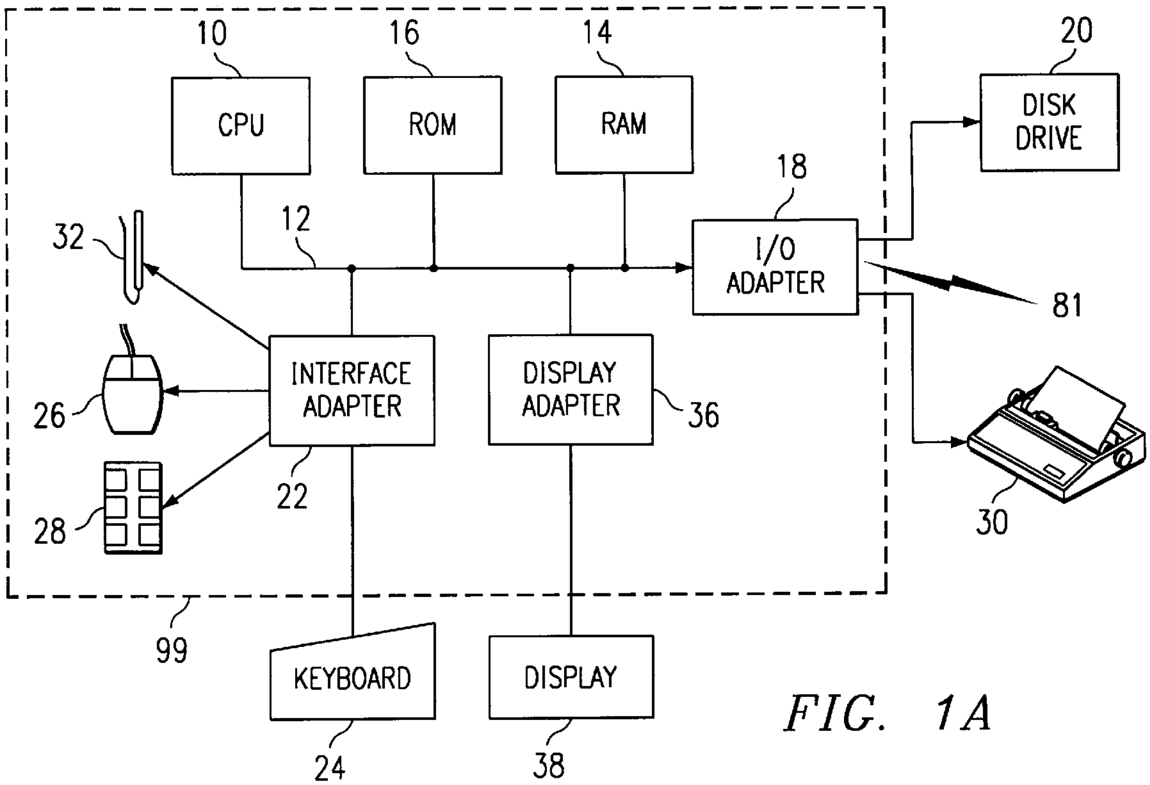
FIG. 1A is a block diagram of a representative hardware environment in accordance with a preferred embodiment.

I. THE COMPOSITION OF THE INTERNET 30
II. PROTOCOL STANDARDS 31
A. Internet Protocols 31
B. International Telecommunication Union-Telecommunication Standardization Sector ("ITU-T") Standards 31
III. TCP/IP FEATURES 35
IV. INFORMATION TRANSPORT IN COMMUNICATION NETWORKS 35
A. Switching Techniques 35
B. Gateways and Routers 40
C. Using Network Level Communication for Smooth User Connection 42
D. Datagrams and Routing 43
V. TECHNOLOGY INTRODUCTION 44
A. ATM 44
B. Frame Relay 45
C. ISDN 45
VI. MCI INTELLIGENT NETWORK 46
A. Components of the MCI Intelligent Network 48
1. MCI Switching Network 48
2. Network Control System/Data Access Point (NCS/DAP) 48
3. Intelligent Services Network (ISN) 4 49
4. Enhanced Voice Services (EVS) 9 50
5. Additional Components 50
B. Intelligent Network System Overview 52
C. Call Flow Example 53
VII. ISP FRAMEWORK 56
A. Background 56
1. Broadband Access 56
2. Internet Telephony System 56
3. Capacity 63
4. Future Services 63
B. ISP Architecture Framework 64
C. ISP Functional Framework 65
D. ISP Integrated Network Services 69
E. ISP Components 70
F. Switchless Communications Services 71
G. Governing Principles 72
1. Architectural Principles 72
2. Service Feature Principles 73
3. Capability Principles 73
4. Service Creation, Deployment, and Execution Principles 75
5. Resource Management Model 2150 Principles 76
6. Data Management 2138 Principles 77
7. Operational Support Principles 80
8. Physical Model Principles 81
H. ISP Service Model 82
1. Purpose 82
2. Scope of Effort 83
3. Service Model Overview 84

4. Service Structure 84
5. Service 2200 Execution 89
6. Service Interactions 90
7. Service Monitoring 92
I. ISP Data Management Model 92
1. Scope 92
2. Purpose 93
3. Data management Overview 94
4. Logical Description 97
5. Physical Description 102
6. Technology Selection 104
7. Implementations 105
8. Security 105
9. Meta-Data 105
10. Standard Database Technologies 106
J. ISP Resource Management Model 106
2. The Local Resource Manager (LRM): 111
3. The Global Resource Manager (GRM) 2188: 111
4. The Resource Management Model (RMM) 112
5. Component Interactions 115
K. Operational Support Model 118
1. Introduction 118
2. The Operational Support Model 121
3. The Protocol Model 125
4. The Physical Model 126
5. Interface Points 126
6. General 128
L. Physical Network Model 129
1. Introduction 129
2. Information Flow 130
3. Terminology 132
4. Entity Relationships 133
VIII. INTELLIGENT NETWORK 134
A. Network Management 134
B. Customer Service 135
C. Accounting 137
D. Commissions 137
E. Reporting 138
F. Security 138
G. Trouble Handling 138
IX. ENHANCED PERSONAL SERVICES 139
A. Web Server Architecture 139
1. Welcome Server 450 140
2. Token Server 454 141
3. Application Servers 143
B. Web Server System Environment 144
1. Welcome Servers 145
2. Token Servers 454 149
3. Profile Management Application Servers 150
C. Security 150
D. Login Process 152
E. Service Selection 153
F. Service Operation 153
1. NIDS Server 154
2. TOKEN database service 155
3. SERVERS database service 156
4. HOSTILE__IP database service 156
5. TOKEN__HOSTS database service 157
6. SERVER__ENV database service 158
7. Chron Job(s) 159
G. Standards 159
H. System Administration 160
I. Product/Enhancement 161
J. Interface Feature Requirements (Overview) 162
1. The User Account Profile 163
2. The Database of Messages 164
K. Automated Response Unit (ARU) Capabilities 165
1. User Interface 165
L. Message Management 168
1. Multiple Media Message Notification 168
2. Multiple Media Message Manipulation 168
3. Text to Speech 168
4. Email Forwarding to a Fax Machine 169
5. Pager Notification of Messages Received 170
6. Delivery Confirmation of Voicemail 170
7. Message Prioritization 170
M. Information Services 170
N. Message Storage Requirements 172
O. Profile Management 172
P. Call Routing Menu Change 173
Q. Two-way Pager Configuration Control and Response to Park and Page 174
R. Personalized Greetings 174
S. List Management 174
T. Global Message Handling 175
X. INTERNET TELEPHONY AND RELATED SERVICES 176
A. System Environment for Internet Media 178
1. Hardware 178
2. Object-Oriented Software Tools 179
B. Telephony Over The Internet 188
1. Introduction 189
2. IP Phone as a Commercial Service 192
3. Phone Numbers in the Internet 203
4. Other Internet Telephony Carriers 204
5. International Access 204
C. Internet Telephony Services 212
D. Call Processing 220
1. VNET Call Processing 220
2. Descriptions of Block Elements 224
E. Re-usable Call Flow Blocks 229
1. VNET PC connects to a corporate intranet and logs in to a directory service 229
2. VNET PC queries a directory service for a VNET translation 234
3. PC connects to an ITG 237
4. ITG connects to a PC 238
5. VNET PC to PC Call Flow Description 239
6. Determining best choice for Internet client selection of an Internet Telephony Gateway server on the Internet: 240
7. Vnet Call Processing 249
XI. TELECOMMUNICATION NETWORK MANAGEMENT 256
A. SNMS Circuits Map 279
B. SNMS Connections Map 279
C. SNMS Nonadjacent Node Map 279
D. SNMS LATA Connections Map 279
E. NPA-NXX Information List 280
F. End Office Information List 280
G. Trunk Group Information List 280
H. Filter Definition Window 281

I. Trouble Ticket Window 281
XII. VIDEO TELEPHONY OVER POTS 282
A. Components of Video Telephony System 283
1. DSP modem pools with ACD 283
2. Agent 284
3. Video on Hold Server 284
4. Video Mail Server 284
5. Video Content Engine 284
6. Reservation Engine 285
7. Video Bridge 285
B. Scenario 285
C. Connection Setup 285
D. Calling the Destination 287
E. Recording Video-Mail, Store & Forward Video and Greetings 288
F. Retrieving Video-Mail and Video On Demand 288
G. Video-conference Scheduling 289
XIII. VIDEO TELEPHONY OVER THE INTERNET 289
A. Components 291
1. Directory and Registry Engine 291
2. Agents 292
3. Video Mail Server 292
4. Video Content Engine 292
5. Conference Reservation Engine 292
6. MCI Conference Space 293
7. Virtual Reality Space Engine 293
B. Scenario 293
C. Connection Setup 293
D. Recording Video-Mail, Store & Forward Video and Greetings 294
E. Retrieving Video-Mail and Video On Demand 295
F. Video-conference Scheduling 295
G. Virtual Reality 296
XIV. VIDEO-CONFERENCING ARCHITECTURE 296
A. Features 296
B. Components 297
1. End-User Terminals 297
2. LAN Interconnect System 298
3. ITU H.323 Server 298
4. Gatekeeper 299
5. Operator Services Module 299
6. Multipoint Control Unit (MCU) 300
7. Gateway 300
8. Support Service Units 301
C. Overview 301
D. Call Flow Example 302
1. Point-to-Point Calls 303
2. Multipoint Video-Conference Calls 308
E. Conclusion 308
XV. VIDEO STORE AND FORWARD ARCHITECTURE 309
A. Features 309
B. Architecture 310
C. Components 310
1. Content Creation and Transcoding 310
2. Content Management and Delivery 310
3. Content Retrieval and Display 311
D. Overview 312
XVI. VIDEO OPERATOR 314
A. Hardware Architecture 314
B. Video Operator Console 318
C. Video Conference Call Flow 323
D. Video Operator Software System 325
1. Class Hierarchy 325
2. Class and Object details 327
E. Graphical User Interface Classes 375
1. Class Hierarchy 375
2. Class and Object details 378
F. Video Operator Shared Database 401
1. Database Schema 401
G. Video Operator Console Graphical User Interface Windows 403
1. Main Console Window 403
2. Schedule Window 403
3. Conference Window 403
4. Video Watch Window 406
5. Console Output Window 407
6. Properties Dialog Box 407
XVII. WORLD WIDE WEB (WWW) BROWSER CAPABILITIES 408
A. User Interface 408
B. Performance 409
C. Personal Home Page 411
1. Storage Requirements 412
2. On Screen Help Text 413
3. Personal Home Page Directory 413
4. Control Bar 414
5. Home Page 415
6. Security Requirements 415
7. On Screen Help Text 416
8. Profile Management 417
9. Information Services Profile Management 419
10. Personal Home Page Profile Management 421
11. List Management 422
12. Global Message Handling 424
D. Message Center 425
1. Storage Requirements 428
E. PC Client Capabilities 429
1. User Interface 429
2. Security 430
3. Message Retrieval 431
4. Message Manipulation 432
F. Order Entry Requirements 433
1. Provisioning and Fulfillment 436
G. Traffic Systems 437
H. Pricing 437
I. Billing 438
XVIII. DIRECTLINE MCI 438
A. Overview 439
1. The ARU (Audio Response Unit) 502 439
2. The VFP (Voice Fax Platform) 504 440
3. The DDS (Data Distribution Service) 506 440
B. Rationale 440
C. Detail 441
1. Call Flow Architecture 520 441
2. Network Connectivity 441
3. Call Flow 443
4. Data Flow Architecture 445
D. Voice Fax Platform (VFP) 504 Detailed Architecture 446
1. Overview 446
2. Rationale 447

3. Detail 448
E. Voice Distribution Detailed Architecture 453
1. Overview 453
2. Rationale 453
F. Login Screen 476
G. Call Routing Screen 477
H. Guest Menu Configuration Screen 479
I. Override Routing Screen 482
J. Speed Dial Screen 483
K. ARU CALL FLOWS 495
XIX. INTERNET FAX 599
A. Introduction 599
B. Details 599
XX. INTERNET SWITCH TECHNOLOGY 603
A. An Embodiment 603
B. Another Embodiment 615
XXI. BILLING 620
A. An Embodiment 624
1. Call Record Format 624
2. Network Call Identifier 625
B. [Another Embodiment]628
1. Call Record Format 628
2. Network Call Identifier 638

INTRODUCTION TO THE INTERNET

I. THE COMPOSITION OF THE INTERNET

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Before progressing further, a common misunderstanding regarding the usage of the term "internet" should be resolved. Originally, the term was used only as the name of the network based upon the Internet Protocol, but now, internet is a generic term used to refer to an entire class of networks. An "internet" (lowercase "i") is any collection of separate physical networks, interconnected by a common protocol, to form a single logical network, whereas the "Internet" (uppercase "I") is the worldwide collection of interconnected networks that uses Internet Protocol to link the large number of physical networks into a single logical network.

II. PROTOCOL STANDARDS

A. Internet Protocols

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol. An excellent description of the details associated with TCP/IP and UDP/IP is provided in TCP/IP Illustrated, W. Richard Stevens, Addison-Wesley Publishing Company (1996).

B. International Telecommunication Union-Telecommunication Standardization Sector ("ITU-T") Standards The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352×288 pixels and 176×144 pixels.

ITU H.263 Recommendation for Video Coder-Decoder for audiovisual services supporting video resolutions of 128×96 pixels, 176×144 pixels, 352×288 pixels, 704×576 pixels and 1408×1152 pixels.

ITU H.320 Recommendation for Narrow Band ISDN visual telephone systems.

ITU H.321 Visual Telephone Terminals over ATM

ITU H.322 Visual Telephone Terminals over Guaranteed Quality of Service LANs

ITU H.323 ITU Recommendation for Visual Telephone Systems and Equipment for Local Area Networks which provide a non-guaranteed quality of service.

ITU H.324 Recommendation for Terminals and Systems for low bitrate(28.8 Kbps) multimedia communication on dial-up telephone lines.

ITU T.120 Transmission Protocols for Multimedia Data.

In addition, several other relevant standards are referenced in this document:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization(ISO), Recommendations for compression of digital Video and Audio including the bit stream but not the compression algorithms.

SLIP Serial Line Internet Protocol

RSVP Resource Reservation Setup Protocol

UDP User Datagram Protocol

III. TCP/IP FEATURES

The popularity of the TCP/IP protocols on the Internet grew rapidly because they met an important need for worldwide data communication and had several important characteristics that allowed them to meet this need. These characteristics, still in use today, include:

A common addressing scheme that allows any device running TCP/IP to uniquely address any other device on the Internet.

Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

IV. INFORMATION TRANSPORT IN COMMUNICATION NETWORKS

A. Switching Techniques

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique. Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice. However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

B. Gateways and Routers

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

C. Using Network Level Communication for Smooth User Connection

In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

D. Datagrams and Routing

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

V. TECHNOLOGY INTRODUCTION

The changing face of the internet world causes a steady inflow of new systems and technology. The following three developments, each likely to become more prevalent in the near future, serve as an introduction to the technological arena:

A. ATM

Asynchronous Transfer Mode (ATM) is a networking technology using a high-speed, connection-oriented system for both local area and wide area networks. ATM networks require modern hardware including:

High speed switches that can operate at gigabit (trillion bit) per second speeds to handle the traffic from many computers;

Optical fibers (versus copper wires) that provide high data transfer rates, with host-to-ATM switch connections running at 100 or 155 Mbps (million bits per second);

Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

B. Frame Relay

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

C. ISDN

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1. To provide an internationally accepted standard for voice, data and signaling;
2. To make all transmission circuits end-to-end digital;
3. To adopt a standard out-of-band signaling system; and To bring significantly more bandwidth to the desktop.

VI. MCI INTELLIGENT NETWORK

The MCI Intelligent Network is a call processing architecture for processing voice, fax and related services. The Intelligent Network comprises a special purpose bridging switch with special capabilities and a set of general purpose computers along with an Automatic Call Distributor (ACD). The call processing including number translation services, automatic or manual operator services, validation services and database services are carried out on a set of dedicated general purpose computers with specialized software. New value added services can be easily integrated into the system by enhancing the software in a simple and cost-effective manner.

Before proceeding further, it will be helpful to establish some terms.

| | |
|---|---|
| ISP | Intelligent Services Platform |
| NCS | Network Control System |
| DAP | Data Access Point |
| ACD | Automatic Call Distributor |
| ISN | Intelligent Services Network (Intelligent Network) |
| ISNAP | Intelligent Services Network Adjunct Processor |
| MTOC | Manual Telecommunications Operator Console |
| ARU | Audio Response Unit |
| ACP | Automatic Call Processor |
| NAS | Network Audio Server |
| EVS | Enhanced Voice Services |
| POTS | Plain Old Telephone System |
| ATM | Asynchronous Transfer Mode |

The Intelligent Network Architecture has a rich set of features and is very flexible. Addition of new features and services is simple and fast. Features and services are extended utilizing special purpose software running on general purpose computers. Adding new features and services involves upgrading the special purpose software and is cost-effective.

Intelligent Network Features and Services include

Call type identification;

Call Routing and selective termination;

Operator selection and call holding;

Manual and Automated Operator;

Voice Recognition and automated, interactive response;

Customer and customer profile verification and validation;

- Voice Mail;
- Call validation and database;
- Audio Conference reservation;
- Video Conference reservation;
- Fax delivery and broadcasting;
- Customer Billing;
- Fraud Monitoring;
- Operational Measurements and Usage Statistics reporting; and
- Switch interface and control.

A. Components of the MCI Intelligent Network

FIG. 19A illustrates an Intelligent Network in accordance with a preferred embodiment. The MCI Intelligent Network is comprised of a large number of components. Major components of the MCI Intelligent Network include the

- MCI Switching Network 2
- Network Control System (NCS)/Data Access Point(DAP) 3
- ISN—Intelligent Services Network 4
- EVS—Enhanced Voice Services 9

1. MCI Switching Network

The MCI switching network is comprised of special purpose bridging switches 2. These bridging switches 2 route and connect the calling and the called parties after the call is validated by the intelligent services network 4. The bridging switches have limited programming capabilities and provide the basic switching services under the control of the Intelligent Services Network (ISN) 4.

2. Network Control System/Data Access Point (NCS/DAP)

The NCS/DAP 3 is an integral component of the MCI Intelligent Network. The DAP offers a variety of database services like number translation and also provides services for identifying the switch ID and trunk ID of the terminating number for a call.

The different services offered by NCS/DAP 3 include:

- Number Translation for 800, 900, VNET Numbers;
- Range Restrictions to restrict toll calling options and advanced parametric routing including Time of Day, Day of Week/Month, Point of Origin and percentage allocation across multiple sites;
- Information Database including Switch ID and Trunk ID of a terminating number for a given call;
- Remote Query to Customer Databases;
- VNET/950 Card Validation Services; and
- VNET ANI/DAL Validation Services.

3. Intelligent Services Network (ISN) 4

The ISN 4 includes an Automatic Call Distributor (ACD) for routing the calls. The ACD communicates with the Intelligent Switch Network Adjunct Processor (ISNAP) 5 and delivers calls to the different manual or automated agents. The ISN includes the ISNAP 5 and the Operator Network Center (ONC). ISNAP 5 is responsible for Group Select and Operator Selection for call routing. The ISNAP communicates with the ACD for call delivery to the different agents. The ISNAP is also responsible for coordinating data and voice for operator-assisted calls. The ONC is comprised of Servers, Databases and Agents including Live Operators or Audio Response Units (ARU) including Automated Call Processors (ACP)s, MTOCs and associated NAS 7. These systems communicate with each other on an Ethernet LAN and provide a variety of services for call processing.

The different services offered by the ONC include:

- Validation Services including call-type identification, call verification and call restrictions if any;

- Operator Services, both manual and automated, for customer assistance;
- Database Services for a variety of database lookups;
- Call Extending Capabilities;
- Call Bridging Capabilities;
- Prompt for User Input; and
- Play Voice Messages.

4. Enhanced Voice Services (EVS) 9

Enhanced Voice Services offer menu-based routing services in addition to a number of value-added features. The EVS system prompts the user for an input and routes calls based on customer input or offers specialized services for voice mail and fax routing. The different services offered as a part of the EVS component of the MCI Intelligent Network include:

- Play Customer Specific Voice Messages;
- Prompt for User Input;
- User Input based Information Access;
- Call Extending Capabilities;
- Call Bridging Capabilities;
- Audio Conference Capabilities;
- Call Transfer Capabilities;
- Record User Voice Messages;
- Remote Update of Recorded Voice; and
- Send/Receive Fax.

5. Additional Components

In addition to the above mentioned components, a set of additional components are also architected into the MCI Intelligent Network. These components are:

- Intelligent Call Routing (ICR) services are offered for specialized call routing based on information obtained from the calling party either during the call or at an earlier time. Routing is also based on the knowledge of the physical and logical network layout. Additional intelligent routing services based on time of day, alternate routing based on busy routes are also offered.
- Billing is a key component of the MCI Intelligent Network. The billing component provides services for customer billing based on call type and call duration. Specialized billing services are additionally provided for value added services like the 800 Collect calls.
- Fraud Monitoring component is a key component of the MCI Intelligent Network providing services for preventing loss of revenue due to fraud and illegal usage of the network.
- Operational Measurements include information gathering for analysis of product performance. Analysis of response to advertising campaigns, calling patterns resulting in specialized reports result from operational measurements. Information gathered is also used for future product planning and predicting infrastructure requirements.
- Usage Statistics Reporting includes gathering information from operational databases and billing information to generate reports of usage. The usage statistics reports are used to study call patterns, load patterns and also demographic information. These reports are used for future product plans and marketing input.

B. Intelligent Network System Overview

The MCI Call Processing architecture is built upon a number of key components including the MCI Switch Network, the Network Control System, the Enhanced Voice Services system and the Intelligent Services Network. Call processing is entirely carried out on a set of general purpose computers and some specialized processors thereby forming the basis for the MCI Intelligent Network. The switch is a special purpose bridging switch with limited programming capabilities-and complex interface. Addition of new services on the switch is very difficult and sometimes not possible. A call on the MCI Switch is initially verified if it needs a number translation as in the case of an 800 number. If a number translation is required, it is either done at the switch itself based on an internal table or the request is sent to the DAP which is a general purpose computer with software capable of number translation and also determining the trunk ID and switch ID of the terminating number.

The call can be routed to an ACD which delivers calls to the various call processing agents like a live operator or an ARU. The ACD communicates with the ISNAP which does a group select to determine which group of agents are responsible for this call and also which of the agents are free to process this call.

The agents process the calls received by communicating with the NIDS (Network Information Distributed Services) Server which are the Validation or the Database Servers with the requisite databases for the various services offered by ISN. Once the call is validated by processing of the call on the server, the agent communicates the status back to the ACD. The ACD in turn dials the terminating number and bridges the incoming call with the terminating number and executes a Release Link Trunk (RLT) for releasing the call all the way back to the switch. The agent also generates a Billing Detail Record (BDR) for billing information. When the call is completed, the switch generates an Operation Services Record (OSR) which is later matched with the corresponding BDR to create total billing information. The addition of new value added services is very simple and new features can be added by additional software and configuration of the different computing systems in the ISP. A typical call flow scenario is explained below.

C. Call Flow Example

The Call Flow example illustrates the processing of an 800 Number Collect Call from phone 1 in FIG. 19A to phone 10. The call is commenced when a calling party dials 1-800-COLLECT to make a collect call to phone 10 the Called Party. The call is routed by the Calling Party's Regional Bell Operating Company (RBOC), which is aware that this number is owned by MCI, to a nearest MCI Switch Facility and lands on an MCI switch 2.

The switch 2 detects that it is an 800 Number service and performs an 800 Number Translation from a reference table in the switch or requests the Data Access Point (DAP) 3 to provide number translation services utilizing a database lookup.

The call processing is now delegated to a set of intelligent computing systems through an Automatic Call Distributor (ACD) 4. In this example, since it is a collect call, the calling party has to reach a Manual or an Automated Operator before the call can be processed further. The call from the switch is transferred to an ACD 4 which is operational along with an Intelligent Services Network Adjunct Processor (ISNAP) 5. The ISNAP 5 determines which group of Agents are capable of processing the call based on the type of the call. This operation is referred to as Group Select. The agents capable of call processing include Manual Telecommunications Operator Console (MTOC)s 6 or Automated Call Processors (ACP)s 7 with associated Network Audio Servers (NAS)s 7*a*. The ISNAP 5 determines which of the Agents is free to handle the call and routes the voice call to a specific Agent.

The Agents are built with sophisticated call processing software. The Agent gathers all the relevant information from the Calling Party including the telephone number of the Called Party. The Agent then communicates with the database servers with a set of database lookup requests. The database lookup requests include queries on the type of the call, call validation based on the telephone numbers of both the calling and the called parties and also call restrictions, if any, including call blocking restrictions based on the called or calling party's telephone number. The Agent then signals the ISNAP-ACD combination to put the Calling Party on hold and dial the called party and to be connected to the Called Party. The Agent informs the called party about the Calling Party and the request for a Collect Call. The Agent gathers the response from the Called Party and further processes the call.

If the Called Party has agreed to receive the call, the Agent then signals the ISNAP-ACD combination to bridge the Called Party and the Calling Party.

The Agent then cuts a BDR which is used to match with a respective OSR generated by the switch to create complete billing information.

The ISNAP-ACD combination then bridges the Called Party and the Calling Party and then releases the line back to the switch by executing a Release Trunk (RLT). The Calling Party and the Called Party can now have a conversation through the switch. At the termination of the call by either party, the switch generates a OSR which will be matched with the BDR generated earlier to create complete billing information for the call. If the Called Party declines to accept the collect call, the Agent signals the ACD-ISNAP combination to reconnect the Calling Party which was on hold back to the Agent. Finally, the Agent informs the Calling Party about the Called Party's response and terminates the call in addition to generating a BDR.

MCI Intelligent Network is a scaleable and efficient network architecture for call processing and is based on a set of intelligent processors with specialized software, special purpose bridging switches and ACD's. The Intelligent Network is an overlay network coexisting with the MCI Switching Network and is comprised of a large number of specialized processors interacting with the switch network for call processing. One embodiment of Intelligent Network is completely audio-centric. Data and fax are processed as voice calls with some specialized, dedicated features and value-added services.

In another embodiment, the Intelligent Network is adapted for newly emerging technologies, including POTS-based video-phones and internet telephony for voice and video. The following sections describe in detail the architecture, features and services based on the emerging technologies.

COMPATIBILITY OF ISN WITH EMERGING TECHNOLOGIES

The following sections describe in detail the architecture, features and services based on several emerging technologies, all of which can be integrated into the Intelligent Network.

VII. ISP FRAMEWORK

A. Background

The ISP is composed of several disparate systems. As ISP integration proceeds, formerly independent systems now become part of one larger whole with concomitant increases in the level of analysis, testing, scheduling, and training in all disciplines of the ISP.

1. Broadband Access

A range of high bandwidth services are supported by a preferred embodiment. These include: Video on Demand, Conferencing, Distance Learning, and Telemedicine.

ATM (asynchronous transfer mode) pushes network control to the periphery of the network, obviating the trunk and switching models of traditional, circuit-based telephony. It is expected to be deployed widely to accommodate these high bandwidth services.

2. Internet Telephony System

The Internet and with it, the World Wide Web, offers easy customer access, widespread commercial opportunities, and fosters a new role for successful telecommunications companies. The ISP platform offers many features which can be applied or reapplied from telephony to the Internet. These include access, customer equipment, personal accounts, billing, marketing (and advertising) data or application content, and even basic telephone service.

The telecommunication industry is a major transmission provider of the Internet. A preferred embodiment which provides many features from telephony environments for Internet clients is optimal.

Figure 19B:
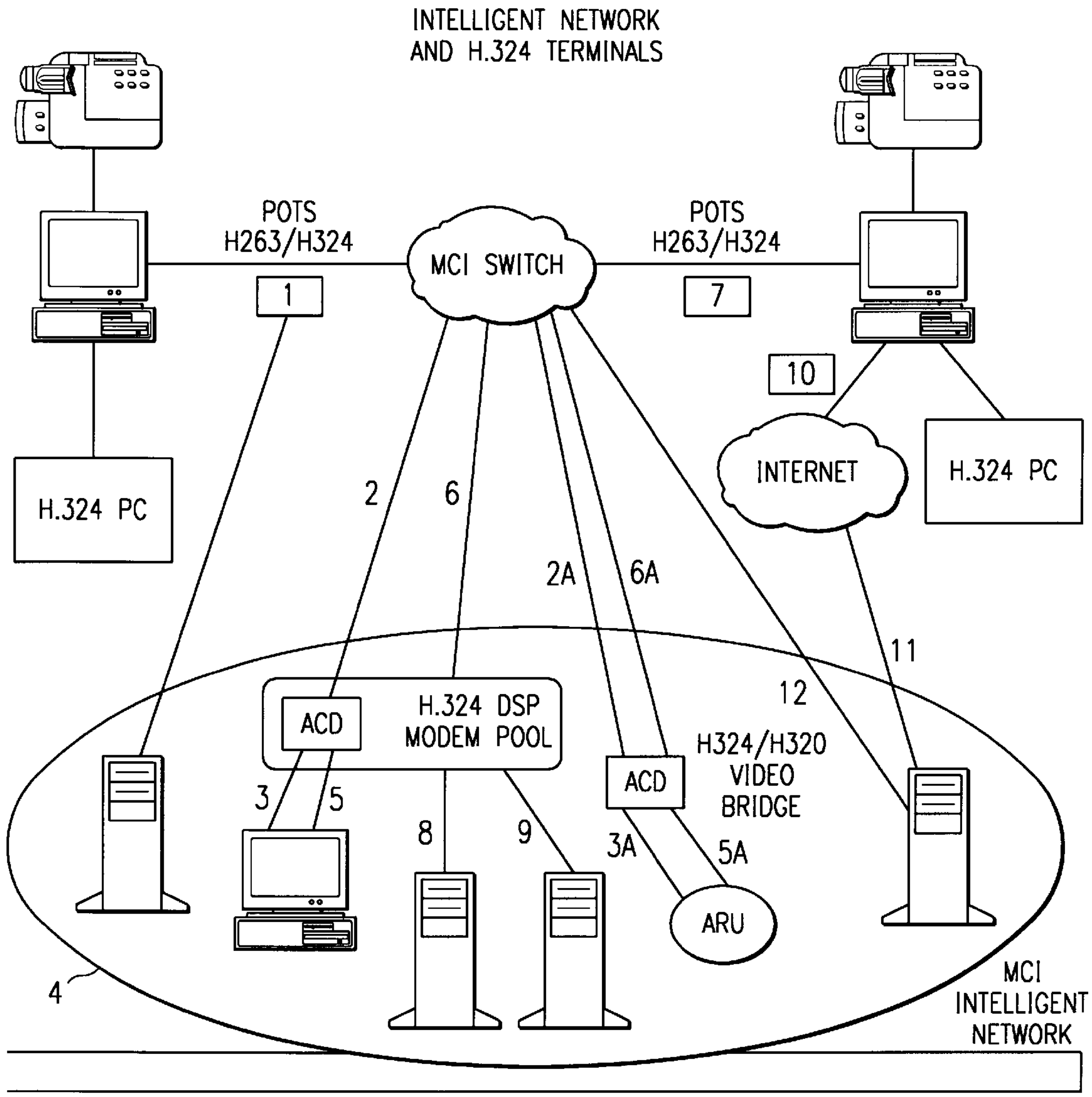
Figure 19C:
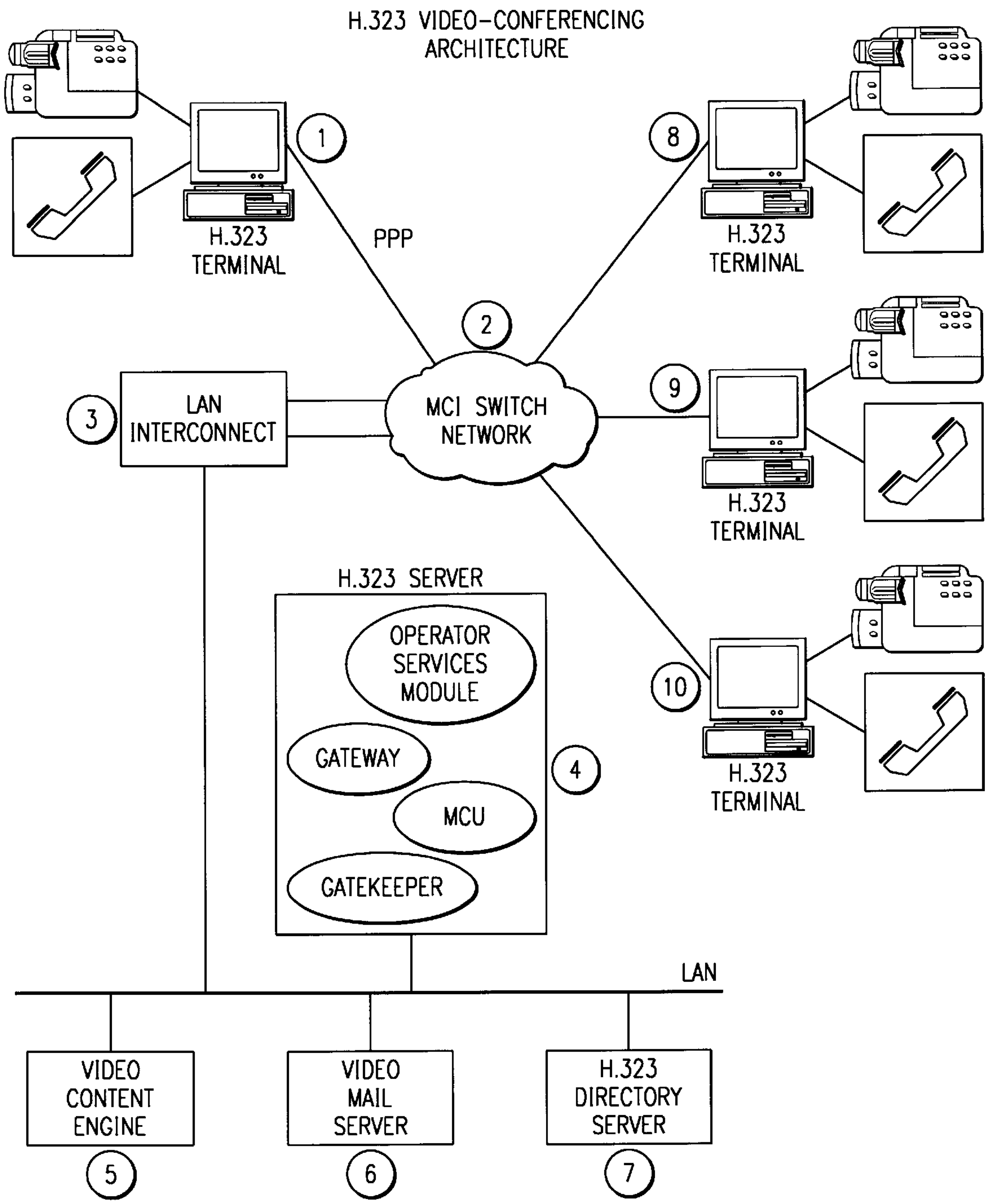
FIG. 19C illustrates a Video-Conferencing Architecture in accordance with a preferred embodiment.
Figure 19D:
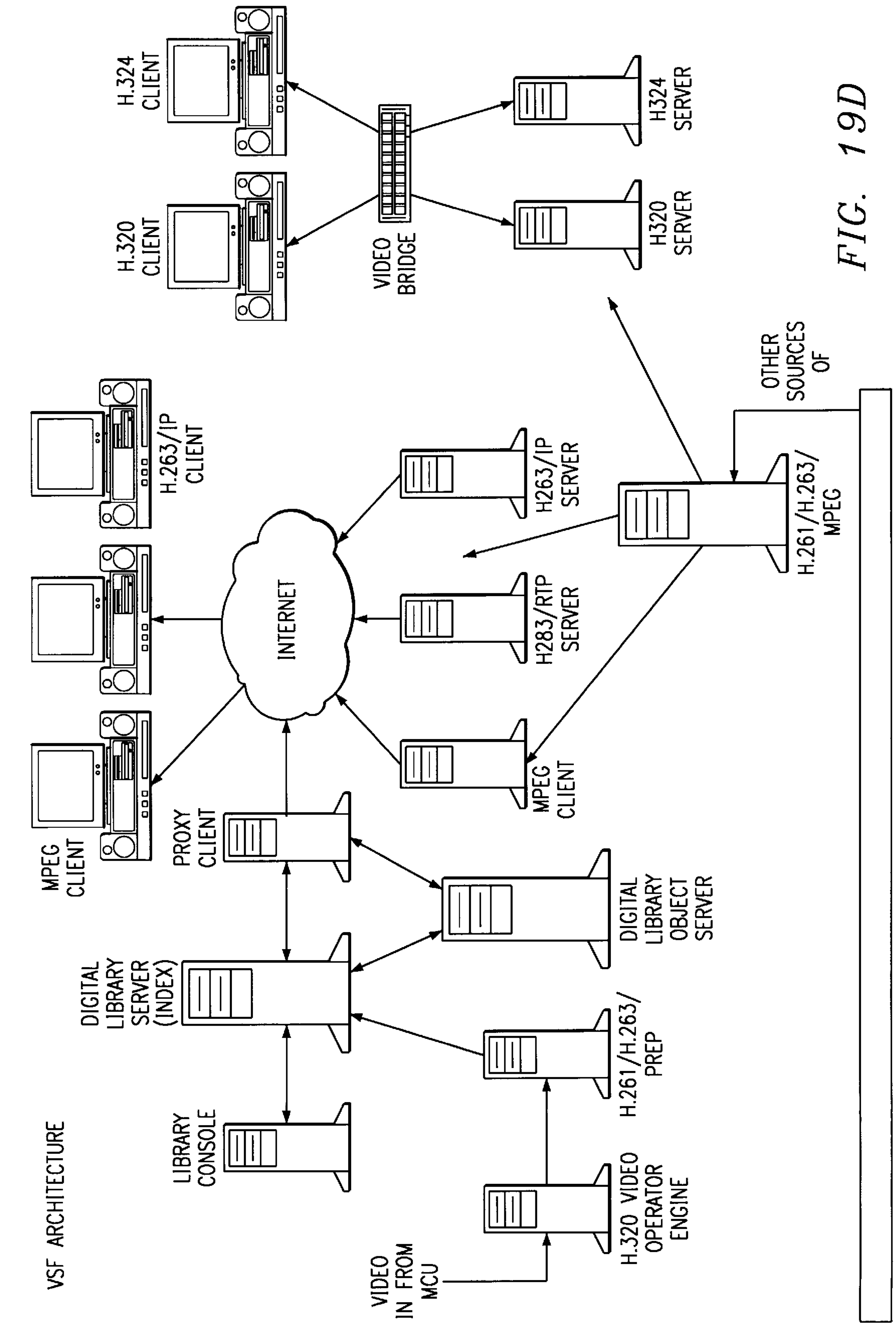
FIG. 19D illustrates a Video Store and Forward Architecture in accordance with a preferred embodiment.
Figure 19E:
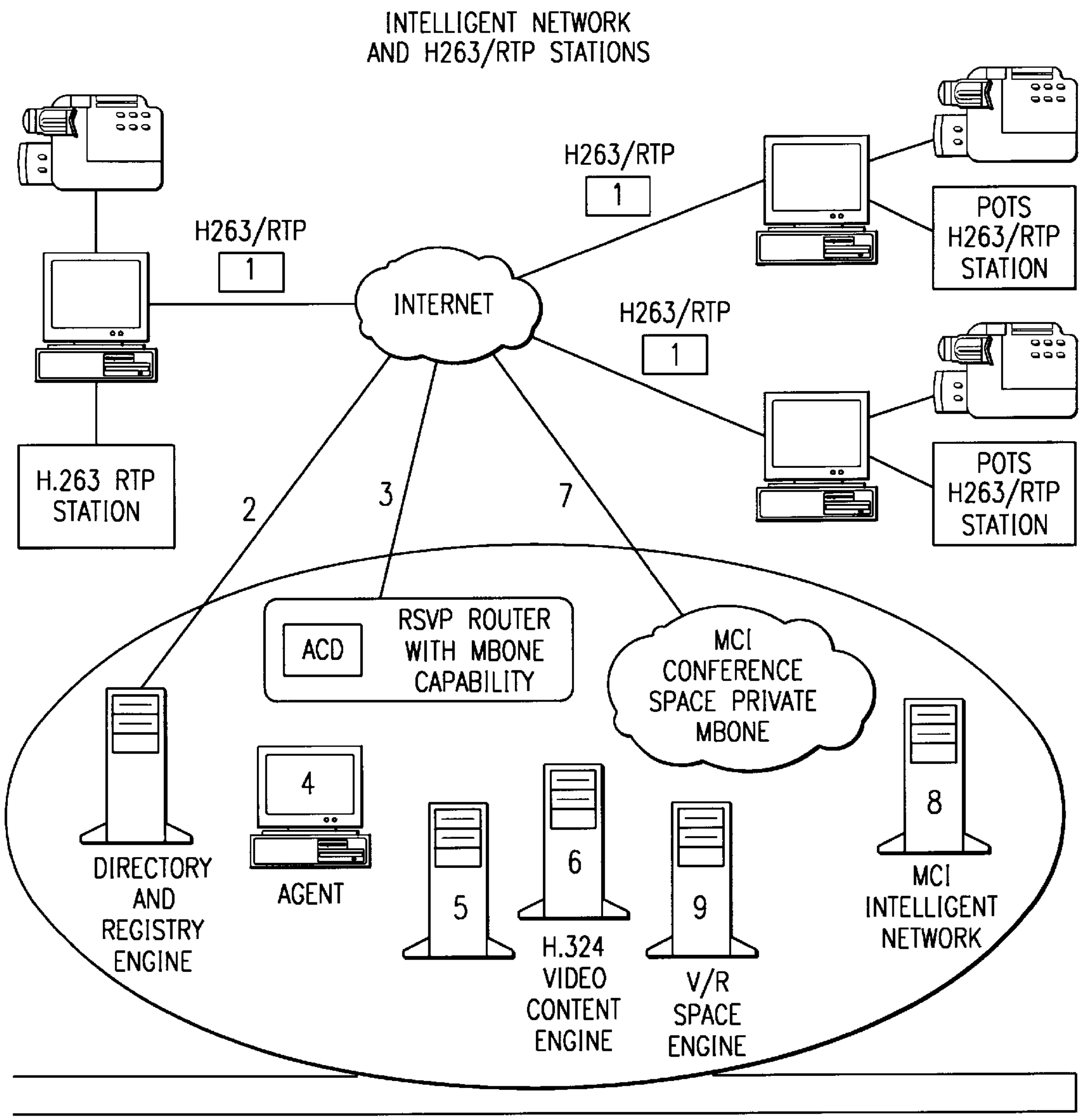
FIG. 19E illustrates an architecture for transmitting video telephony over the Internet in accordance with a preferred embodiment.
Figure 19F:
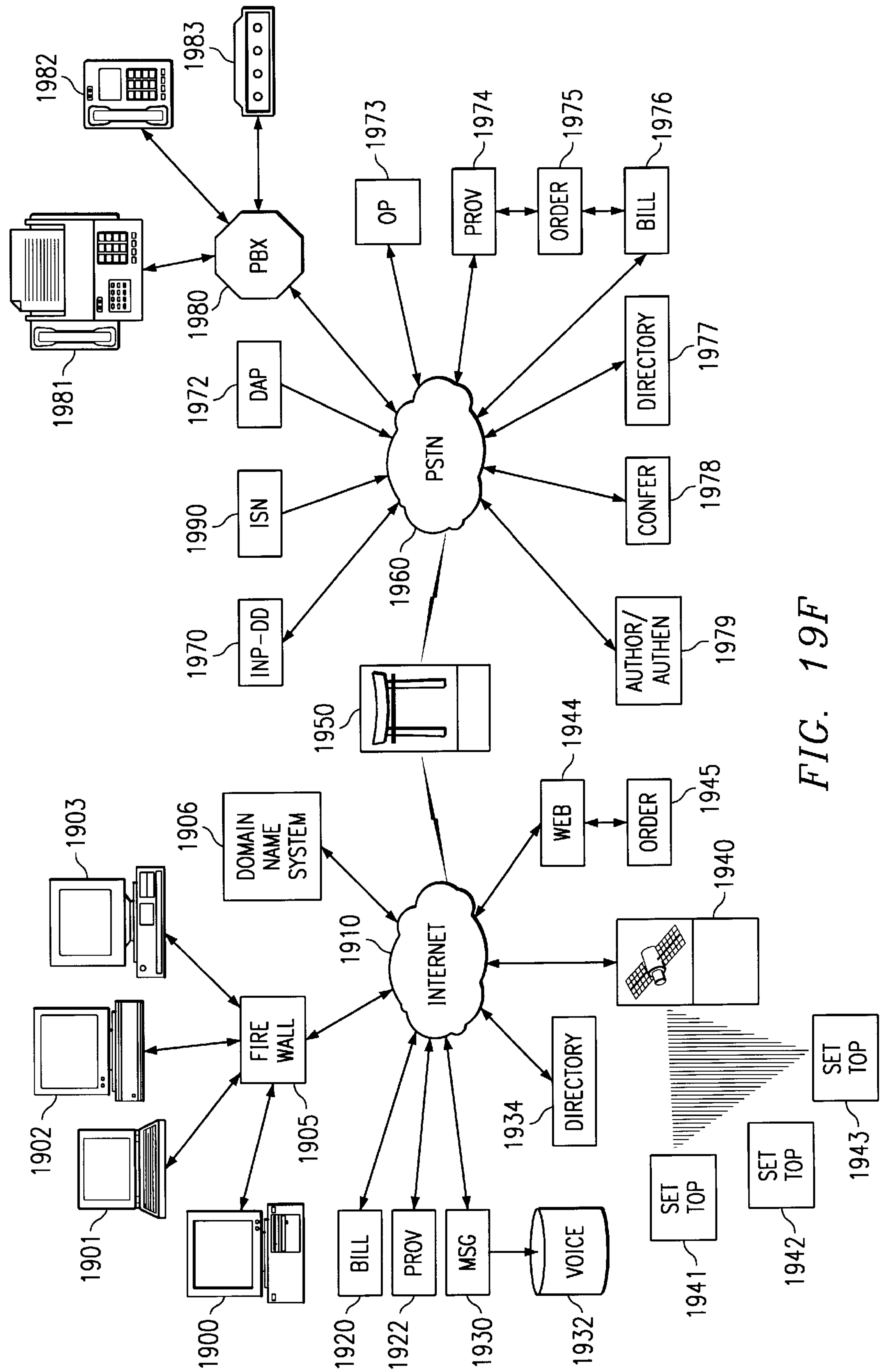
FIG. 19F is a block diagram of an internet telephony system in accordance with a preferred embodiment.

FIG. 19F is a block diagram of an internet telephony system in accordance with a preferred embodiment. A number of computers 1900, 1901, 1902 and 1903 are connected behind a firewall 1905 to the Internet 1910 via an Ethernet or other network connection. A domain name system 1906 maps names to IP addresses in the Internet 1910. Individual systems for billing 1920, provisioning 1922, directory services 1934, messaging services 1930, such as voice messaging 1932 are all attached to the internet 1910 via a communication link. Another communication link is also utilized to facilitate communications to a satellite device 1940 that is used to communicate information to a variety of set top devices 1941–1943. A web server 1944 provides access for an order entry system 1945 to the Internet 1910.

In an embodiment, the order entry system 1945 generates complete profile information for a given telephone number, including, name, address, fax number, secretary's number, wife's phone number, pager, business address, e-mail address, IP address and phonemail address. This information is maintained in a database that can be accessed by everyone on the network with authorization to do so. In an alternate embodiment, the order entry system utilizes a web interface for accessing an existing directory service database 1934 to provide information for the profile to supplement user entered information.

The Internet 1910 is tied to the Public Switched Network (PSTN) 1960 via a gateway 1950. The gateway 1950 in a preferred embodiment provides a virtual connection from a circuit switched call in the PSTN 1960 and some entity in the Internet 1910.

The PSTN 1960 has a variety of systems attached, including a direct-dial input 1970, a Data Access Point (DAP) 1972 for facilitating 800 number processing and Virtual NETwork (VNET) processing to facilitate for example a company tieline. A Public Branch Exchange (PBX) 1980 is also attached via a communication link for facilitating communication between the PSTN 1960 and a variety of computer equipment, such as a fax 1981, telephone 1982 and a modem 1983. An operator 1973 can also optionally attach to a call to assist in placing a call or conference call coming into and going out of the PSTN 1960 or the internet 1910.

Various services are attached to the PSTN through individual communication links including an attachment to the Intelligent Services Network (ISN) 1990, direct-dial plan 1991, provisioning 1974, order entry 1975, billing 1976, directory services 1977, conferencing services 1978, and authorization/authentication services 1979. All of these services can communicate between themselves using the PSTN 1960 and the Internet 1910 via a gateway 1950. The functionality of the ISN 1990 and the DAP 1972 can be utilized by devices attached to the Internet 1910.

Figure 19G:
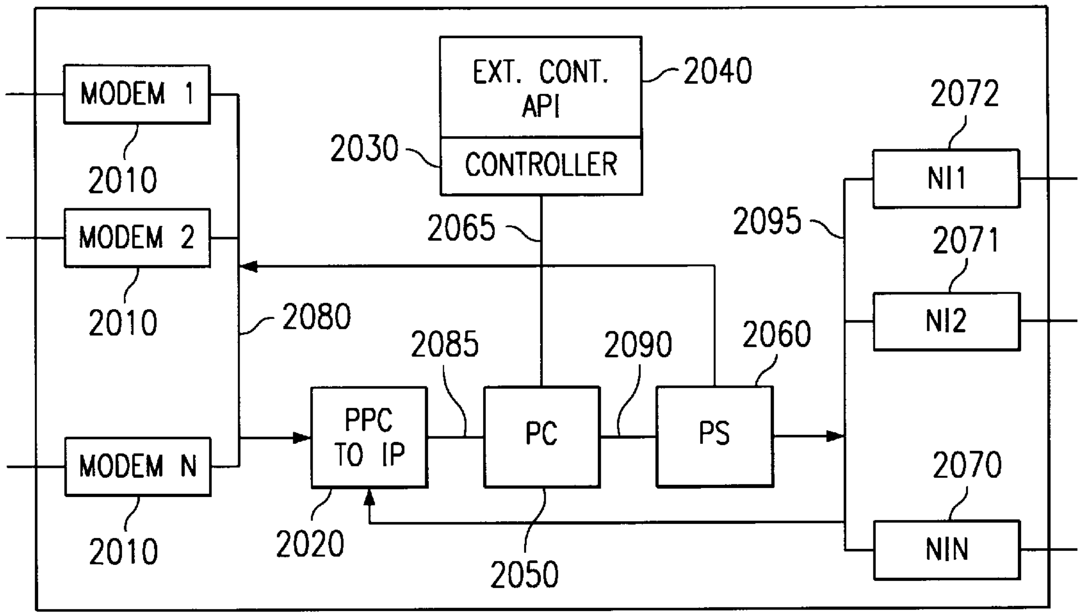
FIG. 19G is a block diagram of a prioritizing access/router in accordance with a preferred embodiment.

FIG. 19G is a block diagram of a Prioritizing Access/Router in accordance with a preferred embodiment. A prioritizing access router (PAR) is designed to combine the features of an internet access device and an Internet Protocol (IP) Router. It enables dial-up modem access to the internet by performing essential modem and PPP/SLIP to IP and the reverse IP to PPP/SLIP conversion. It also analyzes IP packet source/destination addresses and UPD or TCP ports and selects appropriate outgoing network interfaces for each packet. Lastly, it uses a priority routing technique to favor packets destined for specific network interfaces over packets destined for other network interfaces.

The design goal of the prioritizing access/router is to segregate real-time traffic from the rest of the best-effort data traffic on internet networks. Real-time and interactive multimedia traffic is best segregated from traffic without real-time constraints at the access point to the internet, so that greater control over quality of service can be gained. The process that a prioritizing access/router utilizes is presented below with reference to FIG. 19G.

First, at 2010, a computer dials up the PAR via a modem. The computer modem negotiates a data transfer rate and modem protocol parameters with the PAR modem. The computer sets up a Point to Point Protocol (PPP) session with the PAR using the modem to modem connection over a Public Switched Telephone Network (PSTN) connection.

The computer transfers Point-to-Point (PPP) packets to the PAR using the modem connection. The PAR modem 2010 transfers PPP packets to the PPP to IP conversion process 2020 via the modem to host processor interface 2080. The modem to host processor interface can be any physical interface presently available or yet to be invented. Some current examples are ISA, EISA, VME, SCbus, MVIP bus, Memory Channel, and TDM buses. There is some advantage in using a multiplexed bus such as the Time Division Multiplexing buses mentioned here, due to the ability to devote capacity for specific data flows and preserve deterministic behavior.

The PPP to IP conversion process 2020 converts PPP packets to IP packets, and transfers the resulting IP packets to the packet classifier 2050 via the process to process interface 2085. The process to process interface can be either a physical interface between dedicated processor hardware, or can be a software interface. Some examples of process to process software interfaces include function or subroutine calls, message queues, shared memory, direct memory access (DMA), and mailboxes.

The packet classifier 2085 determines if the packet belongs to any special prioritized group. The packet classifier keeps a table of flow specifications, defined by destination IP Address
source IP address
combined source/destination IP Address
combined destination IP Address/UDP Port
combined destination IP Address/TCP Port
combined source IP address/UDP Port
combined source IP Address/TCP Port
combined source IP Address and TCP or UDP port with destination IP address
combined destination IP Address and TCP or UDP port with source IP address combined source IP Address and TCP or UDP port with destination IP address and TCP/UDP Port.

The packet classifier checks its table of flow specifications against the IP addresses and UDP or TCP ports used in the packet. If any match is found, the packet is classified as belonging to a priority flow and labeled as with a priority tag. Resource Reservation Setup Protocol techniques may be used for the packet classifier step.

The packet classifier 2050 hands off priority tagged and non-tagged packets to the packet scheduler 2060 via the process to process interface (90). The process to process interface 2090 need not be identical to the process to process interface 2085, but the same selection of techniques is available. The packet scheduler 2060 used a priority queuing technique such as Weighted Fair Queueing to help ensure that prioritized packets (as identified by the packet classifier) receive higher priority and can be placed on an outbound network interface queue ahead of competing best-effort traffic.

The packet scheduler 2060 hands off packets in prioritized order to any outbound network interface (2010, 2070, 2071 or 2072) via the host processor to peripheral bus 2095. Any number of outbound network interfaces may be used.

IP packets can arrive at the PAR via non-modem interfaces (2070, 2071 and 2072). Some examples of these interfaces include Ethernet, fast Ethernet, FDDI, ATM, and Frame Relay. These packets go through the same steps as IP packets arriving via the modem PPP interfaces.

The priority flow specifications are managed through the controller process 2030. The controller process can accept externally placed priority reservations through the external control application programming interface 2040. The controller validates priority reservations for particular flows against admission control procedures and policy procedures, and if the reservation is admitted, the flow specification is entered in the flow specification table in the packet classifier 2050 via the process to process interface 2065. The process to process interface 2065 need not be identical to the process to process interface 2085, but the same selection of techniques is available.

Figure 20:
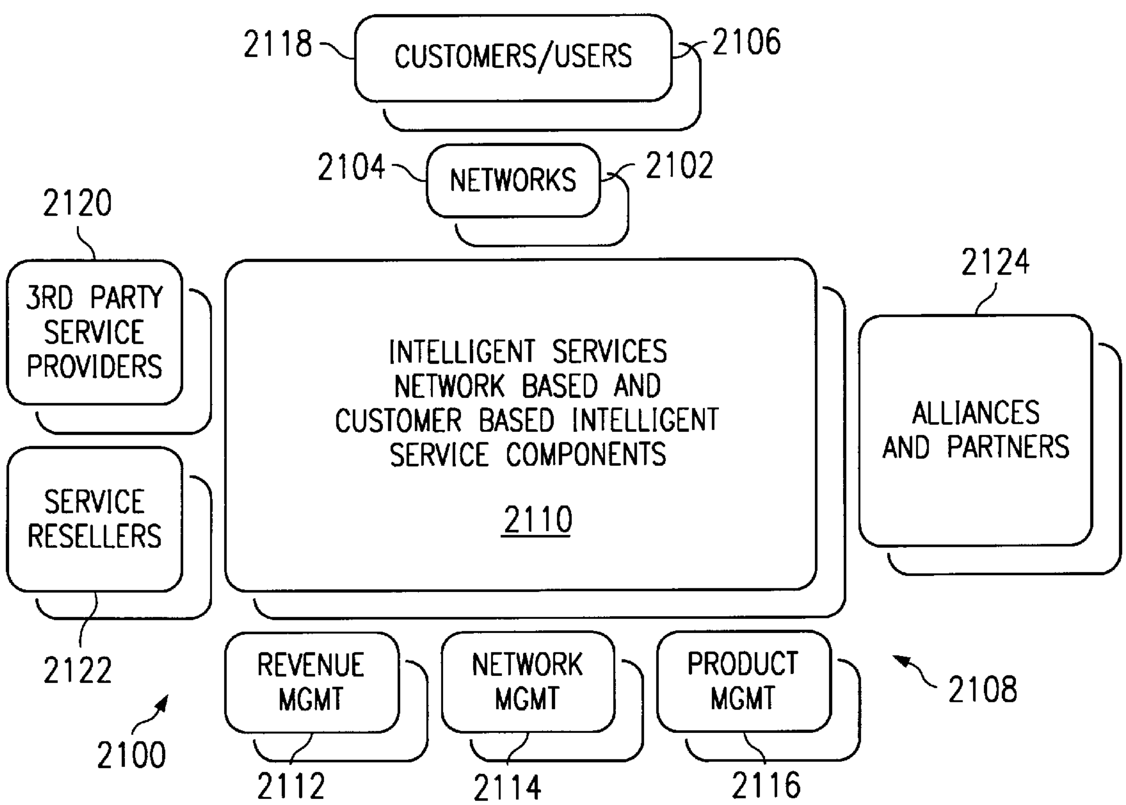
FIG. 20 is a high level block diagram of a networking system in accordance with a preferred embodiment.

Turning now to FIG. 20, there is shown an architectural framework for an Intelligent Services Platform (ISP) 2100, used in the present invention. The architecture of the ISP 2100 is intended to define an integrated approach to the provision and delivery of intelligent services to the MCI network across all the components of the ISP.

Each of the existing communication network systems has its own way of providing service management, resource management, data management, security, distributed processing, network control, or operations support. The architecture of the ISP 2100 defines a single cohesive architectural framework covering these areas. The architecture is focused on achieving the following goals:

- Develop global capabilities;
- Deliver enhanced future services;
- Make efficient use of resources;
- Improve time to market;
- Reduce maintenance and operations costs;
- Increase overall product quality; and
- Introduce scalability both upward and downward capabilities.

The target capabilities of the ISP 2100 are envisioned to provide the basic building blocks for very many services. These services characterized as providing higher bandwidth, greater customer control or personal flexibility, and much reduced, even instantaneous, provisioning cycles.

3. Capacity

The ISP 2100 has a reach that is global and ubiquitous. Globally, it will reach every country through alliance partners' networks. In breadth, it reaches all business and residential locales through wired or wireless access.

4. Future Services

The above capabilities will be used to deliver:

- Telephony and messaging services beyond what we have today;
- Emerging video and multi-media offerings;
- Powerful data services, including enhanced private networks; and
- Software and equipment to enable end users to gain complete control over their services.

Services provided by the ISP 2100 will span those needed in advertising, agriculture, education, entertainment, finance, government, law, manufacturing, medicine, network transmission, real estate, research, retailing, shipping, telecommunications, tourism, wholesaling, and many others.

Services:

- Customizable: customer is able to tailor the service offerings to their own needs.
- Customer managed: customer has direct (network-side) access for the administration and control of their service.
- Loosely Coupled: services obtain and use network resources only when needed; customers pay for only what they use. Bandwidth is available on demand, and without pre-allocation.
- Secure & Private: customer privacy and confidentiality is paramount in the networked world. Commercial interests are guaranteed safe, secure transactions. Users and customers are identified and authenticated, and the network protected from tampering or corruption.

B. ISP Architecture Framework

The following section describes the role of the ISP Platform 2100 in providing customer services.

The ISP 2100 provides customer services through an intelligent services infrastructure, including provider network facilities 2102, public network facilities 2104, and customer equipment 2106. The services infrastructure ensures the end-to-end quality and availability of customer service.

The following section describes the relationship of the ISP platform 2100 to various external systems both within and outside a provider.

The provider components 2108 in FIG. 20 are:

- Intelligent Services 2110—responsible for service provisioning, service delivery, and service assurance, including the internal data communications networks 2102. This represents the ISP's role.
- Revenue Management 2112—responsible for financial aspects of customer services.
- Network Management 2114—responsible for the development and operation of the physical networks 2102.
- Product Management 2116—responsible for the creation and marketing of customer services.

The entities external to the ISP 2100 depicted in FIG. 20 are:

- Networks 2104—this represents all the network connections and access methods used by customers 2106 for service. This includes a provider's circuit switched network, packet switched networks, internal extended wide area network, the internet, a provider's wireless partners' networks, a provider's global alliance and national partner networks, broadband networks, as well as the customer premises equipment 2118 attached to these networks.

3rd party Service Providers 2120—this represents those external organizations which deliver services to customers via the provider's Intelligent Services Platform 2100.

Service Resellers 2122—this represents those organizations which have customers using the facilities 2100.

Global Alliance Partners 2124—organizations which have shared facilities and exchange capabilities of their networks and service infrastructures.

C. ISP Functional Framework

Figure 21:
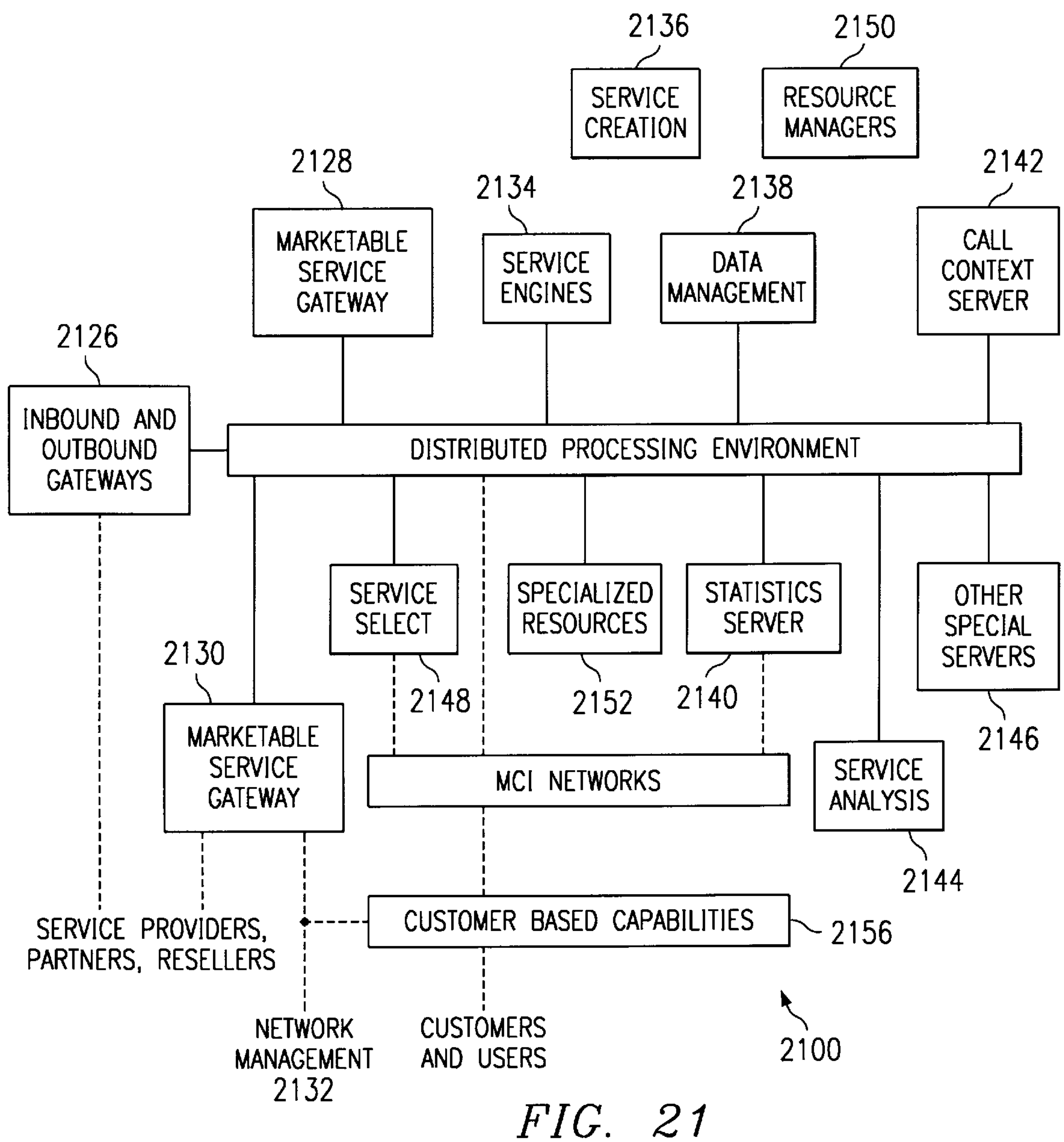
FIG. 21 is a functional block diagram of a portion of the system shown in FIG. 20 in accordance with a preferred embodiment.

FIG. 21 shows components of the ISP 2100 in more detail. Shown is the set of logical components comprising the ISP 2100 architecture. None of these components is a single physical entity; each typically occurs multiple times in multiple locations. The components work together to provide a seamless Intelligent Services 2110 environment. This environment is not fixed; it is envisioned as a flexible evolving platform capable of adding new services and incorporating new technologies as they become available. The platform components are linked by one or more network connections which include an internal distributed processing infrastructure.

The ISP 2100 Functional Components are:

Inbound and Outbound Gateways 2126—allows access to services provided by other providers, and allows other providers to access the provider's services.

Marketable Service Gateway 2128—interface to a three-tier service creation environment for services the provider sells. Services are deployed and updated through the Marketable Service Gateway 2128. This is actually no different than the Management Service Gateway 2130, except that the services created and deployed through here are for external customers.

Management Service Gateway 2130—illustrates that service creation concepts apply to management of the platform as well as service logic. Management services are deployed and managed through the Management Service Gateway 2130. Also, interfaces with management systems external to ISP 2100 are realized by the Management Service Gateway 2130. Some examples of management services include the collection, temporary storage, and forwarding of (billable) network events. Other services include collection and filtering of alarm information from the ISP 2100 before forwarding to network management 2132.

Service Engines 2134—A Service Logic Execution Environment for either marketable or management services. The Service Engines 2134 execute the logic contained in customer-specific profiles in order to provide unique customized service features.

Service Creation Environment 2136—Creates and deploys management services as well as marketable services, and their underlying features and capabilities.

Data Management 2138—Where all customer and service profile data is deployed. Data is cached on Service Engines 2134, Statistics Servers 2140, Call Context servers 2142, Analysis Servers 2144, and other specialized applications or servers 2146 requiring ISP 2100 data.

Service Select 2148—Whether the services are accessed via a narrowband or broadband network, circuit-switched, packet-switched, or cell-switched, the services are accessed via a Service Select function 2148. Service Select 2148 is a specialized version of a service engine 2134, designed specifically to choose a service or services to execute.

Resource Managers 2150—manages all resources, including specialized resources 2152 and service instances running on service engines 2134, and any other kind of resource in the ISP 2100 that needs management and allocation.

Specialized Resources 2152—Special network-based capabilities (Internet to voice conversion, DTMF-detection, Fax, Voice Recognition, etc) are shown as specialized resources 2152.

Call Context Server 2142—accepts network event records and service event records in real time, and allows queries against the data. Once all events for a call (or any other kind of network transaction) are generated, the combined event information is delivered en masse to the Revenue Management function 2154. Data is stored short-term.

Statistics Server 2140—accepts statistics events from service engines, performs rollups, and allows queries against the data. Data is stored short-term.

Customer Based Capabilities 2156—software and specialized hardware on the customer premises that enables customer-premises based capabilities, such as ANI screening, Internet access, compression, interactive gaming, videoconferencing, retail access, you name it.

Analysis Services 2144—a special kind of service engine that isn't based on network access, but is based on adding value based upon network statistics or call context information in real time or near real time. Examples include fraud detection and customer traffic statistics.

Other Special Services 2146—entail other specialized forms of applications or servers that may or may not be based on the Service Engine model. These components provide other computing resources and lower-level functional capabilities which may be used in Service delivery, monitoring, or management.

D. ISP Integrated Network Services

Figure 22:
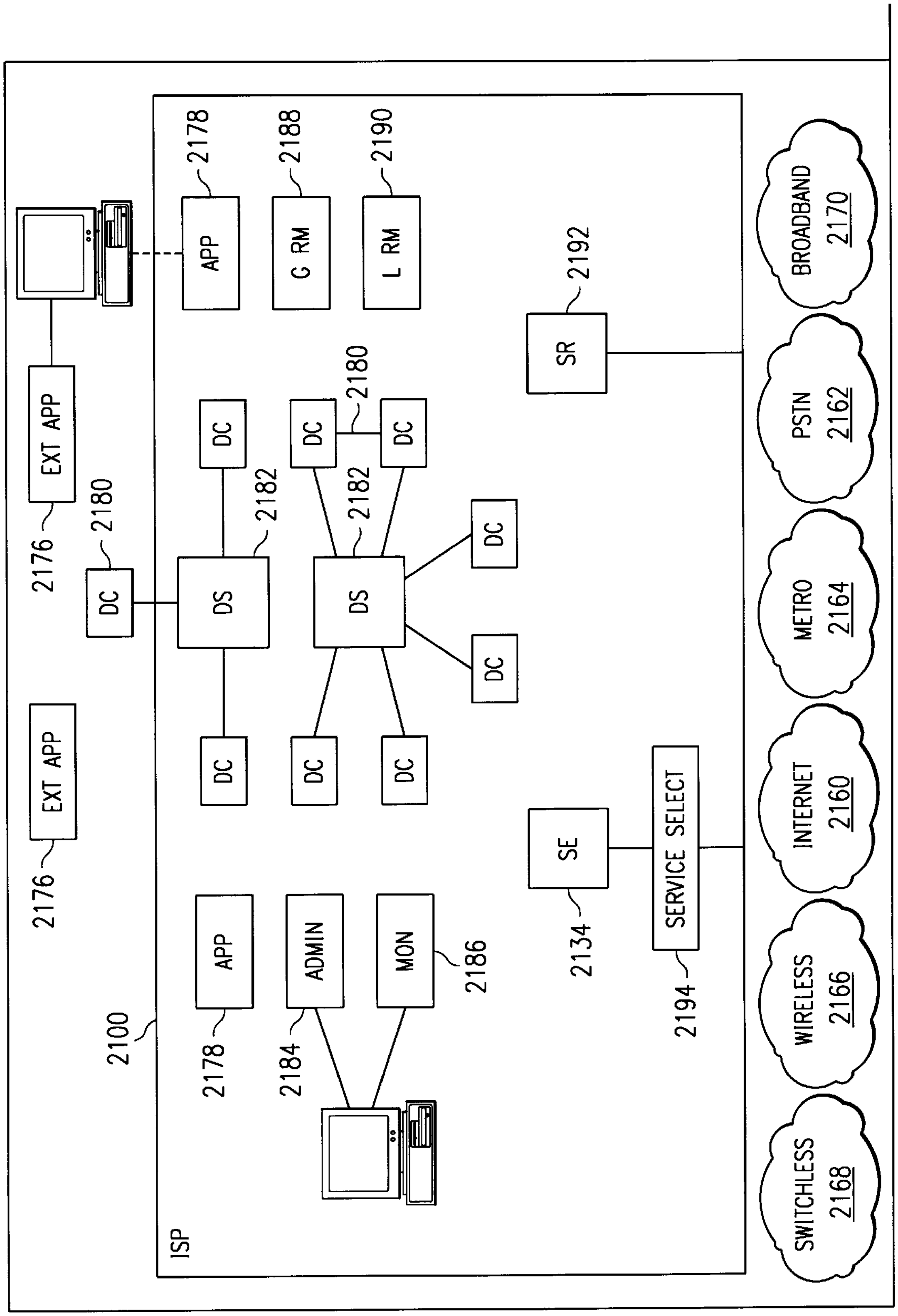
FIG. 22 is another high level block diagram in accordance with a preferred embodiment of FIG. 21.

FIG. 22 shows how the ISP architecture 2100 supplies services via different networks. The networks shown include Internet 2160, the public switched telephony network (PSTN) 2162, Metro access rings 2164, and Wireless 2166. Additionally, it is expected that new "switchless" broadband network architectures 2168 and 2170 such as ATM or ISOEthernet may supplant the current PSTN networks 2162.

The architecture accommodates networks other than basic PSTNs 2162 due to the fact that these alternative network models support services which cannot be offered on a basic PSTN, often with an anticipated reduced cost structure. These Networks are depicted logically in FIG. 22.

Each of these new networks are envisioned to interoperate with the ISP 2100 in the same way. Calls (or transactions) will originate in a network from a customer service request, the ISP will receive the transaction and provide service by first identifying the customer and forwarding the transaction to a generalized service-engine 2174. The service engine determines what service features are needed and either applies the necessary logic or avails itself of specialized network resources for the needed features.

The ISP 2100 itself is under the control of a series of Resource managers and Administrative and monitoring mechanisms. A single system image is enabled through the concurrent use of a common information base. The information base holds all the Customer, Service, Network and Resource information used or generated by the ISP. Other external applications (from within MCI and in some cases external to MCI) are granted access through gateways, intermediaries, and sometimes directly to the same information base.

In FIG. 22, each entity depicts a single logical component of the ISP. Each of these entities is expected to be deployed in multiple instances at multiple sites.

E. ISP Components

Ext App 2176—an external application;

App 2178—an internal ISP application (such as Fraud Analysis);

Dc 2180—Data client, a client to the ISP information base which provides a local data copy;

Ds 2182—Data server, one of the master copies of ISP information;

Admin 2184—the ISP administrative functions (for configurations, and maintenance);

Mon 2186—the ISP monitoring functions (for fault, performance, and accounting);

GRM 2188—the global resource management view for selected resources;

LRM 2190—the local resource management view for selected resources;

SR 2192—the pools of specialized resources (such as video servers, ports, speech recognition);

SE 2134—the generalized service engines which execute the desired service logic; and Service Select 2194—the function which selects the service instance (running on a service engine 2134) which should process transactions offered from the networks.

F. Switchless Communications Services

The switchless network 2168 is a term used for the application of cell-switching or packet-switching techniques to both data and isochronous multimedia communications services. In the past, circuit switching was the only viable technology for transport of time-sensitive isochronous voice. Now, with the development of Asynchronous Transfer Mode cell switching networks which provide quality of service guarantees, a single network infrastructure which serves both isochronous and bursty data services is achievable.

The switchless network is expected to provide a lower cost model than circuit switched architectures due to:

Flexibility to provide exactly the bandwidth required for each application, saving bandwidth when no data is being transferred. A minimum 56 Kbps circuit will not automatically be allocated for every call.

Adaptability to compression techniques, further reducing bandwidth requirements for each network session.

Lower costs for specialized resource equipment, due to the fact that analog ports do not have to be supplied for access to special DSP capabilities such as voice recognition or conferencing. A single high-bandwidth network port can serve hundreds of "calls" simultaneously.

Figure 23:
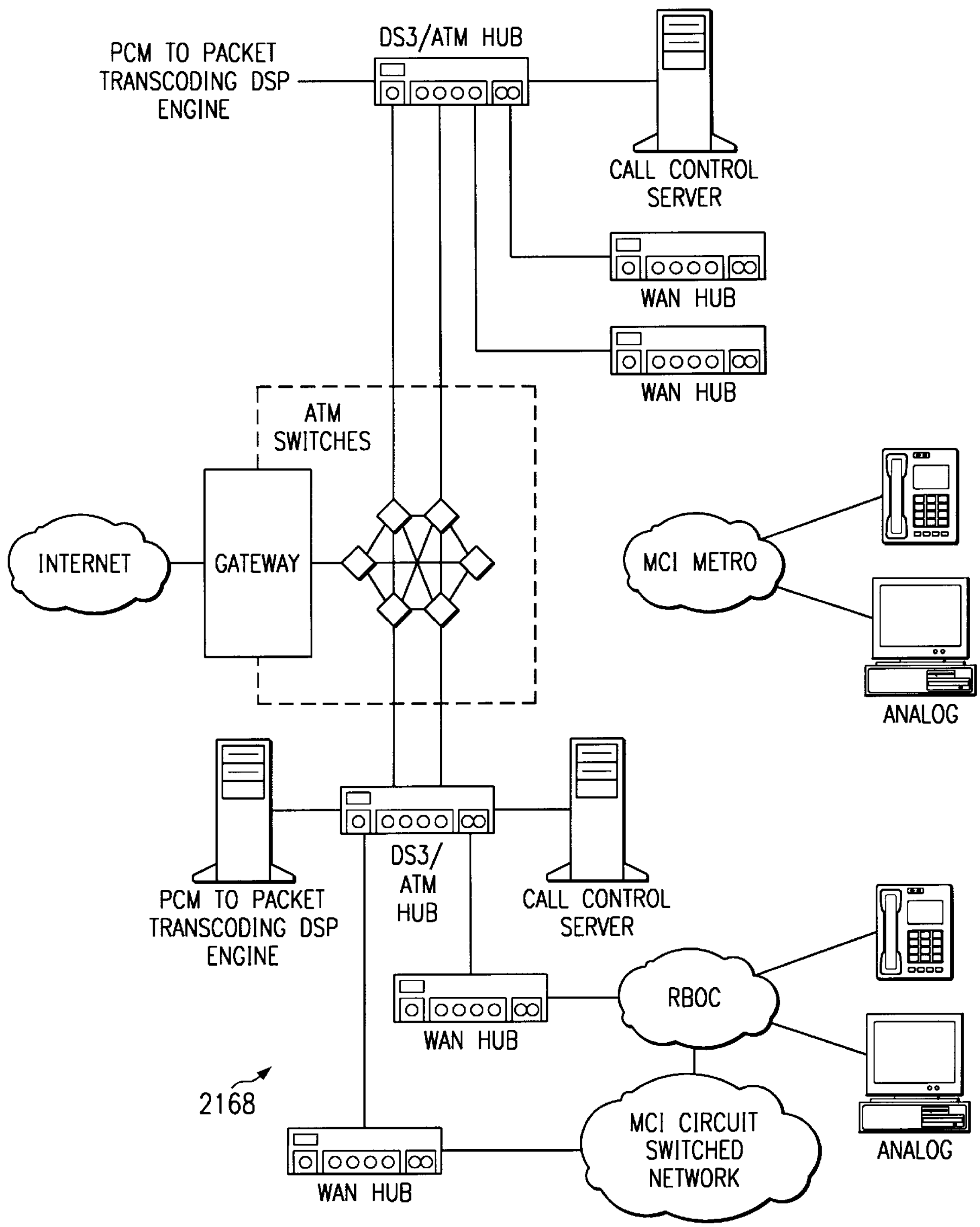
FIG. 23 is a block diagram of a switchless network system in accordance with a preferred embodiment.

Applicability and ease of adaptation of the switchless networks to advanced high-bandwidth services such as videoconferencing, training on demand, remote expert, integrated video/voice/fax/electronic mail, and information services. FIG. 23 illustrates a sample switchless network 2168 in accordance with a preferred embodiment.

G. Governing Principles

1. Architectural Principles

This section contains a listing of architectural principles which provide the foundation of the architecture which follows.

Service Principles

1. The Service Model must support seamless integration of new and existing services.
2. Services are created from a common Service Creation Environment (SCE) which provides a seamless view of services.
3. All services execute in common service logic execution environments (SLEEs), which do not require software changes when new services are introduced.
4. All services are created from one or more service features.
5. Data stored in a single customer profile in the ISP Data Servers may be used to drive multiple services.
6. The Service Model must support the specification and fulfillment of quality of service parameters for each service. These quality of service parameters, when taken together, constitute a service level agreement with each customer. Service deployment must take into account specified quality of service parameters.

2. Service Feature Principles

1. All service features are described by a combination of one or more capabilities.
2. All service features can be defined by a finite number of capabilities.
3. Individual service features must be defined using a standard methodology to allow service designers to have a common understanding of a capability. Each service feature must document their inputs, outputs, error values, display behaviors, and potential service applications.
4. Interaction of physical entities in the network implementation shall not be visible to the user of the service feature through the service feature interfaces.
5. Each service feature should have a unified and stable external interface. The interface is described as a set of operations, and the data required and provided by each operation.
6. Service features are not deployed into the network by themselves. A service feature is only deployed as part of a service logic program which invokes the service feature (see FIG. 21). Thus, service features linked into service logic programs statically, while capabilities are linked to service logic programs dynamically. This is where the loose coupling of resources to services is achieved.

3. Capability Principles

1. Capabilities are defined completely independent from consideration of any physical or logical implementation (network implementation independent).
2. Each capability should have a unified and stable interface. The interface is described as a set of operations, and the data required and provided by each operation.
3. Individual capabilities must be defined using a standard methodology to allow service designers to have a common understanding of a capability. Each capability must document their inputs, outputs, error values, display behaviors, and potential service applications.
4. Interaction of physical entities in the network implementation shall not be visible to the user of the capability through the capability interfaces.
5. Capabilities may be combined to form high-level capabilities.
6. An operation on a capability defines one complete activity. An operation on a capability has one logical starting point and one or more logical ending points.

7. Capabilities may be realized in one or more piece of physical hardware or software in the network implementation.
8. Data required by each capability operation is defined by the capability operation support data parameters and user instance data parameters.
9. Capabilities are deployed into the network independent of any service.
10. Capabilities are global in nature and their location need not be considered by the service designer, as the whole network is regarded as a single entity from the viewpoint of the service designer.
11. Capabilities are reusable. They are used without modification for other services.

4. Service Creation, Deployment, and Execution Principles

1. Each Service Engine 2134 supports a subset of the customer base. The list of customers supported by a service engine is driven by configuration data, stored on the ISP Data Server 2182.
2. Each Service Engine 2134 obtains its configuration data from the ISP data servers 2152 at activation time.
3. Service Engines 2134 use ISP database clients 2180 (see the data management section of this description) to cache the data necessary to support the customers configured for that service engine 2134, as needed. Caching can be controlled by the ISP database server 2182, or controlled by the database of the ISP database server 2182. Data may be cached semi-permanently (on disk or in memory) at a service engine 2134 if it is deemed to be too much overhead to load data from the data server 2182 on a frequent basis.
4. Service Engines 2134 may be expected to execute all of a customer's services, or only a subset of the customer's services. However, in the case of service interactions, one Service Engine 2134 must always be in control of the execution of a service at any given time. Service Engines may hand-off control to other service engines during the course of service execution.
5. Service Engines do not own any data, not even configuration data.
6. Service Engines 2134 are not targets for deployment of data. Data Servers 2182 are targets for deployment of data.

5. Resource Management Model 2150 Principles

1. Resources 2152 should be accessible from anywhere on the network.
2. Resources are not service-specific and can be shared across all services if desired.
3. Resources of the same type should be managed as a group.
4. The Resource Management Model 2150 should be flexible enough to accommodate various management policies, including: Least Cost, Round Robin, Least Recently Used, Most Available, First Encountered, Use Until Failure and Exclusive Use Until Failure.
5. The Resource Management Model 2150 should optimize the allocation of resources and, if possible, honoring a selected policy.
6. The RM 2150 must allow for a spectrum of resource allocation techniques ranging from static configuration to fully dynamic allocation of resources on a transaction by transaction basis.
7. The Resource Management Model 2150 must allow for the enforcement of resource utilization policies such as resource time out and preemptive reallocation by priority.
8. The Resource Management Model 2150 must be able to detect and access the status, utilization and health of resources in a resource pool.
9. All Resources 2152 must be treated as managed objects.
10. All resources must be able to register with the RM 2150 to enter a pool, and de-register to leave a pool.
11. The only way to request, acquire and release a resource 2152 is through the RM 2150.
12. The relationship between resources should not be fixed, rather individual instances of a given resource should be allocated from a registered pool in response to need or demand.
13. All specialized resources 2152 must be manageable from a consistent platform-wide viewpoint.
14. All specialized resources 2152 must offer SNMP or CMIP agent functionality either directly or through a proxy.
15. Every specialized resource 2152 shall be represented in a common management information base.
16. All specialized resources shall support a standard set of operations to inquire, probe, place in or out of service, and test the item.
17. All specialized resources shall provide a basic set of self-test capabilities which are controlled through the standard SNMP or CMIP management interfaces.

6. Data Management 2138 Principles

1. Multiple copies of any data item are allowed.
2. Multiple versions of the value of a data item are possible, but one view is considered the master.
3. Master versions of a given data item are under a single jurisdiction.
4. Multiple users are allowed to simultaneously access the same data.
5. Business rules must be applied uniformly across the ISP 2100 to ensure the validity of all data changes.
6. Users work on local copies of data; data access is location independent and transparent.
7. From the data management point of view, users are applications or other software components.
8. Data access should conform to a single set of access methods which is standardized across the ISP 2100.
9. Private data is allowed at a local database, but cannot be shared or distributed.
10. Only master data can be shared or distributed.
11. Private formats for a shared data item are allowed at the local database.
12. Transactional capabilities can be relaxed at end-user discretion if allowed within the business rules.
13. Rules-based logic and other meta-data controls provide a flexible means to apply policy.
14. Data Replication provides reliability through duplication of data sources.
15. Database Partitioning provides scalability by decreasing the size of any particular data store, and by decreasing the transaction rate against any particular data store.
16. Data Management 2138 must allow both static and dynamic configuration of data resources.
17. Common data models and common schemas should be employed.
18. Logical application views of data are insulated from physical data operations such as relocation of files, reloading of databases, or reformatting of data stores.
19. Audit trails, and event histories, are required for adequate problem resolutions.
20. On-line data audits and reconciliation are required to ensure data integrity.
21. Data recovery of failed databases is needed in real time.
22. Data metrics are needed for monitoring, trending, and control purposes.
23. 7 by 24 operation with 99.9999 availability is required.

24. Data Management 2138 mechanisms must scale for high levels of growth.
25. Data Management 2138 mechanisms must provide cost effective solutions for both large-scale and small-scale deployments.
26. Data Management mechanisms must handle overload conditions gracefully.
27. Data processing and data synchronization must occur in real-time to meet our business needs.
28. Trusted order entry and service creation should work directly on the ISP databases rather than through intermediary applications whenever possible.
29. All data must be protected; additionally customer data is private and must retain its confidentiality.
30. Configurations, operational settings, and run-time parameters are mastered in the ISP MIB (management information base).
31. Wherever possible, off the shelf data solutions should be used to meet Data Management needs.

The following principles are stated from an Object-oriented view:

32. Data items are the lowest set of persistent objects; these objects encapsulate a single data value.
33. Data items may have a user defined type.
34. Data items may be created and deleted.
35. Data items have only a single get and set method.
36. The internal value of a data item is constrained by range restrictions and rules.
37. Data items in an invalid state should be inaccessible to users.

7. Operational Support Principles

1. Common View—All ISP 2100 Operational Support User Interfaces should have the same look & feel.
2. Functional Commonality—The management of an object is represented in the same manner throughout the ISP Operational support environment.
3. Single View—A distributed managed object has a single representation at the ISP Operational Support User Interfaces, and the distribution is automatically.
4. OS/DM Domain—Data within the Operational support domain should be managed with the ISP Data Management 2138 Mechanisms.
5. Global MIB—There is a logical Global MIB which represents resources in the entire ISP.
6. External MIBs—Embedded MIBs that are part of a managed component are outsider of Operational Support and Data Management. Such MIBs will be represented to the OS by a Mediation Device.
7. System Conformance—System conformance to the ISP OS standards will be gained through Mediation Layers.
8. Operational Functions—Operational personnel handle the Network Layer & Element Management for physical & logical resources.
9. Administration Functions—Administration personnel handle the Planning & Service Management.
10. Profile Domain—Service & customer profile data bases are managed by administration personnel under the domain of the Data Management system.
11. Telecommunication Management Network (TMN) compliance—TMN compliance will be achieved through a gateway to any TMN system.
12. Concurrent—Multiple Operators & Administrators must be able to simultaneously perform operations from the ISP OS Interfaces.

8. Physical Model Principles

1. Compatibility: The physical network model provides backward compatibility for existing telecommunications hardware and software.
2. Scaleable: The physical network model is scaleable to accommodate a wide range of customer populations and service requirements.
3. Redundant: The physical network model provides multiple paths of information flow across two network elements. Single points of failure are eliminated.
4. Transparent: Network elements is transparent to the underlying network redundancy. In case of a failure, the switchover to redundant links is automatic.
5. Graceful Degradation: The physical network model is able to provide available services in a gradual reduction of capacity in the face of multiple network failures.
6. Interoperable: The physical network model allows networks with different characteristics to interoperate with different network elements.
7. Secure: The physical network model requires and provides secure transmission of information. It also has capabilities to ensure secure access to network elements.
8. Monitoring: The physical network model provides well-defined interfaces and access methods for monitoring the traffic on the network. Security (see above) is integrated to prevent unauthorized access to sensitive data.
9. Partitionable: The physical network model is (logically) partitionable to form separate administrative domains.
10. Quality of Service: The physical network model provides QOS provisions such as wide range of qualities, adequate QOS for legacy applications, congestion management and user-selectable QOS.
11. Universal Access: The physical network model does not prevent access to a network element due to its location in the network. A service is able to access any resource on the network.
12. Regulatory awareness: The physical network model is amenable at all levels to allow for sudden changes in the regulatory atmosphere.
13. Cost Effective: The physical network model allows for cost effective implementations by not being reliant on single vendor platforms or specific standards for function.

H. ISP Service Model

This section describes the Service model of the Intelligent Services Platform Architecture Framework.

1. Purpose

The ISP Service Model establishes a framework for service development which supports:

- rapid service creation and deployment;
- efficient service execution;
- complete customization control over services for customers;
- total service integration for a seamless service view for customers;
- improved reuse of ISP capabilities through loose coupling of those capabilities;
- reduced cost of service implementation; and
- vendor-independence.

2. Scope of Effort

The ISP Service Model supports all activities associated with Services, including the following aspects:

- provisioning;
- creation;
- deployment;
- ordering;
- updating;
- monitoring;
- execution;
- testing or simulation;

customer support and troubleshooting;

trouble ticket handling; and operations support.

This model covers both marketable services and management services.

Marketable services are the services purchased by our customers

Management services are part of the operation of the MCI network, and are not sold to customers.

The Service Model also defines interactions with other parts of the ISP Architecture, including Data Management, Resource Management, and Operational Support.

3. Service Model Overview

Figure 24:
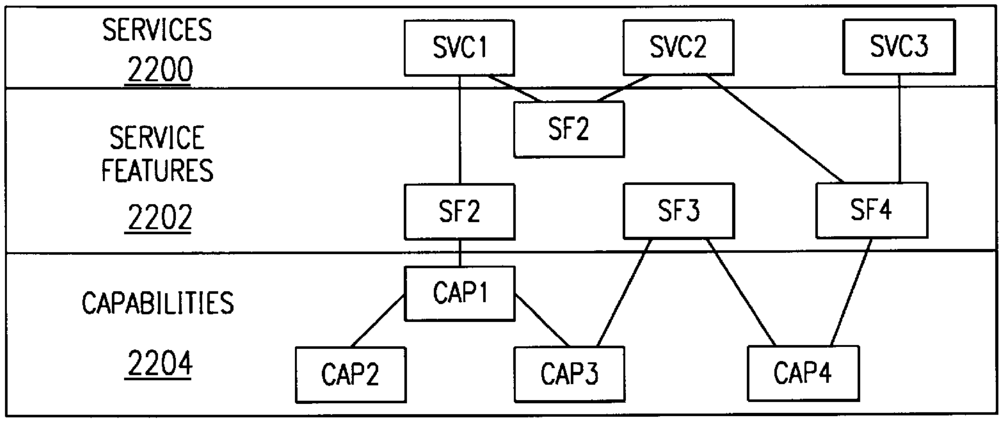
FIG. 24 is a hierarchy diagram illustrating a portion of the systems shown in FIGS. 20 and 23 in accordance with a preferred embodiment.

Central to the Intelligent Services Platform is the delivery of Services 2200 (FIG. 24). Services are the most critical aspect in a telecommunication service provider's ability to make money. The following definition of services is used throughout this service model: A service 2200 is a set of capabilities combined with well-defined logic structures and business processes which, when accessed through a published interface, results in a desired and expected outcome on behalf of the user.

One of the major differences between a Service 2200 and an Application 2176 or 2178 (FIG. 22) is that a Service 2200 includes the business processes that support the sale, operation, and maintenance of the Service. The critical task in developing a Service is defining what can be automated, and clearly delineating how humans interact with the Service.

4. Service Structure

The vocabulary we will use for describing services includes the services themselves, service features, and capabilities. These are structured in a three-tier hierarchy as shown in FIG. 24.

A service 2200 is an object in a sense of an object-oriented object as described earlier in the specification. An instance of a service 2200 contains other objects, called service features 2202. A service feature 2202 provides a well defined interface which abstracts the controlled interaction of one or more capabilities 2204 in the ISP Service Framework, on behalf of a service.

Service features 2202, in turn, use various capability 2204 objects. Capabilities 2204 are standard, reusable, network-wide building blocks used to create service features 2202. The key requirement in Service Creation is for the engineers who are producing basic capability objects to insure each can be reused in many different services as needed.

a) Services 2200

Services 2200 are described by "service logic," which is basically a program written in a very high-level programming language or described using a graphical user interface. These service logic programs identify:

what service features 2202 are used;

the order in which service features are invoked;

the source of input service data;

the destination for output service data;

error values and error handling;

invocation of other services 2200;

interaction with other services; and the interactions with other services;

The service logic itself is generally not enough to execute a service 2200 in the network. Usually, customer data is needed to define values for the points of flexibility defined in a service, or to customize the service for the customer's particular needs. Both Management and Marketable Services are part of the same service model. The similarities between of Management and Marketable Services allow capabilities to be shared. Also, Management and Marketable Services represent two viewpoints of the same network: Management Services represent and operational view of the network, and Marketable Services represent an external end-user or customer view of the network. Both kinds of services rely on network data which is held in common.

Every Marketable Service has a means for a customer to order the service, a billing mechanism, some operational support capabilities, and service monitoring capabilities. The Management Services provide processes and supporting capabilities for the maintenance of the platform.

b) Service Features 2202

Figure 25:
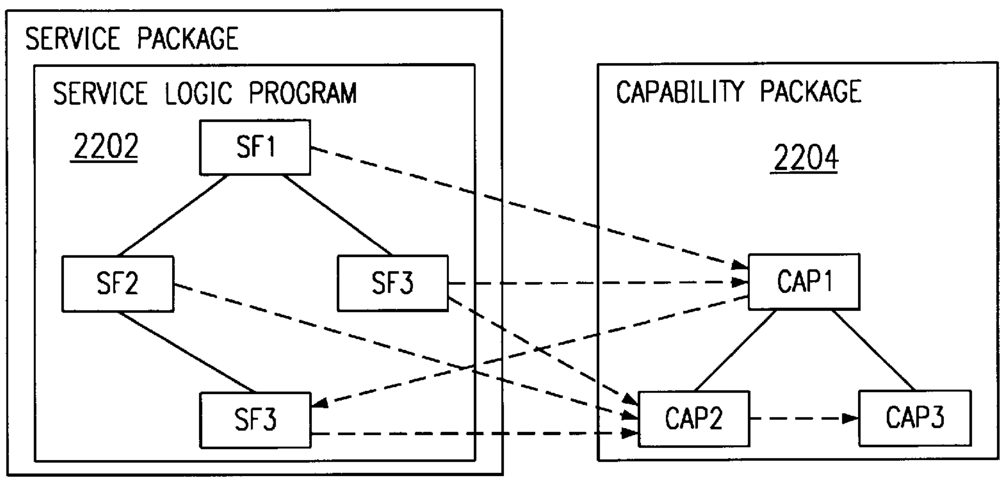
FIG. 25 is a block diagram illustrating part of the system portion shown in FIG. 24 in accordance with a preferred embodiment.

Service features 2202 provide a well-defined interface of function calls. Service features can be reused in many different services 2200, just as capabilities 2204 are reused in many different service features 2202. Service features have specific data input requirements, which are derived from the data input requirements of the underlying capabilities. Data output behavior of a service feature is defined by the creator of the service feature, based upon the data available from the underlying capabilities. Service Features 2202 do not rely on the existence of any physical resource, rather, they call on capabilities 2204 for these functions, as shown in FIG. 25.

Some examples of service features are:

Time-based Routing—based on capabilities such as a calendar, date/time, and call objects, this feature allows routing to different locations based upon time.

Authentication—based upon capabilities such as comparison and database lookup, this function can be used to validate calling card use by prompting for a card number and/or an access number (pin number), or to validate access to a virtual private network.

Automated User Interaction—based upon capabilities such as voice objects (for recording and playback of voice), call objects (for transferring and bridging calls to specialized resources), DTMF objects (for collection or outpulsing of DTMF digits), vocabulary objects (for use with speech recognition), this feature allows automated interaction with the user of a service. This service feature object can be extended to include capabilities for video interaction with a user as well.

c) Capabilities 2204

A capability 2204 is an object, which means that a capability has internal, private state data, and a well-defined interface for creating, deleting, and using instances of the capability. Invoking a capability 2204 is done by invoking one of its interface operations. Capabilities 2204 are built for reuse. As such, capabilities have clearly defined data requirements for input and output structures. Also, capabilities have clearly defined error handling routines.

Capabilities may be defined in object-oriented class hierarchies whereby a general capability may be inherited by several others.

Some examples of network-based capability objects are:

voice (for recording or playback), call (for bridging, transferring, forwarding, dial-out, etc), DTMF (for collection or outpulsing), and Fax (for receive, send, or broadcast).

Some capabilities are not network-based, but are based purely on data that has been deployed into our platform. Some examples of these capabilities are:

calendar (to determine what day of the week or month it is), comparison (to compare strings of digits or characters), translation (to translate data types to alternate formats), and distribution (to choose a result based on a percentage distribution).

d) Service Data

There are three sources for data while a service executes:

Static Data defined in the service template, which include default values for a given service invocation.

Interactive Data obtained as the service executes, which may be explicit user inputs or derived from the underlying network connections.

Custom Data defined in User Profiles, which is defined by customers or their representatives when the service is requested (i.e. at creation time).

5. Service 2200 Execution

Services 2200 execute in Service Logic Execution Environments (SLEEs). A SLEE is executable software which allows any of the services deployed into the ISP 2100 to be executed. In the ISP Architecture, Service Engines 2134 (FIG. 21) provide these execution environments. Service Engines 2134 simply execute the services 2200 that are deployed to them.

Service templates and their supporting profiles are deployed onto database servers 2182 (FIG. 22). When a SLEE is started on a Service Engine 2134, it retrieves its configuration from the database server 2182. The configuration instructs the SLEE to execute a list of services 2200. The software for these services is part of the service templates deployed on the database servers. If the software is not already on the Service Engine 2134, the software is retrieved from the database server 2182. The software is executed, and service 200 begins to run.

In most cases a service 2200 will first invoke a service feature 2202 (FIG. 24) which allows the service to register itself with a resource manager 2188 or 2190. Once registered, the service can begin accepting transactions. Next, a service 2200 will invoke a service feature 2202 which waits on an initiating action. This action can be anything from an internet logon, to an 800 call, to a point of sale card validation data transaction. Once the initiating action occurs in the network, the service select function 2148 (FIG. 21) uses the Resource Manager 2150 function to find an instance of the executing service 2200 to invoke. The initiating action is delivered to the service 2200 instance, and the service logic (from the service template) determines subsequent actions by invoking additional service features 2202.

During service 2200 execution, profile data is used to determine the behavior of service features 2202. Depending on service performance requirements, some or all of the profile data needed by a service may be cached on a service engine 2134 from the ISP 2100 database server 2182 to prevent expensive remote database lookups. As the service executes, information may generated by service features 2202 and deposited into the Context Database. This information is uniquely identified by a network transaction identifier. In the case of a circuit-switched call, the already-defined Network Call Identifier will be used as the transaction identifier. Additional information may be generated by network equipment and deposited into the Context Database as well, also indexed by the same unique transaction identifier. The final network element involved with the transaction deposits some end-of-transaction information into the Context Database. A linked list strategy is used for determining when all information has been deposited into the Context Database for a particular transaction. Once all information has arrived, an event is generated to any service which has subscribed to this kind of event, and services may then operate on the data in the Context Database. Such operations may include extracting the data from the Context Database and delivering it to billing systems or fraud analysis systems.

6. Service Interactions

In the course of a network transaction, more than one service can be invoked by the network. Sometimes, the instructions of one service may conflict with the instructions of another service. Here's an example of such a conflict: a VNET caller has a service which does not allow the caller to place international calls. The VNET caller dials the number of another VNET user who has a service which allows international dialing, and the called VNET user places an international call, then bridges the first caller with the international call. The original user was able to place an international call through a third party, in defiance of his company's intention to prevent the user from dialing internationally. In such circumstances, it may be necessary to allow the two services to interact with each other to determine if operation of bridging an international call should be allowed.

Figure 26:
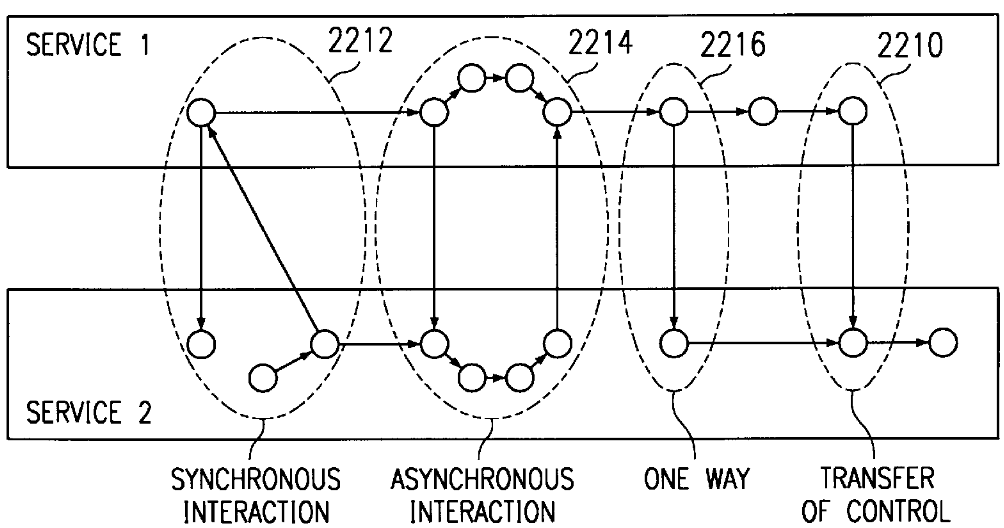
FIG. 26 is a flow chart illustrating a portion of a method in accordance with a preferred embodiment.

The ISP service model must enable services 2200 to interact with other services. There are several ways in which a service 2200 must be able to interact with other services (see FIG. 26):

Transfer of Control 2210: where a service has completed its execution path and transfers control to another service;

Synchronous Interaction 2212: where a service invokes another service and waits for a reply;

Asynchronous Interaction 2214: where a service invokes another service, performs some other actions, then waits for the other service to complete and reply; or One Way Interaction 2216: where a service invokes another service but does not wait for a reply.

In the example of interacting VNET services above, the terminating VNET service could have queried the originating VNET service using the synchronous service interaction capability. The interesting twist to this idea is that service logic can be deployed onto both network-based platforms and onto customer premises equipment. This means that service interaction must take place between network-based services and customer-based services.

7. Service Monitoring

Services 2200 must be monitored from both the customer's viewpoint and the network viewpoint. Monitoring follows one of two forms:

The service 2200 can generate detailed event-by-event information for delivery to the transaction context database The service can generate statistical information for delivery periodically to a statistics database, or for retrieval on demand by a statistics database.

Analysis services can use the Statistics Database or the Context Database to perform real time or near real time data analysis services.

The Context Database collects all event information regarding a network transaction. This information will constitute all information necessary for network troubleshooting, billing, or network monitoring.

I. ISP Data Management Model

This section describes the Data Management 2138 aspects of the Intelligent Services Platform (ISP) 2100 Target Architecture.

1. Scope

The ISP Data Management 2138 Architecture is intended to establish a model which covers the creation, maintenance, and use of data in the production environment of the ISP 2100, including all transfers of information across the ISP boundaries.

The Data Management 2138 Architecture covers all persistent data, any copies or flows of such data within the ISP, and all flows of data across the ISP boundaries. This model defines the roles for data access, data partitioning, data security, data integrity, data manipulation, plus database administration. It also outlines management policies when appropriate.

2. Purpose

The objectives of this architecture are to:

Create a common ISP functional model for managing data;

Separate data from applications;

Establish patterns for the design of data systems;

Provide rules for systems deployment;

Guide future technology selections; and

Reduce redundant developments and redundant data storage.

Additional goals of the target architecture are:

Ensure data flexibility;

Facilitate data sharing;

Institute ISP-wide data control and integrity;

Establish data security and protection;

Enable data access and use;

Provide high data performance and reliability;

Implement data partitioning; and

Achieve operational simplicity.

3. Data management Overview

In one embodiment, the Data Management Architecture is a framework describing the various system components, how the systems interact, and the expected behaviors of each component. In this embodiment data is stored at many locations simultaneously, but a particular piece of data and all of its replicated copies are viewed logically as a single item. A key difference in this embodiment is that the user (or end-point) dictates what data is downloaded or stored locally.

a) Domains

Figure 27:
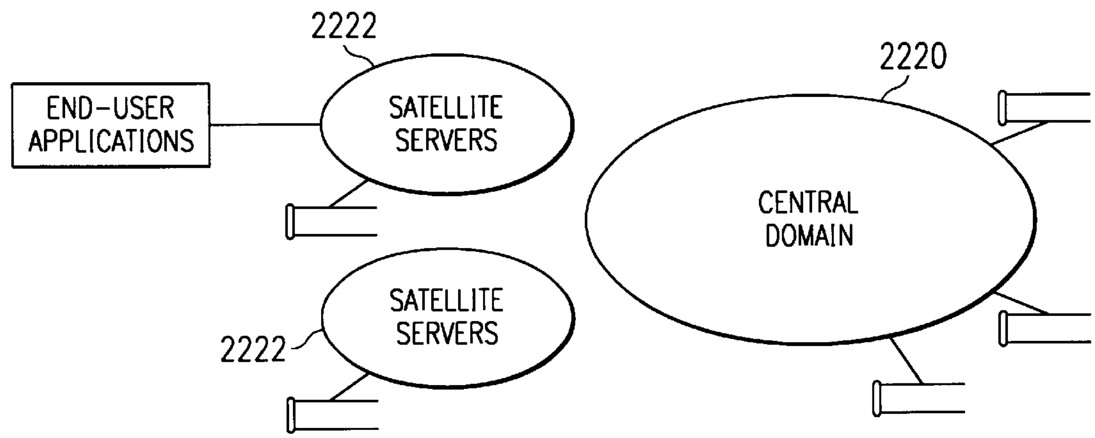
FIGS. 27–39 are block diagrams illustrating further aspects of the systems of FIGS. 20 and 23 in accordance with a preferred embodiment.

Data and data access are characterized by two domains 2220 and 2222, as shown in FIG. 27. Each domain can have multiples copies of data within it. Together, the domains create a single logical global database which can span international boundaries. The key aspect to the domain definitions below is that all data access is the same. There is no difference in an Order Entry feed from a Call Processing lookup or Network side data update.

Central domain 2220 controls and protects the integrity of the system. This is only a logical portrayal, not a physical entity. Satellite domain 2222 provides user access and update capabilities. This is only a logical portrayal, not a physical entity.

b) Partitions

In general, Data is stored at many locations simultaneously. A particular piece of data and all of its replicated copies are viewed logically as a single item. Any of these copies may be partitioned into physical subsets so that not all data items are necessarily at one site. However partitioning preserves the logical view of only one, single database.

c) Architecture

The architecture is that of distributed databases and distributed data access with the following functionality:

Replication and Synchronization;

Partitioning of Data Files;

Concurrency Controls;

Transactional Capability; and

Shared common Schemas.

Figure 28:
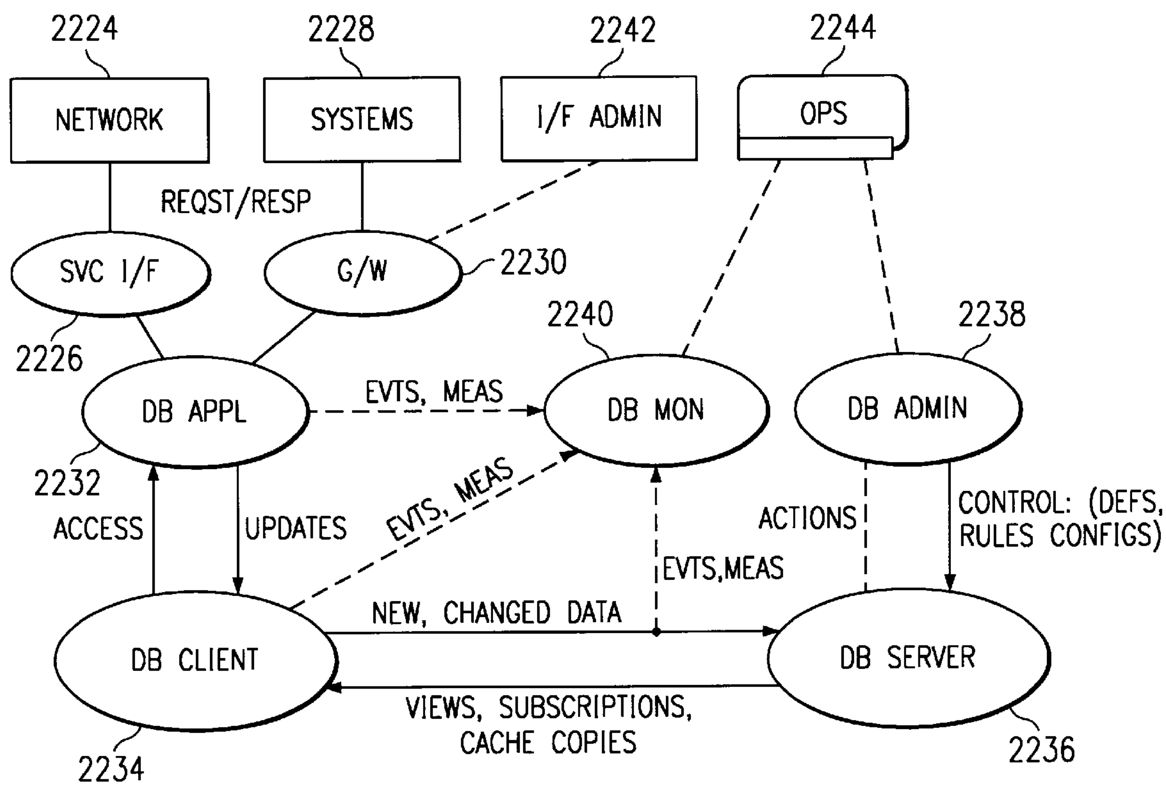

FIG. 28 shows logical system components and high-level information flows. None of the components depicted is physical. Multiple instances of each occur in the architecture.

The elements in FIG. 28 are:

NETWK 2224—external access to the ISP 2100 from the network side;

SVC I/F 2226—the network interface into ISP;

SYSTMS 2228—external application such as Order Entry;

G/W 2230—a gateway to the ISP 2100 for external applications;

dbAppl 2232—a role requiring data access or update capabilities;

dbClient 2234—the primary role of the satellite domain;

dbServer 2236—the primary role of the central domain;

dbAdmin 2238—an administrative role for Data;

dbMon 2240—a monitoring role;

I/F Admin 2242 administrative role for interfaces; and

Ops 2244—operations console.

d) Information Flow

The flows depicted in FIG. 28 are logical abstractions; they are intended to characterize the type of information passing between the logical components.

The flows shown above are:

Rest—data requests to the ISP from external systems;

Resp—responses from the ISP to external requests;

Access—data retrieval by applications within the ISP;

Updates—data updates from applications within ISP;

Evts, data related events sent to the monitor;

Meas—data related metrics sent to the monitor;

New Data—additions to ISP master data;

Changed Data changes to ISP master data;

Views—retrieving ISP master data;

Subscriptions—asynchronous stream of ISP master data;

Cache copies—a snapshot copy of ISP master data;

Actions—any control activity; and

Controls any control data.

e) Domain Associations

In general the Satellite domains 2222 of Data Management 2138 encompass:

ISP Applications;

External systems;

Network interfaces 2226 and system gateways 2230; and

Database client (dbClient) 2234.

The Central domain for Data Management 2138 encompasses:

Monitoring (dbMon) 2240;

Administration (dbAdmin) 2238; and

Database masters (dbServer) 2236

4. Logical Description

The behavior of each Architecture component is described separately below:

a) Data Applications (dbAppl) 2232

This includes any ISP applications which require database access. Examples are the ISN NIDS servers, and the DAP Transaction Servers, The applications obtain their required data from the dbClient 2234 by attaching to the desired databases, and providing any required policy instructions. These applications also provide the database access on behalf of the external systems or network element such as Order Entry or Switch requested translations. Data applications support the following functionality:

Updates: allow an application to insert, update, or delete data in an ISP database.

Access requests allow an application to search for data, list multiple items, select items from a list or set, or iterate through members of a set.

Events and Measurements are special forms of updates which are directed to the monitoring function (dbMon) 2240.

b) Data Management 2138

(1) Client Databases (dbClient) 2234

The dbClients represent satellite copies of data. This is the only way for an application to access ISP data. Satellite copies of data need not match the format of data as stored on the dbServer 2236.

The dbClients register with master databases (dbServer) 2236 for Subscriptions or Cache Copies of data. Subscriptions are automatically maintained by dbServer 2236, but Cache Copies must be refreshed when the version is out of date.

A critical aspect of dbClient 2234 is to ensure that data updates by applications are serialized and synchronized with the master copies held by dbServer 2236. However, it is just as reasonable for the dbClient to accept the update and only later synchronize the changes with the dbServer (at which time exception notifications could be conveyed back to the originating application). The choice to update in lock-step, or not, is a matter of application policy not Data Management 2138.

Only changes made to the dbServer master copies are forwarded to other dbClients.

If a dbClient 2234 becomes inactive or loses communications with the dbServer; it must resynchronize with the master. In severe cases, operator intervention may be required to reload an entire database or selected subsets.

The dbClient 2234 offers the following interface operations:

Attach by an authorized application to a specified set of data;

Policy preferences to be set by an authorized application;

Select a specified view of the local copy of data;

Insert, Update, or Delete of the local copy of data;

Synchronize subscripted data with the dbServer; and

Expiration notifications from dbServer for cached data.

Additionally, the dbClients submit Logs or Reports and signal problems to the monitor (dbMon) 2240.

(2) Data Masters (dbServer) 2236

The dbServers 2236 play a central role in the protection of data. This is where data is 'owned' and master copies maintained. At least two copies of master data are maintained for reliability. Additional master copies may be deployed to improve data performance.

These copies are synchronized in lock-step. That is each update is required to obtain a corresponding master-lock in order to prevent update conflicts. The strict implementation policies may vary, but in general, all master copies must preserve serial ordering of updates, and provide the same view of data and same integrity enforcement as any other master copy. The internal copies of data are transparent to the dbClients 2234.

The dbServer 2236 includes the layers of business rules which describe or enforce the relationships between data items and which constrain particular data values or formats. Every data update must pass these rules or is rejected. In this way dbServer ensures all data is managed as a single copy and all business rules are collected and applied uniformly.

The dbServer 2236 tracks when, and what kind of, data changes are made, and provides logs and summary statistics to the monitor (dbMon) 2240. Additionally these changes are forwarded to any active subscriptions and Cache-copies are marked out of date via expiration messages.

The dbServer also provides security checks and authorizations, and ensures that selected items are encrypted before storage.

The dbServer supports the following interface operations:

View selected data from dbServer;

Subscribe to selected data from dbServer;

Copy selected data into a cache-copy at a dbClient 2234;

Refresh a dbClient cache with the current copy on demand;

New data insertion across all dbServer copies of the master;

Change data attributes across all dbServer copies; and

Cancel previous subscriptions and drop cache-copies of data.

(3) Data Administration (dbAdmin) 2238

Data Administration (dbAdmin) 2238 involves setting data policy, managing the logical and physical aspect of the databases, and securing and configuring the functional components of the Data Management 2138 domain. Data Management policies include security, distribution, integrity rules, performance requirements, and control of replications and partitions. dbAdmin 2238 includes the physical control of data resources such as establishing data locations, allocating physical storage, allocating memory, loading data stores, optimizing access paths, and fixing database problems. dbAdmin 2238 also provides for logical control of data such as auditing, reconciling, migrating, cataloguing, and converting data.

The dbAdmin 2238 supports the following interface operations:

Define the characteristics of a data type;

Create logical containers of given dimensions;

Relate two or more containers through an association;

Constrain data values or relations through conditional triggers and actions;

Place physical container for data in a given location;

Move physical containers for data to new locations;

Remove physical containers and their data;

Load data from one container to another;

Clear the data contents of a container; and

Verify or reconcile the data contents of a container.

(4) Data Monitoring (dbMon) 2240

The dbMon 2240 represents a monitoring function which captures all data-related events and statistical measurements from the ISP boundary gateways, dbClients 2234 and dbServers 2236. The dbMon 2240 mechanisms are used to create audit trails and logs.

The dbMon typically presents a passive interface; data is fed to it. However monitoring is a hierarchical activity and further analysis and roll-up (compilation of data collected at intervals, such as every minute, into longer time segments, such as hours or days) occurs within dbMon. Additionally dbMon will send alerts when certain thresholds or conditions are met.

The rate and count of various metrics are used for evaluating quality of Service (QOS), data performance, and other service level agreements. All exceptions and date errors are logged and flow to the dbMon for inspection, storage, and roll-up.

dbMon 2240 supports the following interface operations:

Setting monitor controls, filters, and thresholds;

Logging of data related activity;

Reports of status, metrics, or audit results; and

Signaling alarms, or alerts.

(5) Data Management operations (Ops) 2244

The Operations consoles (Ops) 2244 provide the workstation-interface for the personnel monitoring, administering, and otherwise managing the system. The Ops consoles provide access to the operations interfaces for dbMon 2240, dbAdmin 2238, and dbServer 2236 described above. The Ops consoles 2244 also support the display of dynamic status through icon based maps of the various systems, interfaces, and applications within the Data management domain 2138.

5. Physical Description

Figure 29:
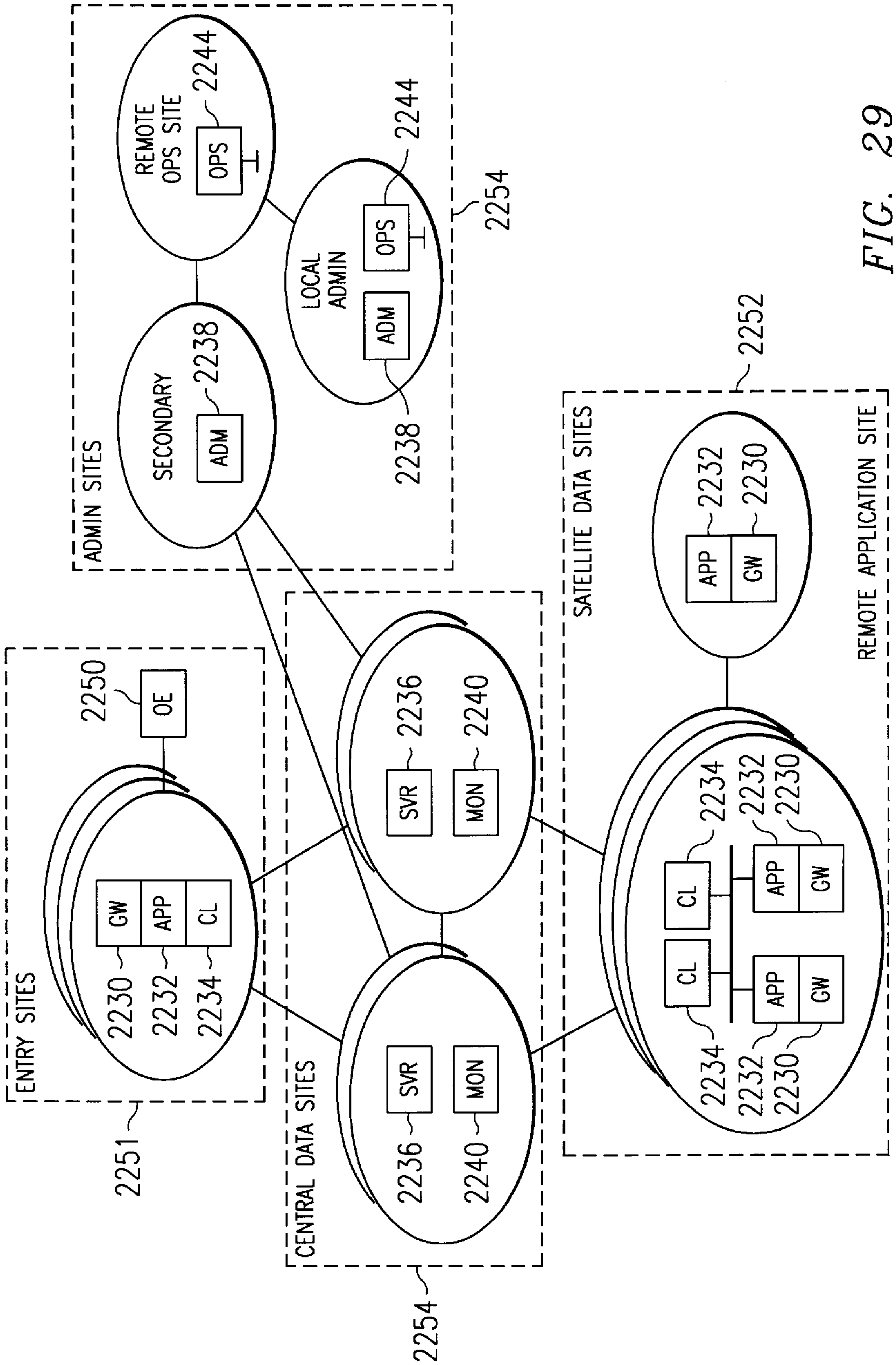

This section describes the Data Management 2138 physical architecture. It describes how a set of components could be deployed. A generalized deployment view is shown in FIG. 29. In FIG. 29:

circles are used to represent physical sites, boxes or combined boxes are computer nodes, and functional roles are indicated by abbreviations.

The abbreviations used in FIG. 29 are:

OE—order entry systems 2250;

GW—ISP gateway 2230;

APP—application (dbAppl) 2232;

CL—a dbClient 2234;

SVR—a dbServer 2236;

ADM—a dbAdmin component 2238;

MON—a dbMon component 2240; and

Ops—operations console.

The functional roles of these elements were described above (see Logical Description of the Target Architecture) in connection with FIG. 28.

Each of the sites shown in FIG. 29 is typically linked with one or more of the other sites by wide area network (WAN) links. The exact network configuration and sizing is left to a detailed engineering design task. It is not common for a database copy to be distributed to the Order Entry (OE) sites 2251, however in this architecture, entry sites are considered equivalent to satellite sites and will contain the dbClient functionality.

On the network-side of the ISP 2100, Satellite sites 2252 each contain the dbClient 2234 too. These sites typically operate local area networks (LANs). The dbClients act as local repositories for network or system applications such as the ISN operator consoles, ARUs, or NCS switch requested translations.

The Central sites 2254 provide redundant data storage and data access paths to the dbClients 2234. Central sites 2254 also provide roll-up monitoring (dbMon) functions although dbMon components 2240 could be deployed at satellite sites 2252 for increased performance.

The administrative functions are located at any desired operations or administration site 2254 but not necessarily in the same location as the dbMon. Administrative functions require the dbAdmin 2238, plus an operations console 2244 for command and control. Remote operations sites are able to access the dbAdmin nodes 2238 from wide-area or local-area connections. Each of the sites is backed-up by duplicate functional components at other sites and are connected by diverse, redundant links.

6. Technology Selection

The following section describes the various technology options which should be considered. The Data Management 2138 architecture does not require any particular technology to operate; however different technology choices will impact the resulting performance of the system.

Figure 30:
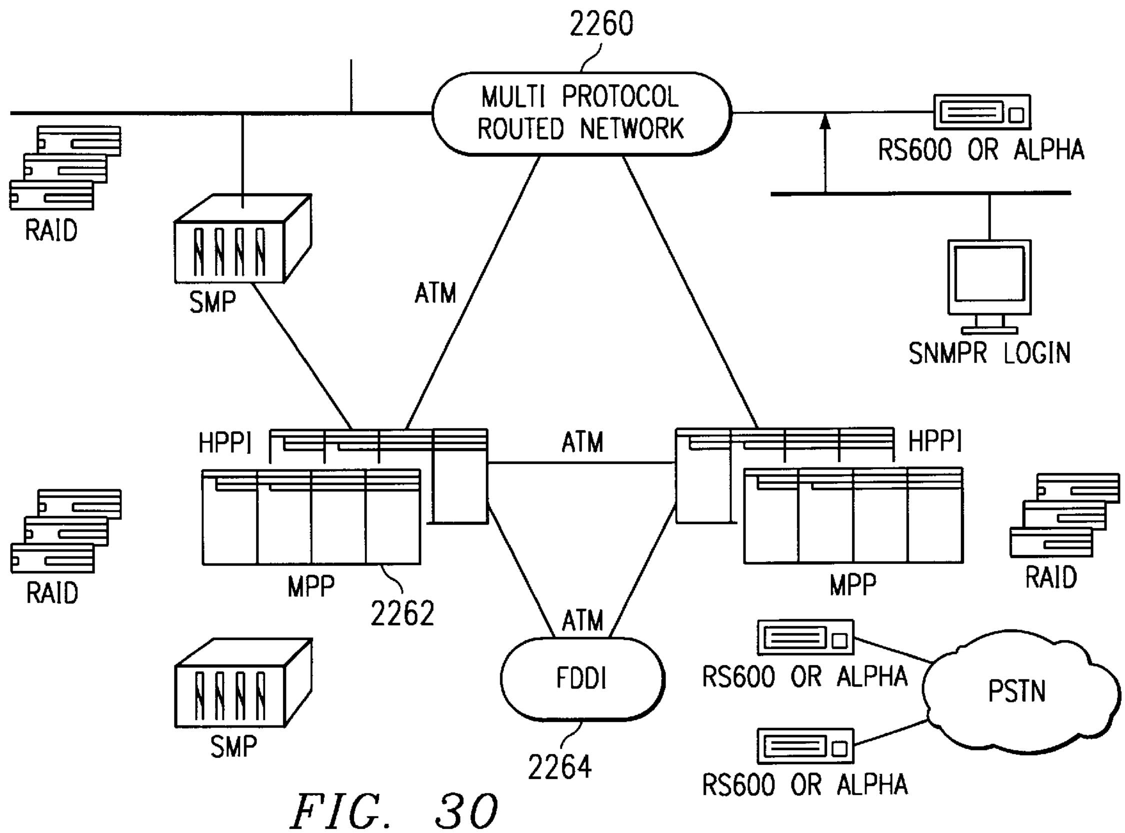

FIG. 30 depicts a set of technologies which are able to provide a very-high performance environment. Specific application requirements will determine the minimum level of acceptable performance. Three general environments are shown.

In the upper part, a multi-protocol routed network 2260 connects external and remote elements with the central data sites. Administrative terminals, and smaller mid-range computers are shown, plus a high-availability application platform such as Order Entry.

In the center are large-scale high-performance machines 2262 with large data-storage devices; these would be typical of master databases and data processing, and data capture/tracking functions such as dbServer 2236 and dbMon 2240.

In the lower part of the diagram are local area processing and network interfaces 2264, such as the ISN operator centers or DAP sites.

7. Implementations

While much is known of the current ISP data systems, additional detailed requirements are necessary before any final implementations are decided. These requirements must encompass existing ISN, NCS, EVS, NIA, and TMN system needs, plus all of the new products envisioned for Broadband, Internet, and Switchless applications.

8. Security

ISP data is a protected corporate resource. Data access is restricted and authenticated. Data related activity is tracked and audited. Data encryption is required for all stored passwords, PINS (personal identification numbers), private personnel records, and selected financial, business, and customer information. Secured data must not be transmitted in clear-text forms.

9. Meta-Data

Meta-data is a form of data which comprises the rules for data driven logic. Meta-data is used to describe and manage (i.e. manipulate) operational forms of data. Under this architecture, as much control as possible is intended to be driven by meta-data. Meta-data (or data-driven logic) generally provides the most flexible run-time options. Meta-data is typically under the control of the system administrators.

10. Standard Database Technologies

Implementation of the proposed Data Management Architecture should take advantage of commercially available products whenever possible. Vendors offer database technology, replication services, Rules systems, Monitoring facilities, Console environments, and many other attractive offerings.

J. ISP Resource Management Model

This section describes the Resource Management 2150 Model as it relates to the ISP 2100 Architecture.

a) Scope

The Resource Management Model covers the cycle of resource allocation and de-allocation in terms of the relationships between a process that needs a resource, and the resource itself. This cycle starts with Resource Registration and De-registration and continues to Resource Requisition, Resource Acquisition, Resource Interaction and Resource Release.

b) Purpose

The Resource Management 2150 Model is meant to define common architectural guidelines for the ISP development community in general, and for the ISP Architecture in particular.

c) Objectives

In the existing traditional ISP architecture, services control and manage their own physical and logical resources. Migration to an architecture that abstracts resources from services requires defining a management functionality that governs the relationships and interactions between resources and services. This functionality is represented by the Resource Management 2150 Model. The objectives of the Resource Management Model are designed to allow for network-wide resource management and to optimize resource utilization, to enable resource sharing across the network:

Abstract resources from services;

Provide real-time access to resource status;

Simplify the process of adding and removing resources;

Provide secure and simple resource access; and

Provide fair resource acquisition, so that no one user of resources may monopolize the use of resources.

d) Background Concepts

Generally, the Resource Management 2150 Model governs the relationships and interactions between the resources and the processes that utilize them. Before the model is presented, a solid understanding of the basic terminology and concepts used to explain the model should be established. The following list presents these terms and concepts:

(1) Definitions

Resource: A basic unit of work that provides a specific and well-defined capability when invoked by an external process. Resources can be classified as logical, like a service engine and a speech recognition algorithm, or physical, like CPU, Memory and Switch ports. A resource may be Shared like an ATM link bandwidth or Disk space, or Dedicated like a VRU or a Switch port.

Resource Pool: A set of registered resource members that share common capabilities.

Service: A logical description of all activities and the interaction flow between the user of the network resources and the resources themselves.

Policy: A set of rules that governs the actions taken on resource allocation and de-allocation, resource pool size thresholds and resource utilization thresholds.

(2) Concepts

The Resource Management Model is a mechanism which governs and allows a set of functions to request, acquire and release resources to/from a resource pool through well-defined procedures and policies. The resource allocation and de-allocation process involves three phases:

Resource Requisition is the phase in which a process requests a resource from the Resource Manager 2150.

Resource Acquisition: If the requested resource is available and the requesting process has the privilege to request it, the Resource Manager 2150 will grant the resource and the process can utilize it. Otherwise, the process has the choice to either abandon the resource allocation process and may try again later, or it may request that the Resource Manager 2150 grant it the resource whenever it becomes available or within a specified period.

Resource Release: The allocated resource should be put back into the resource pool once the process no longer needs it. Based on the resource type, the process either releases the resource and the resource informs the Resource Manager of its new status, or the process itself informs the Resource Manager that the resource is available. In either case, the Resource Manager will restore the resource to the resource pool.

The Resource Management Model allows for the creation of resource pools and the specification of the policies governing them. The Resource Management Model allows resources to register and de-register as legitimate members of resource pools.

Resource Management Model policies enforce load balancing, failover and least cost algorithms and prevent services from monopolizing resources. The Resource Management Model tracks resource utilization and automatically takes corrective action when resource pools are not sufficient to meet demand. Any service should be able to access and utilize any available resource across the network as long as it has the privilege to do so.

The Resource Management Model adopted the OSI Object Oriented approach for modeling resources. Under this model, each resource is represented by a Managed Object (MO). Each MO is defined in terms of the following aspects:

Attributes: The attributes of a MO represent its properties and are used to describe its characteristics and current states. Each attribute is a associated with a value, for example the value CURRENT_STATE attribute of a MO could be IDLE.

Operations: Each MO has a set of operations that are allowed to be performed on it. These operations are:

Create: to create a new MO

Delete: to delete an existing MO

Action: to perform a specific operation such as SHUTDOWN.

Get Value: to obtain a specific MO attribute value

Add Value: to add specific MO attribute value

Remove Value: to delete a specific MO attribute value from a set of values.

Replace Value: to replace an existing MO attribute value (s) with a new one.

Set Value: to set a specific MO attribute to its default value.

Notification: Each MO can report or notify its status to the management entity. This could be viewed as triggers or traps.

Behavior: The behavior of an MO is represented by how it reacts to a specific operation and the constraints imposed on this reaction. The MO may react to either external stimuli or internal stimuli. An external stimuli is represented by a message that carries an operation. The internal stimuli, however, is an internal event that occurred to the MO like the expiration of a timer. A constraint on how the MO should react to the expired timer may be imposed by specifying how many times the timers has to expire before the MO can report it.

All elements that need to utilize, manipulate or monitor a resource need to treat it as a MO and need to access it through the operations defined above. Concerned elements that need to know the status of a resource need to know how to receive and react to events generated by that resource.

Global and Local Resource Management

The Resource Management Model is hierarchical with at least two levels of management: Local Resource Manager (LRM) 2190 and Global Resource Manager (GRM) 2188. Each RM, Local and Global, has its own domain and functionality.

2. The Local Resource Manager (LRM):

Domain: The domain of the LRM is restricted to a specific resource pool (RP) that belongs to a specific locale of the network. Multiple LRMs could exist in a single locale, each LRM may be responsible for managing a specific resource pool.

Function: The main functionality of the LRM is to facilitate the resource allocation and de-allocation process between a process and a resource according the Resource Management Model guidelines.

3. The Global Resource Manager (GRM) 2188:

Domain: The domain of the GRM 2188 covers all registered resources in all resource pools across the network.

Function: The main function of the GRM is to help the LRM 2190 locate a resource that is not available in the LRM domain.

Figure 31:
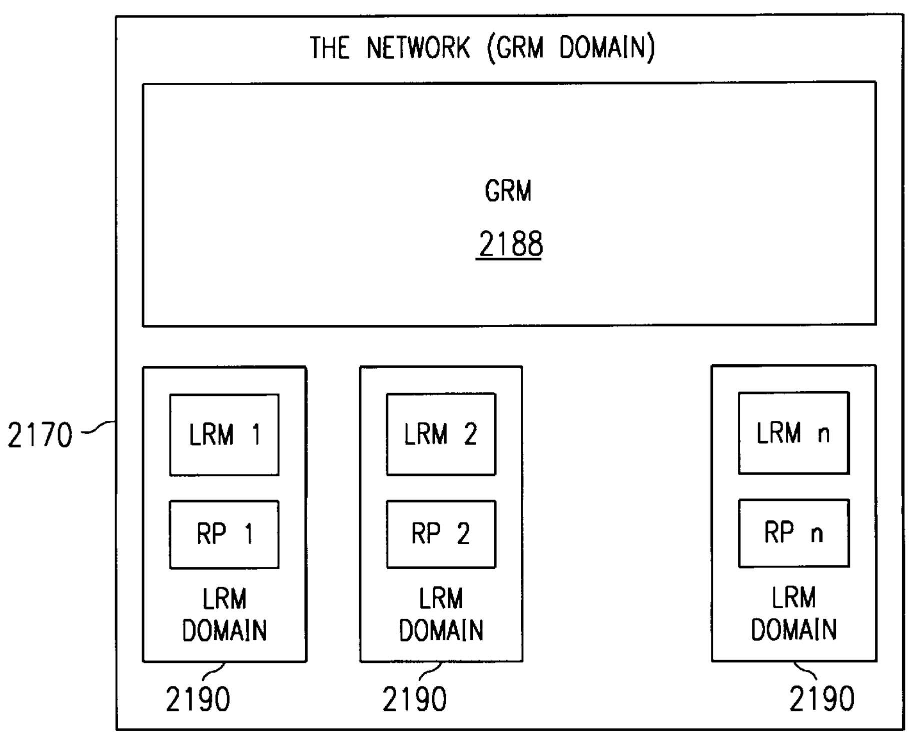

FIG. 31 illustrates the domains of the GRM 2188 and LRM 2190 within network 2270.

4. The Resource Management Model (RMM)

The Resource Management Model is based on the concept of Dynamic Resource Allocation as opposed to Static Configuration. The Dynamic Resource Allocation concept implies that there is no pre-defined static relationship between resources and the processes utilizing them. The allocation and de-allocation process is based on supply and demand. The Resource Managers 2150 will be aware of the existence of the resources and the processes needing resources can acquire them through the Resource Managers 2150. On the other hand, Static Configuration implies a pre-defined relationship between each resource and the process that needs it. In such a case, there is no need for a management entity to manage these resources. The process dealing with the resources can achieve that directly. Dynamic Resource Allocation and Static Configuration represent the two extremes of the resource management paradigms. Paradigms that fall between these extremes may exist.

The Resource Management Model describes the behavior of the LRM 2190 and GRM 2188 and the logical relationships and interactions between them. It also describes the rules and policies that govern the resource allocation and de-allocation process between the LRM/GRM and the processes needing the resources.

a) Simple Resource Management Model

Figure 32:
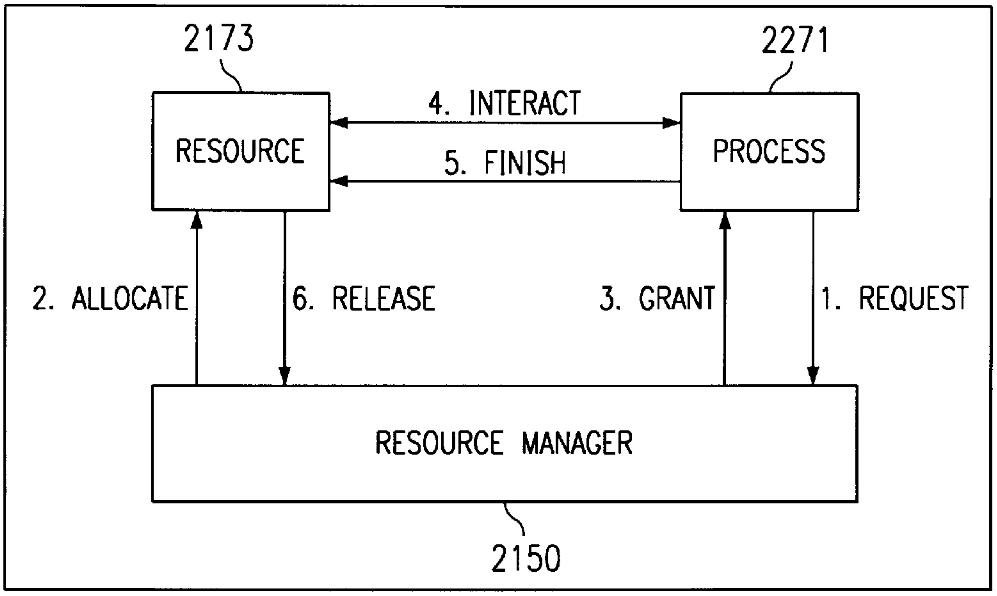

Realizing that resource allocation and de-allocation could involve a complex process, a simple form of this process is presented here as an introduction to the actual model. Simple resource allocation and de-allocation is achieved through six steps. FIG. 32 depicts these steps.

Figure 33:
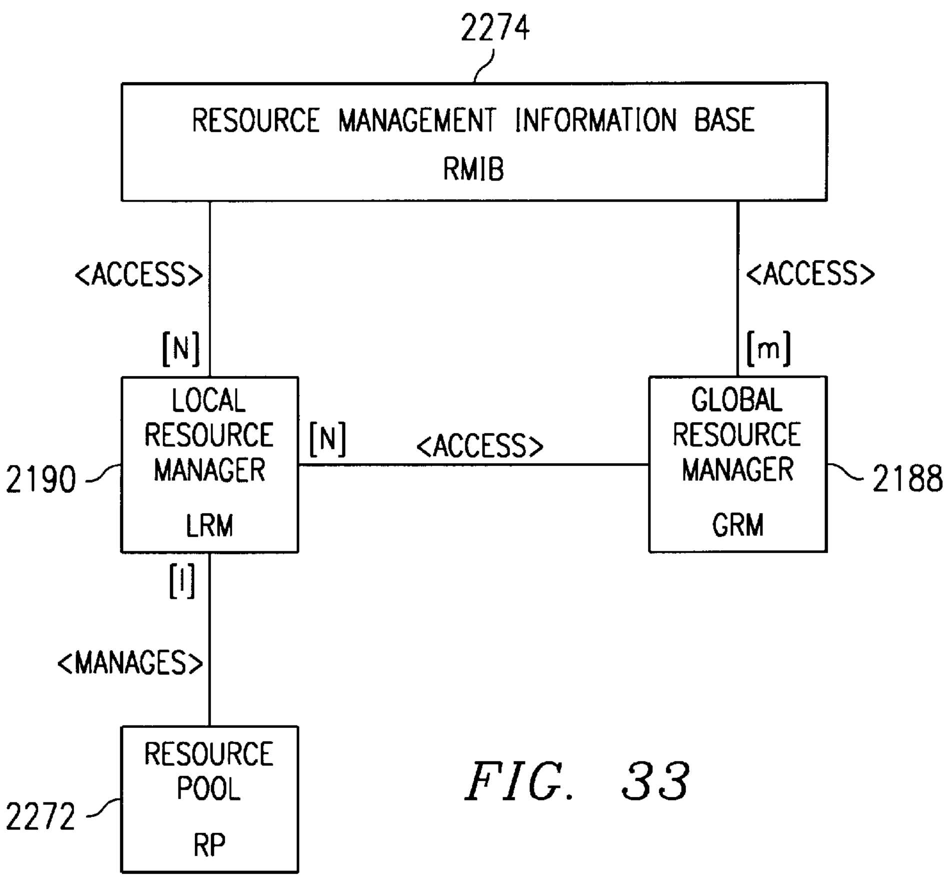

1. A process 2271 requests the resource 2173 from the resource manager 2150.
2. The resource manager 2150 allocates the resource 2173.
3. The resource manager 2150 grants the allocated resource 2173 to the requesting process 2271.
4. The process 2271 interacts with the resource 2273.
5. When the process 2271 is finished with the resource 2273, it informs the resource.
6. The resource 2273 releases itself back to the resource manager 2150.

b) The Resource Management Model Logical Elements:

The Resource Management Model is represented by a set of logical elements that interact and co-operate with each other in order to achieve the objectives mentioned earlier. These elements are shown in FIG. 33 and include: Resource Pool (RP) 2272, LRM 2190, GRM 2188 and Resource Management Information Base (RMIB) 2274.

(1) Resource Pool (RP) 2272

All resources that are of the same type, share common attributes or provide the same capabilities, and are located in the same network locale may be logically grouped together to form a Resource Pool (RP) 2272. Each RP will have its own LRM 2190.

(2) The Local Resource Manager (LRM) 2190

The LRM 2190 is the element that is responsible for the management of a specific RP 2272. All processes that need to utilize a resource from a RP that is managed by a LRM should gain access to the resource through that LRM and by using the simple Resource Management Model described above.

(3) The Global Resource Manager (GRM) 2188

The GRM 2188 is the entity that has a global view of the resource pools across the network. The GRM gains this global view through the LRMs 2190. All LRMs update the GRM with RP 2272 status and statistics. There are cases where a certain LRM can not allocate a resource because all local resources are busy or because the requested resource belongs to another locale. In such cases, the LRM can consult with the GRM to locate the requested resource across the network.

(4) The Resource Management Information Base (RMIB) 2274

As mentioned above, all resources will be treated as managed objects (MO). The RMIB 2274 is the database that contains all the information about all MOs across the network. MO information includes object definition, status, operation, etc. The RMIB is part of the ISP Data Management Model. All LRMs and the GRM can access the RMIB and can have their own view and access privileges of the MO's information through the ISP Data Management Model.

5. Component Interactions

To perform their tasks, the Resource Management Model elements must interact and co-operate within the rules, policies and guidelines of the Resource Management Model. The following sections explain how these entities interact with each other.

a) Entity Relationship (ER) Diagram (FIG. 33):

In FIG. 33, each rectangle represents one entity, the verb between the "< >" implies the relationship between two entities and the square brackets "[ ]" imply that the direction of the relationship goes from the bracketed number to the non bracketed one. The numbers imply is the relationship is 1-to-1, 1-to-many or many-to-many.

FIG. 33 can be read as follows:

1. One LRM 2190 manages one RP 2272.
2. Many LRMs 2190 access the RMIB 2274.
3. Many LRMs 2190 access the GRMs 2188.
4. Many GRMs 2188 access the RMIB 2274.

b) Registration and De-registration

Resource registration and de-registration applies only on the set of resources that have to be dynamically managed. There are some cases where resources are statically assigned.

LRMs 2190 operate on resource pools 2272 where each resource pool contains a set of resource members. In order for the LRM to manage a certain resource, the resource has to inform the LRM of its existence and status. Also, the GRM 2188 needs to be aware of the availability of the resources across the network in order to be able to locate a certain resource. The following registration and de-registration guidelines should be applied on all resources that are to be dynamically managed:

All resources must register to their LRM 2190 as members of a specific resource pool 2272.

All resources must de-register from their LRM 2190 if, for any reason, they need to shutdown or be taken out of service.

All resources must report their availability status to their LRM 2190.

All LRMs must update the GRM 2188 with the latest resource availability based on the registered and de-registered resources.

c) GRM, LRM and RP Interactions

Every RP 2272 will be managed by an LRM 2190. Each process that needs a specific resource type will be assigned an LRM that will facilitate the resource access. When the process needs a resource it must request it through its assigned LRM. When the LRM receives a request for a resource, two cases may occur:

1. Resource is available: In this case, the LRM allocates a resource member of the pool and passes a resource handle to the process. The process interacts with the resource until it is done with it. Based on the resource type, once the process is done with the resource, it either informs the resource that it is done with it, and the resource itself informs its LRM that it is available, or it releases the resource and informs the LRM that it is no longer using the resource.
2. Resource is not available: In this case, the LRM 2190 consults with the GRM 2188 for an external resource pool that contains the requested resource. If no external resource is available, the LRM informs the requesting process that no resources are available. In this case, the requesting process may:

give up and try again, request that the LRM allocate the resource whenever it becomes available, or request that the LRM allocates the resource if it becomes available within a specified period of time.

If an external resource is available, the GRM 2188 passes location and access information to the LRM 2190. Then the LRM either:

allocates the resource on the behalf of the requesting process and passes a resource handle to it (In this case the resource allocation through the GRM is transparent to the process), or advises the requesting process to contact the LRM that manages the located resource.

d) GRM, LRM and RMIB Interactions

The RMIB 2274 contains all information and status of all managed resources across the network. Each LRM 2190 will have a view of the RMIB 274 that maps to the RP 2272 it manages. The GRM 2188, on the other hand, has a total view of all resources across the network. This view consists of all LRMs views. The GRM's total view enables it to locate resources across the network.

In order for the RMIB 2274 to keep accurate resource information, each LRM 2190 must update the RMIB with the latest resource status. This includes adding resources, removing resources and updating resource states.

Both the LRM 2190 and GRM 2188 can gain their access and view of the RMIB 2274 through the ISP Data Management entity. The actual management of the RMIB data belongs to the ISP Data Management entity. The LRM and GRM are only responsible for updating the RMIB.

K. Operational Support Model

1. Introduction

Most of the existing ISP service platforms were developed independently, each with it's own set of Operational Support features. The amount of time required to learn how to operate a given set of platforms increases with the number of platforms. The ISP service platforms need to migrate to an architecture with a common model for all of its Operational Support features across all of its products. This requires defining a model that will support current needs and will withstand or bend to the changes that will occur in the future. The Operational Support Model (OSM) defines a framework for implementation of management support for the ISP 2100.

a) Purpose

The purpose of the Operational Support Model is to:

achieve operational simplicity by integrating the management platform for ISP resources;

reduce the learning curve for operational personnel by providing a common management infrastructure;

reduce the cost of management systems by reducing overlapping management system development;

improve time to market for ISP services by providing a common management infrastructure for all of the ISP services and network elements; and provide a framework for managing ISP physical resources (hardware) and logical resources (software).

b) Scope

The OSM described here provides for the distributed management of ISP physical network elements and the services that run on them. The management framework described herein could also be extended to the management of logical (software) resources. However, the architecture presented here will help map utilization and faults on physical resources to their resulting impact on services.

The management services occur within four layers

Planning,

Service Management,

Network Layers, and

Network Elements.

Information within the layers falls into four functional areas:

Configuration Management,

Fault Management,

Resource Measurement, and

Accounting.

The use of a common Operational Support Model for all of the ISP will enhance the operation of the ISP, and simplify the designs of future products and services within the ISP. This operational support architecture is consistent with the ITU Telecommunications Management Network (TMN) standards.

c) Definitions

Managed Object: A resource that is monitored, and controlled by one or more management systems Managed objects are located within managed systems and may be embedded in other managed objects. A managed object may be a logical or physical resource, and a resource may be represented by more than one managed object (more than one view of the object).

Managed System: One or more managed objects.

Management Sub-Domain: A Management domain that is wholly located within a parent management domain.

Management System: An application process within a managed domain which effects monitoring and control functions on managed objects and/or management sub-domains.

Management Information Base: A MIB contains information about managed objects.

Management Domain: A collection of one or more management systems, and zero or more managed systems and management sub-domains.

Network Element: The Telecommunications network consist of many types of analog and digital telecommunications equipment and associated support equipment, such as transmission systems, switching systems, multiplexes, signaling terminals, front-end processors, mainframes, cluster controllers, file servers, LANs, WANs, Routers, Bridges, Gateways, Ethernet Switches, Hubs, X.25 links, SS7 links, etc. When managed, such equipment is generally referred to as a network element (NE).

Domain: The management environment may be partition in a number a ways such as functionally (fault, service . . . ), geographical, organizational structure, etc.

Operations Systems: The management functions are resident in the Operations System.

2. The Operational Support Model

Figure 34:
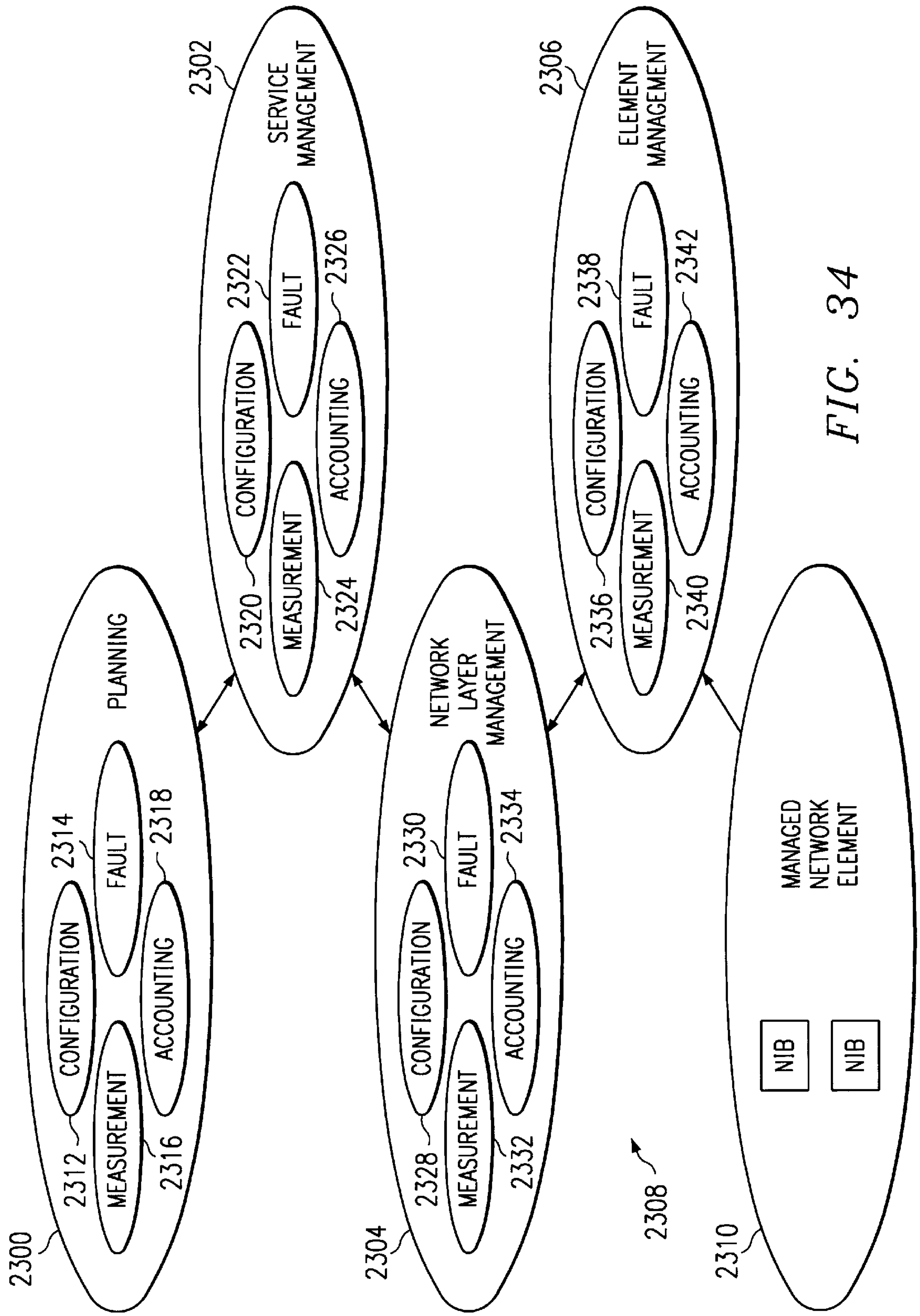

FIG. 34 shows the four management layers 2300, 2302, 2304 and 2306 of the Operational Support Model 2308 over the network elements 2310. The Operational Support Model 2308 supports the day to day management of the ISP 2100. The model is organized along three dimensions. Those dimensions are the layers 2300–2306, the functional area within those layers, and the activities that provide the management services. Managed objects (a resource) are monitored, controlled, and altered by the management system.

a) The Functional Model

The following sections describe the functional areas as they occur within the management layers 2300–2306.

(1) Planning

The ISP Planning Layer 2300 is the repository for data collected about the ISP 2100, and the place where that data is to provide additional value.

Configuration Management 2312: Setting of policy, and goals.

Fault Management 2314: Predicting of mean time to failure.

Resource Measurement 2316: Predicting future resource needs (trending, capacity, service agreement compliance, maintenance agreement, work force).

Accounting: Determine cost of providing services in order to support service pricing decisions.

(2) Service Management

The Service Ordering, Deployment, Provisioning, Quality of Service agreements, and Quality of service monitoring are in the ISP Service Management layer 2302. Customers will have a restricted view of the SM layer 2302 to monitor and control their services. The SM layer provides a manager(s) that interacts with the agents in the NLMs. The SM layer also provides an agent(s) that interacts with the manager(s) in the Planning layer 2300. Managers within the SM layer may also interact with other managers in the SM layer. In that case there are manager-agent relationships at the peer level.

Configuration Management 2320: Service Definition, Service Activation, Customer Definition, Customer Activation, Service Characteristics, Customer Characteristics, hardware provisioning, software provisioning, provisioning of other data or other resources.

Fault Management 2322: Monitor and report violations of service agreement. Testing.

Resource Measurement 2324: Predict the violation of a service agreement and flag potential resource shortages. Predict the needs of current and future (trending) services.

Accounting 2326: Process and forward Accounting information.

Network Layer Management

The ISP Network Layer Management (NLM) Layer 2304 has the responsibility for the management of all the network elements, as presented by the Element Management, both individually and as a set. It is not concerned with how a particular element provides services internally. The NLM layer 2304 provides a manager(s) that interacts with the agents in the EMs 2306. The NLM layer also provides an agent(s) that interacts with the manager(s) in the SM layer 2302. Managers within the NLM layer 2304 may also interact other managers in the NLM layer. In that case there are manager agent relationships at the peer level.

Configuration Management 2328 provides functions to define the characteristics of the local and remote resources and services from a network wide perspective.

Fault Management 2330 provides functions to detect, report, isolate, and correct faults that occur across multiple NEs.

Resource Measurement 2332 provides for the network wide measurement, analysis, and reporting of resource utilization from a capacity perspective.

Accounting 2334 consolidates Accounting information from multiple sources.

(3) Element Management

The Element Management Layer 2306 is responsible for the NEs 2310 on an individual basis and supports an abstraction of the functions provided by the NEs The EM layer 2306 provides a manager(s) that interact with the agents in the NEs. The EM layer also provides an agent(s) that interact with the manager(s) in the NLM layer 2304. Managers within the EM layer 2306 may also interact other managers in the EM layer. In that case there are manager agent relationships at the peer level.

Configuration Management 2336 provides functions to define the characteristics of the local and remote resources and services.

Fault Management 2338 provides functions to detect, report, isolate, and correct faults.

Resource Measurement 2340 provides for the measurement, analysis, and reporting of resource utilization from a capacity perspective.

Accounting 2342 provides for the measurement and reporting of resource utilization from an accounting perspective.

b) Network Element

The computers, processes, switches, VRUs, internet gateways, and other equipment that provide the network capabilities are Network Elements 2310. NEs provide agents to perform operations on the behalf of the Element Management Layer 2306.

c) Information Model

Figure 35:
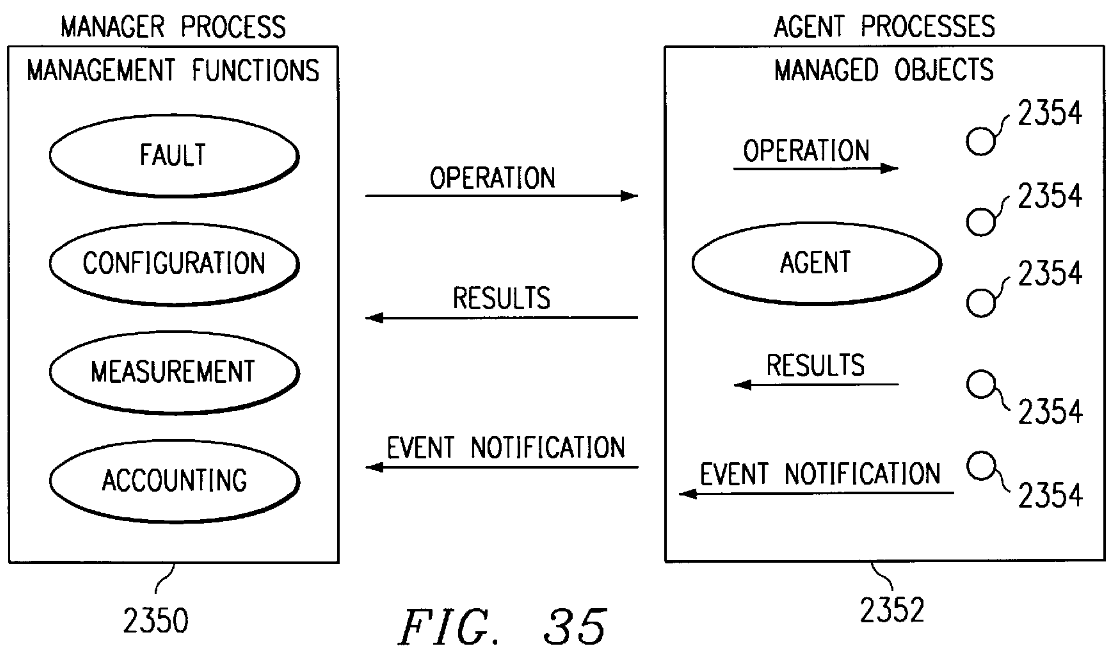

FIG. 35 shows manager agent interaction. Telecommunications network management is a distributed information application process. It involves the interchange of management information between a distributed set of management application processes for the purpose of monitoring and controlling the network resources (NE) 2310. For the purpose of this exchange of information the management processes take on the role of either manager 2350 or agent 2352. The manager 2350 role is to direct management operation requests to the agent 2352, receive the results of an operation, receive event notification, and process the received information. The role of the agent 2352 is to respond to the manager's request by performing the appropriate operation on the managed objects 2354, and directing any responses or notifications to the manager. One manager 2350 may interact with many agents 2352, and the agent may interact with more than one manager. Managers may be cascaded in that a higher level manager acts on managed objects through a lower level manager. In that case the lower level manager acts in both manager and agent roles.

3. The Protocol Model a) Protocols

The exchange of information between manager and agent relies on a set of communications protocols. TMN, which offers a good model, uses the Common Management Information Services (CMIS) and Common Management Information Protocol (CMIP) as defined in Recommendations X.710, and X.711. This provides a peer-to-peer communications protocol based on ITU's Application Common Service Element (X.217 service description & X.227 protocol description) and Remote Operation Service Element (X.219 service description & X.229 protocol description). FTAM is also supported as an upper layer protocol for file transfers. The use of these upper layer protocols is described in Recommendation X.812. The transport protocols are described in Recommendation X.811. Recommendation X.811 also describes the interworking between different lower layer protocols. This set of protocols is referred to as Q3.

b) Common context

In order to share information between processes there needs to be a common understanding of the interpretation of the information exchanged. ASN.1 (X.209) with BER could be used to develop this common understanding for all PDU exchanged between the management processes (manager/agent).

c) Services of the upper layer

The following identifies the minimum services required of the service layer and is modeled after the TMN CMIS services.

SET: To add, remove, or replace the value of an attribute.

GET: To read the value of an attribute.

CANCEL-GET: To cancel a previously issued GET.

ACTION: To request an object to perform a certain action.

CREATE: To create an object.

DELETE: To remove an object.

EVENT-REPORT: Allows the network resource to announce an event.

4. The Physical Model

Figure 36:
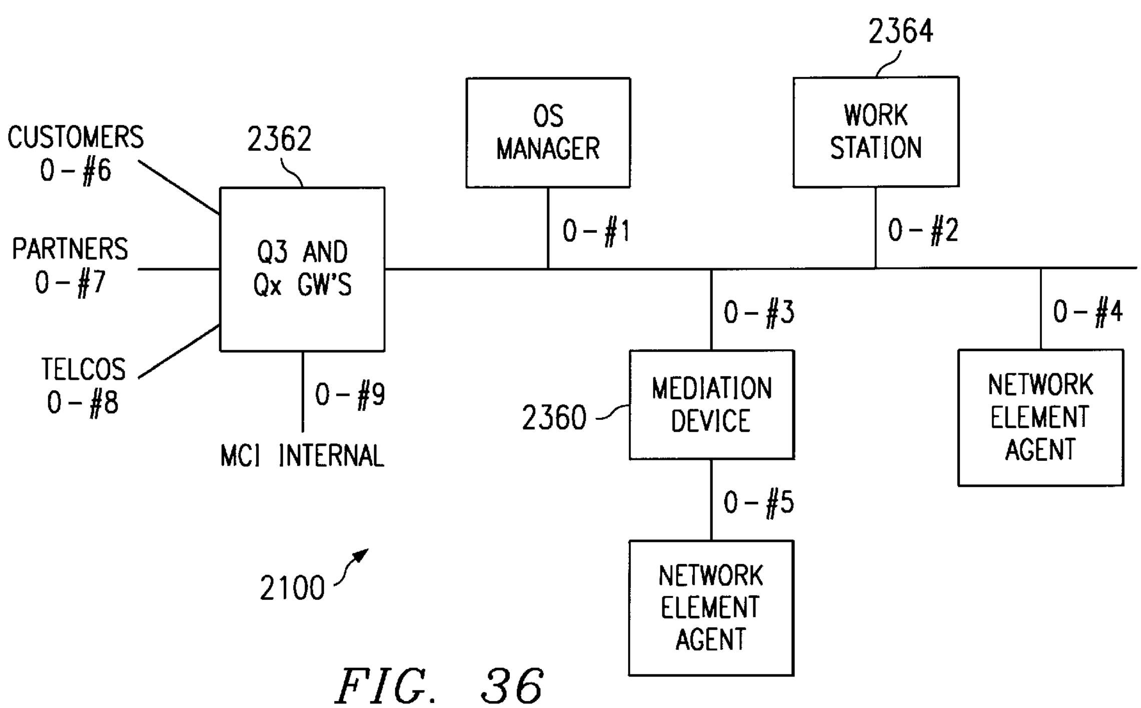

FIG. 36 shows the ISP 2100 physical model.

5. Interface Points

Mediation Device 2360 provides conversion from one information model to the ISP information model. Gateways 2362 are used to connect to management systems outside of the ISP. These gateways will provide the necessary functions for operation with both ISP compliant systems, and non-compliant systems. The gateways may contain mediation devices 2360. FIG. 36 identifies nine interface points. The protocols associated with those interface points are:

1. There are two upper layer protocols. The protocol for communications with the workstation and the ISP upper layer for all other operational support communications. The lower layer is TCP/IP over Ethernet.
2. The upper layer is the protocol for communications with workstation 2364, and the lower layer is TCP/IP over Ethernet.

3,4. The upper layer is the ISP upper layer, and the lower layer is TCP/IP over Ethernet.

5. The proprietary protocols are the of legacy systems that are not compatible with the supported interfaces. Equipment that provides a Simple Network Management Protocol (SNMP) interface will be supported with Mediation Devices.

6,7,8,9. Gateways by their nature will support ISP compliant and non-compliant interfaces. Gateways to enterprise internal systems could include such as the Order Entry system, or an enterprise wide TMN system.

The ISP Realization of the Operational Support Model

Figure 37:
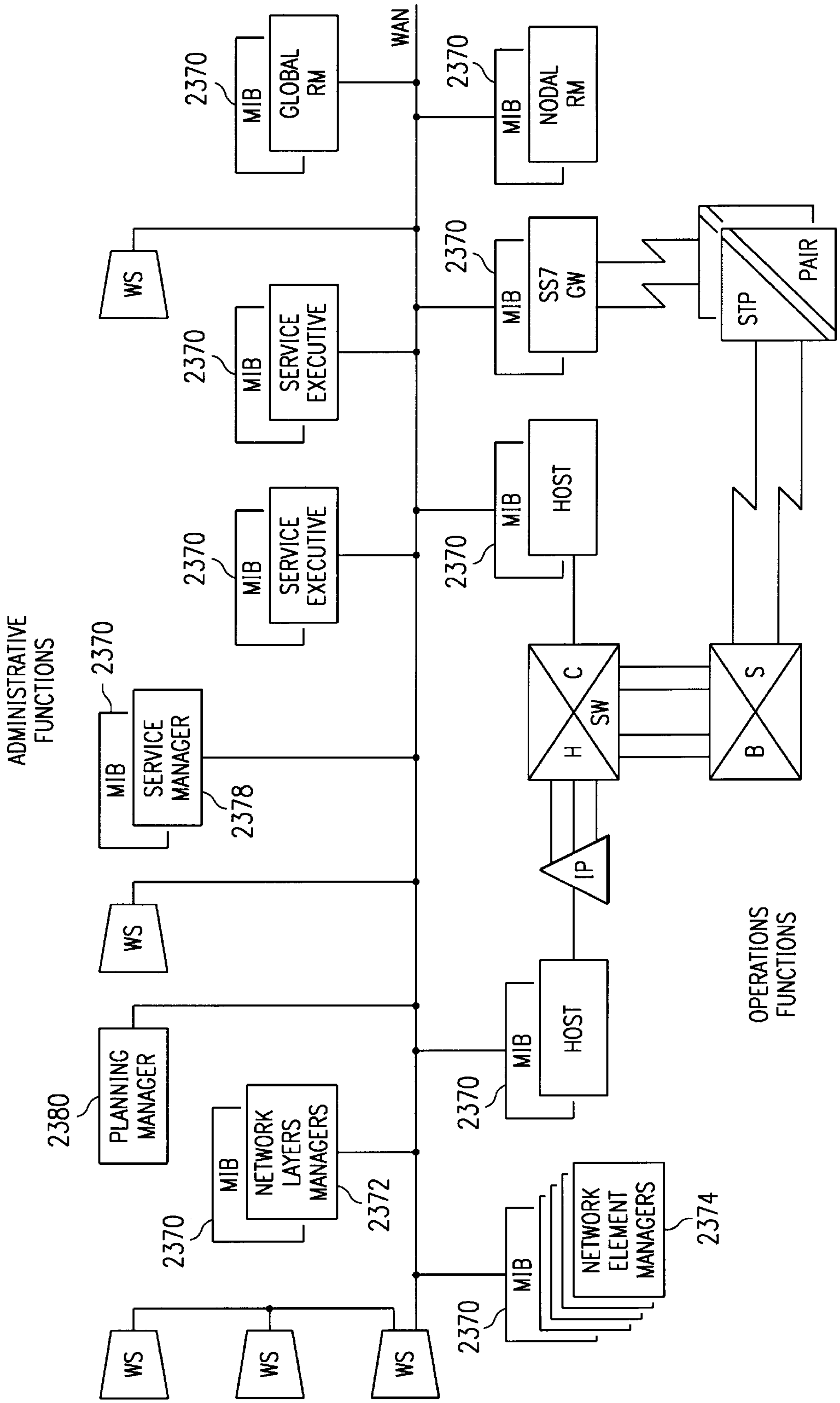

FIG. 37 shows operational support realization.

6. General

The Operational Support Model provides a conceptual framework for building the Operational Support System. FIG. 37 represents an ISP realization of this conceptual model. In this implementation of that model all the ISP Network Elements would be represented to the Operational Support System by a Management Information Base (MIB) 2370 and the agent process that acts upon the objects in the MIB.

Field support personnel have two levels from which the ISP 2100 will be managed.

1. For trouble-shooting, the Network Layers Manager 2372 gives field support a picture of the ISP as a whole. The process of detecting, isolating, and correcting problems begins from there. From that layer, problems could be isolated to a single Network Element. Individual Network Elements are accessible from the Network Element Managers 2374 and would allow a more detailed level of monitoring, control, configuration, and testing. The centralized view of the ISP is missing from today's ISP, but many recognize its importance.

For configuration the Network Layers Manager 2370 provides an ISP-wide view, and interacts with the Network Element Managers 2374 to configure Network Elements in a consistent manner. This will help insure that the ISP configuration is consistent across all platforms. The ability to change a piece of information in one place and have it automatically distributed ISP—wide is a powerful tool that has not been possible with the current ISP management framework.

Once a service definition has been created from the Service Creation Environment 2376, the Service Manager 2378 is used to place it in the ISP network, and provision the network for the new service. Customers for a service are provisioned through the Service Manager 2378. As a part of provisioning customers the Service Manager predicts resource utilization, and determines if new resources need to be added to handle the customer's use of a service. It uses the current utilization statistics as a basis for that determination. Once a customer is activated, the Service Manager monitors the customer's usage of the service to determine if the quality of service agreement is being met. As customer utilization of the services increases the Service Manager 2378 predicts the need to add resources to the ISP network.

This Service Management, with appropriate restrictions, can be extended to customers as another service. While Service Creation is the talk of the IN world, it needs a Service Manager that is integrated with the rest of the system, and that is one of the purposes of this model.

Finally, for planning personnel (non-field support), the Planning Manager 2380 analyzes the ISP-wide resource utilization to determine future needs, and to allocate cost to different services to determine the cost of a service as the basis for future service pricing.

L. Physical Network Model

1. Introduction

This section describes the Physical Network aspects of the Intelligent Services Platform (ISP) 2100 Architecture.

a) Purpose

The Physical Network Model covers the:

Logical Architecture Mapping;

Information Flows; and

Platform Deployment in the production environment of the architecture.

b) Scope

This model defines the terminology associated with the physical network, describes the interactions between various domains and provides examples of realizations of the architecture.

c) Objectives

The objectives of this model are to:

Create a model for identifying various network platforms;

Classify Information Flow;

Provide standard nomenclature;

Provide rules for systems deployment; and

Guide future technology selections.

2. Information Flow

One of the key aspects of the intelligent network (IN) is the Information Flow across various platforms installed in the network. By identifying types of information and classifying them, the network serves the needs of IN.

Customers interact with IN in a series of call flows. Calls may be audio-centric (as in the conventional ISP products), multimedia-based (as in internetMCI user using the web browser), video-based (as in video-on-demand) or a combination of contents.

Information can be classified as follows:

Content;

Signaling; or

Data.

Normally, a customer interacting with the intelligent network will require all three types of information flows.

a) Content

Content flows contain the primary information being transported. Examples of this are analog voice, packet switched data, streamed video and leased line traffic. This is customer's property that IN must deliver with minimum loss, minimum latency and optimal cost. The IN elements are standardized such that the transport fabric supports more connectivity suites, in order to allow content to flow in the same channels with flow of other information.

b) Signaling

Signaling flows contain control information used by network elements. ISUP RLT/IMT, TCP/IP domain name lookups and ISDN Q.931 are all instances of this. The IN requires, uses and generates this information. Signaling information coordinates the various network platforms and allows intelligent call flow across the network. In fact, in a SCE-based IN, service deployment will also require signaling information flowing across the fabric.

c) Data

Data flows contain information produced by a call flow, including crucial billing data records often produced by the fabric and certain network platforms.

3. Terminology

Network: A set of interconnected network elements capable of transporting content, signaling and/or data. MCI's IXC switch fabric, the ISP extended WAN, and the Internet backbone are classic examples of networks. Current installations tend to carry different contents on different networks, each of which is specialized for specific content transmission. Both technology and customer requirements (for on-demand high bandwidth) will require carriers to use more unified networks for the majority of the traffic. This will require the fabric to allow for different content characteristics and protocols along the same channels. Another aspect of this will be more uniform content-independent signaling.

Site: A set of physical entities collocated in a geographically local area. In the current ISP architecture, instances of sites are Operator Center, ISNAP Site (which also has ARU's) and an EVS site. By the very definition, the NT and DSC switches are NOT part of the site. They are instead part of the Transport Network (see below). In the architecture, a group of (geographically collocated) Service Engines (SE), Special Resources (SR), Data Servers (DS) along with Network Interfaces and Links form a site.

Network Element: A physical entity connecting to the Transport Networks through Network Interfaces. Examples of this are ACP, EVS SIP, MTOC, Video-conference Reservation Server, DAP Transaction Server, and NAS. In the next few years, elements such as web servers, voice authentication servers, video streamers and network call record stores will join the present family of network elements.

Network Interface: Equipment enabling connectivity of Network Elements to the Transport Networks. DS1 CSU/DSU, 10BaseT Ethernet interface card and ACD ports are network interfaces. With the architecture of the preferred embodiment, network interfaces will provide a well-understood uniform set of API's for communication.

Link: Connection between 2 or more Network Interfaces which are at different sites. A link may be a segment of OC-12 SONET Fiber or 100 mbps dual ring FDDI section. In the coming years, IN must handle network links such as ISO Ethernet WAN hub links and gigabit rate OC-48's.

Connection: an attachment of two or more Network Interfaces which are at the same site.

Figure 38:
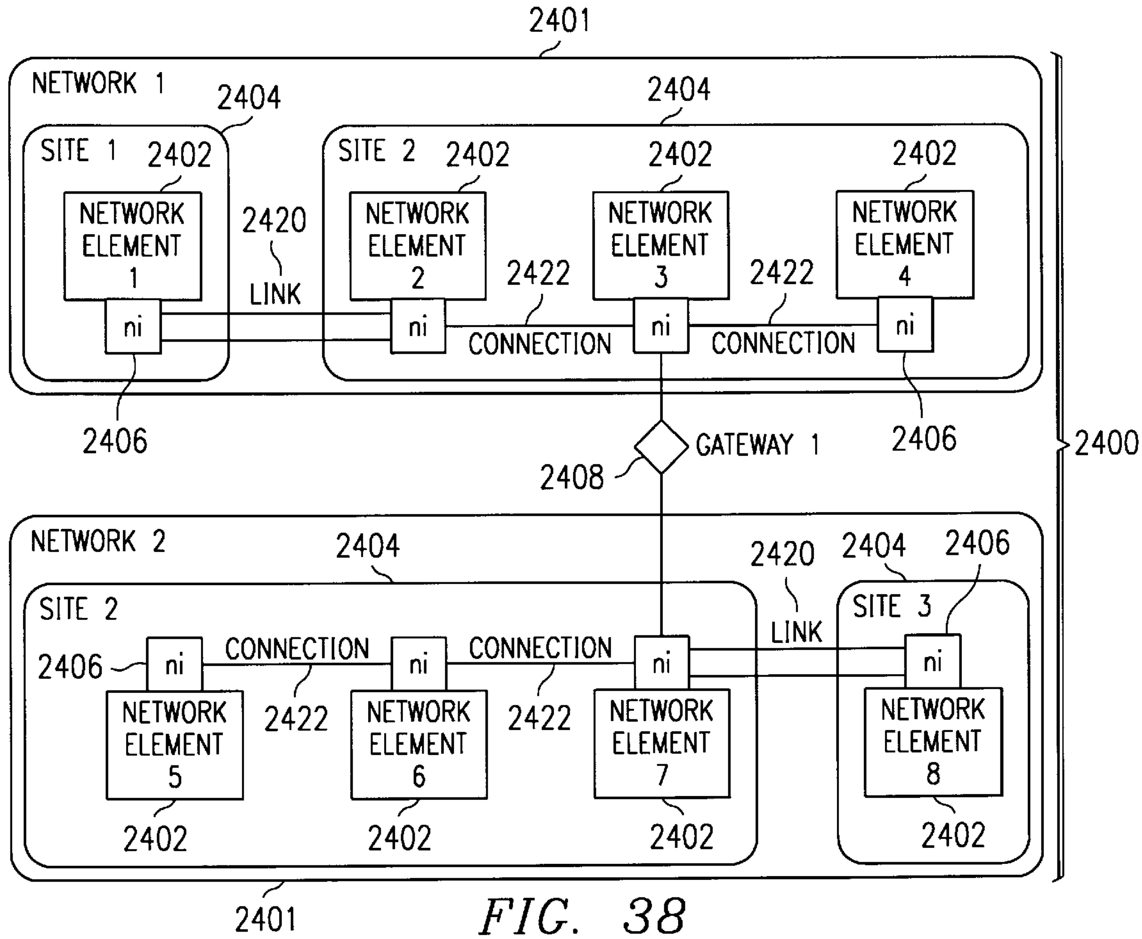

FIG. 38 shows a representation of a physical network 2400 schematic. Networks 2401 contain network elements 2402 at sites 2404 are interconnected through network interfaces 2406 and one or more gateways 2408.

4. Entity Relationships

Figure 39:
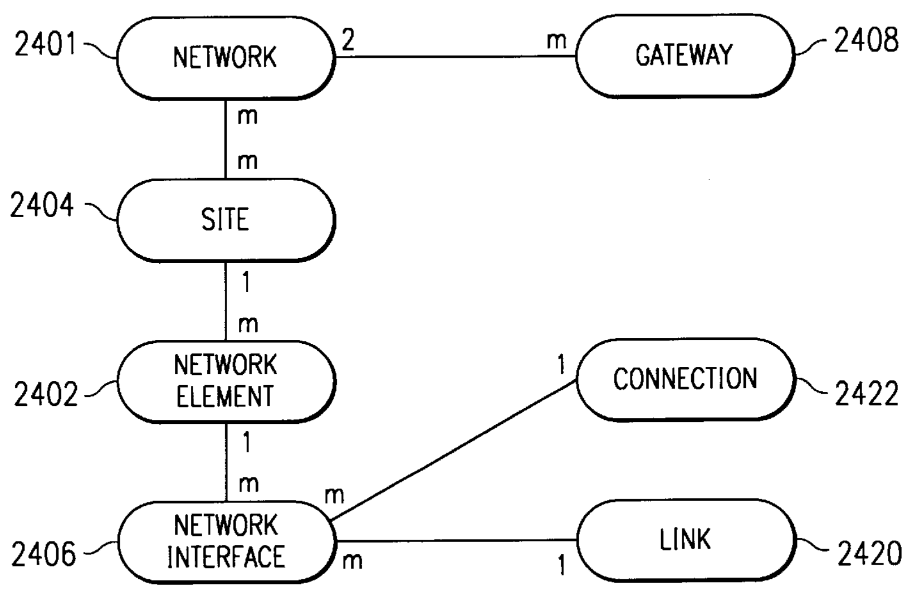

Entity relationships as shown in FIG. 39 have been arrived at as part of the physical network modeling rules. Some of these rules allow for generalities that future demands and some will constrain definitions to avoid conflicts.

1. A Network 2401 spans one or more sites 2404, and contains one or more network elements 2402.
2. A Site 2404 contains one or more network elements 2402.
3. A Network Element 2402 is located in only one Site 2404.

4. A Link 2420 connects two or more Sites 2404.
5. A Connection 2422 connects two or more Network Elements.
6. A Network Element 2402 contains one or more Network Interfaces 2406.

The preferred embodiment integrates product and service offerings for MCI's business customers. The initial embodiment focuses on a limited product set. Requirements for an interface have been identified to capitalize on the integration of these services. The interface provides user-manageability of features, distribution list capabilities, and a centralized message database.

VIII. INTELLIGENT NETWORK

All of the platform's support services have been consolidated onto one platform. The consolidation of platforms enables shared feature/functionality of services to create a common look and feel of features.

A. Network Management

The architecture is designed such that it can be remotely monitored by an MCI operations support group. This remote monitoring capability provides MCI the ability to:

- Identify degraded or broken connectivity between:
  - platforms, servers or nodes that must pass information (i.e., objects) to the "universal inbox",
  - platforms, servers or nodes responsible for retrieving messages and delivering messages,
  - the "universal inbox" and the PC Client messaging interface,
  - the "universal inbox" and the Message Center interface,
  - platforms, servers or nodes that must pass profile information to Profile, and
  - platforms, servers or nodes that must pass profile information to the ARU;
- Identify degraded application processes and isolate the process that is degraded;
- Identify hardware failure; and
- Generate alarms that can be detected and received by an internal MCI monitoring group for all application process, hardware or interface failures.

In addition, remote access to system architecture components is provided to the remote monitoring and support group such that they can perform remote diagnostics to isolate the cause of the problem.

B. Customer Service

Customer Service teams support all services. Customer support is provided to customers in a seamless manner and encompasses the complete product life cycle including:

- Alpha tests;
- Beta tests;
- Commercial release; and
- Identification of enhancements to address customer feedback or additional customer support requirements.

Comprehensive and coordinated support procedures ensure complete customer support from inception to termination. Customer service is provided from the time the Account Team submits the order until the customer cancels the account. Comprehensive and coordinated customer support entails the following:

- A one-stop, direct access, customer service group to support ARU or VRU problems, WWW Browser problems or PC Client problems.
- A staff that is well trained on diagnosing problems associated with access (ARU, WWW Browser or PC Client), the user interface (ARU, WWW Browser or PC Client), the application (Message Center or Profile Management) or the back-end system interfaces (universal inbox, directlineMCI voicemail/faxmail platform, Fax Broadcast System, SkyTel Paging server, order entry systems, billing systems, etc.)
- A staff that has on-line access to databases with information about ARU or VRU capabilities, WWW Browser capabilities, identified hardware issues and identified application issues
- 7×24 customer support
- a single toll free number (800 or 888) with direct access to the customer service group
- seamless first, second and third level support for most troubles where:
  - Level 1 support is the first support representative answering the telephone. They are expected to be able to resolve the most commonly asked questions or problems reported by customers. These questions or problems typically deal with access type (ARU, WWW Browser, PC Client), dial-up communication for the WWW Browser or PC Client, installation or basic computer (PC, workstation, terminal) hardware questions. Additionally they are able to open and update trouble tickets, and reactivate customers' passwords.
  - Level 2 support is provided within the customer support group when referrals to more experienced technical experts is necessary.
  - Level 3 support may involve an outside vendor for on-site hardware support for the customer or an internal MCI engineering or support group depending on the nature of the problem. The customer support group will be able to track the status of the customer visit and add the identified problem to both the customer support databases.
  - Level 4 support will continue to be provided by the Systems Engineering programmers.
- Staffing levels to provide acceptable customer hold times and abandon rates.
- A staff that has on-line access to the order entry and billing systems.
- Automatically generate weekly reports that detail volume of calls made, received, average hold-time of calls and number of trouble tickets opened/closed/escalated.

C. Accounting

Accounting is supported according to current MCI procedures.

D. Commissions

Commissions are supported according to current MCI procedures.

E. Reporting

Reporting is required for revenue tracking, internal and external customer installation/sales, usage and product/service performance. Weekly and monthly fulfillment reports are required from the fulfillment house(s). These fulfillment reports correlate the number of orders received and number of orders delivered. In addition, reporting identifies the number of different subscribers accessing Profile Management or the Message Center through the WWW Site.

F. Security

Security is enforced in accordance with MCI's published policies and procedures for Internet security. In addition, security is designed into the WWW Browser and ARU interface options to verify and validate user access to directlineMCI profiles, Message Center, Personal Home Page calendars and Personal Home Page configurations.

G. Trouble Handling

Trouble reporting of problems is documented and tracked in a single database. All troubles are supported according to the Network Services Trouble Handling System (NSTHS) guidelines. Any Service Level Agreements (SLAs) defined between MCI organizations are structured to support NSTHS.

Any troubles that require a software fix are closed in the trouble reporting database and opened as a Problem Report (PR) in the Problem Tracking System. This Problem Tracking System is used during all test phases of and is accessible by all engineering and support organizations.

IX. ENHANCED PERSONAL SERVICES

Throughout this description, the following terms will be used:

| Term | Represents |
|---|---|
| Server | Both the hardware platform and a TCP service |
| Web Server | AIX 4.2 system running Netscape Commerce Server HTTP Daemon |
| Welcome Server<br>Application Server | |

The Web Servers running as Welcome Servers will be running the Netscape Commerce Server HTTP Daemon in secure as well as normal mode. The Web Servers operating as various application servers will run this daemon in secure mode only. The Secure Mode uses SSLv2.

A. Web Server Architecture

The Web Servers are located in a DMZ. The DMZ houses the Web Servers and associated Database Clients as required. The database clients do not hold any data, but provide an interface to the data repositories behind the corporate firewall.

The Web space uses Round-Robin addressing for name resolution. The Domain name is registered with the administrators of mci.com domain, with a sub-netted (internally autonomous) address space allocated for galileo.mci.com domain.

Figure 40:
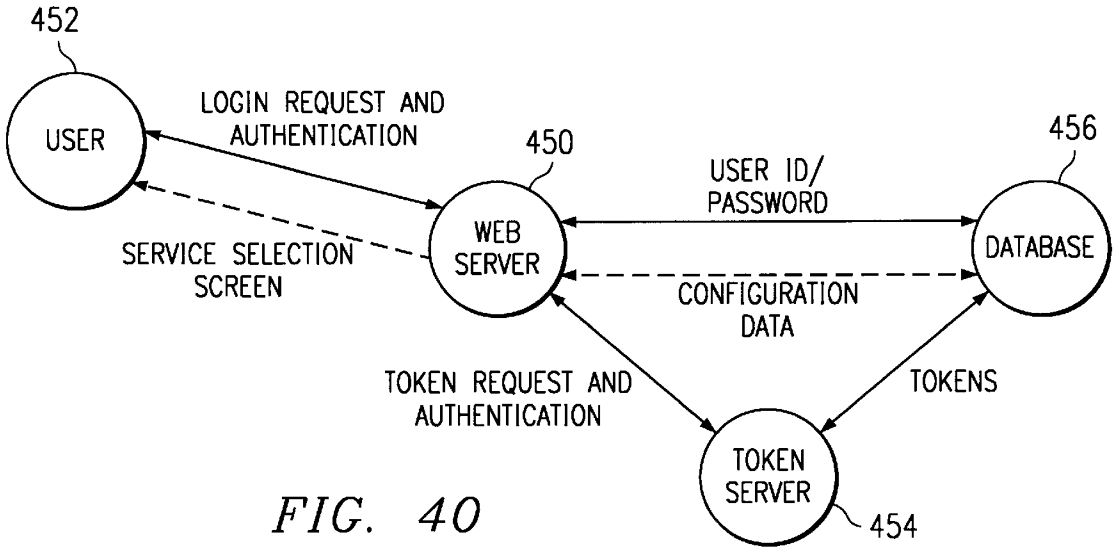
FIG. 40 is a diagrammatic representation of a web server logon in accordance with a preferred embodiment.

FIG. 40 shows the sequence of events leading to a successful login.

1. Welcome Server 450

This Web Server runs both the secure and normal HTTP daemons. The primary function of this server is to authenticate user 452 at login time. The authentication requires the use of Java and a switch from normal to secure mode operation. There are one or more Welcome servers 450 in the DMZ. The information provided by the Welcome server 450 is stateless. The statelessness means that there is no need to synchronize multiple Welcome Servers 450.

The Welcome server's first task is to authenticate the user. This requires the use of single use TOKENS, Passcode authentication and Hostile IP filtering. The first is done using a Token Server 454, while the other two will be done using direct database 456 access.

In case of failed authentication, the user 452 is shown a screen that mentions all the reasons (except Hostile-IP) why the attempt may have failed. This screen automatically leads the users back to the initial login screen.

Welcome server 450's last task, after a successful authentication, is to send a service selection screen to the user 452. The Service Selection screen directs the user to an appropriate Application Server. The user selects the Application, but an HTML file in the Server Section page determines the Application Server. This allows the Welcome Servers 450 to do rudimentary load balancing.

All the Welcome Servers 450 in the DMZ are mapped to www.galileo.mci.com. The implementation of DNS also allows galileo.mci.com to map to www.galileo.mci.com.

2. Token Server 454

This is a database client and not a Web Server. The Token servers 454 are used by Welcome Servers 450 to issue a TOKEN to login attempts. The issued TOKEN, once validated, is used to track the state information for a connection by the Application Servers. The TOKEN information is be maintained in a database on a database server 456 (repository) behind the corporate firewall.

The Token Servers 454 do the following tasks:

1. Issue single use TOKEN during authentication phase.
2. Validate single use TOKEN (mark it for multi use).
3. Validate multi-use TOKEN.
4. Re-validate multi-use TOKEN.

The Token Servers 454 are required to issue a unique TOKEN on every new request. This mandates a communication link between multiple Token Servers in order to avoid conflict of TOKEN values issued. This conflict is eliminated by assigning ranges to each Token Server 454.

The TOKEN is a sixteen character quantity made up of 62 possible character values in the set [0–9A–Za–z]. The characters in positions 0,1 and 2 for each TOKEN issued by the Token Server are fixed. These character values are assigned to each Token Server at configuration time. The character at position 0 is used as physical location identifier. The character at position 1 identifies the server at the location while the character at position 2 remains fixed at '0'. This character could be used to identify the version number for the Token Server.

The remaining 13 characters of the TOKEN are generated sequentially using the same 62 character set described above. At startup the TOKEN servers assign the current system time to the character positions 15–10, and set positions 9–3 to '0'. The TOKEN values are then incremented sequentially on positions 15–3 with position 3 being least significant. The character encoding assumes the following order for high to low digit values: 'z'–'a', 'Z'–'A', '9'–'0'.

The above scheme generates unique tokens if the system time is computed in 4 byte values, which compute to 6 base-62 characters in positions 15–10. The other assumption is that the scheme does not generate more than 62^7 (35*10^12) TOKENS in one second on any given Token Server in any embodiment.

The use of TOKEN ranges allows the use of multiple Token Servers in the Domain without any need for explicit synchronization. The method accommodates a maximum 62 sites, each having no more than 62 Token Servers. An alternate embodiment would accommodate more sites.

All of the Token Servers in the DMZ are mapped to token.galileo.mci.com. The initial embodiment contains two Token Servers 454. These Token Servers 454 are physically identical to the Welcome Servers 450, i.e., the Token Service daemon will run on the same machine that also runs the HTTP daemon for the Welcome service. In another embodiment, the two run on different systems.

The Welcome Server(s) 450 use the Token Server(s) 454 to get a single use TOKEN during the authentication phase of the connection. Once authenticated, the Welcome Server 450 marks the TOKEN valid and marks it for multiple use. This multi-use TOKEN accompanies the service selection screen sent to the user by the Welcome Server.

The design of TOKEN database records is discussed in detail below.

3. Application Servers

The Application servers are Web servers that do the business end of the user transaction. The Welcome Server's last task, after a successful authentication, is to send a service selection screen to the user. The service selection screen contains the new multi-use TOKEN.

When the user selects a service, the selection request, with its embedded TOKEN, is sent to the appropriate Application Server. The Application Server validates the TOKEN using the Token Server 454 and, if valid, serves the request. A Token Server can authenticate a TOKEN issued by any one of the Token Servers on the same physical site. This is possible because the Token Servers 454 are database clients for the data maintained on a single database repository behind the corporate firewall.

An invalid TOKEN (or a missing TOKEN) always leads to the "Access Denied" page. This page is served by the Welcome Server(s) 450. All denial of access attempts are logged.

The actual operation of the Application Server depends on the Application itself. The Application Servers in the DMZ are mapped to <appName><num>.galileo.mci.com. Thus, in an embodiment with multiple applications (e.g., Profile Management, Message Center, Start Card Profile, Personal Web Space etc.), the same Welcome and Token servers 450 and 454 are used and more Applications servers are added as necessary.

Another embodiment adds more servers for the same application. If the work load on an application server increases beyond its capacity, another Application Server is added without any changes to existing systems. The SERVERS and TOKEN_HOSTS databases (described below) are updated to add the record for the new server. The <num> part of the host name is used to distinguish the Application Servers.

There is no need to use DNS Round-robin on these names. The Welcome server 450 uses a configuration table (The SERVERS database loaded at startup) to determine the Application Server name prior to sending the service selection screen.

B. Web Server System Environment

All the Web servers run the Netscape Commerce Server HTTP daemon. The Welcome Servers 450 run the daemon in normal as well as secure mode, while the Application Servers only run the secure mode daemon.

The Token Server(s) run a TCP service that runs on a well known port for ease of connection from within the DMZ. The Token Service daemon uses tcp_wrapper to deny access to all systems other than Welcome and Application server(s). In order to speed this authentication process, the list of addresses is loaded by these servers at configuration time, instead of using reverse name mapping at every request. The use of tcp_wrapper also provides the additional tools for logging Token Service activity.

The Application servers mostly work as front-ends for database services behind the firewall. Their main task is to validate the access by means of the TOKEN, and then validate the database request. The database requests are to Create, Read, Update or Delete exiting records or data fields on behalf of the user. The Application Servers do the necessary validation and authority checks before serving the request.

1. Welcome Servers

Figure 41:
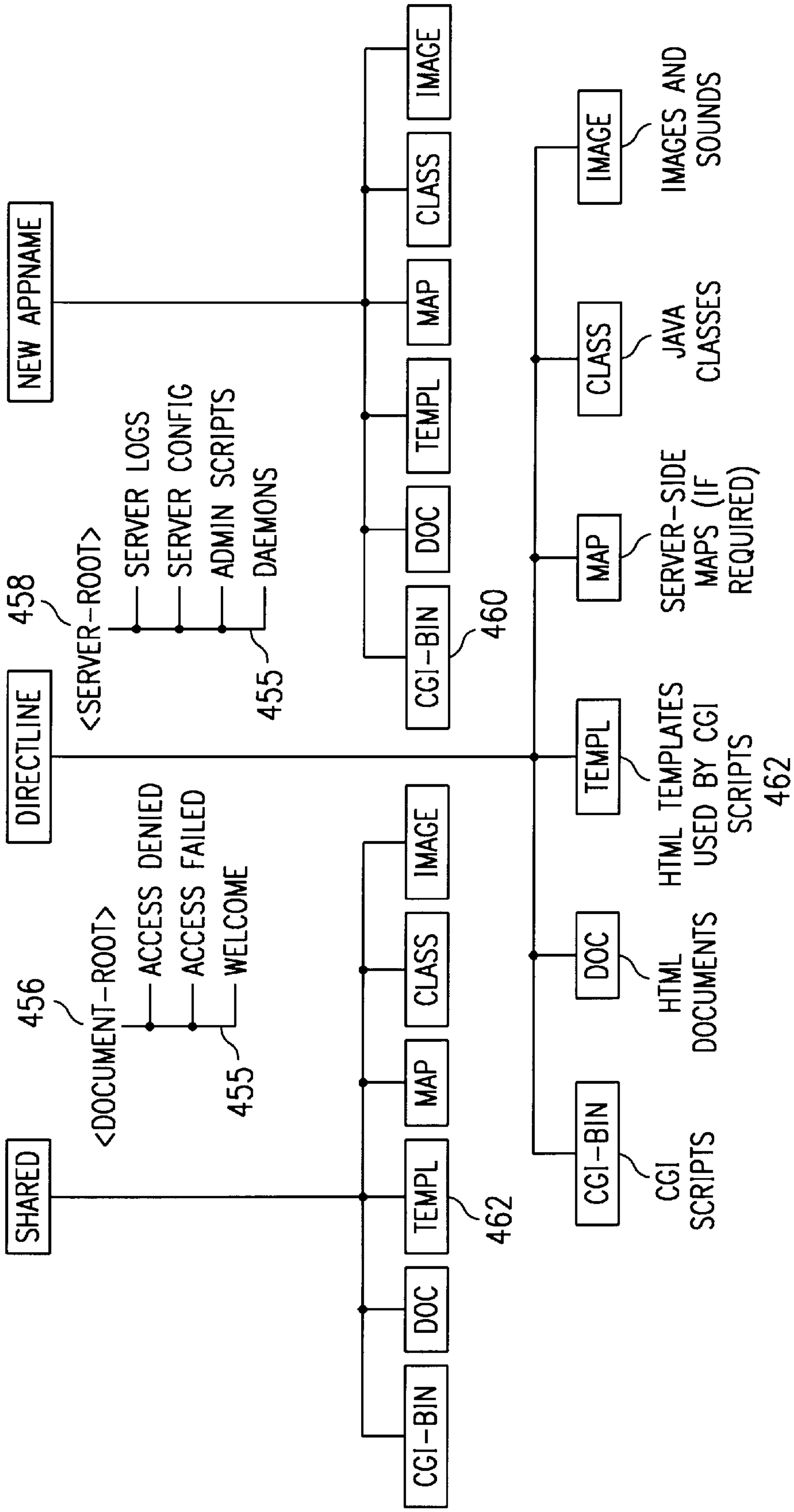
FIG. 41 is a diagrammatic representation of a server directory structure used with the logon of FIG. 40 in accordance with a preferred embodiment.

The Welcome Servers serve the HTML pages described below to the user at appropriate times. The pages are generated using Perl-based Common Gateway Interface (CGI) scripts. The Scripts reside in a directory which is NOT in the normal document-root directory of the HTTP daemon. The normal precautions regarding disabling directory listing and removing all backup files etc. are taken to ensure that CGI scripts are not readable to the user. FIG. 41 shows the directory structure 455 on the Welcome Server 450.

FIG. 41 shows that the <document_root> 456 is separated from the <server_root> 458. It also shows that the <document_root> directory holds only the welcome and access failure HTML pages.

The HTTP Server maps all requests to the "cgi" directory 460 based on the URL requested. The CGI scripts use the HTML templates from the "template" directory 462 to create and send the HTML output to the users on fly.

The use of the URL to map to a CGI script out of the <document_root> 456 blocks access to the <document_root> directory 456 by a malicious user. Since every access to the Welcome Server 450 maps to a CGI script in the cgi directory 460 of the Welcome Server 450, security is ensured by calling the authentication function at start of every script.

The user Authentication libraries are developed in Perl to authenticate the user identity. NSAPI's authentication phase routines also add features for TOKEN verification and access mode detection in the servers themselves.

The Welcome Servers 450 read their operating parameters into their environment from the database 456 at startup. It is necessary to keep this information in the common database in order to maintain the same environment on multiple Welcome Servers 450.

a) Welcome Page

The welcome page is sent as the default page when the Welcome Server 450 is first accessed. This is the only page that is not generated using a cgi script, and it is maintained in the <document_root> directory 456. This page does the following:

- Confirms that the browser can display Frames. If the browser fails to display Frames correctly, this page will display an appropriate error message and direct the user to down load Microsoft Internet Explorer V3.0 or later.
- Confirms that the browser can run Java. A failure will result in the user being directed to Microsoft Internet Explorer V3.0 or later.
- If the browser successfully displays Frames and runs Java, then this page will automatically request the Welcome Server 450 to send a login page.

The last action by the Welcome page is done using the Java applet embedded in page. This also switches the user's browser from normal to secure mode.

b) Login Page

The Login Page is a cgi-generated page that contains an embedded single use TOKEN, a Java applet, and form fields for the user to enter a User Id and Passcode. The page may display a graphic to emphasize service.

The processing of this page is padded to introduce an artificial delay. In the initial embodiment, this padding is set to zero.

The response from this page contains the TOKEN, a scrambled TOKEN value generated by the applet, User Id and Passcode. This information is sent to the Welcome server using a POST HTTP request by the Java applet. The POST request also contains the Applet signature.

If the login process is successful the response to this request is the Server Selection page. A failure at this stage results in an Access Failed page.

c) Server Selection Page

The Server Selection Page is a cgi-generated page which contains an embedded multi-use TOKEN. This page also shows one or more graphics to indicate the types of services available to the user. Some services are not accessible by our users. In other embodiments, when more than one service exists, a User Services Database keyed on the User Id is used to generate this page.

The Welcome server uses its configuration information to embed the names of appropriate Application Servers with the view to sharing the load among all available Application Servers. This load sharing is done by using the configuration data read by the Welcome Server(s) during startup.

The Welcome Server selects an Application Server based upon entries in its configuration file for each of the services. These entries list the names of Application Server(s) for each application along with their probability of selection. This configuration table is loaded by the Welcome Servers at startup.

d) Access Failed Page

The Access Failed Page is a static page. That displays a message indicating that the login failed because of an error in User Id, Passcode or both. This page automatically loads the Login Page after a delay of 15 seconds.

e) Access Denied Page

The Access Denied Page is a static page that displays a message indicating that an access failed due to authentication error. This page automatically loads the Login Page after a delay of 15 seconds. The Access Denied page is called by the Application Servers when their authentication service fails to recognize a TOKEN. All loads of this page will be logged and monitored.

2. Token Servers 454

The TOKEN service on the Web site is the only source of TOKEN generation and authentication. The Tokens themselves are stored in a shared Database 456. This database can be shared among all Token servers. The Token Database is behind the firewall out of the DMZ.

The Token service provides the services over a well-known (>1024) TCP port. These services are provided only to a trusted host. The list of trusted hosts is maintained in a configuration database. This database is also maintained behind the firewall outside of the DMZ. The Token servers read their configuration database only on startup or when they receive a signal to refresh. The Token services are:

Grant a single use TOKEN for login attempt.

Validate a single use TOKEN.

Validate a TOKEN.

Re-Validate a TOKEN.

TOKEN aging is implemented by a separate service to reduce the work load on the Token servers.

All access to the Token Server(s) is logged and monitored. The Token Service itself is written using the tcp_wrapper code available from MCI's internal security groups.

3. Profile Management Application Servers

The profile management application server(s) are the only type of Application servers implemented in the first embodiment. These servers have the same directory layout as the Welcome Servers. This allows the same system system to be used for both services if necessary.

C. Security

The data trusted by subscribers to the Web server is sensitive to them. They would like to protect it as much as possible. The subscribers have access to this sensitive information via the Web server(s). This information may physically reside on one or more database servers, but as far as the subscribers are concerned it is on Server(s) and it should be protected.

Presently only the following information needs to be protected in an embodiment:

In other embodiments, profile information for directline account additional information is protected, including Email, Voice Mail, Fax Mail, and Personal Home Page information.

The protection is offered against the following type of attackers:

People with access to Web;

Other subscribers;

MCI personnel;

People with access to Subscriber's network;

People with access to Subscriber's system;

People looking over the shoulder of the Subscriber; and

Other systems pretending to be Server(s).

The project implements the security by using the following schemes:

Single use TOKENS for login attempts;

Validated TOKENS will accompany all transactions;

TOKEN aging to invalidate a TOKEN if it has not been used for ten minutes;

TOKEN is associated with the IP Address of the calling machine, so TOKEN stealing is not an easy option;

Use of SSL prevents TOKEN-or DATA stealing without having physical access to the customer's display;

Use of TOKEN in a form analogous to the Netscape Cookie gives us the option to switch to cookies at a later date. Cookies offer us the facility to hide the TOKEN even further into the document for one extra layer of security; and Use of Hostile-IP table to block multiple offenders without detection by them.

In addition to the security implemented by TOKEN as described above, the Web Server(s) are in a Data Management Zone for further low level security. The DMZ security is discussed below.

D. Login Process

Figure 42:
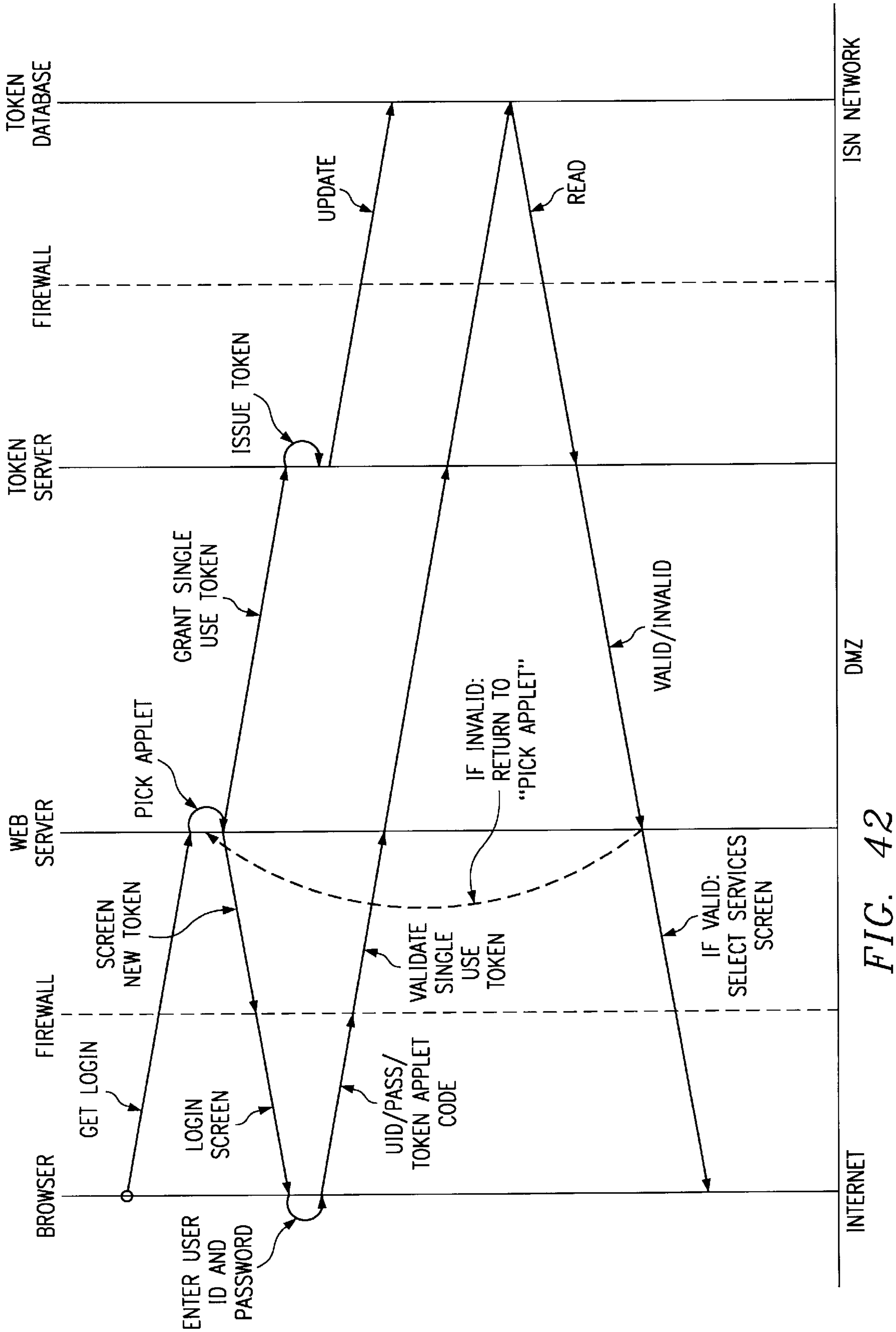
FIG. 42 is a more detailed diagrammatic representation of the logon of FIG. 40 in accordance with a preferred embodiment.

FIG. 42 shows the Login Process. The sequence of events leading to a successful login is:

1. The user requests a connection to www.galileo.mci-.com.
2. A server is selected from a set using DNS Round-robin.
3. An HTML Page is sent to the user's browser.
4. The Page checks the browser for JAVA Compliance and displays a welcome message.
5. If the browser is not Java compliant, the process stops with an appropriate message.
6. If the browser is Java compliant, it automatically issues a "GET Login Screen" request to the www.galileo.m-ci.com server. This request also switches the browser to SSL v2. It will fail if the Browser is not SSL compliant.
7. The Web Server does the following:
   A. The Web server gets a Single Use Token from its internal Token service.
   B. The Web server picks one applet from a large set.
   C. The Web server Records the Applet, Token, and Client IP address in a Database.
   D. The Web server sends back the Login Screen, with Applet & Token.
8. User fills in the Login Screen fields—User Id and Passcode.
   A. The User Id is the user's Directline number (printed on User's Business cards and is in public domain).
   B. The Passcode is a Six digit number known only to the User.

9. When the User presses Enter (or clicks on the LOGIN button) the Java Applet sends the UserId, Passcode, Token, and Scrambled Token back. The Scrambling Algorithm is specific to the Applet that was sent in Step 7D.
10. If the browser's IP address is in the Hostile-IP table, the server goes back to Step 7.
11. The Web server authenticates the Login request against what it recorded in Step 7C.
12. If the test is invalid: if this is the third successive failed attempts from the same IP address server records the Address in Hostile-IP table.
13. The server goes back to Step 7.
14. If the test is valid; The server sends a select services screen to the Browser with an embedded Token. The Token is still associated with the Browser's IP address, but it now has an expiration time.

E. Service Selection

Figure 43:
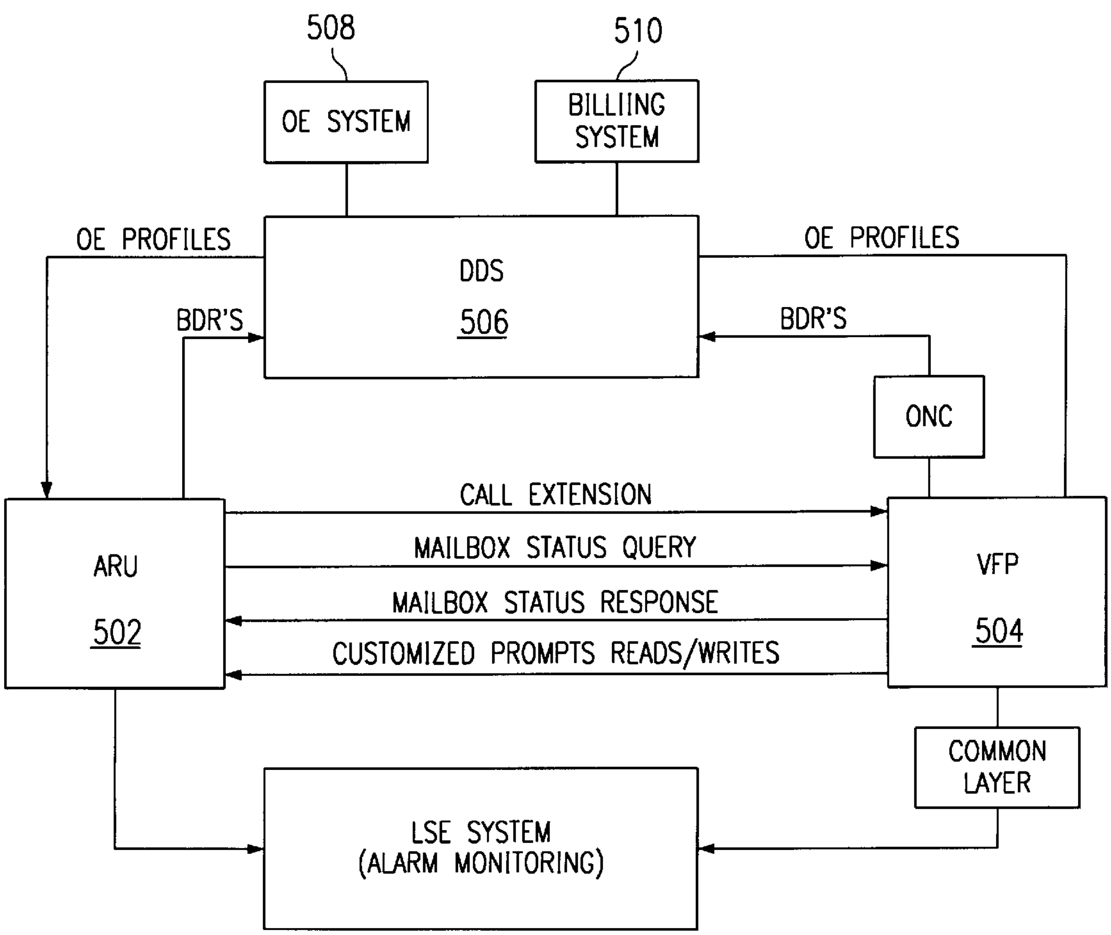
FIGS. 43–50 are block diagrams illustrating portions of the hybrid network in accordance with a preferred embodiment.

When the user selects an option from the Service selection screen, the request is accompanied by the Token. The token is validated before the service is accessed, as shown in FIG. 43.

F. Service Operation

The screens generated by the Application Servers all contain the Token issued to the user when the Login process was started. This Token has an embedded expiration time and a valid source IP Address. All operation requests include this token as a part of the request.

The service requests are sent by the browser as HTML forms, APPLET based forms or plain Hyper Links. In the first two instances, the Token is sent back as a Hidden field using the HTTP-POST method. The Hyper-Links use either the HTTP-GET method with embedded Token or substitute the Cookie in place of a Token. The format of the Token is deliberately chosen to be compatible with this approach.

1. NIDS Server

The NIDS server in the system is isolated from the Web Servers by a router-based firewall. The NIDS server runs the NIDSCOMM and ASCOMM services that allow TCP clients access to databases on the NIDS server. The NIDSCOMM and ASCOMM services do not allow connectivity to databases not physically located on the NIDS Server.

The following databases (C-tree services) on the NIDS server are used by the Welcome Server, Token Server and Profile Management Application Server:

800_PIN_1CALL (this is a partitioned database);
1CALL_TRANS;
COUNTRY;
COUNTRY_SET;
COUNTRY2 (maybe);
COUNTRY_CITY (maybe);
NPA_CITY;
NPACITY_OA300 (maybe); and
OP153T00.

In addition to the C Tree services named above the following new C tree services will be defined in the SERVDEF and used only on the NIDS server dedicated to the system:

TOKEN;
SERVERS;
HOSTILE_IP;
TOKEN_HOSTS; and
SERVER_ENV.

The following descriptions for these databases do not show the filler field required at the first byte of each record, nor do they attempt to show any other filler fields that may be required for structure alignment along the 4-byte boundaries. This omission is made only for clarity. The numbers in parentheses next to the field definitions are the number of bytes required to hold the field value.

2. TOKEN database service.

The TOKEN database service is accessed by the Token Servers. The primary operations on this service are Create a new record, read a record for a given Token value and update a record for the given Token value.

A separate chron job running on the NIDS Server itself also accesses this database and deletes obsolete records on a periodic basis. This chron job runs every hour. It does a sequential scan of the database and deletes records for expired tokens.

The TOKEN database service contains the TOKEN records. The TOKEN records use a single key (the TOKEN) and have the following fields:

1. Version (1);
2. Use Flag (Single/Multi) (1);
3. Token Value (16);
4. IP Address (16);
5. User Id (16);
6. Time Granted (4); and
7. Time expires (4).

The key field is the Token Value.

3. SERVERS database service.

The Servers Database Service is accessed by the Welcome Server at configuration time. The records in this database contain the following fields:

1. Application Name (16);
2. Application Server Host Name (32);
3. Application Server Domain Name (32);
4. Weight (1);
5. Application Icon File URL (64); and
6. Application Description File URL (64).

The key field is the combination of Application Name, Server Host Name, and Server Domain Name. This database is read by the Welcome Servers sequentially. This database is also accessed by the Web Administrators to Create, Read, Update and Delete records. This access is via the ASCOMM interface. The Web Administrators use the a HTML form and CGI script for their administration tasks.

4. HOSTILE_IP database service.

This database is accessed by the Welcome servers to create new records or read existing records based on IP address as the key. The read access is very frequent. This database contains the following fields:

1. IP Address (16);
2. Time entered (4); and
3. Time expires (4).

The key field is the IP Address. All three values are set by the Welcome Server when creating this record. If the entry is to be over-ridden, the service doing the over-ride will only be allowed to change the Time expires value to <epoch_start>, thus flagging the entry as over-ride.

This database is also accessed by the Web Administrators to Create, Read, Update, and Delete records. Access is via the ASCOMM interface. The Web Administrators use the HTML form and CGI script for their administration tasks.

Customer Service uses a specially developed tool to access this database and access is allowed only from within the corporate firewall.

A chron job running on the NIDS server also accesses this database and deletes all obsolete records from this database. This job logs all its activity. The log of this job is frequently examined by the Web Administrators all the time.

5. TOKEN_HOSTS database service.

This database service lists IP Addresses of the hosts trusted by the Token Servers. This database is read by the Token Service at configuration time. The records in this database contain the following fields:

1. IP Address (16);
2. Authority (1);
3. Host Name (32);
4. Host Domain Name (32); and
5. Host description (64).

The key field is the IP Address. The Authority binary flag determines the access level. The low access level only allows validate/re-validate commands on an existing TOKEN; the high access level additionally allows Grant and Validate single use TOKEN commands as well.

This database is also accessed by the Web Administrators to Create, Read, Update and Delete records. Access is via the ASCOMM interface. The Web Administrators use the HTML form and CGI script for their administration tasks.

6. SERVER_ENV database service.

This database is read by the Welcome and Application servers at startup. It defines the starting environment for these servers. In one embodiment, only one field (and only for the Welcome Servers) is designed to be used. This is expanded in other embodiments.

The records in this database contain the following fields:

1. Sequence Number (4);
2. Application Name (16);
3. Environment Name (32); and
4. Environment Value (64).

The key field is Sequence Number. Environment values may refer to other environment variables by name. The values are evaluated at run time by the appropriate CGI scripts. The Welcome Servers are assigned the pseudo Application Name of WELCOME.

This database is also accessed by the Web Administrators to Create, Read, Update and Delete records. This access is via the ASCOMM interface. The Web Administrators use the HTML form and CGI script for their administration tasks.

7. Chron Job(s)

The NIDS Server runs a cleanup chron job. This job is scheduled to run every hour. The main tasks for this job are the following:

1. Scan the HOSTILE_IP database and report on all records. This report contains all records. The aim to track repeat offenders based on this report.
2. Scan the HOSTILE_IP database and report on records with <epoch_time> as their expiration time.
3. Scan the HOSTILE_IP database and delete obsolete records.
4. Scan the TOKEN database and report on all records. This report format will be geared towards traffic reporting rather than scanning each entry.
5. Scan the TOKEN databbase to delete obsolete records.

G. Standards

The following coding standards have been developed:

1. HTML Look and Feel standards;
2. Java Look and Feel standards (derived from the HTML look and feel standards, these are the new class libraries used in development to force a common look and feel on the site's pages); and
3. HTML Programming standards.

H. System Administration

The system administration tasks require reporting of at least the following System Operating Parameters to the System Administrators:

System stats and disk usage with time stamps;

Network operating parameters with time stamps;

Web page usage and access statistics with time stamps;

TOKEN usage statistics;

Hostile IP alarms and statistics;

The following tools and utilities are on the Servers in DMZ;

Time synchronization;

Domain Name Servers;

System Log Monitoring;

Alarm reporting; and

Secure Shell.

The system generates alarms for the following conditions:

Incorrect use of TOKENS;

Hostile IP table changes;

TOKEN Expiration; and

Login attempts.

The alarms will be generated at different levels. The Web Servers use the following broad guidelines:

1. The servers run in a root environment.
2. The administrators are able to start a staging server on a non-standard port to test a new (staged) service.
3. The staging server is accessible from Internet during the staging run.
4. The Administrators have the option to move the staging software from staging area to production area with a single command. There are suitable checks to make sure this is not done accidentally.

I. Product/Enhancement

A preferred embodiment enables directlineMCI customers additional control over their profile by providing a graphical user interface, and a common messaging system. The capability to access the power of a preferred embodiment exists in the form of a directlineMCI profile and common messaging system. The user is able to modify his account, customizing his application by making feature/functionality updates. The application enables the power of the future capabilities that a preferred embodiment integration will provide by allowing the user to run his application.

The user is able to access all of his messages by connecting with just one location. FAX, email, page and voice messages will be accessed through a centralized messaging interface. The user is able to call into the centralized messaging interface through his message center interface to retrieve messages. A centralized message interface provides the user the capability to manage his communications easily and effectively.

The user interface has two components, the user's application profile and message center. The interface is accessible through PC software (i.e., PC Client messaging interface), an ARU or a VRU, and a World Wide Web (WWW) Browser. The interface supports the customization of applications and the management of messages.

The feature/functionality requirements for an embodiment will be presented below. The first piece to be described is the ARU interface and its requirements for the user interface, message management and profile management. Following the ARU requirements, requirements are also provided for the WWW Browser and PC Client interfaces.

J. Interface Feature Requirements (Overview)

A front-end acts as an interface between the user and a screen display server in accordance with a preferred embodiment. The user is able to access the system and directly access his profile and messages. The user interface is used to update his profile and to access his messages. The user's profile information and the user's messages may reside in different locations, so the interface is able to connect to both places. Profile and messaging capabilities are separate components of the interface and have different requirements.

Through his interface, the user is able to update his profile in real-time through profile management. The application profile is the front-end to the user account directory, which is where all of the user account information resides in a virtual location. Also, a user is able to manage his messages (voicemail, faxmail, email, pager recall) through his message center. The message center is the front-end to the centralized messaging database, which is where all of the user's messages may reside, regardless of message content.

Three user interfaces are supported:

DTMF access to an ARU or VRU;

WWW Browser access to a WWW Site; and

PC Client access to a Messaging Server.

From the ARU, the users are able to update their profiles (directlineMCI only), retrieve voicemail messages and pager recall messages, and retrieve message header (sender, subject, date/time) information for faxmail and email messages. Through the PC Client, the user is limited to message retrieval and message manipulation. The WWW Browser provides the user a comprehensive interface for profile management and message retrieval. Through the WWW Browser, the users are able to update their profiles (directlineMCI, Information Services, List Management, Global Message Handling and Personal Home Pages) and retrieve all message types.

1. The User Account Profile

The user is able to access account information through the application profile. The application profile provides an intelligent interface between the user and his account information, which resides in the user account directory. The User Account Directory accesses the individual account information of users. Users are able to read and write to the directory, making updates to their accounts. The directory allows search capabilities, enabling customer service representatives to search for a specific account when assisting a customer.

When a customer obtains a phone number, the user account directory reflects the enrollment, and the user is able to access and update features through his user account profile. If a customer withdraws, the user directory will reflect the deactivation, and the service will be removed from the user's application profile.

In summary, the user account directory provides account information for each of the user's services. However, the user account directory is limited to: directlineMCI profile, Information Services profile, Global Message Handling, List Management and Personal Home Page profiles. This information determines the feature/functionality of the user's application and provides the user with the flexibility that is necessary to customize his application, allowing MCI to meet his continuously changing communication needs.

2. The Database of Messages

An important feature that is offered is the integration of messages. Messages of similar and dissimilar content are consolidated in one virtual location. Through a call, the message center provides the user with a review of all of his messages, regardless of content or access. Through the interface messaging capabilities, the user is also able to maintain an address book and distribution lists.

This message database is a centralized information store, housing messages for users. The message database provides common object storage capabilities, storing data files as objects. By accessing the message database, users retrieve voicemail, faxmail, email and pager recall messages from a single virtual location. In addition, by using common object storage capabilities, message distribution is extremely efficient.

K. Automated Response Unit (AR E Capabilities

1. User Interface

The ARU interface is able to perform directlineMCI Profile Management, Information Services Profile Management, message retrieval and message distribution. The DTMF access provided through the ARU is applied consistently across different components within the system. For example, entering alphabetic characters through the DTMF keypad is entered in the same manner regardless if the user is accessing Stock Quote information or broadcasting a fax message to a distribution list.

Voicemail Callback Auto Redial provides the capability to prompt for and collect a DTMF callback number from a guest leaving a voicemail and automatically launch a return call to the guest call back number when retrieving messages. Upon completing the callback, the subscriber will be able to return to the same place where they left off in the mailbox.

Music On-Hold provides music while a guest is on-hold.

Park and Page provides a guest an option to page a directlineMCI subscriber, through the directlineMCI gateway, then remain on-hold while the subscriber is paged. The subscriber receives the page and calls their directlineMCI number, where they can select to be connected with the guest on hold. Should the subscriber fail to connect a call with the guest, the guest will receive an option to be forwarded to voicemail. If the subscriber does not have voicemail as a defined option, then the guest a final message will be played for the guest.

Note: The guest has the ability to press an option to be forwarded to voicemail at any time while on hold.

Call Screening with Park and Page

An embodiment provides the subscriber with functionality for responding to a park and page, the identity of the calling party (i.e., guest). This provides the subscribers the ability to choose whether they wish to speak to the guest or transfer the guest to voicemail, prior to connecting the call. Specifically, guests are ARU prompted to record their names when they select the park and page option. When the subscriber respond to the park and page, they will hear an ARU prompt stating, "You have a call from RECORDED NAME", then be presented with the option to connect with the calling party or transfer the party to voicemail. If the subscriber does not have voicemail as a defined option, then the guest will be deposited to a final message. The guest also will have the ability to press an option to be forwarded to voicemail at any time while on hold.

Two-way Pager Configuration Control and Response to Park and Page

The system also allows a subscriber to respond to a park and page notification by instructing the ARU to route the call to voicemail or final message or continue to hold, through a command submitted by a two-way pager.

Text Pager Support

The system allows a subscriber to page a directlineMCI subscriber, through the directlineMCI gateway, and a leave a message to be retrieved by a text pager. Specifically, upon choosing the appropriate option, the guest will be transferred to either the networkMCI Paging or the SkyTel message center where an operator will receive and submitcreate a text-based message to be retrieved by the subscriber's text pager.

Forward to the Next Termination Number

The system provides the capability for the party answering the telephone, to which a directlineMCI call has been routed, to have the option to have the call routed to the next termination number in the directlineMCI routing sequence. Specifically, the called party will receive a prompt from the directlineMCI ARU gateway, which indicates that the call has been routed to this number by directlineMCI and providing the called party with the option to receive the incoming call or have the call routed to the next termination number or destination in the routing sequence. The options presented to a called party include:

Press an option to accept the call

Press an option to send the call to the next termination

Let the call time-out (i.e., no action taken) and then proceed to the next termination.

Less Than 2 Second # Reorigination

An embodiment also provides the capability to reoriginate an outbound call, from the directlineMCI gateway, by pressing the pound (#) key for less than two seconds. Currently, directlineMCI requires the # key to be depressed for two seconds or more before the subscriber can reoriginate a call.

L. Message Management

1. Multiple Media Message Notification

The subscriber can receive an accounting of current messages across a number of media, to include voicemail, faxmail, email, paging. Specifically, the subscriber will hear an ARU script stating, for example, "You have 3 new voicemail messages, 2 new faxmail messages, and 10 new email messages."

2. Multiple Media Message Manipulation

A subscriber is allowed to access the Universal Inbox to perform basic message manipulation, of messages received through multiple media (voicemail, faxmail, email, paging), through the directlineMCI ARU gateway. Subscribers are able to retrieve voicemail messages and pager messages, and retrieve message header (priority, sender, subject, date/time, size) information for faxmail and email messages. In addition, subscribers are able to save, forward or delete messages reviewed from the ARU interface. The forward feature is limited to distributing messages as either voicemails or faxmails. Only voicemail messages can be forwarded as voicemails. Email, faxmail and pager messages can be forwarded as faxmails; however, it may be necessary to convert email and pager messages to a G3 format. When forwarding messages as faxmails, subscribers have the ability to send messages to distribution lists and Fax Broadcast lists.

3. Text to Speech

The system converts text messages, received as email, faxmail or pager messages, into audio, which can be played back through the directlineMCI gateway. Initially, the text-to-speech capability will be limited to message header (priority, sender, subject, date/time, size) information.

Subscribers are provided the option to select whether they want to hear message headers first and then select which complete message they want to be played. The only message type that does not support a text-to-speech capability for the complete message will be faxmail messages. The capability only exists to play faxmail headers. FAXmail header information includes sender's ANI, date/time faxmail was received and size of faxmail.

4. Email Forwarding to a Fax Machine

Subscribers can forward an email, retrieved and reviewed through the directlineMCI ARU gateway, to a subscriber-defined termination number. Specifically, the subscriber has the ability to review an email message through the directlineMCI ARU. After reviewing the message, the subscriber receives, among the standard prompts, a prompt requesting whether he would like to forward the email message to a specified termination number or have the option to enter an impromptu number. Upon selecting this option and indicating the termination number, the email message is converted to a G3 format and transmitted to the specified termination number. Email attachments that are binary files are supported. If an attachment cannot be delivered to the terminating fax machine, a text message must be provided to the recipient that the binary attachment could not be forwarded. Forwarding of emails to a fax machine does not result in the message being deleted from the "universal inbox".

5. Pager Notification of Messages Received

A subscriber can receive a pager notification, on a subscriber-defined interval, indicating the number of messages, by message media, that currently reside in the subscriber's "universal inbox". Specifically, the subscriber will have the ability to establish a notification schedule, through the directlineMCI ARU, to receive a pager message which indicates the number of voicemail, faxmail, email and pager messages that reside in the subscriber's "universal inbox".

6. Delivery Confirmation of Voicemail

The system provides the subscriber the ability to receive a confirmation voicemail message when a subscriber-initiated voicemail message was not successfully delivered to the terminating party(s).

7. Message Prioritization

The system provides the guest the ability to assign either regular or urgent priority to a message. When the subscriber receives an accounting of messages, the prioritization will be indicated, and all urgent messages will be indexed before regular messages. This requirement only applies to voicemails, not faxmails. This will require that the "universal inbox" present the proper message priority for directlineMCI voicemails.

M. Information Services

Through the ARU interface, users will be able to receive content from information services which are configurable through the WWW Browser interface. Information content will be provided as an inbound service and an outbound service. The information content that is defined through the WWW Browser (i.e., Profile Management) is defined as the inbound information content and will be limited to:

Stock Quotes and Financial News

Headline News.

Subscribers also have the ability to access additional information content through the ARU interface; however, this information is not configurable through the WWW Browser (i.e., Profile Management). This additional information content will be referred to as outbound information content and will consist of:

Stock Quotes and Financial News;

Headline News;

Weather;

Sports News and Scores;

Soap Opera Updates;

Horoscopes;

Lottery Results;

Entertainment News; and

Traveler's Assist.

The configurable parameters of the inbound information content is defined below. Retrieval of outbound information content will support the entry of alphabetic characters through a DTMF keypad. Entering of alphabetic characters must be consistent with the manner that alphabetic characters are entered through DTMF for list management.

Access to Traveler's Assist will be bundled with the other outbound information services such that the subscriber only has to dial a single 800/8XX number. The 800/8XX call may extend to different termination depending upon the information content selected.

N. Message Storage Requirements

The message storage requirements are consistent with the message storage requirements defined below.

O. Profile Management directlineMCI Profile Management

Subscribers can also review, update and invoke their directlineMCI account profiles. The directlineMCI profile management capabilities through the ARU interface are consistent with the presentation provided through the WWW Browser and support the following requirements:

- Create new directlineMCI profiles and assign names to the profile;
- Invoke directlineMCI profiles;
- Voice annotate directlineMCI profile names;
- Update existing directlineMCI profiles;
- Support the rules-based logic of creating and updating directlineMCI profiles (e.g., selection of only one call routing option, like voicemail, will invoke override routing to voicemail; and updates made in one parameter must ripple through all affected parameters, like paging notification);
- Enable a directlineMCI number;
- Enable and define override routing number; and
- Enable and define FollowMe routing.
- Enable and define final routing (formerly called alternate routing) to:
  - Voicemail and pager;
  - Voicemail only;
  - Pager only;
  - Final message;
  - Invoke menu routing if two or more of the call routing options (FollowMe, voicemail, faxmail or pager) are enabled;
  - Define the default number for faxmail delivery;
  - Activate paging notification for voicemail;
  - Activate paging notification for faxmail; and
  - Provide guest option to classify voicemails for urgent delivery;
  - Define call screening parameters for:
    - Name and ANI;
    - ANI only;
    - Name only; and
  - Enable or disable park and page.

P. Call Routing Menu Change

The system also provides the capability for subscribers to modify their call routing termination numbers without having to re-enter termination numbers which they do not wish to change. Specifically, the directlineMCI routing modification capability requires the subscriber to re-enter all termination numbers in a routing sequence should they wish to change any of the routing numbers. This capability permits the subscriber to change only the termination numbers they wish to change, and indicate by pressing the "#" key when they do not wish to change a specific number in the routing sequence.

Q. Two-way Pager Configuration Control and Response to Park and Page

The system can also enable or disable predefined directlineMCI profiles through a command submitted by a two-way pager.

R. Personalized Greetings

The system provides subscribers the ability to review and update the personalized greeting that will be played from the ARU or displayed from their Personal Home Page. Each greeting is maintained separately and customized to the features available through each interface (ARU or Personal Home Page).

S. List Management

The system also provides the subscriber the ability to create and update lists, and create a voice annotation name for a list. Fax Broadcast list management capabilities are integrated with directlineMCI list management capabilities to provide a single database of lists. From the ARU interface, subscribers have the ability to review, update, add or delete members on a list. In addition, subscribers are able to delete or create lists. The ARU interface is able to use the lists to distribute voicemail and faxmail messages.

Access to distribution lists supports alphabetic list names such that lists are not limited to list code names. Entering of alphabetic characters through DTMF to the ARU for list names is consistent with the manner that alphabetic characters are entered through DTMF for Information Services. The List Management requirements are discussed in greater detail below.

In addition to providing message manipulation capabilities, the PC Client also provides an address book and access to lists. The user is able to make modifications to the address book and manage distribution lists for voice, fax, email and paging messages. In one embodiment, lists created or maintained through the PC Client interface are not integrated with lists created or maintained through the WWW Browser or ARU interfaces, but such integration can be implemented in an alternative embodiment. The subscriber is able to send a message to a distribution list from the PC Client. This requires a two-way interface between the PC Client and the List Management database whereby the PC Client can export a comma delimited or DBF formatted file to the database of lists.

The user is able to create and modify recipient address information through his interface PC software. The user is able to record multiple types of addresses in his address book, including 10 digit ANIs, voice mailbox ids, fax mailbox ids, paging numbers and email addresses (MCIMail and Internet). This information should is saved onto the PC. The address information retained on the PC Client is classified and sorted by recipient's name.

T. Global Message Handling

From the ARU interface, subscribers are able to define which message types can be accessed from the "universal inbox". The global message handling requirements are consistent with the requirements defined below.

X. INTERNET TELEPHONY AND RELATED SERVICES

The discussion thus far has provided an introduction to the Internet, and therefore Internet telephony, but Internet telephony encompasses quite a few areas of development. The following is a summary of Internet telephony, divided into six key areas. The first area consists of access to Internet telephony services. This area involves accessing and utilizing the Internet using such mechanisms as satellites, dialup services, T1, T3, DS3, OC3, and OC12 dedicated lines, SMDS networks, ISDN B-channels, ISDN D-channels, multirate ISDN, multiple B-channel bonded ISDN systems, Ethernet, token ring, FDDI GSM, LMDS, PCS, cellular networks, frame relay, and X.25.

The second area involves sharing Internet telephony. Multimedia data can utilize circuit-switched networks quite readily due to the high reliability and throughput potential. Issues include shared data, pushing URL data between parties, data conferencing, shared whiteboarding, resource collaboration, and ISDN user-user signaling.

The third area deals with routing Internet telephony. Issues include the time-of-day, the day-of-week, the day-of-month, and the day-of-year, in addition to geographic points of origin, network point of origin, and time zone of origin. Analysis of routing also includes user data, destination parties, telephone numbers, lines of origin, types of bearer service, presubscribed feature routing, ANI, and IP addresses. Also, VNET plans, range privileges, directory services, and Service Control Points (SCP)s fall into routing Internet telephony.

The fourth category deals with quality of service. Analysis must include switched networks, ISDN, dynamic modifications, Internet telephony, RSVP, and redundant network services. In addition, this category includes hybrid Internet/telephony switches, Ethernet features, ISDN features, analog local loops and public phones, and billing for reserved and/or utilized services.

The fifth category is composed of directory services, profiles, and notifications. Examples are distributed directories, finding-me and follow-me services, directory management of telephony, and user interfaces. Calling party authentication security is also included. Hierarchical and object-oriented profiles exist, along with directory service user profiles, network profile data structures, service profiles, and order entry profiles.

The sixth category consists of hybrid Internet telephony services. Areas include object directed messaging, Internet telephony messaging, Internet conferencing, Internet faxing, information routing (IMMR), voice communications, and intranets (such as those that exist within a company). Other services include operator services, management service, paging services, billing services, wireless integration, message broadcasts, monitoring and reporting services, card services, video-mail services, compression, authorization, authentication, encryption, telephony application builders, billing, and data collection services.

The seventh category consists of hybrid Internet media services, which include areas of collaborative work which involve a plurality of users. Users can collaborate on Audio, Data and Video. This area includes media conferencing within the Hybrid network. Then there is a broadly related area of Reservations mechanism, Operator-assisted conferencing, and the introduction of content into conferences. The Virtual locations of these conferences will assume importance in the future. The next-generation Chat Rooms will feature virtual conference spaces with simulated Office Environments.

A. System Environment for Internet Media

1. Hardware

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation 99 in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as a communication network (e.g., a data processing network) 81, printer 30 and a disk storage unit 20 to the bus 12, a user interface adapter 22 for connecting a keyboard 24, a mouse 26, a speaker 28, a microphone 32, and/or other user interface devices such as a touch screen (not shown) to the bus 12, and a display adapter 36 for connecting the bus 12 to a display device 38. The workstation typically has resident thereon an operating system such as the Microsoft Windows NT or Windows/95 Operating System (OS), the IBM OS/2 operating system, the MAC System/7 OS, or UNIX operating system. Those skilled in the art will appreciate that the present invention may also be implemented on platforms and operating systems other than those mentioned.

2. Object-Oriented Software Tools

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architectural mechanisms which allow software modules in different process spaces to utilize each other's capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "derived from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "derives from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., number of pistons in the engine, ignition sequences, lubrication, etc.). To access each of these functions in any piston engine object, a programmer would identify the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

- Objects can represent physical objects, such as automobiles in a traffic-flow simulation, electrical components in a circuit-design program, countries in an economics model, or aircraft in an air-traffic-control system.
- Objects can represent elements of the computer-user environment such as windows, menus or graphics objects.
- An object can represent an inventory, such as a personnel file or a table of the latitudes and longitudes of cities.
- An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

- Objects and their corresponding classes break down complex programming problems into many smaller, simpler problems.
- Encapsulation enforces data abstraction through the organization of data into small, independent objects that can communicate with each other. Encapsulation also protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.
- Libraries of reusable classes are useful in many situations, but they also have some limitations. For example:
- Complexity. In a complex system, the class hierarchies for related classes can become extremely confusing, with many dozens or even hundreds of classes.
- Flow of control. A program written with the aid of class libraries is still responsible for the flow of control (i.e., it must control the interactions among all the objects created from a particular library). The programmer has to decide which functions to call at what times for which kinds of objects.
- Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer must write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs with custom code being created over and over again for similar problems.

Thus, as explained above, a framework basically is a collection of cooperating classes that make up a reusable design solution for a given problem domain. It typically provides objects that define default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together. Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

B. Telephony Over The Internet

Voice over the Internet has become an inexpensive hobbyist commodity. Several firms are evolving this technology to include interworking with the PSTN. This presents both a challenge and an opportunity for established carriers like MCI and BT especially in the IDDD arena. This discussion explores how a carrier class service could be offered based on this evolving technology. Of particular interest are ways to permit interworking between the PSTN and the Internet using 1 plus dialing.

The introductory discussion considers the technical requirements to support PC to PC connectivity in a more robust manner than presently offered, in addition to the technical requirements for a PSTN to Internet voice gateway. Consideration is given to how calls can be placed from PCs to a PSTN destination and visa versa. The case of PSTN to PSTN communications, using the Internet as a long distance network is also explored.

It is shown how such services can be offered in a way that will complement existing PSTN services, offering lower prices for a lower quality of service. At issue in the longer term is the steady improvement in quality for Internet telephony and whether this will ultimately prove competitive with conventional voice services.

1. Introduction

In the mid-late 1970s, experiments in the transmission of voice over the Internet were conducted as part of an ongoing program of research sponsored by the U.S. Defense Advanced Research Projects Agency. In the mid-1980s, UNIX-based workstations were used to conduct regular audio/video conferencing sessions, in modest quantities, over the Internet. These experimental applications were extended in the late 1980s with larger scale, one-way multicasting of voice and video. In 1995 a small company, VocalTec (www.vocaltec.com), introduced an inexpensive software package that was capable of providing two way voice communications between multi-media PCs connected to the Internet. Thus was born a new generation of telephony over the Internet.

The first software package, and its immediate followers, provided a hobbyist tool. A meeting place based on a Internet Relay Chat "room" (IRC) was used to establish point to point connections between end stations for the voice transfer. This resulted in chance meetings, as is common in chat rooms, or a prearranged meeting, if the parties coordinated ahead of time, by email or other means.

a) How it Works

A user with a multi-media PC and an Internet connection can add the Internet Telephony capability by loading a small software package. In the case of VocalTec, the package makes a connection to the meeting place (IRC server), based on a modified chat server. At the IRC the user sees a list of all other users connected to the IRC.

The user calls another user by clicking on his name. The IRC responds by sending the IP address of the called party. For dial in users of the Internet, an IP address is assigned at dial in time, and consequently will change between dial in sessions. If the destination is not already engaged in a voice connection, its PC beeps a ring signal. The called user can answer the phone with a mouse click, and the calling party then begins sending traffic directly to the IP address of the called party. A multi-media microphone and speakers built into or attached to the PC are used as a speakerphone. The speaker's voice is digitized, compressed and packetized for transmission across the Internet. At the other end it is decompressed and converted to sound through the PC's speakers.

b) Implications

Telephony over the Internet offers users a low cost service, that is distance and border insensitive. For the current cost of Internet access (at low hourly rates, or in some cases unlimited usage for a flat fee) the caller can hold a voice conversation with another PC user connected to the Internet. The called party contributes to the cost of the conversation by paying for his Internet access. In the case that one or both ends are LAN connected to the Internet by leased lines the call is free of additional charges. All of this is in contrast to the cost of a conventional long distance, possibly international, call.

c) Quality of Service

The voice quality across the Internet is good, but not as good as typical telephone toll quality. In addition, there are significant delays experienced during the conversation. Trying to interrupt a speaker in such an environment is problematic. Delay and quality variations are as much a consequence of distance and available capacity as they are a function of compression, buffering and packetizing time.

Delays in the voice transmission are attributable to several factors. One of the biggest contributors to delays is the sound card used. The first sound cards were half duplex and were designed for playback of recorded audio. Long audio data buffers which helped ensure uninterrupted audio playback introduced real time delays. Sound card based delays are being reduced over time as full duplex cards designed for "speakerphone" applications are brought to the market.

Other delays are inherent in the access line speeds (typically 14.4–28.8 kbps for dial-up internet access) and in the packet forwarding delays in the Internet. Also there is delay inherent in filling a packet with digitized encoded audio. For example, to fill a packet with 90 ms of digitized audio, the application must wait at least 90 ms to receive the audio to digitize. Shorter packets reduce packet-filling delays, but increase overhead by increasing the packet header to packet payload data ratio. The increased overhead also increases the bandwidth demands for the application, so that an application which uses short packets may not be able to operate on a 14.4 kbps dial-up connection. LAN-based PCs suffer less delay, but everyone is subject to variable delays which can be annoying.

Lastly, there are delays inherent in audio codecs. Codec delays can vary from 5 to 30 ms for encoding or decoding. Despite the higher latencies associated with internet telephony, the price is right, and this form of voice communication appears to be gaining in popularity.

2. IP Phone as a Commercial Service

IP telephony technology is here whether the established carriers like it or not. Clearly the use of the Internet to provide international voice calls is a potential threat to the traditional International Direct Distance Dialing (IDDD) revenue stream. Although it may be several years before there is an appreciable revenue impact, it cannot be stopped, except perhaps within national borders on the basis of regulation. The best defense by the carriers is to offer the service themselves in an industrial strength fashion. To do this requires an improved call setup facility and an interface to the PSTN.

Facilitating PC to PC connections is useful for cases in which the voice conversation needs to be conducted during a simultaneous Internet data packet communication, and the parties don't have access to separate telephone facilities. Dial-up Internet subscribers with only one access circuit might find themselves in that position. Cost considerations may also play a role in dictating the use of PC to PC telephony. The larger use of this technology will occur when the Internet can be used in place of the long distance network to interconnect ordinary telephone hand sets. The number of multi-media Internet connected PCs in the world (estimated at 10 million) is minuscule compared to the number of subscriber lines worldwide (estimated at 660 million). This service is in the planning stages of several companies.

In the sections below we look at each of the end point combinations possible in a full Internet telephony service. The most important aspects relate to the PSTN to Internet gateway capabilities. Of particular interest is the possibility of providing the PSTN caller with one-step dialing to his called party. The one-step dialing solutions discussed below are in the context of the North American numbering plan. There are essentially four cases:

1. PC to PC;
2. PC to PSTN;
3. PSTN to PC; and
4. PSTN to PSTN.

The first case is addressed by today's IP Phone software. The second and third case are similar but not identical and each requires a gateway between the PSTN and the Internet. The last case uses the Internet as a long distance network for two PSTN telephones.

a) PC to PC (1) Directory Service

To facilitate PC to PC Internet Telephony a directory service is needed to find the IP address of the called party based on a name presented by the calling party Early internet telephony software utilized a modified internet chat server as a meeting place. More recently, internet telephony software is replacing the chat server with a directory service which will uniquely identify internet telephone users (perhaps by email address). To receive calls, customers would register with the directory service (for a fee, with recurring charges) and would make their location (IP address) known to the directory system whenever they connect to the Internet and want to be available for calls. The best way to accomplish automatic notification is to get agreement between the vendors of IP phone software on a protocol to notify the directory service whenever the software is started (automatic presence notification). It would also be desirable, as an option, to find a way to automatically invoke the IP phone software when the IP stack is started.

The directory service is envisioned as a distributed system, somewhat like the Internet Domain Name System, for scalability. This is not to imply, necessarily, the user@foo.com format for user identification.

Theoretically only the called parties need to be registered. If the calling party is not registered, then the charge for the call (if there is one) could be made to the called party (a collect call). Alternatively, we can insist that the caller also be registered in the directory and billed through that mechanism (this is desirable since we charge for the registration and avoid the complications that collect calls require). A charge for the call setup is billed, but not for the duration, over and above the usual Internet charges. Duration charges already apply to the dial up Internet user and Internet usage charges, both for dial up and dedicated usage, are probably not too far away.

Collect calls from a registered user may be required to meet market demand. A scheme for identifying such calls to the called party must be devised, along with a mechanism for the called party to accept or reject the collect call. The directory service will track the ability of the called software to support this feature by version number (or, alternatively, this could be a matter for online negotiation between the IP telephony software packages).

In the event of collect calls (assuming the caller is not registered), the caller could claim to be anyone she chooses. The directory service will force the caller to take on a temporary "assigned" identity (for the duration of the call) so the called party will know this is an unverified caller. Since IP addresses are not necessarily fixed, one cannot rely on them to identify parties.

(2) Interoperability

Nearly all IP phone software packages on the market today use different voice encoding and protocols to exchange the voice information. To facilitate useful connections the directory will store the type and version (and possibly options) of Internet phone software being used. To make this work effectively software vendors will report this information automatically to the directory service. This information will be used to determine interoperability when a call is placed. If the parties cannot interoperate, an appropriate message must be sent to the caller. As an alternative, or in addition to registration of software type, a negotiation protocol could be devised to determine interoperability on the fly, but all packages would have to "speak" it.

There is a question of whether translations between IP phone encoding can be performed with acceptable quality to the end user. Such a service could have a duration and or volume fee associated with it, which might limit the desirability of its use. Also, after a shake out period we expect only a few different schemes to exist and they will have interoperability, perhaps through an industry agreed lowest common denominator compression and signaling protocol. So far, all the IP phone software vendors we have contacted are in favor of an Esperanto that will permit interoperability. If this comes to pass the life span of the translation services will be short, probably making them not economically attractive.

We can help the major software vendors seek consensus on a "common" compression scheme and signaling protocol that will provide the needed interoperability. Once the major vendors support this method the others will follow. This is already happening, with the recent announcements from Intel, Microsoft, Netscape, and VocalTec that they will all support the H.323 standard in coming months. This can be automatically detected at call setup time. The directory service would keep track of which versions of which software can interoperate. To facilitate this functionality the automatic notification of presence should include the current software version. This way upgrades can be dynamically noted in the directory service. Some scheme must also be defined to allow registration information to be passed between software packages so if a user switches packages she is able to move the registration information to the new application. There is no reason to object if the user has two applications each with the same registration information. The directory service will know what the user is currently running as part of the automatic presence notification. This will cause a problem only if the user can run more than one IP phone package at the same time. If the market requires this ability the directory service could be adapted to deal with it. The problem could also be overcome through the use of negotiation methods between interacting IP phone software packages.

(3) Call Progress Signaling

If the user is reachable through the directory system, but is currently engaged in a voice connection, then a call waiting message (with caller ID, something which is not available in the PSTN call waiting service) is sent to the called party and a corresponding message is sent back to the caller.

If the user is reachable through the directory system, but is currently not running his voice software (IP address responds, but not the application—see below for verification that this is the party in question) then an appropriate message is returned to the caller. (As an option an email could be sent to the called party to alert him to the call attempt. An additional option would be to allow the caller to enter a voice message and attach the "voice mail" to the email. The service could also signal the caller to indicate: busy, unreachable, active but ignored call waiting, etc. Other notification methods to the called party can also be offered, such as FAX or paging. In each case, the notification can include the caller's identity, when known.) Once the directory system is distributed it will be necessary to query the other copies if contact cannot be made based on local information. This system provides the ability to have various forms of notification, and to control the parameters of those forms.

(4) Party Identification

A critical question is how will the directory service know that a called party is no longer where she was last reported (i.e., has "gone away"). The dialed in party might drop off the network in a variety of ways (dialed line dropped, PC hung, Terminal Server crashed) without the ability to explicitly inform the directory service of his change in status. Worse yet, the user might have left the network and another user with a voice application might be assigned the same IP address. (This is OK if the new caller is a registered user with automatic presence notification; the directory service could then detect the duplicate IP address. There may still be some timing problems between distributed parts of the directory service.) Therefore, some scheme must exist for the directory service to determine that the customer is still at the last announced location.

One approach to this is to implement a shared secret with the application, created at registration time. Whenever the directory system is contacted by the software (such as automatic presence notification or call initialization) or attempts to contact the called party at the last known location, it can send a challenge (like CHAP) to the application and verify the response. Such a scheme eliminates the need for announcing "I am no longer here", or wasteful keep alive messages. A customer can disconnect or turn off his IP phone application at any time without concern for notification to the directory system. If multiple IP phone applications are supported, by the directory service, each may do the challenge differently.

(5) Other Services

Encrypted internet telephone conversations will require a consensus from the software vendors to minimize the number of encryption setup mechanisms. This will be another interoperability resolution function for the directory service. The directory service can provide support for public key applications and can provide public key certificates issued by suitable certificate authorities.

The user can also specify on the directory service, that his PC be called (dial out) if she is not currently on-line. Charges for the dial out can be billed to the called party, just as would happen for call forwarding in POTS. The call detail record (CDR) for the dial out needs to be associated with the call detail of an entity in the IP Phone system (the called party). Note that this is different than the PC to PSTN case in that no translation of IP encoded voice to PCM is required, indeed the dial out will use TCP/IP over PPP. If the dial out fails an appropriate message is sent back.

The dial out could be domestic or international. It is unlikely that the international case will exist in practice due to the cost. However, there is nothing to preclude that case and it requires no additional functionality to perform.

b) PC to PSTN

The PSTN to Internet gateway must support translating PCM to multiple encoding schemes to interact with software from various vendors. Alternatively the common compression scheme could be used once it is implemented. Where possible, the best scheme, from a quality stand point, should be used. In many cases it will the software vendor's proprietary version. To accomplish that, telcos will need to license the technology from selected vendors. Some vendors will do the work needed to make their scheme work on telco platforms.

(1) Domestic PSTN Destination

The PC caller needs to be registered to place calls to the PSTN. The only exception to this would be if collect calls from the Internet are to be allowed. This will add complications with respect to billing. To call a PSTN destination the PC caller specifies a domestic E.164 address. The directory system maps that address to an Internet dial out unit based on the NPA-NXX. The expectation is that the dial out unit will be close to the destination and therefore will be a local call. One problem is how to handle the case where there is no "local" dial out unit. Another problem is what to do if the "local" out dial unit is full or otherwise not available.

Three approaches are possible. One approach is to offer the dial out service only when local calls are possible. A second approach is to send a message back to the caller to inform him that a long distance call must be placed on his behalf and request permission to incur these charges. A third approach is to place the call regardless and with no notification. Each of these cases requires a way to correlate the cost of the dial out call (PSTN CDR) with the billing record of the call originator (via the directory service).

The third approach will probably add to the customer support load and result in unhappy customers. The first approach is simple but restrictive. Most users are expected to be very cost conscious, and so might be satisfied with approach one. Approach two affords flexibility for the times the customer wants to proceed anyway, but it adds complexity to the operation. A possible compromise is to use approach one, which will reject the call for the reason that no local out dial is available. We could also add an attribute in the call request that means "I don't care if this ends up as a long distance call." In this case the caller who was rejected, but wants to place the call anyway makes a second call attempt with this attribute set. For customers with money to spare, all PSTN calls could be made with that attribute set.

Placing domestic PSTN calls supports the international calling requirement for Internet originated calls from Internet locations outside the U.S.

(2) International PSTN Destinations

Calls to an international PSTN station can be done in one of two ways. First, an international call could be placed from a domestic dial out station. This is not an attractive service since it saves no money over the customer making an international telephone call himself. Second, the Internet can be used to carry the call to the destination country and a "local" dial out can be made there. This situation is problematic for it must be agreed to by the carrier at the international destination. This case may be viable in one of two ways. Both ways require a partner at the international destination. One option would be to use a local carrier in the destination country as the partner. A second option would be to use an Internet service provider, or some other service provider connected to the Internet in the destination country.

c) PSTN to PC

This case appears to be of least interest, although it has some application and is presented here for completeness.

As noted in the PC to PSTN case the PSTN to Internet gateway will need to support translating PCM to multiple encoding schemes to interwork with software from various vendors. The directory service is required to identify the called PC. Automatic notification of presence is important to keep the called party reachable. The PSTN caller need not be registered with the directory service, for caller billing will be based on PSTN information. The caller has an E.164 address that is "constant" and can be used to return calls as well as to do billing. Presumably we can deliver the calling number to the called party as an indication of who is calling. The calling number will not always be available, for technological or privacy reasons. It must be possible to signal the PC software that this is a PSTN call and provide the E.164 number or indicate that it is unavailable.

The service can be based on charging the calling phone. This can be done as if the Internet were the long distance portion of the call. This is possible with a second dial tone. If an 800 or local dial service is used it is necessary for the caller to enter billing information. Alternatively a 900 service will allow PSTN caller-based billing. In either case the caller will need to specify the destination "phone number" after the billing information or after dialing the 900 number.

A major open issue is how the caller will specify the destination at the second dial tone. Only touch tones are available at best. To simplify entry we could assign an E.164 address to each directory entry. To avoid confusion with real phone numbers (the PSTN to PSTN case) the numbers need to be under directory control. Perhaps 700 numbers could be used, if there are enough available. Alternatively a special area code could be used. Spelling using the touch tone PAD is a less "user friendly" approach.

3. Phone Numbers in the Internet

The best approach is to have an area code assigned. Not only will this keep future options open, but it allows for simpler dialing from day one. Given a legitimate area code the PSTN caller can directly dial the E.164 address of the PC on the Internet. The telephone system will route the call to an MCI POP where it will be further routed to a PSTN-to-Internet voice gateway. The called number will be used to place the call to the PC, assuming it is on-line and reachable. This allows the PSTN caller to dial the Internet as if it were part of the PSTN. No second dial tone is required and no billing information needs to be entered. The call will be billed to the calling PSTN station, and charges will accrue only if the destination PC answers. Other carriers would be assigned unique area codes and directories should be kept compatible.

For domestically originated calls, all of the billing information needed to bill the caller is available and the intelligent network service functionality for third party or other billing methods is available via the second dial tone.

4. Other Internet Telephony Carriers

All this will get more complicated when number portability becomes required. It may be desirable to assign a country code to the Internet. Although this would make domestic dialing more complex (it appears that dialing anything other than 1 plus a ten digit number significantly reduces the use of the service) it may have some desirable benefits. In any event the assignment of an area code (or several) and the assignment of a country code are not mutually exclusive. The use of a country code would make dialing more geographically uniform.

5. International Access

It is unlikely that an international call will be made to the U.S. to enter the Internet in the U.S. If it happens, however, the system will have enough information to do the caller-based billing for this case without any additional functionality.

Another possibility is that we will (possibly in partnership) set up to handle incoming calls outside the U.S. and enter the Internet in that country to return to the U.S., or go anywhere else on the Internet. If the partner is a local carrier, then the partner will have the information needed for billing the PSTN caller.

a) Collect Calls

PSTN to PC collect calls require several steps. First, the call to the PSTN to Internet gateway must be collect. The collect call could then be signaled in the same way as PC to PC calls. It will be necessary to indicate that the caller is PSTN based and include the calling E.164 address if it is available.

b) PSTN to PSTN

The choice of voice compression and protocol scheme for passing voice between PSTN to Internet gateways is entirely under the carrier's control. Various service levels could be offered by varying the compression levels offered. Different charges could associated with each level. The caller would select a quality level; perhaps by dialing different 800 number services first.

(1) Domestic Destination

Neither the calling nor the called parties need be registered with the directory service to place calls across the Internet. The caller dials a PSTN-to-Internet gateway and receives a second dial tone and specifies, using touch tones, the billing information and the destination domestic E.164 address. 900 service could be used as well. The directory service (this could be separate system, but the directory service already has mapping functionality to handle the PC to PSTN dial out case) will be used to map the call to an out dialer to place a local call, if possible. Billing is to the caller and the call detail of the out dial call needs to be associated with the call detail of the inbound caller.

An immediate question is how to deal with the case where the nearest dial out unit to the number called results in a long distance or toll call, as discussed in PC to PSTN case. The situation here is different to the extent that notification must be by voice, and authorization to do a long distance, or toll call dial out must be made by touch tones. In the event of a long distance dial out the Internet could be skipped altogether and the call could go entirely over the PSTN. It is not clear that there is any cost savings by using the Internet in this case.

(2) One Step Dialing

The problem is that the destination PSTN number needs to be entered and, somehow, it needs to be indicated that the destination is to be reached via the Internet rather than the conventional long distance network.

This selection criteria can be conveyed according to the following alternatives:

1. Assign a new 10XXX number that is the carrier's Internet.
2. By subscription.

The first method allows the caller to select the Internet as the long distance carrier on a call by call basis. The second method makes the Internet the default long distance network. In the second case a customer can return to the carrier's conventional long distance network by dialing the carrier's 10XXX code.

The first method has the draw back that the caller must dial an extra five digits. Although many will do this to save money, requiring any extra dialing will reduce the total number of users of the service. The second method avoids the need to dial extra digits, but requires a commitment by the subscriber to predominately use the Internet as his long distance network. The choice is a lower price with a lower quality of service.

In the PSTN to PSTN case it is possible to consider offering several grades of service at varying prices. These grades will be based on a combination of the encoding scheme and the amount of compression (bandwidth) applied, and will offer lower cost for lower bandwidth utilization.

To signal the grade of service desired three 10XXX codes could be used. By subscription a particular grade would be the default and other service grades would be selected by a 10XXX code.

(3) Service Quality

The service quality will be measured by two major factors. First, sound quality, the ability to recognize the caller's voice, and second by the delays that are not present in the PSTN.

On the first point we can say that most of the offerings available today provide an acceptable level of caller recognition. Delay, however, is another story. PC to PC users experience delays of a half second to two seconds. As noted in the introduction much of the delay can be attributed to the sound cards and the low speed dial access. In the case of PSTN to PSTN service both these factors are removed.

The use of DSPs in the PSTN to Internet voice gateway will keep compression and protocol processing times very low. The access to the gateway will be at a full 64 kbps on the PSTN side and likely Ethernet on the Internet side. Gateways will typically be located close to the backbone so the router on the Ethernet will likely be connected to the backbone by a T3 line. This combination should provide a level of service with very low delays. Some buffering will be needed to mask the variable delays in the backbone, but that can likely be kept to under a quarter of a second in the domestic carrier backbone.

The main differentiation of quality of service will be voice recognition which will be related to bandwidth usage. If needed, the proposed IETF Resource reSerVation setup Protocol (RSVP) can be used to assure lower delay variation, but the need for the added complexity of RSVP is yet to be established. Also, questions remain regarding the scalability of RSVP for large-scale internet telephony.

(4) Costs

An open question is whether using the Internet for long distance voice in place of the switched telephone network is actually cheaper. Certainly it is priced that way today, but do current prices reflect real costs? Routers are certainly cheaper than telephone switches, and the 10 kbps (or so) that the IP voice software uses (essentially half duplex) is certainly less than the dedicated 128 kbps of a full duplex 64 kbps DSO. Despite these comparisons the question remains.

Although routers are much cheaper than telephone switches, they have much less capacity. Building large networks with small building blocks gets not only expensive, but quickly reaches points of diminishing returns. We already have seen the Internet backbone get overloaded with the current crop of high end routers, and they are yet to experience the significant traffic increase that a successful Internet Telephony offering would bring. We are saying two things here.

1. It is unlikely that the current Internet backbone can support a major traffic increase associated with a successful internet telephony service. We need to wait for the technology of routers to improve.
2. The second issue raised above was that of bandwidth usage. Indeed 10 kbps half duplex (a little more when both parties occasionally speak at the same time, but much less during periods of silence) is considerably less than 64 kbps full duplex dedicated capacity. Two points should be noted on this argument.

First, bandwidth is cheap, at least, when there is spare fiber in the ground. Once the last strand is used the next bit per second is very expensive. Second, on transoceanic routes, where bandwidth is much more expensive, we are already doing bandwidth compression of voice to 9.6 kbps. This is essentially equivalent to the 10 kbps of Internet Telephony.

Why is IP capacity priced so much cheaper than POTS? The answer is that the pricing difference is partly related to the subsidized history of the Internet. There is a process in motion today, by the Internet backbone providers, to address some of the cost issues of the Internet. The essence of the process is the recognition that the Internet requires a usage charge. Such charges already apply to some dial up users, but typically do not apply to users with dedicated connections.

If PC to PC Internet Telephony becomes popular, users will tend to keep their PCs connected for long periods. This will make them available to receive calls. It will also drive up hold times on dial in ports. This will have a significant effect on the capital and recurring costs of the Internet.

(5) Charges

A directory service must provide the functions described above and collect enough information to bill for the service. A charge can be made for directory service as well as for registration (a one time fee plus a monthly fee), call setup, but probably not for duration. Duration is already charged for the Internet dial in user and is somewhat bundled for the LAN-attached user. Usage charges for Internet service may be coming soon (as discussed above). Duration charges are possible for the incoming and outgoing PSTN segments.

Incoming PSTN calls may be charged as the long distance segment by using a special area code. Other direct billing options are 900 calls and calling card (or credit card) billing options (both require a second dial tone).

Requiring all callers (except incoming PSTN calls) to be registered with the directory service will eliminate the immediate need for most collect calling. This will probably not be a great impediment since most users of the IP Phone service will want to receive as well as originate calls, and registration is required for receiving calls. Callers could have unlisted entries which would be entries with an E.164 address, but no name. People given this E.164 address could call the party (from the PSTN or from a PC), as is the case in the present phone system.

Different compression levels can be used to provide different quality of voice reproduction and at the same time use more or less Internet transit resources. For PC to PC connections the software packages at both ends can negotiate the amount of bandwidth to be used. This negotiation might be facilitated through the directory service.

(6) Technical Issues

It will be necessary to coordinate with IP Phone vendors to implement the registration, automatic presence notification, and verification capabilities. We will also need to add the ability to communicate service requests. These will include authorization for collect calls specifying attributes such as "place a dial out call to the PSTN even if it is long distance" and others to be determined.

Registration with a directory is a required feature that will be illuminated below. Using the DNS model for the distributed directory service will likely facilitate this future requirement. Assignment of a pseudo E.164 number to directory entries will work best if a real area code is used. If each carrier has an area code it will make interworking between the directory systems much easier. An obvious complication will arise when number portability becomes required.

IP Telephony, in accordance with a preferred embodiment, is here and will stay for at least the near future. A combination of a carrier level service, based on this technology, and a growth in the capacity of routers may lead to the Internet carrying a very significant percentage of future long distance traffic.

The availability of higher speed Internet access from homes, such as cable modems, will make good quality consumer IP Telephony service more easily attained. The addition of video will further advance the desirability of the service.

More mundane, but of interest, is FAX services across the Internet. This is very similar to the voice service discussed above. Timing issues related to FAX protocols make this a more difficult offering in some ways.

Conferencing using digital bridges in the Internet make voice and video services even more attractive. This can be done by taking advantage of the multi-casting technology developed in the Internet world. With multi-casting the cost of providing such services will be reduced.

C. Internet Telephony Services

Figure 1B:
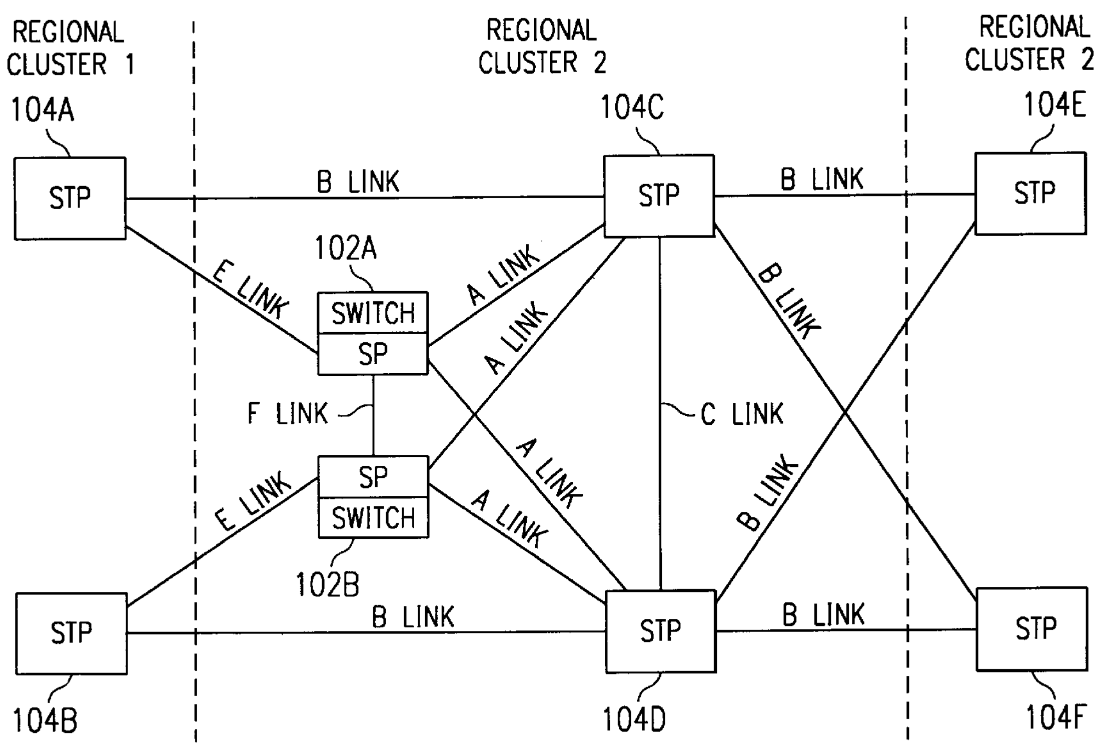
FIG. 1B is a block diagram illustrating the architecture of a typical Common Channel Signaling System #7 (SS7) network in accordance with a preferred embodiment.
Figure 1C:
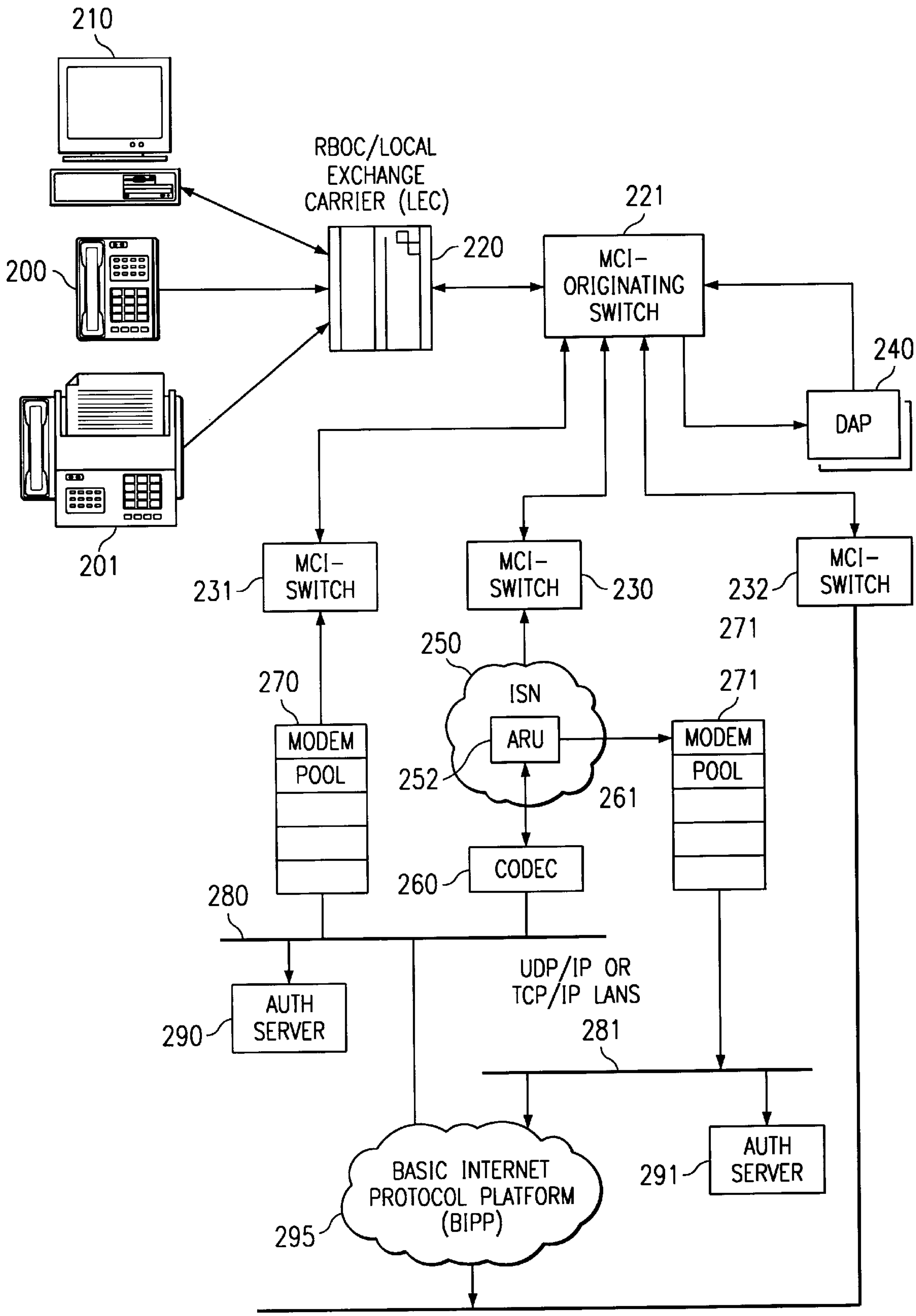
FIG. 1C is a block diagram of an internet telephony system in accordance with a preferred embodiment.

FIG. 1C is a block diagram of an internet telephony system in accordance with a preferred embodiment. Processing commences when telephone 200 is utilized to initiate a call by going off hook when a party dials a telephone number. Telephone 200 is typically connected via a conventional two-wire subscriber loop through which analog voice signals are conducted in both directions. One of ordinary skill in the art will readily realize that a phone can be connected via fiber, ISDN or other means without departing from the teaching of the invention. Alternatively, a person could dial a phone number from a computer 210, paging system, video conferencing system or other telephony capable devices. The call enters a Local Exchange Carrier (LEC) 220 which is another name for a Regional Bell Operating Company (RBOC) central switch. The call is terminated by a LEC at a leased Common Business Line (CBL) 230 of an interchange carrier such as MCI. As a result of the termination to the CBL, the MCI Switch 221 receives an offhook indication.

The Switch 221 responds to the offhook by initiating a DAL Hotline procedure request to the Network Control System (NCS) which is also referred to as a Data Access Point (DAP) 240. The switch 221 is simplified to show it operating on a single DS1 line, but it will be understood that switching among many lines actually occurs so that calls on thousands of individual subscriber lines can be routed through the switch on their way to ultimate destinations. The DAP 240 returns a routing response to the originating switch 221 which instructs the originating switch 221 to route the call to the destination switch 230 or 231. The routing of the call is performed by the DAP 240 translating the transaction information into a specific SWitch ID (SWID) and a specific Terminating Trunk Group (TTG) that corresponds to the route out of the MCI network necessary to arrive at the appropriate destination, in this case either switch 230 or 231. An alternative embodiment of the hybrid network access incorporates the internet access facility into a switch 232. This integrated solution allows the switch 232 to attach directly to the internet 295 which reduces the number of network ports necessary to connect the network to the internet 295. The DAP sends this response information to the originating switch 221 which routes the original call to the correct Terminating Switch 230 or 231. The terminating switch 230 or 231 then finds the correct Terminating Trunk Group (TTG) as indicated in the original DAP response and routes the call to the ISN 250 or directly to the modem pool 270 based on the routing information from the DAP 240. If the call were destined for the Intelligent Services Network (ISN) 250, the DAP 240 would instruct the switch to terminate at switch 230.

Based upon analysis of the dialed digits, the ISN routes the call to an Audio Response Unit (ARU) 252. The ARU 252 differentiates voice, fax, and modem calls. If the call is a from a modem, then the call is routed to a modem pool 271 for interfacing to an authentication server 291 to authenticate the user. If the call is authenticated, then the call is forwarded through the UDP/IP or TCP/IP LAN 281 or other media communication network to the Basic Internet Protocol Platform (BIPP) 295 for further processing and ultimate delivery to a computer or other media capable device.

If the call is voice, then the ARU prompts the caller for a card number and a terminating number. The card number is validated using a card validation database. Assuming the card number is valid, then if the terminating number is in the U.S. (domestic), then the call would be routed over the current MCI voice lines as it is today. If the terminating number is international, then the call is routed to a CODEC 260 that converts the voice to TCP/IP or UDP/IP and sends it via the LAN 280 to the internet 295. The call is routed through a gateway at the terminating end and ultimately to a phone or other telephony capable device.

Figure 1D:
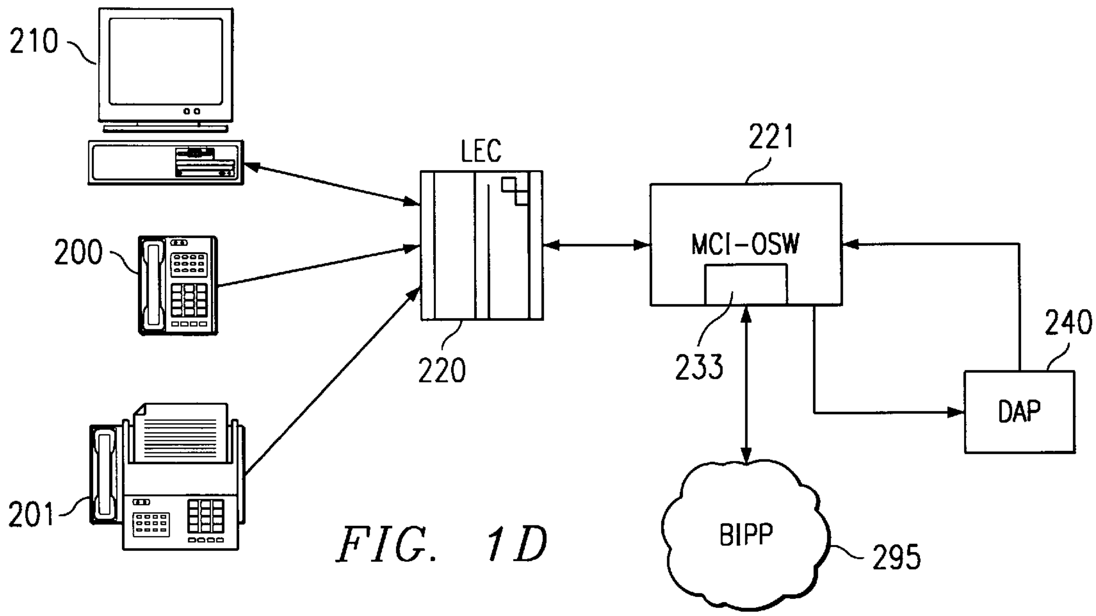
FIG. 1D is a block diagram of a hybrid switch in accordance with a preferred embodiment.

FIG. 1D is a block diagram of a hybrid switch in accordance with a preferred embodiment. Reference numbers have been conserved from FIG. 1C, and an additional block 233 has been added. Block 233 contains the connecting apparatus for attaching the switch directly to the internet or other communication means. The details of the connecting apparatus are presented in FIG. 1E. The principal difference between the hybrid switch of FIG. 1D and the switches presented in FIG. 1C is the capability of switch 221 attaching directly to the Internet 295.

Figure 1E:
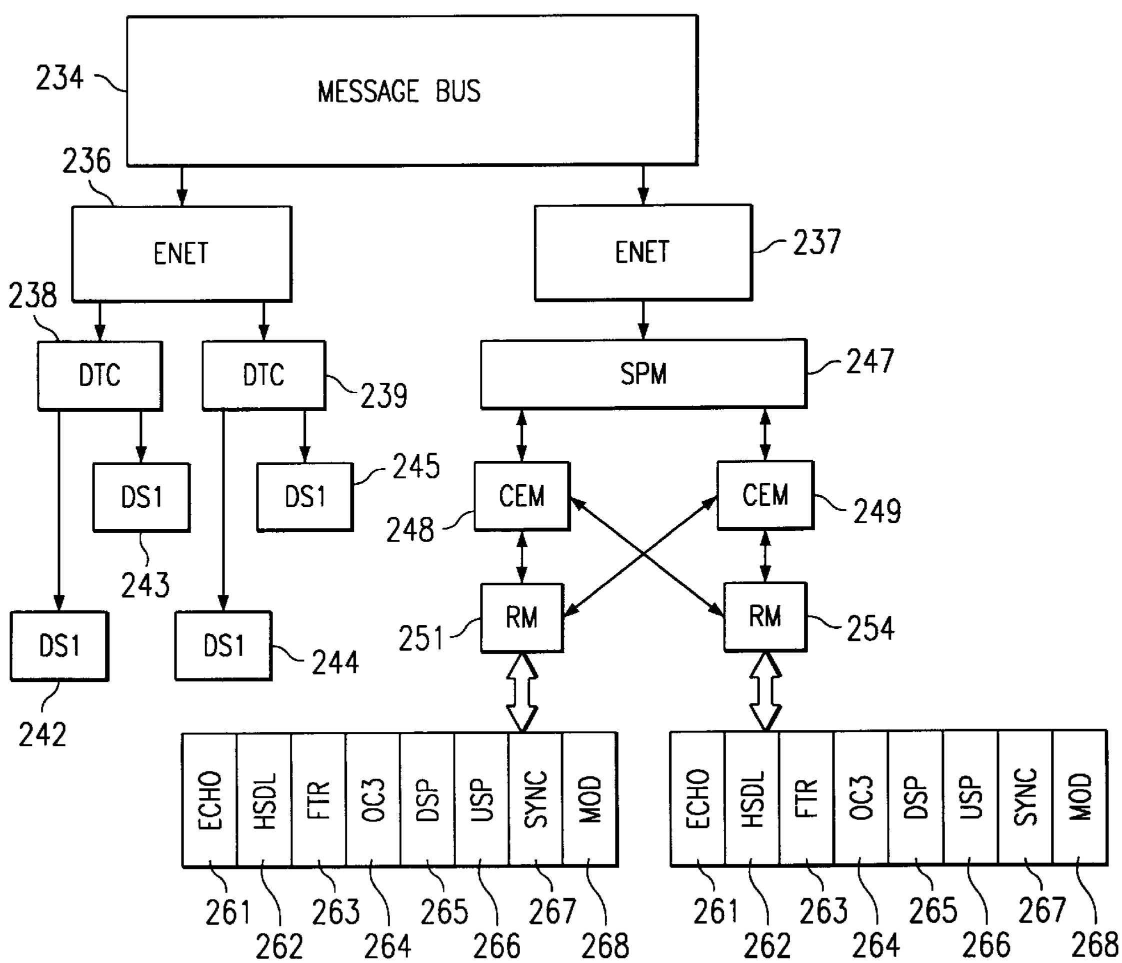
FIG. 1E is a block diagram of the connection of a hybrid switch in accordance with a preferred embodiment.

FIG. 1E is a block diagram of the connecting apparatus 233 illustrated in FIG. 1D in accordance with a preferred embodiment. A message bus 234 connects the switch fabric to an internal network 236 and 237. The internal network in turn receives input from a Dynamic Telephony Connection (DTC) 238 and 239 which in turn provides demuxing for signals originating from a plurality of DS1 lines 242, 243, 244 and 245. DS1 lines, described previously, refer to the conventional bit format on the T1 lines.

To accommodate the rapidly diversifying telephony/media environment, a preferred embodiment utilizes a separate switch connection for the other internal network 237. A Spectrum Peripheral Module (SPM) 247 is utilized to handle telephony/media signals received from a pooled switch matrix 248, 249, 251, 254, 261–268. The pooled switch matrix is managed by the SPM 247 through switch commands through control lines. The SPM 247 is in communication with the service provider's call processing system which determines which of the lines require which type of hybrid switch processing. For example, fax transmissions generate a tone which identifies the transmission as digital data rather than digitized voice. Upon detecting a digital data transmission, the call processing system directs the call circuitry to allow the particular input line to connect through the pooled switch matrix to a corresponding line with the appropriate processing characteristics. Thus, for example, an internet connection would be connected to a TCP/IP Modem line 268 to assure proper processing of the signal before it was passed on through the internal network 237 through the message bus 234 to the originating switch 221 of FIG. 1D.

Besides facilitating direct connection of a switch to the internet, the pooled switch matrix also increases the flexibility of the switch for accommodating current communication protocols and future communication protocols. Echo cancellation means 261 is efficiently architected into the switch in a manner which permits echo cancellation on an as-needed basis. A relatively small number of echo cancellers can effectively service a relatively large number of individual transmission lines. The pooled switch matrix can be configured to dynamically route either access-side transmissions or network-side transmissions to OC3 demux, DSP processing or other specialized processing emanating from either direction of the switch.

Moreover, a preferred embodiment as shown in FIG. 1E provides additional system efficiencies such as combining multiplexer stages in a port device on one side of a voice or data circuit switch to enable direct connection of a fiber-optic cable to the multiplexed output of the port device. Moreover, redundancy is architected into the switch through the alternate routes available over CEM 248/249 and RM 251/254 to alternate paths for attaching various communication ports.

When the switch 221 of FIG. 1D, is connected to the internet 295, the processing is provided as follows. A line from the internet 295 enters the switch through a modem port 268 and enters the pooled switch matrix where demux and other necessary operations are performed before the information is passed to the switch 221 through the internal network 237 and the message bus 234. The modules 261–268 provide plug and play capability for attaching peripherals from various communication disciplines.

Figure 1F:
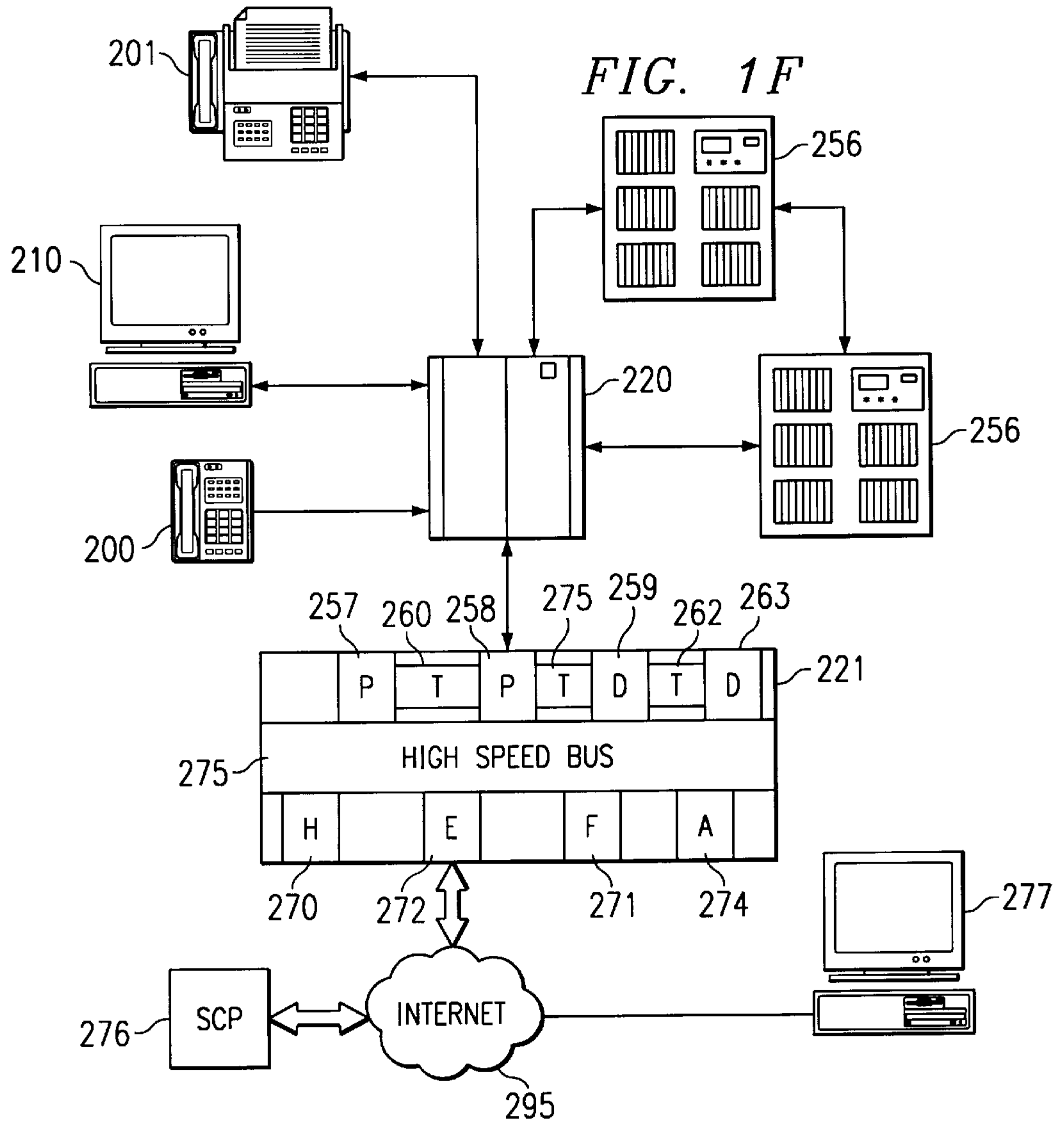
FIG. 1F is a block diagram of a hybrid (internet-telephony) switch in accordance with a preferred embodiment.

FIG. 1F is a block diagram of a hybrid (internet-telephony) switch in accordance with a preferred embodiment. The hybrid switch 221 switches circuits on a public switched telephone network (PSTN) 256 with TCP/IP or UDP/IP ports on an internet network 295. The hybrid switch 221 is composed of PSTN network interfaces (247, 260), high-speed Internet network interfaces (271, 272, 274), a set of Digital Signal Processor (DSP)s (259, 263), a time-division multiplexed bus 262, and a high-speed data bus 275.

The hybrid internet telephony switch 221 grows out of the marriage of router architectures with circuit switching architectures. A call arriving on the PSTN interface 257 is initiated using ISDN User Part (ISUP) signaling, with an Initial Address Message (IAM), containing a called party number and optional calling party number. The PSTN interface 257 transfers the IAM to the host processor 270. The host processor 270 examines the PSTN network interface of origin, the called party number and other IAM parameters, and selects an outgoing network interface for the call. The selection of the outgoing network interface is made on the basis of routing tables. The switch 221 may also query an external Service Control Point (SCP) 276 on the internet to request routing instructions. Routing instructions, whether derived locally on the switch 221 or derived from the SCP 276, may be defined in terms of a subnet to use to reach a particular destination.

Like a router, each of the network interfaces in the switch 221 is labeled with a subnet address. Internet Protocol (IP) addresses contain the subnet address on which the computer is located. PSTN addresses do not contain IP subnet addresses, so subnets are mapped to PSTN area codes and exchanges. The switch 221 selects routes to IP addresses and PSTN addresses by selecting an interface to a subnet which will take the packets closer to the destination subnet or local switch.

The call can egress the switch via another PSTN interface 258, or can egress the switch via a high-speed internet network interface 273. If the call egresses the switch via the PSTN interface 258, the call can egress as a standard PCM Audio call, or can egress the switch as a modem call carrying compressed digital audio.

In the case where the call egresses the switch 221 as a standard PCM audio call, the PCM audio is switched from PSTN Interface 257 to PSTN Interface 258 using the TDM bus 260. Similarly, PCM audio is switched from PSTN Interface 258 to PSTN Interface 257 using the TDM bus 260.

In the case where the call egresses the switch 221 as a modem call carrying compressed digital audio, the switch 221 can initiate an outbound call to a PSTN number through a PSTN interface 258, and attach across the TDM Bus 260 a DSP resource 259 acting as a modem. Once a modem session is established with the destination, the incoming PCM audio on PSTN interface 257 can be attached to a DSP Resource 263 acting as an audio codec to compress the audio. Example audio formats include ITU G.729 and G.723. The compressed audio is packetized into Point to Point Protocol (PPP) packets on the DSP 263, and transferred to DSP 259 for modem delivery over the PSTN Interface 258.

In the case where the call egresses the switch 221 on a high speed internet interface 272, the switch 221 attaches the PSTN Interface 257 to the DSP resource 263 acting as an audio codec to compress the PCM audio, and packetize the audio into UDP/IP packets for transmission over the Internet network. The UDP/IP packets are transferred from the DSP resource 263 over the high-speed data bus 275 to the high-speed internet network interface 272.

Figure 1G:
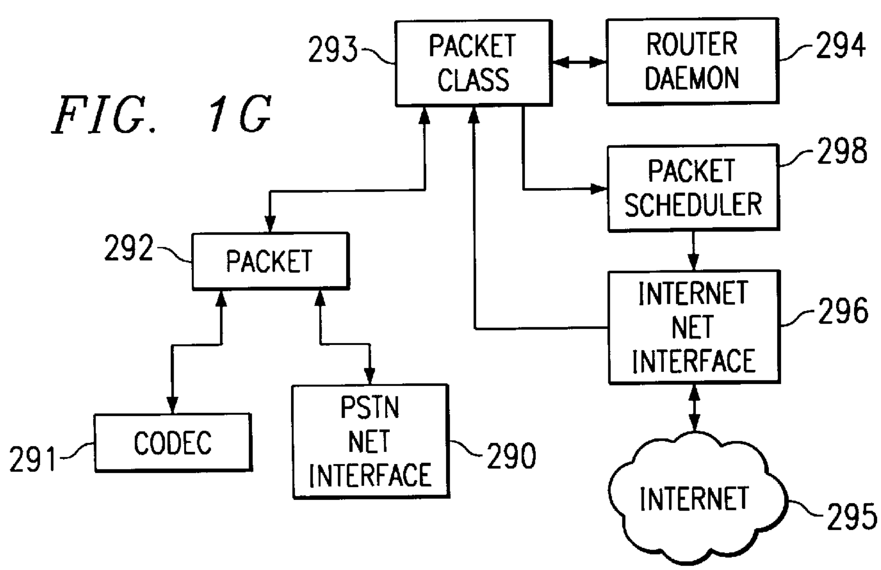
FIG. 1G is a block diagram showing the software processes involved in the hybrid internet telephony switch in accordance with a preferred embodiment.

FIG. 1G is a block diagram showing the software processes involved in the hybrid internet telephony switch 221. Packets received on the internet network interface 296 are transferred to the packet classifier 293. The packet classifier 293 determines whether the packet is a normal IP packet, or is part of a routing protocol (ARP, RARP, RIP, OSPF, BGP, CIDR) or management protocol (ICMP). Routing and management protocol packets are handed off to the Routing Daemon 294. The Routing Daemon 294 maintains routing tables for the use of the packet classifier 293 and packet scheduler 298. Packets classified as normal IP packets are transferred either to the packetizer/depacketizer 292 or to the packet scheduler 298. Packets to be converted to PCM audio are transferred to the packetizer/depacketizer 292. The packetizer/depacketizer takes packet contents and hands them to the codec 291, which converts compressed audio into PCM Audio, then transfers PCM audio to the PSTN Interface 290.

Normal IP packets to be sent to other internet devices are handed by the packet classifier 293 to the packet scheduler 298, which selects the outgoing network interface for the packet based on the routing tables. The packets are placed upon an outbound packet queue for the selected outgoing network interface, and the packets are transferred to the high speed network interface 296 for deliver across the internet 295.

D. Call Processing

This section describes how calls are processed in the context of the networks described above.

1. VNET Call Processing

Figure 10B:
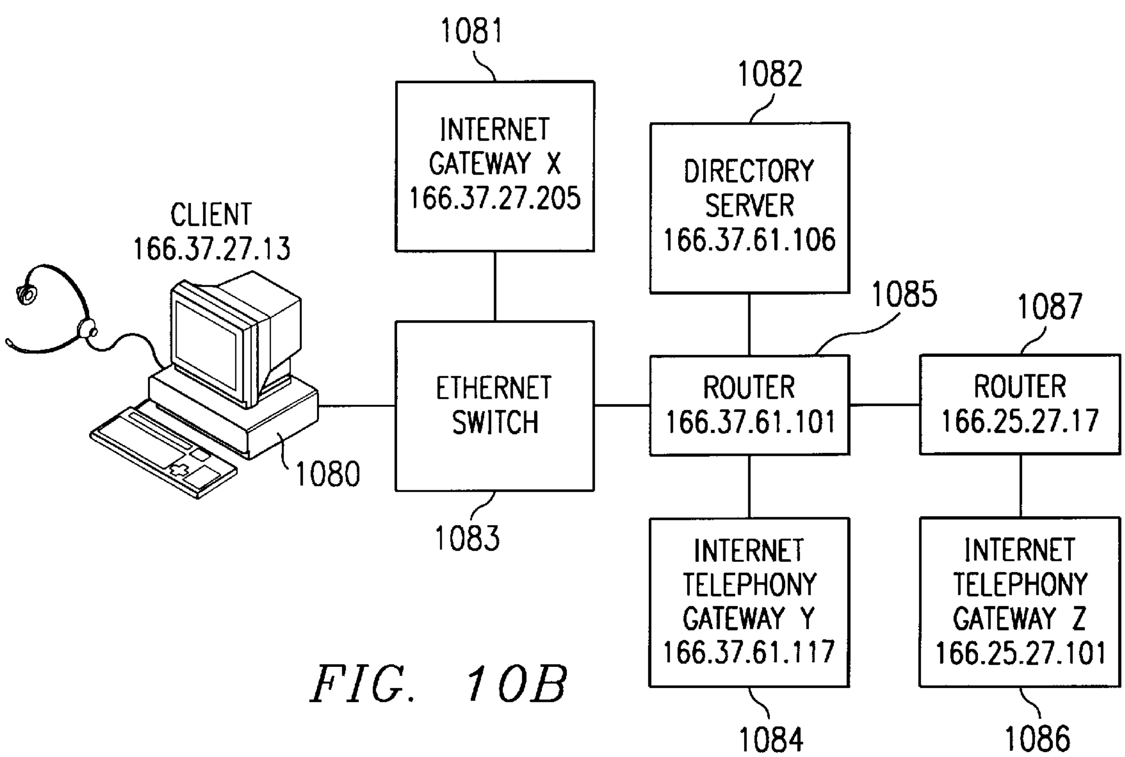
FIG. 10B illustrates an internet routing network in accordance with a preferred embodiment.
Figure 10A:
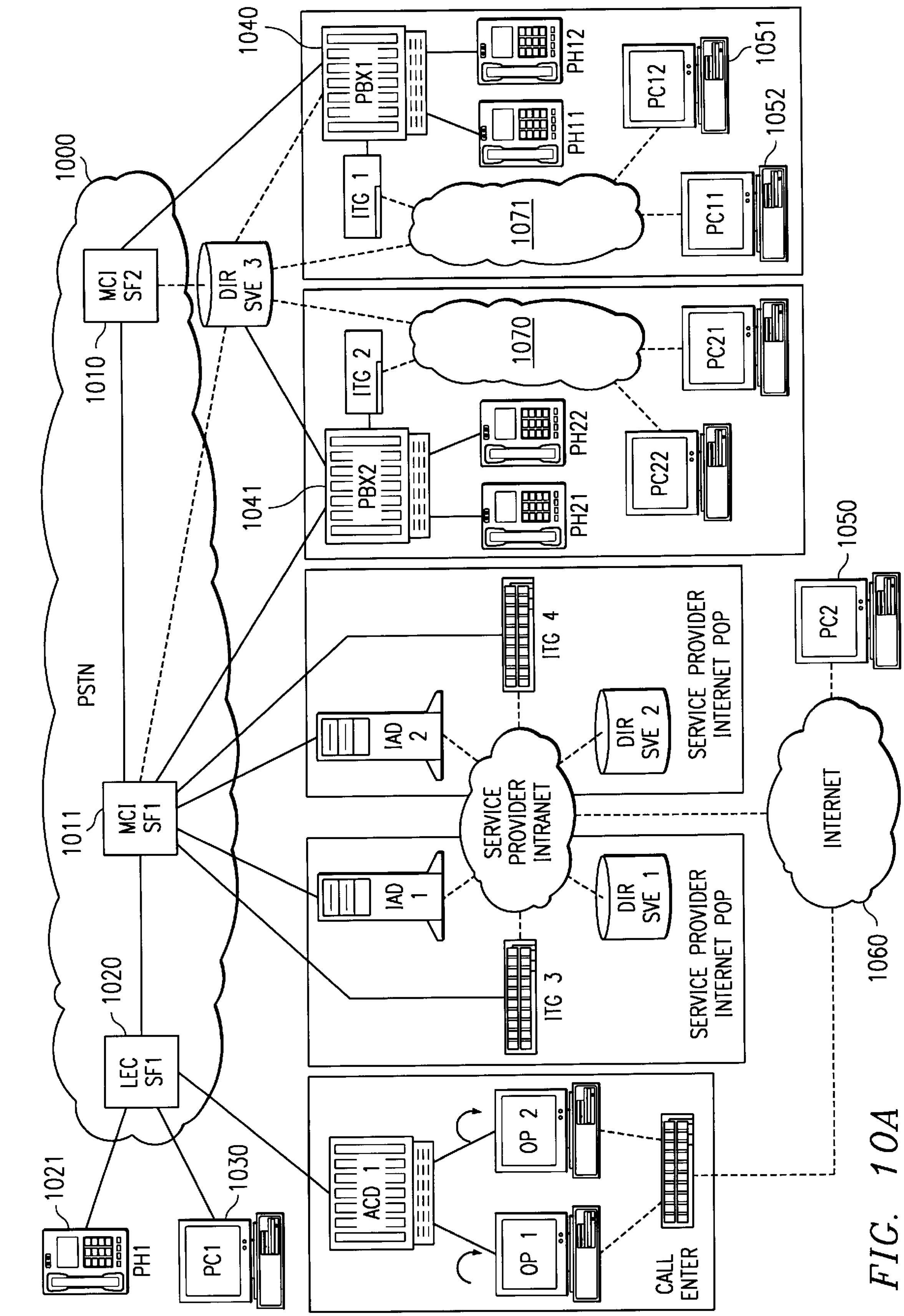
FIG. 10A illustrates a Public Switched Telephone Network (PSTN) 1000 comprising a Local Exchange Carrier (LEC) 1020 through which a calling party uses a telephone 1021 or computer 1030 to gain access to a switched network in accordance with a preferred embodiment.

FIG. 10A illustrates a Public Switched Network (PSTN) 1000 comprising a local exchange (LEC) 1020 through which a calling party uses a telephone 1021 or computer 1030 to gain access to a switched network including a plurality of MCI switches 1011, 1010. Directory services for routing telephone calls and other information is provided by the directory services 1031 which is shared between the Public Branch Exchanges 1041, 1040 and the PSTN.

This set of scenarios allows a subscriber to use either a PC, telephone or both to make or receive VNET calls. In this service, the subscriber may have the following equipment:

- A telephone that uses VNET routing is available today in MCI's network. In this case, VNET calls arriving in the MCI PSTN network using the subscriber's VNET number are routed with the assistance of the DAP just as they are routed today.
- A PC that is capable of Internet telephony. Calls are routed into and out of this PC with the assistance of an Internet or Intranet Directory Service that tracks the logged-in status and current IP address of the VNET user.
- A PC and a telephone is used to receive and make calls. In this case, a user profile will contain information that allows the DAP and Directory Service to make a determination whether to send an incoming call to the PC or to the telephone. For example, the user may always want calls to go to their PC when they are logged-in and to their phone at all other times. Or, they may want their calls to always go to their PC during normal work hours and to their phone at other times. This type of control over the decision to send incoming calls to a phone or PC may be controlled by the subscriber.

The following scenarios apply to this type of service.

1. A PC to PC call where the Directory service is queried for the location of the terminating PC:

PCs connected to an Intranet using the Intranet as transport.

Both PC's connected to a corporate Intranet via dial up access.

Both PCs on separate Intranets with the connection made through the Internet.

Both PCs on the Internet through a dial-up connection.

One PC directly connected to a corporate Intranet and the other PC using a dial-up connection to the Internet.

One PC using a dial up connection to a corporate Intranet and the other PC using a dial-up connection to the Internet.

Both PCs on separate Intranets with the connection made through the PSTN.

One or both PCs connected to a corporate Intranet using dial-up access.

One or both of the PCs connected to an Internet Service Provider.

One or both of the ITGs as an in-network element.

2. A PC to phone call where a directory service is queried to determine that the terminating VNET is a phone. The PC then contacts an Internet Telephony Gateway to place a call to the terminating phone.

PC on an intranet using a private ITG connected to the PSTN with the ITG as an out of network element. The destination phone is connected to a PBX.

The PC may also be using a public ITG that must be access through the Internet.

The PC may be connected to the corporate Intranet using dial-up access.

PC on an intranet using a private ITG connected to the PSTN with the ITG as an in-network element. The destination phone is connected to a PBX.

The PC may also be using a public ITG that must be accessed through the Internet.

The PC may be connected to the corporate Intranet using dial-up access.

PC on an intranet using a private ITG connected to the PSTN with the ITG as an in-network element. The destination phone is connected to the PSTN.

The PC may also be using a public ITG that must be accessed through the Internet.

The PC may be connected to the corporate Intranet using dial-up access.

The ITG may be an in-network element.

PC on an intranet using a private ITG connected to a PBX with the traffic carried over the Intranet.

PC is at a different site than the destination phone with the traffic carried over the Internet or intranet.

The PC may be using a dial-up connection to the corporate Intranet.

3. A phone to PC call where the DAP or PBX triggers out to the Internet Directory Service to identify the terminating IP address and ITG for routing the call. The call is then routed through the PSTN to an ITG and a connection is made from the ITG to the destination PC.

Possible Variations:

Same variations as the PC to phone.

4. A Phone to Phone call where the DAP or PBX must query the Directory Service to determine whether the call should be terminated to the subscriber's phone or PC.

Possible Variations:

Both Phones are on a PBX;

One phone is on a PBX and the other phone is on the PSTN; and

Both phones are on the PSTN.

For each of these variations, the DAP and Directory Service may be a single entity or they may be separate entities. Also, the directory service may be a private service or it may be a shared service. Each of the scenarios will be discussed below with reference to a call flow description in accordance with a preferred embodiment. A description of the block elements associated with each of the call flow diagrams is presented below to assist in understanding the embodiments.

2. Descriptions of Block Elements

| Element | Description |
|---|---|
| Ph1 | Traditional analog phone connected to a Local Exchange Carrier. For the purposes of these VNET scenarios, the phone is capable of making VNET calls, local calls or DDD calls. In some scenarios the VNET access may be done through<br>• The customer dials a 700 number with the last seven digits being the destination VNET number for the call. The LEC will know that the phone is picked to MCI and route the call to the MCI switch. The MCI switch will strip off the "700", perform and ANI lookup to identify the customer ID and perform VNET routing using the VNET number and customer ID.<br>• The customer dials an 800 number and is prompted to enter their Social Security number (or other unique id) and a VNET number. The switch passes this information to the DAP which does the VNET translation. |
| PC1<br>PC2 | Personal computer that has the capability to dial in to an Internet service provider or a corporate intranet for the purpose of making or receiving Internet telephony calls. The following access methods might be used for this PC<br>Internet service provider |

-continued

| Element | Description |
| --- | --- |
| | • The PC dials an 800 number (or any other dial plan) associated with the service provider and is routed via normal routing to the modem bank for that provider. The user of the PC then follows normal log-on procedures to connect to the Internet.<br>Corporate Intranet<br>• The PC dials an 800 number (or any other dial plan) associated with the corporate Intranet and is routed via normal routing to the modem bank for that Intranet. The user of the PC then follows normal log-on procedures to connect to the Intranet. |
| LEC SF1 | Switching fabric for a local exchange carrier. This fabric provides the connection between Ph1/PC1/PC2 and MCI's telephone network. It also provides local access to customer PBXs. |
| MCI SF1<br>MCI SF2 | Switching fabric for MCI (or for the purpose of patenting, any telephony service provider). These SFs are capable of performing traditional switching capabilities for MCI's network. They are able to make use of advanced routing capabilities such as those found in MCI's NCS (Network Control System). |
| NCS | The NCS provides enhanced routing services for MCI. Some of the products that are supported on this platform are:<br>800, EVS, Universal Freephone, Plus Freephone, Inbound International, SAC(ISAC) Codes, Paid 800, 8XX/Vnet Meet Me Conference Call, 900, 700, PCS, Vnet, Remote Access to Vnet, Vnet Phone Home, CVNS, Vnet Card, MCI Card (950 Cards), Credit Card and GETS Card.<br>In support of the existing VNET services, the DAP provides private dialing plan capabilities to Vnet customers to give them a virtual private network. The DAP supports digit translation, origination screening, supplemental code screening, 800 remote access, and some special features such as network call redirect for this service.<br>To support the call scenarios in this document, the NCS also has the capability to made a data query to directory services in order to route calls to PCs. |
| Dir Svc 1<br>Dir Svc 2 | Internet Directory Services. The directory service performs:<br>• Call routing - As calls are made to subscribers using Internet telephony services from MCI, the directory service must be queried to determine where the call should terminate. This may be done based upon factors such as<br>the logged-in status of the subscriber,<br>service subscriptions identifying the subscriber as a PC or phone only user<br>preferred routing choices such as "route to my PC always if I am logged in", or "route to my PC from 8–5 on weekdays, phone all other times", etc.<br>• Customer profile management - The directory service must maintain a profile for each subscriber to be able to match VNET numbers to the service subscription and current state of subscribers.<br>• Service authorization - As subscribers connect their PCs to an IP telephony service, they must be authorized for use of the service and may be given security tokens or encryption keys to ensure access to the service. This authorization responsibility might also place restrictions upon the types of service a user might be able to access, or introduce range privileges restricting the ability of the subscriber to place certain types of calls. |
| ITG 1<br>ITG 2 | Internet Telephony Gateway - The Internet Telephony Gateway provides a path through which voice calls made be bridged between an IP network and a traditional telephone network.<br>To make voice calls from an IP network to the PSTN, a PC software package is used to establish a connection with the ITG and request that the ITG dial out on the PSTN on behalf of the PC user. Once the ITG makes the connection through the voice network to the destination number, the ITG provides services to convert the IP packetized voice from the PC to voice over the PSTN. Similarly, the ITG will take the voice from the PSTN and convert it to IP packetized voice for the PC.<br>To make voice calls from the PSTN to the IP network, a call will be routed to the ITG via PSTN routing mechanisms. Once the call arrives, the ITG identifies the IP address for the destination of the call, and establishes an IP telephony session with that destination. Once the connection has been established, the ITG provides conversion services between IP packetized voice and PCM voice. |
| ITG 3<br>ITG 4 | These ITGs act in a similar capacity as the ITGs connected to the PSTN, but these ITGs also provide a connection between the corporate Intranet and the PBX. |
| IAD 1<br>IAD 2 | The Internet access device provides general dial-up Internet access from a user's PC to the Internet. This method of connecting to the |

-continued

| Element | Description |
|---|---|
| | Internet may be used for Internet telephony, but it may also be simply used for Internet access. When this device is used for Internet telephony, it behaves differently than the ITG. Although the IAD is connected to the PSTN, the information traveling over that interface is not PCM voice, it is IP data packets. In the case of telephony over the IAD, the IP data packets happen to be voice packets, but the IAD has no visibility into those packets and cannot distinguish a voice packet from a data packet. The IAD can be thought of as a modem pool that provides access to the Internet. |
| PBX 1<br>PBX 2 | Private Brach Exchange - This is customer premise equipment that provides connection between phones that are geographically co-located. The PBX also provides a method from those phones to make outgoing calls from the site onto he PSTN. Most PBXs have connections to the LEC for local calls, and a DAL connection to another service provider for VNET type calls.<br>These PBXs also show a connection to a Directory Service for assistance with call routing. This capability does not exist in today's PBXs, but in the VNET call flows for this document, a possible interaction between the PBX and the Directory Service is shown.<br>These PBXs also show a connection to an ITG. These ITGs provide the bridging service between a customer's Intranet and the traditional voice capabilities of the PBX. |
| Ph11<br>Ph12<br>Ph21<br>Ph22 | These are traditional PBX connected phones. |
| PC11<br>PC12<br>PC21<br>PC22 | These are customer premises PCs that are connected to customer Intranets. For the purposes of these call flows, the PCs have Internet Telephony software that allow the user to make or receive calls. |

E. Re-usable Call Flow Blocks

1. VNET PC connects to a corporate intranet and logs in to a directory service

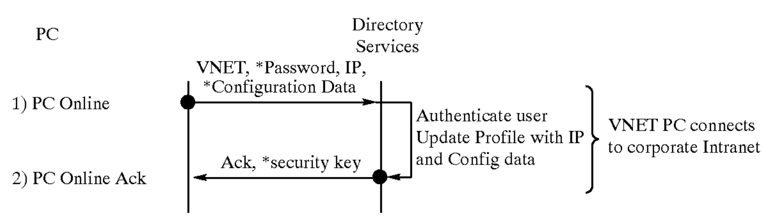

*Optional data depending upon implementation

1. The user for a PC connects their computer to an IP network, turns on the computer and starts an IP telephony software package. The software package sends a message to a directory service to register the computer as "on-line" and available to receive calls. This on-line registration message would most likely be sent to the directory service in an encrypted format for security. The encryption would be based upon an common key shared between the PC and the directory service. This message contains the following information:
   - Some sort of identification of the computer or virtual private network number that may be used to address this computer. In this VNET scenario, this is the VNET number assigned to the individual using this PC. This information will be used to identify the customer profile associated with this user. It may also be some identification such as name, employee id, or any unique ID which the directory service can associate with a VNET customer profile.
   - A password or some other mechanism for authenticating the user identified by the VNET number.
   - The IP address identifying the port that is being used to connect this computer to the network. This address will be used by other IP telephony software packages to establish a connection to this computer.
   - The message may contain additional information about the specifics of the software package or PC being used for IP telephony and the configuration/capabilities of the software or PC. As an example it might be important for a calling PC to know what type of compression algorithms are being used, or other capabilities of the software or hardware that might affect the ability of other users to connect to them or use special features during a connection.

The location of the directory service to receive this "on-line" message will be determined by the data distribution implementation for this customer. In some cases this may be a private database for a company or organization subscribing to a VNET service, in other cases it might be a national or worldwide database for all customers of a service provider (MCI). This location is configured in the telephony software package running on the PC.
2. When the directory service receives this message from the PC, it validates the user by using the VNET number to look up a user profile and comparing the password in the profile to the password received. Once the user has been validated, the directory service will update the profile entry associated with the VNET number (or other unique ID) to indicate that the user is "on-line" and is located at the specified IP address. The directory service will also update the profile with the configuration data sent during the login request. Upon successful update of the, the directory service sends a response back to the specified IP address indicating that the message was received and processed. This acknowledgment message may also contain some sort of security or encryption key to guarantee secure communication with the directory service when issuing additional commands. When the PC receives this response message it may choose to notify the user via a visual or audible indicator.

Variation for On-line registration

The call flow segment shown earlier in this section showed a PC on-line registration where the PC simply sends a password to the directory service to log-on. A variation for this log-on procedure would be the following call flow segment where the directory service presents a challenge and the PC user must respond to the challenge to complete the log-in sequence. This variation on the log-in sequence is not shown in any of the call flows contained within this document, but it could be used in any of them.

The IP address identifying the port that is being used to connect this computer to the network. This address will be used by other IP telephony software packages to establish a connection to this computer.

The message may contain additional information about the specifics of the software package or PC being used for IP telephony and the configuration/capabilities of the software or PC. As an example it might be important for a calling PC to know what type of compression algorithms are being used, or other capabilities of the software or hardware that might affect the ability of other users to connect to them or use special features during a connection.

The location of the directory service to receive this "on-line" message will be determined by the data distribution implementation for this customer. In some cases this may be a private database for a company or organization subscribing to a VNET service, in other cases it might be a national or worldwide database for all customers of a service provider (MCI). This location is configured in the telephony software package running on the PC.

2. In this scenario the PC did not provide a password in the initial registration message. This is because the directory service uses a challenge/response registration process. In this case, the directory service will use a shared key to calculate a challenge that will be presented to the PC.

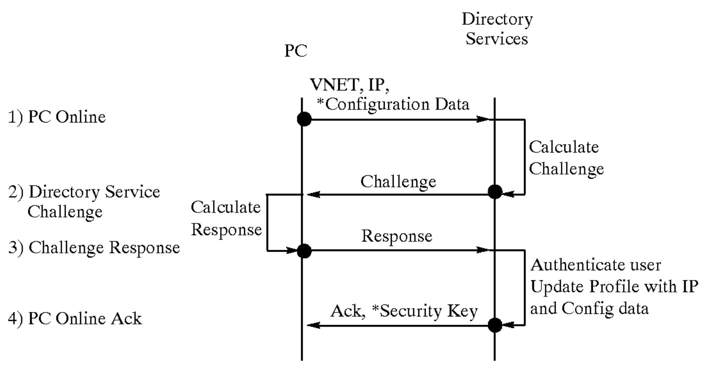

*Optional data depending upon implementation

1. The user for a PC connects their computer to an IP network, turns on the computer and starts an IP telephony software package. The software package sends a message to a directory service to register the computer as "on-line" and available to receive calls. This on-line registration message would most likely be sent to the directory service in an encrypted format for security. The encryption would be based upon an common key shared between the PC and the directory service. This message contains the following information:

Some sort of identification of the computer or virtual private network number that may be used to address this computer. In this VNET scenario, this is the VNET number assigned to the individual using this PC. This information will be used to identify the customer profile associated with this user. It may also be some identification such as name, employee id, or any unique ID which the directory service can associate with a VNET customer profile.

3. The PC receives this challenge and presents it to the user of the PC. The PC user uses the shared key to calculate a response to the challenge and send the response back to the directory service.

4. When the directory service receives this response from the PC, it validates the user. Once the user has been validated, the directory service will update the profile entry associated with the VNET number (or other unique ID) to indicate that the user is "on-line" and is located at the specified IP address. The directory service will also update the profile with the configuration data sent during the login request. Upon successful update of the, the directory service sends a response back to the specified IP address indicating that the message was received and processed. This acknowledgment message may also contain some sort of security or encryption key to guarantee secure communication with the directory service when issuing additional commands. When the PC receives this response message it may choose to notify the user via a visual or audible indicator.

2. VNET PC queries a directory service for a VNET translation

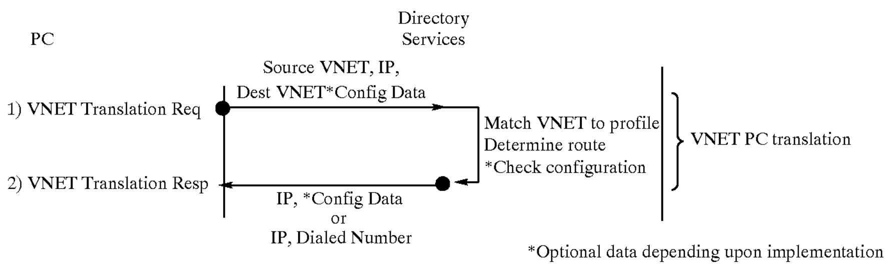

1. A PC uses an Internet telephony software package to attempt to connect to a VNET number. To establish this connection, the user of the PC dials the VNET number (or other unique ID such as name, employee ID, etc). Once the telephony software package has identified this call as a VNET type call, it will send a translation request to the directory service. At a minimum, this translation request will contain the following information:

The IP address of the computer sending this request

The VNET number of the PC sending this request.

The Vnet number (or other ID) of the computer to be dialed.

A requested configuration for the connection. For example, the calling PC might want to use white-board capabilities within the telephony software package and may wish to verify this capability on the destination PC before establishing a connection. If the VNET number does not translate to a PC, this configuration information may not provide any benefit, but at the time of sending this request the user does not know whether the VNET number will translate to a PC or phone.

2. When the directory service receives this message, it uses the Vnet number (or other ID) to determine if the user associated with that VNET number (or other ID) is "on-line" and to identify the IP address of the location where the computer may be contacted. This directory service may also contain and make use of features like time of day routing, day of week routing, ANI screening, etc.

If the VNET number translates into a PC that is "on-line", the directory service will compare the configuration information in this request to the configuration information available in the profile for the destination PC. When the directory service returns the response to the translation request from the originating PC, the response will include The registered "on-line" IP address of the destination PC. This is the IP address that the originating PC may use to contact the destination PC.

Configuration information indicating the capabilities of the destination PC and maybe some information about which capabilities are compatible between the origination and destination PC.

If the VNET number translates to a number that must be dialed through the PSTN, the response message to the PC will contain the following An IP address of an Internet Telephony gateway that may be used to get this call onto MCI's PSTN. The selection of this gateway may be based upon a number of selection algorithms. This association between the caller and the ITG to be used is made based upon information in the profile contained within the directory service.

A VNET number to be dialed by the ITG to contact the destination phone. In the case of this call flow this is the VNET number of the destination phone. This allows the call to use the existing VNET translation and routing mechanisms provided by the DAP.

If the VNET number translates to a phone which is reachable through a private ITG connected to the customer's PBX, the directory service will return the following.

The VNET number of an ITG gateway that is connected to the PBX serving the destination phone. This association between the destination phone the ITG connected to its serving PBX is made by the directory service.

The VNET number to be dialed by the ITG when it offers the call to the PBX. In most cases this will just be an extension number.

3. PC connects to an ITG

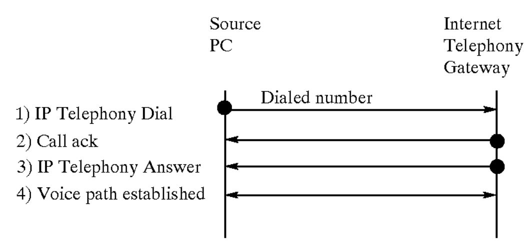

1. A PC uses its telephony software package to send a "connection" message to an ITG. This IP address is usually returned from the directory service in response to a VNET translation. The specific format and contents of this message is dependent upon the software sending the message or the ITG software to receive the message. This message may contain information identifying the user of the PC or it may contain information specifying the parameters associated with the requested connection.

2. The ITG responds to the connect message by responding to the message with an acknowledgment that a call has been received. This step of call setup may not be necessary for a PC calling an ITG, but it is shown here in an attempt to maintain a consistent call setup procedure that is independent of whether the PC is connecting to an ITG or to another PC. When connecting to a PC, this step of the procedure allows the calling PC to know that the destination PC is ringing.

3. The ITG accepts the call.

4. A voice path is established between the ITG and the PC.

4. ITG connects to a PC

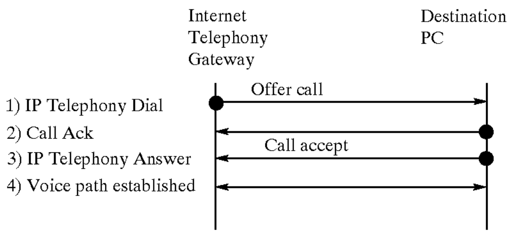

1. An ITG uses its telephony software to send a "connection" message to a PC. The ITG must know the IP address of the PC to which it is connecting. The specific format and contents of this message is dependent upon the ITG software sending the message or the PC software to receive the message. This message may contain information identifying this call as one being offered from an ITG, or it may contain information specifying the requested configuration for the call (i.e. voice only call).
2. The message from step 1 is received by the PC and the receipt of this message is acknowledged by sending a message back to the ITG indicating that the PC is offering the call to the user of the PC
3. The user of the PC answers to call and a message is sent back to the originating PC indicating that the call has been accepted.
4. A voice path is established between the ITG and the PC.

5. VNET PC to PC Call Flow Description

The user for PC12 1051 connects the computer to an Internet Protocol (IP) network 1071, turns on the computer and starts an IP telephony software protocol system. The system software transmits a message to a directory service 1031 to register the computer as "on-line" and available to receive calls. This message contains IP address identifying the connection that is being used to connect this computer to the network. This address may be used by other IP telephony software packages to establish a connection to this computer. The address comprises an identification of the computer or virtual private network number that may be used to address this computer 1051. In this VNET scenario, the address is a VNET number assigned to the individual using this PC. VNET refers to a virtual network in which a particular set of telephone numbers is supported as a private network of numbers that can exchange calls. Many corporations currently buy communication time on a trunk that is utilized as a private communication channel for placing and receiving inter-company calls. The address may also be some identification such as name, employee id, or any other unique ID.

The message may contain additional information regarding the specifics of the system software or the hardware configuration of PC11 1051 utilized for IP telephony. As an example, it is important for a calling PC to know what type of compression algorithms are supported and active in the current communication, or other capabilities of the software or hardware that might affect the ability of other users to connect or use special feature during a connection.

6. Determining best choice for Internet client selection of an Internet Telephony Gateway server on the Internet:

FIG. 10B illustrates an internet routing network in accordance with a preferred embodiment. If a client computer 1080 on the Internet needs to connect to an Internet Telephony Gateway 1084, the ideal choice for an Gateway to select can fall into two categories, depending on the needs of the client:

If the client 1080 needs to place a telephone call to a regular PSTN phone, and PSTN network usage is determined to be less expensive or higher quality than Internet network usage, it is the preferred choice to select a gateway that allows the client to access the PSTN network from a point "closest" to the point of internet access. This is often referred to as Head-End Hop-Off (HEHO), where the client hops off the internet at the "head end" or "near end" of the internet.

If the client 1080 needs to place a telephone call to a regular PSTN phone, and the PSTN network is determined to be more expensive than Internet network usage, it is the preferred choice to select a gateway that allows the client to access the PSTN from the Internet at a point closest to the destination telephone. This is often referred to as Tail-End Hop-Off (TEHO), where the client hops off the internet at the "tail end" or "far end" of the internet.

a) Head-End Hop-Off Methods (1) Client Ping Method

This method selects the best choice for a head-end hop-off internet telephony gateway by obtaining a list of candidate internet telephony gateway addresses, and pinging each to determine the best choice in terms of latency and number of router hops. The process is as follows:

Client Computer 1080 queries a directory service 1082 to obtain a list of candidate internet telephony gateways.

The directory service 1082 looks in a database of gateways and selects a list of gateways to offer the client as candidates. Criteria for selecting gateways as candidates can include last gateway selected.

matching 1, 2, or 3 octets in the IPv4 address.

last client access point, if known.

selection of at least one gateway from all major gateway sites, if practical.

The directory service 1082 returns a list of "n" candidate IP addresses to the client 1080 in a TCP/IP message.

The client 1080 simultaneously uses the IP ping to send an echo-type message to each candidate Internet Telephony Gateway, 1084, 1081, 1086. The "–r" option will be used with the ping command to obtain a trace route.

Based upon the ping results for each Internet Telephony Gateway, the client 1080 will rank order the ping results as follows:

If any Internet Telephony Gateways are accessible to the client 1080 without traveling through any intervening router as revealed by the ping trace route, they are ranked first.

The remaining Internet Telephony Gateways are ranked in order of Lowest latency of round-trip ping results.

Using the Client Ping Method with the Sample Network Topology above, the Client Computer 1080 queries the Directory Service 1082 for a list of Internet Telephony Gateways to ping. The Directory Service 1082 returns the list:

166.37.61.117

166.25.27.101

166.37.27.205

The Client Computer 1080 issues the following three commands simultaneously:

ping 166.37.61.117 –r 1 ping 166.25.27.101 –r 1 ping 166.37.27.205 –r 1

The results of the ping commands are as follows:

Pinging 166.37.61.117 with 32 bytes of data:

Reply from 166.37.61.117: bytes=32 time=3 ms TTL=30
Route: 166.37.61.101

Reply from 166.37.61.117: bytes=32 time=2 ms TTL=30
Route: 166.37.61.101

Reply from 166.37.61.117: bytes=32 time=2 ms TTL=31
Route: 166.37.61.101

Reply from 166.37.61.117: bytes=32 time=2 ms TTL=30
Route: 166.37.61.101

Pinging 166.25.27.101 with 32 bytes of data:

Reply from 166.25.27.101: bytes=32 time=14 ms TTL=30
Route: 166.37.61.101

Reply from 166.25.27.101: bytes=32 time=2 ms TTL=30
Route: 166.37.61.101

Reply from 166.25.27.101: bytes=32 time=3 ms TTL=31
Route: 166.37.61.101

Reply from 166.25.27.101: bytes=32 time=4 ms TTL=30
Route: 166.37.61.101

Pinging 166.37.27.205 with 32 bytes of data:

Reply from 166.37.27.205: bytes=32 time=1 ms TTL=126
Route: 166.37.27.205

Reply from 166.37.27.205: bytes=32 time=1 ms TTL=126
Route: 166.37.27.205

Reply from 166.37.27.205: bytes=32 time=1 ms TTL=126
Route: 166.37.27.205

Reply from 166.37.27.205: bytes=32 time=1 ms TTL=126
Route: 166.37.27.205

Since the route taken to 166.37.27.205 went through no routers (route and ping addresses are the same), this address is ranked first. The remaining Internet Telephony Gateway Addresses are ranked by order of averaged latency. The resulting preferential ranking of Internet Telephony Gateway addresses is 166.37.27.205

166.37.61.117

166.25.27.101

The first choice gateway is the gateway most likely to give high quality of service, since it is located on the same local area network. This gateway will be the first the client will attempt to use.

(2) Access Device Location Method

The method for identifying the most appropriate choice for an Internet Telephony Gateway utilizes a combination of the Client Ping Method detailed above, and the knowledge of the location from which the Client Computer 1080 accessed the Internet. This method may work well for clients accessing the Internet via a dial-up access device.

A client computer 1080 dials the Internet Access Device. The Access Device answers the call and plays modem tone. Then, the client computer and the access device establishes a PPP session. The user on the Client Computer is authenticated (username/password prompt, validated by an authentication server). Once the user passes authentication, the Access Device can automatically update the User Profile in the Directory Service for the user who was authenticated, depositing the following information "User Name" "Account Code" "online timestamp"
"Access Device Site Code"

Later, when the Client Computer requires access through an Internet Telephony Gateway, it queries the Directory Service 1082 to determine the best choice of Internet Telephony Gateway. If an Access Device Site Code is found in the User's Profile on the Directory Service, the Directory Service 1082 selects the Internet Telephony Gateway 1084, 1081 and 1086 at the same site code, and returns the IP address to the Client Computer 1080. If an Internet Telephony Gateway 1084, 1081 and 1086 is unavailable at the same site as the Access Device Site Code, then the next best choice is selected according to a network topology map kept on the directory server.

If no Access Device Site Code is found on the directory server 1082, then the client 1080 has accessed the network through a device which cannot update the directory server 1082. If this is the case, the Client Ping Method described above is used to locate the best alternative internet telephony gateway 1084.

(3) User Profile Method

Another method for selection of an Internet Telephony Gateway 1084, 1081 and 1086 is to embed the information needed to select a gateway in the user profile as stored on a directory server. To use this method, the user must execute an internet telephony software package on the client computer. The first time the package is executed, registration information is gathered from the user, including name, email address, IP Address (for fixed location computers), site code, account code, usual internet access point, and other relevant information. Once this information is entered by the user, the software package deposits the information on a directory server, within the user's profile.

Whenever the Internet Telephony software package is started by the user, the IP address of the user is automatically updated at the directory service. This is known as automated presence notification. Later, when the user needs an Internet Telephony Gateway service, the user queries the directory service for an Internet Telephony Gateway to use. The directory service knows the IP address of the user and the user's usual site and access point into the network. The directory service can use this information, plus the network map of all Internet Telephony Gateways 1084, 1081 and 1086, to select the best Internet Telephony Gateway for the client computer to use.

(4) Gateway Ping Method

The last method selects the best choice for a head-end hop-off internet telephony gateway by obtaining a list of candidate internet telephony gateway addresses, and pinging each to determine the best choice in terms of latency and number of router hops. The process is as follows:

Client Computer queries a directory service to obtain a best-choice internet telephony gateway.

The directory service looks in a database of gateways and selects a list of candidate gateways. Criteria for selecting gateways as candidates can include
- last gateway selected.
- matching 1, 2, or 3 octets in the IPv4 address.
- last client access point, if known.
- selection of at least one gateway from all major gateway sites, if practical.

The directory sends a message to each candidate gateway, instructing each candidate gateway to ping the client computer's IP Address.

Each candidate gateway simultaneously uses the IP ping to send an echo-type message to the client computer. The "–r" option will be used with the ping command to obtain a trace route. The ping results are returned from each candidate gateway to the directory service.

Based upon the ping results for each Internet Telephony Gateway, the directory service will rank order the ping results as follows:

If any Internet Telephony Gateways are accessible to the client without traveling through any intervening router as revealed by the ping trace route, they are ranked first.

The remaining Internet Telephony Gateways are ranked in order of lowest averaged latency of round-trip ping results.

The Client Ping Method and Gateway Ping Method may use the traceroute program as an alternative to the ping program in determining best choice for a head-end hop-off gateway.

b) Tail-End Hop-Off Methods

Tail-End Hop-Off entails selecting a gateway as an egress point from the internet where the egress point is closest to the terminating PSTN location as possible. This is usually desired to avoid higher PSTN calling rates. The internet can be used to bring the packetized voice to the local calling area of the destination telephone number, where lower local rates can be paid to carry the call on the PSTN.

(1) Gateway Registration

One method for Tail-End Hop-Off service is to have Internet Telephony Gateways 1084, 1081 and 1086 register with a directory service. Each Internet Telephony Gateway will have a profile in the directory service which lists the calling areas it serves. These can be listed in terms of Country Code, Area Code, Exchange, City Code, Line Code, Wireless Cell, LATA, or any other method which can be used to subset a numbering plan. The gateway, upon startup, sends a TCP/IP registration message to the Directory Service 1082 to list the areas it serves.

When a Client Computer wishes to use a TEHO service, it queries the directory service for an Internet Telephony Gateway 1084 serving the desired destination phone number. The directory service 1082 looks for a qualifying Internet Telephony Gateway, and if it finds one, returns the IP address of the gateway to use. Load-balancing algorithms can be used to balance traffic across multiple Internet Telephony Gateways 1084, 1081 and 1086 serving the same destination phone number.

If no Internet Telephony Gateways 1084, 1081 and 1086 specifically serve the calling area of the given destination telephone number, the directory service 1082 returns an error TCP/IP message to the Client Computer 1080. The Client 1080 then has the option of querying the Directory Service for any Internet Telephony Gateway, not just gateways serving a particular destination telephone number.

As a refinement of this Gateway Registration scheme, Gateways can register calling rates provided for all calling areas. For example, if no gateway is available in Seattle, it may be less expensive to call Seattle from the gateway in Los Angeles, than to call Seattle from the gateway in Portland. The rates registered in the directory service can enable the directory service the lowest cost gateway to use for any particular call.

7. Vnet Call Processing

FIG. 11 is a callflow diagram in accordance with a preferred embodiment. Processing commences at 1101 where the location of the directory service to receive this "on-line" message will be determined by the data distribution implementation for this customer. In some cases this may be a private database for a company or organization subscribing to a VNET service, in other cases it might be a national or worldwide database for all customers of a service provider (MCI). When the directory service receives this message from PC12 1051, it will update a profile entry associated with the unique ID to indicate that the user is "on-line" and is located at the specified IP address. Then, at 1102, after successful update of the profile associated with the ID, the directory service sends a response (ACK) back to the specified IP address indicating that the message was received and processed. When the computer (PC12) receives this response message it may choose to notify the user via a visual or audible indicator.

At 1103, a user of PC11 1052 connects a computer to an IP network, turns on the computer and starts telephony system software. The registration process for this computer follows the same procedures as those for PC12 1051. In this scenario it is assumed that the directory service receiving this message is either physically or logically the same directory service that received the message from PC12 1051.

At 1104, when the directory service 1031 receives a message from PC11 1052, it initiates a similar procedure as it followed for a message for PC12 1051. However, in this case it will update the profile associated with the identifier it received from PC11 1052, and it will use the IP address it received from PC11 1052. Because of the updated profile information, when the acknowledgment message is sent out from the directory service, it is sent to the IP address associated with PC11 1052. At this point both computers (PC12 1051 and PC11 1052) are "on-line" and available to receive calls.

At 1105, PC12 1051 uses its telephony system software to connect to computer PC11 1052. To establish this connection, the user of PC12 1051 dials the VNET number (or other unique ID such as name, employee ID, etc). Depending upon the implementation of the customer's network, and software package, a unique network identifier may have to be placed in this dial string. As an example, in a telephony implementation of a VNET, a subscriber may be required to enter the number 8 prior to dialing the VNET number to signal a PBX that they are using the VNET network to route the call. Once the telephony software package has identified this call as a VNET type call, it will send a translation request to the directory service. At a minimum, this translation request will contain the following information:

The IP address of the computer (PC12 1051) sending this request, and

The VNET number (or other ID) of the computer to be dialed.

At 1106, when the directory service receives this message, it uses the VNET number (or other ID) to determine if the user associated with the VNET number (or other ID) is "on-line" and to identify the IP address of the location where the computer may be contacted. Any additional information that is available about the computer being contacted (PC11 1052), such as compression algorithms or special hardware or software capabilities, may also be retrieved by the directory service 1031. The directory service 1031 then returns a message to PC12 1051 with status information for PC11 1052, such as whether the computer is "on-line," its IP address if it is available and any other available information about capabilities of PC11 1052. When PC12 1051 receives the response, it determines whether PC11 1052 may be contacted. This determination will be based upon the "on-line" status of PC11 1052, and the additional information about capabilities of PC11 1052. If PC12 1051 receives status information indicating that PC11 1052 may not be contacted, the call flow stops here, otherwise it continues.

The following steps 1107 through 1111 are "normal" IP telephony call setup and tear-down steps. At 1107, PC12 1051 transmits a "ring" message to PC11 1052. This message is directed to the IP address received from the directory service 1031 in step 1106. This message can contain information identifying the user of PC12 1051, or it may contain information specifying the parameters associated with the requested connection.

At 1108, the message from step 1107 is received by PC11 1052 and the receipt of this message is acknowledged by sending a message back to PC12 1051 indicating that the user of PC11 1052 is being notified of an incoming call. This notification may be visible or audible depending upon the software package and its configurations on PC11 1052.

At 1109, if the user of PC11 1052 accepts the call, a message is sent back to PC12 1051 confirming "answer" for the call. If the user of PC11 1052 does not answer the call or chooses to reject the call, a message will be sent back to PC12 1051 indicative of the error condition. If the call was not answered, the call flow stops here, otherwise it continues.

At 1110, the users of PC12 1051 and PC11 1052 can communicate using their telephony software. Communication progresses until at 1111 a user of either PC may break the connection by sending a disconnect message to the other call participant. The format and contents of this message is dependent upon the telephony software packages being used by PC12 1051 and PC11 1052. In this scenario, PC11 1052 sends a disconnect message to PC12 1051, and the telephony software systems on both computers discontinue transmission of voice.

Figure 12:
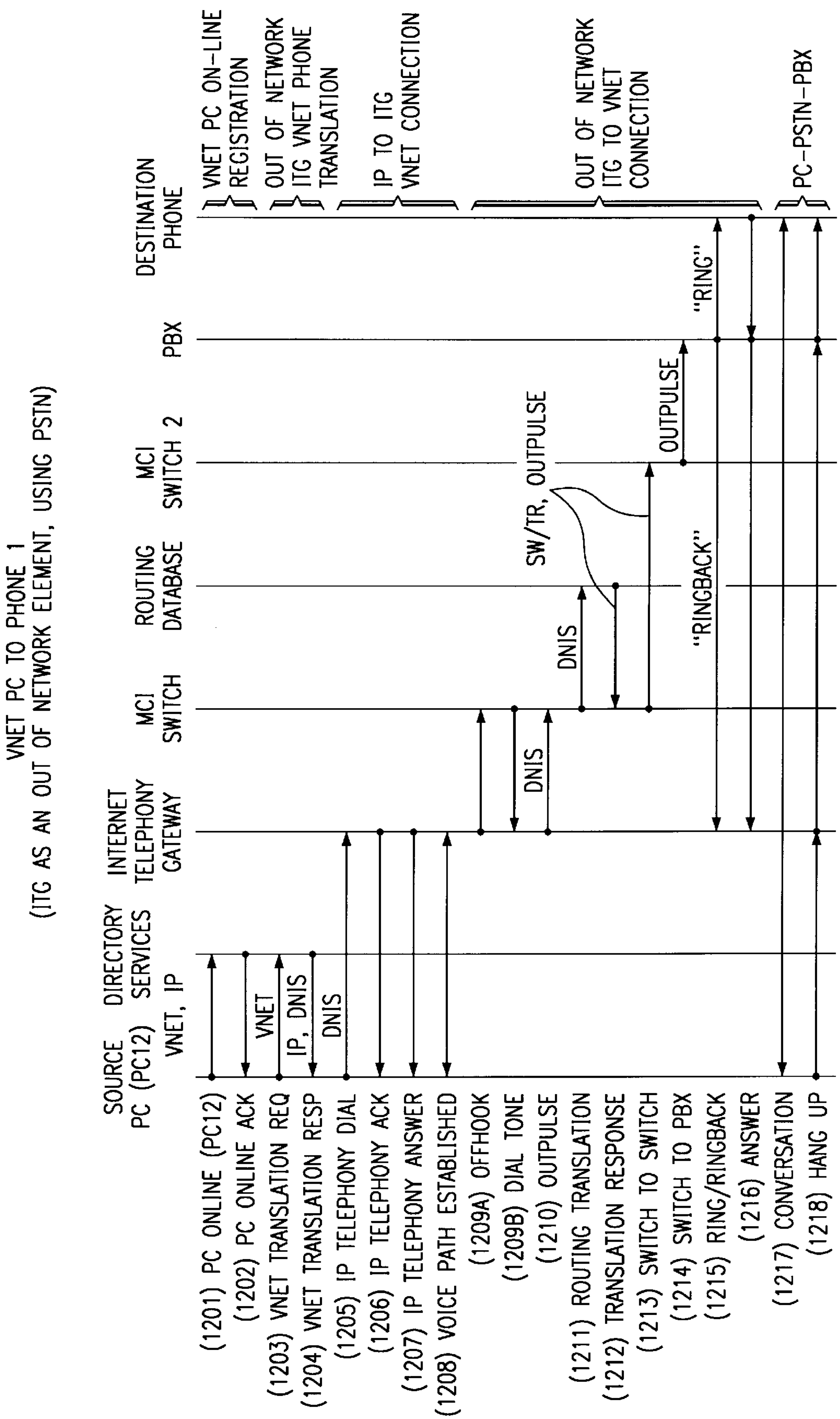
FIG. 12 illustrates a VNET Personal Computer (PC) to out-of-network PC Information call flow in accordance with a preferred embodiment.

FIG. 12 illustrates a VNET Personal Computer (PC) to out-of-network PC Information call flow in accordance with a preferred embodiment. In this flow, the Internet telephony gateway is an out-of-network element. This means that the Internet Telephony Gateway cannot use SS7 signaling to communicate with the switch, it must simply outpulse the VNET number to be dialed. An alternate embodiment facilitates directory services to do a translation of the VNET number directly to a Switch/Trunk and outpulse the appropriate digits. Such processing simplifies translation in the switching network but would require a more sophisticated signaling interface between the internet gateway and the switch. This type on "in-network" internet gateway scenario will be covered in another call flow.

This scenario assumes that there is no integration between the internet and a customer premises Public Branch Exchange (PBX). If there were integration, it might be possible for the PC to go through the Internet (or intranet) to connect to an ITG on the customers PBX, avoiding the use of the PSTN. FIG. 12 is a callflow diagram in accordance with a preferred embodiment. Processing commences at 1201 where the location of the directory service to receive this "on-line" message will be determined by the data distribution implementation for this customer. In some cases this may be a private database for a company or organization subscribing to a VNET service, in other cases it might be a national or worldwide database for all customers of a service provider (MCI).

When the directory service receives this message from PC12 1051, it will update a profile entry associated with the unique ID to indicate that the user is "on-line" and is located at the specified IP address. Then, at 1202, after successful update of the profile associated with the ID, the directory service sends a response (ACK) back to the specified IP address indicating that the message was received and processed. When the computer (PC12) receives this response message it may choose to notify the user via a visual or audible indicator.

At 1203, a VNET translation request is then sent to the directory services to determine the translation for the dial path to the out of network internet gateway phone. A response including the IP address and the DNIS is returned at 1204. The response completely resolves the phone addressing information for routing the call. Then, at 1205, an IP telephony dial utilizing the DNIS information occurs. DNIS refers to Dialed Number Information Services which is definitive information about a call for use in routing the call. At 1206 an ACK is returned from the IP telephony, and at 1207 an IP telephony answer occurs and a call path is established at 1208.

1209*a* shows the VNET PC going offhook and sending a dial tone 1209*b*, and outpulsing digits at 1210. Then, at 1211, the routing translation of the DNIS information is used by the routing database to determine how to route the call to the destination telephone. A translation response is received at 1212 and a switch to switch outpulse occurs at 1213. Then, at 1215, a ring is transmitted to the destination phone, and a ringback to the PC occurs. The call is transmitted out of the network via the internet gateway connection and answered at 1216. Conversation ensues at 1217, until one of the parties hangs up at 1218.

Figure 13:
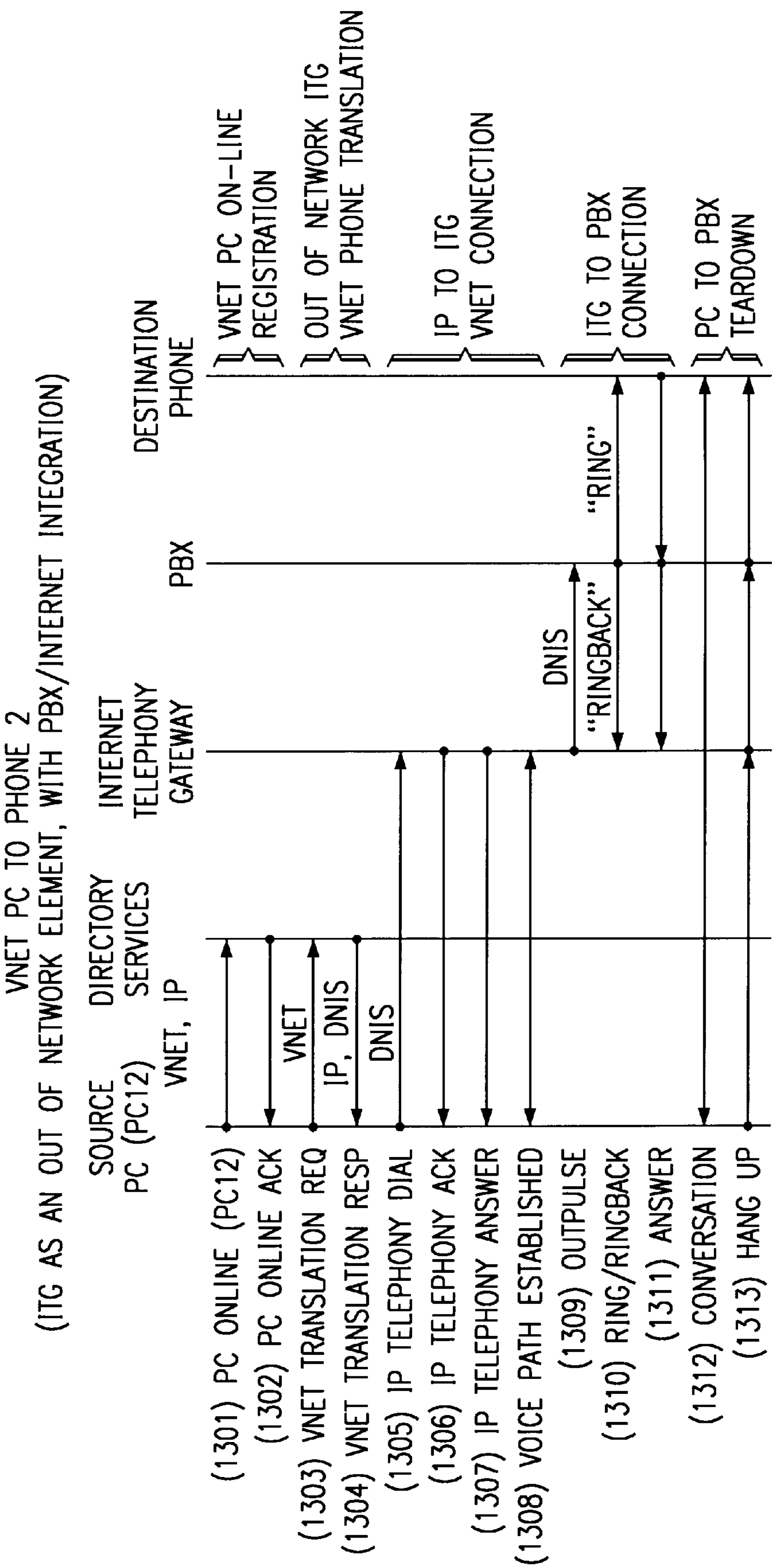
FIG. 13 illustrates a VNET Personal Computer (PC) to out-of-network Phone Information call flow in accordance with a preferred embodiment.

FIG. 13 illustrates a VNET Personal Computer (PC) to out-of-network Phone Information call flow in accordance with a preferred embodiment. In this call flow, the use of the PSTN is avoided by routing the call from the PC to the Internet/Intranet to an internet gateway directly connected to a PBX.

Figure 14:
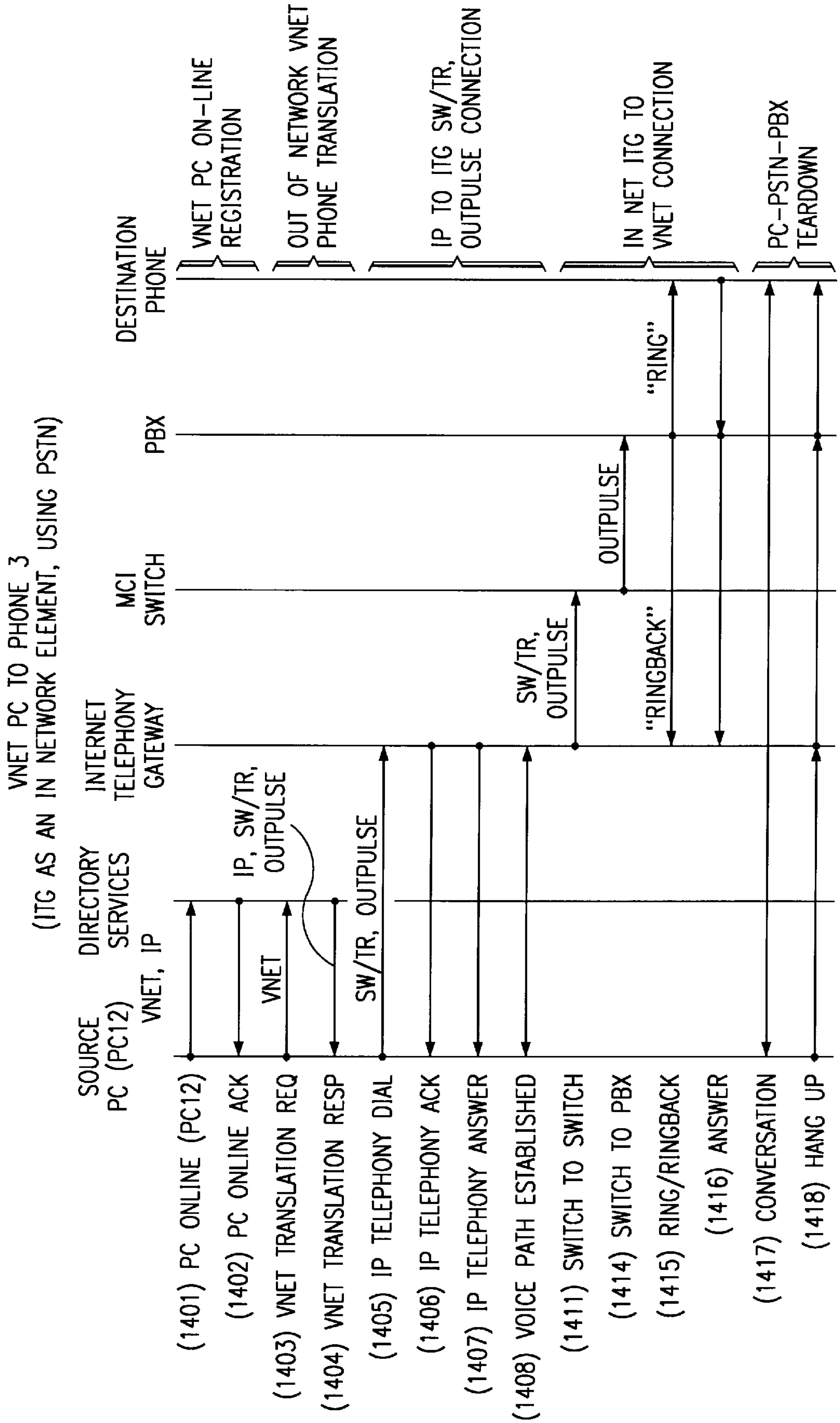
FIG. 14 illustrates a VNET Personal Computer (PC) to in-network Phone Information call flow in accordance with a preferred embodiment.

FIG. 14 illustrates a VNET Personal Computer (PC) to in-network Phone Information call flow in accordance with a preferred embodiment. In this call flow, the internet telephony gateway is an in-network element. This requires that the internet gateway can behave as if it were a switch and utilize SS7 signaling to hand the call off to a switch. This allows the directory service to return the switch/trunk and outpulse digits on the first VNET lookup. This step avoids an additional lookup by the switch. In this case the directory service must have access to VNET routing information.

a) PC to PC

Figure 15:
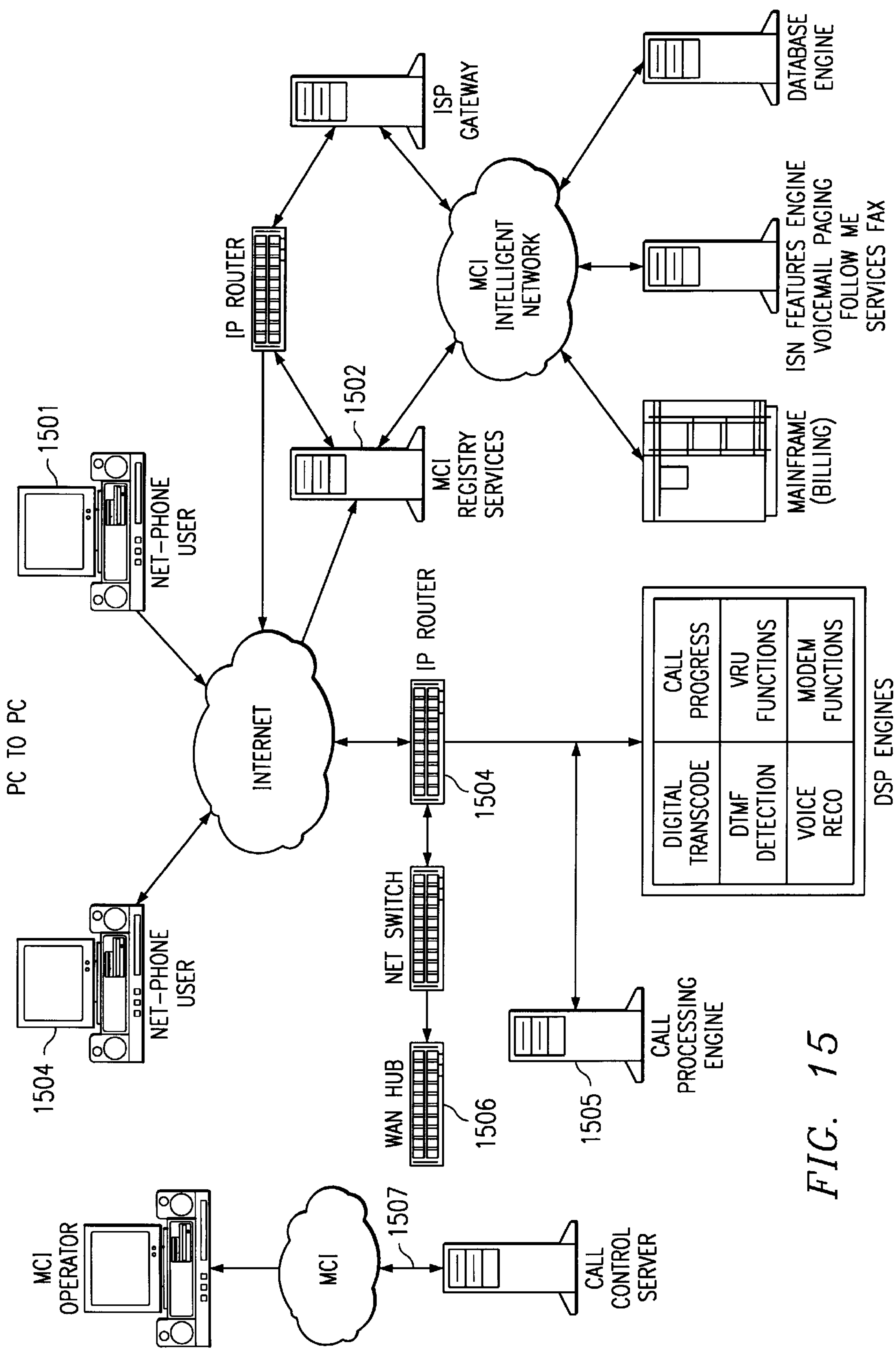
FIG. 15 illustrates a personal computer to personal computer internet telephony call in accordance with a preferred embodiment.

FIG. 15 illustrates a personal computer to personal computer internet telephony call in accordance with a preferred embodiment. In step 1501, a net phone user connects through the internet via an IP connection to the step 1502 MCI directory service where a look up is performed to determine how to route the call. In step 1503, the call is terminated in the Intelligent System Platform (ISP) to determine where to send the call. IP Router is the gateway that goes into the MCI ISP to determine via the Intelligent Services Network (ISN) feature engine how to get the call through the network. In step 1504, the call is connected through the Internet to the Net Phone user. In alternative scenario step 1504 the person at the phone is unavailable, so the calling party desired to speak with an MCI operator and the IP Router goes through the Net-Switch (interface to the voice world.) In step 1505, the netswitch queries the call processing engine to do DSP Engine functions. In step 1506, the call is routed through the WAN Hub to a MCI switch to an MCI Operator or voicemail in step 1507. This preferred embodiment utilizes the existing infrastructure to assist the call.

b) PC TO PHONE

Figure 16:
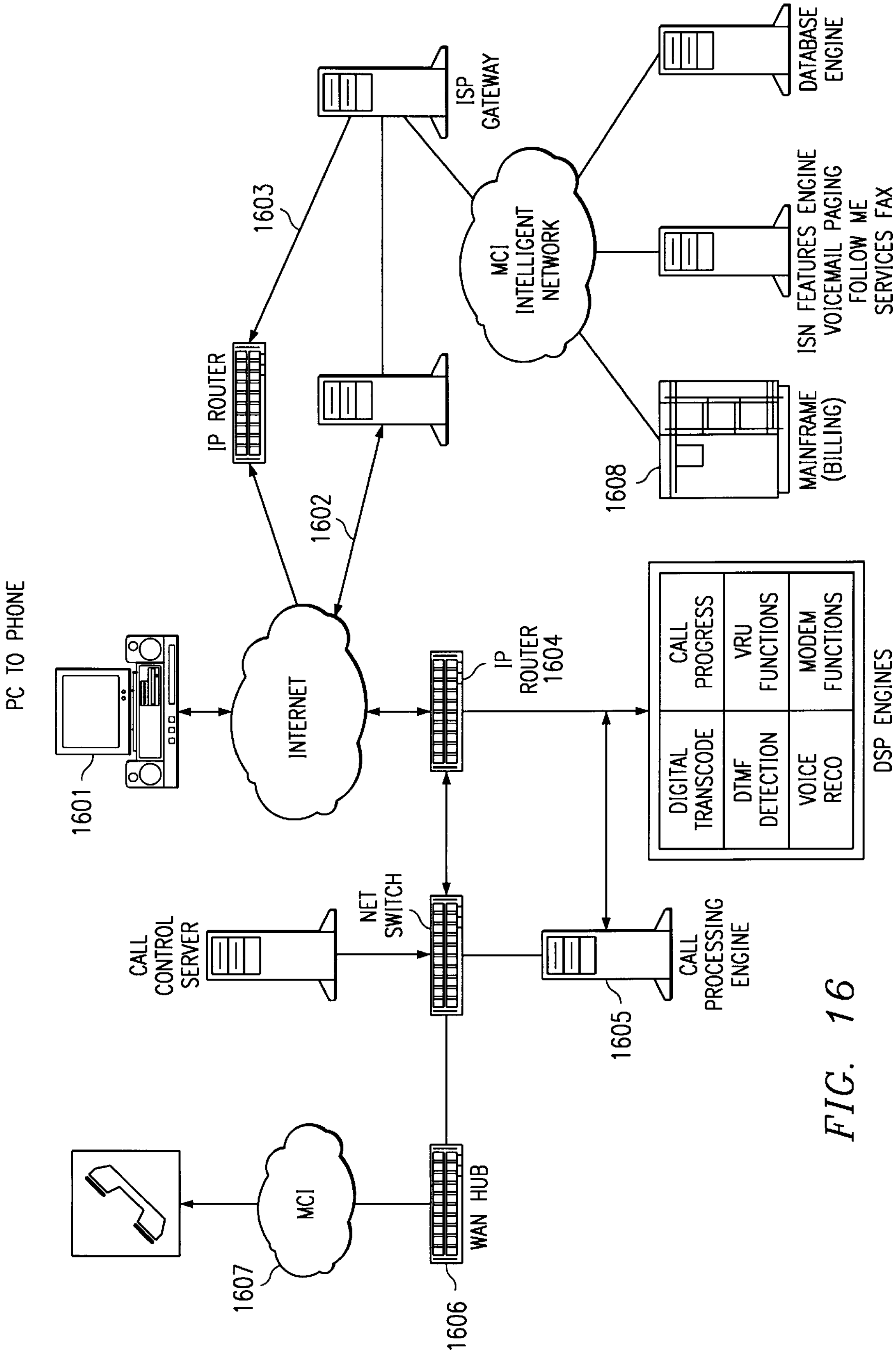
FIG. 16 illustrates a phone call that is routed from a PC through the Internet to a phone in accordance with a preferred embodiment.

FIG. 16, illustrates a phone call that is routed from a PC through the Internet to a phone. In step 1602, the MCI Directory is queried to obtain ISN information for routing the call. Then the call is redirected in step 1603 to the ISP Gateway and routed utilizing the IP router to the call processing engine in steps 1604 and 1605. Then, in step 1606, the call is routed to the WAN and finally to the RBOC where Mainframe billing is recorded for the call.

c) Phone to PC

Figure 17:
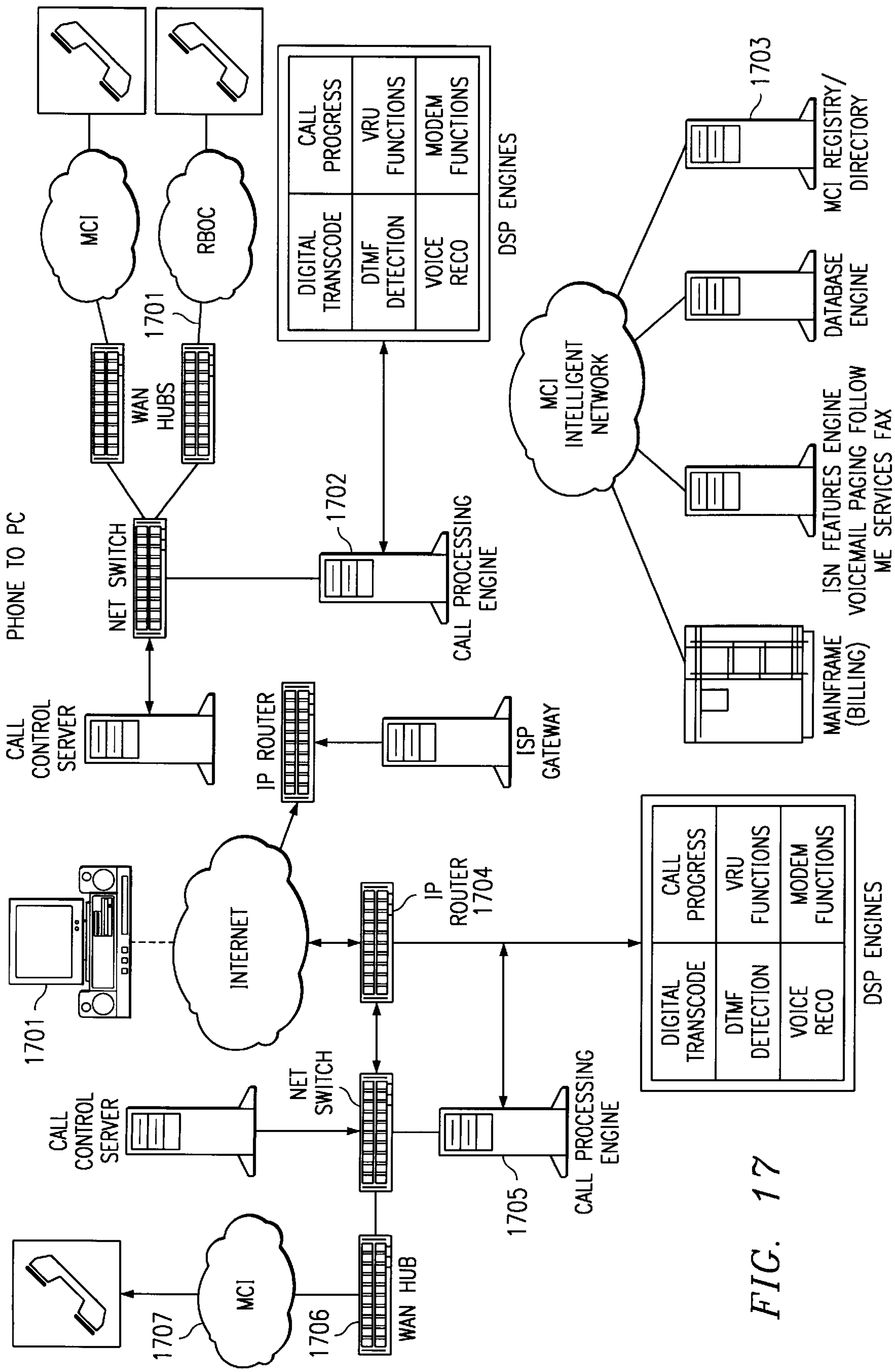
FIG. 17 illustrates a phone to PC call in accordance with a preferred embodiment.

FIG. 17 illustrates a phone to PC call in accordance with a preferred embodiment. In step 1701, a phone is routed into a special net switch where in step 1702, a call processing engine determines the DTMF tones utilizing a series of digital signal processors. Then, at step 1703, the system looks up directory information and connects the call. If the caller is not there, or busy, then at step 1704, the call is routed via an IP router over the switch utilizing the call processing engine in step 1705.

d) Phone to Phone

Figure 18:
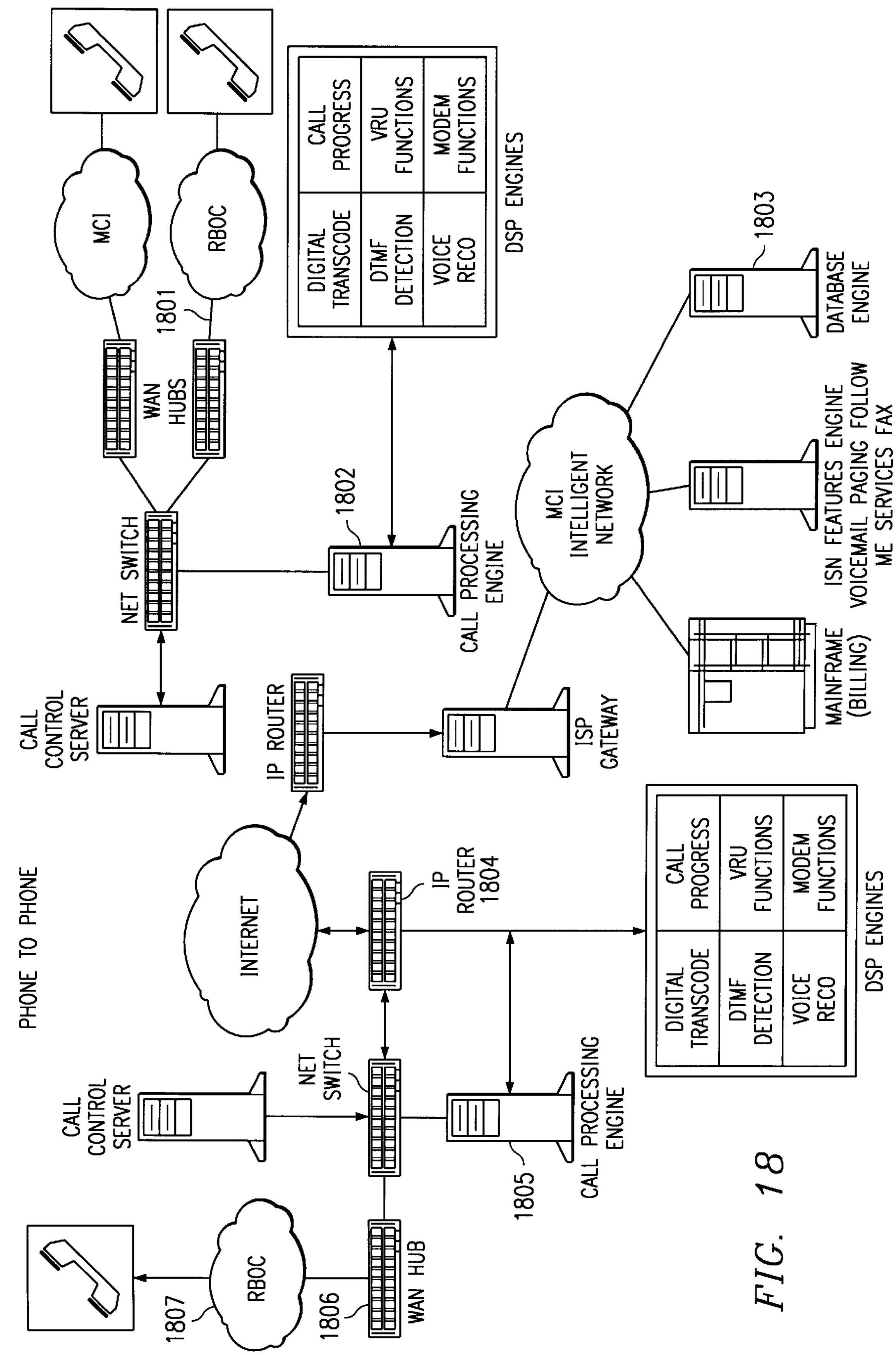
FIG. 18 illustrates a phone to phone call over the internet in accordance with a preferred embodiment.

FIG. 18 illustrates a phone to phone call over the internet in accordance with a preferred embodiment. A call comes into the switch at step 1801, and is processed by the call logic program running in the call processing engine in step 1802. In step 1803, a lookup is performed in the directory information database to determine routing of the call as described above. The routing includes storing a billing record in the mainframe billing application 1808. All of the ISN features are available to the call even thought the call is routed through the internet. An IP router is used at each end of the internet to facilitate routing of the call through the internet 1804 and into the network switch. From the network switch the call is routed to a call processing engine through a WAN hub 1806 through the RBOC 1807 to the target telephone. Various DSP Engines 1803 are utilized to perform digital transcoding, DTMF detection, voice recognition, call progress, VRU functions and Modem functions.

XI. TELECOMMUNICATION NETWORK MANAGEMENT

A preferred embodiment utilizes a network management system for a telecommunication network for analyzing, correlating, and presenting network events. Modern telecommunications networks utilize data signaling networks, which are distinct from the call-bearing networks, to carry the signaling data that are required for call setup, processing, and clearing. These signaling networks use an industry-standard architecture and protocol, collectively referred to as Common Channel Signaling System #7, or Signaling System #7 (SS7) for short. SS7 is a significant advancement over the previous signaling method, in which call signaling data were transmitted over the same circuits as the call. SS7 provides a distinct and dedicated network of circuits for transmitting call signaling data. Utilizing SS7 decreases the call setup time (perceived by the caller as post-dial delay) and increases capacity on the call-bearing network. A detailed description of SS7 signaling is provided in Signaling System #7, Travis Russell, Mcgraw Hill (1995).

The standards for SS7 networks are established by ANSI for domestic (U.S.) networks, by ITU for international connections, and are referred to as ANSI SS7 and ITU C7, respectively. A typical SS7 network is illustrated in FIG. 1B. A call-bearing telecommunications network makes use of matrix switches 102*a*/102*b* for switching customer traffic. These switches 102*a*/102*b* are conventional, such as a DMS-250 manufactured by Northern Telecom or a DEX-600 manufactured by Digital Switch Corporation. These switches 102*a*/102*b* are interconnected with voice-grade and data-grade call-bearing trunks. This interconnectivity, which is not illustrated in FIG. 1B, may take on a large variety of configurations.

Switches in telecommunications networks perform multiple functions. In addition to switching circuits for voice calls, switches must relay signaling messages to other switches as part of call control. These signaling messages are delivered through a network of computers, each of which is called a Signaling Point (SP) 102*a*/102*b*. There are three kinds of SPs in an SS7 network:

Service Switching Point (SSP)

Signal Transfer Point (STP)

Service Control Point (SCP)

The SSPs are the switch interface to the SS7 signaling network.

Signal Transfer Points (STPs) 104*a* . . . 104*f* (collectively referred to as 104) are packet-switching communications devices used to switch and route SS7 signals. They are deployed in mated pairs, known as clusters, for redundancy and restoration. For example, in FIG. 1B, STP 104*a* is mated with STP 104*b* in Regional Cluster 1, STP 104*e* is mated with STP 104*d* in Regional Cluster 2, and STP 104*c* is mated with STP 104*f* in Regional Cluster 3. A typical SS7 network contains a plurality of STP clusters 104; three are shown in FIG. 1 for illustrative purposes. Each STP cluster 104 serves a particular geographic region of SSPs 102. A plurality of SSPs 102 have primary SS7 links to each of two STPs 104 in a cluster. This serves as a primary homing arrangement. Only two SSPs 102 are shown homing to Regional Cluster 2 in FIG. 1B for illustrative purposes; in reality, several SSPs 102 will home on a particular STP cluster 104. SSPs 102 will also generally have a secondary SS7 link to one or both STPs 104 in another cluster. This serves as a secondary homing arrangement.

The SS7 links that connect the various elements are identified as follows:

A links connect an SSP to each of its primary STPs (primary homing).

B links connect an STP in one cluster to an STP in another cluster.

C links connect one STP to the other STP in the same cluster.

D links connect STPs between different carrier networks (not illustrated).

E links connect an SSP to an STP that is not in its cluster (secondary homing).

F links connect two SSPs to each other.

To interface two different carriers' networks, such as a Local Exchange Carrier (LEC) network with an Interchange Carrier (IXC) network, STP clusters 104 from each carriers' network may be connected by D links or A links. SS7 provides standardized protocol for such an interface so that the signaling for a call that is being passed between an LEC and an IXC may also be transmitted.

Figure 2:
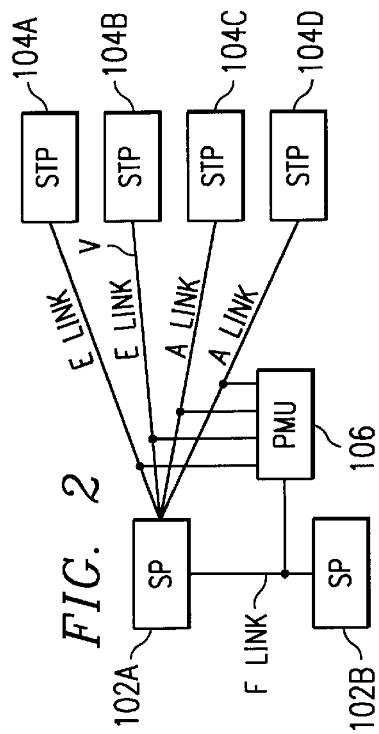
FIG. 2 is a block diagram illustrating the use of PMUs in a typical SS7 network in accordance with a preferred embodiment.

When a switch receives and routes a customer call, the signaling for that call is received (or generated) by the attached SSP 102. While intermachine trunks that connect the switches carry the customer's call, the signaling for that call is sent to an STP 104. The STP 104 routes the signal to either the SSP 102 for the call-terminating switch, or to another STP 104 that will then route the signal to the SSP 102 for the call-terminating switch. Another element of an SS7 network are Protocol Monitoring Units (PMU) 106, shown in FIG. 2. PMUs 106 are deployed at switch sites and provide an independent monitoring tool for SS7 networks. These devices, such as those manufactured by INET Inc. of Richardson, Tex., monitor the A, E, and F links of the SS7 network, as shown in FIG. 2. They generate fault and performance information for SS7 links.

As with any telecommunications network, an SS7 network is vulnerable to fiber cuts, other transmission outages, and device failures. Since an SS7 network carries all signaling required to deliver customer traffic, it is vital that any problems are detected and corrected quickly. Therefore, there is an essential need for a system that can monitor SS7 networks, analyze fault and performance information, and manage corrective actions.

Prior art SS7 network management systems, while performing these basic functions, have several shortcomings. Many require manual configuration of network topology, which is vulnerable to human error and delay topology updates. Configuration of these systems usually requires that the system be down for a period of time. Many systems available in the industry are intended for a particular vendor's PMU 106, and actually obtain topology data from their PMUs 106, thereby neglecting network elements not connected to a PMU 106 and other vendors' equipment.

Because prior art systems only operate with data received from proprietary PMUs 106, they do not provide correlation between PMU events and events generated from other types of SS7 network elements. They also provide inflexible and proprietary analysis rules for event correlation.

Figure 3:
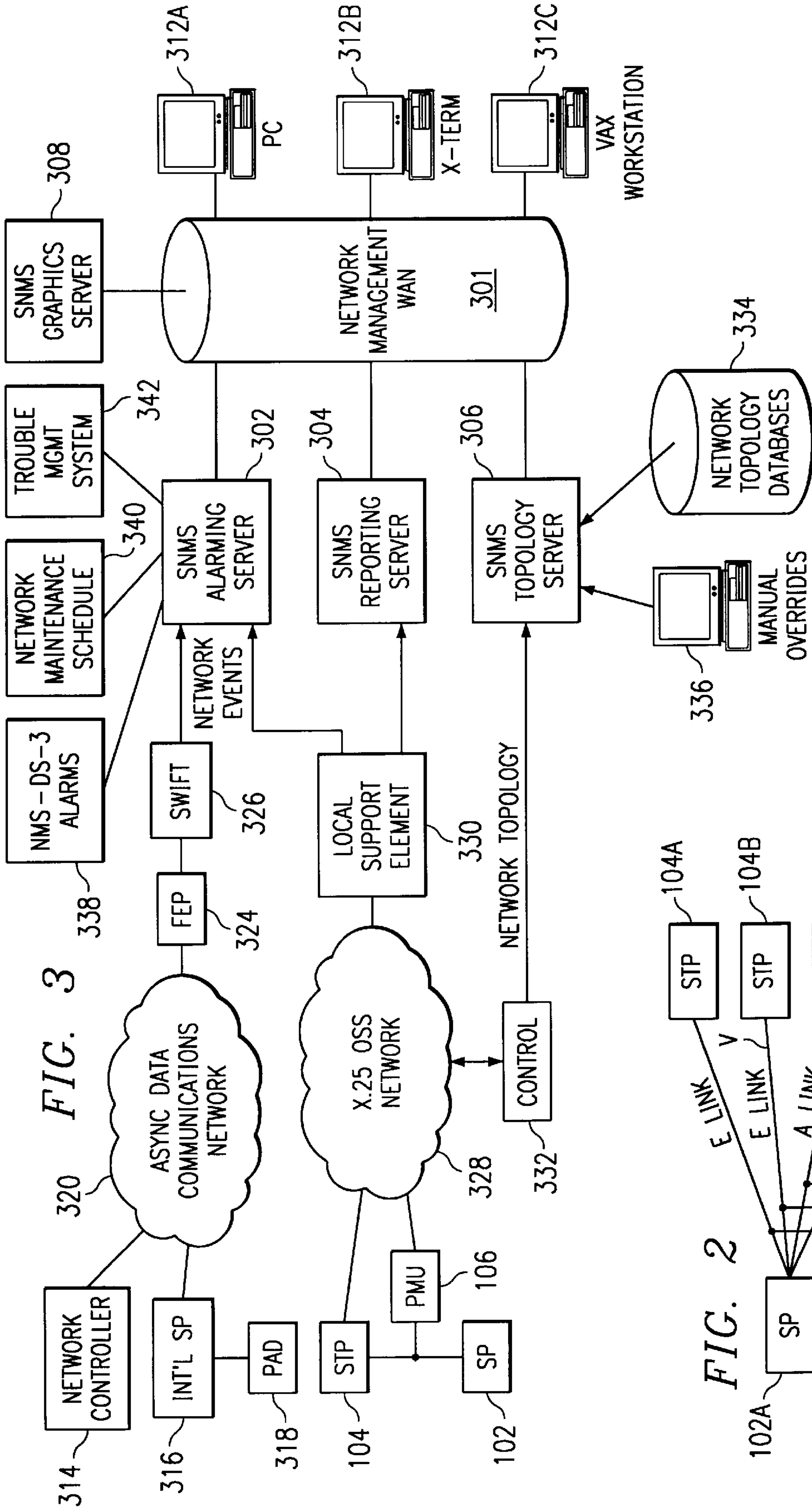
FIG. 3 is a block diagram illustrating the systems architecture of the preferred embodiment.

A system and method for providing enhanced SS7 network management functions are provided by a distributed client/server platform that can receive and process events that are generated by various SS7 network elements. Each network event is parsed and standardized to allow for the processing of events generated by any type of element. Events can also be received by network topology databases, transmission network management systems, network maintenance schedules, and system users. Referring to FIG. 3, the systems architecture of the preferred embodiment of the present invention, referred to as an SS7 Network Management System (SNMS), is illustrated. SNMS consists of four logical servers 302/304/306/308 and a plurality of client workstations 312*a*/312*b*/312*c* connected via a Network Management Wide Area Network (WAN) 310. The four logical SNMS servers 302/304/306/308 may all reside on a single or a plurality of physical units. In the preferred embodiment, each logical server resides on a distinct physical unit, for the purpose of enhancing performance. These physical units may be of any conventional type, such as IBM RS6000 units running with AIX operating system.

The client workstations 312 may be any conventional PC running with Microsoft Windows or IBM OS/2 operating systems, a dumb terminal, or a VAX VMS workstation. In actuality, client workstations may be any PC or terminal that has an Internet Protocol (IP) address, is running with X-Windows software, and is connected to the WAN 310. No SNMS-specific software runs on the client workstations 312.

SNMS receives events from various SS7 network elements and other network management systems (NMS) 338. It also receives network topology, configuration, and maintenance data from various external systems, as will be described. The various network elements that generate events include Network Controllers 314, International and Domestic SPs 316/102, STPs 104, and PMUs 106. Network Controllers 314 are devices that switch circuits based on external commands. They utilize SS7 signaling in the same manner as an SSP 102, but are not linked to any STPs 104. International SPs 316 support switches that serve as a gateway between a domestic and international telecommunications network. The STPs 104 may be domestic or international.

The PMUs 106 scan all the SS7 packets that pass across the SS7 circuits, analyze for fault conditions, and generate network events that are then passed onto SNMS. The PMUs 106 also generate periodic statistics on the performance of the SS7 circuits that are monitored.

All SPs 102/316, STPs 104, PMU 106, and SS7 Network Controllers 314 transmit network events to SNMS via communications networks. This eliminates the need for SNMS to maintain a session with each of the devices. In one typical embodiment, as illustrated in FIG. 3, an Asynchronous Data Communications Network 320 is used to transport events from Network Controllers 314 and International SPs 316. An IBM mainframe Front End Processor (FEP) 324, such as IBM's 3708, is used to convert the asynchronous protocol to SNA so it can be received by a IBM mainframe-based Switched Host Interface Facilities Transport (SWIFT) system 326. SWIFT 326 is a communications interface and data distribution application that maintains a logical communications session with each of the network elements.

In this same embodiment, an X.25 Operational Systems Support (OSS) Network 328 is used to transport events from STPs 104, SPs 102, and PMUs 106. These events are received by a Local Support Element (LSE) system 330. The LSE 330, which may be a VAX/VMS system, is essentially a Packet Assembler/Disassembler (PAD) and protocol converter used to convert event data from the X.25 OSS Network 328 to the SNMS servers 302/304. It also serves the same function as SWIFT 326 in maintaining communication sessions with each network element, thus eliminating the need for SNMS to do so. The need for both SWIFT 326 and LSE 330 illustrates one embodiment of a typical telecommunications network in which different types of elements are in place requiring different transport mechanisms. SNMS supports all these types of elements.

All network events are input to the SNMS Alarming Server 302 for analysis and correlation. Some events are also input to the SNMS Reporting Server 304 to be stored for historical purposes. A Control system 332, which may be a VAX/VMS system, is used to collect topology and configuration data from each of the network elements via the X.25 OSS Network 328. Some elements, such as STPs 104 and SPs 102, may send this data directly over the X.25 OSS Network 328. Elements such as the International SSP 316, which only communicates in asynchronous mode, use a Packet Assembler/Disassembler (PAD) 318 to connect to the X.25 OSS Network 328. The Control system 332 then feeds this topology and configuration data to the SNMS Topology Server 306.

Network topology information is used by SNMS to perform alarm correlation and to provide graphical displays. Most topology information is received from Network Topology Databases 334, which are created and maintained by order entry systems and network engineering systems in the preferred embodiment. Topology data is input to the SNMS Topology Server 306 from both the Network Topology Databases 334 and the Control System 332. An ability to enter manual overrides through use of a PC 336 is also provided to the SNMS Topology Server 306.

The SNMS Alarming Server 302 also receives events, in particular DS-3 transmission alarms, from other network management systems (NMS) 338. Using topology data, SNMS will correlate these events with events received from SS7 network elements. The SNMS Alarming Server 302 also receives network maintenance schedule information from a Network Maintenance Schedule system 340. SNMS uses this information to account for planned network outages due to maintenance, thus eliminating the need to respond to maintenance-generated alarms. SNMS also uses this information to proactively warn maintenance personnel of a network outage that may impact a scheduled maintenance activity.

The SNMS Alarming Server 302 has an interface with a Trouble Management System 342. This allows SNMS users at the client workstations 312 to submit trouble tickets for SNMS-generated alarms. This interface, as opposed to using an SNMS-internal trouble management system, can be configured to utilize many different types of trouble management systems. In the preferred embodiment, the SNMS Graphics Server 308 supports all client workstations 312 at a single site, and are therefore a plurality of servers. The geographical distribution of SNMS Graphics Servers 308 eliminates the need to transmit volumes of data that support graphical presentation to each workstation site from a central location. Only data from the Alarming Server 302, Reporting Server 304, and Topology Server 306 are transmitted to workstation sites, thereby saving network transmission bandwidth and improving SNMS performance. In alternative embodiments, the Graphics Servers 308 may be centrally located.

Figure 4:
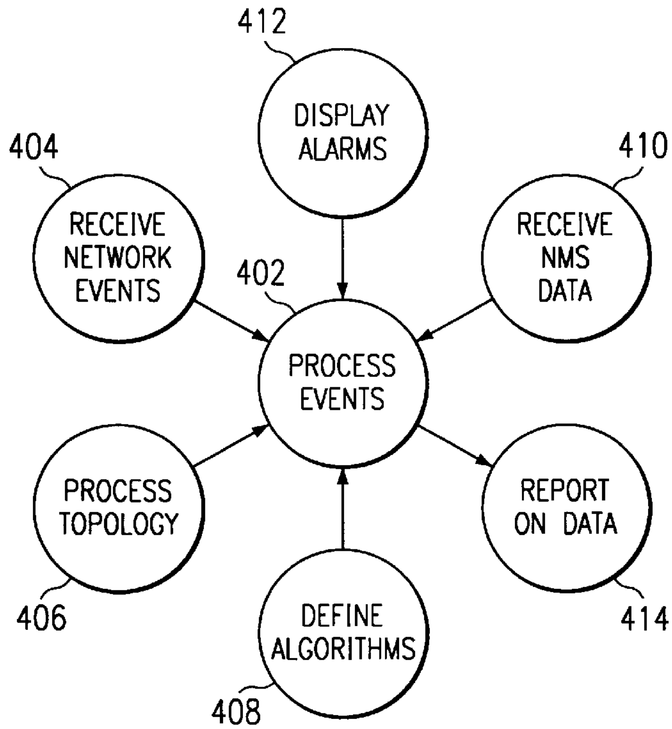
FIG. 4 is a high-level process flowchart illustrating the logical system components in accordance with a preferred embodiment.

Referring now to FIG. 4, a high-level process flowchart illustrates the logical system components of SNMS. At the heart of the process is Process Events 402. This component serves as a traffic cop for SNMS processes. Process Events 402, which runs primarily on the SNMS Alarming Server 302, is responsible for receiving events from other SNMS components, processing these events, storing events, and feeding processed event data to the Reporting and Display components. The Process Events process 402 is shown in greater detail in FIG. 5.

The Receive Network Events component 404, which runs primarily on the Alarming Server 302, receives network events from the various SS7 network elements (STPs 104, SPs 102, PMUs 106, etc.) via systems such as SWIFT 326 and LSE 330. This component parses the events and sends them to Process Events 402 for analysis. The Receive Network Events process 404 is shown in greater detail in FIG. 6.

The Process Topology component 406, which runs primarily on the Topology Server 306, receives network topology and configuration data from the Network Topology Databases 334, from the SS7 network elements via the Control System 332, and from Manual Overrides 336. This data is used to correlate network events and to perform impact assessments on such events. It is also used to provide graphical presentation of events. Process Topology 406 parses these topology and configuration data, stores them, and sends them to Process Events 402 for analysis. The Process Topology process 406 is shown in greater detail in FIG. 7.

The Define Algorithms component 408, which runs primarily on the Alarming Server 302, defines the specific parsing and analysis rules to be used by SNMS. These rules are then loaded into Process Events 402 for use in parsing and analysis. The algorithms are kept in a software module, and are defined by programmed code. A programmer simply programs the predefined algorithm into this software module, which is then used by Process Events 402. These algorithms are procedural in nature and are based on network topology. They consist of both simple rules that are written in a proprietary language and can be changed dynamically by an SNMS user, and of more complex rules which are programmed within SNMS software code.

The Receive NMS Data component 410, which runs primarily on the Alarming Server 302, receives events from other network management systems (NMS) 338. Such events include DS-3 transmission alarms. It also receives network maintenance events from a Network Maintenance Schedule system 340. It then parses these events and sends them to Process Events 402 for analysis. The Display Alarms component 412, which runs primarily on the Graphics Server 308 and the Alarming Server 302, includes the Graphical User Interface (GUI) and associated software which supports topology and alarm presentation, using data supplied by Process Events 402. It also supports user interactions, such as alarm clears, acknowledgments, and trouble ticket submissions. It inputs these interactions to Process Events 402 for storing and required data updates. The Display Alarms process 412 is shown in greater detail in FIG. 8.

The Report On Data component 414, which runs primarily on the Reporting Server 304, supports the topology and alarm reporting functions, using data supplied by Process Events 402. The Report On Data process 414 is shown in greater detail in FIG. 9.

Figure 5:
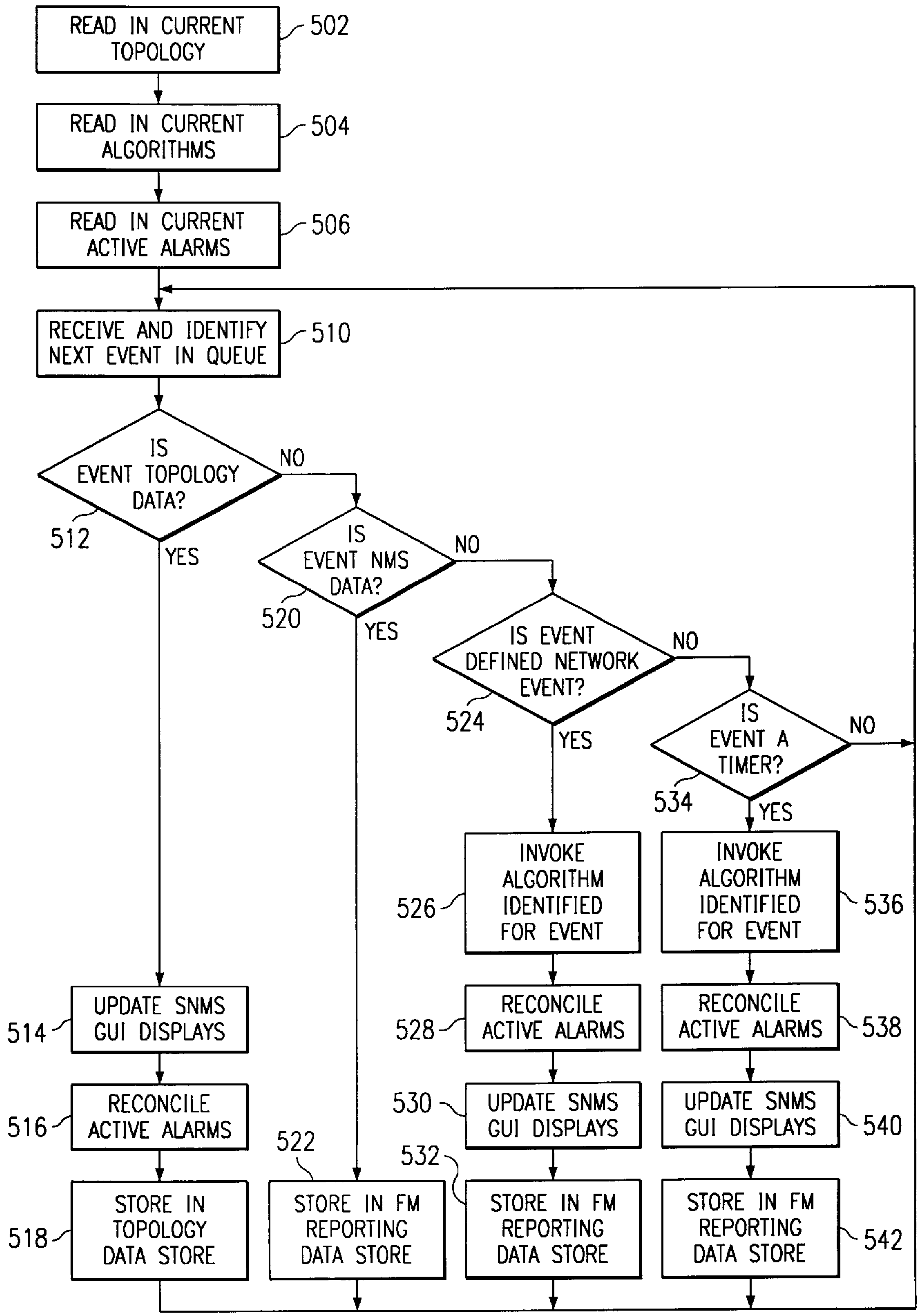

Referring now to FIG. 5, the detailed process of the Process Events component 402 is illustrated. This is the main process of SNMS. It receives generalized events from other SNMS components, parses each event to extract relevant data, and identifies the type of event. If it is an SS7-related event, Process Events 402 applies a selected algorithm, such as create alarm or correlate to existing alarm.

The first three steps 502–506 are an initialization process that is run at the start of each SNMS session. They establish a state from which the system may work. Steps 510–542 are then run as a continuous loop.

In step 502, current topology data is read from a topology data store on the Topology Server 306. This topology data store is created in the Process Topology process 406 and input to Process Events 402, as reflected in FIG. 4. The topology data that is read has been parsed in Process Topology 406, so it is read in step 502 by Process Events 402 as a standardized event ready for processing.

In step 504, the algorithms which are created in the Define Algorithms component 408 are read in. These algorithms determine what actions SNMS will take on each alarm. SNMS has a map of which algorithms to invoke for which type of alarm.

In step 506, alarms records from the Fault Management (FM) reporting database, which is created in the Report on Data process 414, are read in. All previous alarms are discarded. Any alarm that is active against a node or circuit that does not exist in the topology (read in step 502) is discarded. Also, any alarm that does not map to any existing algorithm (read in step 504) is discarded. The alarms are read from the FM reporting database only within initialization. To enhance performance of the system, future alarm records are retrieved from a database internal to the Process Events 402 component. Step 506 concludes the initialization process; once current topology, algorithms, and alarms are read, SNMS may begin the continuous process of reading, analyzing, processing, and storing events.

This process begins with step 510, in which the next event in queue is received and identified. The queue is a First In/First Out (FIFO) queue that feeds the Process Events component 402 with network events, topology events, and NMS events. To reiterate, the topology data that are read in step 502 and the alarm data that are read in step 504 are initialization data read in at startup to create a system state. In step 510, ongoing events are read in continuously from process components 404, 406, and 410. These events have already been parsed, and are received as standardized SNMS events. SNMS then identifies the type of event that is being received. If the event is found to be older than a certain threshold, for example one hour, the event is discarded.

In steps 512, 520, 524, and 534 SNMS determines what to do with the event based on the event type identification made in step 510.

In step 512, if the event is determined to be topology data, SNMS updates the GUI displays to reflect the new topology in step 514. Then in step 516, SNMS performs a reconciliation with active alarms to discard any alarm not mapping to the new topology. In step 518, the new topology data is recorded in a topology data store, which is kept in the SNMS Topology Server 306.

In step 520, if the event is determined to be NMS data, such as DS-3 alarms 338, it is stored in the FM reporting database on the SNMS Reporting Server 304 for future reference by SNMS rules.

In step 524, if the event is determined to be a defined SS7 network event, then in step 526 one or more algorithms will be invoked for the event. Such algorithms may make use of data retrieved from Network Management Systems 338, Network Maintenance Schedules 340, and Network Topology 334.

For example, when each circuit level algorithm generates an alarm, it performs a check against the Network Maintenance Schedule 340 and NMS 338 records. Each alarm record is tagged if the specified circuit is within a maintenance window (Network Maintenance Schedule 340) or is transported on a DS-3 that has a transmission alarm (NMS 338). While SS7 circuits run at a DS-0 level, the Network Topology Databases 334 provide a DS-3 to DS-0 conversion table. Any DS-0 circuit within the DS-3 is tagged as potentially contained within the transmission fault. Clear records from NMS 338 will cause active SNMS circuit level alarms to be evaluated so that relevant NMS 338 associations can be removed. SNMS clear events will clear the actual SNMS alarm. GUI filters allow users to mask out alarms that fit into a maintenance window or contained within a transmission fault since these alarms do not require SNMS operator actions.

In step 528, active alarms are reconciled with new alarm generations and clears resulting from step 526. In step 530, the GUI displays are updated. In step 532, the new alarm data is stored in the FM reporting database.

In step 534, the event may be determined to be a timer. SNMS algorithms sometimes need to delay further processing of specific conditions for a defined period of time, such as for persistence and rate algorithms. A delay timer is set for this condition and processing of new SNMS events continues. When the time elapses, SNMS treats the time as an event and performs the appropriate algorithm.

For example, an SS7 link may shut down momentarily with the possibility of functioning again within a few seconds, or it may be down for a much greater period of time due to a serious outage that requires action. SNMS, when it receives this event, will assign a timer of perhaps one minute to the event. If the event clears within one minute, SNMS takes no action on it. However, if after the one minute timer has elapsed the event is unchanged (SS7 link is still down), SNMS will proceed to take action.

In step 536, the appropriate algorithm is invoked to take such action. In step 538, active alarms are reconciled with those that were generated or cleared in step 536. In step 540, the GUI displays are updated. In step 542, the new alarm data is stored in the FM reporting database. As stated previously, SNMS operates in a continuous manner with respect to receiving and processing events. After the data stores in steps 518, 522, 532, and 542, the process returns to step 510.

Figure 6:
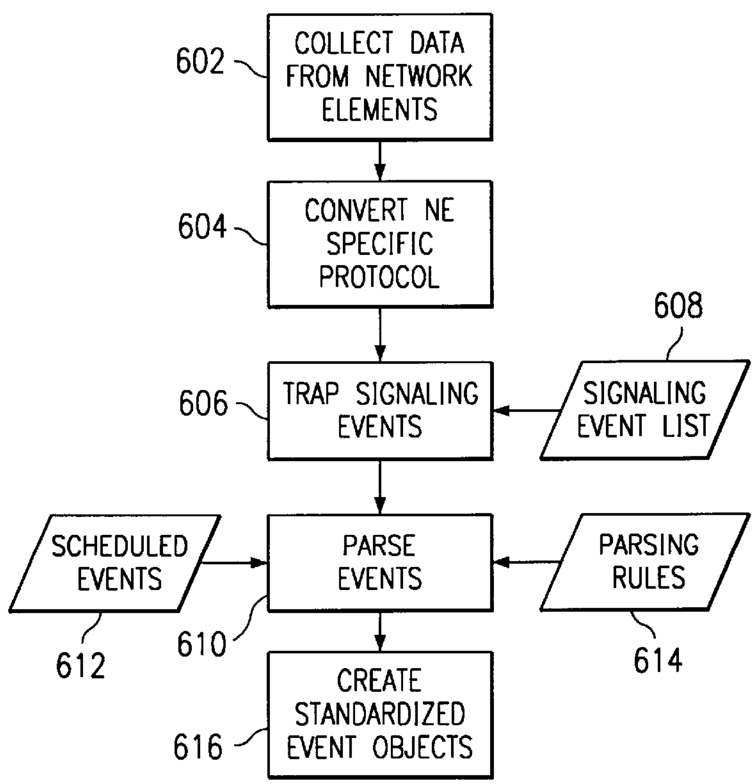

Referring now to FIG. 6, the detailed process of the Receive Network Events component 404 is illustrated. This component collects events from the SS7 network elements via data transport mechanisms, such as the Async Data Network 320, SWIFT 326, X.25 OSS network 328, and the LSE 330. These events are received by the SNMS Alarming Server 302 in a First In/First Out (FIFO) queue. In steps 602 and 604, events from the SS7 network elements are collected by mainframe applications external to SNMS, such as SWIFT 326 and LSE 330, and the protocol of the event data is converted from the network element-specific protocol to SNA or TCP/IP. In one embodiment, SNMS may also have software running on the mainframe that converts the protocol to that recognizable by the SNMS Alarming Server 302. The event data is then transmitted via SNA or TCP/IP to the SNMS Alarming Server 302. SNMS maintains a Signaling Event List 608 of all SS7 event types that is to be processed. In step 606, SNMS checks the Signaling Event List 608 and if the current event is found in the list, SNMS traps the event for processing. If the event is not found in the list, SNMS discards it.

In step 610, the event is parsed according to defined parsing rules 614. The parsing rules 614 specify which fields are to be extracted from which types of events, and are programmed into the SNMS code. The parsing of events in step 610 extracts only those event data fields needed within the alarm algorithms or displays. Also input to step 610 are scheduled events 612 from the Network Maintenance Schedule 340. Scheduled events 612 are used to identify each network event collected in step 602 that may be a result of scheduled network maintenance. This allows SNMS operators to account for those SS7 network outages that are caused by planned maintenance.

In step 616, the parsed event data is used to create standardized event objects in SNMS resident memory for use by other SNMS processes. Such event objects are read into the main process, Process Events 402, in step 510.

Figure 7:
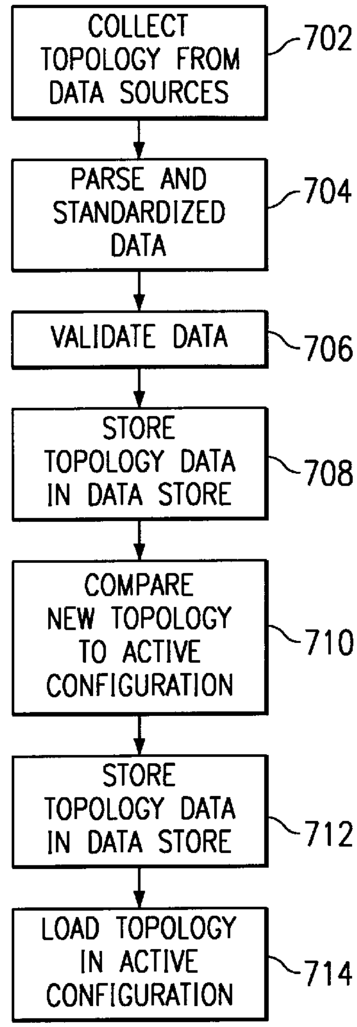
FIGS. 5–9 are process flowcharts illustrating the detailed operation of the components illustrated in FIG. 4 in accordance with a preferred embodiment.

Referring now to FIG. 7, the detailed process of the Process Topology component 406 is illustrated. This process component retrieves network topology and configuration data from three types of sources, creates standardized topology data records, and stores this data for use by other SNMS processes. In particular, it feeds active topology data to Process Events 402, running on the Alarming Server 302, in step 502.

In step 702, the SNMS Topology server 306 collects topology data from three different sources. It collects current connectivity and configuration data generated by the SS7 network elements via the Control system 332. It collects topology data that has been entered into order entry and engineering systems and stored in Network Topology Databases 334. It also accepts manual overrides 336 via workstation. The collection of data from the Topology Database 334 and the Control system 332 occurs on a periodic basis, and is performed independently of the SNMS Alarming server 302. Unlike prior art systems that use data retrieved from PMUs 106, SNMS receives topology data from all types of network elements, including those that are not connected to a PMU 106 such as that of FIG. 2. SNMS also uses data reflecting the topology of foreign networks, such as those of a Local Exchange Carrier (LEC) or an international carrier. This data is used to perform impact assessments that will allow the SNMS user to determine facts such as which end customers may be impacted by an SS7 link outage. The type of topology data collected and used by SNMS, and for example, for the SS7 linkage of an STP 104 with a Switch/SSP 102, data is received by network order entry and engineering systems. The data and a brief description of its contents is provided below.

| | |
|---|---|
| STP Link ID | Identifies each SS7 link to the STP |
| Switch Link ID | Identifies each SS7 link to the Switch/SP |
| STP Linkset | Identifies a trunk grouping of SS7 links to the STP |
| Switch Linkset | Identifies a trunk grouping of SS7 links to the Switch/SP |
| MCI/Telco Circuit ID | Identifies the SS7 link to external systems. For interfaces between two different networks, each ID (MCI ID and Telco ID) provides an identification of the SS7 link for each network (MCI and a Telco in this example). |
| Link Type | Identifies the type of SS7 link |
| SLC | Signal Link Code |

For the switched voice network supported by SS7, data is received by network order entry and engineering systems and used to perform SS7 event impact assessments:

| | |
|---|---|
| Voice Trunk Groups | Voice trunk group supported by each SSP 102 |

For the SS7 linkage of a domestic STP 104*g* to an international STP 104*h*, data is received by network order entry and engineering systems:

| | |
|---|---|
| Circuit ID | Identifies the SS7 link to external systems |
| SLC | Signal Link Code |

For the purpose of performing impact assessments, Local Exchange Carrier (LEC) NPA/NXX assignments and End Office to Access Tandem homing arrangements are received by a calling area database that is populated by Bellcore's Local Exchange Routing Guide (LERG).

| | |
|---|---|
| LATA | Local Access Transport Area (conventional) |
| NPA/NXX | Numbering Plan Area/prefix (conventional) |
| End Office | LEC customer serving node |
| Access Tandem | LEC end office hub |

Foreign network STP 104 clustering and SSP 102 homing arrangements are received by SS7 network elements via a control system.

| | |
|---|---|
| Point Code | Identifies SS7 node (conventional) |

Data identifying certain aspects of each network element are received by a Switch Configuration File, which resides in an external system.

Data mapping each network DS-0 onto a DS-3 is received by Network Topology Databases. This data is used to assign DS-3 alarms received by NMS to DS-0 level circuits.

Data needed to overwrite data acquired through automated processes are provided by manual overrides.

Referring now back to FIG. 7 in step 704, the various topology data are parsed to extract the data fields that are needed by SNMS algorithms. The data are then standardized into event records that can be processed by Process Events 402.

In step 706, the standardized data records are validated against other data. For example, circuit topology records are validated against node topology records to ensure that end nodes are identified and defined.

In step 708, the topology data are stored on the Topology server 306 of FIG. 3 in a relational database, such as that offered by Sybase.

In step 710, the new topology records are passed from the Topology server 306 to the main SNMS process running on the Alarming server 302 and compared against the active configuration (i.e. configuration that is currently loaded into memory). Active alarm and GUI displays are reconciled to remove alarms that pertain to non-existent topology entries.

In step 712, the topology is stored on the Alarming Server 302 (for use by Process Events 402) in the form of flat files for performance reasons. At this time the flat file mirrors the Topology server 306 database from step 708. This flat file is only accessible by the main process. In step 714, the new topology records are loaded into active SNMS memory and new processes which require topology data now use the new configuration.

Figure 8:
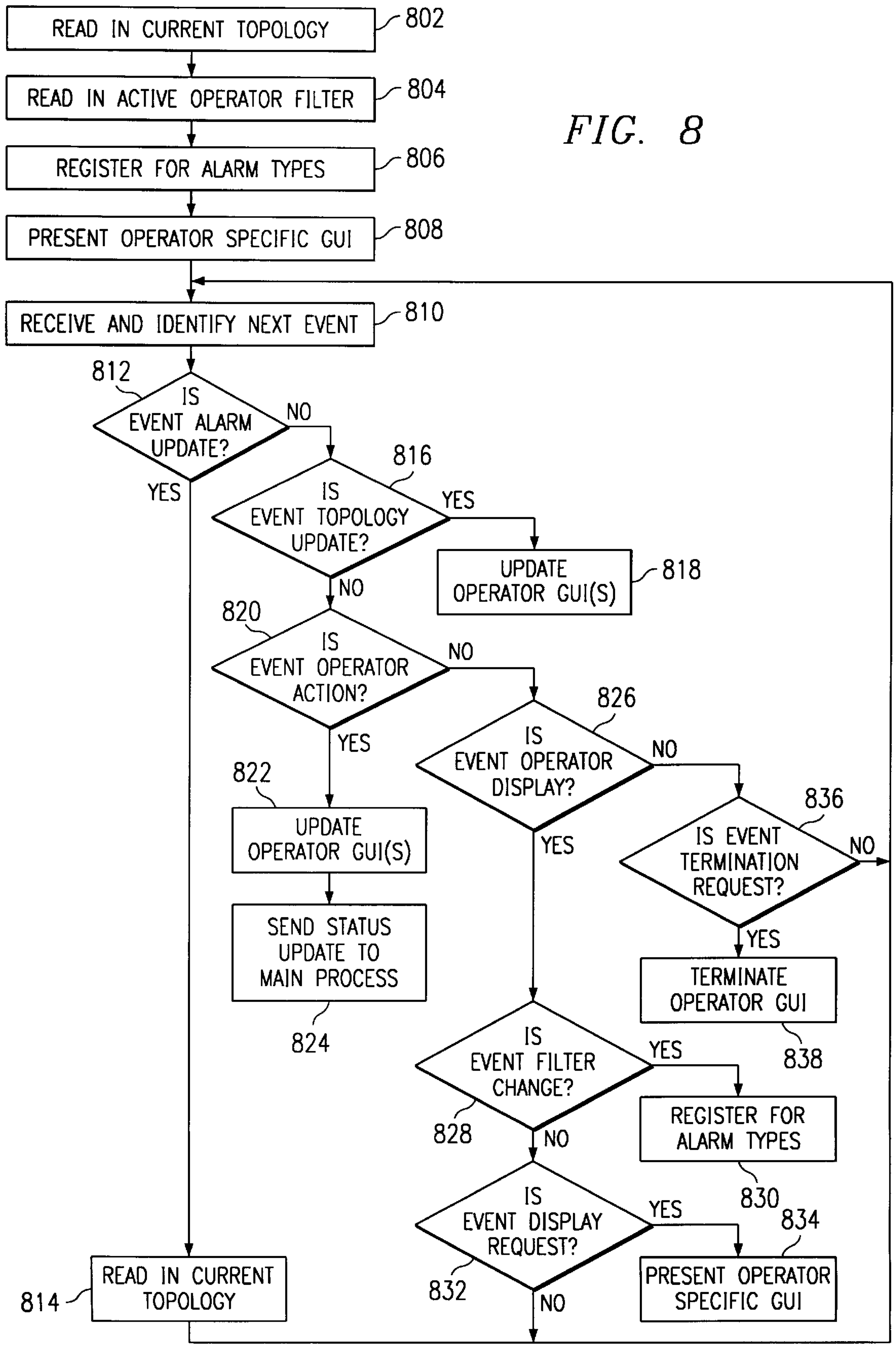

Referring now to FIG. 8, the detailed process of the Display Alarms component 412 is illustrated. This process component provides the results of SNMS processing to the user (referred to as the "operator"), and accepts operator input as actions to be performed within SNMS. Therefore, the process between Display Alarms 412 and Process Events 402 is two-way. It is important to note that while there is a single Process Events process 402 running for the entire SNMS system, there is a different instance of the Display Alarms process 412 running for each operator that is logged onto SNMS. That is, each operator instigates a separate execution of Display Alarms 412.

When an operator logs on SNMS, the first four steps, 802–808, execute as an initialization. From there, steps 810–838 operate as a continuous loop. The initialization provides each operator with a system state from which to work. In step 802, the current topology is read in and displayed via Graphical User Interface (GUI). Each operator has its own GUI process that is initialized and terminated based upon an operator request. Each GUI process manages its displays independently. Any status change is handled by the individual processes.

In step 804, a filter that defines the specific operator view is read in. Each operator can define the view that his/her GUI process will display. Filter parameters include:

1. Traffic Alarms, Facility alarms, or both
2. Acknowledged Alarms, Unacknowledged Alarms, or both
3. Alarms on circuits within maintenance windows, Alarms on circuits that are not within a maintenance window, or both.
4. Alarms on circuits that have associated transmission alarms (DS-3 alarms via outage ids), Alarms on circuits that do not have associated transmission alarms, or both.
5. Alarms with a specified severity.
6. Alarms on nodes/circuits owned by a specified customer id.
7. Alarms on International circuits, Alarms on Domestic circuits, or both.

The operator's GUI displays are updated both upon initialization in step 804 and when filter changes are requested in steps 828 and 830. Each specific operator's instance of the Display Alarms 412 process opens a connection with Process Events 402 so that only alarm records relevant to the specific operator's filter are transmitted. In step 806, the specific operator's process registers itself with Process Events 402 to identify which alarms are to be sent. In step 808, the GUI display is presented to the operator.

The continuous execution of Display Alarms 412 begins in step 810. Each event that is to be retrieved and presented, as defined by the operator filter, is received and identified. In steps 812, 816, 820, 826, and 836 SNMS determines what to do with the event based on the event type identification made in step 810. In steps 812 and 816, if the event is determined to be an alarm update or a topology update, the operator's GUI display is updated to reflect this, in steps 814 and 818, respectively. Then the next event is received, in step 810.

In step 820, if the event is determined to be an operator action, two activities are required. First, in step 822, the operator's GUI display is updated to reflect the status change. Then, in step 824, a status change update is sent to the main process, Process Events 402, so that the status change may be reflected in SNMS records and other GUI processes (for other operators) can receive and react to the status changes.

In step 826, if the event is determined to be an operator display action, then it is determined if the action is a filter change request or a display request. In step 828, if it is determined to be a filter change request, then in step 830 the GUI process registers with Process Events 402 so that the appropriate alarms records are transmitted. In step 832, if it is determined to be an operator display request, then in step 834 the requested display is presented to the operator. Display requests may include:

1. node detail and connection
2. circuit connection
3. linkset connection
4. unknown topology alarms (alarms on objects that are not defined in the topology databases)
5. STP pair connections
6. Nodes contained within a LATA
7. Home/Mate connections (for non-adjacent nodes)
8. NPA/NXX lists
9. trunk group lists
10. end office access tandem
11. rules definition help screens (aid the operator in understanding the actual algorithm used in generating the alarm
12. recommended actions (operator defined actions that should be taken when a specific alarm is received)

In step 836, if the event is determined to be a termination request, then the specific operator's GUI process is terminated in step 838. Otherwise, the next event is received in step 810. Within the Display Alarm process, SNMS provides several unique display windows which support fault isolation, impact assessments, and trouble handling. All of the GUI displays which contain node and circuit symbols are "active" windows within SNMS (i.e. screens are dynamically updated when alarm status of the node or circuit change). All the displays are possible due to the set of MCI topology sources used within SNMS. SNMS has extensive topology processing of SNMS which is used in operator displays.

A. SNMS Circuits Map

This window displays topology and alarm status information for a selected linkset. As network events are received, SNMS recognizes the relationships between endpoints and isolates the fault by reducing generated alarms. This display allows the operator to monitor a linkset as seen from both sides of the signaling circuit (from the perspective of the nodes).

B. SNMS Connections Map

This window presents a cluster view of MCI's signaling network. All MCI and non-MCI nodes connected to the MCI STPs in the cluster are displayed along with the associated linksets. A cluster view is important since a single STP failure/isolation is not service impacting, but a cluster failure is since all MCI SPs have connectivity to both MCI STPs in the cluster.

C. SNMS Nonadjacent Node Map

This window presents a STP pair view of a selected LEC signaling network. All LEC SPs, STPs, and SCPs (with signaling relationships to the MCI network) connected LEC STP pair are displayed. MCI's area of responsibility does not include the LEC STP to LEC SSP signaling links, so no linksets are displayed here. This display allows the SNMS operator to monitor a LEC signaling network as seen by the MCI nodes.

D. SNMS LATA Connections Map

This window presents a map of all LEC owned nodes that are located within a specified LATA. As well, the MCI STP pair that serves the LATA is also displayed along with the associated linksets (where applicable). This display allows the operator to closely monitor a specific LATA if/when problems surface within the LATA. LATA problems, while outside MCI's domain of control, can introduce problems within the MCI network since signaling messages are shared between the networks. As well, MCI voice traffic which terminates in the specified LATA can be affected by LATA outages.

E. NPA-NXX Information List

This window presents a list of NPX-NXX's served by a specified LEC switch. This display is very valuable during impact assessment periods (i.e. if the specified LEC switch is isolated, which NPA-NXX's are unavailable).

F. End Office Information List

This window presents a list of LEC end office nodes which are homed to the specific LEC access tandem. This display is very valuable during impact assessment periods (i.e. if the specified LEC tandem switch is isolated, which end offices are unavailable).

G. Trunk Group Information List

This window presents a list of MCI voice trunks, connected to a specified MCI switch, and the LEC end office switches where they terminate. This display is very valuable during impact assessment periods (i.e. what end offices are impacted when a MCI switch is isolated). This display is also available for selected LEC end office switches.

H. Filter Definition Window

The SNMS operator can limited the scope of his displays to:

type of alarms that should be presented severity of alarms that should be presented acknowledged alarms, unacknowledged alarms, or both alarms on circuits inside a planned outage window, alarms on circuits outside a planned outage window or both alarms that are not the result of a specified transmission network outage alarms on specified customer nodes or alarms on circuits connected to specified customer I. Trouble Ticket Window The SNMS operator can open trouble tickets on signaling alarms. These trouble tickets are opened in MCI's trouble ticketing system. Operators can also display the status of existing trouble tickets.

Figure 9:
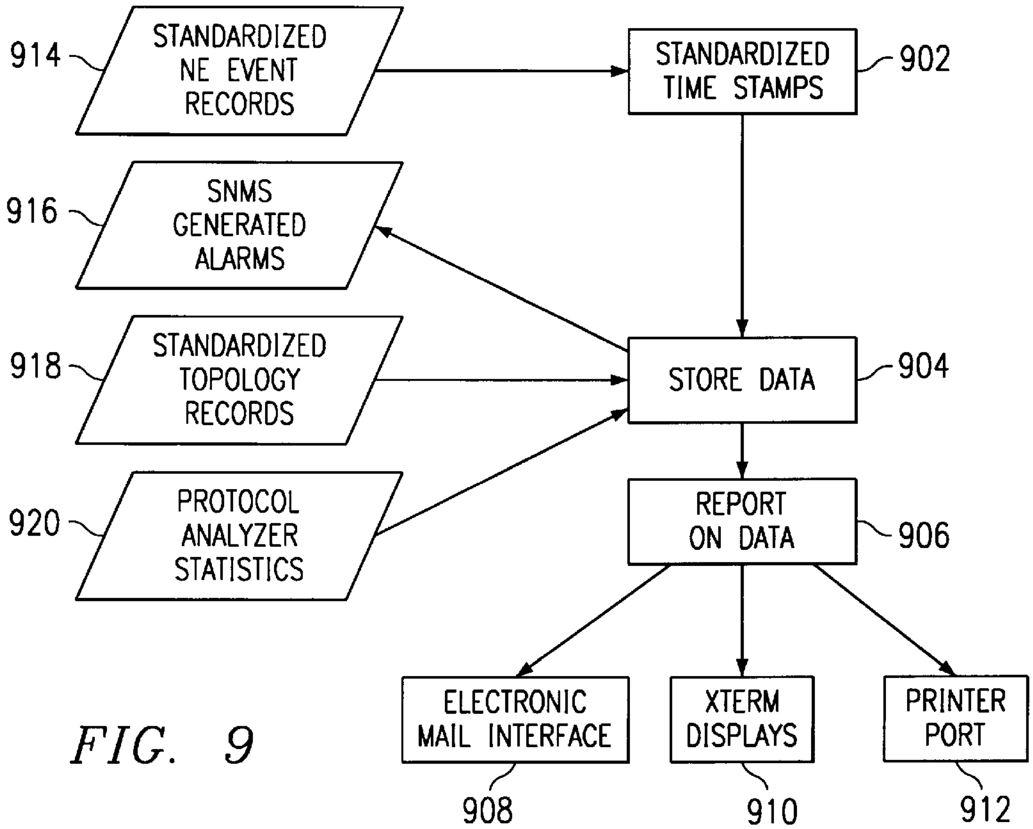

Referring now to FIG. 9, the detailed process of the Report On Data component 414 is illustrated. This process component, which runs on the Reporting server 304, stores SNMS-processed data and provides reports.

Standardized Network Element (NE) Event Records 914 are received with location specific time stamps. In step 902, the time stamps are converted into Greenwich Mean Time (GMT) so that standardized reports can be produced.

In step 904, all data received are stored in individual database tables. Data may also be archived for long-term storage to tape or disk. This data includes SNMS-generated alarms 916, standardized topology records 918, and performance statistics from PMUs 920. It may also include non-processed data, such as DS-3 alarms from NMS 338 and network maintenance schedule data 340.

In step 906, reports are produced. These reports may be custom or form reports. They may also be produced on demand, or per a schedule. These reports may be presented in a number of ways, including but not limited to electronic mail 908, X-terminal displays 910, and printed reports 912.

XII. VIDEO TELEPHONY OVER POTS

The next logical step from voice over the POTS is video. Today, computers are capable of making video "calls" to each other when connected to some type of computer network. However, most people only have access to a computer network by making a call from their modem on the POTS with another modem on a computer connected to a network, so that they can then "call" another computer on the network, which is in turn connected by a modem to another network computer. It is much simpler (and efficient) to call another person directly on the POTS and have the modems communicate with each other, without network overhead. ITU recommendation H.324 describes terminals for low bitrate (28.8 kbps modem) multimedia communication, utilizing V.34 modems operating over the POTS. H.324 terminals may carry real-time voice, data, and video, or any combination, including video telephony. H.324 terminals may be integrated into personal computers or implemented in stand-alone devices such as videotelephones and televisions. Support for each media type (voice, data, video) is optional, but if supported, the ability to use a specified common mode of operation is required, so that all terminals supporting that media type can interwork. H.324 allows more than one channel of each type to be in use. Other Recommendations in the H.324 series include the H.223 multiplex (combination of voice, data and video), H.245 control, H.263 video codec (digital encoder and decoder), and G.723.1.1 audio codec.

H.324 makes use of the logical channel signaling procedures of ITU Recommendation H.245, in which the content of each logical channel is described when the channel is opened. Procedures are provided for allowing each caller to utilize only the multimedia capabilities of their machine. For example a person trying to make a video (and audio) call to someone who only has audio and not video capabilities can still communicate with the audio method (G.723.1.1).

H.324 by definition is a point-to-point protocol. To conference with more than one other person an MCU (Multipoint Control Unit) is needed to act as a video-call bridge. H.324 computers may interwork with H.320 computers on the ISDN, as well as with computers on wireless networks.

A. Components of Video Telephony System

1. DSP modem pools with ACD.

A Digital Signal Processor (DSP) modem pool is a modem bank, with each modem having the ability to be programmed for extra functions (like new V. modem protocols, DTMF detection, etc.) A call is routed from the MCI switch to an ACD. The ACD keeps a matrix of which DSP modems are available. The ACD also communicates with the ISNAP which does a group select to determine which group of Agents are responsible for this call and also which of the agents are free to process this call. In an alternative embodiment, DSP resources can be deployed without an ACD, directly connected to a switch. In this embodiment, the DSP resources are managed using an NCS-based routing step.

2. Agent

An Agent can be a human Video Operator (video capable MTOC), or an Automated program (video ARU). The ACD knows which Agent ports are available and connects an Agent to an Agent Port.

3. Video on Hold Server

If the ACD has no Agent ports available, then the caller is connected to the Video On Hold Server, which has the ability to play advertisements and other non-interactive video, until the ACD finds a free Agent port.

4. Video Mail Server

Video-mail messages are stored here. Customers can manage their mail and record greetings to be stored on this server.

5. Video Content Engine

Video On Demand content resides on the Video Content Engine. Video stored here can be previously recorded videoconferences, training videos, etc.

6. Reservation Engine

When people want to schedule a multi-party videoconference, they can specify the participants and time of the conference on this system. Configuration can be done with the help of a human Video Operator or by some other form entry method.

7. Video Bridge

Because H.324 is a point-to-point protocol, a Multi-point Conferencing Unit (MCU) needs to manage each participants call and re-direct the video streams appropriately. MCU conferencing will be available for customers with H.324 and H.320 compliant systems.

B. Scenario

A computer or set-top TV has H.324 compliant software, and a modem for use over POTS, most likely to be 28.8 kbps (V.34) or higher. One objective is to call another party. If they do not answer or are busy, the originator has the option of leaving video-mail for the destination party. Another objective is to schedule and participate in a conference with more than two participants.

C. Connection Setup

FIG. 19B illustrates a call connection setup in accordance with a preferred embodiment. There are three methods for making a video-call to someone. The first method is to simply call them (from 1 and 7 of FIG. 19B. If the destination is busy or doesn't answer, then the caller can make another call to 1 800 VID MAIL and perform the appropriate procedures as follows.

When a user dials "1 800 VID MAIL" at 1, the ACD on the DSP modem pool will connect a switch to a modem 2 and a port to an Agent 3. Then the user logs-in to the system with a special, custom terminal program that utilizes the data stream part of the H.324 bandwidth (using the ITU T.120 standard), called the V-mail Data Interface (VMDI). From a graphical user interface, icon or other menu, the caller can choose to:

- browse and search a directory of video-capable MCI customers,
- call another H.324 compliant software program,
- create a video-mail for Store & Forward for later delivery,
- personalize and record their video-mail greeting messages,
- view and manage their video-mail, or
- view selections from a library of recordings (Video On Demand).

In an alternate embodiment, a user can dial "1 800 324 CALL" to call a number. Then, if the destination number was 1 319 375 1772, the modem dial string would be "ATDT 1 800 324 CALL ‘,’ 1 319 375 1772” (the comma ‘,’ tells the modem to do a short pause while dialing.) When the connection to 1 800 324 CALL is made, a connection is made from the originator, to an MCI switch 1, to an ARU 5*a*, selected by an ACD 2*a*, 3*a*.

The ARU 5*a* detects DTMF tones entered through a telephone keypad or other device for generating DTMF tones to get the destination number. The originator remains on hold while the ARU 5*a* makes a separate call to the destination number 5*a*, 6*a* and 7. If the destination answers, the originator is connected to the destination, both party’s modems can connect, and the ARU 5*a* is released. If the destination is busy or does not answer, the call is transferred to 1 800 VID MAIL or an Agent through the DSP modem pool 2. If there are no DTMF tones detected, the call is transferred to an Agent through the DSP modem pool 2. The Agent will make an H.324 connection with the caller and ask for their destination number (or provide help.) The architecture for this alternative is similar to how faxes are detected and transmitted in the directlineMCI system as discussed with respect to an alternative embodiment.

D. Calling the Destination

When the destination number is known, the Video On Hold Server provides the video input for the H.324 connection 4. A new call is made from the Agent 5, 6 to the destination number 7. One concern that required analysis while working out a detailed embodiment required determining if modems could re-synchronize after a switch operation without going off-line. If the destination number answers and is a modem, a connection MUST be made at the same speed as the originator modem speed. After modem handshaking is performed, the ACD instructs the switch to release the agent 3, 5 and releases the modems 2 and 6 and connects the originator to the destination 1 and 7. The destination PC realizes that the connection is an H.324 call (not a fax or otherwise) and the video-call proceeds.

In an alternate embodiment, if the destination answers and is a modem, a connection is made. Then, two H.324 calls are using two DSP modems. The Agent can be released from both calls 3 and 5. The incoming data from each call is copied to the other call 2 and 6. This way, an Agent can monitor the video call for Video Store & Forward 9. When one connection drops carrier, the video-call is complete, and the modem carrier for the remaining call is dropped.

E. Recording Video-Mail, Store & Forward Video and Greetings

If a destination number does not answer or is busy, the Video Mail Server will play the appropriate Video-Mail greeting for the owner of the destination number 8. The caller then leaves a video-message, which is stored on the Video Mail Server. The recording of video for Store & Forward Video is exactly the same as leaving a video-message, described above. Parameters such as destination number, forwarding time, and any other audio S&F features currently available are entered through the VMDI or communicated with a human video operator (or automated video ARU.)

To record a personalized greeting for playback when someone cannot reach you because you are busy or do not answer, is similar to leaving Video-Mail. The option to do this is done through the VMDI or communicated with a human video operator.

F. Retrieving Video-Mail and Video On Demand

Users have the choice of periodically polling their video-mail for new messages, or have the video-mail server call them periodically when they have a new message waiting. Configuration is done through the VMDI or human video operator. Managing and checking video-mail is also performed through the VMDI or communicated with a human video operator.

Choice of video to view for Video On Demand (VOD) is through the VMDI. These videos can be previously recorded video-conferences, training videos, etc. and are stored on the Video Content Engine 9.

G. Video-conference Scheduling

A user can navigate through the VMDI or Internet 10 WWW forms, or communicate with a human video operator to schedule a multi-point conference. This information is stored on the Reservation Engine 11. The other conference participants are notified of the schedule with a video-mail, e-mail message or otherwise. There will be an option to remind all registered conference participants at a particular time (e.g. 1 hour before the conference), through video-mail (or e-mail, voice-mail, paging service or any other available notification method). The MCU (video bridge) can call each participant 12, or H.324 users can dial In to the MCU at the scheduled time 12.

XIII. VIDEO TELEPHONY OVER THE INTERNET

FIG. 19E illustrates an architecture for transmitting video telephony over the Internet in accordance with a preferred embodiment. Real-time Transmission Protocol (RTP) based video-conferencing refers to the transmission of audio, video and data encapsulated as RTP messages. For a RTP-based video-conferencing session, a end-user station first establishes a dial-up Point-to-Point (PPP) connection with the Internet which is then used to transport the RTP messages. Audio information is compressed as per G.723.1.1 audio codec (coder—decoder) standards, Video is compressed in accordance with ITU H.263 video codec standards and data is transmitted as per ITU-T.120 standards.

RTP is a protocol providing support for applications with real-time properties. While UDP/IP is its initial target networking environment, RTP is transport-independent so that it can be used over IPX or other protocols. RTP does not address the issue of resource reservation or quality of service control; instead, it relies on resource reservation protocols such as RSVP. The transmission service with which most network users are familiar is point-to-point, or unicast service. This is the standard form of service provided by networking protocols such as HDLC and TCP.

Somewhat less commonly used (on wire-based networks, at any rate) is broadcast service. Over a large network, broadcasts are unacceptable (because they use network bandwidth everywhere, regardless of whether individual sub-nets are interested in them or not), and so they are usually restricted to LAN-wide use (broadcast services are provided by low-level network protocols such as IP). Even on LANs, broadcasts are often undesirable because they require all machines to perform some processing in order to determine whether or not they are interested in the broadcast data.

A more practical transmission service for data that is intended for a potentially wide audience is multicast. Under the multicast model on a WAN, only hosts that are actively interested in a particular multicast service will have such data routed to them; this restricts bandwidth consumption to the link between the originator and the receiver of multicast data. On LANs, many interface cards provide a facility whereby they will automatically ignore multicast data in which the kernel has not registered an interest; this results in an absence of unnecessary processing overhead on uninterested hosts.

A. Components

RSVP Routers with MBONE capability for broadcast of video from the Video Content Engine and the MCI Conference Space network. MCI will have an MBONE network that multicasts locally and transmits many unicasts out the Internet.

RSVP is a network control protocol that will allow Internet applications to obtain special qualities-of-service (QOS's) for their data flows. This will generally (but not necessarily) require reserving resources along the data path (s) either ahead of time or dynamically. RSVP is a component of the future "integrated services" Internet, which provides both best-effort and real-time qualities of service. An embodiment is presented in the detailed specification that follows.

When an application in a host (end system) requests a specific QOS for its data stream, RSVP is used to deliver the request to each router along the path(s) of the data stream and to maintain router and host state to provide the requested service. Although RSVP was developed for setting up resource reservations, it is readily adaptable to transport other kinds of network control information along data flow paths.

1. Directory and Registry Engine

When people are connected to the Internet (whether through modem dial-up, direct connection or otherwise), they can register themselves in this directory. The directory is used to determine if a particular person is available for conferencing.

2. Agents

An Agent can be a human Video Operator (video capable MTOC), or an Automated program (video ARU). An Internet ACD in accordance with a preferred embodiment is designed so that Agent ports can be managed. The ACD will know which Agent ports are available and connects an Agent to an available Agent Port. If the ACD has no Agent ports available, then the caller is connected to the Video On Hold Server, which has the ability to play advertisements and other non-interactive video, until the ACD finds a free Agent port.

3. Video Mail Server

Video-mail messages are stored here. Customers can manage their mail and record greetings to be stored on this server.

4. Video Content Engine

Video On Demand content resides on the Video Content Engine. Video stored here may be previously recorded video-conferences, training videos, etc.

5. Conference Reservation Engine

When people want to schedule a multi-party video-conference, they can specify the participants and time of the conference on this system. Configuration can be done with the help of a human Video Operator or by some other form entry method.

6. MCI Conference Space

This is the virtual reality area that customers can be present in. Every participant is personified as an "avatar". Each avatar has many abilities and features, such as visual identity, video, voice, etc. Avatars interact with each other by handling various objects that represent document sharing, file transferring, etc., and can speak to each other as well as see each other.

7. Virtual Reality Space Engine

The Conference Spaces are generated and managed by the Virtual Reality Engine. The virtual reality engine manages object manipulation and any other logical descriptions of the conference spaces.

B. Scenario

If a user has a current connection to the Internet. The user will utilize H.263 compliant system software utilizing RTP (as opposed to TCP) over the Internet. If the user also desires to participate in VR MCI conference-space, and create/view video-mail, the user can join a VR session.

C. Connection Setup

The simplest way to make a video call to another person on the Internet is to simply make the call without navigating through menus and options as an initial telephone call. However, if the destination is busy or not answering, MCI provides services for depositing messages.

A customer can login to a telnet server (e.g. telnet vmail.mci.com), or use a custom-made client, or the WWW (e.g. http://vmail.mci.com). The services menu is referred to as the V-Mail Data Interface (VMDI), similar to the VMDI available when dialing through POTS as described above.

From a menu, the caller can choose to:

browse and search a directory of video-capable MCI customers, call another H.263 compliant software program, create a video-mail for Store & Forward for later delivery, personalize and record their video-mail greeting messages, view and manage their video-mail, and view selections from a library of recordings (Video On Demand).

When a user has specified a party to call by indicating the destination's name, IP address or other identification, the Directory is checked. It is possible to determine if a destination will accept a call without actually calling; so, since it can be determined that the destination will accept a call, the originator's video client can be told to connect to the destination. If the callers are using a WWW browser (e.g. Netscape Navigator, Microsoft Internet Explorer, internetMCI Navigator, etc.) to access the VMDI, then a call can be automatically initiated using Java, JavaScript or Helper App. If a call cannot be completed, there will be a choice to leave video-mail.

D. Recording Video-Mail, Store & Forward Video and Greetings

If an Agent determines that a destination party is not available (off-line, busy, no answer, etc.), the Video Mail Server plays an appropriate Video-Mail greeting for the owner of the destination number 8. The caller then leaves a video-message, which is stored on the Video Mail Server. The recording of video for Store & Forward (S&F) Video is exactly the same as leaving a video-message, described above. Parameters such as destination number, forwarding time, and any other audio S&F features currently available are entered through the VMDI or communicated with a human video operator (or automated video ARU.)

Customers may record their own personalized greetings to greet callers that cannot reach them because they are busy or do not answer. This is accomplished in a manner similar to leaving Video-Mail, through the VMDI or communicated with a human video operator.

E. Retrieving Video-Mail and Video On Demand

Users have the choice of periodically polling their video-mail for new messages, or having the video-mail server call them periodically when they have a new message waiting. Configuration is done through the VMDI or human video operator. Managing and checking video-mail is also performed through the VMDI or communicated with a human video operator. A choice of video to view for Video On Demand (VOD) is provided through the VMDI. These videos can be previously recorded video-conferences, training videos, etc. and are stored on the Video Content Engine.

P. Video-conference Scheduling

A user can navigate through the VMDI or Internet 10 WWW forms, or communicate with a human video operator to schedule a conference in the Conference Space. The information is stored on the Conference Reservation Engine 8. The other conference participants are notified of the schedule with a video-mail, e-mail message or otherwise. An optional reminder is provided for all registered conference participants at a particular time (e.g. 1 hour before the conference), through video-mail (or e-mail, voice-mail, paging service or any other available notification method).

G. Virtual Reality

For multiple party conferences, a virtual meeting place can be generated by the Virtual Reality Space Engine. The implementation of the interface includes an embodiment based on VRML. Each person is in control of an "avatar." Each avatar can have many different features such as visual representation (static representation or live video "head") and audio (voice or music). Data exchange and collaboration are all actions that can be performed in each VR conference room. The private MBONE network allows the multicasting of conference member's data streams. Since everyone has a different view when interacting in VR-space, the VR Space Engine can optimize the broadcast of everyone's incoming H.263 streams to everyone else by multi-casting only those avatar streams in view for each particular avatar.

XIV. VIDEO-CONFERENCING ARCHITECTURE

MCI Video-Conferencing describes an architecture for multimedia communications including real-time voice, video and data, or any combination, including video telephony. The architecture also defines interoperation with other video-conferencing standards. The architecture also defines multipoint configurations and control, directory services and video mail services.

A. Features

Video-Conferencing architecture is a multimedia services system and is designed to provide a number of features and functions including,

- Point-to-Point Video Telephony
- Multimedia video-conferencing with a MCU for control and multimedia information processing
- Support for Gateways for interworking with other video-conferencing systems based on ITU H.320 and ITU H.324 standards
- Support for real-time voice, video and data or any combination
- Multimedia information streams are transported between the end-user terminals using standard transport protocol RTP
- Support for dynamic capability exchange and mode preferences, like ITU H.263 video and ITU G.723 audio, between end-user terminals FIG. 19C illustrates a Video-Conferencing Architecture in accordance with a preferred embodiment. The components and details of the video-conferencing architecture are detailed below.

B. Components

The Video-Conferencing System is comprised of a set of components including,

- End-User Terminals
- LAN Interconnect System
- ITU H.323 Server
- Support Service Units 1. End-User Terminals The end-user terminals are the end points of communication. Users communicate and participate in video conferences using the end-user terminals. End-user terminals, including ITU H.323 terminals 1 & 8, ITU H.320 terminal 9 and ITU H.324 terminal 10, are interconnected through the ITU H.323 Server which provides the call control, multipoint control and gateway functions. End-User terminals are capable of multimedia input and output and are equipped with telephone instruments, microphones, video cameras, video display monitors and keyboards.

2. LAN Interconnect System

The LAN Interconnect System 3 is the interface system between the MCI Switch Network 2 and the different H.323 Systems including H.323 Server 4, Video Content Engine 5, Video Mail Server 6 and also the H.323 Directory Server 7.

End-User terminals participating in video-telephony sessions or video-conferencing sessions establish communication links with the MCI switch network and communicate with the H.323 Server through the LAN Interconnect System. The LAN Interconnect system provides ACD-like functionality for the H.323 video-conferencing system.

3. ITU H.323 Server

The H.323 Server 4 provides a variety of services including call control, multipoint control, multipoint processing, and gateway services for interworking between terminals supporting different video-conferencing standards like ITU H.320 and ITU H.324.

The H.323 Server is comprised of a set of individual components which communicate with each other and with the other external systems like end-user terminals, video mail server and H.323 directory server. The different components of the H.323 Server include:

- H.323 Gatekeeper
- Operator Services Module
- H.323 Multipoint Control Unit (MCU)
- H.323 Gateway 4. Gatekeeper The H.323 Gatekeeper provides call control services to the H.323 terminals and Gateway units. The Gatekeeper provides a variety of services including:

- Call Control Signaling with terminals, gateways and MCU;
- Admissions Control for access to the video-conferencing system;
- Call Authorization;
- Bandwidth control and management;
- Transport Address Translation for translating addresses between different kinds of interworking video-conferencing systems;
- Call Management of on-going calls;
- Interfaces with the Directory Server[7] to provide directory services; and
- Interfaces with the Video Mail Server[6] for video mail services.

The Gatekeeper uses the ITU H.225 stream packetization and synchronization procedures for the different services, and is tightly integrated with the Operator Services Module for offering manual operator services.

5. Operator Services Module

The Operator Services Module offers manual/automatic operator services and is tightly integrated with the gatekeeper. The manual or the automatic operator terminal, located elsewhere on the LAN, interacts with the gatekeeper through the Operator Services Module to provide all the required operator services.

6. Multipoint Control Unit (MCU)

The MCU is comprised of the Multipoint Controller and the Multipoint Processor and together provides multipoint control and processing services for video-conferences. The multipoint controller provides control functions to support conferences between three or more terminals. The multipoint controller carries out capabilities exchange with each terminal in a multipoint conference. The multipoint processor provides for the processing of audio, video and/or data streams including mixing, switching and other required processing under the control of the multipoint controller. The MCU uses ITU H.245 messages and methods to implement the features and functions of the multipoint controller and the multipoint processor.

7. Gateway

The H.323 Gateway provides appropriate translation between the various transmission formats. The translation services include,

- Call Signaling message translation between H.225 and H.221 which is the part of the H.320 system;
- Communication procedures translation between H.245 and H.242; and
- Translation between the video, audio and data formats like H.263, H.261, G.723, G.728 and T.120.

The H.323 Gateway provides conversion functions for transmission format, call setup and control signals and procedures.

8. Support Service Units

The Support Service Units include the H.323 Directory Server 7, the Video-Mail Server 6 and the Video Content Engine 5 which interact with the H.323 Server for providing different services to the end-user terminals. The H.323 Directory Server provides directory services and interacts with the gatekeeper unit of the H.323 Server. The Video Mail Server is the repository of all the video mail generated by the H.323 system and interacts with the gatekeeper unit of the H.323 server for the creation and playback of video mail. The Video Content Engine is the repository of all other types of video content which can be served to the end-user terminals. The Video Content Engine interacts with the gatekeeper unit of the H.323 Server.

C. Overview

The H.323 based video-conferencing architecture completely describes an architecture for multimedia communications including real-time voice, video and data, or any combination including video telephony. Users with H.323 terminals can participate in a multimedia video-conferencing session, a point-to-point video telephony session, or an audio only session with other terminal users not equipped with video facilities. The architecture also includes gateways for interworking with other video-conferencing terminals based on standards like ITU H.320 and ITU H.324.

The architecture includes a directory server for offering complete directory services including search facilities. A video mail server is an integral part of the architecture providing for the recording and playback of video mail. A video content engine is also part of the overall architecture for offering multimedia content delivery services.

H.323 terminals participating in a video-conferencing or a video telephony session communicate with the H.323 server through the MCI switch network. The H.323 server offers a variety of services including call control, information stream delivery, multi-point control and also gateway services for interworking with H.320 or H.324 terminals. The server also offers directory services and video mail services.

A H.323 terminal initiating a video call establishes a communication link with the H.323 Server through the MCI switch network. On admission to the network by the H.323 server, the server offers a directory of other available terminals to the call initiating terminal which selects a destination terminal or a destination group to participate in a video conference. The server then sets up a communication link with the selected destination terminal or terminals and finally bridges the calling terminal and the called terminal/terminals. If the destination terminal is unavailable or busy, the server offers the calling terminal an option to deposit a video mail. The server also notifies the recipient of the video mail and offers the recipient services for retrieval of the video mail on-demand. Additional services like content delivery on-demand to H.323 terminals are also offered and controlled by the H.323 server.

D. Call Flow Example

The Call Flow for the H.323 architecture based video-conferencing is explained in detail for different call types including, Point-to-Point Calls including calls to other H.323, H.320 and H.324 terminals; and Multipoint Video-Conference Calls.

FIG. 19C illustrates various call flows in accordance with a preferred embodiment.

1. Point-to-Point Calls a) Case 1: H.323 Terminal to another H.323 Terminal

A call initiating H.323 terminal 1 initiates a call to another H.323 terminal[8] through the MCI Switch Network. The gatekeeper is involved in controlling the session including call establishment and call control. The Terminal end-user interface is any commercially available Web-browser.

- Calling terminal 1 initiates a dial-up call to the MCI Switch network;
- the call is terminated on the H.323 Gatekeeper module of the H.323 Server 4 through the LAN Interconnect 3 system;
- a PPP link is established between the calling terminal and the Gatekeeper 4 on a well-know unreliable transport address/port;
- Calling terminal sends a admission request message to the Gatekeeper[4]
- The Gatekeeper 4 sends an admission confirm message and communicates with the Directory Server 7 and sends back directory information to calling terminal for display at the calling terminal, and the directory information is displayed as a web-page along with a choice of calling modes including Point-to-Point or Conference mode;
- the admissions exchange is followed by the setting up of a reliable connection for H.225 call control messaging on a well known port;
- the terminal user chooses the point-to-point mode and also chooses the destination of the call. This is the setup request message;
- the gatekeeper 4 together with the operator services module/operator proceeds with calling the called terminal 8 with a setup request;
- if setup request fails, the gatekeeper 4 informs the calling terminal 1 of the failure and provides an option for the calling terminal 1 to leave a video mail;
- if the user at calling terminal 1 chooses to leave a video mail for user at the destination terminal 8, the gatekeeper 4 establishes a connection with the Video Mail Server 6 and receives a reliable port address from the mail server 6 for a H.245 connection;

- the gatekeeper 4 additionally establishes a connection for H.225 call control with the video mail server 6.
- the gatekeeper 4 in-turn sends a reliable port address to calling terminal 1 for H.245 control channel. The gatekeeper 4 may be involved in H.245 control channel communications;
- the calling terminal 1 establishes a reliable connection for H.245 control channel and H.245 procedures like capability exchange, mode preferences, etc. are carried out;
- after the capabilities exchange, H.245 procedures will be used to establish logical channels for the different media streams;
- the capabilities exchange also involves determination of dynamic port addresses for the transport of the different media streams;
- the media streams are transported over the dynamic ports in the various logical channels;
- once the terminal has completed the video mail, it closes the logical channel for video after stopping transmission of the video stream;
- data transmission is stopped and logical channel for data is closed;
- audio transmission is stopped and logical channel for audio is closed;
- H.245 call clearing message is sent to the peer entity;
- calling terminal 1 transmits a disconnect message on the H.225 port to the gatekeeper 7 which in turn sends the disconnect message to the video mail server 6;
- the disconnect messages are acknowledged and the call is disconnected;
- if the setup request is a success, called terminal 8 responds with a connect message which include a reliable port address for H.245 connection;
- the gatekeeper 4 responds to the calling terminal 1 with the connect message along with the port address for the H.245 control channel communications;
- calling terminal 1 sets up a connection for H.225 call control signaling with the gateway 4, establishes another connection for H.245 control channel communications and responds to the gateway 4 with connect acknowledgment message;
- the gatekeeper 4 in-turn sends the connect acknowledgment message to called terminal 8.
- called terminal 8 now sets up a H.225 call control connection and also establishes another connection for H.245 with the gatekeeper 4 for control channel communications;
- the terminals, having established a H.245 control channel for reliable communication, exchange capabilities and other initial procedures of H.245, and an audio channel may be optionally opened before the capabilities exchange;
- following the capabilities exchange, logical channels over dynamic ports are established for each of the media streams;
- once the media logical channels are open over dynamic ports, media information can be exchanged;
- during the session, H.245 control procedures may be invoked for changing the channel structure like mode control, capability, etc.;
- also H.225 control channel is for specific procedures as requested by the gatekeeper[4] including call status, bandwidth allocation, etc.;
- for termination, either terminal may initiate a stop video message, discontinue video transmission and then close the logical channel for video;
- data transmission is discontinued and the logical channel for data is closed;
- audio transmission is discontinued and logical channel for audio is closed;
- H.245 end session message is sent and transmission on the control channel is stopped and the control channel is closed;
- terminal receiving the end session message will repeat the closing procedures and then H.225 call signaling channel is used for call clearing; and
- terminal initiating the termination will send a disconnect message on the H.225 control channel to the gatekeeper 4 which in turn sends a disconnect message to the peer terminal. The peer terminal acknowledges the disconnect which is forwarded to the initiating terminal and the call is finally released.

b) Case 2: H.323 Terminal to H.320 Terminal

A call initiated from a H.323 terminal 1 invokes a call to a H.320 terminal 9 through an MCI Switch Network. The gatekeeper along with the gateway is involved in controlling the session including call establishment and call control. A terminal end-user interface is any of the commercially available Web-browsers or a similar interface.

The call flow is similar to a H.323 terminal calling another H.323 terminal as explained in the previous case except that a gateway 4 component is introduced between the gatekeeper 4 and the called terminal 9. The gateway transcodes H.323 messages including audio, video, data and control to H.320 messages and vice-versa. If the H.320 terminal 9 initiates a call to a H.323 terminal[1], the initial dial-up routine is performed by the gateway and then the gatekeeper takes over the call control and the call proceeds as explained in the previous case.

c) Case 3: H.323 Terminal to H.324 Terminal

Call initiating H.323 terminal 1 initiates a call to a H.324 terminal 10 through the MCI Switch Network. The gatekeeper along with the gateway is involved in controlling the session including call establishment and call control. The Terminal end-user interface is a Web-browser or a similar interface.

The call flow is similar to a H.323 terminal calling another H.323 terminal as explained in the previous case except that a gateway 4 component is introduced between the gatekeeper 4 and the called terminal 9.

The gateway 4 transcodes H.323 messages including audio, video, data and control to H.324 messages and vice-versa.

If the H.324 terminal 10 initiates a call to a H.323 terminal 1, the initial dial-up routine is performed by the gateway and then the gatekeeper takes over the call control and the call proceeds as explained in the previous case.

2. Multipoint Video-Conference Calls

In the case of multipoint video-conference, all the terminals exchange initial call signaling and setup messages with the gatekeeper 4 and then are connected to the Multipoint Controller 4 for the actual conference including H.245 control channel messaging through the gatekeeper 4.

The following are the considerations for setting up a conference:

- After the initial admission control message exchange, the users are presented with a web page with information about conference type and a dynamic list of participants.

Participants joining later are presented with a web page with conference information and also are requested to enter authentication information.

All users get connected to the multipoint controller[4] through the gatekeeper[4].

The multipoint controller[4] distributes information among the various participants.

E. Conclusion

The video-conferencing architecture is a total solution for multimedia communications including real-time voice, video and data, or any combination, including point-to-point video telephony. The architecture defines interworking with other systems utilizing ITU recommendations. Additional services including directory services and video mail services are also part of the overall architecture.

XV. VIDEO STORE AND FORWARD ARCHITECTURE

The Video Store and Forward Architecture describes a video-on-demand content delivery system. The content may include video and audio or audio only. Input source for the content is from the existing video-conferencing facility of MCI or from any video/audio source. Input video is stored in a Digital Library in different standard formats like ITU H.320, ITU H.324, ITU H.263 or MPEG and delivered to the clients in the requested format. Delivery is at different speeds to the clients either on the Internet or on dial-up lines including ISDN and with a single storage for each of the different formats.

A. Features

The Video Store and Forward Architecture is designed with a rich set of features and functionality including:

Delivers Video and Audio on demand;

Supports different compression and transmission standards including ITU H.320, ITU H.324, MPEG and ITU H.263 on both IP (Internet Protocol) and RTP (Real Time Transport Protocol);

Supports content delivery on the Internet, by dial-up ISDN lines and by low speed (28.8 kbps) Analog Telephone lines;

Supports single source of content and multiple storage and delivery formats and multiple delivery speeds; and Supports Content Management and Archival in multiple formats.

B. Architecture

FIG. 19D is a Video Store and Forward Architecture in accordance with a preferred embodiment.

C. Components

The Video Store and Forward architecture can be completely described by the following components.

Content Creation and Transcoding.

Content Management and Delivery.

Content Retrieval and Display.

1. Content Creation and Transcoding

Input sources include analog video, video from Multi-Point Control Unit (MCU) and other video sources 1*a* and 1*b*. Input content is converted to standard formats like ITU H.261, ITU H.263, ITU H.320, ITU H.263, ITU H.324, MPEG and also formats to support delivery of H.263 over RTP and H.263 over an Internet Protocol 2 and 3. Input can initially be coded as H.263 and optionally transcoded into the various other formats and stored 2. The transcoded content is stored on different servers, one for each content type to serve the various clients each supporting a different format 5*a*, 5*b*, 5*c*, 5*d*, 5*e* and 5*f*.

2. Content Management and Delivery

Content is stored on different servers with each server supporting a specific format and is managed by a Digital Library consisting of:

Index Server for managing the indexes and archival of content 4,

Object Servers for storage of content 5*a*, 5*b*, 5*c*, 5*d*, 5*e* and 5*f*, Proxy Client as a front end to the Index and Object Server and interacting with the different clients requesting for content 6.

Content Delivery is by:

Internet,

Dial-up ISDN lines,

Dial-up Analog Telephone lines at 28.8 kbps, and

Content format is either a MPEG Stream, H.320 Stream, H.324 Stream, or a H.263 Stream transported over IP or RTP.

3. Content Retrieval and Display

Content Retrieval is by clients supporting various formats:

MPEG Client—7*a;*

ITU H.263 Client supporting RTP—7*b;*

ITU H.263 Client supporting IP—7*c;*

ITU H.320 Client—7*d*; and

ITU H.324 Client—7*e*.

Content is retrieved by the different clients on demand and displayed on a local display.

Clients support VCR like functions like fast-forward, re-wind, etc.

D. Overview

Analog Video from different sources and H.320 video from an MCU is received as input and transcoded into various formats as required like ITU H.324, ITU H.261, ITU H.263 or MPEG and stored on the different Object Servers dedicated for each of the formats. The Object Servers are in turn managed by the Index Server and are together called a Digital Library. Any request from the clients for content is received by the Index Server and in turn serviced by the Object Server through a Proxy Client.

The Index Server or the Library Server respond to requests from the proxy client and store, update and retrieve objects like H.261, H.263 or MPEG multimedia information on the object servers. Then they direct the object server to deliver the retrieved information back to the proxy client. The Index Server has the complete index information of all the different objects stored on the object servers and also information on which of the object server the information is residing on. The index information available on the Index Server is accessible by the proxy client for retrieval of multimedia content from the different object servers. Security and access control is also part of the index server functionality.

The Object Servers are an integral part of the Digital Library providing physical storage and acting as the repository for the multimedia content, including the video-conferencing information stream from the conferencing facilities. The multimedia content is stored in standard formats which can be retrieved by the proxy client on demand. Each of the Object Servers are dedicated for a specific format of multimedia content like H.261, H.263, MPEG, etc. The organization and index information of the multimedia content including information about the specific object server dedicated for a multimedia format is managed by the index server. The Object Server delivers the stored multimedia content to the proxy client upon receiving specific instructions from the index server.

The Proxy Client is the front end of the digital library and is accessed by all the clients through the Internet for on-demand multimedia content. The Proxy Client also is a World Wide Web (WWW) Server and delivers a page to the clients when accessed. The clients interact with the Proxy Client and thereby with the Digital Library through the WWW pages. Clients request multimedia content by interacting with the WWW pages. The Proxy Client receives the request from the clients through the WWW pages and processes the request. The Proxy Client then communicates with the index server with object queries as requested by the client. The index server then communicates with one of the object servers dedicated to the requested multimedia format and, based on the index information available at the index server, directs the object servers to deliver the requested multimedia content to the Proxy Client. The Proxy Client receives the multimedia content from the object server and delivers it to the client making the request.

The Clients connect to the Servers either through the Internet or by dial-up connections on an ISDN line or an Analog line at 28.8 Kbps depending on the video format requested and the client capabilities. A H.320 client connects by an ISDN line and a H.324 client requests services on an analog telephone line at 28.8 Kbps. A MPEG client or a H.263 client using RTP or a H.263 client using IP request services through the Internet. The front-ends for multimedia content query and display like the WWW browsers are integrated as a part of the Client and provide an easy-to-use interface for the end-users.

A request for video from the client is received by the proxy client which routes the request to the Index Server which is turn processes the request and communicates with a specific Object Server in addition to indexing the content for delivery. The Object Server delivers the requested content to the client through the Internet. In the case of the dial-up links, the content is delivered back on the already established link.

In sum, the Video Store and Forward architecture describes a comprehensive system for the creation, transcoding, storage, archiving, management and delivery of video and audio or audio on demand. The delivery of video and audio or audio will be on the Internet or by ISDN or Analog Telephone dial-up lines. Content including video and audio or audio is delivered at various data rates from individual storage locations, each serving a different delivery speed.

XVI. VIDEO OPERATOR

A. Hardware Architecture

Figure 96:
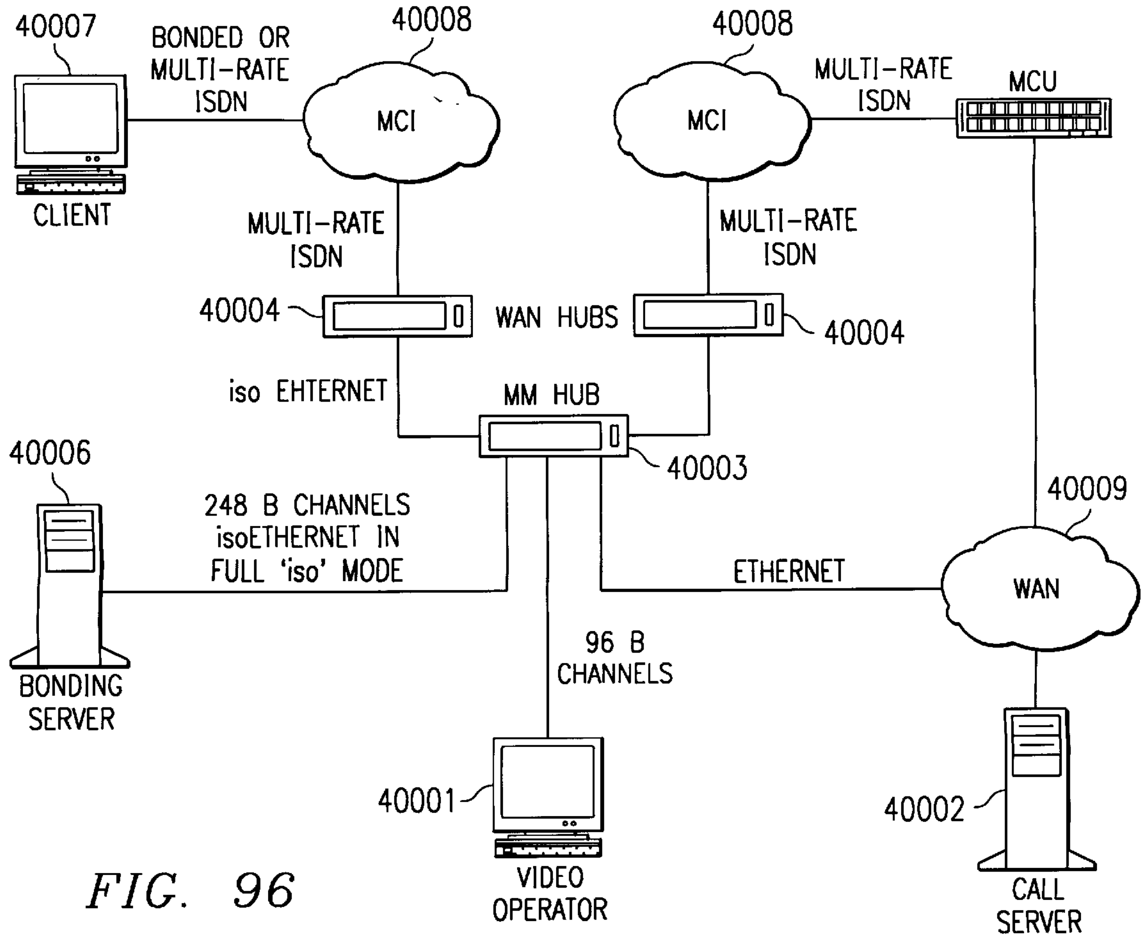
FIG. 96 shows a hardware component embodiment for allowing a video operator to participate in a video conferencing platform, providing services including but not limited to monitoring, viewing and recording any video conference call and assisting the video conference callers in accordance with a preferred embodiment.

FIG. 96 shows the system hardware for allowing a video operator to participate in a video conference or video call, providing numerous services to the video callers. Among the services provided are: answering incoming video calls or dialing out to customer sites; accessing a system for maintaining video conference schedules, joining callers using Bandwidth on Demand Interoperability Group ("BONDING") calls or International Telecommunication Union-Telecommunication Standardization Sector ("ITU-T") standard H.320 Multi-rate Bearer Service (MRBS) Integrated Services Digital Network ("ISDN") calls into a video conference or video call; monitoring, viewing and recording any video conference or video call; playing back video conferences or video calls recorded earlier; and offering assistance to or responding to inquiries from video conference callers during video conferences or video calls.

The system hardware is comprised of a Video Operator Terminal 40001, a Call Server 40002, a multimedia hub ("MM Hub") 40003, wide area network hubs ("WAN Hubs") 40004, a multi-point conferencing unit ("MCU") 40005, a BONDING Server 40006, a Client Terminal 40007, and a switching network ("MCI") 40008.

In one embodiment, the Video Operator Terminal 40001 is a Pentium-based personal computer with a processing speed of 90 MHz or greater, 32 MB RAM, and a hard disk drive with at least 1.0 GB storage space. The operating system in this embodiment is Microsoft's Windows 95. Special features include Incite Multimedia Communications Program ("MCP") software, an H.320 video coder/decoder ("codec") card for audio and video compression (e.g. Zydacron's Z240 codec), and an isochronous Ethernet ("isoEthernet") network interface card. Incite's MCP manages the isoEthernet network interface card to create the equivalent of 96 ISDN B-channels in isochronous channels for transmission of video signals.

The Call Server 40002 in this embodiment is a Pentium-based personal computer with a processing speed of 90 MHz or greater, 32 MB RAM, and a hard disk drive with at least 1.0 GB storage space. The operating system is Microsoft's Windows NT Server. Special features include the Incite Call Server services and an Ethernet network interface card.

Different embodiments of the system accommodate any model of MM Hub 40003 and any model of WAN Hub 40004. In one embodiment, the MM Hub 40003 is the Incite Multimedia Hub, and the WAN Hub is the Incite WAN Hub. The MM Hub 40003 is a local area network ("LAN") hub that connects, via numerous ports supporting isoEthernet interfaces each with a bandwidth consisting of 96 full-duplex B-channels, to personal computers such as the Video Operator Terminal 40001 and the BONDING Server 40006, to WAN Hubs 40004, or to other cascaded MM Hubs. In addition, the MM Hub 40003 can accept up to ten Mbps of Ethernet data via an Ethernet interface such as the one from the Call Server 40002. The WAN Hub 40004 acts as an interface between an MM Hub 40003 and a public or private switched network such as MCI 40008, enabling video conferencing to extend beyond the WAN or LAN containing the MM Hub 40003 and WAN Hub 40004.

Different embodiments of the system also accommodate various manufacturers' MCU 40005 devices. The function of an MCU 40005 is to allow video conference callers using a variety of different devices, possibly communicating over different circuit-based digital networks, to communicate with one another in a single video conference. For example, one embodiment employs VideoServer's Multimedia Conference Server ("MCS"), which mixes audio to allow any one video conference caller to hear the complete video conference discussion and processes video to allow each video conference caller to see all other callers simultaneously.

In one embodiment, the BONDING Server 40006 is a Pentium-based personal computer with a processing speed of 90 MHz or greater, 32 MB RAM, and a hard disk drive with at least 1.0 GB storage space. The operating system in this embodiment is Microsoft's Windows 95. Special features include Incite BONDING Server software, a Digital Signal Processor ("DSP") card (such as Texas Instrument's "TMS320C80" DSP), and an isoEthernet network interface card. Where a Client Terminal 40007 makes BONDING or Aggregated video calls, the BONDING Server 40006 converts the calls to multi-rate ISDN calls used within the video operator platform.

In a preferred embodiment, the Client Terminal a Pentium-based personal computer with a processing speed of 90 MHz or greater, 32 MB RAM, and a hard disk drive with at least 1.0 GB storage space. The operating system is Microsoft's Windows 95 in this embodiment, and the Client Terminal 40007 is equipped with audio and video equipment making it compatible with ITU-T standard H.320.

In this embodiment, the switching network is an integrated services digital network ("ISDN") provided by MCI 40008.

The Video Operator Terminal 40001 is connected to the MM Hub 40003 via an isoEthernet interface with a bandwidth of 96 full-duplex B-channels, which allows each video operator to manage up to eight video conferencing clients, each client employing a Client Terminal 40007. The MM Hub 40003 is connected to WAN Hubs 40004 via similar isoEthernet local area network ("LAN") connections. One WAN Hub 40004 connects through MCI 40008 to an MCU 40005 via multi-rate ISDN interfaces. Another WAN Hub 40004 connects to MCI 40008 via a multi-rate ISDN interface, and MCI connects to each Client Terminal 40007 via a BONDING or multi-rate ISDN interface. In a three-way connection, the MCU 40005, the Call Server 40002 and the MM Hub 40003 are connected to one another through an Ethernet wide area network ("WAN") 40009. The MM Hub 40003 is also connected to a BONDING Server 40006 via an isoEthernet interface with a bandwidth of 248 B-channels in full "iso" mode.

B. Video Operator Console

Figure 97:
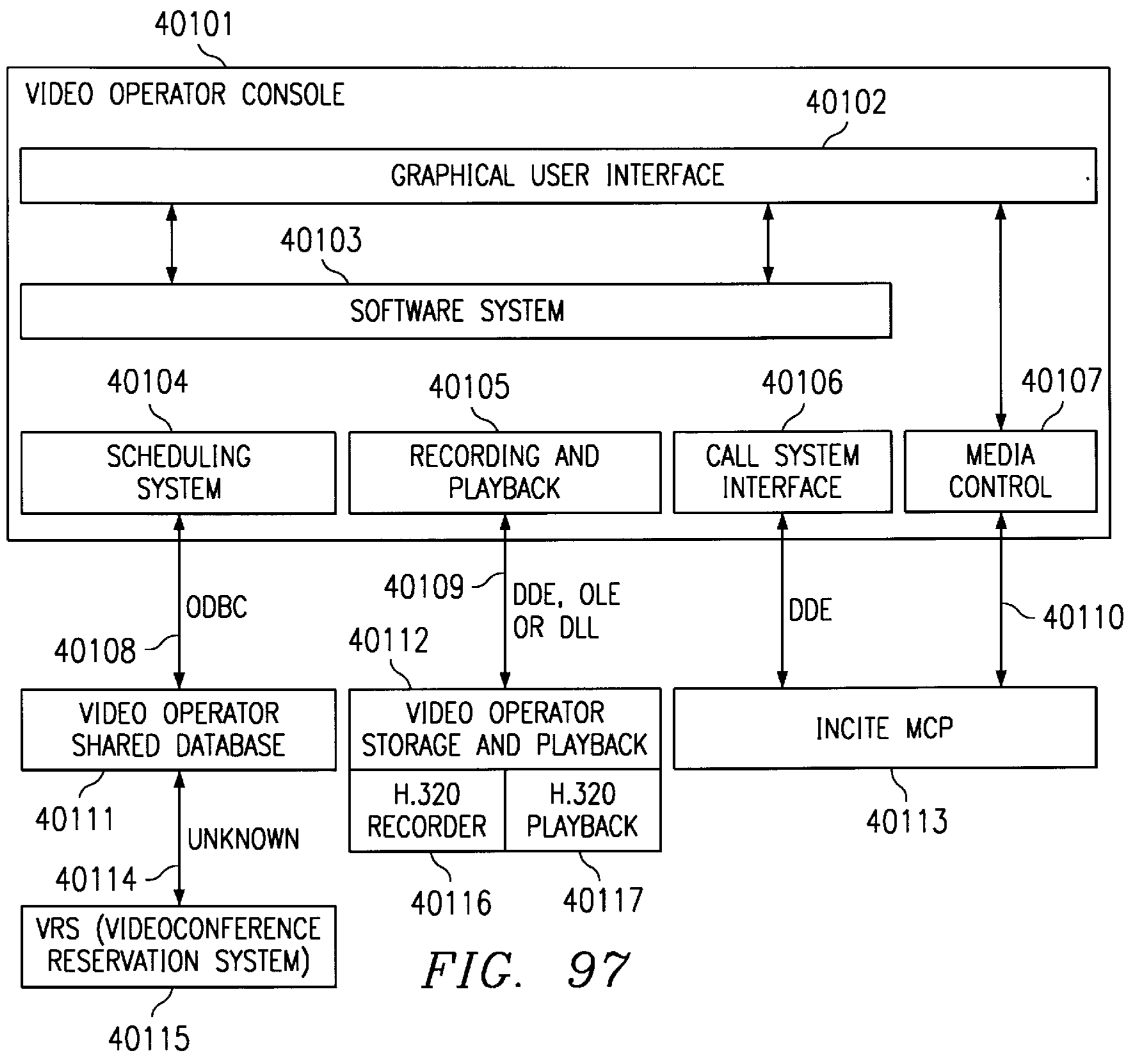
FIG. 97 shows a system for enabling a video operator to manage video conference calls which includes a video operator console system in accordance with a preferred embodiment.

FIG. 97 shows one embodiment of the system for enabling a video operator to manage video conference calls, which includes a Video Operator Console system 40101 and external systems and interfaces 40108 through 40117.

The Video Operator Console system 40101 is comprised of a Graphical User Interface ("GUI") 40102, a Software System 40103 and a Media Control system 40107. The GUI 40102 interacts with both the Software System 40103 and the Media Control system 40107 to allow a video operator to perform all functions of the video operator invention from the Video Operator Terminal [40001 FIG. 96] using the Video Operator Console system 40101.

The Software System 40103 implements the following systems: a Scheduling system 40104 which manages the video operator's schedule; a Recording and Playback system 40105 which records the audio and video input from any call and plays back audio and video input through any call; and a Call System Interface 40106 which acts as an application program interface with the Incite MCP application to manage individual calls by performing switching functions such as dial and hold.

The Scheduling system 40104 is connected via an Open Database Connectivity ("ODBC") interface 40108 to a Video Operator Shared Database 40111, which is in turn connected via an interface between VOSD and VRS 40114 to a Videoconference Reservation System ("VRS") 40115. The VRS 40115 submits video conference schedules, conference definitions and site definitions to the Video Operator Shared Database 40111 via the interface 40114 either on a regular basis or on demand by a database agent system within the Video Operator Shared Database 40111. The Video Operator Shared Database 40111, residing in a different computer from that containing the Video Operator Console 40101 in a preferred embodiment, stores all conference and site information such that each Video Operator Console 40101 can retrieve the necessary conference and site configurations for any video conference call. In an alternative embodiment of the external systems associated with the internal Scheduling system 40104, the Video Operator Shared Database 40111 and VRS 40115 may be merged into a single system.

The Recording and Playback system 40105 communicates via a Dynamic Data Exchange ("DDE"), Object Linking and Embedding ("OLE") or Dynamic Link Library ("DLL") interface 40109 with a Video Operator Storage and Playback system 40112 located locally in the Video Operator Terminal [40007 FIG. 96]. The Video Operator Storage and Playback system is comprised of a uni-directional recording device 40116 conforming to ITU-T standard H.320 and a uni-directional playback device 40117 conforming to ITU-T standard H.320. Conference calls are recorded by transmitting the digitized audio and video signals from the Video Operator Console 40101 to the H.320 recorder 40116. Conference calls are played back by retrieving a previously recorded conference call from disk storage and transmitting the audio and video signals from the H.320 playback device 40117 to the Video Operator Console.

The Call System Interface system 40106 communicates via a DDE interface 40110 with the Incite MCP application 40113 to manage switching functions such as dial, hold, etc.

The Media Control system 40107 allows the GUI 40102 to communicate directly with external components to manage the GUI 40102 presentation of audio and video. In the embodiment shown in FIG. 401, the Media Control system 40107 communicates via a DDE interface 40110 with the Incite MCP application 40113. The Incite MCP application 40113 provides all necessary call setup features and multimedia features such as video window placement and audio control through the DDE interface 40110 to the internal Media Control system 40107, and on to the GUI 40102.

Figure 98:
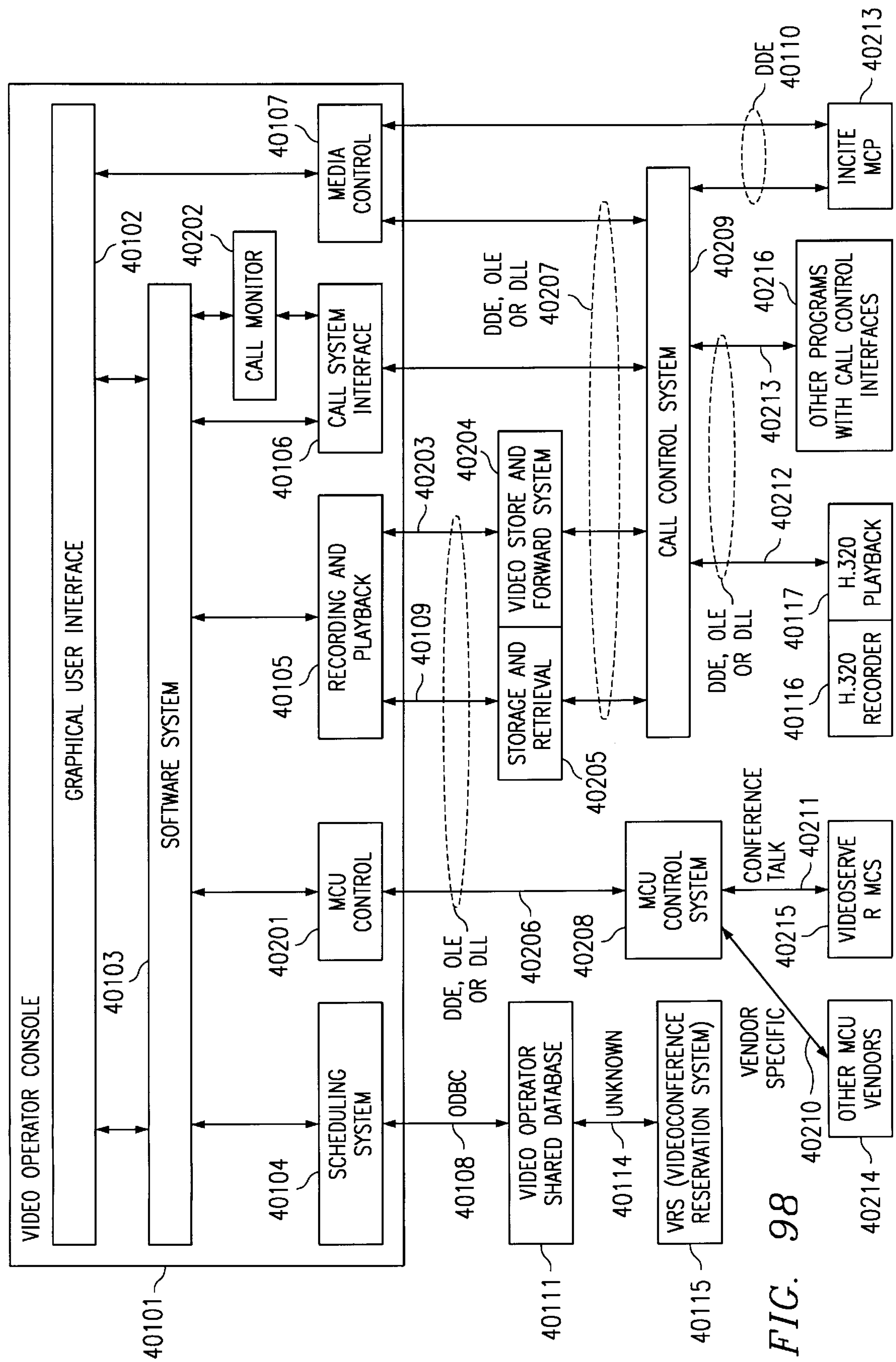
FIG. 98 shows a system for enabling a video operator to manage video conference calls which includes a video operator console system in accordance with a preferred embodiment.

FIG. 98 shows a second embodiment of the system for enabling a video operator to manage video conference calls, which includes a Video Operator Console system 40101 and external systems and interfaces 40108 through 40117 and 40203 through 40216. In this embodiment, however, the Software System 40103 is compatible with not only VideoServer's "MCS" 40215 MCU, but also other manufacturers' MCU applications. Thus the internal software system MCU control 40201, the external software system MCU Control System 40208, the MCUs themselves 40214 and 40215, and the interfaces between them 40206, 40210 and 40211, appear in FIG. 98. In addition, because not only the Incite MCP 40113 application but also "Other programs with call control interfaces" 40216 may provide necessary call setup and multimedia features in this embodiment, the external Call Control System 40209 is necessary, as are the intervening DDE, OLE or DLL interfaces 40207, 40212 and 40213. This embodiment also includes a Video Store and Forward system 40204 and its DDE, OLE or DLL interface 40203. Finally, the second embodiment adds the internal software system Call Monitor 40202.

As in the first embodiment, the Video Operator Console system 40101 is comprised of a GUI 40102 and a Software System 40103. However, in addition to the Scheduling system 40104, the Recording and Playback system 40105 and the Call System Interface 40106, the software system in the second embodiment includes the MCU control 40201 and the Call Monitor 40202.

The Scheduling system 40104 and associated external systems 40108, 40111, 40114 and 40115 are identical to the those in the first embodiment, pictured in FIG. 97 and described above.

The internal MCU control 40201 communicates via a DDE, OLE or DLL interface 40206 with the external MCU Control System 40208 to manage resources and features specific to various different MCU systems. The MCU Control System 40208 communicates either via a ConferenceTalk interface 40211 with the VideoServer MCS 40215 or via another vendor-specific interface 40210 with some Other MCU vendors' MCU 40214.

The Recording and Playback system 40105 communicates via DDE, OLE or DLL interfaces 40109, 40203 with both the Storage and Retrieval system 40205 and the Video Store and Forward system 40204. The Storage and Retrieval system 40205 and Video Store and Forward system 40204 communicate via another DDE, OLE or DLL interface 40207 with the Call Control System 40209. The Call Control System 40209 communicates via another DDE, OLE or DLL interface 40212 with a uni-directional H.320 recorder 40116 and a uni-directional H.320 playback device 40117. Conference calls recorded by transmitting the digitized audio and video signals from the Video Operator Console 40101 through the Storage and Retrieval system 40205 and Call Control System 40209 to the H.320 recorder 40116. Conference calls are played back by retrieving a previously recorded conference call from disk storage and transmitting the audio and video signals from the H.320 playback device 40117 through the Call Control System 40209 and Storage and Retrieval system 40205 to the Video Operator Console 40101. The Video Store and Forward system 40204 operates in a manner similar to the Storage and Retrieval system 40205, communicating between the Recording and Playback system 40105 and the Call Control System 40209.

The call monitor 40202 monitors the state of calls and connections by regularly polling the Call System Interface 40106 within the Video Operator Console Software System 40103. The Call System Interface 40106 communicates via a DDE, OLE or DLL interface 40207 with the Call Control System 40209 to manage call data, including switching functions such as dial, hold, etc., translating between the Video Operator Console 40101 internal data structures and the Call Control System 40209 data. The Call Control System, in turn, manages either the Incite MCP 40113 or Other programs with call control interfaces 40216.

The Media Control system 40107 communicates via a DDE, OLE or DLL interface with the Call Control System 40209, which communicates via a DDE interface 40110 with the Incite MCP application 40113 or with Other programs with call control interfaces 40216. The Incite MCP application 40113 provides all necessary call setup features and multimedia features such as video window placement and audio control either directly through a DDE interface 40110 to the internal Media Control system 40102 or via the Call Control System 40209. If Other programs with call control interfaces 40216 are used to provide call setup and multimedia features, they communicated with the Media Control system 40107 via the Call Control System 40209.

C. Video Conference Call Flow

Figure 99:
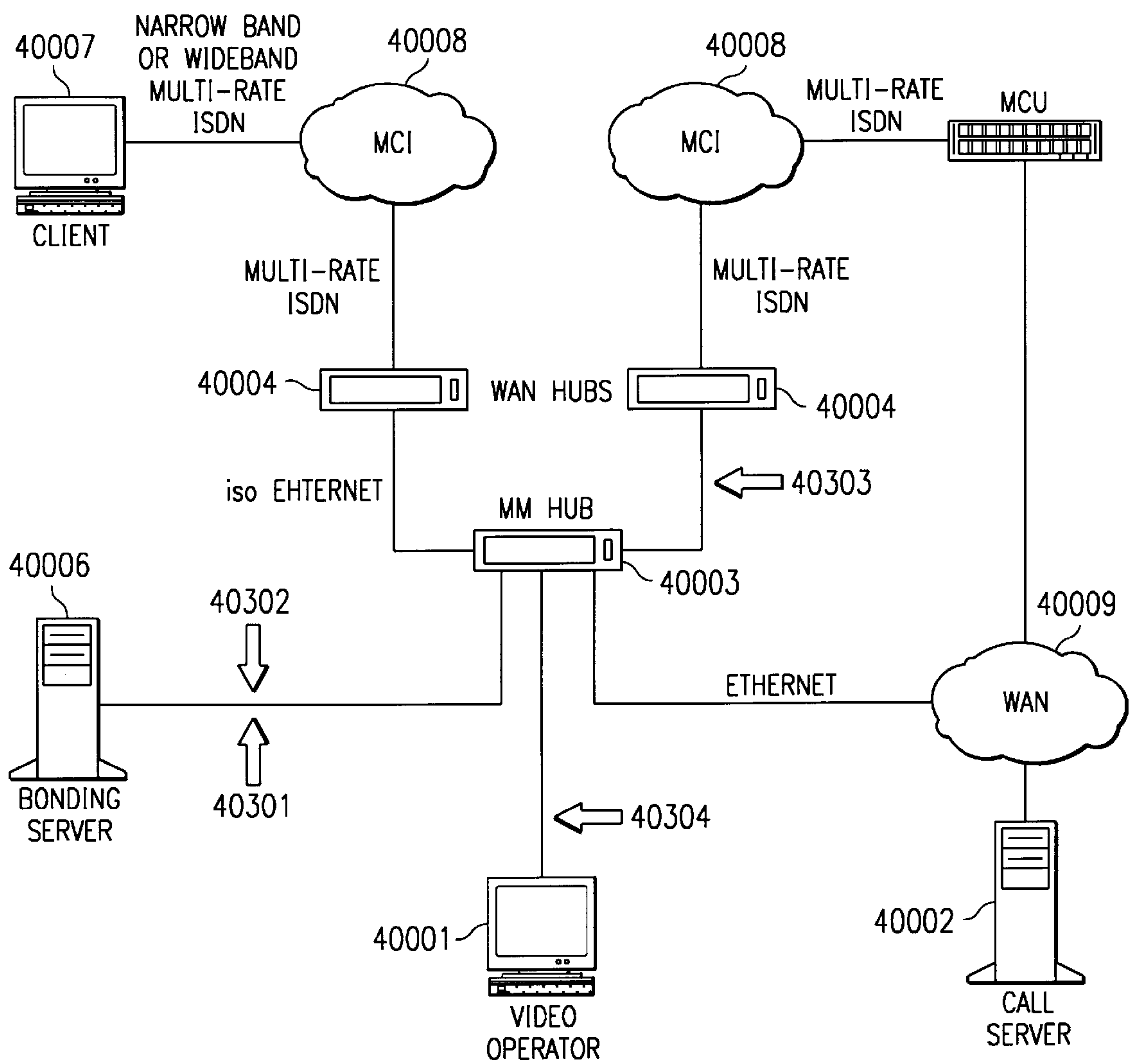
FIG. 99 shows how a video conference call initiated by the video operator in accordance with a preferred embodiment.

FIG. 99 shows how a video conference call initiated by the video operator is connected through the system pictured in FIG. 96. In the first step, illustrated by call flow path 40301, the video operator initiates a call from the Video Operator Terminal 40001 through the MM Hub 40003 to the BONDING Server 40006, where the BONDING Server 40006 converts the call to a BONDING call. In the second step, illustrated by call flow path 40302, the BONDING Server 40006 transmits the BONDING call through the MM Hub 40003 once again, through a WAN Hub 40004, through MCI 40008, and to the Client Terminal 40007. This step is repeated for each Client Terminal 40007 that will participate in the video conference. In the third step, illustrated by call flow path 40303, the video operator initiates a call from the Video Operator Terminal 40001 through the MM Hub 40003, through a WAN Hub 40004, through MCI 40008, and to the MCU 40005. In the fourth step, illustrated by call flow path 40304, the video operator uses the Video Operator Terminal 40001 to bridge the connections to the Client Terminal 40007 and MCU 40005. Each time the video operator calls a conference call client at its Client Terminal 40007, the MCU's ANI for the particular conference site is passed in the Calling Party Field to identify each client participating in the conference call with the correct conference site. When the MCU is called, the clients' ANI are passed. The MCU can then identify the correct conference site for each call.

In an alternate embodiment, the client initiates a BONDING call from the Client Terminal 40007 through MCI 40005, through a WAN Hub 40004, through the MM Hub 40003, through the BONDING Server 40006, and through the MM Hub 40003 once again to the Video Operator Terminal 40001. The video operator then places a call to the MCU as illustrated in call flow path 40303 and finally bridges the two calls as illustrated in call flow path 40304. To determine the correct conference site for the client-initiated call, the initiating client's ANI is passed to the MCU when the connection is made by the video operator.

While a conference call is in progress, the video operator monitors each of the calls from the Video Operator Terminal 40001. Functions of the video operator include monitoring which calls remain connected, reconnecting disconnected calls, adding new clients to the conference, or joining the conference to inform the clients regarding conference status.

All calls are disconnected to end a conference, and the video operator shared database [40214 in FIG. 98] reflects an updated conference schedule.

D. Video Operator Software System

1. Class Hierarchy

Figure 100:
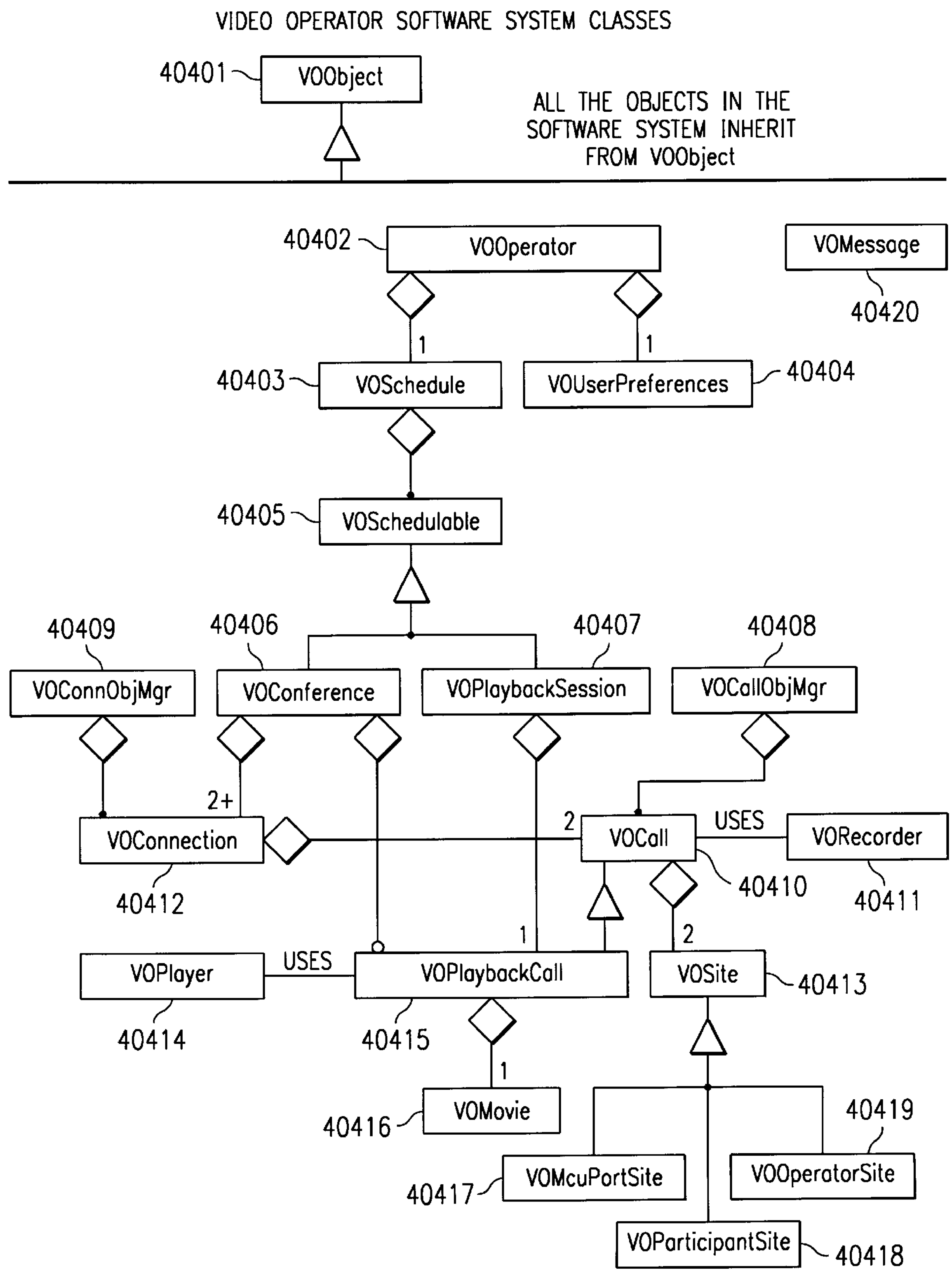
FIG. 100 shows the class hierarchy for video operator software system classes in accordance with a preferred embodiment.

FIG. 100 shows the class hierarchy for video operator software system classes. In one embodiment using the Visual C++ programming language, the VOObject 40401 class is extended from the Visual C++ base class CObject. VOObject 40401 is a Superclass to all classes of objects in the internal software system for the video operator console system, such that all objects in the internal software system inherit attributes from VOObject 40401.

VOOperator 40402 is an assembly class associated with one VOSchedule 40403 Part-1 Class object and one VOUserPreferences 40404 Part-2 Class object, such that exactly one VOSchedule 40403 object and exactly one VOUserPreferences 40404 object are associated with each VOOperator 40402 object. VOSchedule 40403, in turn, is an Assembly Class associated with zero or more VOSchedulable 40405 Part-1 Class objects, such that any number of VOSchedulable 40405 objects may be associated with each VOSchedule 40403 object.

VOSchedulable 40405 is a Superclass to the VOConference 40406 Subclass-1 and the VOPlaybackSession 40407 Subclass-2, such that the VOConference 40406 object and the VOPlaybackSession 40407 object inherit attributes from the VOSchedulable 40405 object. VOConference 40406 is an Assembly Class associated with two or more VOConnection 40412 Part-1 Class objects and zero or one VOPlaybackCall 40415 Part-2 Class objects, such that at least two VOConnection 40412 objects and possibly one VOPlaybackCall 40415 object are associated with each VOConference 40406 object. VOPlaybackSession 40407 is an Assembly Class associated with one VOPlaybackCall 40415 Part-1 Class object, such that exactly one VOPlaybackCall 40415 object is associated with each VOPlaybackSession 40407 object.

VOCallObjMgr 40408 is an Assembly Class for zero or more VOCall 40410 Part-1 Class objects, such that any number of VOCall 40410 objects may be associated with each VOCallObjMgr 40408 object. Similarly, VOConnObjMgr 40409 is an Assembly Class for zero or more VOConnection 40412 Part-1 Class objects, such that any number of VOConnection 40412 objects may be associated with each VOConnObjMgr 40409 object. VOConnection 40412 is an Assembly class for two VOCall 40410 Part-1 Class objects, such that exactly two VOCall 40410 objects are associated with each VOConnection 40412 object. VOCall 40410 is a Superclass to the VOPlaybackCall 40415 Subclass-1, such that VOPlaybackCall 40415 objects inherit attributes from the VOCall 40410 object. VOCall 40410 is also an Assembly Class associated with two VOSite 40413 Part-1 Class objects, such that exactly two VOSite 40413 objects are associated with each VOCall 40410 object. Finally, the VOCall 40410 class object uses the VORecorder 40411 class object.

VOSite 40413 is a Superclass to the VOMcuPortSite 40417 Subclass-1, the VOParticipantSite 40418 Subclass- 2, and the VOOperatorSite 40419 Subclass-3, such that VOMcuPortSite 40417 objects, VOParticipantSite 40418 objects and VOOperatorSite 40419 objects inherit attributes from the VOSite 40413 object.

VOPlaybackCall 40415 is an Assembly Class associated with one VOMovie 40416, such that exactly one VOMovie 40416 object is associated with each VOPlaybackCall 40415 object. The VOPlaybackCall 40415 class object also uses the VOPlayer 40414 class object.

VOMessage 40420 object has no associations other than inheriting the attributes of VOObject 40401, the Superclass to all objects in the internal software system.

2. Class and Object details a) VOObject

All Internal Software System classes will inherit from the following base class. This base class is extended from the Visual C++ base class CObject.

| | |
|---|---|
| Class | VOObject |
| Base Class | CObject |
| Inheritance Type | public |
| Friend Classes | — |

(1) Data Types enum senderType_e {SENDER_INTERNAL, SENDER_SCHEDULE, SENDER_CONFERENCE, SENDER_CONNECTION, SENDER_CALL, SENDER_TIMER};

enum messageType_e {MSG_DEBUG, MSG_ERROR, MSG_WARNING, MSG_APPLICATION_ERROR, MSG_STATE_UPDATE};

Delivery type flags: DELIVER_MESSAGE_QUEUE, DELIVER_LOG_FILE, DELIVER_MODAL_DIALOG, DELIVER_MODELESS_DIALOG, DELIVER_CONSOLEOUTPUT (2) Attributes

| Access Level | Type | Name | Description |
|---|---|---|---|
| static | VOOperator* | m_pVO | video operator pointer |
| static | VOSchedule* | m_pSchedule | scheduler pointer |
| static | VOCallObjMgr* | m_pCallOM | Call Object Manager pointer |
| static | VOConnectionObjMgr* | m_pConnOM | Connection Object Manager pointer |
| static | VOCallSystem* | m_pCallSys | Call System Interface pointer |

(3) Methods (a) PostMessage virtual PostMessage (messageType_e type, int errCode, CString info="", int delivery=(DELIVER_MSG_QUEUE|DELIVER_LOG_FILE), senderType_e senderType=SENDER_INTERNAL, void* sender=NULL);

(i) Parameters

| | |
|---|---|
| type | The type of message, as defined in the Data Types section |
| errCode | The error or warning code as defined in the application's resources. |
| Info | Extra textual information to be passed as part of the message. |
| delivery | Preferred method of message delivery. The delivery options are shown in the Data Types section above. Default method of delivery is stored in the class member variable m_delivery, which should be initialized to both DELIVER_MESSAGE_QUEUE and DELIVER_LOG_FILE only. |
| senderType | The message sender type, as defined in the Data Types section. |
| Sender | A pointer to the object sending the message, i.e. this |

(ii) Description

Use this function to create error, warning, debug, logging and notification messages. It will create a VOMessage object, which will then perform the appropriate actions as specified by the delivery flags.

(b) GetErrorString virtual CString GetErrorString (int errorcode);

Return Value: returns a CString object having the error string corresponding to the error code passed.

errorcode parameter: the error code for which you want the error string. Error strings are stored as resources.

This function is called to get a textual description corresponding to an error code.

b) Core Classes (1) Class List

Site
Participant Site
MCU Port Site
Video Operator Site
Call
Playback Call
Movie
Call Object Manager
Connection
Connection Object Manager
Message
Video Operator (2) Class Descriptions (a) Site This is a base class from which classes such as the Participant Site and MCU Port Site classes can be derived from. It's main purpose is to function as a data structure containing pertinent information about who or what is taking part in a Call.

| | |
|---|---|
| Class | VOSite |
| Base Class | VOObject |
| Inheritance Type | public |
| Friend Classes | — |

(i) Data Types enum Bandwidth__e {MULTIRATE, BONDING, AGGREGATED, H0};

(ii) Attributes

| Access Level | Type | Name | Description |
|---|---|---|---|
| | Cstring | m_name | name of the site |
| | ID_t | m_ID | Unique site ID |
| | ID_t | m_locationID | ID for physical location |
| | Cstring | m_timezone | Time zone |
| | Cstring | m_dialNumber | Number(s) to dial. See the Call System Interface section for multiple numbers format. |
| | Bandwidth_e | m_bandwidthUsage | Bandwidth usage |
| | int | m_maxNumChannels | Maximum number of channels capable |
| | VOCall* | m_pCall | pointer to Call object that this Site is a part of . *Codec or Terminal Type (PictureTel, MCP, etc.) *Call Setup Type (dial-in, dial-out) |

(b) Participant Site

Inherits from VOSite base class.

All customers or conference participants will have their information stored in the VO shared database.

| | |
|---|---|
| Class | VOParticipantSite |
| Base Class | VOSite |
| Inheritance Type | public |
| Friend Classes | — |

Attributes

| Access Level | Type | Name | Description |
|---|---|---|---|
| | Cstring | m__coordinatorName | Site coordinator name |
| | Cstring | m__coordinatorNbr | Site coordinator telephone number |
| | ID__t | m__companyID | ID of Company this Site belongs to |
| | VOMCUPortSite* | m__pMCUPort | MCU Port Site that is to be associated with in a Connection object |

(c) MCU Port Site

Inherits from VOSite base class.

All conferences take place on an MCU. Each Participant Site needs to connect with a logical "port" on an MCU.

| | |
|---|---|
| Class | VOMcuPortSite |
| Base Class | VOSite |
| Inheritance Type | public |
| Friend Classes | — |

Attributes

| Access Level | Type | Name | Description |
|---|---|---|---|
| | ID__t | m__mcuID | ID to identify the MCU |
| | VOParticipant Site* | m__pParticipant | Participant Site that is to be associated with in a Connection object |

(d) Video Operator Site

Inherits from VOSite base class.

All calls will have the Video Operator Site as one of the sites in a point-to-point call. This structure contains the real ANI of the video operator.

| | |
|---|---|
| Class | VOOperatorSite |
| Base Class | VOSite |
| Inheritance Type | public |
| Friend Classes | — |

Attributes

| Access Level | Type | Name | Description |
|---|---|---|---|
| | ID__t | m__operatorID | Operator's ID |
| | CString | m__voicePhone | Operator's voice phone number |
| | ID__t | m__groupID | Operator's Group ID |
| | ID__t | m__superviser ID | Supervisor's ID |
| | CObList | m__Calls | list of Call objects that this Site is a part of |

(e) Call

A Call is defined as a full duplex H.320 stream between two sites. In all Calls, the Video Operator Site will be one of the sites. A Joined pair of Calls is called a Connection.

| | |
|---|---|
| Class | VOCall |
| Base Class | VOObject |
| Inheritance Type | public |
| Friend Classes | — |

(i) Data Types enum StateCall_e {ERROR, INACTIVE, INCOMING, DIALING, ACTIVE, DISCONNECTED, HELD, lastCallStates};

enum callOperation_e {ERROR, DIAL, ANSWER, HOLD, PICKUP, DISCONNECT, HANGUP, lastCallOperations}

(ii) Attributes

| Access Level | Type | Name | Description |
|---|---|---|---|
| | ID_t | m_ID | call ID |
| | VOSite* | m_pSite | other end of a call site (Participant, MCU Port or unknown) |
| | VOOperatorSite* | m_pOperatorSite | Operator site |
| | boolean | m_operatorInitiated | TRUE if the call is initiated by the operator (default) |
| | CTime | m_startTime | the actual time when the call became active |
| | boolean | m_expectHangup | flag that helps determine whether a Hangup is expected or not. |
| | StateCall_e | m_state | state of the call |
| | StateCall_e [nCallStates] [nCallOperations] | m_transitionTable | state transition table |
| | VORecorder* | m_pRecorder | recorder object for call |
| | VOConnection* | m_pConnection | pointer to Connection object this call belongs to. |

(iii) Methods

Disconnection( ); is called when the other end of the line hangs up or the line goes dead. The member variable m_expectHangup should be FALSE. Otherwise, the Call Object Manager's Hangup( ) operation would have been called.

Reset( ); resets the call state to an inactive state

RecordingStart( ); starts recording the H.320 input pipe of the Call.

RecordingStop( ); stops the recording of the Call.

setState(callOperation_e operation);

operation parameter: indicates an operation that has been performed which will result in a change of state Operations that affect the state of the Call should call the setState function after the operation has been performed. This function will change the state of the Call by referencing the current state and the operation in the state-transition table. A VOMessage object will be created, with a type of STATUS_UPDATE and sent to the application queue. The GUI and any other component that reads the application queue will therefore be informed of the status update.

(f) Playback Call

Inherits from VOCall base class.

In this special case of a Call, the Video Operator audio and video output is replaced with the H.320 stream from the playback of a movie by the Video Operator Storage and Playback external system component.

| | |
|---|---|
| Class | VOPlaybackCall |
| Base Class | VOCall |
| Inheritance Type | public |
| Friend Classes | — |

(i) Attributes

| Access Level | Type | Name | Description |
|---|---|---|---|
| | VOMovie* | m_pMovie | the movie object that will be played |
| | VOPlayer* | m_pPlayer | Player object that performs the playback |

(ii) Methods

PlaybackStart( ); starts playback

PlaybackStop( ); stops playback (g) Movie

A Movie is a recording of an H.320 Call. For Phase 1, the Video Operator Storage and Playback System manages files and H.320 data streams for recording and playback of movies, as well as storage and retrieval.

| | |
|---|---|
| Class | VOMovie |
| Base Class | VOObject |
| Inheritance Type | public |
| Friend Classes | — |

Attributes

| Access Level | Type | Name | Description |
|---|---|---|---|
| public | ID_t | m_movieID | movie ID |
| public | CString | m_description | movie description |

(h) Call Object Manager

By having a Call Object Manager to perform the construction and destruction of Call objects, a list of all calls on the video operator's machine can be maintained. This includes calls that are not part of any Conference or Playback Sessions, including incoming calls and general purpose dial-out calls. Operations that affect a Call but do not create or destroy it can be performed by the Call object itself.

| | |
|---|---|
| Class | VOCallObjManager |
| Base Class | VOObject |
| Inheritance Type | public |
| Friend Classes | — |

(i) Attributes

| Access Level | Type | Name | Description |
|---|---|---|---|
| | int | m_numChannels | total number of unused channels |

-continued

| Access Level | Type | Name | Description |
|---|---|---|---|
| | int | m_numActive | total number of active channels |
| | CMapStringToOb | m_callList | list of calls |

(ii) Methods

Dial( );

Dial(VOCall* pCalling);

pCalling parameter: If not NULL, this pointer will be used for the Call object. This is necessary when creating or re-using a Call object that is in an inactive or disconnected state.

Dial performs dial out. The number(s) to Dial are in the m_pSite Call member structure.

Answer( );

Answer(VOCall* pIncoming);

pIncoming parameter: If not NULL, this pointer will be used for the Call object. This is necessary when creating or re-using a Call object that is in an inactive or disconnected state.

Answer answers an incoming call.

Hangup(VOCall* pCall);

pCall parameter: pointer to the call

Hangup hangs up the call pointed to by pCall

Hold(VOCall* pCall);

pCall parameter: pointer to the call

Hold puts the call pointed to on hold.

VOCall* CallCreate( );

VOCall* CallCreate creates a Call object.

VOPlaybackCall* PlaybackCallCreate( );

VOPlaybackCall* PlaybackCallCreate( ) creates a Playback Call object.

VOCall* GetCallPtr(ID_t idCall);

idCall parameter: call ID

VOCall* GetCallPtr gets the pointer to the call object identified by idCall (i) Connection A Connection is defined as a pair of Call objects that maintain a Join state, and each Call has the Video Operator Site as a common point for the Join to be implemented.

| | |
|---|---|
| Class | VOConnection |
| Base Class | VOObject |
| Inheritance Type | public |
| Friend Classes | — |

(i) Data Types enum StateConnection_e {ERROR, UNJOINED, JOINED, BROKEN, lastConnectionStates};

enum ConnectionOperation_e {ERROR, JOIN, UNJOIN, BREAK, RESET, lastConnectionOperations};

(ii) Attributes

| Access Level | Type | Name | Description |
|---|---|---|---|
| | VOCall* | m_pParticipantCall | pointer to the Participant Call |
| | VOCall* | m_pMCUPortCall | pointer to the MCU Port Call |
| | VOParticipantSite* | m_pParticipantSite | pointer to the Participant Site |

-continued

| Access Level | Type | Name | Description |
|---|---|---|---|
| | VOMCUSite* | m_pMCUPortSite | pointer to the MCU Port Site |
| | CTime | m_joinTime | time of join |
| | VOMovie* | m_pMovie | movie pointer for recording or playback |
| | boolean | m_expectBreak | flag that helps determine whether a Break is expected or not. |
| | StateConnection_e | m_state | state of the connection |
| | StateConnection_e [nConnectionStates] [nConnectionOps] | m_transitionTable | state transition table |
| | VOConference* | m_pConference | pointer to the Conference that this Connection is a part of. |

(iii) Methods

Join joins the Participant and MCU Port Calls.

Unjoin( ); unjoins the Participant and MCU Port Calls.

SetParticipantCall(VOCall* participantCall);

participantCall parameter: pointer to a Call object

SetParticipantCall sets the Call to be the Participant Call. This is useful when managing unknown incoming calls or for last minute participant substitution.

SetMCUPortCall(VOCall* mcuPortCall);

mcuPortCall parameter: pointer to a Call

SetMCUPortCall sets the Call to be the MCU Port Call. This is useful when managing unknown incoming calls or for last minute call site substitution.

DoParticipantCall( ); calls the Participant Site and sets it as the Participant Call.

DoMCUPortCall( ); calls the MCU Port Site and sets it as the MCU Port Call.

setState (ConnectionOperation_e operation);

operation parameter: the operation that has been performed which will result in a change of state.

Operations that affect the state of the Connection should call the setState function after the operation has been performed. This function will change the state of the Connection by referencing the current state and the operation in the state-transition table. A VOMessage object will be created, with a type of STATUS_UPDATE and sent to the application queue. The GUI and any other component that reads the application queue will therefore be informed of the status update.

protected Break( ); is called when a Joined Connection becomes Unjoined. If the member variable m_expectBreak is FALSE then one of the Calls must have unexpectedly been disconnected. Otherwise, the Connection's Unjoin( ) operation would have been called.

protected Reset( ); resets the state of the Connection to UNJOINED.

(j) Connection Object Manager

Similarly with the Call Object Manager, a list of all Connections in operation on the video operator's machine must be maintained. All operations that result in the creation or deletion of a Connection must use the Connection Object Manager.

| | |
|---|---|
| Class | VOConnectionObjMgr |
| Base Class | VOObject |
| Inheritance Type | public |
| Friend Classes | — |

(i) Attributes

| Access Level | Type | Name | Description |
|---|---|---|---|
| | CMapStringToOb | m_connectionsList | list of all connections |
| | int | m_numJoined | number of joined connections |

(ii) Methods

VOConnection* Create( );

Return Value: pointer to Connection object

VOConnection* Create creates a new Connection object and adds it to the list.

Remove (VOConnection* oldConnection);

oldConnection parameter: connection object to be removed

Return Value: returns TRUE if operation successful.

Remove deletes a Connection object and removes it from the list.

VOConnection* GetConnectionPtr(ID_t idConnection);

Return Value: a pointer to the connection object idConnection parameter: ID of the Connection VOConnection* GetConnectionPtr returns the pointer to a Connection object identified by its ID.

(k) Message

All one-way communication from the Internal System Software to the rest of the Video Operator application, i.e. the Graphical User Interface, is sent as messages that get placed on the Application Queue. The function to create and post a Message is in the base class VOObject, which all Internal System Software classes inherit from. All run-time errors or debugging information is put into a Message object, and posted to the application queue so that an appropriate object will process it according to its type and severity. Therefore all class functions that do not return a specific type will post a Message if something goes wrong, e.g. out of memory, or debugging information to be displayed by the GUI or logged to a file.

| | |
|---|---|
| Class | VOMessage |
| Base Class | VOObject |
| Inheritance Type | public |
| Friend Classes | — |

(i) Data Types enum senderType_e {INTERNAL, SCHEDULE, CONFERENCE, CONNECTION, CALL, TIMER};

enum messageType_e {DEBUG, ERROR, WARNING, APPLICATION_ERROR, STATE_UPDATE};

Delivery type flags: DELIVER_MESSAGE_QUEUE, DELIVER_LOG_FILE, DELIVER_MODAL_DIALOG, DELIVER_MODELESS_DIALOG, DELIVER_CONSOLEOUTPUT (ii) Attributes

| Access Level | Type | Name | Description |
|---|---|---|---|
| | int | m_errorCode | error code |
| | int | m_delivery | flags for preferred message delivery when posting. |
| | senderType_e | m_senderType | sender type |
| | VOObject* | m_pObject | pointer to the sender |
| | messageType_e | m_messageType | type of the message |
| | CString | m_info | message info<br>* priority of message or error<br>* severity of message or error |

(iii) Methods

Post( ); posts a message to the application message queue private static AppendLog( );

Return Value: returns TRUE if the operation is successful.

This method is called by VOObject: :PostMessage( ) when the flag for DELIVER_LOG_FILE is set.

(l) Video Operator

Generally there will be only one Video Operator per machine. Each Video Operator has a Schedule, and a list of customer Participant Sites to manage. The Call Object Manager and Connection Object Manager are also part of the Video Operator.

| | |
|---|---|
| Class | VOOperator |
| Base Class | VOObject |
| Inheritance Type | public |
| Friend Classes | — |

(i) Attributes

| Access Level | Type | Name | Description |
|---|---|---|---|
| | ID_t | m_operatorID | operatorID |
| | VOSchedule | m_schedule | schedule for the current operator |
| | CObList | m_MCUlist | list of MCU objects |
| | CObList | m_operatorSites | Operator's site(s) |
| static | VOUserPreferences | m_userPreferences | default application user preferences |

(ii) Methods protected ScheduleStart( ); initiates the schedule for the video operator.

protected CallObjMgrStart( ); initiates the call object manager.

protected ConnectionObjMgrStart( ); initiates the connection object manager.

protected CallSystemInterfaceStart( ); initiates the Call System Interface.

(m) User Preferences

The Video Operator Console application will have a set of default application preferences which may be modified and saved. The values of these variables are taken from the following sources, in order of increasing preference: hard-coded default values, saved VO. INI file, command-line invocation arguments, GUI entry and run-time modifications saved to VO.INI file.

| | |
|---|---|
| Class | VOUserPreferences |
| Base Class | VOObject |
| Inheritance | public |
| Type | |
| Friend Classes | — |

(i) Attributes

| Access Level | Type | Name | Description |
|---|---|---|---|
| | ID_t | m_operatorID | default operatorID |

(ii) Methods

SavePrefs( ); saves all values to VO.INI.

LoadPrefs( ); loads all values from VO.INI.

(n) MCU

All MCU Port Sites correspond to a particular MCU. This class is used for MCU Port Site storage only. For Phase 2, MCU specific operations and interfaces would be implemented here.

| | |
|---|---|
| Class | VOMCU |
| Base Class | VOObject |
| Inheritance | public |
| Type | |
| Friend Classes | — |

(i) Attributes

| Access Level | Type | Name | Description |
|---|---|---|---|
| | ID_t | m_mcuID | ID of the MCU |
| | CObList | m_portList | List of MCU Port Site objects |

(ii) Methods

VOMCUPortSite* GetPortPtr(ID_t idPort);

Return Value: a pointer to the MCU Port Site object.

IdPort parameter: ID of the MCU Port Site

VOMCUPortSite* GetPortPtr returns the pointer to a MCU Port Site object identified by its ID.

VOMCUPortSite* CreatePort( );

Return Value: a pointer to a new MCU Port Site object

VOMCUPortSite* CreatePort returns the pointer to a newly created MCU Port Site object identified by its ID.

(3) State Variable Transition Diagrams for Core Classes

Figure 101:
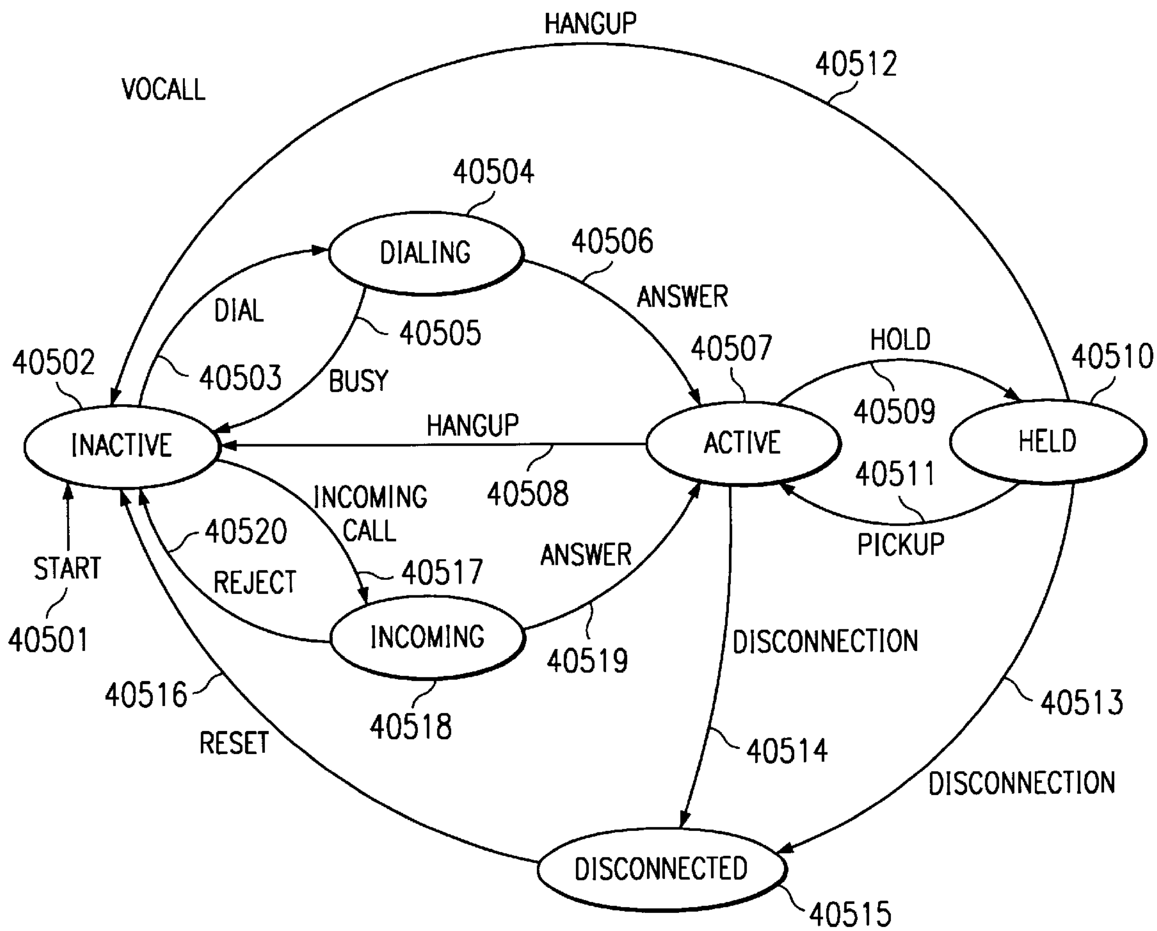
FIG. 101 shows a state transition diagram illustrating the state changes that may occur in the VOCall object's m_state variable in accordance with a preferred embodiment.

FIG. 101 shows a state transition diagram illustrating the state changes that may occur in the VOCall object's m_state variable ("state variable"). The state variable starts 40501 in Inactive 40502 state.

If the VOCall object receives a Dial 40503 input while in Inactive 40502 state, the state variable changes to Dialing 40504 state. In the Dialing 40504 state, the state variable changes to Inactive 40502 state upon receiving a Busy 40505 input or to Active 40507 state upon receiving an Answer 40506 input. In the Active 40507 state, the state variable changes to Held 40510 state upon receiving a Hold 40509 input, to Disconnected 40515 state upon receiving a Disconnection 40514 input, or to Inactive 40502 state upon receiving a Hangup 40508 input. In the Held 40510 state, the state variable changes to Active 40507 state upon receiving a Pickup 40511 input, to Disconnected 40515 state upon receiving a Disconnection 40513 input, or to Inactive 40502 state upon receiving a Hangup 40512 input. In the Disconnected 40515 state, the state variable changes to Inactive 40502 state upon receiving a Reset 40516 input.

If the VOCall object receives an Incoming Call 40517 input while in Inactive 40502 state, the state variable changes to Incoming 40518 state. In the Incoming 40518 state, the state variable changes to Inactive 40502 state upon receiving a Reject 40520 input or to Active 40507 state upon receiving an Answer 40519 input.

Figure 102:
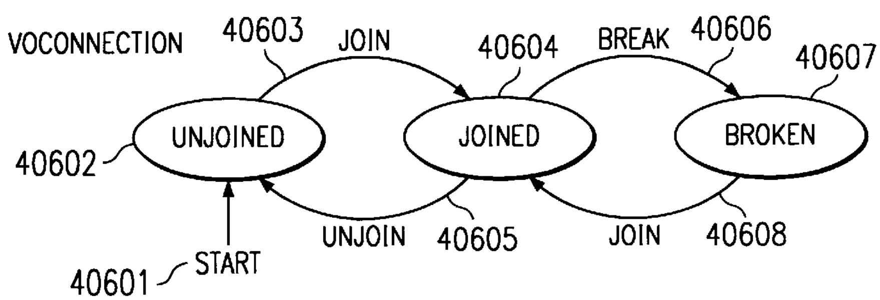
FIG. 102 shows a state transition diagram illustrating the state changes that may occur in the VOConnection object's m_state variable ("state variable") in accordance with a preferred embodiment.

FIG. 102 shows a state transition diagram illustrating the state changes that may occur in the VOConnection object's m_state variable ("state variable"). The state variable starts 40601 in Unjoined 40602 state. In the Unjoined 40602 state, the state variable changes to Joined 40604 state upon receiving a Join 40603 input. In the Joined 40604 state, the state variable changes to Unjoined 40602 state upon receiving an Unjoin 40605 input or to Broken 40607 state upon receiving a Break 40606 input. In the Broken 40607 state, the state variable changes to Joined 40604 state upon receiving a Join 40608 input.

c) Scheduling System Classes (1) Class List

Playback Session

Conference

Schedule

Schedulable (2) Class Descriptions (a) Playback Session

Like Conferences, Playback Sessions need to be scheduled. A Call is made with a Participant Site and the Video Operator Site. The Video Operator Storage and Playback external component system will playback a scheduled and pre-selected movie, replacing the AV output to the Participant Site. No MCU is used for a Playback Session, and only one Participant Site is involved in one embodiment.

| | |
|---|---|
| Class | VOPlaybackSession |
| Base Class | VOSchedulable |
| Inheritance | public |
| Type | |
| Friend Classes | — |

(i) Data Types enum StatePlaybackSession_e {ERROR, INACTIVE, SETUP, ACTIVE, ENDING, FINISHED, lastPBSessionStates};

enum playbackSessionOperation_e {ERROR, PREPARE, START, CLOSE, FINISH, lastPBSessionOperations};

(ii) Attributes

| Access Level | Type | Name | Description |
|---|---|---|---|
| public | ID_t | m_ID | ID assigned when a reservation is made for the session |
| public | CString | m_name | a short name for the session |
| public | CString | m_description | a brief description |
| public | CTime | m_startTime | start time |

-continued

| Access Level | Type | Name | Description |
|---|---|---|---|
| public | CTimeSpan | m__duration | the duration of the playback session |
| public | int | m__xferRate | The data transfer rate (number of channels) |
| protected | VOPlaybackCall* | m__playbackCall | the playback call object |
| protected | StatePlaybackSession__e | m__state | state of playback session |
| protected | StatePlaybackSession__e [lastPBSessionStates] [lastPBSessionOps] | m__transitionTable | The state transition table |

(iii) Methods public boolean Setup( );

Return Value: returns TRUE if operation successful.

public boolean Setup( ) sets up the Playback Call by calling the Participant Site and initialize a VOPlayer object. This function may be called by the Scheduler.

Public boolean Start( );

Return Value: returns TRUE if operation successful.

Public boolean Start starts the Player to play to the Playback Call. This function may be called by the Scheduler.

Public boolean Close( );

Return Value: returns TRUE if operation successful.

Public boolean Close sends messages to the Video Operator and maybe the Participant that the Playback Session will end soon.

Public boolean Finish( );

Return Value: returns TRUE if operation successful.

Public boolean Finish stops the Player and Hangup the Playback Call. This function may be called by the Scheduler.

public StatePlaybackSession__e StateGet( );

Return Value: returns the playback session's state.

Use the public StatePlaybackSession__e StateGet; function to find out the state of the Playback Session.

protected boolean StateSet(playbackSessionOperation__e operation);

Return Value: returns TRUE if operation successful.

operation parameter: the operation that has been performed which will result in a change of state Operations that affect the state of the Playback Session should call the protected boolean StateSet function after the operation has been performed. This function will change the state of the Playback Session by referencing the current state and the operation in the state-transition table. A VOMessage object will be created, with a type of STATUS__UPDATE and sent to the application queue. The GUI and any other component that reads the application queue will therefore be informed of the status update.

(b) Conference

The main function of the Video Operator is to manage conferences. The scheduler system creates the Conference objects, which in turn create a list of Connections (or Participant-MCU Port Site Call pairs). In the special case of a movie being played back to a conference, an extra call is made to an MCU Port and the movie is played back to the MCU in a similar way as a Playback Session. This of course requires an extra MCU Port site to be available, and must be scheduled before the start of the conference.

| | |
|---|---|
| Class | VOConference |
| Base Class | VOSchedulable |
| Inheritance Type | public |
| Friend Classes | — |

(i) Data Types enum conferenceMode__e {CONTINUOUS__PRESENCE, VOICE__ACTIVATED, LECTURE, DIRECTOR__CONTROL};

enum StateConference__e {ERROR, INACTIVE, SETUP, ACTIVE, ENDING, FINISHED, lastConferenceStates};

enum conferenceOperation__e {ERROR, PREPARE, START, CLOSE, FINISH, lastConferenceOperations};

(ii) Attributes

| Access Level | Type | Name | Description |
|---|---|---|---|
| | ID__t | m__ID | Conference ID given when the reservation is made |
| | CString | m__name | name for conference |
| | CString | m__description | brief description |
| | CString | m__timeZone | time zone |
| | CTime | m__startTime | start time of the conference |
| | CTimeSpan | m__duration | duration of the conference |
| | int | m__transferRate | transfer rate |
| | int | m__numActiveConns | number of active connections |
| | conferenceMode__e | m__mode | conference mode |
| | boolean | m__recordingScheduled | TRUE if this conference is to be recorded |
| | CObList | m__connectionsList | List to store the connection objects |
| | CMapStringToObj | m__participantSiteList | List of participant sites |
| | VOPlaybackCall | m__playbackCall | If there is a playback in the conference, this is valid |
| | StateConference__e | m__state | current state of conference |
| | StateConference__e [lastConferenceStates] [lastConferenceOps] | m__transitionTable | state transition table |
| | | | *Call Setup Type *Audio Protocol *Video Protocol *Multi MCU Conference *H.243 |

-continued

| Access Level | Type | Name | Description |
|---|---|---|---|
| | | | Chair Contr ol & passw ord |

(iii) Methods public boolean Setup( );

Return Value: returns TRUE if operation successful.

public boolean Setup sets up each Connection in the connection list (and the Playback Call if required) by calling each Participant Site and MCU Port Site as appropriate, and perform the Join operations to create the Connections. This function may be called by the Scheduler.

Public boolean Start( );

Return Value: returns TRUE if operation successful.

Public boolean Start starts the Conference. This function may be called by the Scheduler.

Public boolean End( );

Return Value: returns TRUE if operation successful.

Public boolean End starts tearing down the Connections in the conference or issues warnings that the conference will end soon. This function may be called by the Scheduler.

Public boolean Finish( );

Return Value: returns TRUE if operation successful.

Public boolean Finish stops the Conference and hangs up all Calls in the Conference. This function may be called by the Scheduler.

public StateConference__e StateGet( );

Return Value: returns the Conference state

Use the public StateConference__e StateGet function to find out the state of the Conference.

protected boolean StateSet(conferenceOperation__e operation);

Return Value: returns TRUE if operation successful.

operation parameter: the operation that has been performed which will result in a change of state Operations that affect the state of the Conference should call the protected boolean StateSet function after the operation has been performed. This function will change the state of the Conference by referencing the current state and the operation in the state-transition table. A VOMessage object will be created, with a type of STATUS__UPDATE and sent to the application queue. The GUI and any other component that reads the application queue will therefore be informed of the status update.

(c) Schedule

The Scheduling System maintains a list of Conferences and Playback Sessions. Each Conference and Playback Session is created at a particular time interval before its starting time. The Schedule in memory and the Schedule stored in the Video Operator Shared Database for the current Video Operator should always be synchronized.

| | |
|---|---|
| Class | VOSchedule |
| Base Class | VOObject |
| Inheritance Type | public |
| Friend Classes | — |

Attributes

| Access Level | Type | Name | Description |
|---|---|---|---|
| | ID__t | m__operatorI D | responsible operator ID |
| | CMapStringToO bj | m__schedItem s | list of schedulable objects (Conferences and Playback Sessions) |
| | CMapWordToOb | m__schedAlar ms | list of alarms currently set for operations on schedulable objects (construction and deletion) |

(ii) Methods

SynchWithDb( ); synchronizes with the VO shared database for the schedule.

AddSchedulable(VOSchedulable* pSchedulable);

pSchedulable parameter: pointer to schedulable object to be added to list

AddSchedulable adds a Schedulable object to the list

DeleteSchedulable(ID__t aSchedulable);

aSchedulable parameter: schedulable object to be removed from list

DeleteSchedulable deletes a Schedulable object and remove from list.

(d) Schedulable

Items or Objects that are schedulable in Phase 1 are Conferences and Playback Sessions. This class allows us to create a schedule for any type of event.

| | |
|---|---|
| Class | VOSchedulable |
| Base Class | VOObject |
| Inheritance Type | public |
| Friend Classes | — |

(i) Attributes

| Access Level | Type | Name | Description |
|---|---|---|---|
| | ID__t | m__requestor | ID of requestor |
| | Ctime | m__startTime | scheduled starting time |
| | CTimeSpa n | m__duration | scheduled duration of event |
| | Ctime | m__endTime | scheduled end time of event |
| | MMRESULT | m__alarmID | ID of alarm currently set |

(ii) Methods public SetAlarm(Ctime time, LPTIMECALLBACK func);

time parameter: time for alarm to be triggered func parameter: pointer to callback function when alarm is triggered Return Value: returns TRUE if operation successful.

public SetAlarm sets an alarm to be triggered at a specified time. When the alarm is triggered, the callback function will be called. This is useful for time dependant events such as 15 minutes before a Conference starts, 5 minutes before a Conference ends, and 30 minutes after a Conference has finished.

public KillAlarm( );

Return Value: returns TRUE if operation successful.

public KillAlarm kills the last alarm that has been set by SetAlarm( ). This would be used in the case of aborting a Conference, etc.

(3) State Variable Transition Diagram for Schedule System Classes

Figure 103:
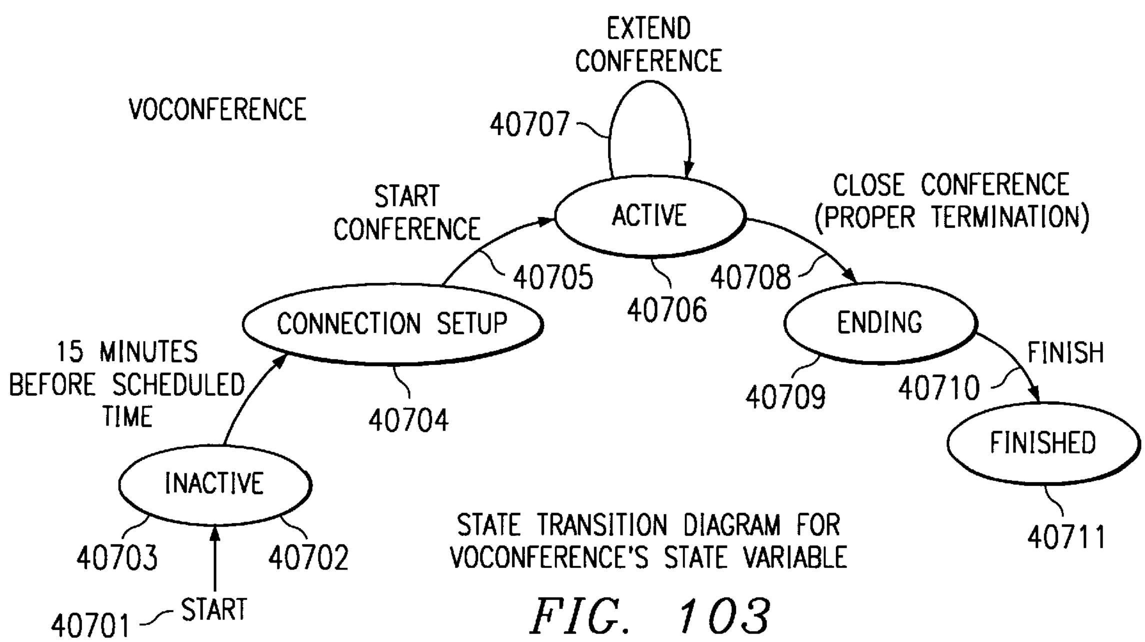
FIG. 103 shows a state transition diagram illustrating the state changes that may occur in the VOConference object's m_state variable ("state variable") in accordance with a preferred embodiment.

FIG. 103 shows a state transition diagram illustrating the state changes that may occur in the VOConference object's m_state variable ("state variable"). The state variable starts 40701 in Inactive 40702 state. In the Inactive 40702 state, the state variable changes to ConnectionSetup 40704 state upon receiving a "15 minutes before scheduled time" 40703 input. In the ConnectionSetup 40704 state, the state variable changes to Active 40706 state upon receiving a Start Conference 40705 input. In the Active 40706 state, the state variable remains in Active 40706 state upon receiving an Extend Conference 40707 input or changes to Ending 40707 state upon receiving a CloseConference (Proper Termination) 40708 input. In the Ending 40707 state, the state variable changes to Finished 40711 state upon receiving a Finish 40710 input.

d) Recording and Playback Classes (1) Class List

Recorder

Player (2) Class Details (a) Recorder

A recorder communicates with whatever external components performs the actual movie creation and recording of the input pipe of a Call. This external component is known as the Video Operator Storage and Playback system.

| | |
|---|---|
| Class | VORecorder |
| Base Class | VOObject |
| Inheritance Type | public |
| Friend Classes | — |

(i) Data Types enum StateRecorder_e {ERRQR, IDLE, RECORDING, PAUSED, FINISHED, lastRecorderStates};

enum recorderOperation_e ERROR, BEGIN, PAUSE, RESUME, STOP, lastRecorderOps}

(ii) Attributes

| Access level | Type | Name | Description |
|---|---|---|---|
| | VOMovie* | m_movie | Movie |
| | VOCall* | m_pCall | Call pointer (for recording) |
| | Cstring* | m_info | Participant and Conference Names |
| | Ctime | m_startTime | Start Time |
| | Ctime | m_endTime | End time |
| | CtimeSpan | m_duration | Total recorded time |
| | StateRecorder_e | m_state | State |
| | StateRecorder_e [lastRecorderStates] [lastRecorderOps] | m_transition Table | state transition table |
| | | | *VSF Object *Recording Mode |

(iii) Methods

InitMovie( ); VOSP initializes a recording. This will tell the VOSP to prepare to record.

start( ); VOSP starts a recording.

stop( ); VOSP stops a recording.

setState(recorderOperation_e operation);

operation parameter: the operation that has been performed which will result in a change of state.

Operations that affect the state of the Recorder should call the setState function after the operation has been performed. This function will change the state of the Recorder by referencing the current state and the operation in the state-transition table. A VOMessage object will be created, with a type of STATUS_UPDATE and sent to the application queue. The GUI and any other component that reads the application queue will therefore be informed of the status update.

(b) Player

A Player communicates with whatever external component performs the actual playback of a movie to the output pipe of a Call. For Phase 1, this external component is known as the Video Operator Storage and Playback system.

| | |
|---|---|
| Class | VOPlayer |
| Base Class | VOObject |
| Inheritance Type | public |
| Friend Classes | — |

(i) Data Types enum StatePlayer_e {ERROR, IDLE, PLAYING, PAUSED, FINISHED, nPlayerStates};

enum playerOperation_e {ERROR, BEGIN, PAUSE, RESUME, STOP, RESET, nPlayerOps}

(ii) Attributes

| Access level | Type | Name | Description |
|---|---|---|---|
| | VOMovie* | m_pMovie | Movie |
| | VOCall* | m_pCall | Call pointer (for playback) |
| | Cstring | m_info | Participant and Conference Names |
| | Ctime | m_startTime | Start and End Time |
| | Ctime | m_endTime | |
| | CTimeSpan | m_duration | Total playback time |
| | StatePlayer_e | m_state | State |
| | StatePlayer_e [nPlayerStates] [nPlayerOps] | m_transition Table | state transition table |
| | | | *VSF Object *Playback Mode |

(iii) Methods public InitMovie( );

Return Value: returns TRUE if operation successful.

public InitMovie VOSP initializes playback. This will tell the VOSP to prepare for playback.

public Start( );

Return Value: returns TRUE if operation successful.

public Start VOSP starts playback.

public Stop( );

Return Value: returns TRUE if operation successful.

public Stop VOSP stops playback.

setstate(playerOperation_e operation);

Return Value: returns TRUE if operation successful.

operation parameter: the operation that has been performed which will result in a change of state.

Operations that affect the state of the Player should call the setstate function after the operation has been performed. This function will change the state of the Player by referencing the current state and the operation in the state-transition table. A VOMessage object will be created, with a type of STATUS_UPDATE and sent to the application queue. The GUI and any other component that reads the application queue will therefore be informed of the status update.

(3) State Transition Diagrams for Recording and Playback Classes

Figure 104:
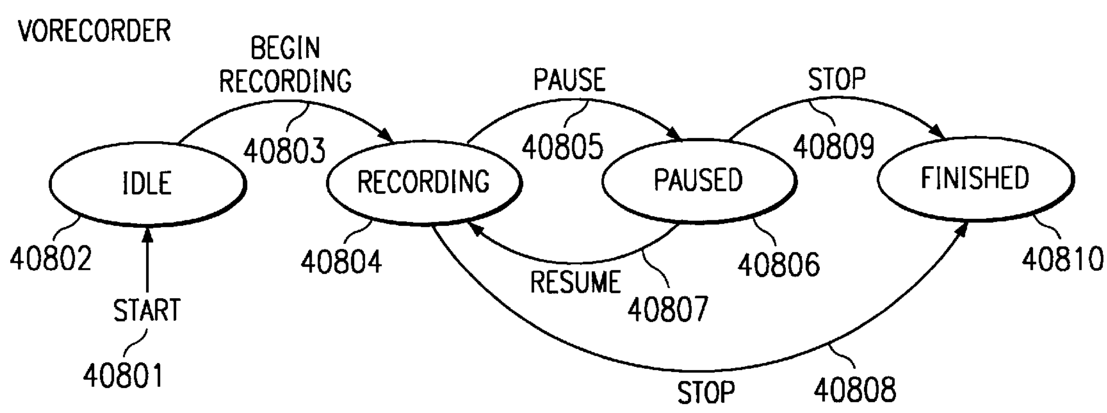
FIG. 104 shows a state transition diagram illustrating the state changes that may occur in the VORecorder object's m_state variable ("state variable") in accordance with a preferred embodiment.

FIG. 104 shows a state transition diagram illustrating the state changes that may occur in the VORecorder object's m_state variable ("state variable"). The state variable starts 40801 in Idle 40802 state. In the Idle 40802 state, the state variable changes to Recording 40804 state upon receiving a Begin Recording 40803 input. In the Recording 40804 state, the state variable changes to Paused 40806 state upon receiving a Pause 40805 input or to Finished 40810 state upon receiving a Stop 40808 input. In the Paused 40806 state, the state variable changes to Recording 40804 state upon receiving a Resume 40807 input or to Finished 40810 state upon receiving a Stop 40809 input.

Figure 105:
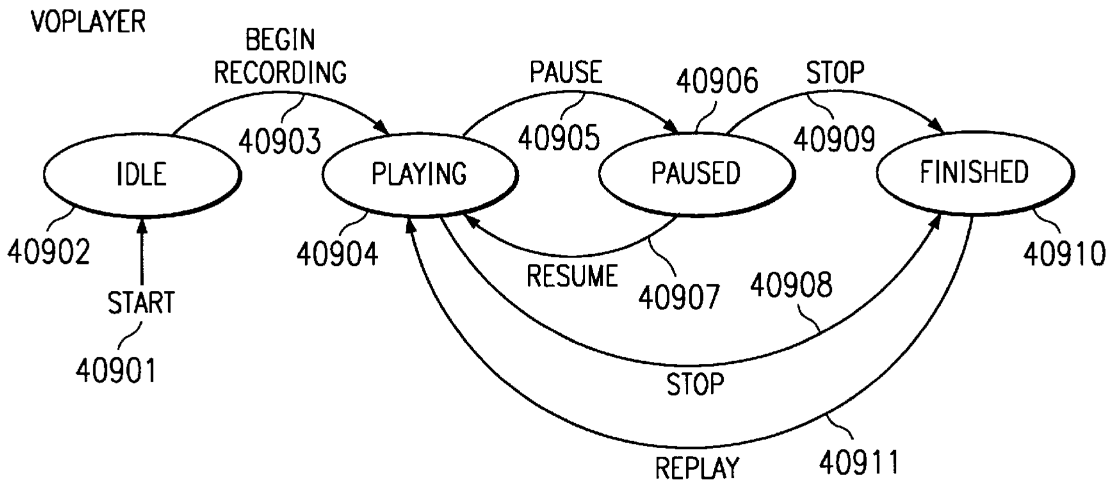
FIG. 105 shows a state transition diagram illustrating the state changes that may occur in the VORecorder object's m_state variable ("state variable") in accordance with a preferred embodiment.

FIG. 105 shows a state transition diagram illustrating the state changes that may occur in the VOPlayer object's m__state variable ("state variable"). The state variable starts 40901 in Idle 40902 state. In the Idle 40902 state, the state variable changes to Playing 40904 state upon receiving a Begin Playing 40903 input. In the Playing 40904 state, the state variable changes to Paused 40906 state upon receiving a Pause 40905 input or to Finished 40910 state upon receiving a Stop 40908 input. In the Paused 40906 state, the state variable changes to Playing 40904 state upon receiving a Resume 40907 input or to Finished 40910 state upon receiving a Stop 40909 input. In the Finished 40910 state, the state variable changes to Playing 40904 state upon receiving a Replay 40911 input.

e) Call System Interface Class Description

The Call Control System will manage all calls that a Video Operator can manage. This includes incoming and outgoing H.320 call management and low level operations on a call, such as recording and playback. The Video Operator Application uses its Call System Interface to communicate with the Call Control System external component which manages all calls in a uniform way. This allows the video operator to manage calls that require different external programs, adding an extra codec to the machine, or even managing calls on a remote machine.

| | |
|---|---|
| Class | VOCallSys |
| Base Class | VOObject |
| Inheritance Type | public |
| Friend Classes | — |

(1) Data Types enum Bandwidth__e {MULTIRATE, BONDING, AGGREGATED, H0}

Q.931 UserInfo for a call using BONDING:

0x00 0x01 0x07 0x44 0x79 0x00 0x00

0 1 7 447-9000

Bonded, 1 number, 7 digits long, 447-9000

Q.931 UserInfo for Aggregation:

0x01 0x02 0x07 0x44 0x79 0x00 0x00 0xFF 0x01

1 2 7 447-9000, 1

Aggregated, 2 numbers, 7 digits long, 447-9000, 447-9001

(2) Attributes

| Access Level | Type | Name | Description |
|---|---|---|---|
| public | int | m__numCalls | total number of calls available |
| public | int | m__numConnections | total number of connections available |

(3) Methods public Dial(Bandwidth__a calltype, CString destination);

public Dial(Bandwidth__e calltype, CString destination, CString origination);

Return Value: returns TRUE if operation successful.

calltype parameter: specifies the type of call to make.

destination parameter: specifies the destination number to be dialed.

origination parameter: specifies an origination number to be used, instead of the real number of the operator's console.

public Dial dials out.

public Answer(ID__t call);

call parameter: The Call ID of a Call waiting to be answered.

public Answer answers an incoming call.

public Hangup(ID__t call);

Return Value: returns TRUE if operation successful.

call parameter: the Call ID of a Call to Hangup public Hangup hangs up a call.

public Hold(ID__t call);

Return Value: returns TRUE if operation successful.

call parameter: the Call ID of a Call to Hold public Hold puts the call on hold.

public Join(ID__t call1, ID__t call2);

Return Value: returns TRUE if operation successful.

call1 parameter: the Call ID of a Call.

call2 parameter: the Call ID of a Call.

public Join joins two Calls.

(ID__t connection);

Return Value: returns TRUE if operation successful.

connection parameter: he ID of a Connection to Unjoin public Unjoin un-joins the specified Connection.

public StateCall__e CallStatus(ID__t call);

Return Value: returns the state of a Call connection parameter: the ID of a Connection to Unjoin public StateCall__e CallStatus reports status of the specified Call.

public StateConnection__e JoinStatus(ID__t connection);

Return Value: returns the state of a Connection connection parameter: the ID of a Connection to Unjoin public StateConnection__e JoinStatus reports status of the specified Join.

protected LaunchMCP( );

Return Value: returns TRUE if operation successful.

protected LaunchMCP launches Incite's MCP application.

E. Graphical User Interface Classes

1. Class Hierarchy

Figure 106:
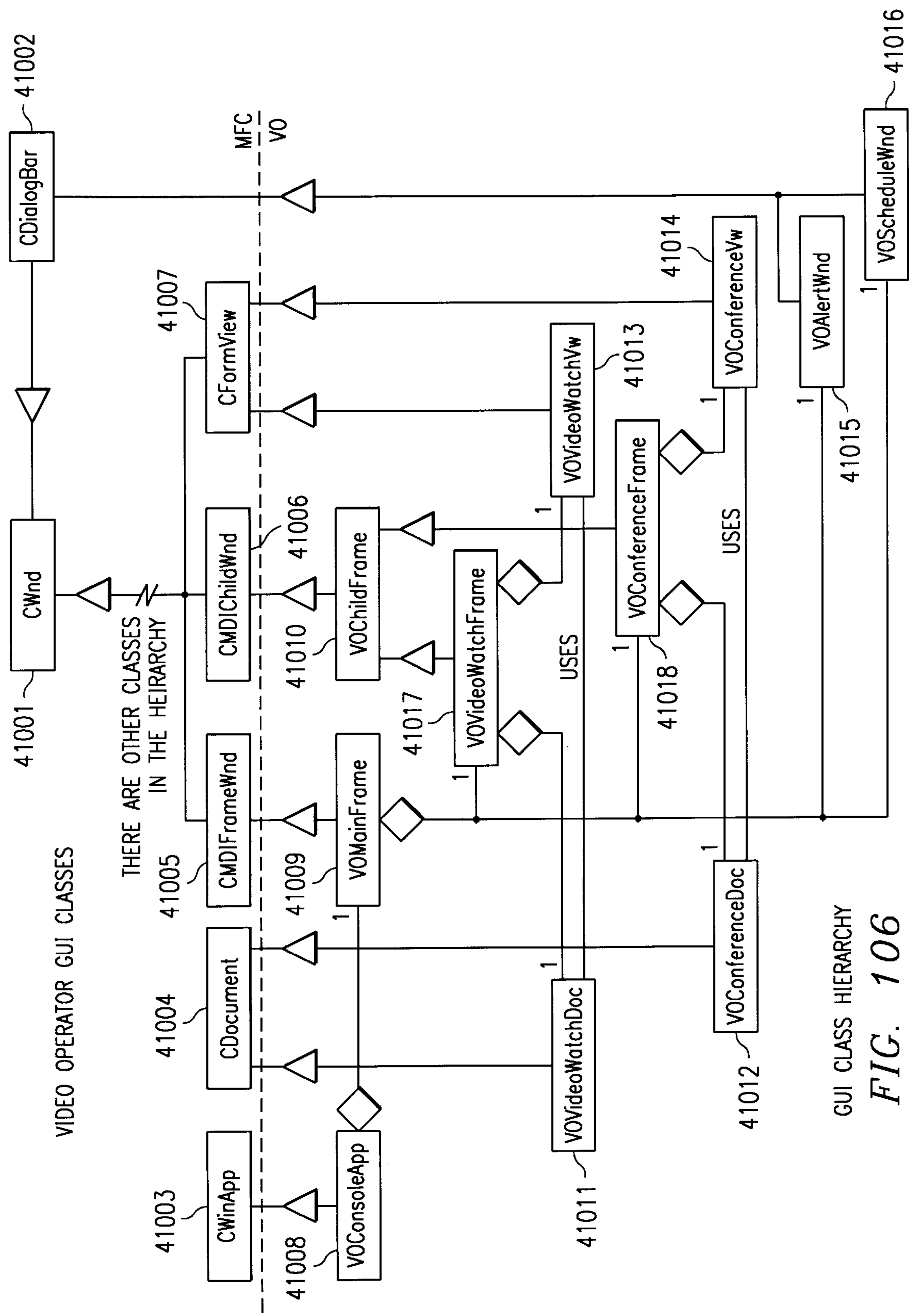
FIG. 106 shows the class hierarchy for the video operator graphics user interface ("GUI") classes in accordance with a preferred embodiment.

FIG. 106 shows the class hierarchy for the video operator graphics user interface ("GUI") classes. In general, the video conference operator will perform all the features of the video conferencing operator system described herein by interacting with the video operator console GUI ("console GUI"). The main components of the console GUI are the Main Console Window, Schedule and Connection List Windows, Conference and Connection Windows, a message area, audio and video controls, dialog boxes presenting timely information, and menu items for actions that may be performed infrequently. MCU operations and features will not be implemented in the video operator console GUI, so as to allow different embodiments of the video operator system employing different MCU model types. Vendor-specific MCU operations will be performed by the vendor's software that comes with the MCU application. In one embodiment employing VideoServer's MCS, the MCS Workstation Software can be used to implement features such as conference finish time extension, audio and video blocking, conference director control, etc. This software can run in parallel to the video operator GUI.

Described in object-oriented programming terms, the GUI has a main application object which creates and maintains all the windows and views within. The main window is the VOMainFrame 41009 which is created by the VOConsoleApp 41008. This mainframe window creates the VOScheduleWnd 41016, VOAlertWnd 41015, VOConferenceVw 41014 and the VOVideoWatchVw 41013. The VOScheduleWnd 41016 and the VOAlertWnd are dockable windows meaning that they can be attached to one of the sides of their parent window. In this case the parent window is the VOMainFrame 41009 window. The dockable windows can also be separated from the border by dragging them away. In such a situation they will act like normal tool windows.

The function of each class of object can be summarized as follows. VOConsoleApp 41008 is the main application class, and VOMainFrame 41009 is the main window which contains all the other windows. VOScheduleWnd 41016 is a window displaying the operator's schedule, and VOAlertWnd 41015 is a window where the error messages and alerts are displayed. VOChildFrame 41010 is a frame window for the multiple document interface ("MDI") windows. VOChildFrame 41010 will act like the mainframe window for each of the views. VOConferenceFrame 41018, derived from the VOChildFrame 41010, is the frame window for the conference view, and VOConferenceVw 41014 is the window displaying the conference information. VOConferenceDoc 41012 is the document class corresponding to the VOConferenceVw 41014. VOVideoWatchFrame 41017, derived from the VOChildFrame 41010, is the frame window for the Video Watch view, and VOVideoWatchVw 41013 is the window displaying the video stream and controls for making calls. VOVideoWatchDoc 41011 is the document class corresponding to the VideoWatch view.

In one embodiment using Visual C++ as the programming language, CWnd 41001 is a Superclass to the CMDIFrameWnd 41005 Subclass-1, CMDIChildWnd 41006 Subclass-2, CFromView 41007 Subclass-3, and CDialogBar 41002 Subclass-4, such that CMDIFrameWnd 41005 class objects, CMDIChildWnd 41006 class objects, CFromView 41007 class objects, and CDialogBar 41002 class objects inherit attributes from the CWnd 41001 class. CMDIFrameWnd 41005 is a Superclass to VOMainFrame 41009 Subclass-1; CMDIChildWnd 41006 is a Superclass to VOChildFrame 41010 Subclass-1; CFromView 41007 is a Superclass to both VOVideoWatchVw 41013 Subclass-1 and VOConferenceVw 41014 Subclass-2; and CDialogBar 41002 is a Superclass to both VOAlertWnd 41015 Subclass-1 and VOScheduleWnd 41016 Subclass-2. VOChildFrame 41010 is a Superclass to both VOVideoWatchFrame 41017 Subclass-1 and VOConferenceFrame 41018 Subclass-2. CWinApp 41003 is a Superclass to VOConsoleApp 41008 Subclass-1, and CDocument 41004 is a Superclass to both VOVideoWatchDoc 41011 Subclass-1 and VOConferenceDoc 41012 Subclass-2.

VOConsoleApp 41008 is an Assembly Class associated with one VOMainFrame 41009 Part-1 Class object, such that exactly one VOMainFrame 41009 object is associated with each VOConsoleApp 41008 object. VOMainFrame 41009 is an Assembly Class associated with one VOVideoWatchFrame 41017 Part-1 Class object, one VOConferenceFrame 41018 Part-2 Class object, one VOAlertWnd 41015 Part-3 Class object, and one VOScheduleWnd 41016 Part-4 Class object, such that exactly one VOVideoWatchFrame 41017 object, exactly one VOConferenceFrame 41018 object, exactly one VOAlertWnd 41015 object, and exactly one VOScheduleWnd 41016 object are associated with each VOMainFrame 41009 object.

VOVideoWatchFrame 41017 is an Assembly Class associated with one VOVideoWatchDoc 41011 Part-1 Class object and one VOVideoWatchVw 41013 Part-2 Class object, such that exactly one VOVideoWatchDoc 41011 object and exactly one VOVideoWatchVw 41013 object are associated with each VOVideoWatchFrame 41017 object. Each VOVideoWatchDoc 41011 object, extended from the CDocument 41004 class object as discussed above, uses a VOVideoWatchVw 41013 object, extended from the CFormView 41007 class object.

Similarly, VOConferenceFrame 41018 is an Assembly Class associated with one VOConferenceDoc 41012 Part-1 Class object and one VOConferenceVw 41014 Part-2 Class object, such that exactly one VOConferenceDoc 41012 object and exactly one VOConferenceVw 41014 object are associated with each VOConferenceFrame 41018 object. VOConferenceDoc 41012 uses VOConferenceVw 41014.

2. Class and Object details a) User Interface Classes (1) Class List

| | |
|---|---|
| VOConsoleApp | The main application class |
| VOMainFrame | The main window which has all the other windows |
| VOScheduleWnd | Window displaying the operator's schedule |
| VOOutputWnd | Window where the error messages and alerts are displayed |
| VOChildFrame | Frame window for the MDI windows. This will act like the mainframe window for each of the views. |
| VOConferenceFrame | The frame window for the conference view. This is derived from the VOChildFrame |
| VOConferenceVw | The window displaying the conference information |
| VOConferenceDoc | The document class corresponding to the VOConferenceVw |
| VOVideoWatchFrame | The frame window for the Video Watch view. This is derived from the VOChildFrame |
| VOVideoWatchVw | The window displaying the video stream and controls for making calls. |
| VOVideoWatchDoc | Document class corresponding to the VideoWatch view. |

(2) Class Details (a) VOConsoleApp

| | |
|---|---|
| Class | VOConsoleApp |
| Base Class | CWinApp |
| Inheritance Type | public |
| Friend Classes | — |

(i) Attributes

| Access Level | Type | Name | Description |
|---|---|---|---|
| protected | VOOperator* | m_pOperator | A pointer to the logged in video operator |

(ii) Methods

Retcode CreateVideoOperator(CString login, CString password);

Return Value: returns a non-zero value if successful, zero otherwise.

login parameter: login id for the operator password parameter: operator's password The Retcode CreateVideoOperator function is initially called during the application instantiation.

Retcode InitializeCallSystemComponents( );

Return Value: returns a non-zero value if successful, zero otherwise

The Retcode InitializeCallSystemComponents function is initially called during the application initiation, after the creation of the video operator, which makes a local copy of the pointers to the VOCallSystemInterface, VOCallObjMgr and the VOConnectionObjMgr objects, initiated by the internal software system.

void OnGetVOMessage(VOMsg voMsg);

voMsg parameter: the message object passed by the internal software system

The void OnGetVOMessage function is called when the application receives a message from the internal software system to redirect the message to the appropriate windows. In the initial implementation, the message will be passed on to the VOMainFrame, which interprets the message. Depending on the type of the message it is either displayed in the VOOutputWnd, displayed in a message box, or passed on to the VOConferenceVw and the VOVideoWatch windows.

(b) VOMainFrame

| | |
|---|---|
| Class | VOMainFrame |
| Base Class | CFrameWnd |
| Inheritance Type | public |
| Friend Classes | — |

(i) Attributes

| Access Level | Type | Name | Description |
|---|---|---|---|
| protected | VOOperator* | m_pOperator | A pointer to the logged in video operator |
| | VOScheduleWnd* | m_pScheduleWnd | A pointer to the schedule window |
| | VOOutputWnd* | m_pOutputWnd | A pointer to the output window |
| | VOConfernece Vw* | m_pConfVw | A pointer to the conference window. This will be collection if we have multiple conference windows active at the same time. |
| | VOVideoWatchVw* | m_pVideoWatchVw | Pointer to the video watch window. |

(ii) Methods

Retcode SynchWithDb( );

Return Value: returns a non-zero value if successful. zero otherwize login parameter: login id for the operator password parameter: operator's password The Retcode SynchWithDb function is called if the schedule has changed and the needs to be synchronized with the database.

Retcode DisplayMessage(VOMsg voMsg);

Return Value: returns a non-zero successful, zero otherwise voMsg parameter: the VOMsg object received from the internal software system The Retcode DisplayMessage function displays the content of the voMsg object in the output window. Based on the severity, an alert message box is also displayed.

void OnConferenceStatusChanged(VOConference* pConference);

pConference parameter: pointer to the conference object whose status has changed The void OnConferenceStatusChanged function is called when the status of a particular conference has changed.

(c) VOScheduleWnd

| | |
|---|---|
| Class | VOScheduleWnd |
| Base Class | CDialogBar |
| Inhertance Type | public |
| Friend Classes | — |

(i) Attributes

| Access Level | Type | Name | Description |
|---|---|---|---|
| protected | VOMainFrame* | m_pMainFrame | A pointer to the Main Frame window |
| | VOSchedule* | m_pSchedule | pointer to the video operator's schedule |

(ii) Methods

Retcode DisplaySchedule(BOOL filter=0);

Return Value: returns a non-zero value if successful. zero otherwise filter parameter: the filter to be applied for display of the schedule. filter=0 displays the entire schedule. filter=1 displays only the active conferences and playback calls.

The Retcode DisplaySchedule function is called to display the list of conferences and playback calls in the schedule window.

Retcode DisplayConfSites(VOConference* pConference);

Return Value: returns a non-zero value if successful. zero otherwise pConference parameter: pointer to the conference object for which the sites have to be displayed in the sites list box of the schedule window.

The Retcode DisplayConfSites function is called to display the list of sites in a site list box of the schedule window.

Retcode OnClickScheduledItem( );

Return Value: returns a non-zero value if the selection is different from the previous selection. zero otherwise The Retcode OnClickScheduledItem function is called when the user clicks on an item in the schedule list box. The initial implementation displays the corresponding sites in the conference or the site and the movie details in the playback call.

Retcode OnDblClickScheduledItem( );

Return Value: returns a non-zero value if a conference window is opened. zero otherwise The Retcode OnDblClickScheduledItem function is called when the user double clicks on an item in the schedule list box. The initial implementation creates a new VOConferenceVw for the scheduled item.

Retcode OnClickSite( );

Return Value: returns a non-zero value if the selection is different from the previous selection. zero otherwise The Retcode OnClickSite function is called when the user clicks on an item in the site list box of the Schedule window.

(d) VOOutputWnd

| | |
|---|---|
| Class | VOOutputWnd |
| Base Class | CDialogBar |
| Inheritance Type | public |
| Friend Classes | — |

(i) Attributes

| Access Level | Type | Name | Description |
|---|---|---|---|
| protected | VOMainframe* | m_pMainframe | pointer to the mainframe window |

(ii) Methods

Retcode DisplayMessage(CString info, VOMsg* pVoMsg=NULL);

Return Value: returns a non-zero value if successful. zero otherwise info parameter: additional information to be displayed pVoMsg parameter: a pointer to a VOMsg object Retcode DisplayMessage displays a message text in the output window. If pVoMsg=NULL, only the info will be displayed.

(e) VOConferenceVw

| | |
|---|---|
| Class | VOConferenceVw |
| Base Class | CFormView |
| Inheritance Type | public |
| Friend Classes | — |

(i) Attributes

| Access Level | Type | Name | Description |
|---|---|---|---|
| protected | VOOperator* | m_pOperator | A pointer to the logged in video operator |
| | VOMainFrame* | m_pMainframe | A pointer to the mainframe window |
| | VOVideoWatchVw* | m_pVideoWatchVw | A pointer to the video watch window |
| | VOOutputWnd* | m_pOutputWnd | pointer to the output window |

(ii) Constructor(s)

protected VOConferenceVw( );

VOConferenceVw(VOConference* pConference);

VOConferenceVw(VOPlaybackSession* pPbSession);

pConference parameter: a pointer to the conference object for which the view is to be created.

pPbSession parameter: a pointer to the playback session object for which the view is to be created.

The conference view is used to display the information about any conference or a scheduled playback session. This view is created only by the mainframe when the user double clicks on a conference/playback session in the schedule window.

(iii) Methods (VOConference* pConference);

PConference parameter: a pointer to the conference object whose status has changed.

void OnConferenceStatusChanged is called when the conference status has changed so that the UI can be updated accordingly.

void OnPbSessionStatusChanged(VOPlaybackSession* pPbSession);

pPbSession parameter: a pointer to the playback session object whose status has changed.

void OnPbSessionStatusChanged is called when the playback session's status has changed so that the UI can be updated accordingly.

void OnConnStatusChanged(VOConnection* pConnection);

pConnection parameter: a pointer to the connection object whose status has changed.

void OnConnStatusChanged is called when a connection's status has changed so that the UI can be updated accordingly.

void OnCallStatusChanged(VOCall* pCall);

pCall parameter: a pointer to the playback session object whose status has changed.

void OnCallStatusChanged is called when the status of a call in the current conference/playback session has changed so that the UI can be updated accordingly.

void OnPbCallStatusChanged(VOPbCall* pPbCall);

pPbCall parameter: a pointer to the playback session object whose status has changed.

void OnPbCallStatusChanged is called when the playback session's status has changed so that the UI can be updated accordingly.

(VOConnection* pConnection);

pConnection parameter: a pointer to the Connection object whose status has changed.

void DisplayConnectionStatus is called to display a connection's status.

void DisplayCallStatus(VOCall* pCall);

pCall parameter: pointer to the call object whose status has changed.

void DisplayCallStatus is called to display a call's status (participant or MCU).

void DisplayRecordingStatus( ); is called to display the recording status if any call in a conference is being recorded.

void DisplayWatchStatus( ); is called to display the indication as to which call is being monitored, in the current conference or playback session.

void DisplayPlaybackStatus( ); is called to display the playback status.

Retcode OnDialSite( );

Return Value: returns a nonzero value if the operation has been initiated successfully, zero otherwise.

Retcode OnDialSite is called when the Dial button on the participant side is clicked. This will dial the participant of selected connection.

Retcode OnDialMCU( );

Return Value: returns a nonzero value if the operation has been initiated successfully, zero otherwise.

Retcode OnDialMCU is called when the Dial button on the MCU side is clicked. This will dial the MCU port assigned to the selected participant.

Retcode OnHangupSite( );

Return Value: returns a nonzero value if the operation has been initiated successfully, zero otherwise.

Retcode OnHangupSite hangs up the call to the participant.

Retcode OnHangupMCU( );

Return Value: returns a nonzero value if the operation has been initiated successfully, zero otherwise.

Retcode OnHangupMCU hangs up the call to the MCU.

Retcode OnHoldSite( );

Return Value: returns a nonzero value if the operation has been initiated successfully, zero otherwise.

The Retcode OnHoldSite function puts the participant on hold (if the call is active).

Retcode OnHoldSite( );

Return Value: returns a nonzero value if the operation has been initiated successfully, zero otherwise.

The Retcode OnHoldMCU function puts the MCU on hold (if the call is active).

Retcode OnWatchSite( );

Return Value: returns a nonzero value if successful, zero otherwise.

The Retcode OnWatchSite function will monitor the current participant. The video stream corresponding to the participant will be displayed in the video watch window.

Retcode OnWatchMCU( );

Return Value: returns a nonzero value if successful, zero otherwise.

Retcode OnWatchMCU starts monitoring the MCU leg corresponding to a participant in a conference. The video stream is displayed in the video watch window.

Retcode OnRecordMCU( );

Return Value: returns a nonzero value if the operation has been initiated successfully, zero otherwise.

Retcode OnRecordMCU starts recording the MCU stream. If the recording is already on, this function will pause/stop the recording.

Retcode OnRecordSite( );

Return Value: returns a nonzero value if the operation has been initiated successfully, zero otherwise.

Retcode OnRecordSite starts recording the stream corresponding the selected participant. If recording is already on, recording will pause/stop.

Retcode MakeAutoConnection( );

Return Value: returns a nonzero value if the operation has been initiated successfully, zero otherwise.

Retcode MakeAutoConnection is called to automatically connect the participant and the MCU and when successful, join them.

Retcode MakeAutoDisconnection( );

Return Value: returns a nonzero value if the operation has been initiated successfully, zero otherwise.

Retcode MakeAutoDisconnection is called to automatically un-join the connection and disconnect the calls to the participant and the mcu.

Retcode ConnectAll( );

Return Value: returns a nonzero value if the operation has been initiated successfully, zero otherwise.

Retcode ConnectAll is called to automatically make all the connection one by one.

Retcode DisconnectAll( );

Return Value: returns a nonzero value if the operation has been initiated successfully, zero otherwise.

Retcode DisconnectAll is called to automatically break all the conference connections.

(f) VOVideoWatchVw

| | |
|---|---|
| Class | VOMainFrame |
| Base Class | CFrameWnd |

-continued

| | |
|---|---|
| Inheritance Type | public |
| Friend Classes | — |

(i) Attributes

| Access Level | Type | Name | Description |
|---|---|---|---|
| protected | VOOperator* | m_pOperator | A pointer to the logged in video operator |
| | VOCallObjMgr* | m_pCallMgr | Pointer to the call object manager |
| | VOScheduleWnd* | m_pScheduleWnd | A pointer to the schedule window |

(ii) Constructor(s)

VOVideoWatchVw( );

(iii) Methods void OnDial( ); dials the number in the destination edit box.

void OnTransfer( ); transfers the current call to a number. This will initially display a dialog box where the user enters the number top which the call is to be transferred.

void OnAnswer( ); is called when the Answer button is clicked.

void OnForward( ); is called when the forward button is clicked. All the call will be forwarded to the forwarding number provided.

void OnMute( ); is called when the mute button is clicked. Turns the mute on/off.

void OnHangup( ); is called when the hang-up button is clicked. Hangs up the current call.

void OnHold( ); is called when the hold button is clicked. Puts the current call on hold.

void OnPickup( ); is called when the pickup button is clicked. Picks up the call on hold.

void OnPrivacy( ); is called when the privacy button is clicked. Turns the privacy on or off.

void OnPlayMovie( ); is called when the Play button is clicked. This will display a dialog box with a list of movies to choose from. Once a movie is selected, the movie will be played.

void OnRecordCall( ); is called when the record button is clicked.

void OnJoinToConference( ); is called when the Join Conf button is clicked. This will display the list of active conferences and sites OR playback sessions. The operator will select the site corresponding to the current call and the call will be joined to the conference.

void WatchVideo(BOOL selection);

Return Value: returns a non-zero value if successful. zero otherwise selection parameter: specifies what to watch.

selection=VDOWATCH_CONFERENCE displays the video from the site/MCU selected for watching selection=VDOWATCH_SELF displays the output of the video operator's camera selection=VDOWATCH_CALL displays video from the call selected from the listbox provided in the video watch window OR the video from the incoming call, if any.

Call the void WatchVideo function to select the video stream to watch.

void OnDisplayCallsWindow( ); is called when the 'Calls' button is clicked.

void OnSelfView( ); is called when the 'SelfView' check box is checked or unchecked. When the self view is checked, the video operator's camera output is displayed in a separate small window.

void OnLocalVolume( ); is called when the local volume slide bar position is changed. This will adjust the local volume.

void OnRemoteVolume( ); is called when the remote volume slide bar position is changed. This will adjust the remote volume signal.

b) Media Control Class Description (1) VOMediaControl

| | |
|---|---|
| Class | VOMediaControl |
| Base Class | VOObject |
| Inheritance Type | public |
| Friend Classes | — |

(a) Attributes

| Access Level | Type | Name | Description |
|---|---|---|---|
| protected | struct MtsLinkPortInfo | m_portInfo | This structure is used to communicate with the MCP |

(b) Constructor(s)

VOMediaControl( );

(c) Methods public void SetVolume(short rightVolume, short leftVolume);

rightVolume parameter: an integer between 0–1000.

leftVolume parameter: an integer between 0–1000.

public void SetVolume sets the volume control.

public short GetVolume(short channel);

Return Value: returns the volume for the specified channel channel parameter: set channel=PORT_CHANNEL_RIGHT for the right volume setting, and set channel PORT_CHANNEL_LEFT for the left volume setting.

public short GetVolume returns the current volume for the specified channel public void SetSelfView(long flags);

flags parameter: sets the properties of the self view. The valid flag values are:

| | |
|---|---|
| SELFVIEW_ON | Displays the self view; |
| SELFVIEW_OFF | Hides the self view; and |
| SELFVIEW_MIRRORED | Mirrors the self view. |

public void SetSelfView sets the self view properties.

public long GetSelfView( );

Return Value: returns the self view settings

The public long GetSelfView function returns the self view settings which can be used to find out if the self view is visible or hidden, or if it is mirrored.

public void SetSelfViewSize(short size);

size parameter: one of the predefined sizes for the self view public void SetSelfViewSize sets the size of the self view window. The valid values are FULL_CIF, HALF_CIF and QUARTER_CIF.

public short GetSelfViewSize( );

Return Value: returns Current self view size.

The public short GetSelfViewSize function returns the current self view window size. The values will be one of the predefined sized. See SetSelfViewSize for the description of the sizes.

public void SetAutoGain(BOOL autoGain=TRUE);

autoGain parameter: should be TRUE to enable auto gain, FALSE to disable

The public void SetAutoGain function enables or disables the auto gain depending on the autoGain value.

public BOOL GetAutoGain( );

Return Value: returns The current auto gain setting.

The public BOOL GetAutoGain function returns the current auto gain setting. TRUE if auto gain is on, FALSE otherwise.

public void SetEchoCancellation (bool bCancel);

bCancel parameter: if bCancel is TRUE cancellation is enabled; if FALSE cancellation is disabled.

public void SetEchoCancellation enables or disables echo cancellation.

public BOOL GetEchoCancellation( );

Return Value: returns the current echo cancellation state.

public BOOL GetEchoCancellation gets the current state of the current echo cancellation.

public short GetVideoMode(short mode=MODE_RX);

Return Value: returns the video mode mode parameter: indicates receive or transmit mode.

public short GetVideoMode gets the audio mode for receive or transmit, depending on the value of mode. mode=MODE_RX for receive mode and MODE_TX for transmit.

public short GetAudioMode(short mode=MODE_RX);

Return Value: returns the audio mode mode parameter: indicates receive or transmit mode.

public short GetAudioMode gets the audio mode for receive or transmit, depending on the value of mode. mode=MODE_RX for receive mode and MODE_TX for transmit.

public void SetVideoWnd(HWND hWnd);

hwnd parameter: pointer to the window where the video is to be displayed.

The public void SetVideoWnd function displays the video in the window identified by hWnd.

public HWND GetVideoWnd( );

Return Value: returns the window handle in which the video is being displayed. If no window is set, NULL is returned.

The public HWND GetVideoWnd function is called to retrieve the window handle in which the video is being displayed.

public void MakeVideoWndResizeable(BOOL bResize=TRUE);

bResize parameter: if bResize is TRUE, the video window is resizeable; if FALSE, it is not resizeable.

The public void MakeVideoWndResizeable function makes the video window resizable with bResize=TRUE. To make the window fixed size, make bResize FALSE.

public BOOL IsVideoWndResizeable( );

Return Value: returns TRUE if the video window is resizeable, FALSE otherwise.

Call the public BOOL IsVideoWndResizeable function to determine if the video window is resizeable.

F. Video Operator Shared Database

1. Database Schema

Figure 107:
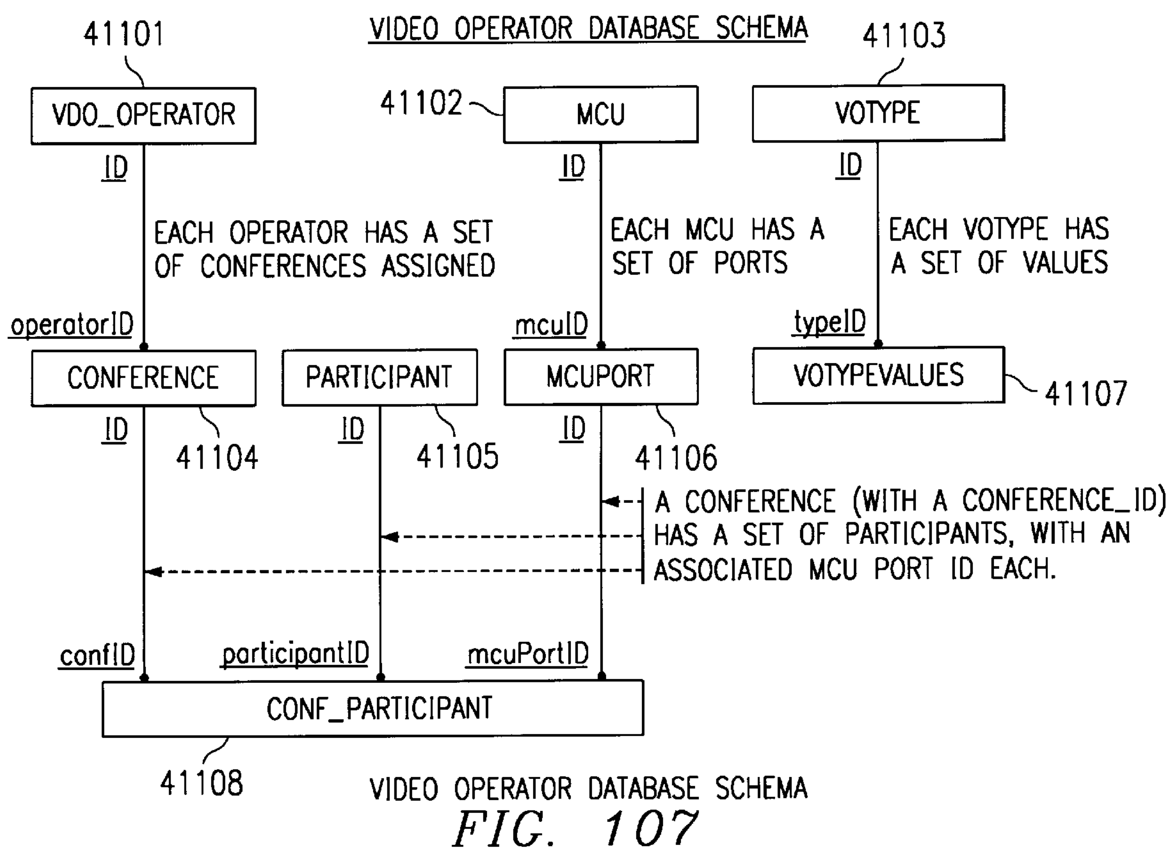
FIG. 107 shows a database schema for the video operator shared database in accordance with a preferred embodiment.

FIG. 107 shows a database schema for the video operator shared database (see 40214 FIG. 98). In one embodiment, the database contains the following tables. CONFERENCE 41104 lists details about a scheduled conference, PARTICIPANT 41105 lists the participants of conferences, and CONF_PARTICIPANT 41108 contains the keys from the CONFERENCE 41104 and PARTICIPANT 41105 tables, which are used to determine the participants in any given conference. MCU 41102 contains the characteristics of different MCU's from various suppliers, and MCUPORT 41106 contains the MCU identification number from the MCU 41102 table as well as the ports of the MCU used by the participants to connect to a conference. VOPERATOR lists video operator attributes; VOTYPES lists all the types (e.g., protocols, bandwidths) used to define a conference or participant; and VOTYPEVALUES 41107 lists the values for each of the defined types.

Each video operator record in the VDO_OPERATOR 41101 table contains a unique identification number in its ID field, which number may appear in the CONFERENCE 41104 table's operatorID field, assigning each video operator to particular conferences profiled in the CONFERENCE 41104 table. Each conference record in the CONFERENCE 41104 table, in turn, contains a unique identification number in its ID field, which number may appear in the CONF_PARTICIPANT 41108 table's confID field. Similarly, each participant record in the PARTICIPANT 41105 table contains a unique identification number in its ID field, which number may appear in the CONF_PARTICIPANT 41108 table's participantID field. Finally, each MCU record in the MCU 41102 table contains a unique identification number in its ID field, which number may appear in the MCUPORT 41106 table's mcuID field, identifying the set of MCU ports associated with the MCU. Each MCU port record in the MCUPORT 41106 table, in turn, contains a unique identification number in its ID field, which number may appear in the CONF_PARTICIPANT 41108 table's mcuPortID field. Within the CONF_PARTICIPANT 41108 table, the confID, participantID, and mcuPortID values are used as cross-referencing keys to define a particular conference with a given conference profile, a set of participants, and an MCU port.

In addition, each VOType record in the VOTYPE 41103 table contains a unique identification number in its ID field, which number may appear in the VOTYPEVALUES 41107 table's typeID field, identifying a set of values associated with the VOType.

G. Video Operator Console Graphical User Interface Windows

1. Main Console Window

Figure 108:
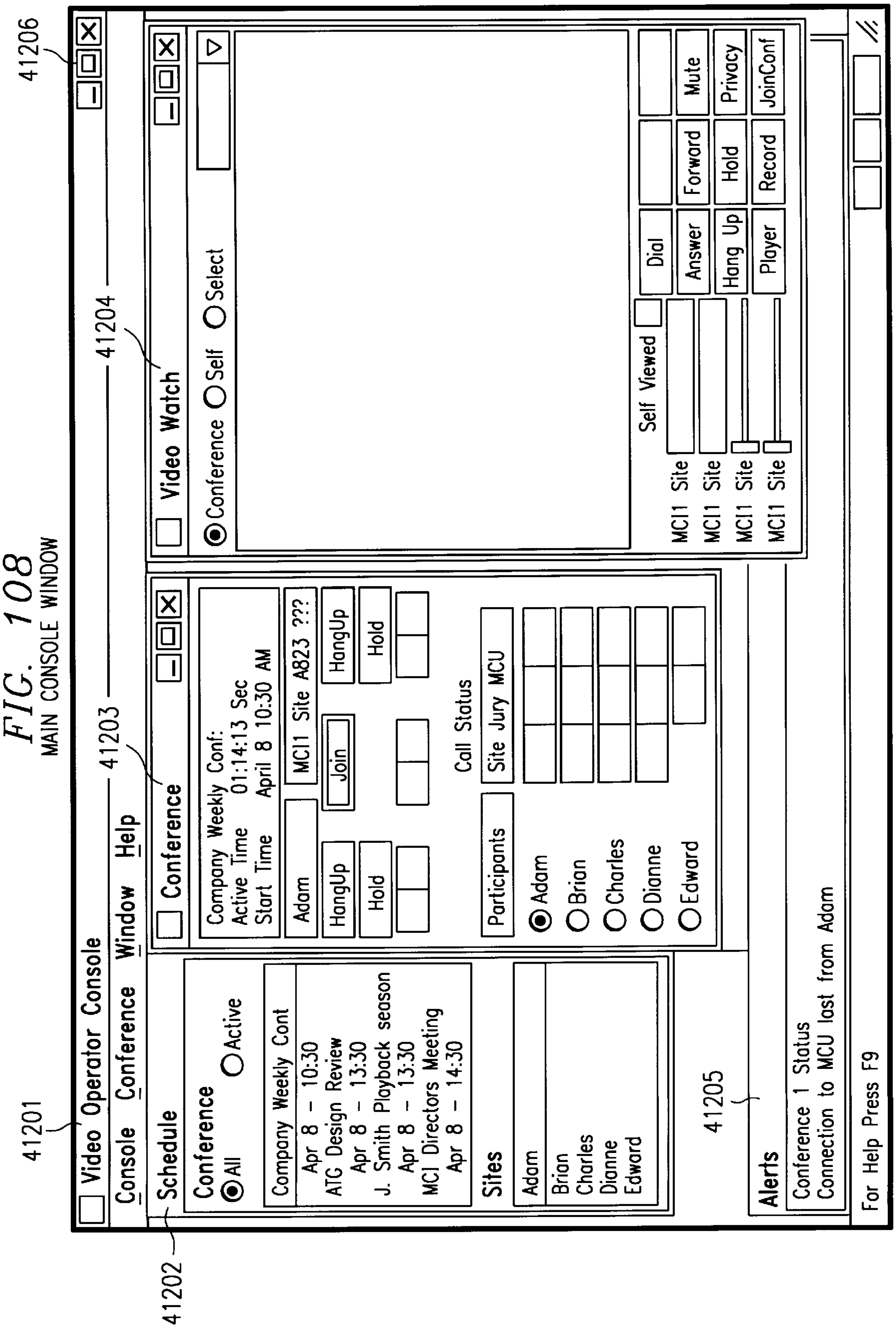
FIG. 108 shows one embodiment of the Main Console window in accordance with a preferred embodiment.

FIG. 108 shows one embodiment of the Main Console window 41201 as it would appear on a Video Operator Terminal [1 FIG. 96], showing possible placements of a Schedule window 41202, a Conference window 41203, a Video Watch window 41204 and a Console Output window 41205. The Main Console window 41201 enables the video operator to manage video conferences.

2. Schedule Window

Figure 109:
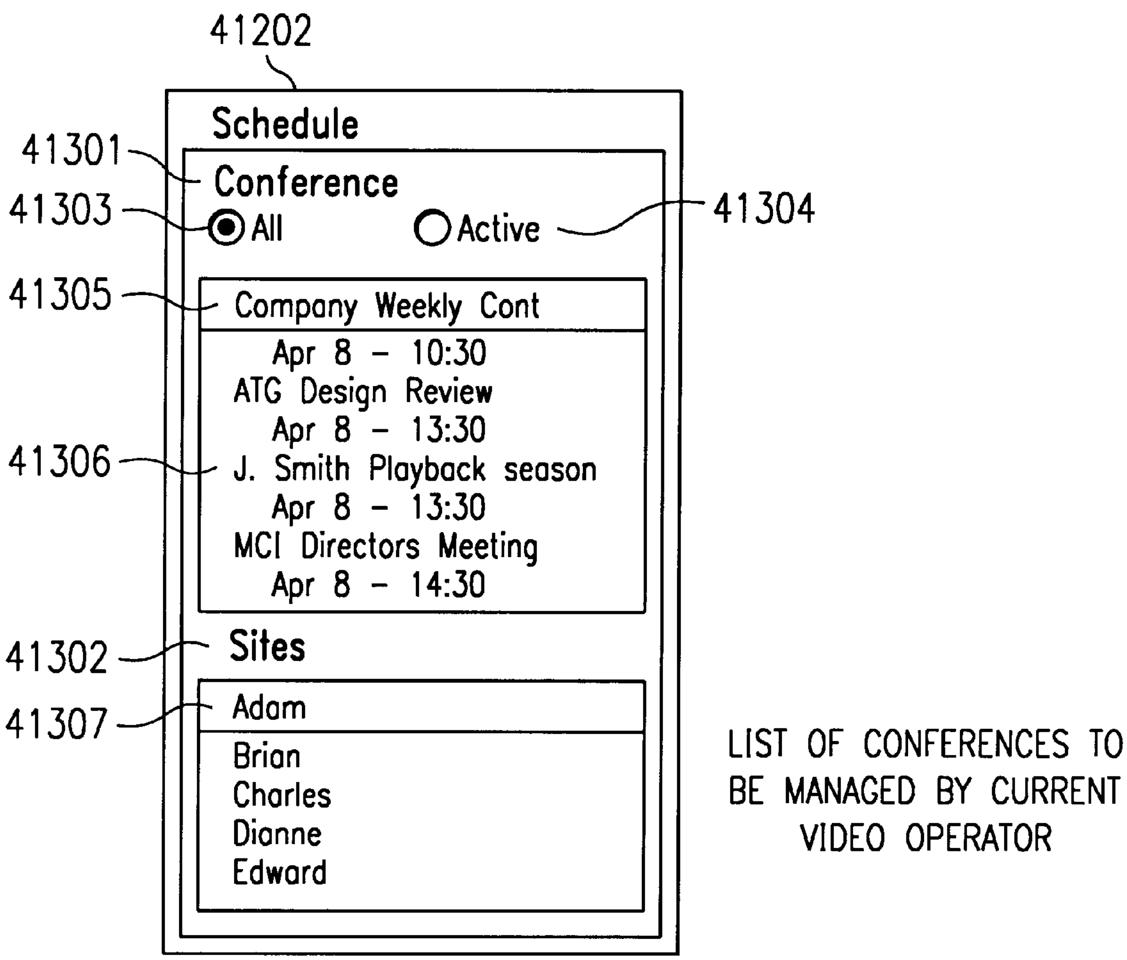
FIG. 109 shows one embodiment of the Schedule window in accordance with a preferred embodiment.

FIG. 109 shows one embodiment of the Schedule window 41202, which displays all the conferences 41305 and playback sessions 41306 to be handled by the current video operator for the next 8 hours. In one embodiment, the list is updated upon application startup, at 15 minute intervals, and every time a conference ends.

The Schedule window will have two scrolled text areas—one area for conferences 41301, and the other for sites 41302 participating in the selected conference. If a conference name is double-clicked, the appropriate Conference Window [41203 FIGS. 108, 110] will appear.

3. Conference Window

Figure 110:
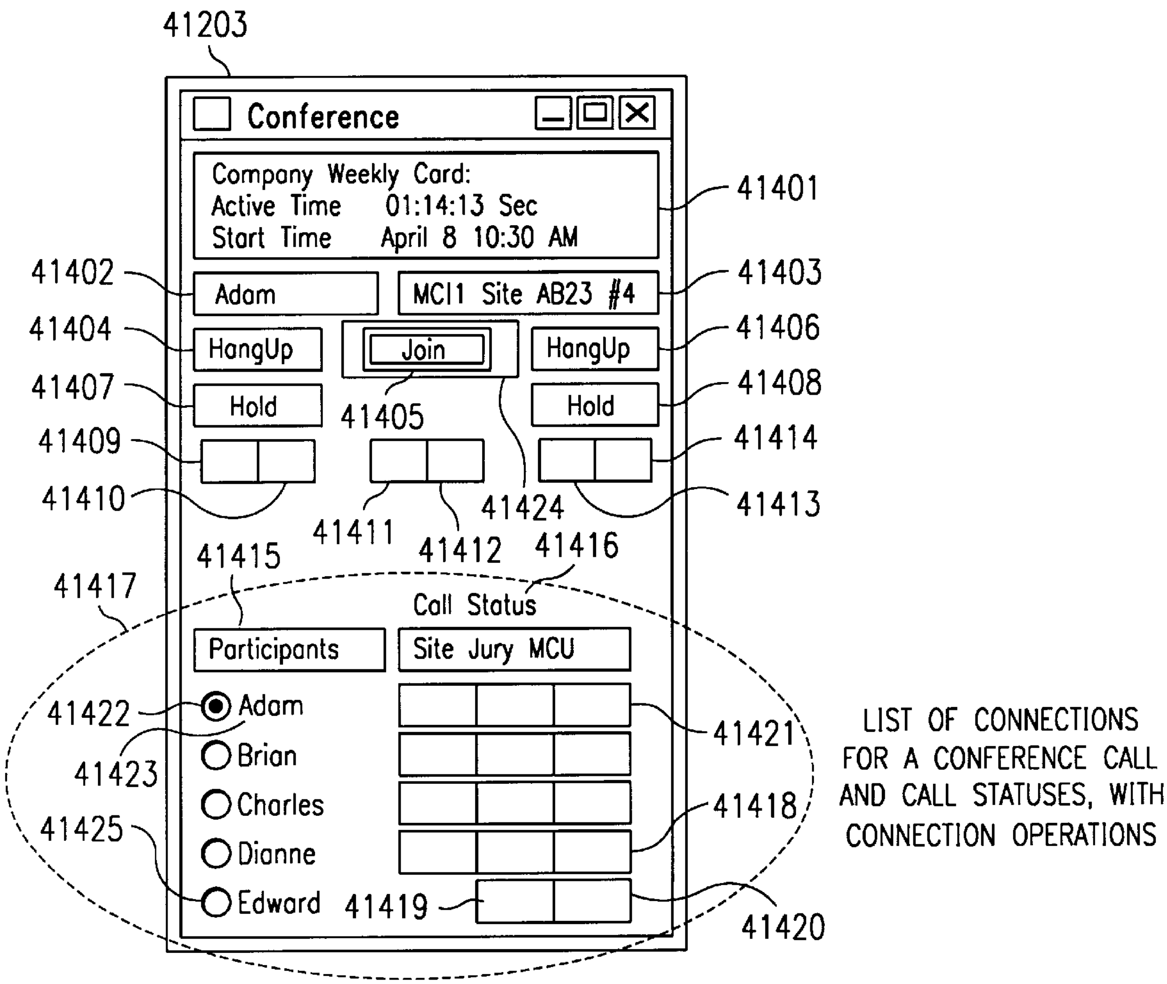
FIG. 110 shows one embodiment of the Conference window 41203, which is displayed when the operator selects a conference or playback session in the Schedule window in accordance with a preferred embodiment.

FIG. 110 shows one embodiment of the Conference window 41203, which is displayed when the operator selects a conference or playback session in the Schedule window 41202. The display of the Conference Window 41203 is dependent on whether a Conference or a Playback Session has been selected from the Schedule Window 41202. Only one conference window is displayed at a time. When a new conference window is opened, the existing one is hidden. While a Conference Window is hidden, the status of the conference and connections are still monitored. FIG. 110 shows a Conference Session 41401. The Conference window 41203 displays the list of conference Participants 41415 and radio buttons to selectively operate on individual connections, including call setup, viewing, playback and recording.

Information about the conference such as the duration, start time, end time, playback and recording status, and conference type are displayed at the bottom of the window. If the operator double clicks inside the Conference Window 41203 where there is no action associated with the clicking location, the Properties Box [41701 FIG. 113] is displayed with the conference settings.

A conference is ended by pressing the End Conference button. This will disconnect all calls associated with the conference.

The Conference Window 41203 displays the connections in the conference and their connection status 41417, including any free MCU Port slots reserved for a not yet joined connection 41421. Each Connection listing contains a radio button 41422, the participant site name 41423 and status lights 41418–41420. The status of the two calls and the join are monitored and displayed with the site name in the Conference window 41203. The status squares 41418–41420 are colored boxes, with different colors representing different call statuses (e.g., no call, call in progress, active call, or active call that has been disconnected).

The Conference Window 41203 provides buttons to click 41417 that define the sequence in which a participant site gets connected to an MCU Port site, routed through the video operator. Other features available from this part of the window are watching the video input from a call, recording video input from either call, and making a normal video call to the participant site or to the MCU.

The color of the arrows 41424 represents the status of each call. The color of the arrows is also duplicated in the status lights 41418–41420 in the list of connections.

If there is a Playback Connection 41425 associated with the Conference, only one Call is necessary to an MCU Port site. The normal Participant Site call setup interface will be inaccessible, and the Join control 41405 will become the Start and Stop switch for playback.

Free MCU ports can be reached only when an MCU Port call for a defined Connection is inactive (or disconnected). This allows the operator to join a conference as if the operator were a participant. This is done by selecting the Connection with the free MCU port call. When connected, the operator can inform the rest of the participants that the operator is attempting to contact or restore a connection.

There are some functional limitations that the Conference Window 41203 will reflect. The Conference Window 41203 should not allow access to functions that cannot be performed, for example:

- The video operator can only view one call at a time.
- The video operator can record any call at any time with software unidirectional decoder.
- Playback connection selection changes the call setup buttons appropriately.
- The video operator can participate in a conference only when a MCU port call is inactive.
- The video operator can talk to participant site only when the participant is disconnected.

To clarify, a simple connection setup using the Conference Window proceeds as follows. By pressing the Call button near the participant site box 41402, the operator calls Adam (or, alternatively, Adam may call the operator), and then the operator places the call on Hold 41407. By pressing the Call button near the MCU Port site box 41403, the operator calls the MCU and then places the call on Hold 41408. By pressing the Join button 41405, the two calls are joined. In another embodiment, this can be an automated rather than a manual process. Adam and the MCU are now connected as H.320 video call. All three arrows 41424 will be green.

4. Video Watch Window

Figure 111:
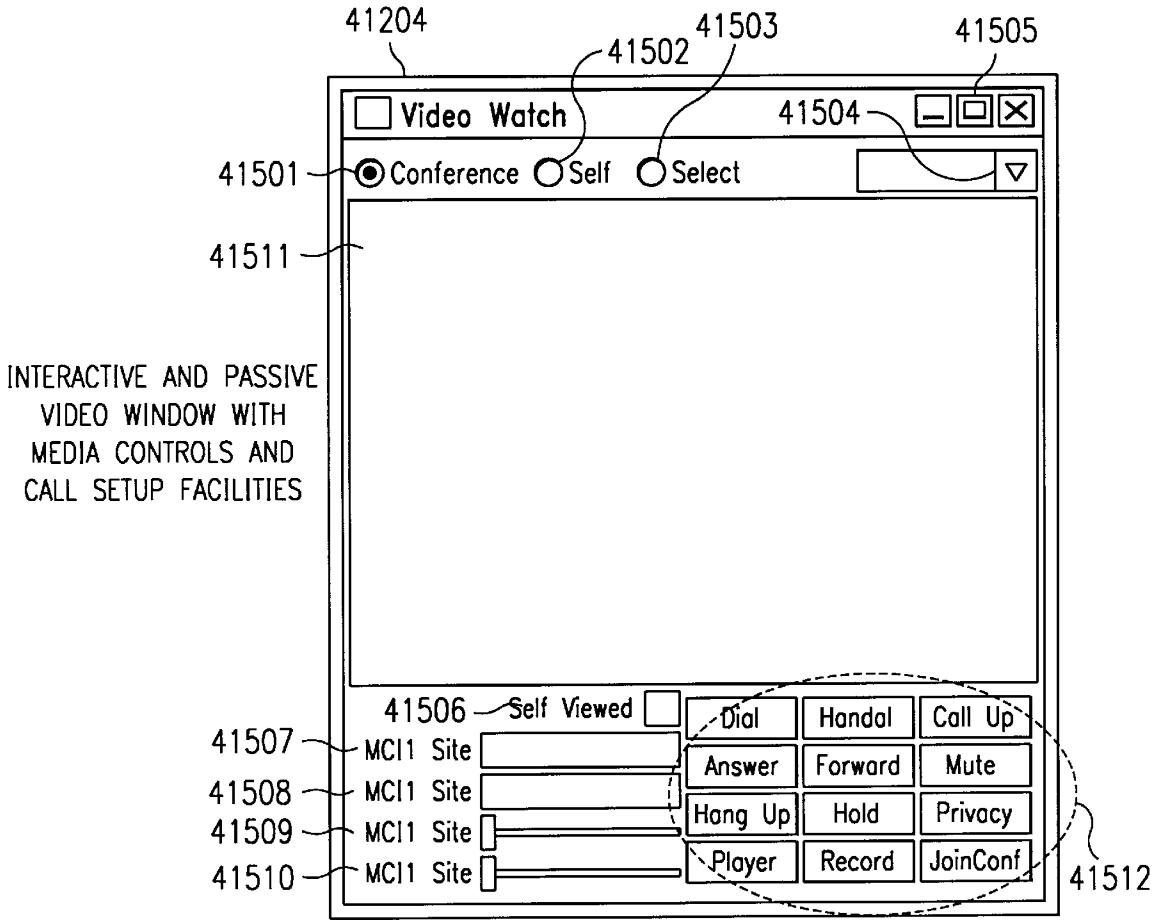
FIG. 111 shows one embodiment of the Video Watch window 41204, which displays the H.320 input from a selected call of a conference connection or a separate incoming or outgoing call in accordance with a preferred embodiment.

FIG. 111 shows one embodiment of the Video Watch window 41204, which displays the H.320 input from a selected call of a conference connection or a separate incoming or outgoing call. The Video Watch window 41204 also has controls for making normal calls 41512 and media control such as audio control 41509–41510.

The Video Watch window is the display for the unidirectional H.320 decode of the video output of a selected call. By default, the MCU call of the first active site will be displayed. To watch any other call, the appropriate View button must be pressed in the Conference Windows. The video and audio controls for this window such as volume control 41509–41510, picture size 41511, etc., are managed from the Video Control Panel.

When the operator chooses to make a normal H.320 video call (point to point), to a site or an available slot in an active conference, the Video Watch window 41204 is used for viewing the video. A small self-view video window should appear nearby when the operator selects the Self View button 41506.

5. Console Output Window

Figure 112:
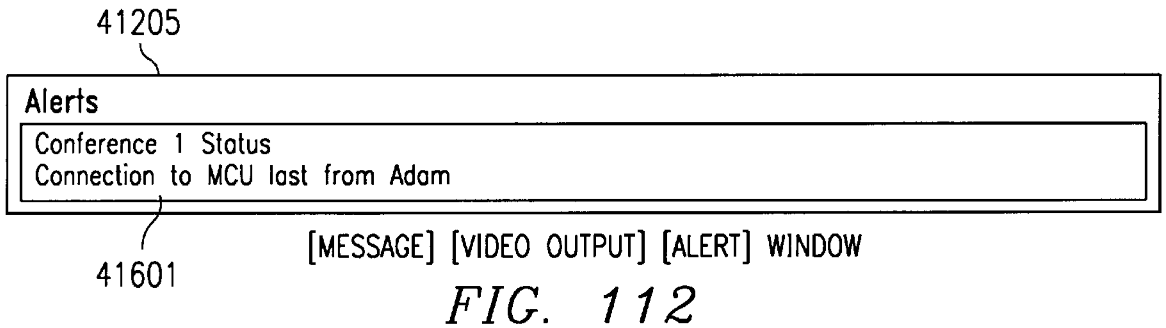
FIG. 112 shows one embodiment of the Console Output window 41205 which displays all error messages and alerts in accordance with a preferred embodiment.

FIG. 112 shows one embodiment of the Console Output window 41205 which displays all error messages and alerts 41601. The window is scrollable so that the video operator can see all errors that have occurred in the current session. These messages are also logged to a text file for future reference.

6. Properties Dialog Box

Figure 113:
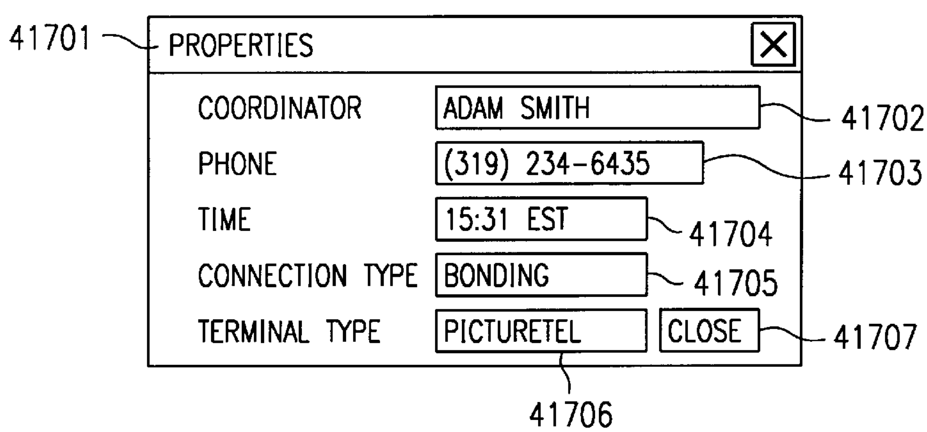
FIG. 113 shows a Properties dialog box in accordance with a preferred embodiment.

FIG. 113 shows a Properties dialog box 41701. Dialog boxes are windows that are transitional and only displayed temporarily. They are usually used for entering data or displaying information that requires immediate attention. This will be a modeless dialog box displaying the properties of a particular conference or site. There will be only one such window open at any time. If the user focuses on another Conference Window or Connection Window, the same dialog box is updated with the appropriate properties. FIG. 113 pictures the properties associated with a particular site, including the site coordinator 41702, the site phone number 41703, the time 41704, connection type 41705 and terminal type 41706. A Close button 41707 closes the Properties dialog box 41701.

XVII. WORLD WIDE WEB (WWW) BROWSER CAPABILITIES

A. User Interface

The graphical user interface is designed such that only a single IP connection from the workstation to the server is required. This single IP connection supports both the Internet connection between the WWW Browser and the WWW Site, and the messaging connection between the PC Client and the universal inbox (i.e., Message Center). The PC Client interface is integrated with the WWW Browser interface such that both components can exist on the same workstation and share a single IP connection without causing conflicts between the two applications.

WWW Browser access is supported from any of the commercially available WWW Browser interfaces:

Microsoft Internet Explorer;

Netscape Navigator (1.2, 2.X); or

Spyglass Mosaic.

In addition, the WWW Browser interface is optimized to support Windows 95; however, Windows 3.1 and Windows 3.11 are supported as well.

The WWW Browser interface detects the display characteristics of the user's workstation (or terminal) and adapts the presentation to support the display settings of the workstation. The presentation optimized around a 640×480 pixel display but is also capable of taking advantage of enhanced resolution and display qualities of 800×600 (and greater) monitors.

To improve performance, the user is able to select between 'minimal graphics' or 'full graphics' presentation. The WWW browser will detect whether a user has selected 'minimal graphics' or 'full graphics' and send only the appropriate graphics files.

B. Performance

Response time for downloading of information from the WWW Site or the Personal Home Page to the user's workstation or terminal meets the following benchmarks.

Workstation Configuration:

Processor: 486DX—33 MHz;

Memory: 12 MB;

Monitor: VGA, Super VGA, or XGA;

Access: Dialup;

Windows 95;

Presentation Option: Full Graphics; and

Peripherals: Audio Card, Audio Player Software, 14.4 Kbps Modem.

| REQUIREMENT | MEAN VALUE | NOT TO EXCEED VALUE |
|---|---|---|
| Retrieve and Personal Home Pages. Time is measured from when the user selects the Bookmark until the Status Bar reads, "Document: Done". | 20 sec | 30 sec |
| Retrieve WWW screens other than Home Pages. Time is measured from when the user selects the hypertext link or tab until the Status Bar reads, "Document: Done". | 5 sec (text only) or 15 sec (scheduling screen) | 15 sec (text only) or 30 sec (scheduling screen) |
| Start playing a voicemail message. Time is measured from when the users selects the voicemail message in the Message Center until the streaming audio file starts playing on the user's workstation. | 10 sec | 15 sec |

After a screen or page has been downloaded from the WWW Site to the workstation, the cursor is pre-positioned onto the first required field or field that can be updated.

C. Personal Home Page

The system provides subscribers the ability to establish a Personal Home Page which provides a vehicle for people to communicate with or schedule meetings with the subscriber. A person accessing a subscriber's Personal Home Page is referred to as the guest and the user that 'owns' the Personal Home Page is referred to as the subscriber.

Guest-access to Personal Home Pages will support the following features:

Create and send a text-based pager message through networkMCI Paging;

Create and send an email message to the email (MCI Mail or internetMCI) account; and Access the subscriber's calendar to schedule a meeting. Messages generated through the subscriber's Personal Home Page are directed to the subscriber's networkMCI or SkyTel Pager, or MCI email account.

Email messages composed by guests will:

Present the subscriber's name, not the subscriber's email address, in the email header;

Provide a field in the email header for the:

Sender's name (required field),

Sender's email address (optional field), and

Subject (optional field).

Guests 'request' appointments on a subscriber's Personal Home Page.

Requested appointments on a subscriber's Personal Home Page will be prefaced with "(R)".

Approved appointments will be prefaced with "(A)".

Subscribers are responsible for routinely checking their calendars and approving "(A)" or deleting requested appointments, and initiating the necessary follow-up communications to the requesting party. Approved appointments will be prefaced by "(A)".

Security Requirements

Calendar access from the Personal Home Page is designed to support two-levels of security:

No PIN Access:

Times Only, or

Times & Events;

PIN Access:

Times Only; or

Times & Events.

1. Storage Requirements

The system stores and maintains past and future appointments in the following manner:

Current month plus past six months of historical calendar appointments

Current month plus next twelve months of future calendar appointments.

A subscriber is provided the option to download the contents of the months appointments that are scheduled to be overwritten in the database. The calendar information that will be downloaded to the subscriber is in a comma delimited or DBF format and capable of being imported into Microsoft Schedule+, ACT or Ascend.

2. On Screen Help Text

On screen help text provides guest and subscriber icon access to field specific "Help" instructions to operate within the Personal Home Page. The Help Text must provide information describing:

How to Send the subscriber a text-based pager message from the Personal Home Page through networkMCI Paging;

How to Send the subscriber an email message from the Personal Home Page to an MCI email account;

How to Access and update a subscriber's Calendar;

How to Locate a user's Personal Home Page; and

How to Order your own Personal Home Page through MCI.

3. Personal Home Page Directory

The provides the guest the ability to access to a Personal Home Page directory through the existing MCI Home Page. This directory allows the guest to search all established Personal Home Page accounts for a specific Personal Home Page address, by specifying Last Name (required); First Name (optional), Organization (optional), State (optional) and/or Zip Code (optional). Results from the Personal Home Page directory search return the following information: Last Name, First Name, Middle Initial, Organization, City, State and Zip Code. Although City is not requested in search criteria it is provided in search results.

Another means for a guest to locate a Personal Home Page is through the WWW Browser. Many WWW Browsers have built in search capabilities for 'Net Directory.' Users' Personal Home Pages are listed within the directories of Internet addresses presented by the WWW Browser. The benefit to conducting your search from the MCI Home Page is that only Personal Home Pages are indexed (and searched). Conducting the search through the WWW Browser menu option will not limit the search to Personal Home Pages and therefore will conduct a search through a larger list of URLs. In addition, guests have the capability to enter the specific URL (i.e., Open Location) for the Personal Home Page rather than performing a search. This is especially important for those subscribers that have their Personal Home Page "unlisted" in the directory.

4. Control Bar

A Control Bar is presented at the bottom of the Personal Home Page. The Control Bar is presented after the guest has selected Personal Home Pages from the MCI Home Page. The Control Bar provides the guest access to the following features:

Help Text

MCI Home Page

Personal Home Page Directory

Feedback.

5. Home Page

The Home Page is the point of entry for the subscriber to perform message retrieval and exercise profile management from a WWW Browser. The Home Page is designed to provide the user easy access to the Message Center or Profile Management.

6. Security Requirements

Access to the Message Center or Profile Management is limited to authorized users. Users are prompted to enter their User ID and Password before accessing the Message Center or Profile Management. After three unsuccessful attempts, the user is blocked from accessing the Message Center or Profile Management and a WARNING message advises the subscriber to contact the MCI Customer Support Group. The account is deactivated until an MCI Customer Support representative restores the account. After the account is restored, the subscriber is required to update his or her Password.

A successful logon to the Message Center enables the user to access Profile Management without being challenged for another (i.e., the same) User ID and Password. The same is also true for users that successfully access Profile Management—they are allowed to access the Message Center without being challenged for another (i.e., the same) User ID and Password. Passwords are valid for one month. Users are prompted to update their password if it has expired. Updates to passwords require the user to enter the expired password, and the new password twice.

7. On Screen Help Text

Provide the subscriber icon access to field specific "Help" instructions to operate within the Home Page. The Help Text provides information describing:

How to Access Message Center;

How to Access Profile Management;

How to Access the MCI Home Page;

How to Access Personal Home Pages;

How to Send (i.e. Create or Forward) Messages through Message Center;

How to File Messages through Message Center;

How to Update the directlineMCI Profile;

How to Update the Information Services Profile;

How to Update their Personal Home Page;

How to Provide Feedback on the Home Page; and

How to Order the User's Guide.

Control Bar

A Control Bar is presented at the bottom of the Home Page. The Control Bar provides the guest access to the following features:

Help Text;

MCI Home Page;

Personal Home Page Directory; and

Feedback.

8. Profile Management

In addition to the On-Screen Help Text and Control Bar discussed above, the Profile Management screen presents a Title Bar. The Title Bar provides the subscriber easy access to the Profile Management components and quick access to the Message Center. Access to the Profile Management components is provided through the use of tabs which will include:

directlineMCI;

Information Services;

Personal Home Page;

List Management; and

Message Handling.

The directlineMCI tab includes additional tabs for the underlying components of directlineMCI which are:

Voicemail;

FAXmail;

Paging.

The directlineMCI Profile Management system provides subscribers a Profile Management page from which account profile information can be manipulated to:

Create new directlineMCI profiles and assign names to the profile;

Update existing directlineMCI profiles;

Support the rules-based logic of creating and updating directlineMCI profiles (e.g., selection of only one call routing option, like voicemail, invokes override routing to voicemail; and updates made in one screen ripple through all affected screens, like paging notification);

Enable a directlineMCI number;

Enable and define override routing number;

Enable and define FollowMe routing; and

Define RNA parameters for each number in the directlineMCI FollowMe routing sequence Enable and define final routing (formerly called alternate routing) to:

Voicemail and pager,

Voicemail only,

Pager only, and

Final message;

Invoke menu routing if two or more of the call routing options (FollowMe, voicemail, faxmail or pager) are enabled;

Enable voicemail;

Enable faxmail;

Enable paging;

Define the default number for faxmail delivery;

Activate paging notification for voicemail;

Activate paging notification for faxmail;

Define schedules to activate/deactivate different directlineMCI profiles;

Provide guest option to classify voicemails for urgent delivery;

Configure the time zone for all message types that will be used to identify the time a message is received;

Define call screening parameters for:

Name and ANI,

ANI only, and

Name only; and

Enable or disabling park and page.

9. Information Services Profile Management

Information Services Profile Management provides subscribers the ability to select the information source, delivery mechanism (voicemail, pager, email) and the delivery frequency depending upon the information source and content. Specifically, the subscriber has the ability configure any of the following information sources:

Stock Quotes and Financial News; and

Headline News.

Stock Quotes and Financial News provides the subscriber the following:

Business News Headlines;

Stock Quotes (delay less than or equal to 10 minutes);

Stock Market Reports (hourly, AM/PM or COB);

Currency and Bond Reports (hourly, AM/PM or COB);

Precious Metal Reports (hourly, AM/PM or COB); and

Commodities Reports (hourly, AM/PM or COB).

Business News Headlines are delivered via email once per day. Reports (Stock Market, Currency and Bond, Precious Metal and Commodities) are delivered at the interval specified by the subscriber. Hourly reports require that email message is time stamped at 10 minutes after the hour. AM/PM reports require that one email message is transmitted in the morning (11:10 am ET) and one email message is transmitted in the evening (5:10 PM ET), with COB reports transmitted at 5:10 PM ET.

The content of the Stock Market Report contains:

Stock or mutual fund ticker symbol;

Stock or mutual fund opening price;

Stock or mutual fund closing price;

Last recorded bid price for the stock or mutual fund;

Last recorded ask price for the stock or mutual fund;

Stock or mutual fund's 52-week high; and

Stock or mutual fund 52-week low.

Stock Quotes and Financial News also provide the subscriber the ability to select from a list of available stocks and mutual funds and define criteria whereby a voicemail or text-based page is provided. The definable criteria are referred to as 'trigger points' and can be any or all of the following conditions:

Stock or mutual fund reaches a 52-week high value;

Stock or mutual fund reaches a 52-week low value;

Stock or mutual fund reaches a user-defined high point; and

Stock or mutual fund reaches a user-defined low-point.

After a 'trigger point' condition has been satisfied, a message (voicemail or text-based pager) is transmitted within 1 minute to the subscriber. Voicemail messages are directed to the subscriber's mailbox defined in the user's directlineMCI account. The information content for Stock Quotes and Financial News is no older-than 10-minutes old.

10. Personal Home Page Profile Management

Personal Home Page Profile Management provides subscribers the ability to customize their Personal Home Page and define how guests can communicate with them (email or text-based pager). In addition, Profile Management also enables subscribers to control guest access to their calendar. Specifically, the subscriber is able to:

- Establish and maintain a greeting message;
- Establish and maintain a contact information (i.e., address information);
- Establish and maintain a personal calendar;
- Enable or disable guest access to paging, email or calendar;
- Control guest access to calendar by defining PINs for standard or privileged access; and
- Incorporate an approved subscriber submitted graphic, such as a personal photo or corporate logo, on a predefined location on the Personal Home Page.

Upon creation of the Personal Home Page, the contact information is populated with the subscriber's delivery address information. The subscriber has the capability to update that address information contained within the contact information.

11. List Management

List Management provides the subscriber the ability to create and update lists. Profile Management provides subscribers the ability to define lists accessible through the Message Center for message distribution. In one embodiment, list management is centralized such that Fax Broadcast list management capabilities are integrated with directlineMCI list management capabilities to provide a single database of lists. In an alternate embodiment, the two list management systems are separate, so the user may access either database for lists.

Lists are maintained through an interface similar to an address book on the PC Client whereby subscriber are able to add or remove names to lists. Associated with each person's name are the email address, faxmail address (i.e., ANI), voicemail address (i.e., ANI), and pager number. As messages populate the Message Center inbox (i.e., universal inbox), the address book is updated with the source address of the associated message type.

When a subscriber chooses to create a distribution list, she is prompted to select a name, type and identifier name for the list. All created lists are available in alphabetical order by name. The type of the list (voice, fax, email, page) accompanies the list name. In addition, list identifiers may consist of alphabetic characters.

The subscriber is then prompted for recipient names and addresses to create a distribution list. The subscriber is able to access his address book for recipient information. The subscriber is not be restricted to record the same address types in his list; if a list is created with a fax type, the subscriber is able to include ANI, email and paging addresses in the list. The subscriber is able to manage his distribution lists with create, review, delete, edit (add and delete recipients) and rename capabilities.

When the user chooses to modify a list through the WWW Browser interface, she is prompted to select the address type (voice, fax, fax, paging, email) and a list of the user's distribution lists should be provided for that address type. The user is also able to enter the List Name to locate it. Users are able to modify lists through create, review, edit (add and remove recipients), delete and rename commands.

Whenever a subscriber modifies a list with a recipient addition, removal or address change, she is able to make the modification a global change. For example, a user changes the voice mailbox address for Mr. Brown in one list. she is able to make this a global change, changing that address for Mr. Brown in all of his distribution lists. While the subscriber is able to create and modify distribution lists through the ARU and VRU in addition to the PC, enhanced list maintenance capabilities are supported through the WWW Browser interface.

The subscriber is able to search and sort lists by name or by the different address fields. For example, a user is able to search for all lists containing 'DOLE' by using the *DOLE* command within the search function. In addition, users are able to search lists using any of the address fields. For example, a user could search based on a recipient number, 'to' name or zip code. A user is able to sort lists by list names, identifiers and types or by any address field.

In addition to search capabilities, the distribution list software enables the user to copy and create sub-lists from existing distribution list records. The user is able to import and export recipient data from external database structures.

The capability to share lists among users and upload lists to a host also exists.

12. Global Message Handling

Global Message Handling provides subscribers the ability to define the message types that will appear in the "universal inbox" or accessed through the Message Center. The following message types are selectable:

- directlineMCI voicemail;
- directlineMCI faxmail;
- networkMCI and SkyTel Paging; and
- Email from an MCI email account (i.e., MCI Mail or internetMCI).

If a subscriber is not enrolled in a specific service then that option will be grayed-out and therefore not selectable within Global Message Handling. Any updates to Global Message Handling result in a real-time update to the Message Center. An example is that a subscriber may choose to allow voicemail messages to appear in the Message Center. The Message Center automatically retrieves all voicemail message objects that exist within the voicemail database.

D. Message Center

The Message Center functions as the "universal inbox" for retrieving and manipulating message objects. The "universal inbox" consists of folders containing messages addressed to the user. Access to the Message Center is supported from all WWW Browsers, but content contained in the "universal inbox" only presents the following message types:

- Voicemail: addressed to user's directlineMCI account;
- Email: addressed to the user's MCI email (i.e., MCI Mail or internetMCI) account;
- FAXmail: addressed to the user's directlineMCI account; and
- Paging: addressed to the user's networkMCI Paging account (or SkyTel Paging account).

In addition to the On-Screen Help Text and Control Bar discussed in the previous sections, the Message Center screen presents a Title Bar. The Title Bar provides the subscriber easy access to the Message Center functions and quick access to Profile Management. The Message Center functions that are supported through the Title Bar are:

- File: lists user's defined folders and allows user to select folder;
- Create: compose a new email message;

Forward: voicemails will be forwarded as email attachments;

Search: provide ability to search based on message type, sender's name or address, subject or date/time; and Save: allows users to save messages to a folder on the universal inbox, to a file on the workstation or to a diskette.

When composing or forwarding messages through the Message Center, the user has the ability to send a message as either an email or a faxmail. The only limitation is that voicemails may only be forwarded as voicemails or as email attachments. All other message types may be interchanged such that emails may be forwarded to a fax machine, or pager messages may be forwarded as an email text message. Messages that are sent out as faxmail messages are generated in a G3 format, and support distribution to Fax Broadcast lists.

The presentation layout of the Message Center is consistent with the presentation layout of the PC Client such that they have the same look and feel. The Message Center is designed to present a Message Header Frame and a Message Preview Frame, similar to the presentation that is supported by nMB v3.x. The user will have the ability to dynamically re-size the height of the Message Header Frame and the Message Preview Frame. The Message Header Frame will display the following envelope information:

Message type (email, voice, fax, page);

Sender's name, ANI or email address;

Subject;

Date/time; and

Message size.

The Message Preview Frame displays the initial lines of the body of the email message, the initial lines of the first page of the faxmail message, the pager message, or instructions on how to play the voicemail message. Playing of voicemail messages through an WWW Browser is supported as a streaming audio capability such that the subscriber is not required to download the audio file to their workstation before playing it. The streaming audio is initiated after the user has selected (single left-mouse click) on the voicemail header in the Message Header Frame. Displaying of faxmail messages is initiated immediately after the user has selected (single left-mouse click) on the faxmail header in the Message Header Frame.

The Message Center also allows the subscriber to use distribution lists that have been created in Profile Management. The distribution lists support sending messages across different message types.

In addition to the basic message retrieval and message distribution, the Message Center supports the creation and maintenance of message folders (or directories) within the universal inbox. Initially users are limited to the following folders:

Draft: retains all saved messages that have NOT been sent;

Inbox: retains all messages received by the "universal inbox" and it will be the default folder presented when the user accesses Message Center;

Sent: retains all messages that have been sent; and

Trash: retains for 7 days all messages marked for delete. Subscribers will eventually be able to create (and rename) folders (and folders within folders).

1. Storage Requirements

Initially, users are allotted a limited amount of storage space for directlineMCI voicemail and directlineMCI faxmail. Pager recall messages and email messages are not limited based upon amount of storage space consumed, but rather the date/time stamp of the message received. Ultimately, storage requirements will be enforced based upon a common measurement unit, like days. This will provide users an easier approach to knowing when messages will be deleted from the database, and when guests will be prevented from depositing a message (voicemail, faxmail) to their "universal inbox". To support this, the following are storage requirements for messages retained in the inbox:

directlineMCI voicemail: 60 minutes;

directlineMCI faxmail: 50 pages;

networkMCI pages: 99 hours; and

Email: 6 months.

The subscriber is provided the option to download the messages that are scheduled to be overwritten in the database except for messages that are retained in the trash folder.

E. PC Client Capabilities

1. User Interface

The PC Client interface supports subscribers that want to operate in a store & forward environment. These users want to download messages to either manipulate or store locally. The PC Client is not designed to support Profile Management and the PC Client interface only presents messages (voicemail, faxmail, email, text-page). Access to Profile Management capabilities only is available through the ARU interface or the WWW Browser interface. The PC Client interface is integrated with the WWW Browser interface such that both components can exist on the same workstation and share a single IP connection.

The PC Client interface is optimized to support Windows 95; however, Windows 3.1 is supported as well.

The graphical user interface is designed to present a Message Header Window and a Message Preview Window, similar to the presentation that is supported by nMB v3.x and is supported by the WWW Browser. The user has the ability to dynamically re-size the height of the Message Header Window and the Message Preview Window. The Message Header Window displays the following envelope information:

Message type (email, voice, fax, page);

Sender's name, ANI or email address;

Subject;

Date/time; and

Message size.

The Message Preview Window displays the initial lines of the body of email messages or pager messages, or instructions on how to display the faxmail message or play the voicemail message. Playing of voicemail messages from the PC Client requires an audio card be present on the PC. Displaying of faxmail messages invokes the faxmail reader within the PC Client.

The Message Center also allows the user to use distribution lists that have been created in Profile Management. The distribution lists support sending messages across different message types.

2. Security

User authentication between the PC Client and the server is negotiated during the dial-up logon session. Security is supported such that the User ID and Password information is imbedded in the information that is passed between the PC Client and server when establishing the interface. Subscribers are not required to manually enter their User ID and Password. In addition, updates made to the password are communicated to the PC Client.

3. Message Retrieval

Message Retrieval provides subscribers the ability to selectively retrieve voicemail, faxmail, pages and email messages that reside in the "universal inbox". Message types that are displayed or played from the PC Client include:

directlineMCI voicemail;

directlineMCI faxmail;

networkMCI paging; and

Email from an MCI email account;

The PC Client initiates a single communication session to retrieve all message types from the "universal inbox". This single communication session is able to access the upstream databases containing voicemails, faxmails, emails and pages.

The PC Client also is able to perform selective message retrieval such that the user may is able to:

Retrieve all messages;

Retrieve full text (or body) for selected message header (s);

Retrieve messages based upon editable search criteria:
- priority messages;
- email messages;
- pager messages;
- faxmail messages (complete or header only);
- voicemail messages (complete or header only);
- sender name, address or ANI;
- date/time stamp on message; and
- message size.

Header-only faxmail messages retrieved from the "universal inbox" are retained in the "universal inbox" until the message body is retrieved. Voicemail messages are retained in the "universal inbox" until the subscriber accesses the "universal inbox" via the WWW Browser (i.e., Message Center) or ARU and deletes the message. Messages retrieved from the "universal inbox" are moved to the desktop folder.

In addition, the PC Client is able to support background and scheduled polling such that users are able to perform message manipulation (create, edit, delete, forward, save, etc.) while the PC Client is retrieving messages.

4. Message Manipulation

Message Manipulation provides subscribers the ability to perform many standard messaging client actions, like:

Compose (or create) email, faxmail or pager messages;

Forward all message types;

Save;

Edit;

Delete;

Distribute;

Attach;

Search; and

Display or play messages.

F. Order Entry Requirements directlineMCI or networkMCI Business customers are provided additional interface options to perform profile management and message management functions. Both directlineMCI and networkMCI Business customers are automatically provided accounts to access the features and functions available through the different interface types. The ability to provide accounts to networkMCI Business customers is also supported; however not all networkMCI Business customers are provided accounts. Order entry is flexible enough to generate accounts for networkMCI Business customers, as needed.

Order entry is designed such that directlineMCI customers or networkMCI Business customers are automatically provided access to the additional interface types and services provided in the system. For example, a customer that orders directlineMCI (or networkMCI Business) is provided an account to access the Home Page for Profile Management or Message Center. Checks are in place to prevent a customer from being configured with two accounts—one from directlineMCI and one from networkMCI Business. In order to accomplish this, integration between the two order entry procedures is established.

An integrated approach to order entry requires a single interface. The interface integrates order entry capabilities such that the order entry appears to be housed in one order entry system and does not require the order entry administrator to establish independent logon sessions to multiple order entry systems. This integrated order entry interface supports a consistent order entry methodology for all of the services and is capable of pulling information from the necessary order entry systems. In addition, the interface supports the capability to see the services associated with the user's existing application.

The specific requirements of the integrated order interface system are:

Automated feeds to define an MCI email (MCI Mail or internetMCI) account;

Automated feeds to define a networkMCI paging account (or SkyTel Paging) account;

Automated feeds to define a directlineMCI account;

Automated feeds to enable Fax Broadcast capabilities;

Ability to manually enter MCI email account, networkMCI paging account or directlineMCI account information;

Ability to enable or disable access to inbound information services; and

Ability to enable or disable access to outbound information services.

These abilities give order entry administrators the flexibility to add a user based upon preexisting MCI service (email, paging, directlineMCI) account information. Alternatively, the order administrator may add a user while specifying the underlying services.

The order entry systems provide the necessary customer account and service information to the downstream billing systems. They also track the initial customer order and all subsequent updates so that MCI can avoid sending duplicate platform software (i.e., PC Client) and documentation (i.e., User Guide). In addition, order entry processes enable an administrator to obtain the following information:

Record customer delivery and name:
- support U.S.A. and Canadian addresses, and
- provide ability to prevent delivery to P.O. boxes;

Record customer's billing address, phone number and contact name;

Record the order date and all subsequent updates;

Record the name, phone number and division of the Account Representative that submitted the order;

Record or obtain the user's directlineMCI number;

Record or obtain the user's networkMCI paging PIN;

Record or obtain the user's MCI email account ID;

Generate a daily Fulfillment Report that is electronically sent to fulfillment house; and Generate a daily Report that tracks:
- number of orders received;
- number of orders to create networkMCI Paging (or SkyTel Paging) account;

number of orders to create MCI email account, and number of orders to create a directlineMCI account.

Personal home pages can be ordered for a customer. The customer delivery information recorded during order entry is the default address information that is presented from the user's Personal Home Page. In addition, the order entry processes support the installation of and charging for special graphics.

The capability to turn existing feature/functionality 'on' and 'off' for a specific service exists. Features that can be managed by the user are identified within the order entry systems. These features are then activated for management within the user's directory account.

There are real-time access capabilities between order entry systems and the user's directory account. This account houses all of the user's services, product feature/functionality, and account information, whether user-managed or not. Those items that are not identified as user-managed are not accessible through the user's interface.

1. Provisioning and Fulfillment

Access requirements have been defined in terms of inbound access to the system and outbound access from the system. Inbound access includes the methods through which a user or a caller may access the system. Outbound access includes the methods through which users are handled by the system in accordance with a preferred embodiment. Internet support exists for both inbound and outbound processing.

The following components may provide inbound access:

directlineMCI: 800/8XX;

MCI Mail: 800/8XX, email addresses;

networkMCI Paging: 800/8XX; and internetMCI mail: 800/8XX, POP3 email address.

The following components have been identified for outbound access:

directlineMCI: Dial 1;

Fax Broadcast: 800/8XX, local;

MCI Mail: 800/8XX, email address; and internetMCI mail: 800/8XX, POP3 email address.

G. Traffic Systems

Traffic is supported according to current MCI procedures.

H. Pricing

Initially, the features are priced according to the existing pricing structure defined for the underlying components. In addition, taxing and discounting capabilities are supported for the underlying components as they are currently being supported. Discounting is also supported for customers that subscribe to multiple services.

I. Billing

The billing system:

- Supports charges for directlineMCI enhanced services (voicemail, faxmail, both);
- Supports charges for peak and off-peak rates;
- Supports discounts for multiple services (directlineMCI, networkMCI Business, networkMCI Paging, networkMCI Cellular) which will vary based upon number of services;
- Supports ability to suppress networkMCI Cellular charges for directlineMCI calls (originating and terminating);
- Supports charges for monthly fees sensitive to directlineMCI usage;
- Supports promotions in the form of free minutes based on directlineMCI usage;
- Supports charges for Personal Home Pages;
- Supports ability to suppress charges for Personal Home Pages; and
- Supports SCA Pricing.

In one embodiment, the billing system supports the current invoicing procedures that exist for each of the underlying components. In an alternative embodiment, the billing provides a consolidated invoice that includes all of the underlying components. In addition to invoicing, directed billing is supported for all of the underlying components that are currently supporting directed billing.

XVIII. DIRECTLINE MCI

The following is a description of the architecture of the directline MCI system, as modified for use with the system. This document covers the general data and call flows in the directlineMCI platform, and documents the network and hardware architecture necessary to support those flows. Billing flows in the downstream systems are covered at a very high level. Order Entry (OE) flows in the upstream systems are covered at a very high level. Certain portions of the directlineMCI architecture reuse existing components (e.g. the Audio Response Unit (ARU)). Those portions of the directlineMCI architecture which are new are covered in more detail.

A. Overview

In addition to billing, order entry, and alarming, the directlineMCI system is made up of three major components, as shown in FIG. 43:

ARU (Audio Response Unit) 502

VFP (Voice Fax Platform) 504

DDS (Data Distribution Service) 506

The subsections below describe each of the major components at a high level.

FIG. 43 shows the high-level relationships between the major system components.

1. The ARU (Audio Response Unit) 502

The ARU 502 handles all initial inbound calls for directlineMCI. Some features (such as find me/follow me) are implemented entirely on the ARU. Inbound faxes are tone-detected by the ARU and extended to the VFP 504. Menuing provided by the ARU can be used to request access to the voicemail/faxmail features, in which case the call is also extended to the VFP.

2. The VFP (Voice Fax Platform) 504

The VFP provides the menuing for the voicemail/faxmail features as well as outbound fax and voice forwarding and pager notifications. The VFP is also the central data store for the customized subscriber prompts which are played and recorded by the ARU 502.

3. The DDS (Data Distribution Service) 506

The DDS is a central data repository for OE profiles and Billing Details Records (BDRs). OE profiles are deposited with DDS, which is responsible for distributing the profiles to all of the appropriate systems. DDS 506 collects BDRs and ships them to the downstream billing systems.

B. Rationale

The requirement for the directlineMCI service is to integrate a variety of service components into a single service accessed by a single 800 number. A number of these service components had been previously developed on the ISN ARU platform. The services not present in the ARU were mailbox services and fax services. The ARU 502 of the system 500 incorporates a voicemail/faxmail platform purchased from Texas Instruments (TI). Portions of that software are ported to run on DEC Alpha machines for performance, reliability, and scalability. Another requirement for the directlineMCI implementation is integration with the mainstream (existing MCI) billing and order entry systems. The DDS provides the inbound and outbound interfaces between directlineMCI and the mainstream order entry systems.

C. Detail

FIG. 43 shows the relationships between the major system components. The OE system 508 generates subscriber profiles which are downloaded via DDS 506 to the ARU 502 and the Voice Fax Platform (VFP) 504. BDRs generated by the ARU 502 and VFP 504 are fed to the billing systems 510 via DDS 506. The ARU 502 handles all inbound calls. If faxtone is detected, or if a voicemail/faxmail feature is requested, the call is extended from the ARU 502 to the VFP 504. For mailbox status (e.g. "You have three messages"), the ARU 502 queries the VFP 504 for status and plays the prompt.

Subscribers' customized prompts are stored on the VFP 504. When the ARU plays the customized prompt, or records a new prompt, the prompt is accessed on the VFP 504. Alarms from the ARU 502 and VFP 504 are sent to the Local Support Element (LSE).

1. Call Flow Architecture 520

Figure 44:
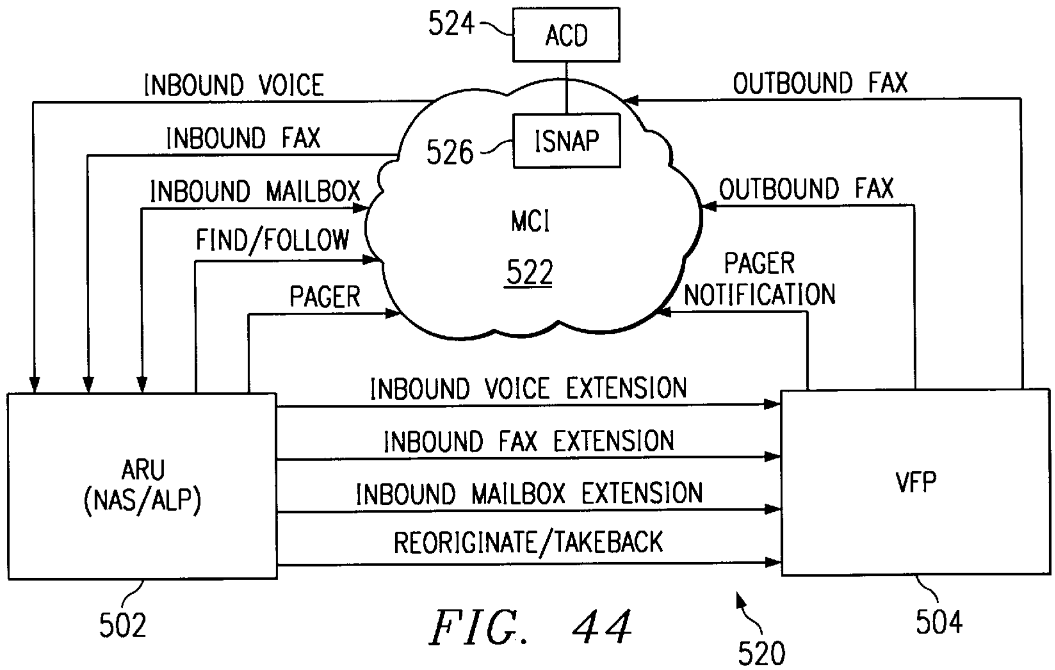

The call flow architecture for directlineMCI is shown in FIG. 44. The top part of the figure shows the network 522 connectivity used to transport the calls. The bottom part of the figure shows the call direction for different call types. The subsections below provide the text description to accompany the figure.

2. Network Connectivity

All inbound ISN calls are received at an Automatic Call Distributor (ACD) 524 connected to the MCI network 522. The Access Control Point (ACP) receives notice of an inbound call from the Integrated Services Network Application Processor (ISNAP) 526, which is the control/data interface to the ACD 524. The Network Audio System (NAS) plays and records voice under the control of the ACP via a T1 interface to the ACD. In the United States, a digital multiplexing system is employed in which a first level of multiplexed transmission, known as T1, combines 24 digitized voice channels over a four-wire cable (one-pair of wires for "send" signals and one pair of wires for "receive" signals). The conventional bit format on the T1 carrier is known as DS1 (i.e., first level multiplexed digital service or digital signal format), which consists of consecutive frames, each frame having 24 PCM voice channels (or DS0 channels) of eight bits each. Each frame has an additional framing bit for control purposes, for a total of 193 bits per frame. The T1 transmission rate is 8000 frames per second or 1.544 megabits per second (Mbps). The frames are assembled for T1 transmission using a technique known as time division multiplexing (TDM), in which each DS0 channel is assigned one of 24 sequential time slots within a frame, each time slot containing an 8-bit word.

Transmission through the network of local, regional and long distance service providers involves sophisticated call processing through various switches and hierarchy of multiplexed carriers. At the pinnacle of conventional high-speed transmission is the synchronous optical network (SONET), which utilizes fiber-optic media and is capable of transmission rates in the gigabit range (in excess of one-billion bits per second). After passing through the network, the higher level multiplexed carriers are demultiplexed ("demuxed") back down to individual DS0 lines, decoded and coupled to individual subscriber telephones.

Typically, multiple signals are multipexed over a single line. For example, DS3 transmission is typically carried by a coaxial cable and combines twenty-eight DS1 signals at 44.736 Mbps. An OC3 optical fiber carrier, which is at a low level in the optical hierarchy, combines three DS3 signals at 155.52 Mbps, providing a capacity for 2016 individual voice channels in a single fiber-optic cable. SONET transmissions carried by optical fiber are capable of even higher transmission rates.

The NAS/ACP combination is referred to as the ARU 502. If the ARU 502 determines that a call must be extended to the VFP 504, it dials out to the VFP 504. The VFP media servers are connected to the MCI network 522 via T1. Data transfer from the ARU 502 to the VFP 504 is accomplished via is Dual Tone Multi-Frequency (DTMF) on each call.

3. Call Flow

The call scenarios shown in FIG. 44 are detailed below. At the start of any of the inbound calls, the ARU 502 has already received the call and performed an application select to determine whether the call is a directlineMCI call or not.

a) Inbound FAX:

An inbound FAX call is delivered to the ARU 502. The ARU performs a faxtone detect and extends the call to the VFP 504. Account number and mode are delivered to the VFP utilizing DTMF signaling.

b) Inbound Voice, ARU only:

An inbound voice call is made in either subscriber or guest mode, and only those features which use the ARU 502 are accessed. The ARU determines mode (subscriber or guest). In subscriber mode, the ARU queries the VFP 504 to determine the number of messages. No additional network accesses are made.

c) Inbound/Outbound Voice, ARU only:

A call is made to the ARU 502, and either pager notification or find me/follow me features are accessed. The ARU 502 dials out via the ACD 524 to the outside number.

d) Inbound Voice, VFP features:

A call is made to the ARU 502, and the call is extended to the VFP 504. Account number and mode (subscriber or guest) are sent to the VFP via DTMF. The guest modes are:

1. Deposit voicemail.
2. Deposit fax mail.
3. Collect fax mail.

The subscriber modes are:

1. Retrieve or send mail.
2. Maintain broadcast lists.
3. Modify mailbox name recording.

The VFP 504 continues prompting the user during the VFP session.

e) Outbound Fax/Voice/Pager, VFP only:

For FAX or voice delivery or pager notification, the VFP dials out on the MCI network 522 directly.

f) Reoriginate/Takeback:

While an inbound subscriber call is connected to the VFP 504, the user may return to the top level of the ARU 502 directlineMCI menus by pressing the pound key for two seconds. The network 522 takes the call back from the VFP 504 and reorginates the call to the ARU 502.

4. Data Flow Architecture

Figure 45:
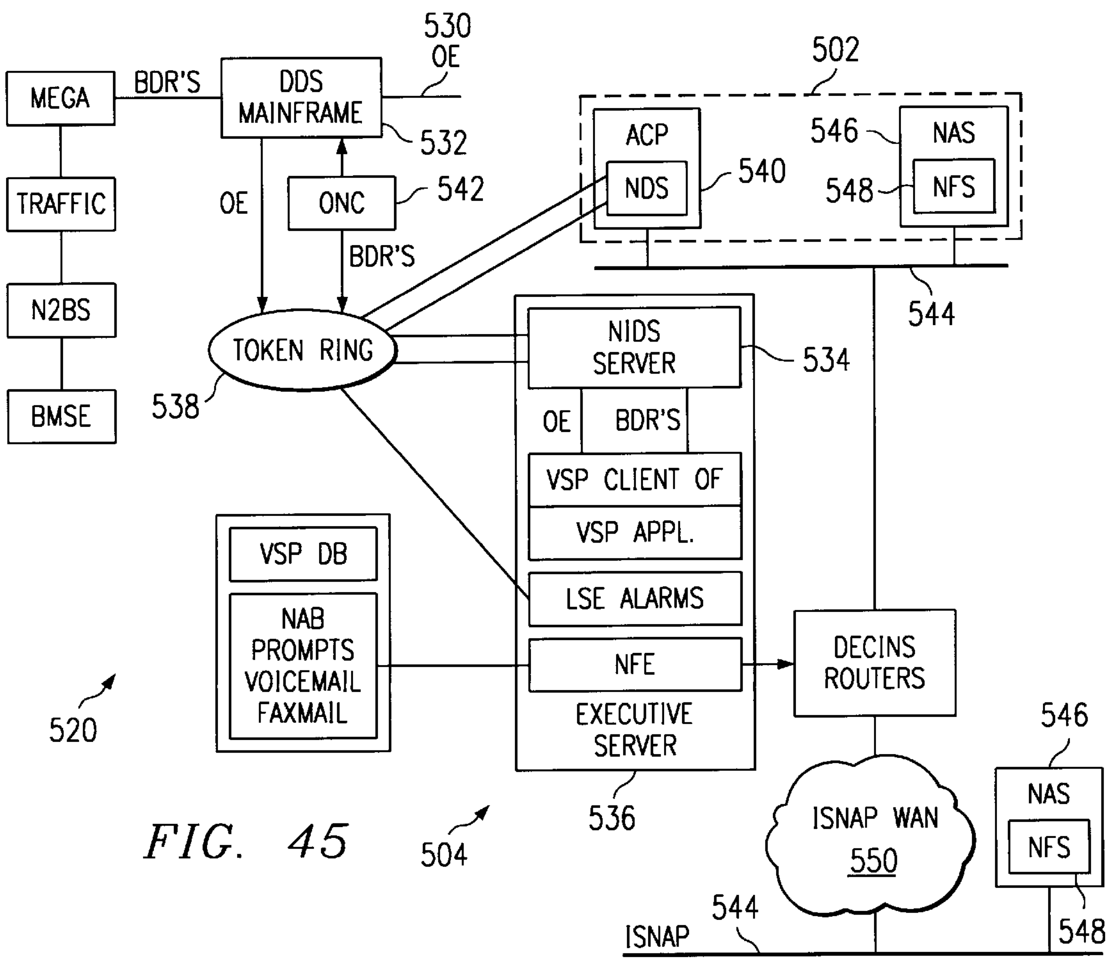

FIG. 45 depicts the primary data flows in the directlineMCI architecture 520:

- OE records (customer profiles) are entered in an upstream system and are downloaded at 530 to the DDS mainframe 532. The DDS mainframe downloads the OE records to the Network Information Distributed Services (NIDS) servers 534 on the ARU/ACP and the VFP/Executive Server 536. These downloads are done via the ISN token ring network 538. On the executive server 536, the OE records are stored in the local Executive Server database (not shown).
- BDRs are cut by both the Executive Server 536 and the ACP 540. These BDRs are stored in an Operator Network Center (ONC) server 542 and are uploaded to the DDS mainframe 532. The uploads from the ONC servers 542 to the DDS mainframe are done via the ISN token ring network 538.

The ARU 502 prompts subscribers with their number of voicemail/faxmail messages. The number of messages a subscriber has is obtained from the VFP 504 by the ACP 540 over the ISNAP Ethernet 544. Note that the ACPs 540 may be at any of the ISN sites.

The user-recorded ad hoc prompts played by the NAS 546 are stored on the VFP 504 and are played over the network on demand by the NAS 546. The NFS protocol 548 is used over the ISNAP Local Area Network (LAN) 544 and Wide Area network (WAN) 550.

D. Voice Fax Platform (VFP) 504 Detailed Architecture

1. Overview

Figure 46:
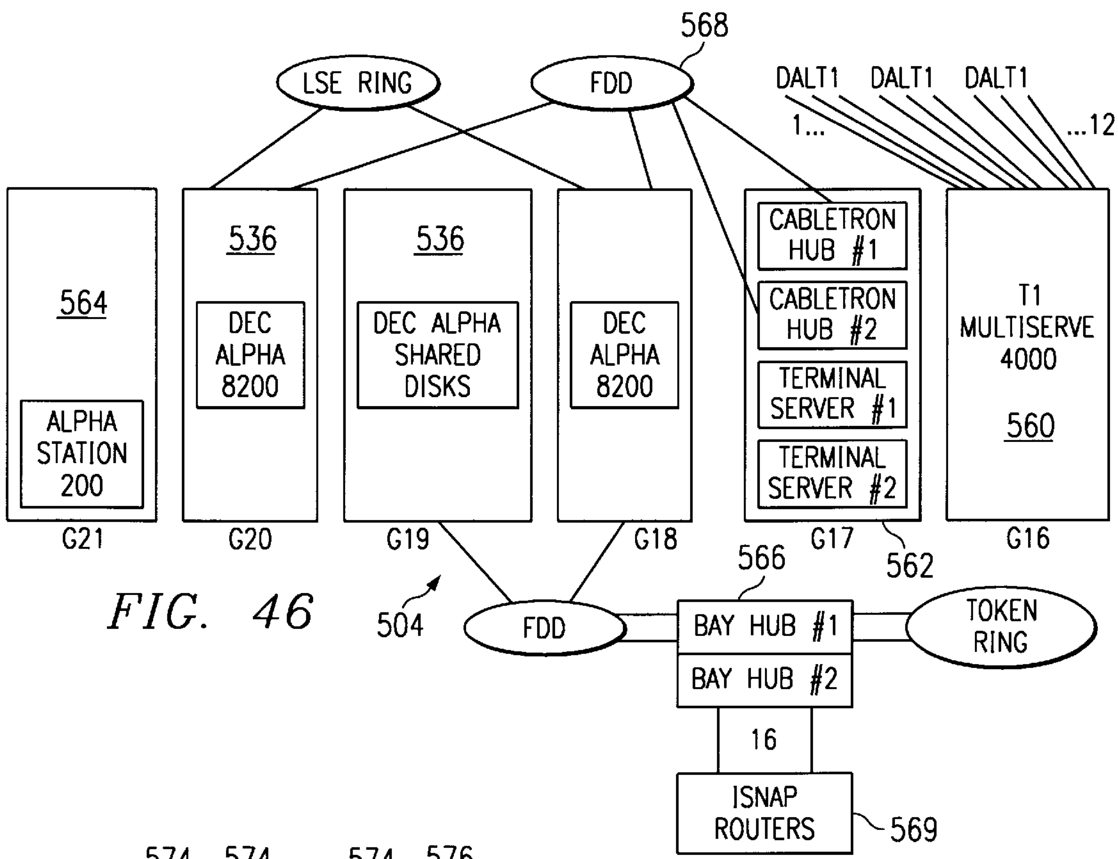

FIG. 46 shows the hardware components of the Voice Fax Portion 504 of the directlineMCI system for the first embodiment. The main components in this system are:

The TI MultiServe 4000 media server 560.

The DEC 8200 executive servers 536.

The Cabletron MMAC+ hubs 562.

The AlphaStation 200 console manager and terminal servers 564.

The Bay Networks 5000 hubs 566.

In another embodiment, the Cabletron hubs will be removed from the configuration, and the Bay Networks hubs will then carry all the network traffic.

2. Rationale

The TI MultiServe 4000 560 was selected by MCI for the voicemail/faxmail portion of the directlineMCI platform. The MultiServe 4000 is a fairly slow 68040 machine on a fairly slow Nubus backplane. The 68040/Nubus machines are used by TI as both media servers (T1 interface, DSPs for voice and fax) and also for the executive server (database and object storage). Although this hardware is adequate for media server use, it was inadequate as an executive server to serve hundreds or even thousands of gigabytes of voice and fax data and thousands of media server ports. Additionally, there is no clustering (for either performance or redundancy) available for the media server hardware. Thus, the executive server portion of the TI implementation was ported by MCI to run on a DEC Alpha 8200 cluster 536, described below. This clustering provides both failover and loadsharing (thus scalability).

Likewise, the gigabytes that must be moved from the high speed 8200 platforms must be moved across a network to the TI media servers. Cabletron Hubs 562 with both Fiber Distribution Data Interface (FDDI) and switched 10bT connectivity provide the backbone for the implementation. Each media server 560 is attached to a redundant pair of switched Ethernet ports. Because each port is a switched port, each media server gets a dedicated 10 Mb of bandwidth to the hub. The 8200 servers 536 each need a large network pipe to serve the many smaller 10 Mb Ethernet pipes. For the first embodiment, the FDDI interfaces 568 will be used. However, traffic projections show that the necessary traffic will exceed FDDI capacity by several times, so an embodiment in accordance with a preferred embodiment will use higher speed networking technology such as ATM. The hub 562 configuration is fully redundant.

The AlphaStation 200 workstation 564 is needed for operations support. The AlphaStation 200 provides console management via DEC's Polycenter Console Manager for each of the directlineMCI VFP 504 components. It also runs the DEC Polycenter Performance Analyzer software. The performance analyzer software collects and analyzes data from the 8200s for tuning purposes.

3. Detail

Figure 47:
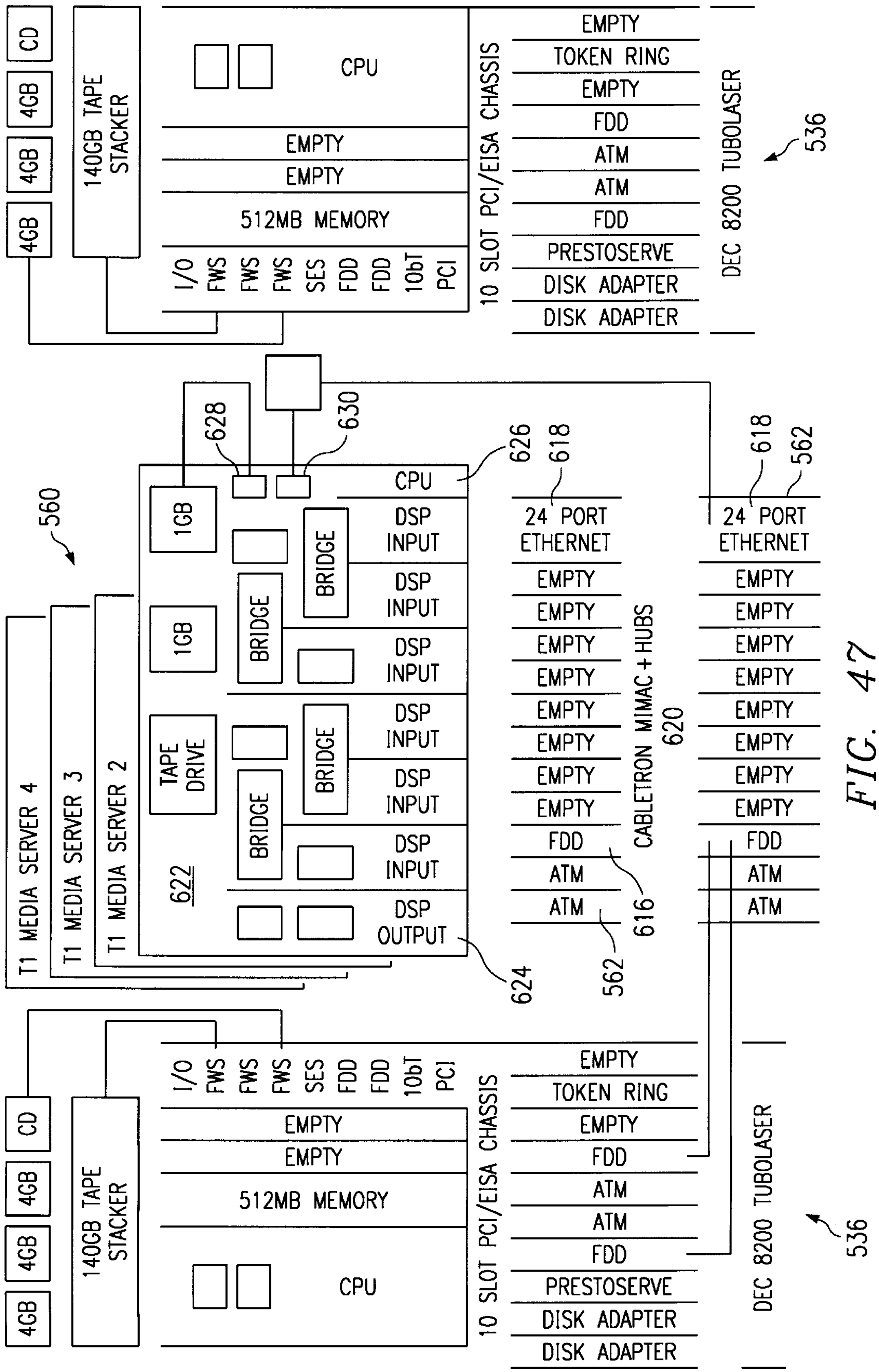

FIG. 47 shows the production installation of the VFP 504 at the production site.

Notes about FIG. 47 and its relationship to FIG. 46:

The DEC Alpha 8200s 536 are in a failover configuration. The center rack is a shared disk array.

The TI MultiServe 4000 560 is actually compound of four separate media servers in a single cabinet. The diagrams after this one show each "quadrant" (one of the four media servers in a MultiServe 4000) as a separate entity. Four each of the 16 FGD T1s are connected to each quadrant.

The AlphaStation 200 workstation 564 and the terminal servers are used to provide console and system management. The Cabletron hubs 562 provide the network between the media servers 560 and the executive servers 536.

The Bay Networks hubs 566 provide the network between the VFP 504 and the network routers 569.

a) Internal Hardware Network

Figure 48B:
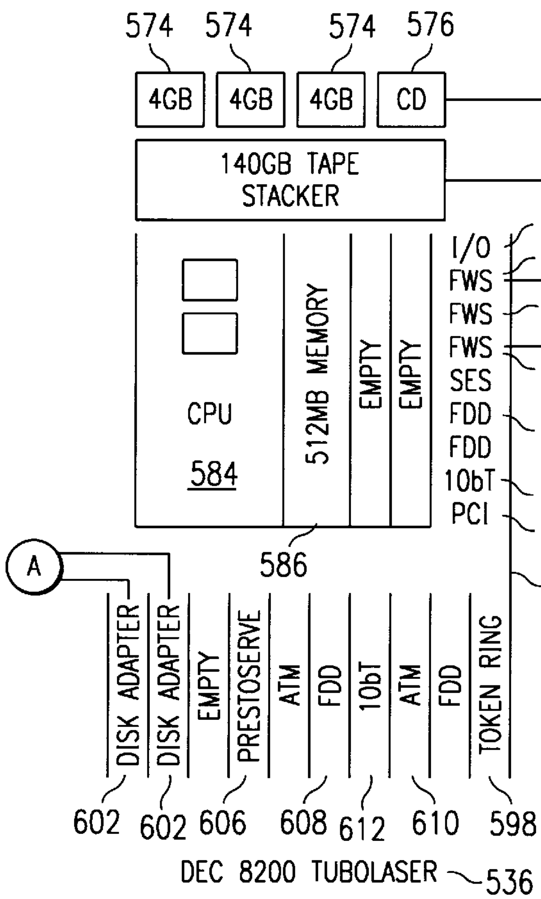
Figure 48A:
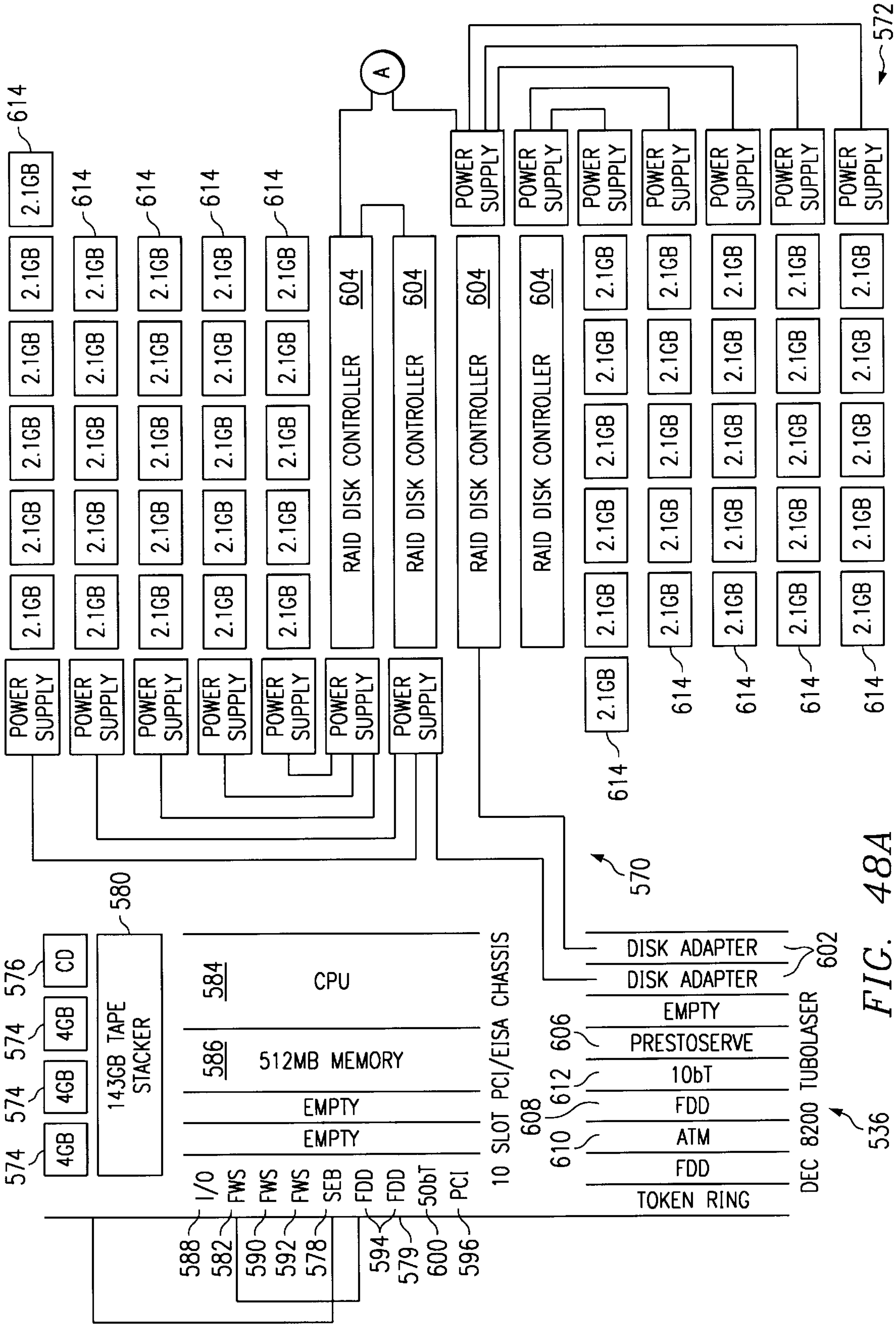

FIG. 48 shows the VFP internal hardware/network architecture: General notes about FIGS. 47–49:

The left DEC 8200 machine 536 is shown with all of its ATM and FDDI connections 570 drawn in. The right DEC 8200 is shown with its Ethernet connections 572 drawn in. In actual deployment, both machines have all of the ATM, FDDI, token ring, and Ethernet connections 570 and 572 shown. The Cabletron hubs 562 show fewer connections into ports than actually occur because each 8200 536 is drawn with only half its network connectivity. Also, only one of the four media servers 560 is shown connected to the Ethernet ports. In fact, there is a transceiver and two Ethernet connects for each media server.

Figure 49A:
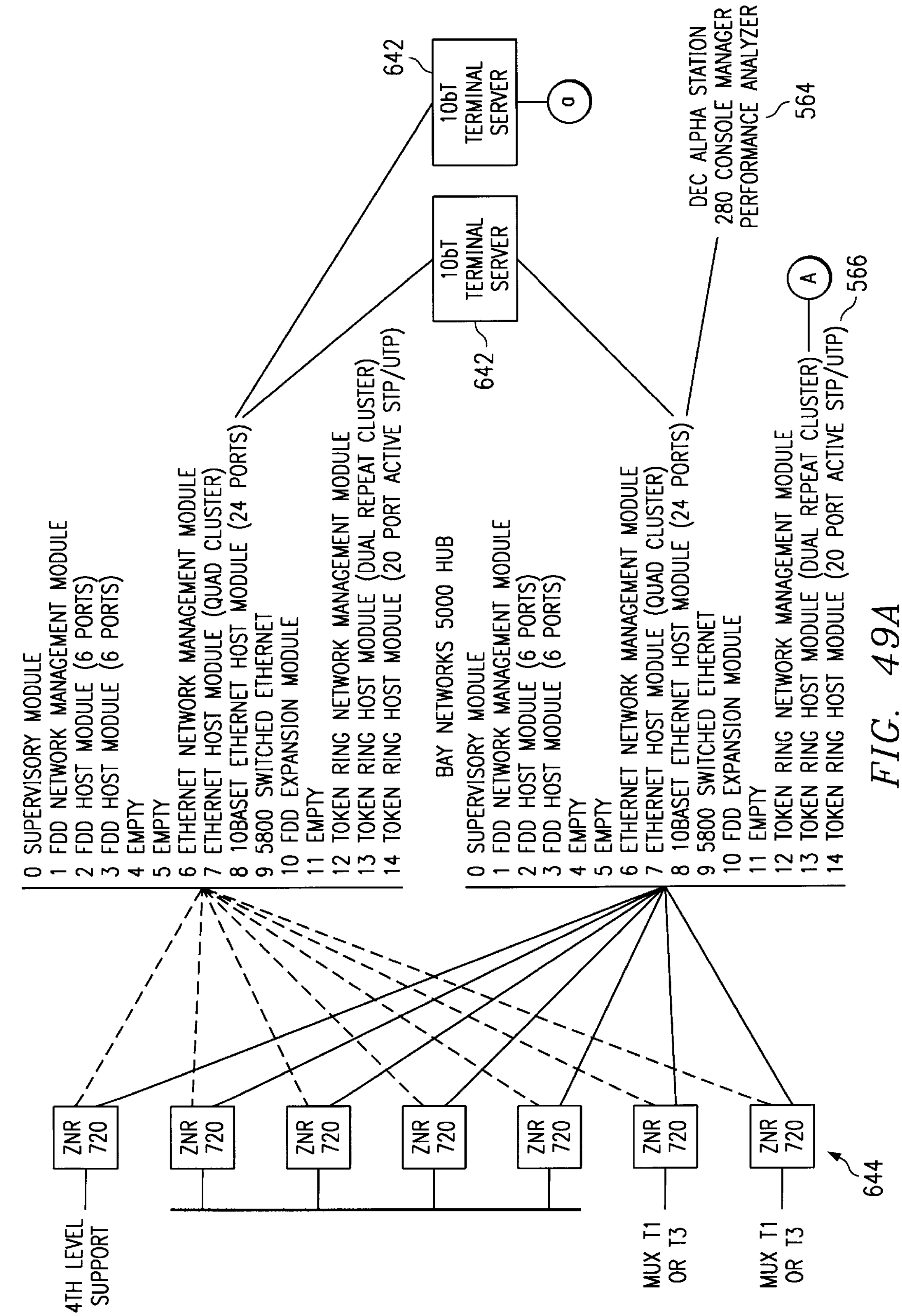
Figure 49B:
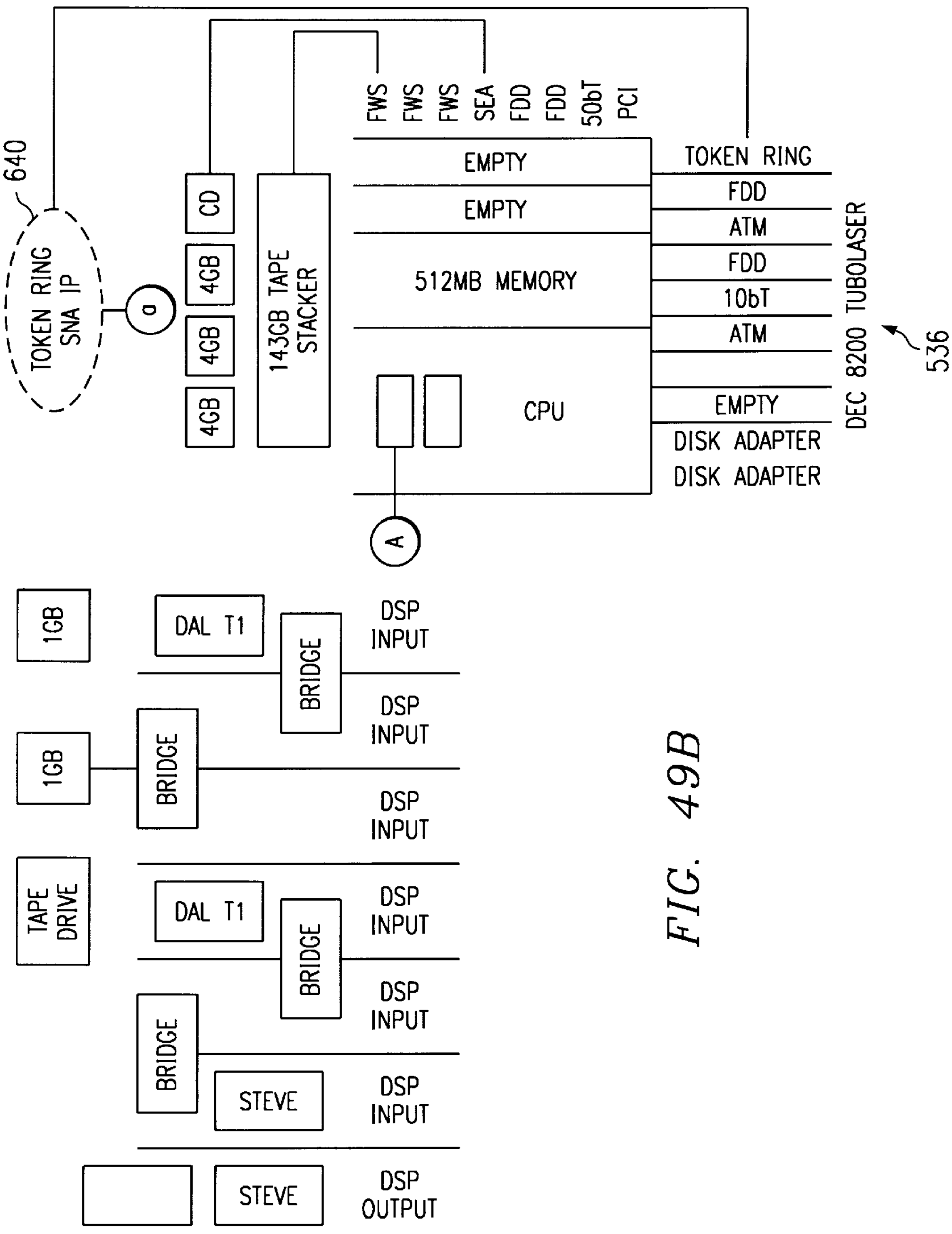

The Bay Hubs 566 are not shown in FIG. 48. They are shown in FIG. 49, directlineMCI VFP External LAN Network Connectivity.

Starting from the top of FIG. 48 of the DEC 8200s 536:

The top unit contains three 4 GB drives 574 for operating system, swap, etc. The system CD drive 576 is also located here. This unit is controlled by the Single-Ended Small Computer Systems Interface (SCSI) ("SES" on the diagram) interface 578 from the main system 579.

The tape stacker 580 is a 140 GB tape unit with a single drive and a 10 tape stack. This unit is controlled from a Fast-Wide SCSI ("FWS" on the diagram) interface 582 from the main system 579.

The main system unit 579 utilizes three of five available slots. Slot 1 has the main CPU card 584. This card has one 300 MHz CPU and can be upgraded to two CPUs. Slot 2 has a 512 MB memory card 586. This card can be upgraded to 2 GB, or another memory card can be added. System maximum memory is 4 GB.

Slots 3 and 4 are empty, but may be used for additional CPU, memory, or I/O boards. Slot 5 has the main I/O card 588. This card has eight I/O interfaces:

One Fast-Wide SCSI interface 582 controls the tape stacker.

Two Fast-Wide SCSI interfaces 590–592 are unused.

The Single-Ended SCSI interface 578 controls the local system drives.

The FDDI interface 594 connects to one of the hubs.

The PCI slot 596 connects to a PCI expansion chassis 598.

One port is a 10baseT Ethernet card 600 that is connected to the corresponding card in the other 8200 536 via a private thinnet Ethernet. This network is required for one of the system failover heartbeats.

An embodiment utilizes nine of the ten available slots in the PCI/EISA expansion chassis 598. Slots 1 and 2 have disk adapters 602. Each disk adapter 602 is connected to a RAID disk controller 604 that has another disk controller 604 (on the other machine) chained, which in turn is connected to a disk controller 604 on that machine. Thus, each of the 8200 machines 536 has two disk controllers 604 attached off of each disk adapter 602. This is the primary clustering mechanism, since either machine can control all of the disks located in FIG. 48 beneath the PCI chassis 598. Slot 3 has a Prestoserve board 606. This is a Network File Server (NFS) accelerator.

Slot 4 has an FDDI board 608. This FDDI connection is made to the hub other than the FDDI connection made from main slot 5 above.

Slots 5 and 6 have ATM boards 610. It has a 10baseT Ethernet card 612 that is connected to the corresponding card in the other 8200 536 via a private thinnet Ethernet. This network is required for one of the system failover heartbeats. Slot 10 is empty.

The two units beneath the PCI chassis are Redundant Array of Inexpensive Disks (RAID) disk controllers 604. Each disk controller 604 is on a SCSI chain with two disk controllers 604 in the middle and a disk adapter 602 (one per machine) on each end. Thus there are two chains, each with two disk controllers 604 and two disk adapters 602. This is the connectivity to the main system 579. Each disk controller 604 supports six single-ended SCSI chains. In this configuration, each of the two chains has one disk controller with two SES connections, and one disk controller with three connections. Each chain has five sets 614 (or "drawers") of disk drives as pictured in the center rack. Note the redundant power supply in the drawer with the RAID Disk Controller.

The Cabletron MMAC+ hubs 562 (FIG. 47) are configured in a redundant pair. Both the 8200s 536 and the TI media servers 560 connect to both hubs 562, and the two hubs 562 are also connected to each other. Starting from the left side of the hubs: The FDDI concentrator card 616 provides an eight port FDDI ring. Each 8200 has one connection into the FDDI card 616 on each hub 562. The 24 port Ethernet card 618 provides connectivity to the TI media servers 560. Each media server 560 connects into one Ethernet port 618 on each hub. There are eight empty slots 620 in each hub which can be used for additional FDDI, ATM, or Ethernet expansion.

There are four TI media servers 560 mounted in a single rack called a "MultiServe 4000". Each media server in the rack is identical. Starting from the top unit, and then proceeding left to right for the main slots: The top unit 622 is a drawer that contains two 1 GB disk drives, and a removable/hot-insertable tape drive. There are two tape drives that can be shared among the four media servers. The left seven boards 624 labeled "DSP xxx" are TI MPB boards which can each support six incoming or fifteen outgoing channels, as labeled. These boards 624 are grouped together into three sets. There is a right group of three boards, a middle group of three boards, and a single board on the left. Each group has one T1. The T1 terminates at the interface marked "T1M". This is the master T1 interface. T1 channels may be shared by the set of boards delimited by the master/slave T1 boards, and chained together by the bridge modules. The rightmost board 626 is the main CPU/IO board. This board supports an SCSI interface 628 to the disk drawer, an Ethernet connection 630 to a special transceiver 632, and a serial port for the console (not shown).

The transceiver 632 to the right of the CPU/IO board connects to Ethernet ports on each of the two main hubs 562. The transceiver senses if one of its Ethernet connections has failed, and routes traffic to the other port.

b) External Hardware/Network Connections

FIG. 49 shows the hardware and network connections from the VFP 504 to the external network. Notes about FIG. 49: Each 8200 536 is connected onto the ISN token ring 640 through the Bay Hubs for DDS access over SNA and BDR access over IP. A pair of terminal servers 642 has a connection to the console port of each machine and hub. A DEC AlphaStation 200 564 runs console manager software to access the ports connected to the terminal servers 642. The DECNIS routers are all on an FDDI ring 568 (FIG. 46), connected between the Bay Hubs 566 and the two DEC 8200s 536.

The Bay Hubs 566 connect the VFP system 504 to the external network through the seven routers 644 shown.

E. Voice Distribution Detailed Architecture

1. Overview

Voice Distribution refers to the portion of the architecture in which the NAS 546 (FIG. 45) reads and writes the subscriber's ad hoc prompts across the LAN or WAN from/to the VFP 504 using the NFS protocol.

2. Rationale

In one embodiment, voice distribution is implemented by placing a server at each ISN site and replicating the data via complex batch processes from each server to every other server.

The "Large Object Management" (LOM) project defines a network-based approach. It was decided to use the directlineMCI VFP 504 as the network-based central object store for the NAS 546 to read and write customer prompts.

Figure 50:
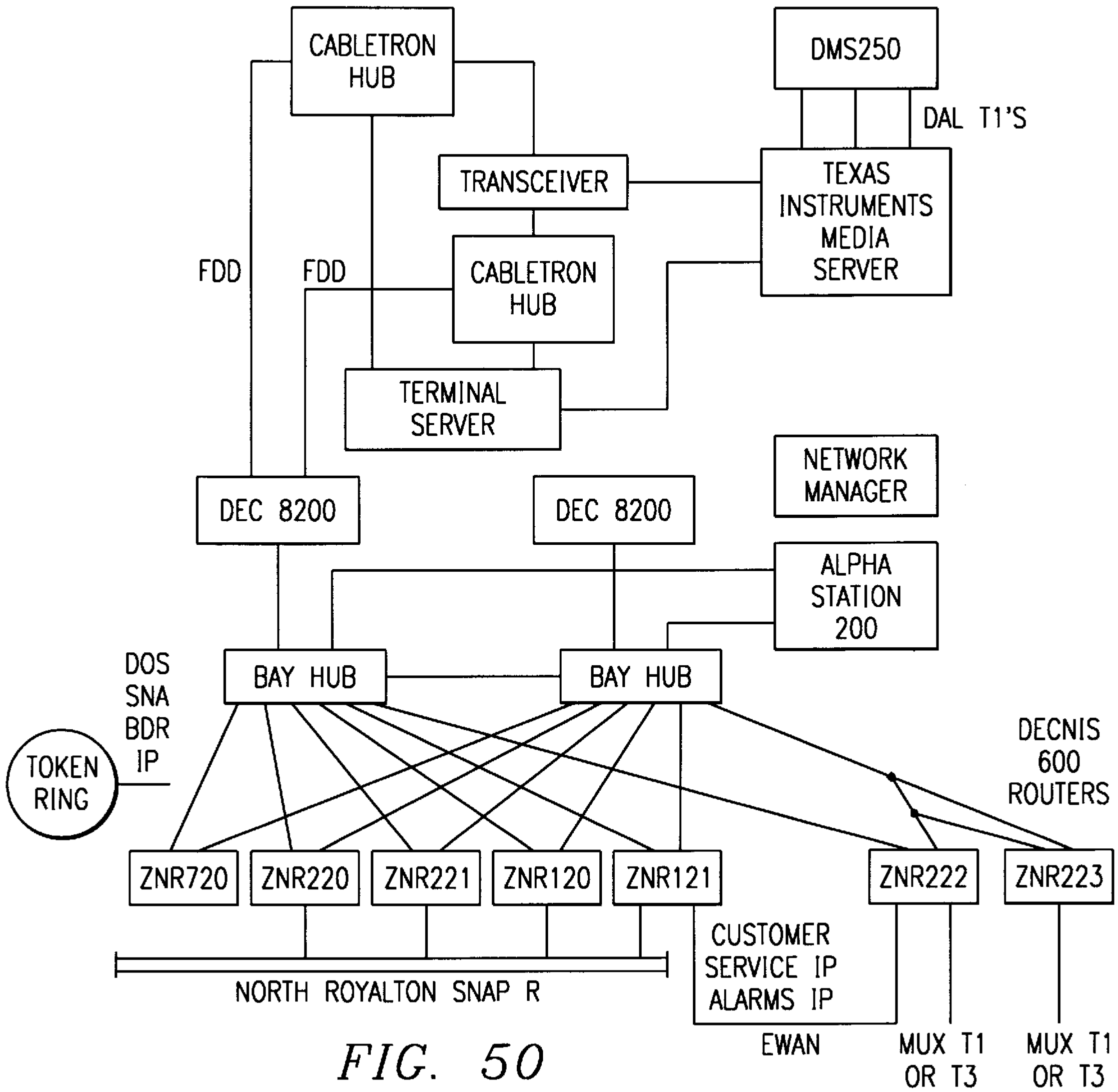
Figure 51:
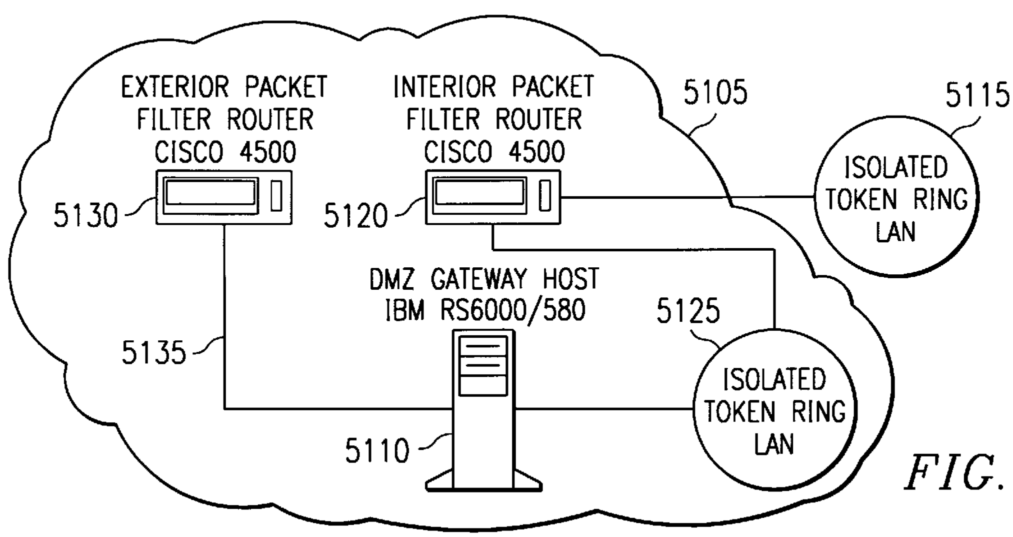
FIG. 51 illustrates a configuration of the Data Management Zone (DMZ) 5105 in accordance with a preferred embodiment.
Figure 52A:
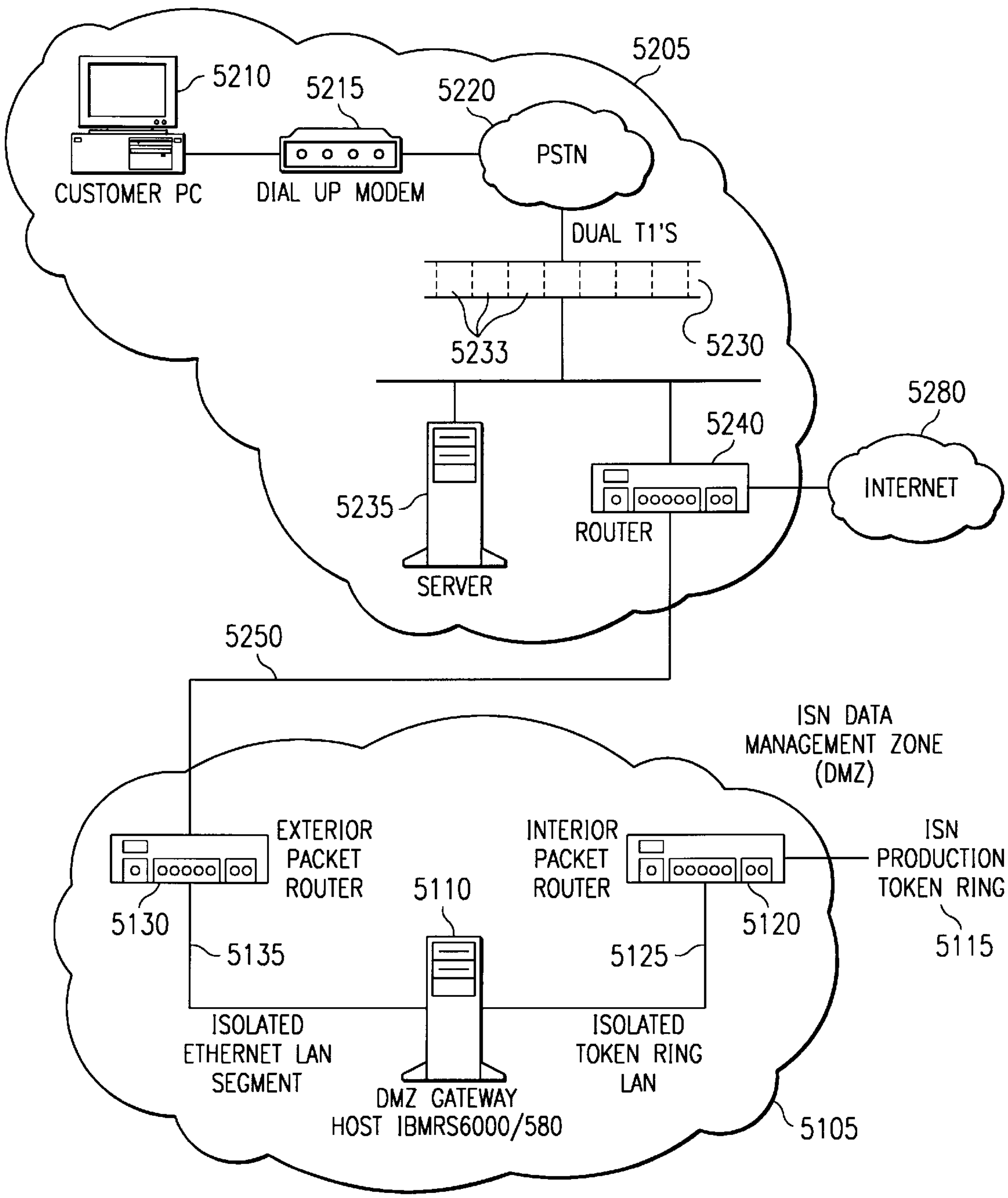
FIGS. 52A–52C illustrate network block diagrams in connection with a dial-in environment in accordance with a preferred embodiment.

FIG. 50 shows a network architecture to support Voice distribution traffic in accordance with a preferred embodiment. FIG. 52A depicts a configuration of the Data Management Zone 5105 of the present invention. The Data Management Zone (DMZ) is a firewall between Internet dial-in platforms (although not the actual Internet itself) and the ISN production networks. Its purpose is to provide dial-in access to data for ISN customers while maintaining security for the ISN network as well as privacy and integrity of customer data in a production ISN network.

The DMZ permits a customer to receive periodically generated data, such as DDS data down feeds from a mainframe database. Such data is periodically extracted from the database and placed in a user account directory on a secure File Transfer Protocol (FTP) host for subsequent retrieval by a customer.

Data access for customers is through dedicated ports at dial-in gateways, which are owned, operated and maintained by the Internet provider. Dial-in user authentication is through the use one time passwords via secure identification cards, as is more fully described below. The cards are distributed and administered by Internet provider personnel.

The DMZ provides a screened subnet firewall that uses a packet filtering router to screen traffic from the outside unsecured network and the internal private network. Only selected packets are authorized through the router, and other packets are blocked. The use of multiple firewalling techniques ensures that no single point of failure or error in DMZ configuration puts the ISN production network at risk.

The DMZ 5105 is intended to conform to several security standards. First, individuals who are not authorized employees cannot be allowed access to internal production networks. Therefore IP connectivity through the gateway is not allowed. Second, access and use of DMZ services is restricted to authenticated and authorized users for specific purposes. Therefore all other utilities and services normally found on a general purpose machine are disabled. Third, use of DMZ services and facilities must be carefully monitored to detect problems encountered by authorized users and to detect potentially fraudulent activity.

The centerpiece of the DMZ is the DMZ Bastion host 5110. Bastion host 5110 runs an FTP server daemon that implements a modified FTP protocol, as will be described in further detail below. Bastion host 5110 is a highly secured machine used as the interface to the outside world. Bastion host 5110 allows only restricted access from the outside world. It typically acts as an application-level gateway to interior hosts in ISN 5115, to which it provides access via proxy services. Generally, critical information is not placed on Bastion host 5110, so that, even if the host is compromised, no access is made to critical data without additional integrity compromise at the ISN 5115.

Bastion host 5110 is connected to both interior and exterior users as shown in FIG. 52A. Bastion host 5115 may be a UNIX-based computer such as an IBM RS/6000 model 580 running the AIX operating system.

An interior user is a user connected to the ISN production token ring 5115. Token ring 5115 is connected to an interior packet filter 5120 such as a Cisco model 4500 modular router. Packet filter 5120 is connected to token ring LAN 5125, which in turn is connected to bastion host 5110. Token ring LAN 5125 is a dedicated token ring that is isolated from all components other than bastion host 5110 and interior packet filter 5120, thereby preventing any access to bastion host 5110 through token ring LAN 5125 except as allowed by packet filter 5120.

Exterior users connect through exterior packet filter 5130, such as a Cisco model 4500 modular router. Packet filter 5130 is connected to bastion host 5110 through an isolated Ethernet LAN segment 5135. Ethernet LAN segment 5135 is a dedicated segment that is isolated from all components other than bastion host 5110 and exterior packet filter 5130. Because of the configuration, no user can access bastion host 5110 except through interior packet filter 5120 or exterior packet filter 5130.

FIG. 52A depicts the DMZ 5105 in connection with dial-in environment 5205. In dial-in environment 5205, the customer PC 5210 is connected to public switched telephone network (PSTN) 5220 through the use of modem 5215. Modem bank 5230 assigns a modem to answer incoming calls from PSTN 5220. Modem bank 5230 comprises a set of high-speed modems 5233 such as U.S. Robotics V.34 Kbps modems. Incoming calls are authenticated by authentication server 5235. Authentication server 5235 may be implemented using a server such as the Radius/Keystone server running on a Sun Sparcstation model 20.

The Bastion host 5110 resides within a firewall, but is logically outside both the ISN 5115 and the gateway site 5205.

Following authentication, the selected modem 5233 is connected to incoming call router 5240 using Point-to-Point Protocol (PPP). PPP is a protocol that provides a standard method of transporting multi-protocol datagrams over point-to-point links. PPP is designed for simple links that transport packets between two peers. These links provide full-duplex simultaneous bi-directional operation, and are assumed to deliver packets in order. PPP provides a common solution for easy connection of a wide variety of hosts, bridges and routers). PPP is fully described in *RFC* 1661*: The Point-to-Point Protocol* (*PPP*), W. Simpson, Ed. (1994) ("RFC 1661"), the disclosure of which is hereby incorporated by reference.

Incoming call router 5240 selectively routes incoming requests to the exterior packet filter 5130 of DMZ 5105 over a communications link such as T1 line 5250, which is connected to exterior packet filter 5130 via a channel service unit (not shown). Incoming call router 5240 may be implemented using, for example, a Cisco 7000 series multiprotocol router. Incoming call router 5240 is optionally connected to Internet 5280. However, router 5240 is configured to block traffic from Internet 5280 to Exterior packet filter 5130, and to block traffic from exterior packet filter 5130 to Internet 5280, thereby disallowing access to DMZ 5105 from Internet 5280.

Bastion host 5110 runs a File Transfer Protocol (FTP) server daemon that implements a modified FTP protocol based on release 2.2 of the wu-ftpd FTP daemon, from Washington University. Except as noted herein, the FTP protocol is compliant with *RFC* 765*: File Transfer Protocol*, by J. Postel (June 1980) ("RFC 765"), the disclosure of which is hereby incorporated by reference. RFC 765 describes a known protocol for transmission of files using a TCP/IP-based telnet connection, in which the server responds to user-initiated commands to send or receive files, or to provide status information. The DMZ FTP implementation excludes the send command (which is used to send a file from a remote user to an FTP server, and any other FTP command that transfers files to the FTP host. A restricted subset of commands including the get (or recv), help, Is, and quit commands are supported.

The get command is used to transfer a file from host server 5110 to remote user 5210. The recv command is a synonym for get. The help command provides terse online documentation for the commands supported by host server 5110. The Is command provides a list of the files in the current directory of the server, or of a directory specified by the user. The quit command terminates an FTP session. Optionally, the cd command, which specifies a named directory as the current directory, and the pwd command, to display the name of the current directory, may be implemented.

By disallowing send and other commands that transfer files to the server, a potential intruder is prevented from transferring a "Trojan horse" type of computer program that may be used to compromise system security. As an additional benefit, the unidirectional data flow prevents a user from inadvertently deleting or overwriting one of his files resident on the Bastion server.

When the FTP daemon initiates a user session, it uses the UNIX chroot(2) service to specify the root of the user's directory tree as the apparent root of the filesystem that the user sees. This restricts the user from visibility to UNIX system directories such as /etc and /bin, and from visibility to other users' directories, while permitting the desired visibility and access to the files within the user's own directory tree. To further assure a secured environment, the FTP daemon executes at the user-id ("uid") of the user level, rather than as root, and allows access only to authorized users communicating from a set of predetermined IP addresses known to be authorized. In particular, the standard non-authenticated accounts of anonymous and guest are disabled.

In order to further secure Bastion server 5110, a number of daemons that are ordinarily started by the UNIX Internet server process inetd are disabled. The disables daemons are those that are either not needed for Bastion server operation, or that are known to have security exposures. These daemons include rcp, rlogin, rlogind, rsh, rshd, tftp, and tftpd. These daemons are disabled by removing or commenting out their entries in the AIX /etc/inetd.conf file. The /etc/inetd.conf file provides a list of servers that are invoked by inetd when it receives an Internet request over a socket. By removing or commenting out the corresponding entry, the daemon is prevented from executing in response to a received request.

As a further assurance of security a number of daemons and utilities are disallowed from execution by changing their associated file permissions to mark them as non-executable (e.g., having a file mode of 000). This is performed by a DMZ Utility Disabler (DUD) routine that executes at boot time. The DUD routine marks as non-executable the above-identified files (rcp, rlogin, rlogind, rsh, rshd, tftp, and tftpd), as well as a number of other daemons and utilities not ordinarily invoked by inetd. This set of daemons and utilities includes sendmail, gated, routed, fingerd, rexecd, uucpd, bootpd, and talkd. In addition, DUD disables the telnet and ftp clients to prevent an intruder from executing those clients to access an interior host in the event of a break-in. The telnet and ftp clients may be temporarily marked as executable during system maintenance activities.

Bastion host 5110 has IP forwarding disabled. This ensures that IP traffic cannot cross the DMZ isolated subnet 5115 by using Bastion host 5110 as a router.

The limited level of ftp service provided by Bastion server 5110 provides a secure ftp session but makes it difficult to perform typical system maintenance. In order to perform system maintenance, maintenance personnel must connect to Bastion host 5110 from an interior host within ISN 5115 using a telnet client. The FTP client program in Bastion is then changed from non-executable (e.g., 000) to executable (e.g., 400), using the AIX chmod command. Maintenance personnel may then execute the ftp client program to connect to a desired host on ISN 5115. During this procedure, control of transfers is therefore from within Bastion host 5110 via the FTP client program executing within that host, rather than from a client outside of the host. At the end of a maintenance session the FTP session is terminated, and the chmod command is executed again to revert the ftp client program to a non-executable state (e.g., 000), after which the ISN-initiated telnet session may be terminated.

To provide logging, Bastion server 5110 implements a TCP daemon wrapper, such as the TCPwrappers suite from Wietse Venema. The TCP wrapper directs inetd to run a small wrapper program rather than the named daemon. The wrapper program logs the client host name or address and performs some additional checks, then executes the desired server program on behalf of inetd. After termination of the server program, the wrapper is removed from memory. The wrapper programs have no interaction with the client user or with the client process, and do not interact with the server application. This provides two major advantages. First, the wrappers are application-independent, so that the same program can protect many kinds of network services. Second, the lack of interaction means that the wrappers are invisible from outside.

The wrapper programs are active only when the initial contact between client and server is established. Therefore, there is no added overhead in the client-server session after the wrapper has performed its logging functions. The wrapper programs send their logging information to the syslog daemon, syslogd. The disposition of the wrapper logs is determined by the syslog configuration file, usually /etc/syslog.conf.

Dial-in access is provided through dial-in environment 5105. The use of authentication server 5235 provides for authentication of users to prevent access from users that are not authorized to access the DMZ. The authentication method implemented uses a one-time password scheme. All internal systems and network elements are protected with one-time password generator token cards, such as the SecurID secure identification token cards produced by Security Dynamics, using an internally developed authentication client/server mechanism called Keystone. Keystone clients are installed on each element that receive authentication requests from users. Those requests are then securely submitted to the Keystone Servers deployed throughout the network.

Each user is assigned a credit card sized secure identification card with a liquid crystal display on the front. The display displays a pseudo-randomly generated six-digit number that changes every 60 seconds. For an employee to gain access to a Keystone protected system, the user must enter their individually assigned PIN number followed by the number currently displayed on the secure identification card. Such authentication prevents unauthorized access that employ the use of programs that attempt to "sniff" or intercept passwords, or Trojan horse programs designed to capture passwords from users.

Authentication information collected by the Keystone clients is encrypted with an RSA and DES encryption key, and is dispatched to one of many Keystone Servers. The Keystone Servers evaluates the information to verify the user's PIN and the access code that should be displayed on that user's card at that moment. After the system verifies that both factors for that user where entered correctly, the authorized user is granted access to the system, or resource requested.

In order to assure security from the point of entry of the external network, no external gateway machine has a general access account and all provide controlled access. Each gateway machine ensures that all gateway services generate logging information, and each external gateway machine maintains an audit trail of connections to the gateway. All of the external gateway machines have all non-essential services disconnected.

The authentication server 5235 serves as a front end to all remote access dial up, and is programmed to disallow pass-through. All network authentication mechanisms provide for logging of unsuccessful access attempts. Preferably, the logs generated are reviewed daily by designated security personnel.

Figure 53:
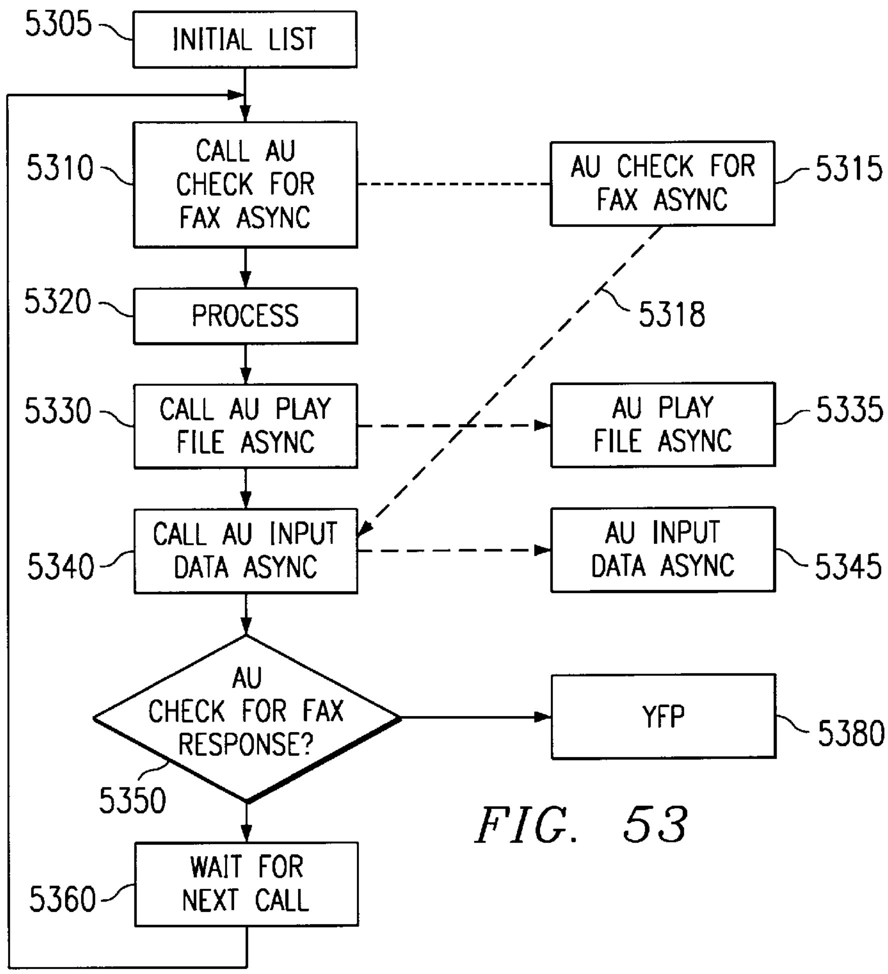
FIG. 53 depicts a flow diagram illustrating the fax tone detection in accordance with a preferred embodiment.

FIG. 53 depicts a flow diagram showing the fax tone detection methodology. In step 5305, the fax tone detection system allocates a null linked-list; that is, a linked list having no entries. In step 5310, the fax tone detection system starts the asynchronous routine auCheckForFaxAsync 5315. The auCheckForFaxAsync routine 5315 is an asynchronous program that executes concurrently with the main line program, and rather than synchronously returning control to the calling program. The auCheckForFax routine evaluates the tone of the incoming call to see whether the call is originated by a facsimile machine, and generates an auCheckForFax response 5318 if and when a facsimile tone is detected.

After starting auCheckForFaxAsync routine 5315, control proceeds to step 5320. In step 5320, the fax tone detection system adds an entry to the linked list allocated in step 5305. The added entry represents a unique identifier associated with the message being processed. In step 5330, the fax tone detection system starts the asynchronous routine auPlayFileAsync 5335. The auPlayFileAsync routine 5335 is an asynchronous program that executes concurrently with the main line program, rather than synchronously returning control to the calling program. The auPlayFileAsync routine 5335 accesses previously stored digitally recorded sound files and plays them to the originating caller. The sound files played may be used, for example, to instruct the originating caller on sequences of key presses that may be used to perform particular functions, e.g., to record a message, to retrieve a list of previously recorded messages, etc.

In step 5340, the fax tone detection system starts the asynchronous routine auInputDataAsync 5340. The auInputDataAsync routine 5340 is an asynchronous program that executes concurrently with the main line program, rather than synchronously returning control to the calling program. The auInputDataAsync routine 5340 monitors the originating call to detect key presses by the user, in order to invoke the routines to execute the tasks associated with a particular key press sequence.

As has been noted, the auCheckForFaxAsync routine 5315 executes concurrently with the main program, and generates a auCheckForFax response 5318 if and when a facsimile tone is detected. In step 5350, the fax tone detection system checks to see whether an auCheckForFax response 5318 response has been received. If a response has been received, this indicates that the originating call is a facsimile transmission, and the fax tone detection system extends the incoming call to Voice/Fax processor (VFP) 5380. If no auCheckForFax response 5318 is received within a predetermined time (e.g., 7 seconds), the fax tone detection system concludes that the originator of the call is not a facsimile device, and terminates the auCheckForFaxAsync routine 5315. In an implementation, it may be preferable to implement this check through an asynchronous interruption-handling process. In such an implementation, an execution-time routine may be set up to gain control when an auCheckForFax response 5318 event occurs. This may be implemented using, for example, the C++ catch construct to define an exception handler to handle an auCheckForFax response 5318 event.

Following the decision in step 5350, the fax tone detection system in step 5360 waits for the next incoming call.

Figure 54A:
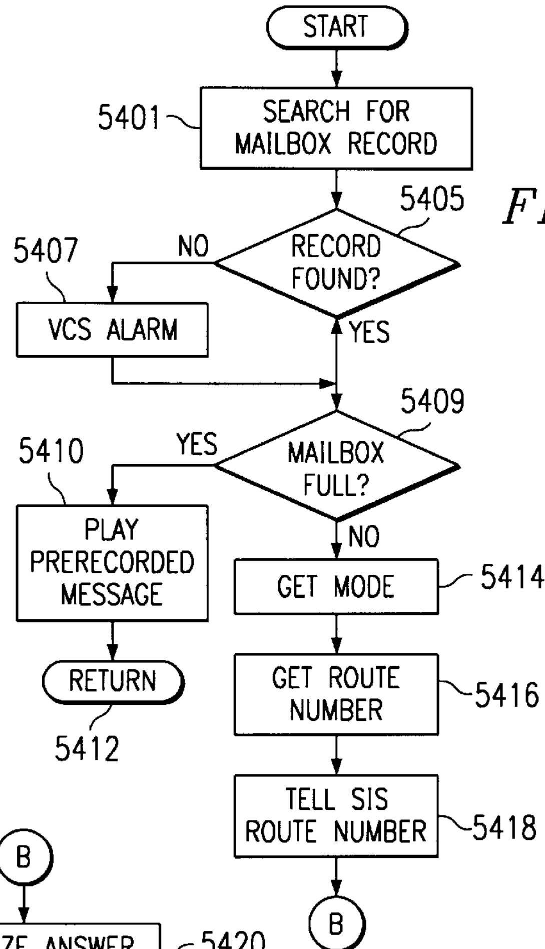
FIGS. 54A through 54E depict a flow diagram illustrating the VFP Completion process for fax and voice mailboxes in accordance with a preferred embodiment.

FIGS. 54A through 54E depict a flow diagram showing the VFP Completion process for fax and voice mailboxes. As depicted in FIG. 54A, the VFP completion routine in step 5401 searches the database for a record corresponding to the addressed mailbox. In step 5405, the VFP completion routine checks to see if a mailbox record was successfully retrieved. If no mailbox record was found, in step 5407, the VFP completion routine generates a VCS alarm indicating that the desired mailbox record was not found. Because the mailbox record was not found, the VFP completion processor will be unable to test the attributes of the mailbox address. However, regardless of whether the mailbox record is found, control proceeds to step 5409. In step 5409, the VFP completion processor tests the contents of the mailbox record, if any, to determine whether the addressed mailbox is full. If the addressed mailbox is full, in step 5410, the VFP completion routine plays an error message indicating that the addressed mailbox is at capacity and is unable to store additional messages, and exits in step 5412.

In step 5414, the VFP completion processor obtains the mode of the VFP call. The mode is derived from the dial string provided by the originating caller, and is stored in the enCurrentNum field of the pstCall1State structure. The dial string has the following format:

```
    {
        char number[10];        /* 10-digit 8xx number dialed by user
*/
        char asterisk;          /* constant '*'*/
        char mode;          /* 1-byte mode */
        char octothorp;     /* constant '#'*/
        }
```

The mode has one of the following values:

| | |
|---|---|
| 1 | guest voicemail |
| 2 | guest fax with voice annotation |
| 3 | guest fax without voice annotation |
| 4 | user voice/fax retrieval |
| 5 | user list maintenance |
| 6 | user recording of mailbox |

In step 5416, the VFP completion processor retrieves the route number associated with the addressed mailbox from the database. In step 5418, the route number is passed to the SIS layer.

Figure 54B:
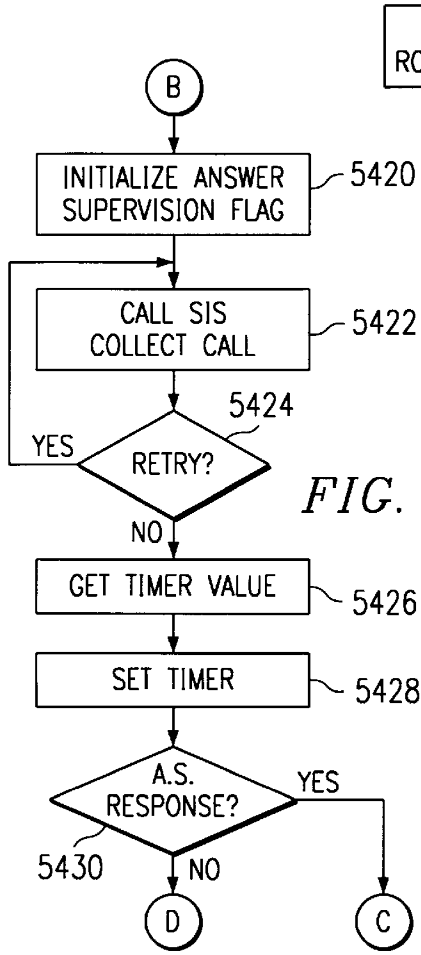

As depicted in FIG. 54B, execution continues with step 5420. In step 5420, the VFP completion processor initialized an answer supervision flag that is used to determine whether the VFP is accepting transfer of the call. In step 5422, the VFP completion processor calls the SisCollectCall routine to process the call. If the call is unsuccessful, Step 5424 causes the SisCollectCall invocation of step 5422 to be repeated up to a predetermined number of retries.

In step 5426, the VFP completion processor obtains a predetermined timer expiration value from the otto.cfg file. The timer expiration value is set to the amount of time in which, if an answer is not received, the VFP completion processor may conclude that the VFP is not currently reachable.

In step 5428, the VFP completion processor sets the timer according to the value from step 5426. In step 5430, the VFP completion processor check to see whether answer supervision occurred prior to the expiration of the timer set in step 5424. If so, control proceeds to step 5430 to transfer control to the VFP.

Figure 54C:
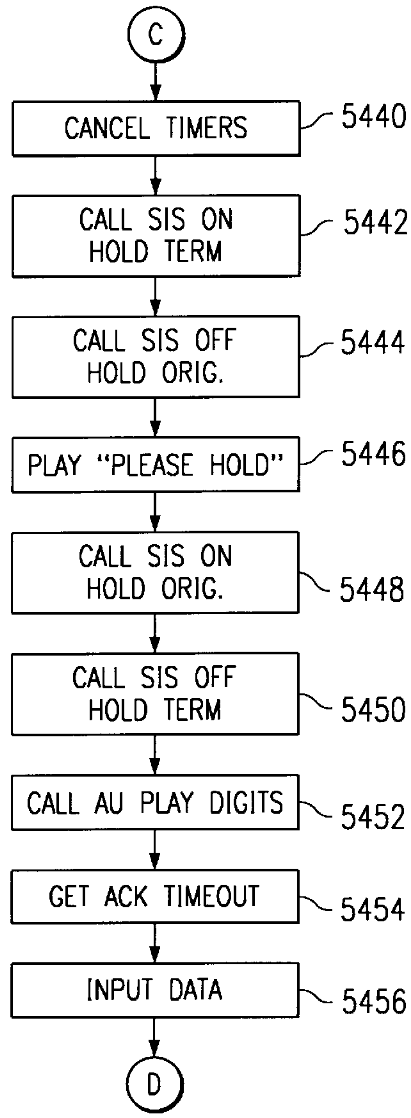

FIG. 54C depicts the operation of transferring control to the VFP in response to an affirmative decision in step 5430. In step 5440, any pending timers set in step 5428 are canceled. In step 5442, the VFP completion processor calls routine sisOnHoldTerm( ) to put the VFP on hold. In step 5444, the VFP completion processor calls routine sisOffHoldOrig( ) to take the originating call off hold.

In step 5446, the VFP completion processor plays a previously stored digitally recorded sound file, instructing the originating caller to wait during the process of transferring the call to the VFP. In step 5448, the VFP completion processor calls routine sisOffHoldOrig( ) to put the originating call back on hold. In step 5450, the VFP completion processor calls routine sisOffHoldTerm to take the VFP off hold. In step 5452, the VFP completion processor calls the auPlayDigits routine, passing to it as a parameter, a string comprising the addressed mailbox number, an asterisk ('*') to indicate a field separation, the mode, and an octothorp ('#') to indicate the end of the command string.

In step 5454, the VFP completion processor obtains a timeout value AckTimeout and an interdigit delay value from the otto.cfg file. The AckTimeout value is used to determine the amount of time before the VFP completion processor determines that no response is forthcoming from the VFP. The interdigit delay value is used to time the delays between audio signals sent that represent telephone keypad presses. In step 5456, the VFP completion processor calls the InputData routine to obtain a response from the VFP.

Figure 54D:
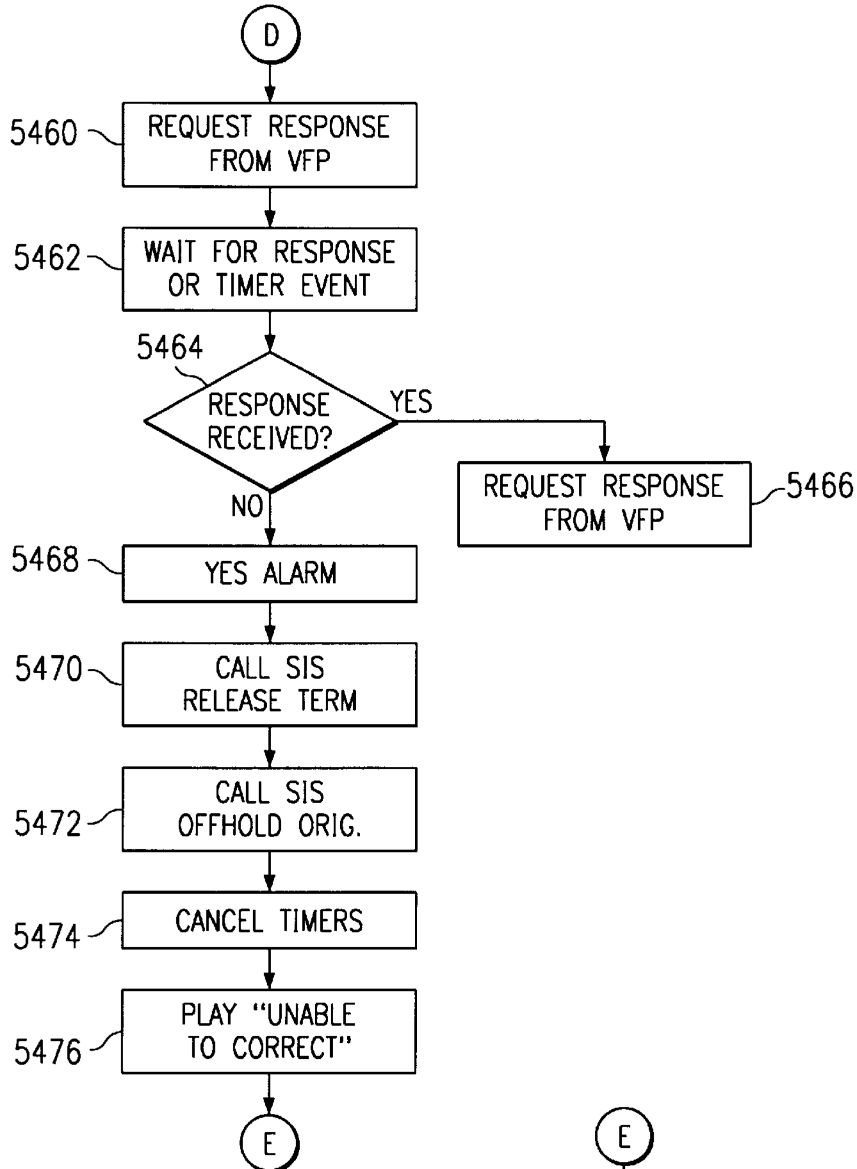

Following steps 5440 through 5456, or following a negative decision in step 5430, control proceeds to step 5460, as shown in FIG. 54D. In step 5460, the VFP completion processor requests a response from the VFP. In step 5462, the VFP completion processor waits for the VFP response or for a timer set in step 5428 to expire. In step 5464, if the VFP has responded, the VFP completion processor proceeds to step 5446.

In step 5446, the VFP completion system checks the VFP response and writes the appropriate BDR term status record. The response indicates the acknowledgment from the TI platform. A response of '00' indicates success, and the VFP completion processor writes a BDR_STAT_NORMAL indicator. A response of '01' indicates the VFP did not receive the key to the addressed mailbox, and the VFP completion processor writes a BDR_STAT_DLINE_TI_NO_DIGITS indicator. A response of '02' indicates that the VFP timed out while collecting the key, and the VFP completion processor writes a BDR_STAT_DLINE_TI_FORMAT indicator. A response of '03' indicates that the addressed mailbox was not found, and the VFP completion processor writes a BDR_STAT_DLINE_TI_MAILBOX indicator. If no response was received, a BDR_STAT_DLINE_TI_NO_RSP indicator is written. Following the BDR indicator, control proceeds to step 5480 as shown in FIG. 54E.

If no answer was received from the VFP, the timer set in step 5428 has expired, and control passes to step 5468. In step 5468 the VFP completion processor gives a VCS alarm indicating that the VFP did not answer. In step 5470, the VFP completion processor calls routine sisReleaseTerm( ) to disconnect the call to the VFP. In step 5472, the VCS completion processor calls routine sisOffHoldOrig to take the originating call off of hold. In step 5474, the VFP completion processor calls tiCancelTimers to cancel all outstanding timers that have not yet been canceled. In step 5476, the VFP completion processor plays a previously stored digitally recorded sound file, reporting to the originating caller that the VFP completion processor was unable to connect to the VFP.

Figure 54E:
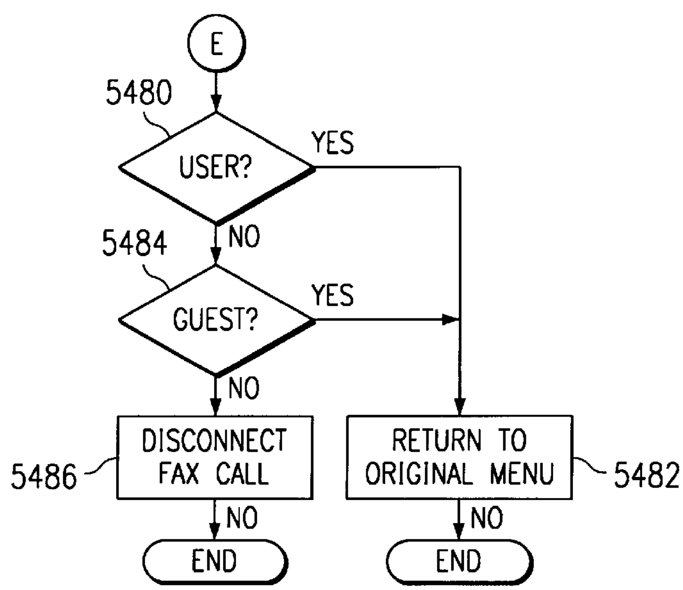

After either step 5476 or step 5466 (depending on the decision in step 5464), control proceeds to step 5480, as shown in FIG. 54E. In step 5480, the VFP completion processor checks to see if the originating caller is a subscribed user. If so, control passes to step 5482. In step 5484, the VFP completion processor checks to see if the originating caller is a guest user. If so, control passes to step 5482. Step 5482 then returns the originating caller to the menu from which the caller initiated the VFP request. If the originating caller is neither a subscribed user nor a guest, control passes to step 5486. In step 5486, the originating caller is assumed to be a fax call, and the call is disconnected.

Figure 55A:
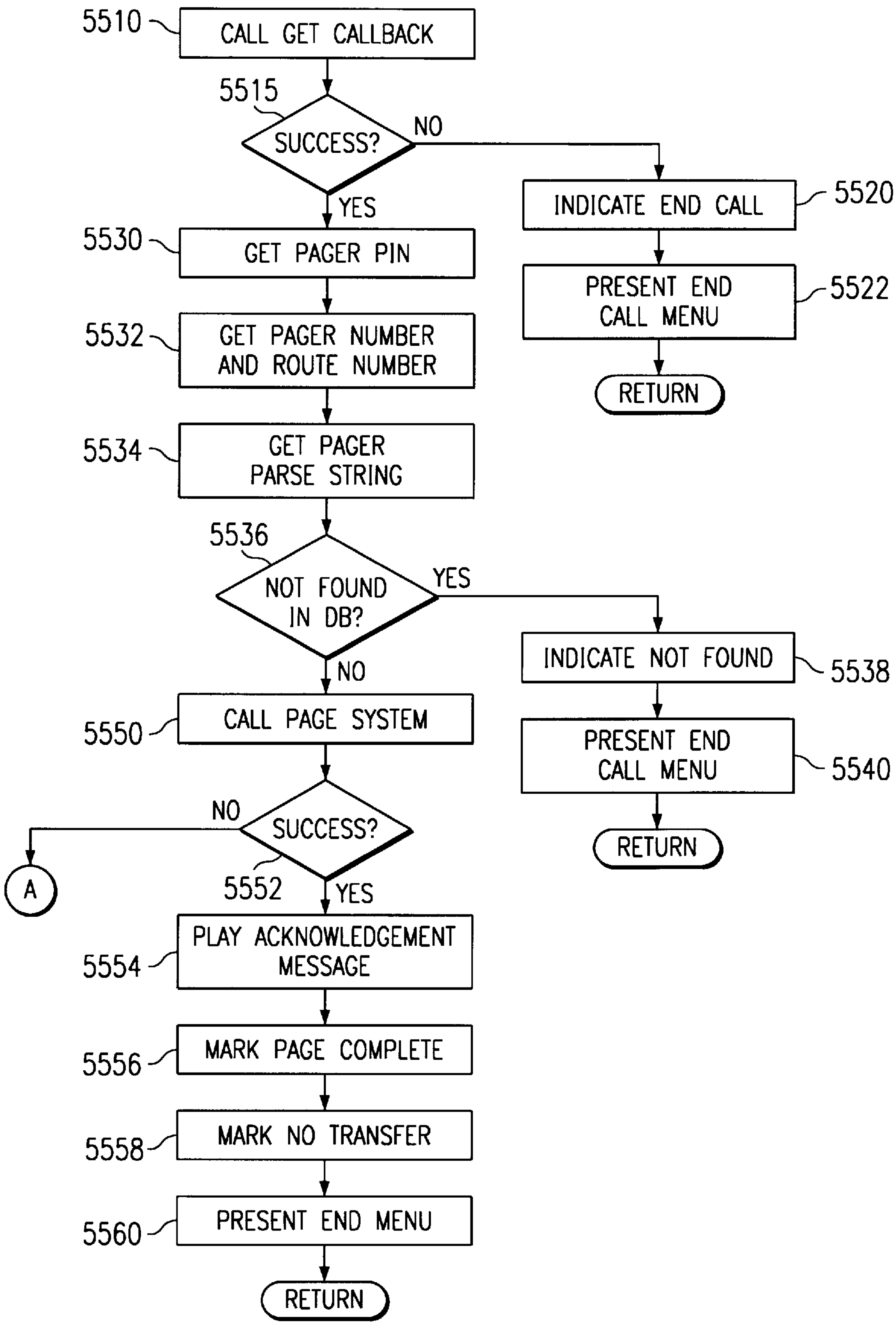
FIGS. 55A and 55B illustrate the operation of the Pager Termination processor in accordance with a preferred embodiment.
Figure 55B:
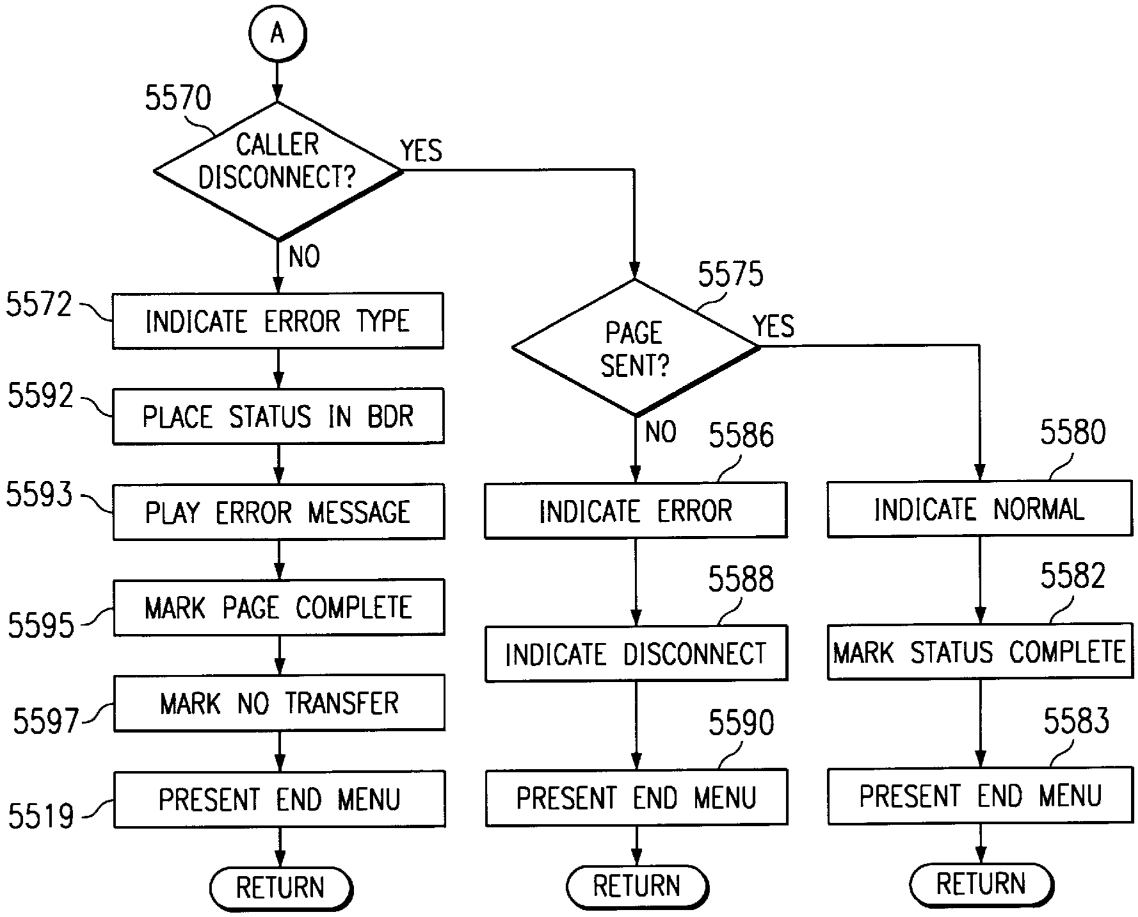

FIGS. 55A and 55B depict the operation of the Pager Termination processor. In step 5510, the pager termination processor calls the GetCallback routine to obtain the telephone number that will be used to identify the caller, and that will be displayed on the paging device to identify the number to be called back by the pager subscriber. The GetCallback routine is describe in detail below with respect to FIG. 56.

In step 5515, the pager termination processor checks to see if a telephone number was returned by the GetCallback. If no number was returned, in step 5520 the pager termination processor indicates that the call should be ended, and in step 5522 provides the caller with a menu to select another service.

If a number was returned, the addressed pagers PIN is obtained from the database in step 5530. The pager termination processor constructs a pager dial string comprising the pager PIN retrieved in step 5530 and the callback number obtained in step 5510. In step 5532, the pager termination processor obtains the pager's type and routing information is obtained from the database. In step 5534, the pager termination processor checks the configuration file to obtain a pager parse string that defines the parameters for pagers of the type addressed. In step 5536, the pager termination processor checks to see whether the requested pager parse string was successfully retrieved. If not, in step 5538 the pager termination processor indicates that the page could not be performed by setting the BDR term status to BDR_STAT_PAGER_NOT_FOUND, and in step 5540 provides the caller with a menu to select another service.

If the pager parse string was successfully retrieved, the pager termination processor proceeds to step 5550 as shown in FIG. 55B. In step 5550, the pager termination processor calls the pager subsystem, passing to it the route number, the dial string, and the pager parse string. In step 5552, the pager termination processor checks the return code from the pager subsystem. If the page was successfully completed, the pager termination processor, in step 5554 plays a digitally prerecorded message to the caller, informing the caller that the page has been successfully sent. In step 5556 the enEndCallStatus field is updated to mark the pager call complete. In step 5558, the transfer status is marked as blank, indicating that there is no need to transfer the caller, and in step 5560, the pager termination processor presents the user with a menu permitting it to select another service or to end the call.

If the page was not successfully completed, the pager termination processor checks in step 5570 whether the caller had disconnected during the page attempt. If the caller had disconnected, the pager termination processor in step 5575 checks to see whether the page had been sent prior to the disconnection. If the page was sent despite the disconnect, the pager termination processor in step 5580 indicates a normal ending to the page request in step 5580 and sets the status as complete in step 5582. In step 5584, the pager termination processor presents the user with a menu permitting it to select another service or to end the call.

If the page was not sent the pager termination processor indicates an abnormal ending to the page request in step 5586 and indicates a caller disconnect in step 5588. In step 5590, the pager termination processor presents the user with a menu permitting it to select another service or to end the call.

If the caller has not disconnected, the pager termination processor sets a code indicating the reason for the failure in step 5572. The failure types include

- BDR_STAT_PAGER_ROUTE_NUM (for an invalid route number);
- BDR_STAT_PAGER_CRIT_ERROR (for a failure in the originating call);
- BDR_STAT_PAGER_TIMEOUT (for the failure of the pager to acknowledge the call within a predetermined timeout time interval);
- BDR_STAT_PAGER_DIGITS_HOLD (for the failure of the pager subsystem to play the digits corresponding to the pager address);
- BDR_STAT_PAGER_DISC (for a premature disconnect of the paging subsystem); and BDR_STAT_PAGER_NOT_FOUND (for an invalid parse string).

In step 5592 the pager termination processor posts the error code selected in step 5572 to the BDR. In step 5582, the pager termination processor plays a prerecorded digital sound file indicating that the page could not be sent. In step 5595 the enEndCallStatus field is updated to mark the pager call complete. In step 5597, the transfer status is marked as blank, indicating that there is no need to transfer the caller, and in step 5599, the pager termination processor presents the user with a menu permitting it to select another service or to end the call.

Figure 56:
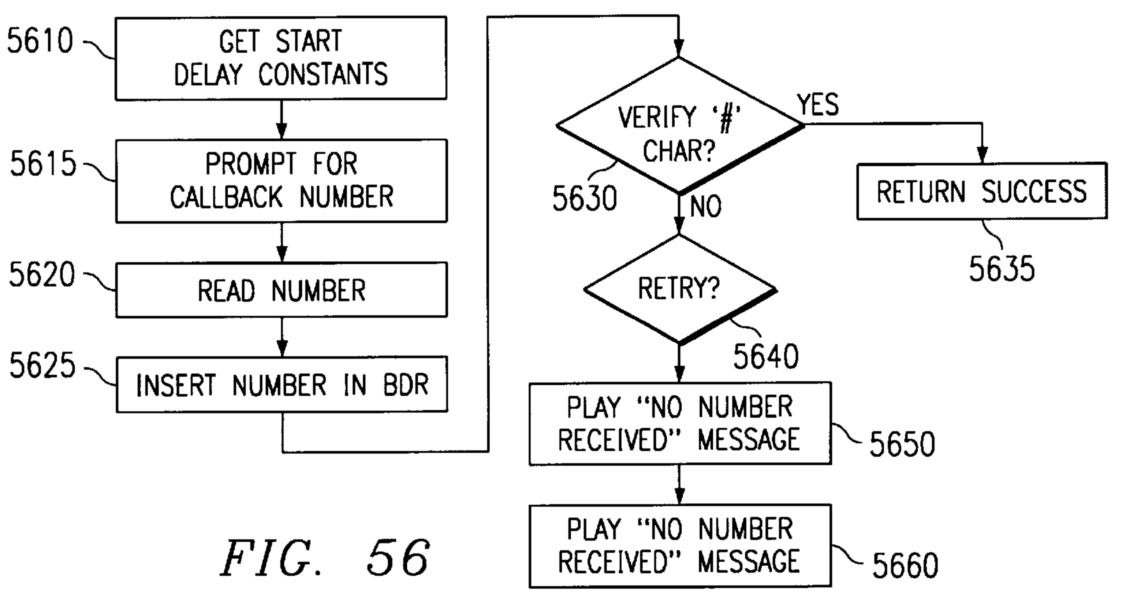
FIG. 56 depicts the GetCallback routine called from the pager termination in accordance with a preferred embodiment.

FIG. 56 depicts the GetCallback routine called from the pager termination processor in step 5510. In step 5610 the GetCallback routine obtains constants that define the applicable start and interdigit delays from the otto.cfg file. In step 5615, the GetCallback routine plays a prerecorded digital sound file prompting the caller to provide a callback telephone number, by pressing the applicable keypad keys, followed by an octothorp ('#'). In step 5620, the GetCallback routine reads the number entered by the caller. In step 5625 the data received is placed in the BDR. In step 5630, the GetCallback routine checks to see if the number entered was terminated by a '#' character. If so, the GetCallback routine returns success in step 5635. If not, the GetCallback routine, in step 5640, sees if the retry count has been exceeded. If the retry count has not been exceeded, execution repeats from step 5615. If the retry count has been exceeded, in step 5650, the GetCallback routine plays a prerecorded digital message indicating that the number was not successfully received, and in step 5660 returns an error condition to the calling program.

The following description sets forth a user interface for user-management of directlineMCI profile items currently accessed via ARU (DTMF) and Customer Service. These items include:

(De)Activate Account

Find-Me Routing

Schedules

3-Number Sequence

First, Second, Third Numbers and Ring-No-Answer Timeouts

Pager On/Off

Override Routing

Final (Alternate) Routing

Caller Screening

Pager Notification of Voicemail Messages

Pager Notification of Faxmail Messages

Speed Dial Numbers

The following table lists the fields that the directlineMCI customer is able to update via DTMF. This list does not include all fields in the service, only those that are used by the directlineMCI application.

| Field Name |
|---|
| 800# + PIN |
| Primary Termination |
| Primary Time-out Value |
| Secondary Termination |
| SecondaryTime-out Value |
| Tertiary Termination |
| TertiaryTime-out Value |
| Override Routing |
| Override Time-out Value |
| Alternate Routing |
| Alternate Time-out Value |
| PIN_Flags, specifically: |
| Bit 10Schedule 1 |
| Bit 11Schedule 2 |
| Bit 15Page on Vmail |
| Bit 16Page on Fax |
| State_Flags, specifically: |
| Bit 3 Account Available |
| Bit 13 Pager On/Off |
| Bit 14 Find-Me On/Off |
| Bit 15 Voicemail On/Off |
| Bit 16 Fax On/Off |
| Call Screening State |
| Default Fax Number |
| Speed Dial #1 |
| Speed Dial #2 |
| Speed Dial #3 |
| Speed Dial #4 |
| Speed Dial #5 |
| Speed Dial #6 |
| Speed Dial #7 |
| Speed Dial #8 |
| Speed Dial #9 |

A user will access his directlineMCI profile via http://www.mci.services.com/directline. Upon entry of a valid Account ID and Passcode, the user's Routing Screen will be presented. The user may click on tabs to move from one screen to another. If a user returns to a screens that's been updated during that session, the screen will be displayed as it was when he last left it, i.e. any updates he's submitted will be reflected in the data. If, however, a user logs off, or times out, when next he logs into his profile management screens, the data displayed will be from a new query into the 800PIN_1Call database. Updates made within the last 15 minutes may not have reached the NIDS databases serving the Web Server, so the data may not reflect any recent updates.

The following items will appear in the index frame, and will act as links to their associated Web screens. When a user 'clicks' on one of these items, the associated screen will be displayed in the text frame.

Call Routing

Guest Menu

Override Routing

Speed Dial Numbers

Voicemail

Faxmail

Call Screening

In addition, a LOGOFF button will appear at the bottom of the index frame. Clicking on this button will result in immediate token expiration, and the user will be returned to the login screen.

F. Login Screen

Figure 57:
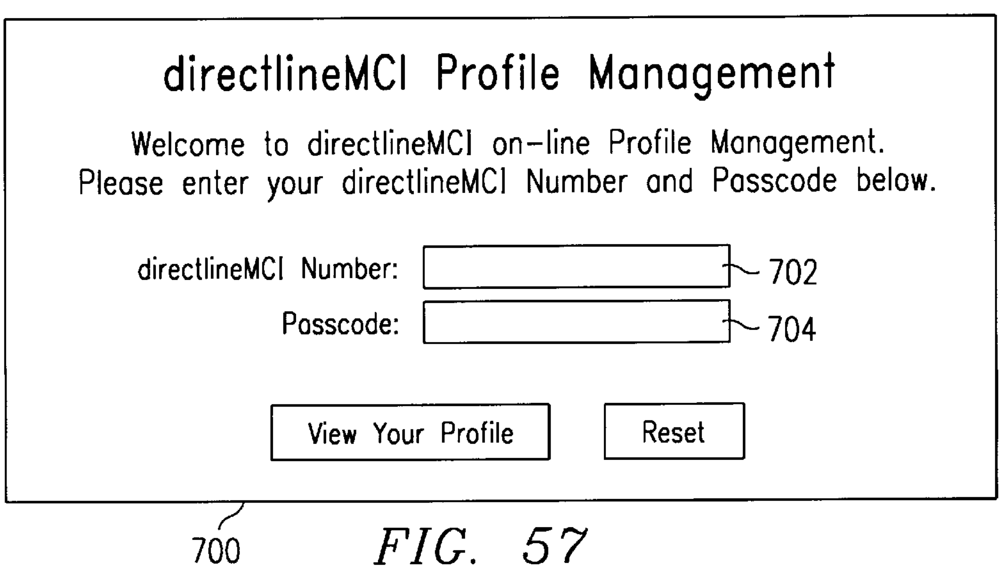
FIG. 57 shows a user login screen for access to online profile management in accordance with a preferred embodiment.

FIG. 57 shows a user login screen 700 for access to online profile management.

directlineMCI Number 702

The account ID will be the directlineMCI customer's 10-digit access number, of the format 8xx xxx xxxx. This number, concatenated with a PIN of '0000', will be the key into the 1Call database, which contains the customer profile data.

The user will not be allowed a successful login if the Program flag (PIN flag 4) is set to 'N'. If a login attempt is made on such an account, the Login Error screen will be displayed.

Passcode 704

The passcode will be the same as that used to access user options via the ARU interface. It is a six-character numeric string. The user's entry will not be echoed in this field; an asterisk (*) will be displayed for each character entered.

Status message directlineMCI Number: "Enter your directlineMCI number."

Passcode: "Enter your passcode."

G. Call Routing Screen

Figure 58:
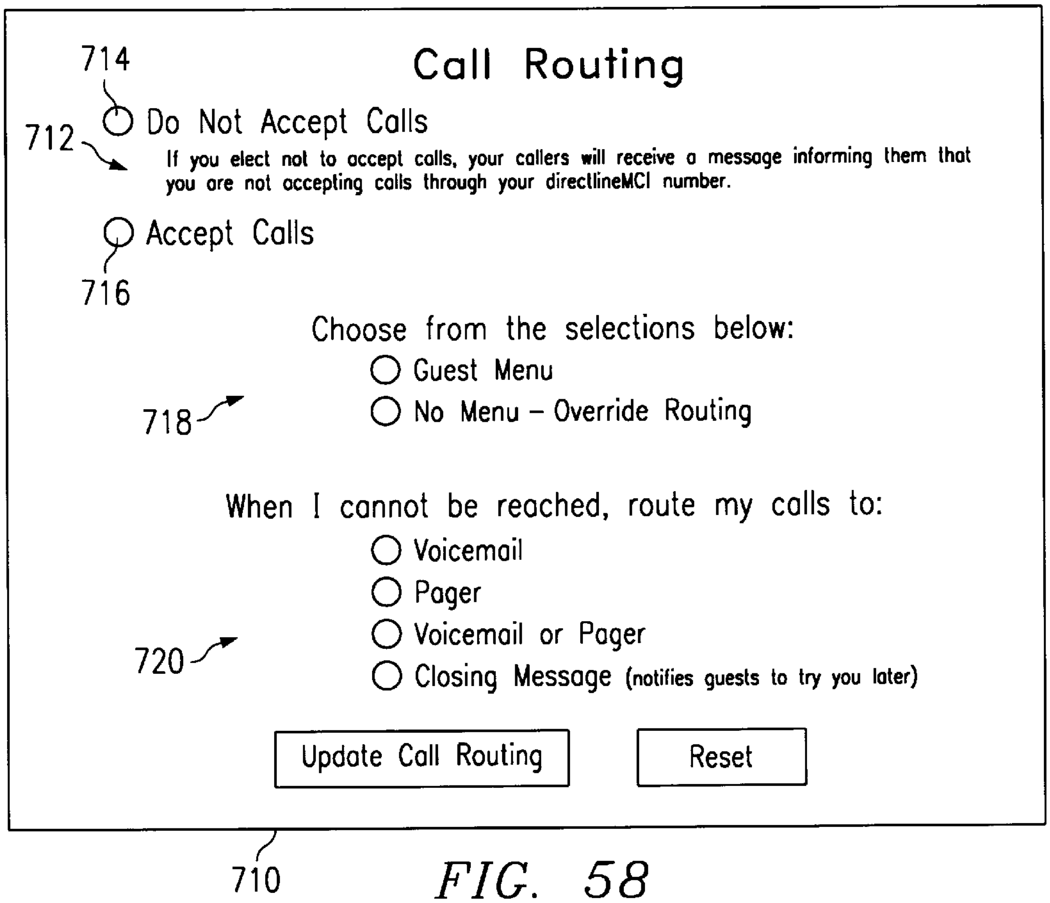
FIG. 58 shows a call routing screen, used to set or change a user's call routing instructions in accordance with a preferred embodiment.

FIG. 58 shows a call routing screen 710, used to set or change a user's call routing instructions.

"Accept Calls" Section 712

The user can specify whether calls are accepted at 712 on her account by selecting the appropriate radio button 714 or 716. These buttons correspond directly to the Account Available flag (State flags, bit 3) in the customer's directline record:

| Radio Buttons | Account Available flag |
|---|---|
| Accept Calls | Y |
| Do Not Accept Calls | N |

"Choose from the selections below" Section 718

The user specifies whether the guest caller should receive a Guest Menu, or Override Routing treatment. This selection will indicate whether the data in the Guest Menu or Override Routing screen is applicable.

The customer's Override Termination will be populated as follows, according to the user's selection:

| 'Offer Guests . . . ' Radio Buttons | Override Termination |
|---|---|
| Guest Menu | 00 |
| No Menu - Override Routing | 08* (default voicemail) |

"When I cannot be reached." Section 720

A user specifies call treatment for those calls for which he was unable to be reached. The Alternate Termination in the customer record is updated as follows:

| Radio Buttons | Alternate Termination |
|---|---|
| Voicemail | 08 |
| Pager | 07 |
| Voicemail or Pager - Caller Choice | 09 |
| Final Message | 05 |

Status messages

Depending on the choices made by the user, the following status messages are provided to the user for each selection identified below:

Do Not Accept Calls: "No calls will be accepted on your directlineMCI Number."

Accept Calls: "Calls will be accepted on your directlineMCI Number."

Guest Menu: "Lets callers select how they want to contact you."

No Menu—Override Routing: "Routes callers to a specific destination selected by you."

Voicemail: "Callers will be asked to leave a voicemail."

Pager: "Callers will be prompted to send you a page."

Voicemail or Pager: "Callers can choose to leave you a voicemail or send you a page."

Closing Message: "Callers will hear a message asking them to try their call later."

H. Guest Menu Configuration Screen

Figure 59:
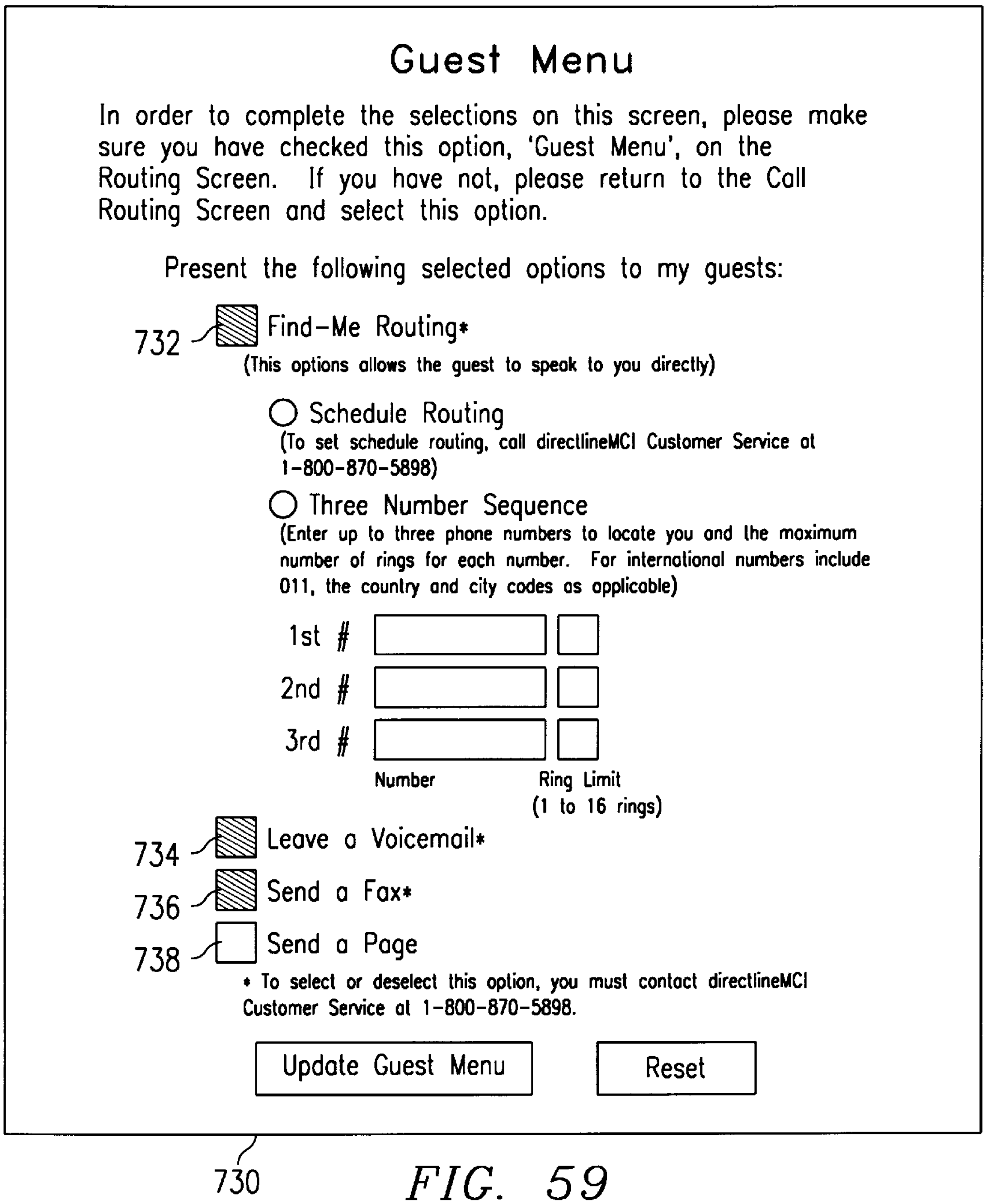
FIG. 59 shows a guest menu configuration screen, used to set up a guest menu for presentation to a caller who is not an account owner in accordance with a preferred embodiment.

When Override Routing has been disabled, i.e., when Guest Menu has been selected, a Guest Menu will be presented to the guest caller. The user has the ability to configure his Guest Menu using a guest menu configuration screen 730 (FIG. 59) to the following extent:

"Find-Me Routing" Checkbox 732

In this phase, Find-Me Routing cannot be de-selected. The check box will be checked based on the Find-Me Flag (PIN Flags, bit 9, and the option greyed out.

If the subscriber enters a 'leading 1' for a domestic number, it will be stripped from the number, and only the NPA-Nxx-xxxx will be stored in the database.

When programming his 3-Number Sequence numbers, the subscriber may select the number of rings, from 1 to 6, the system should allow before a Ring-no-Answer decision is made. The number of rings will be stored in the database in terms of seconds; the formula for calculating seconds will be: 6 *Ring_Limit. The default, if no value is entered, is 3 rings, or 18 seconds. When reading from the database, from 0 to 8 seconds will translate to 1 ring. A number of seconds greater than 8 will be divided by six, with the result rounded to determine the number of rings, up to a maximum of 16.

Updates to the customer's record will be as follows:

| Radio Buttons | Schedule ½ flags | Primary Termination and Timeout | Secondary Termination and Timeout | Tertiary Termination and Timeout |
|---|---|---|---|---|
| Schedules | Both Y | no change | no change | no change |
| 3-Number Sequence | Both N | 1st entered number** and timeout | 2nd entered number** and timeout | 3rd entered number** and timeout |

**Domestic/international termination will be validated as described in Appendix A.

"Leave a Voicemail" Checkbox 734

In this phase,Voicemail cannot be de-selected. The check box will be checked based on the Vmail Flag (PIN Flags, bit 3), and the option grayed out.

"Send a Fax" Checkbox 736

In this phase, Fax cannot be de-selected. The check box will be checked based on the Fax Termination Flag (PIN Flags, bit 13), and the option greyed out.

"Send a Page" Checkbox 738

The user can specify whether callers will be offered the paging option by toggling the box labeled Send me a Page. This box corresponds directly to the Pager On/Off flag (State flags, bit 13) in the customer's directline record:

| Page Checkbox | Pager On/Off flag |
|---|---|
| Checked | Y |
| Unchecked | N |

Status messages

Find Me Routing: "Allows callers to try to 'find you' wherever you are."

Schedule Routing: "Routes callers based on your schedule."

Three Number . . . : "Allows callers to locate you through the three numbers."

$1^{st}$ #, $2^{nd}$ #, $3^{rd}$ #: "Enter telephone number."

$1^{st}$, $2^{nd}$, 3rd Ring Limit: "Enter the number of times to ring at this number."

Leave a Voicemail: "Allows callers to leave you a voicemail."

Send a Fax: "Allows callers to send you a fax."

Send a Page: "Allows callers to send you a page."

I. Override Routing Screen

Figure 60:
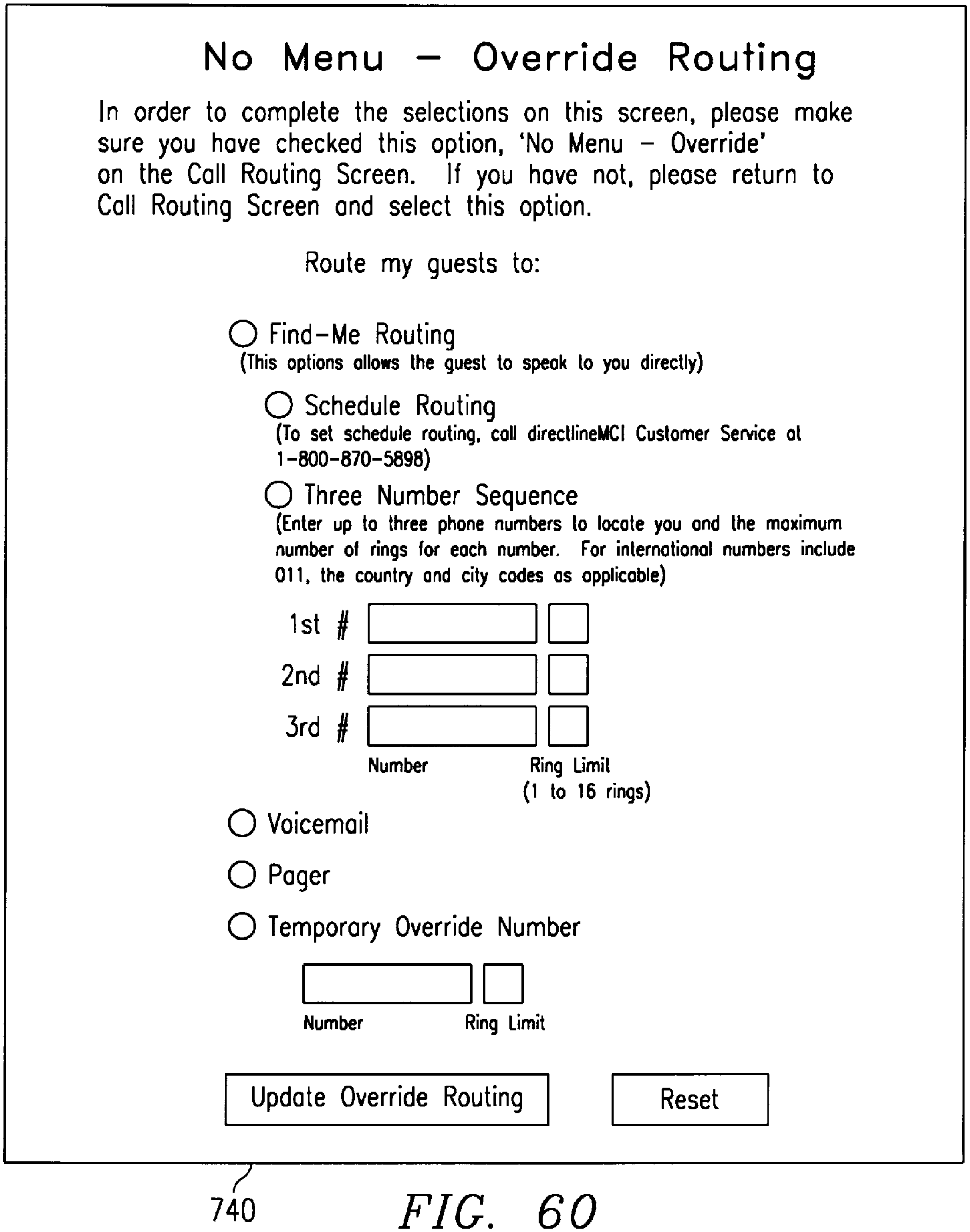
FIG. 60 shows an override routing screen, which allows a user to route all calls to a selected destination in accordance with a preferred embodiment.

FIG. 60 shows an override routing screen 740, which allows a user to route all calls to a selected destination. When a user selects to route all his calls to a specific destination, bypassing presentation of the guest menu 730 of FIG. 59, the Override Termination in the customer record will be updated as follows:

| Override Routing Radio Buttons | Override Termination |
|---|---|
| Guest Menu selected | 00 |
| Voicemail | 08 |
| Pager | 07 |
| Find-Me | 06 |
| Telephone number | Entered number** |

When this option is initially selected from the Profiles screen, there will be no Override Routing setting in the user's customer record. The default setting, when this screen is presented, will be Voicemail, if available, Find-Me if Voicemail is not available.

Status messages

Find Me Routing: "Allows callers to only try to 'find you' wherever you are."

Schedule Routing: "Routes callers based on your schedule."

Three Number . . . : "Allows callers to locate you through the three numbers."

$1^{st}$ #, $2^{nd}$ #, $3^{rd}$ #: "Enter telephone number."

$1^{st}$, $2^{nd}$, $3^{rd}$ Ring Limit: "Enter the number of times to ring at this number"

Voicemail: "Callers will be prompted to leave you a voicemail only."

Send a Page: "Callers will be prompted to send you a page only."

Temporary Override Number: "caller will only be routed to this number you select."

Telephone Number Ring Limit: "Enter the number of times to ring at this number"

J. Speed Dial Screen

Figure 61:
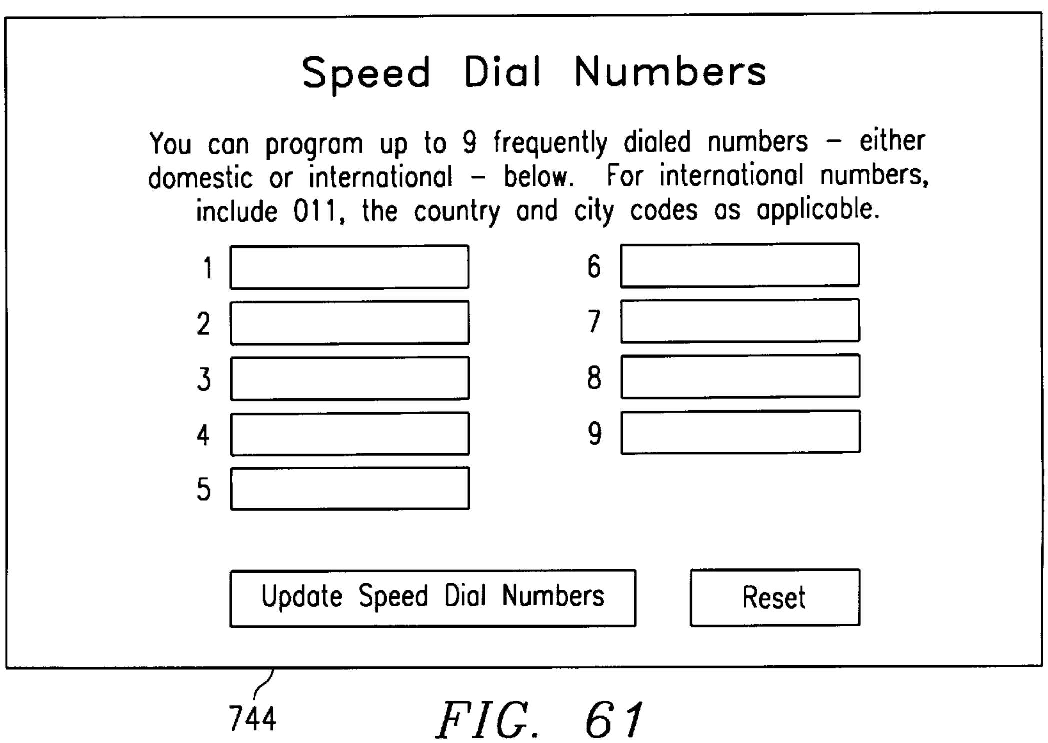
FIG. 61 shows a speed dial numbers screen, used to set up speed dial in accordance with a preferred embodiment.

FIG. 61 shows a speed dial numbers screen 744. A user may update his nine (9) Speed Dial numbers via the Web interface. Speed Dial numbers labeled 1 through 9 on the Web page correspond with the same Speed Dial numbers in the customer's record. Domestic and international termination will be validated as described below.

Status messages

1–9: "Enter speed dial number <1–9>."

Figure 62:
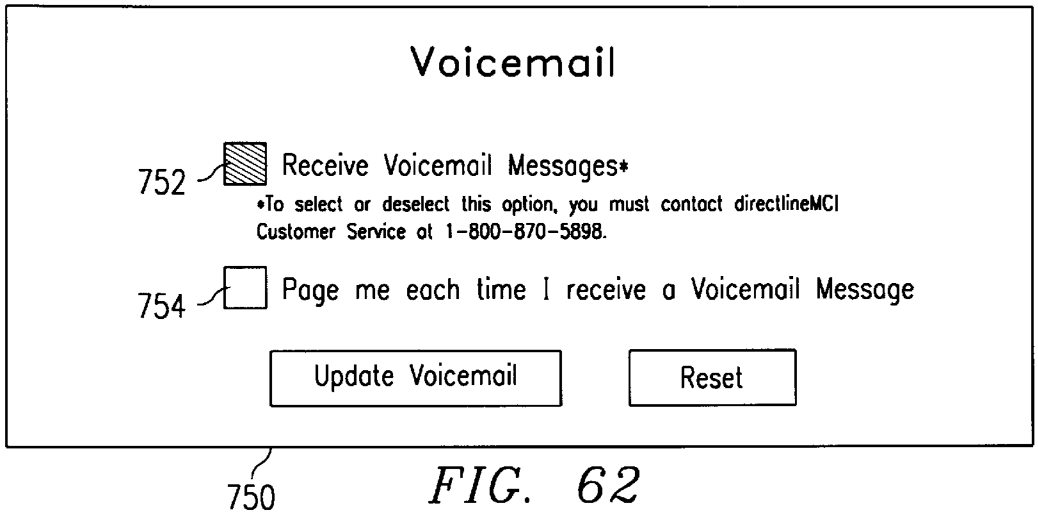
FIG. 62 shows a voicemail screen, used to set up voicemail in accordance with a preferred embodiment.

FIG. 62 shows a voicemail screen 750.

"Receive Voicemail Messages" Checkbox 752

"Page me when I receive" Checkbox

"Page me when I receive a new voicemail message" Checkbox 754. This box corresponds directly to the Page on Vmail flag (PIN flags, bit 15) in the customer's directline record:

| Pager Notification Checkbox | Page on Vmail flag |
|---|---|
| Unchecked | N |
| Checked | Y |

Status messages

Receive voicemail . . . : "Callers will be able to leave you a voicemail message."

Page me each time . . . : "You will be paged when you receive a voicemail message."

Figure 63:
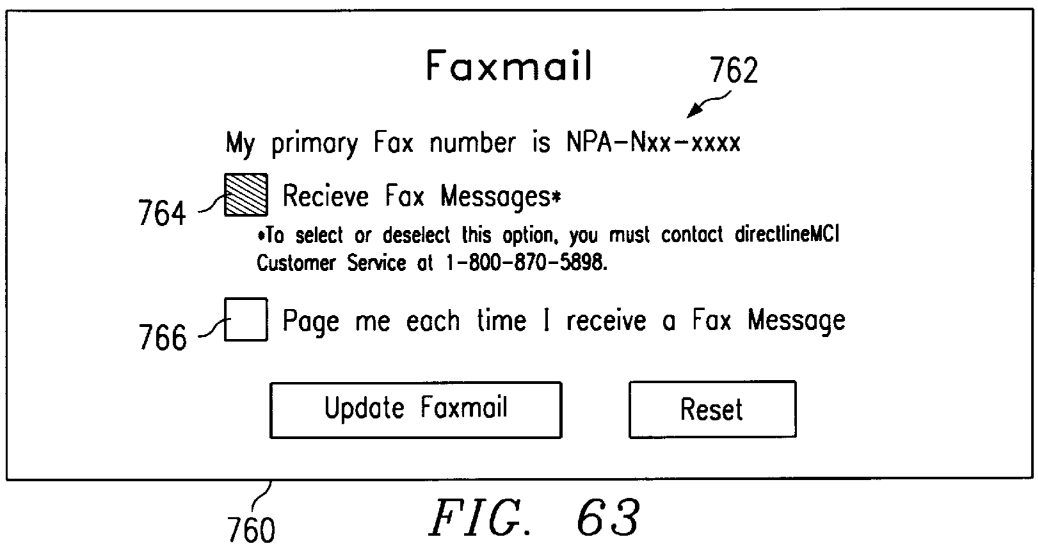
FIG. 63 shows a faxmail screen, used to set up faxmail in accordance with a preferred embodiment.

FIG. 63 shows a faxmail screen 760.

"My primary Fax number is" Field 762

"Receive Faxmail Messages" Checkbox 764

Profile management of this item is shown as it appears on the Faxmail Screen.

"Page me when I receive" Checkbox 766

This item appears as a "Page me when I receive a new voicemail message" Checkbox 766. This box corresponds directly to the Page on Fax flag (PIN flags, bit 16) in the customer's directline record:

| Pager Notification Checkbox | Page on Fax flag |
|---|---|
| Unchecked | N |
| Checked | Y |

Status messages

Receive fax . . . : "Callers will be able to send you a fax."

Page me each time . . . : "You will be paged when you receive a fax."

Figure 64:
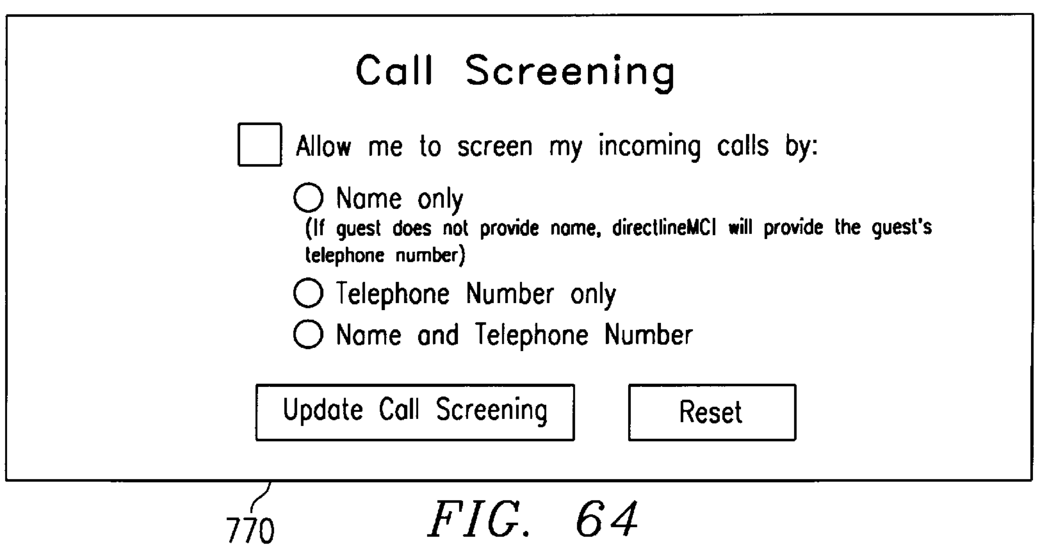
FIG. 64 shows a call screening screen, used to set up call screening in accordance with a preferred embodiment.

FIG. 64 shows a call screening screen 770. A user may elect to screen his calls by caller name, originating number or both name and number. The Call Screening State in the customer record will be updated as follows:

| Call Screening Checkbox | Radio Buttons | Call Screening State |
|---|---|---|
| Unchecked | n/a | 00 |
| Checked | Number Only | 02 |
| | Name Only | 01 |
| | Name and Number | 03 |

Status messages

Allow me to screen . . . : "Activating this feature allows you to screen your calls."

Name only: "Caller's name will be presented to answering party."

Telephone number: "Caller's telephone number will be presented to answering party"

Name and Telephone: "Caller's name and telephone number will be presented to answering party."

Figure 65:
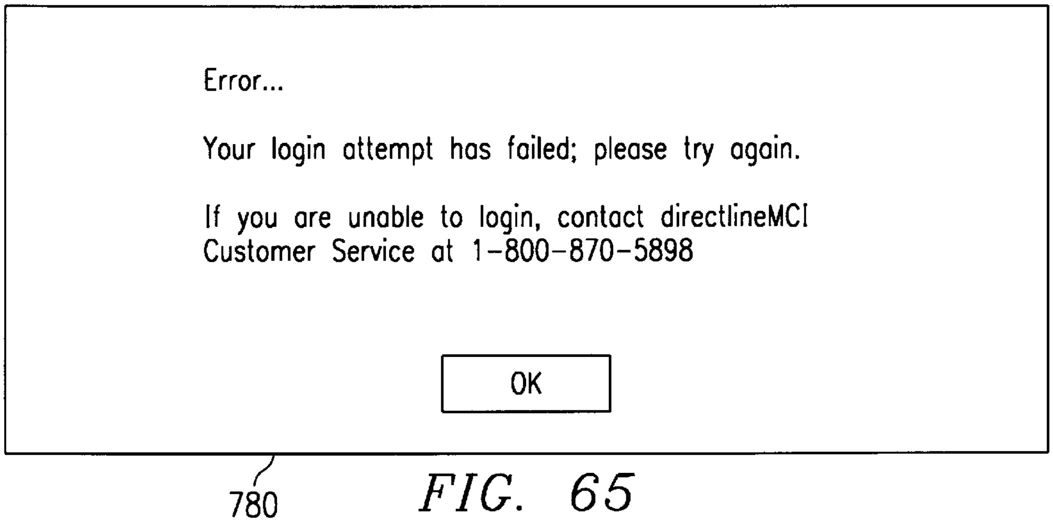
FIGS. 65–67 show supplemental screens used with user profile management in accordance with a preferred embodiment.
Figure 66:
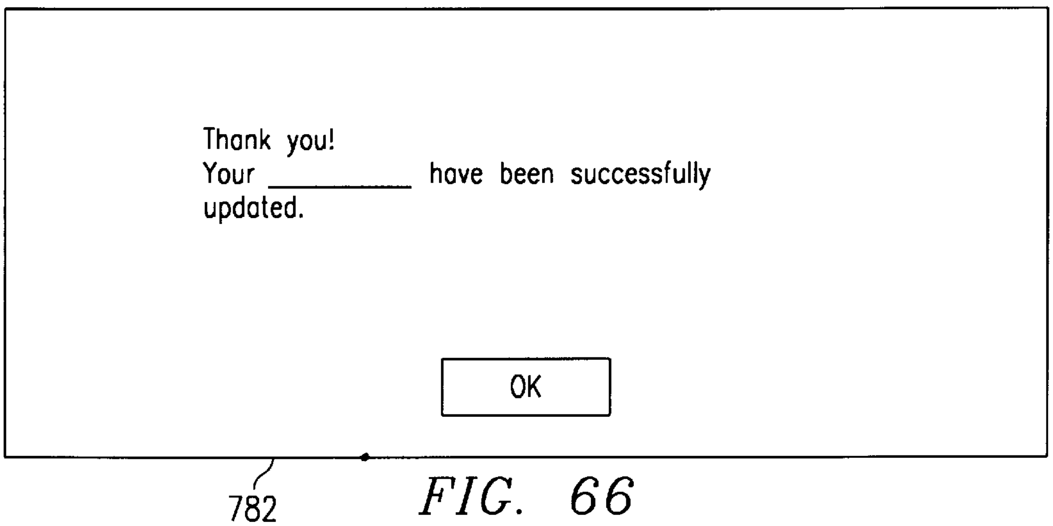
Figure 67:
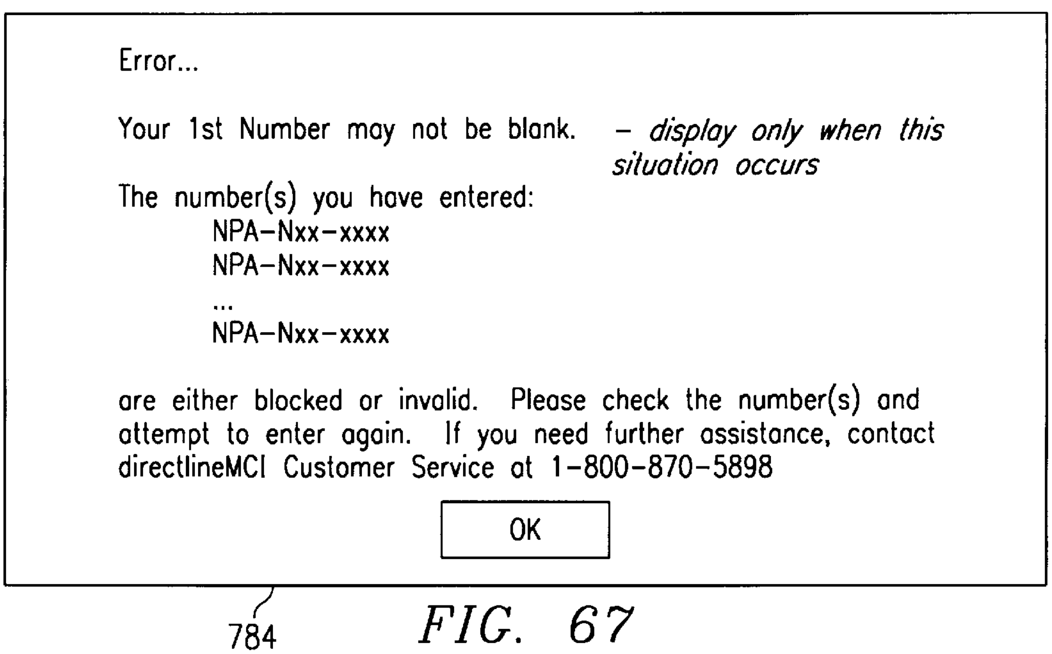

FIGS. 65–67 show supplemental screens 780, 782 and 784 used with user profile management.

Login Error screen 780

This error screen is presented when a login attempt has failed due to an invalid account number, passcode, or a hostile IP address. This is also the screen that is displayed when a user's token has expired and he's required to login again.

Update Successful screen 782

This screen is presented when an update has been successfully completed. The 'blank' will be filled in with: 'Call Routing options have', 'Guest Menu options have', 'Override Routing has', 'Speed Dial Numbers have', 'Voicemail options have', 'Faxmail options have', and 'Call Screening option has'.

Update Failed screen 784

This screen will be presented when a user has attempted to enter one or more invalid terminating number(s), or to update his account with a blank First number. The account will not be updated until corrections are made and all numbers are successfully validated.

In the various screens of the user interface, profile options are 'grayed out', indicating that the option is not available from the screen, based on the following flag settings:

| Screen | Option | Dependencies |
|---|---|---|
| Login Screen | Login | Program (Follow-Me) Flag |
| Profile Screen | Accept Calls | Avail Programming Flag |
| | Final Routing to Voicemail | Find-Me Flag AND Voicemail Flag |
| | Final Routing to Pager | Find-Me Flag AND Pager Termination Flag |
| | Final Routing to Voicemail or Pager | Find-Me Flag AND Voicemail Flag AND Pager Termination Flag |
| Guest Menu | Schedules | Find-Me AND Schedule 1 Trans populated AND Schedule 2 Trans populated |
| | Three-Number Sequence | Find-Me AND Domestic Termination Flag OR International Termination |
| | Number (1st, 2nd, 3rd) | Find-Me AND Domestic Termination Flag OR International Termination Flag |
| | Send a page | Pager Termination Flag |
| Override Routing | Schedules | Find-Me Flag AND Schedule 1 Trans populated AND Schedule 2 Trans populated |
| | Three-Number Sequence | Find-Me AND Domestic Termination Flag OR International Termination |
| | Number (1st, 2nd, 3rd) | Find-Me Flag AND Domestic Termination Flag OR International Termination Flag |
| | Pager | Pager Termination Flag |
| | Telephone Number | Find-Me Flag AND Domestic Termination Flag OR International Termination |
| Speed Dial Numbers | 1–9 | Speed Dial Programming AND Domestic Completion Flag OR International Completion Flag |
| Voicemail screen | Page me when I receive . . . | Voicemail Flag AND Pager Termination Flag |
| Faxmail screen | Page me when I receive . . . | Fax Termination Flag AND Pager Termination Flag |

-continued

| Screen | Option | Dependencies |
|---|---|---|
| Call Screening | Allow me to screen . . . | Call Screening Programming |

For some of the profile options described above, validation checks are made as follows:

International numbers, with the exception of North American Dialing Plan (NADP) numbers, must be prefaced with '011', or will not be accepted for programming.

976 blocking will be implemented as follows:

The International Blocking database will be queried, using Category 000, Type 002, and the programmed NPA, looking for a pattern match, to ensure that the programmed number is not a blocked Information/Adult Services number. If a match is found, programming to that number will not be allowed.

Country Set blocking will be implemented as follows:

The Country Set of the directlineMCI Property record will be validated against the Country Code of the programmed number. If the terminating country is blocked the directlineMCI Country Set, programming to that number will not be allowed.

Programming Routing

| If the programmed number is: | Perform the following validation checks |
|---|---|
| Domestic | Domestic Flag<br>976 Blocking |
| NADP | Domestic Flag<br>976 Blocking<br>Cset Blocking using Term PCC, Auth Cset |
| International | International Flag<br>Cset Blocking using Term CC, Auth Cset |

Programming Speed Dial Numbers

| If the programmed number is: | Perform the following validation checks |
|---|---|
| Domestic | Domestic Comp Flag<br>976 Blocking |
| NADP | Domestic Comp Flag<br>976 Blocking<br>Cset Blocking using Term PCC, Auth Cset |
| International | International Comp Flag<br>Cset Blocking using Term CC, Auth Cset |

Figure 68:
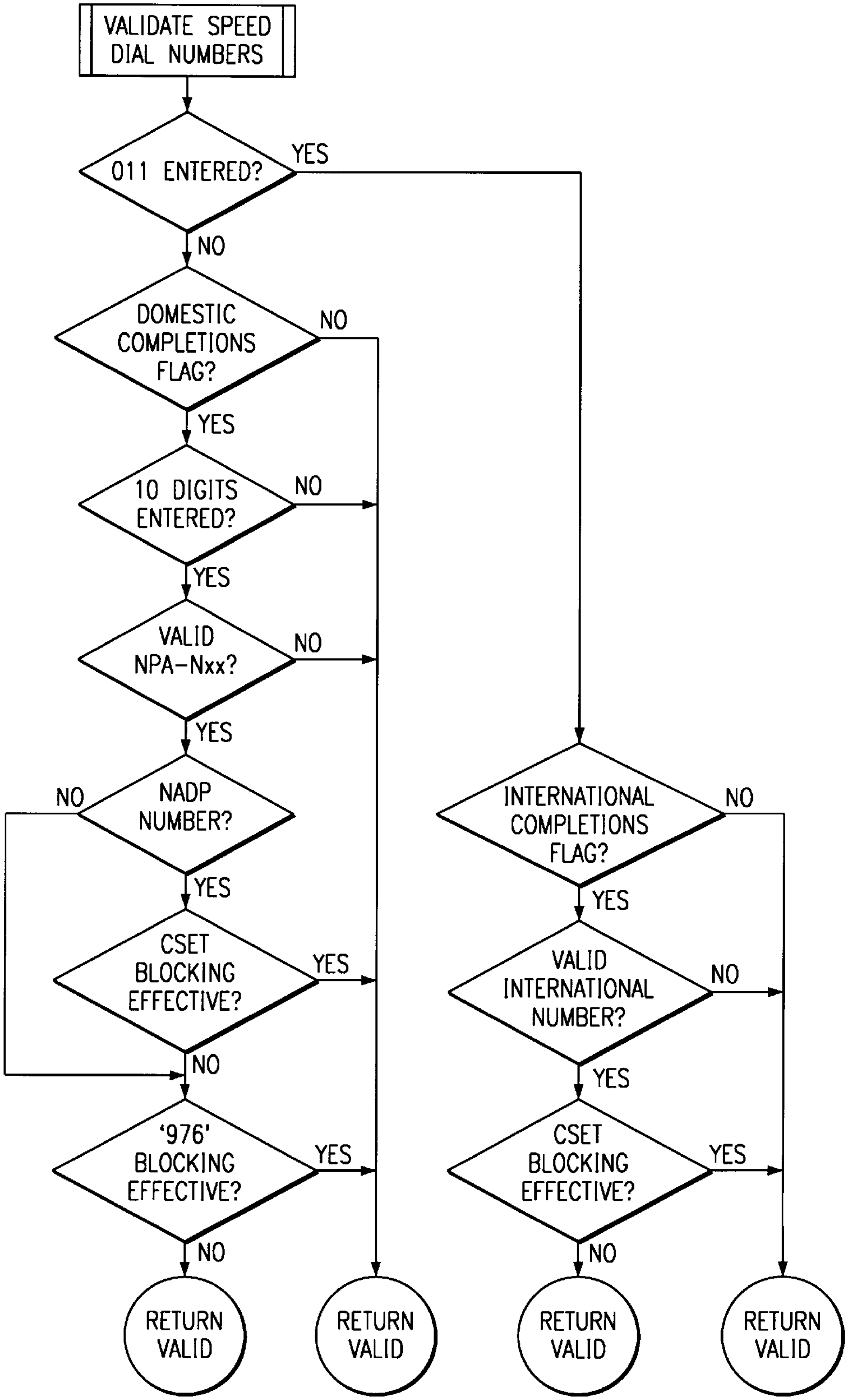
FIG. 68 is a flow chart showing how the validation for user entered speed dial numbers is carried out in accordance with a preferred embodiment.

FIG. 68 is a flow chart showing how the validation for user entered speed dial numbers is carried out. The same flow chart is applicable to validation of entries by a guest on the guest screen when a call is made to a user by a non-subscriber.

The integrated switching system and packet transmission network of this invention allows the provision of an improved feature set for users. directlineMCI is a single-number access personal number, with features including Find-Me functionality, voicemail, paging, and fax store and forward services. A subscriber, or user, is asked for profile information, which is entered into his customer record in the directlineMCI database on the ISN mainframe. The product's feature set includes:

Personal Greeting: The user has the option of recording a personal greeting to be played to his guest callers. If a user records a personal greeting, it replaces the 'Welcome to directlineMCI' default greeting.

Guest Menu: The Guest Menu is defined by which features the user has subscribed to. A guest caller to a 'fully loaded' account will be presented options to Speak to or Page the user, Send a Fax, or Leave a Voicemail Message.

3-Number Sequence for Find-Me functionality: The system attempts to reach the user at three numbers, trying the First (Primary) number, then the Second(ary), then the Third (Tertiary) number. If no answer is received at any of these numbers, the call is treated as prescribed in Alternate Routing.

2-Level Schedule for Find-Me functionality: The system attempts to reach the user at two numbers, using current date/day/time information to query his schedules. Attempts are made to a number from the user's Schedule 1, then Schedule 2; if no answer is received, Alternate Routing defines the treatment.

Alternate Routing allows the user to prescribe the treatment of a guest caller who chose to reach him, but no answer was received at any of the attempted numbers. Options for Alternate Routing include Voicemail, Pager, a Guest's choice of Voicemail or Pager, or a Closing Message, asking the caller to try his call again at a later time.

Override Routing allows the user to disable the presentation of the Guest Menu, and prescribe a single treatment for all guest callers. Options include completion to a telephone number, the user's defined Find-Me sequence, Voicemail, or Pager.

Default Routing is the treatment of a guest caller who, when presented the Guest Menu, does not respond after three prompts. Default Routing options include a transfer to the Operator, completion to a telephone number, the Find-Me sequence, or Voicemail.

Call Screening allows the user to define whether or not he wishes callers to be announced before being connected. Options include no call screening, or having the caller identified by name, originating telephone number, or both name and number.

The 'Place a Call' option in the user's menu allows him to make a call, and have it charged to his directlineMCI account.

Voice/Faxmail: Both voice and fax messages can be stored for later retrieval by the user. The user may opt to be notified when new voice and/or fax messages are deposited into his mailbox.

The Voice/Fax Platform (VFP) has been integrated into the Intelligent Services Network (ISN), to allow the ISN applications to query its databases, and billing records to be cut directly from the VFP.

Among the changes to the original directlineMCI product are the following items:

Find-Me Routing

Find-Me Routing now has two options, selectable by the subscriber: the 3number sequence currently implemented, or the 2-level schedule option. The schedule option is implemented such that the subscriber's Schedule 1 translation will be treated as the primary termination, and his Schedule 2 translation will be treated as the secondary termination. Find-Me Routing is described in more detail in the Call Flow diagrams and ARU Impacts sections.

Default Routing

Default Routing is the prescribed action the application takes when a caller does not respond to Guest Menu prompts. Options for Default Routing include a telephone number, voicemail, Find-Me routing, and Operator transfer.

Voice/Fax Message Information

When a subscriber accesses the user menu, the application provides mailbox status information, including the number of new voice or fax messages, and if his mailbox is full. The application launches a query to the VFP database to obtain this information.

Speed Dial

In addition to the ability to complete a call to a telephone number entered real-time, the subscriber is now able to complete to programmed Speed Dial numbers. These 9 Speed Dial numbers will be user-programmable via DTMF.

K. ARU CALL FLOWS

Figure 69A:
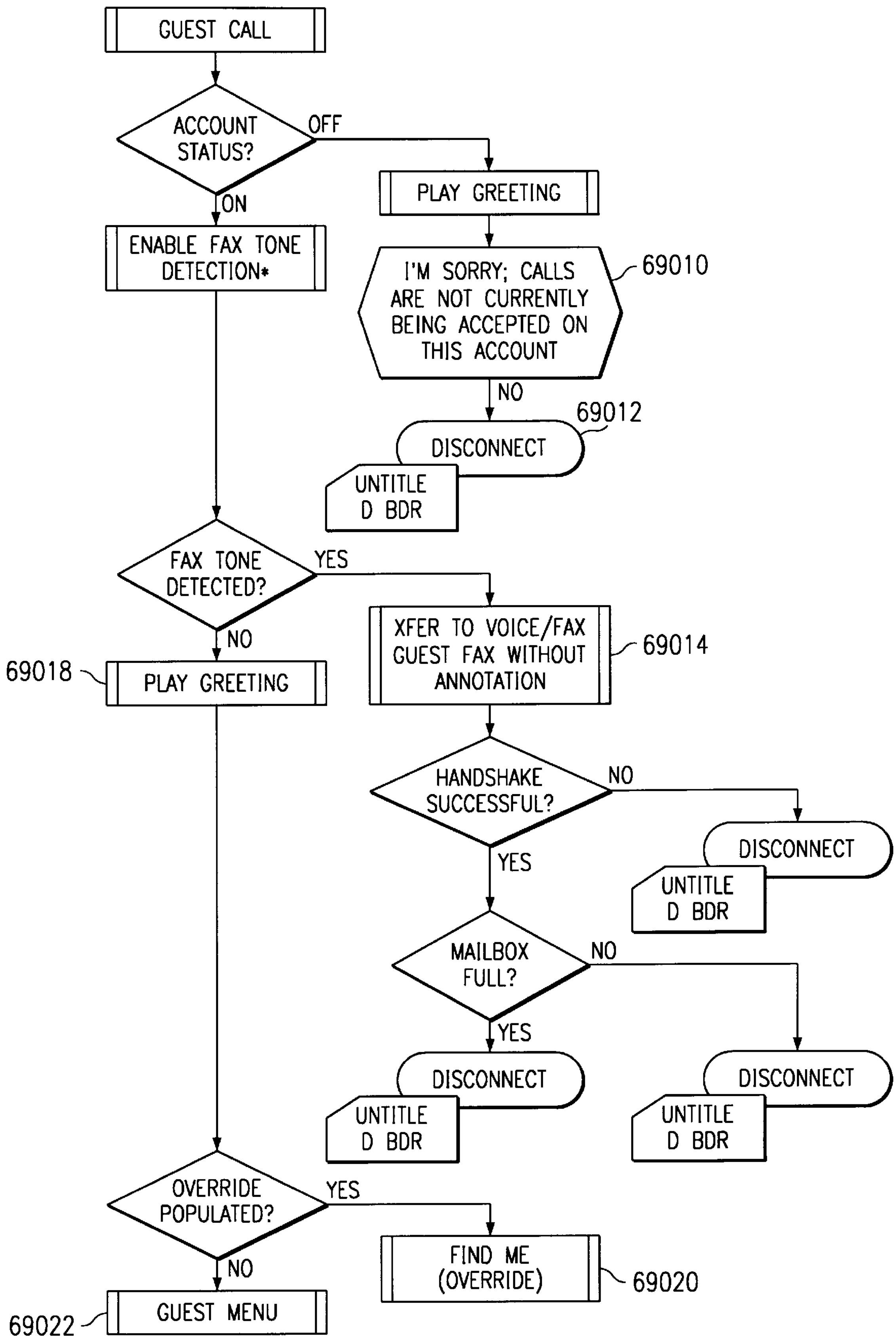
FIGS. 69A–69AI are automated response unit (ARU) call flow charts showing software implementation in accordance with a preferred embodiment.

FIGS. 69A through 69AI depict automated response unit (ARU) call flow charts showing software implementation of the directline MCI product described above, and are useful for a further understanding of the invention.

FIG. 69A depicts the starting point for processing of an ARU call. As a call initiates, it is assumed to be a guest call. If the account to which the call is directed is not currently online, the ARU in Step 69010 plays a message indicating that calls cannot be accepted for the account, and in Step 69012 disconnects the call. If the ARU detects a fax tone on the incoming call, the ARU in Step 69014 performs the ARU Xfer to Voice/Fax Guest Fax without Annotation routine, which is described below with respect to FIG. 69L. If no fax tone is detected, the ARU in Step 69018 performs the ARU Play Greeting routine, which is described below with respect to FIG. 69L. The ARU then checks to see whether the subscriber has indicated an override for incoming calls. If so, in Step 69020 the ARU performs the ARU Find Me routine, specifying a parameter of "Override." The ARU Find Me routine is described below with respect to FIGS. 69E and 69F. If override has not been specified, the ARU in Step 69022 performs the ARU Guest Menu routine, which is described below with respect to FIG. 69D.

Figure 69B:
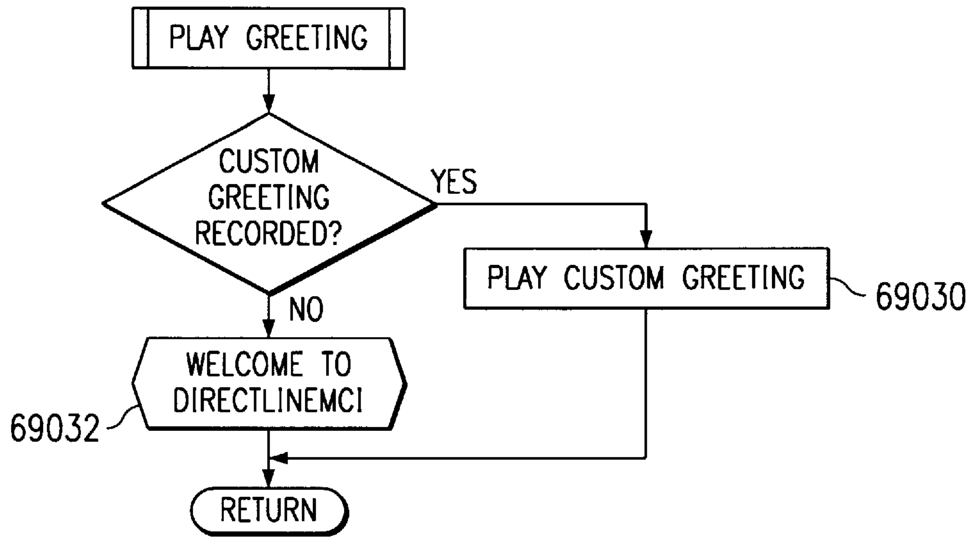

FIG. 69B depicts the ARU Play Greeting routine. If a custom greeting has been recorded, the ARU plays the custom greeting in Step 69030. Otherwise, the ARU plays a generic prerecorded greeting in Step 69032.

Figure 69C:
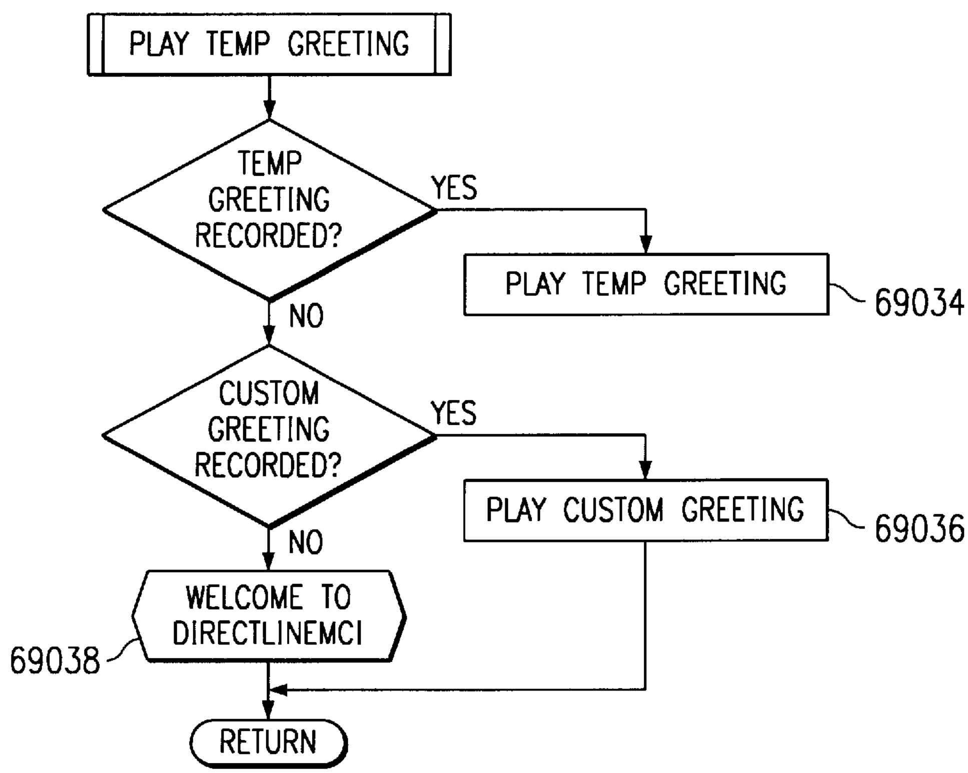

FIG. 69C depicts the ARU Play Temp Greeting routine. If a temporary greeting has been recorded, the ARU plays the temporary greeting in Step 69034. If a custom greeting has been recorded, the ARU plays the custom greeting in Step 69036. Otherwise, the ARU plays a generic prerecorded greeting in Step 69038.

Figure 69D:
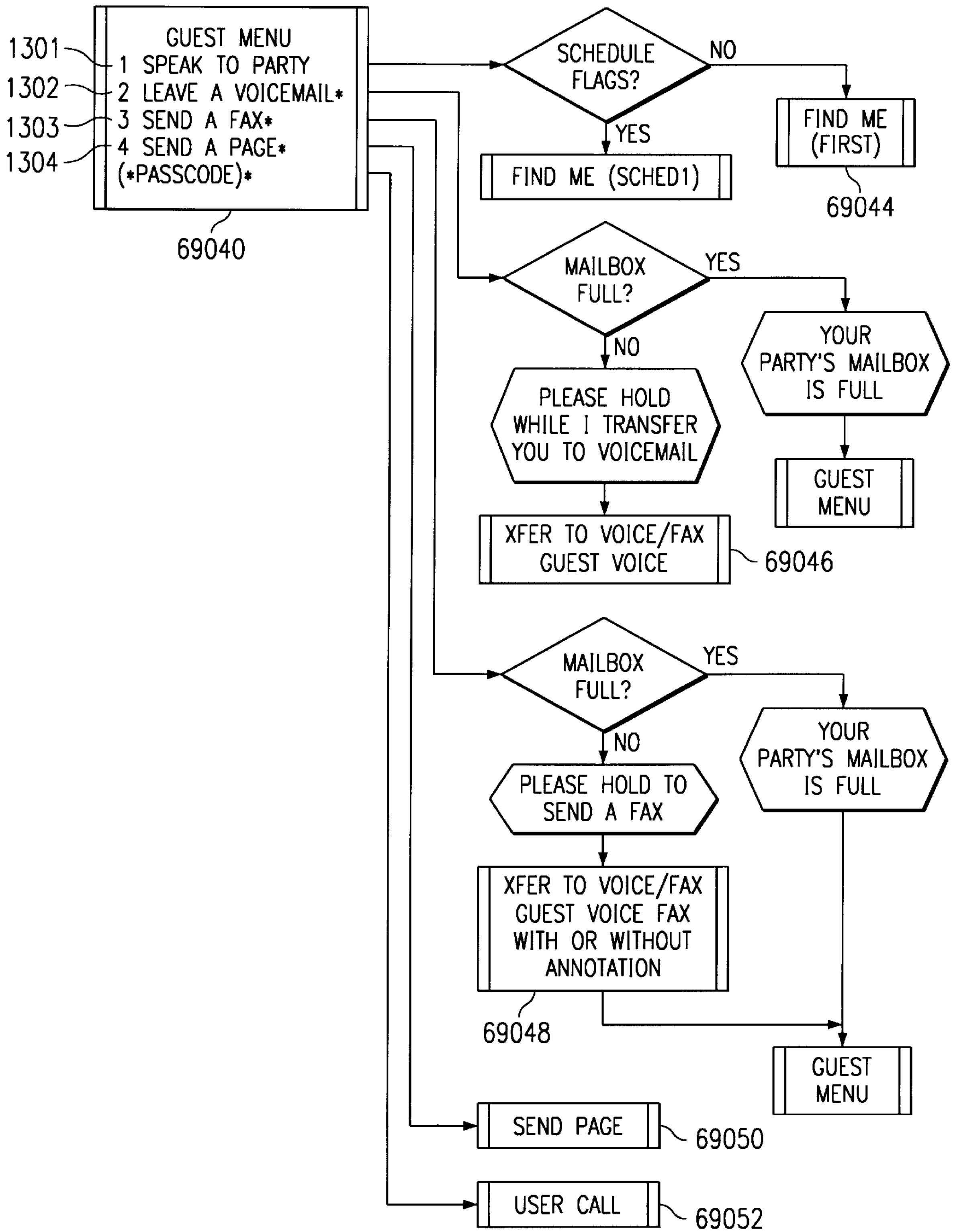

FIG. 69D depicts the ARU Guest Menu routine. In Step 69040, the ARU presents an audible menu to the caller. In the example shown, item '1' corresponds to a request to speak to a subscriber; item '2' corresponds to a request to leave a voice mail message for a subscriber; item '3' corresponds to a request to send a fax to a subscriber; and item '4' corresponds to a request to page a subscriber. In addition, a subscriber may enter his or her passcode to gain access to the ARU as a subscriber.

If the caller requests to speak to a subscriber, the ARU checks the schedule flags associated with the caller's profile. If the subscriber's profile indicates routing by schedule, the ARU in Step 69042 performs the Find Me routine of FIGS. 69E and 69F, using "Sched1" as the parameter. If the subscriber's profile does not indicate routing by schedule, the ARU in Step 69044 performs the ARU Find Me routine using "First" as the parameter. The ARU Find Me routine is discussed in further detail below with respect to FIGS. 69E and 69F.

If the caller requests to leave a voice mail message, the ARU checks to see whether the subscriber's mailbox is full. If the mailbox is full, a recorded message is played and the caller is returned to the guest menu. If the mailbox is not full, a recorded message is played advising the caller to hold while he is transferred to the ARU Voicemail routine in Step 69046.

If the caller requests to send a fax, the ARU checks to see whether the subscriber's mailbox is full. If the mailbox is full, a recorded message is played and the caller is returned to the guest menu. If the mailbox is not full, a recorded message is played advising the caller to hold while he is transferred to the voice/fax routine in Step 69048.

If the caller requests to page the subscriber, the ARU in Step 69050 performs the ARU Send Page routine, which is described with respect to FIG. 69M, below.

If the caller enters a valid passcode, the ARU in Step 69052 performs the ARU User Call routine, which is described with respect to FIG. 69P, below.

Figure 69E:
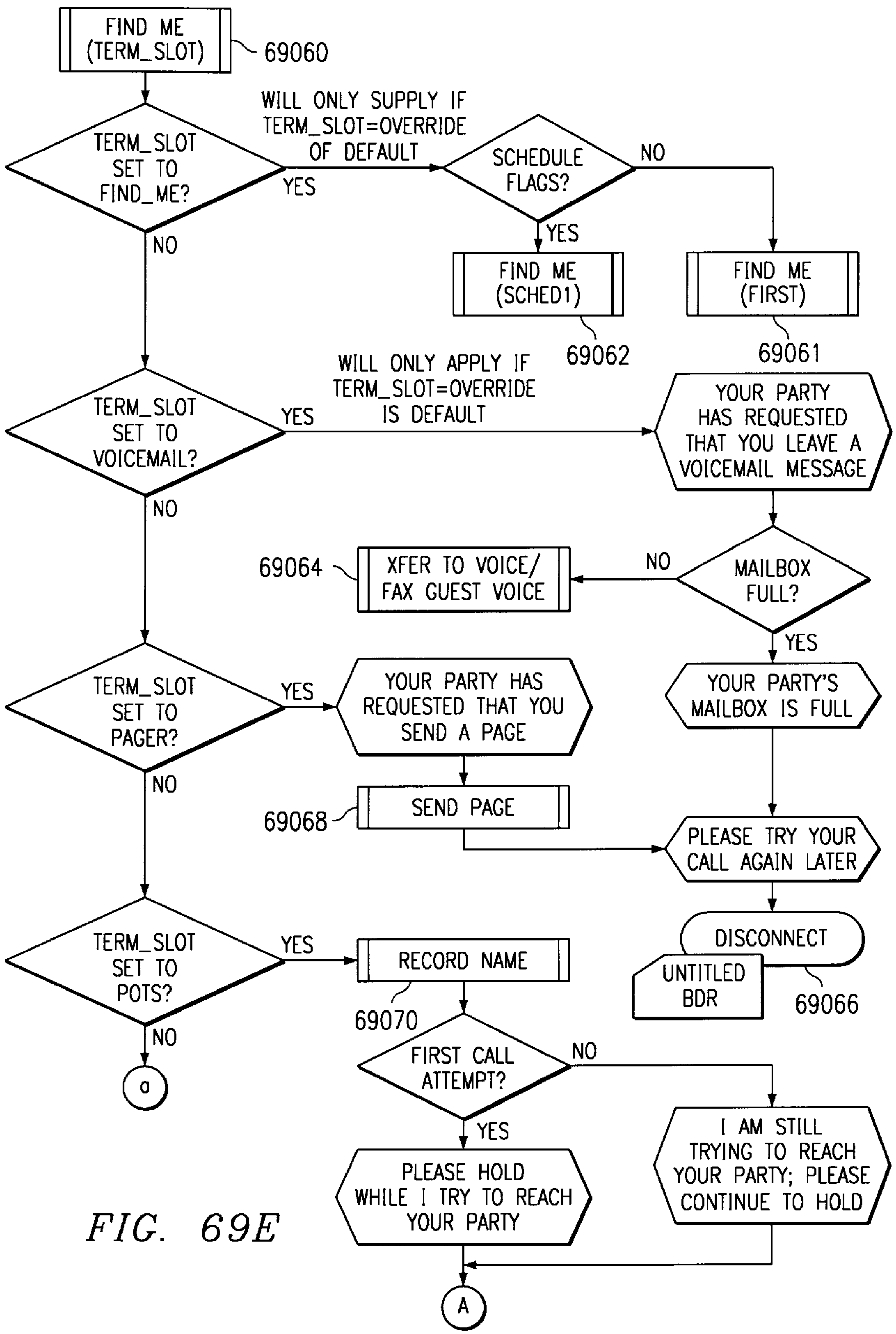
Figure 69F:
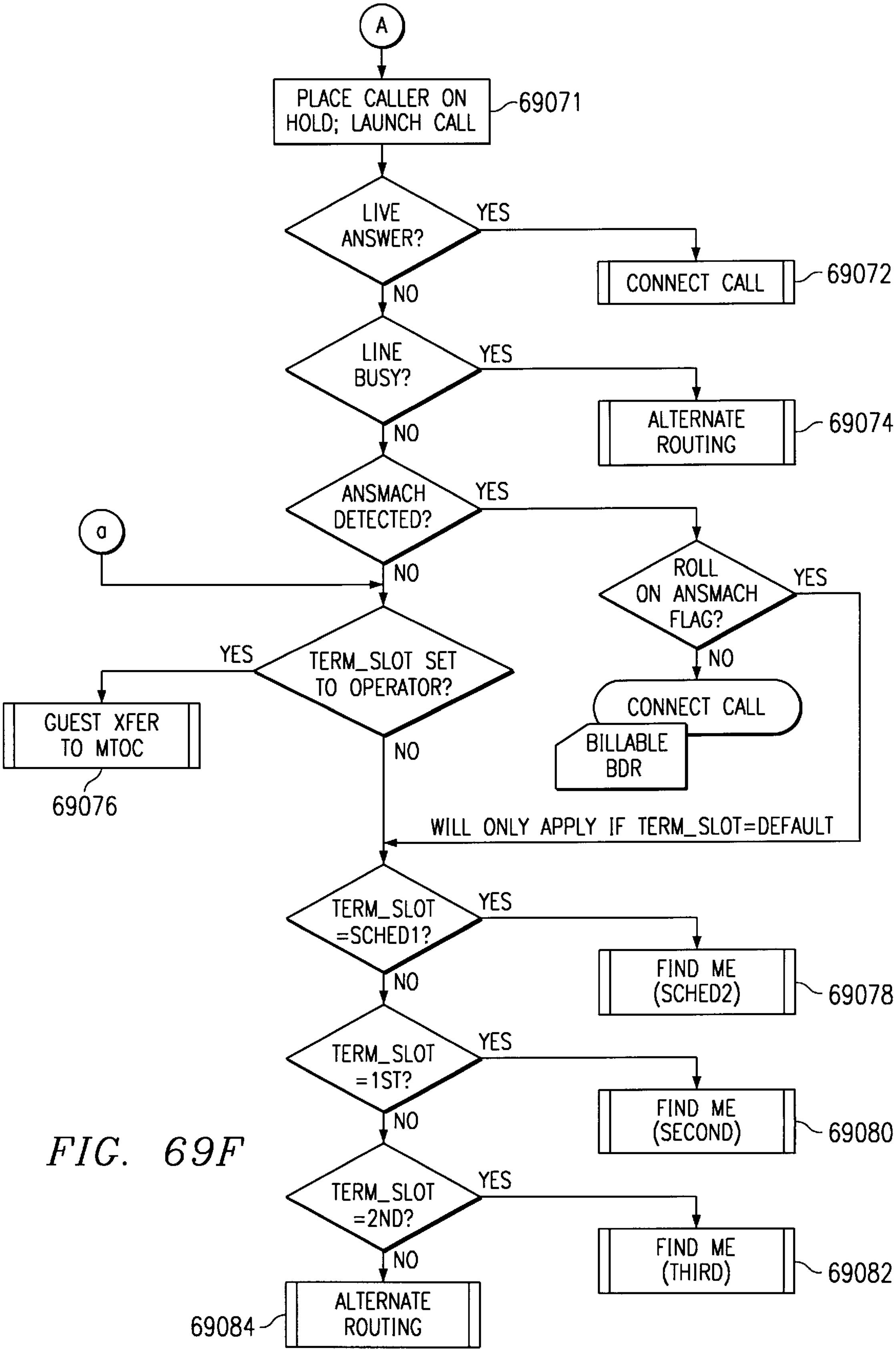

FIGS. 69E and 69F depict the operation of the ARU Find Me routine. As shown in Step 69060, the ARU Find me routine takes a single parameter Term_Slot, which is set by the caller and used by the ARU performing the ARU Find Me routine to choose among alternative courses of action. If Term_Slot is set to "Find Me", this indicates that the ARU is to use the default method of determining the subscriber's current number. This value may be set, for example, for override or default processing. If the subscriber's profile includes schedule flags, the ARU performs the ARU Find Me routine using the "Sched1" parameter as shown in Step 69062; if not, the ARU performs the ARU Find Me routine using the first telephone number in the list of numbers for the subscriber, as shown in Step 69061.

If Term_Slot is set to "Voicemail," the ARU plays a message to the caller that the subscriber has requested that the caller leave a voice mail message. If the subscriber's mailbox is not full, the ARU in Step 69064 performs the ARU Xfer to Voice/Fax Guest Voice routine, depicted in FIG. 69K. That routine returns if unsuccessful, in which case a message is played indicating that the caller should try the call later, and the caller is disconnected. Likewise, if the subscriber's mailbox is full, the ARU plays messages indicating that the mailbox is full and that the caller should try the call later, and the caller is disconnected.

If Term_Slot is set to "Pager," the ARU plays a message to the caller that the subscriber has requested that the caller leave a request to page the subscriber. The ARU then performs the ARU Send Page routine, which is described with respect to FIG. 69M, below. That routine returns if unsuccessful, in which case a message is played indicating that the caller should try the call later, and the caller is disconnected.

If Term_Slot is set to any POTS ("Plain Old Telephone Service") value (such as Sched1, Sched2, First, Second, or Third), the POTS value indicates that the subscriber has specified that incoming calls be sent using the standard telephone system, and the ARU has been directed to use the particular scheduled or selected telephone number. In Step 69070, the ARU performs the ARU Record Name routine to acquire a digital recording of the caller's identification. The ARU Record Name routine is described in detail with respect to FIG. 69H, below. The ARU plays an appropriate message for the caller (e.g., "Please hold while I try to reach your party" on the first attempt, and "I am still trying to reach your party; please continue to hold" for subsequent attempts). In Step 69071, the ARU places the caller on hold and launches the call to the selected telephone number. If the call is answered by an individual, the ARU in Step 69072 performs the ARU Connect Call routine, discussed below with respect to FIG. 69I. If the line is busy, the ARU in Step 69074 performs the ARU Alternate Routing routine of FIG. 69N. If the ARU detects an answering machine, it checks to see whether the subscriber has requested that the ARU roll over to the next alternative number upon encountering an answering machine. If not, the ARU connects the call. Otherwise, the ARU selects the next number in rotation to call and re-performs the ARU Find Me routine using the newly-selected number.

If there is neither a live answer, a line busy signal, nor an answering machine answer, then if Term_Slot is set to "Operator," the ARU performs the ARU Guest Xfer to MOTC routine, described below with respect to FIG. 69M, to transfer the call to the operator. Otherwise, the ARU selects the next telephone number, if any, and re-invokes the ARU Find Me routine with the new number. If no more numbers to check remain, the ARU in Step 69084 performs the ARU Alternate Routing routine of FIG. 69N.

Figure 69G:
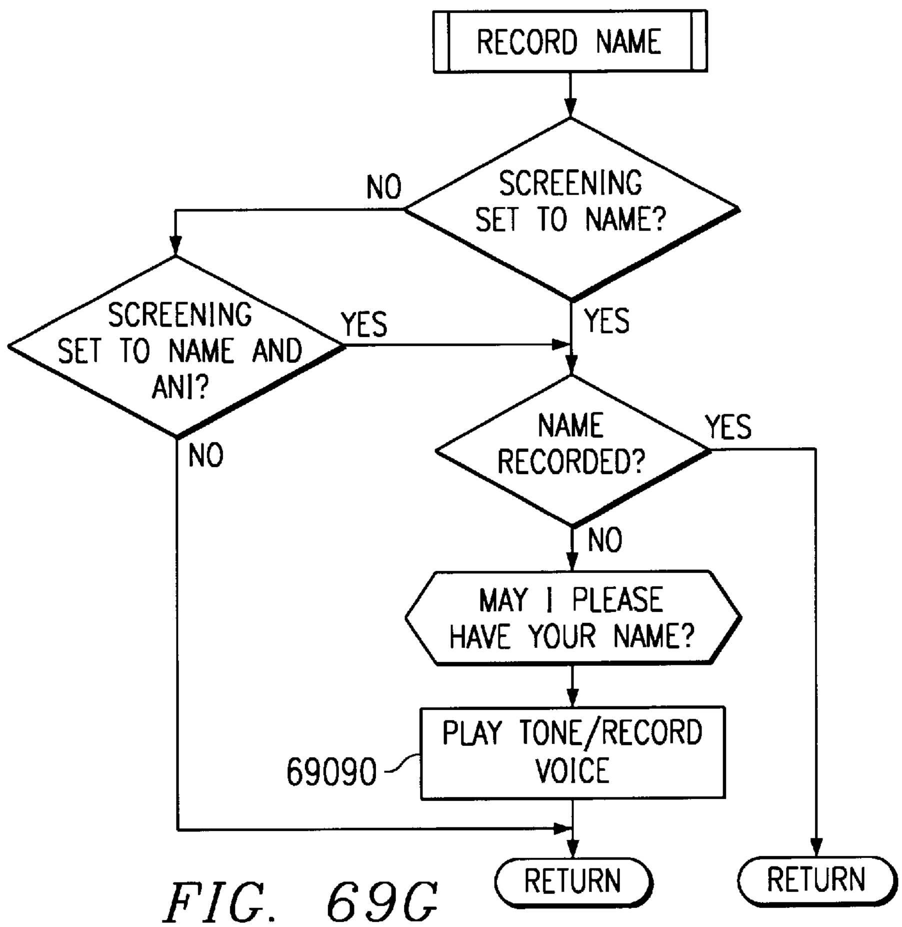

FIG. 69G depicts the ARU Record Name routine. This routine is used to record the name of the caller if the subscriber has specified call screening, either by name or by name and ANI. If the subscriber has specified call screening, the ARU checks to see whether the caller's name has been recorded on a previous pass. If not, the caller is prompted to supply a name, and the audible response is recorded in Step 69090. If the subscriber has not specified either form of call screening, the ARU Record Name routine returns without recording the caller's name.

Figure 69H:
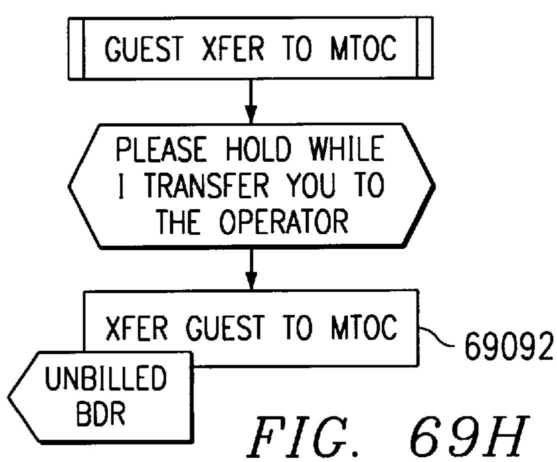

FIG. 69H depicts the ARU Guest Xfer to MOTC routine. This routine plays a prerecorded message asking the caller to hold, and then transfers the call to the operator in Step 69092.

Figure 69I:
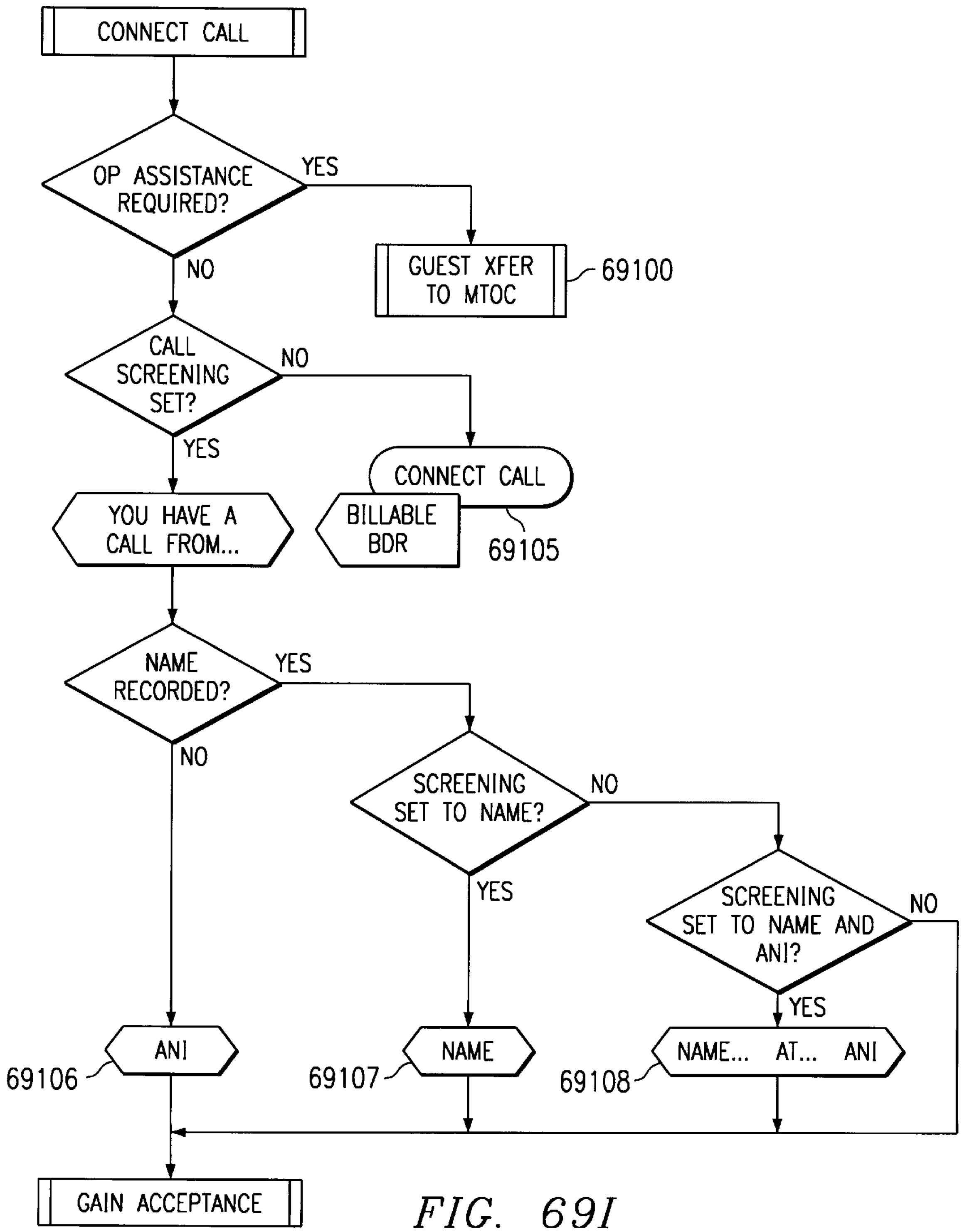

FIG. 69I depicts the ARU Connect Call routine. If operator assistance is required to complete the call, the ARU performs the ARU Guest Xfer to MOTC routine of FIG. 83H. If the subscriber has not requested call screening, the call is connected to the subscriber. If the subscriber has selected call screening, the ARU plays a set of informational messages to the subscriber. The ARU plays "You have a call from," followed by a message identifying the caller, depending on the options chosen by the subscriber and whether a caller name had been recorded. If the name is not recorded, the identifying message 69106 gives only the ANI from which the call was placed. If a name was recorded, the identifying message includes the name as in Step 69107 if the subscriber has requested screening by name, or the name and ANI as in Step 69108 if the subscriber has selected screening by name and ANI. After prompting the subscriber with the identifying information, the ARU in Step 69110 performs the ARU Gain Acceptance routine depicted in FIG. 69J.

Figure 69J:
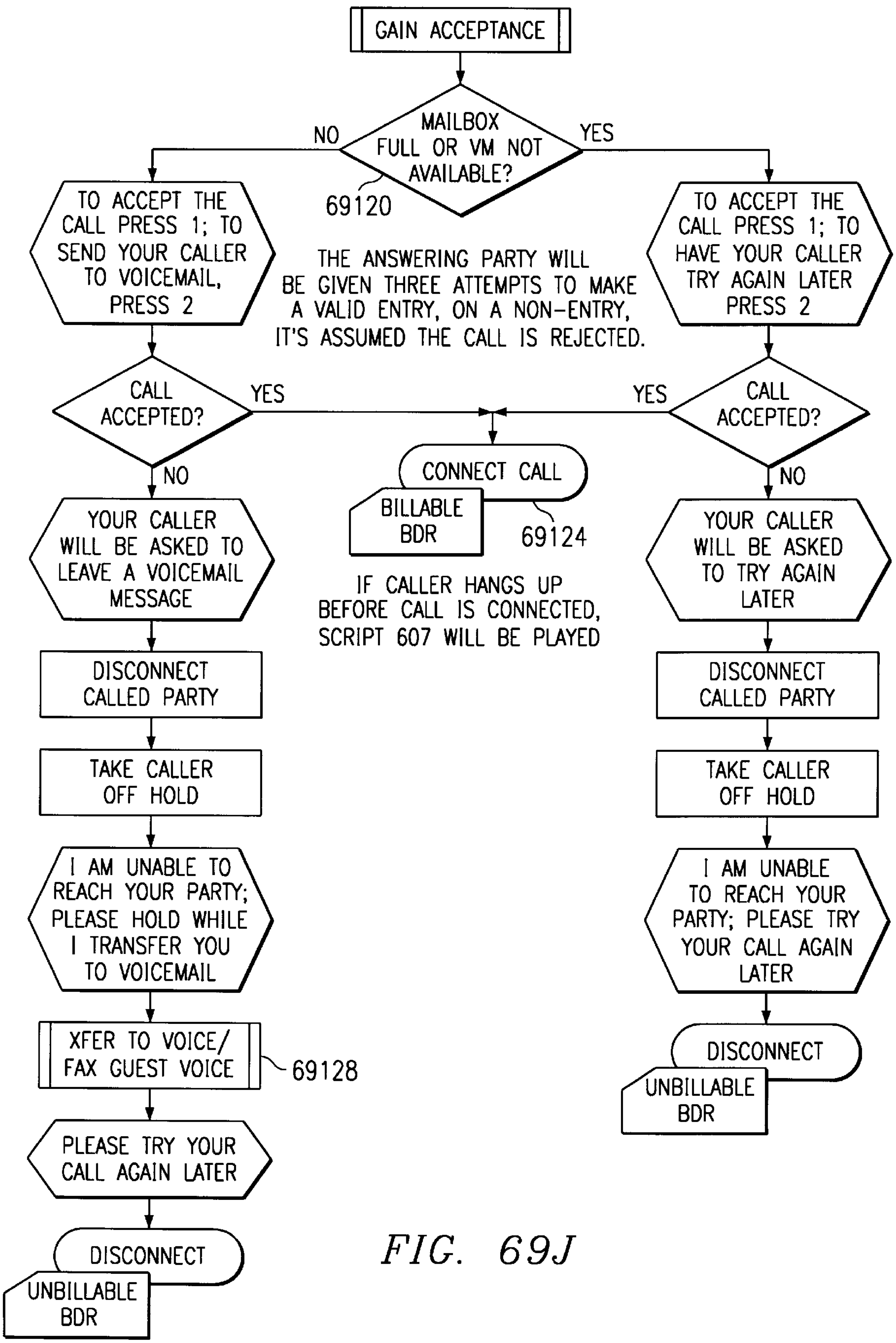

FIG. 69J depicts the ARU Gain Acceptance routine called from Step 69110. The ARU checks whether the subscriber has an available mailbox that is not full. If so, the ARU prompts the subscriber to indicate whether to take the call or to have the call directed to voice mail. If the mailbox is full or not available, the ARU prompts the subscriber whether to take the call or direct the caller to call back later. If the subscriber indicates that he will take the call (e.g., by pressing '1'), the ARU connects the call in Step 69124. Otherwise, the ARU acknowledges the refusal with an appropriate informational message (e.g., "Your caller will be asked to leave a voice mail message" or "Your caller will be asked to try again later," depending on the condition of the mailbox determined in Step 69120). The ARU disconnects the subscriber and takes the calling party off hold. The ARU plays a recording to the calling party indicating that it was unable to reach the subscriber and optionally prompting the caller to leave a voice mail message. If no mailbox is available, the caller is disconnected. If a non-full mailbox is available, the ARU in Step 69128 performs the ARU Xfer to Voice/Fax Guest Voice routine of FIG. 69K. Following this routine, the ARU plays a message asking the caller to call back later, and disconnects.

Figure 69K:
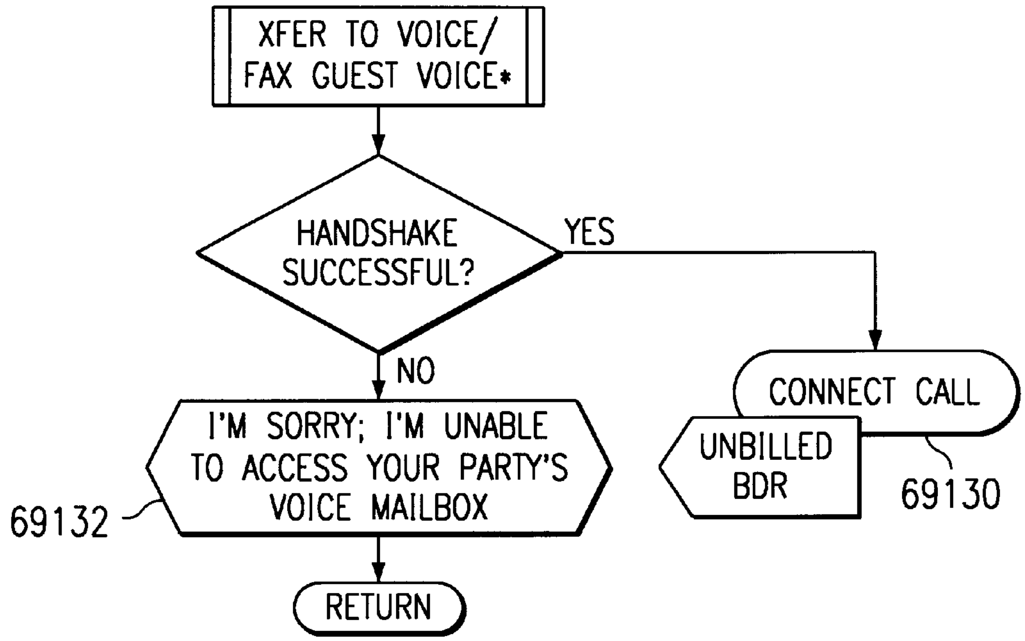
Figure 69L:
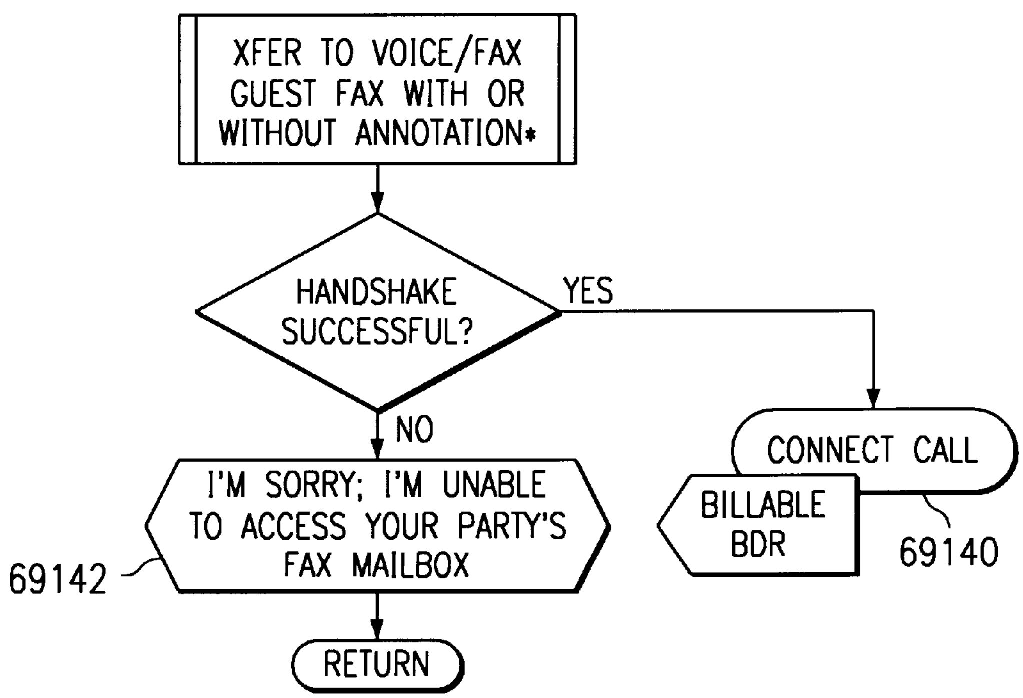

FIG. 69K depicts the ARU Xfer to Voice/Fax Guest Voice routine, which connects the caller to the VFP to leave a voice mail message. The ARU attempts to acquire a handshake with the VFP. If the handshake is successful, the ARU connects the call in Step 69130. If unsuccessful, the ARU plays an error message in Step 69132 and exits. FIG. 69L depicts the ARU Xfer to Voice/Fax Guest Fax w/or w/out Annotation routine, which connects the caller to the VFP to transmit a fax. The ARU attempts to acquire a handshake with the VFP. If the handshake is successful, the ARU connects the call in Step 69140. If unsuccessful, the ARU plays an error message in Step 69142 and exits. The routines of FIGS. 68K and 69L are similar except for the service requested of the VFP and the contents of the error message played to the caller.

Figure 69M:
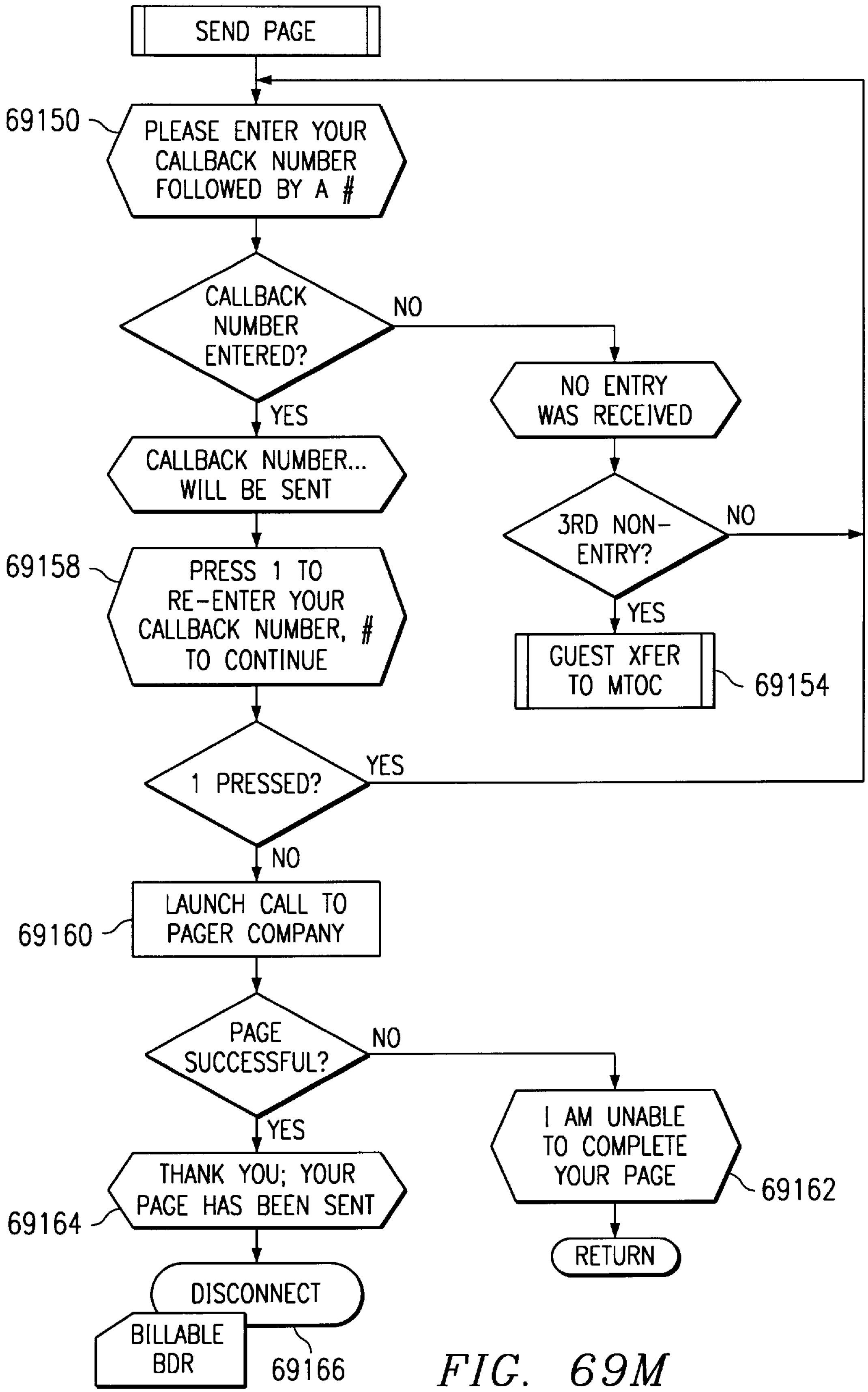

FIG. 69M depicts the ARU Send Page routine, which initiates a call to the subscriber's paging service. In Step 69150 the ARU prompts the caller to enter the telephone number that should be provided to the addressed pager. This prompt is repeated up to three times until a callback number is received. If no callback number after three prompts, the ARU performs the ARU Guest Xfer to MOTC routine, which transfers the caller to the operator. This permits a caller without DTMF-enabled equipment by which to enter a callback to provide the number to an operator who can enter it on his or her behalf. In Step 69158, the ARU plays a recording to the caller, enabling the caller to correct a number entered in error, or to confirm that the correct number has been entered. In Step 69160, the ARU places a call to the subscriber's paging service, using the data provided by the caller to indicate to the paging service the number to be displayed on the pager. If the call to the paging service is successful, the ARU plays a message indicating success in Step 69164 and disconnects in Step 69166. If the call to the paging service is unsuccessful, the ARU in Step 69162 plays a message indicating the failure and returns, whereupon the ARU may optionally present the caller with additional options.

Figure 69N:
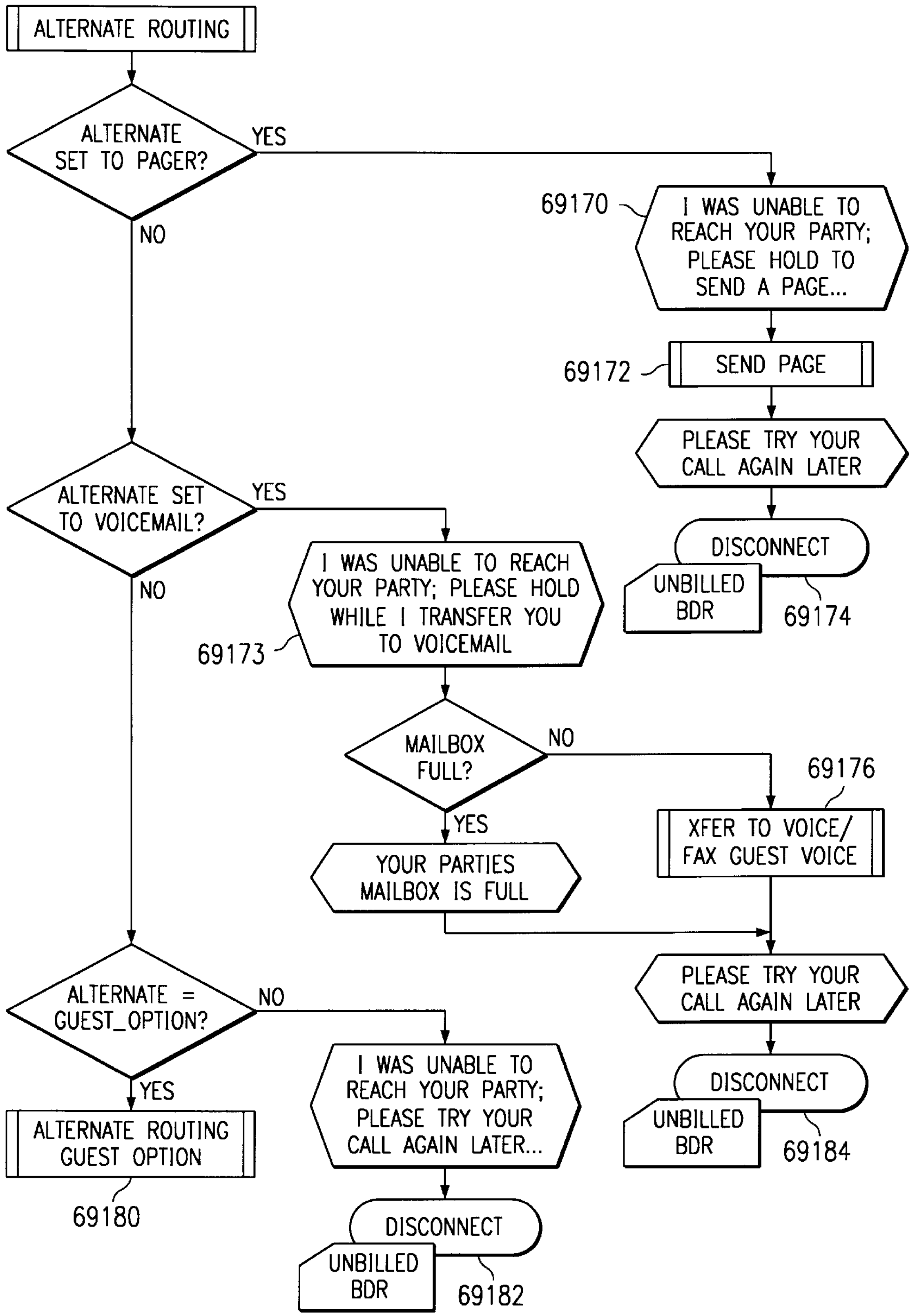
Figure 690:
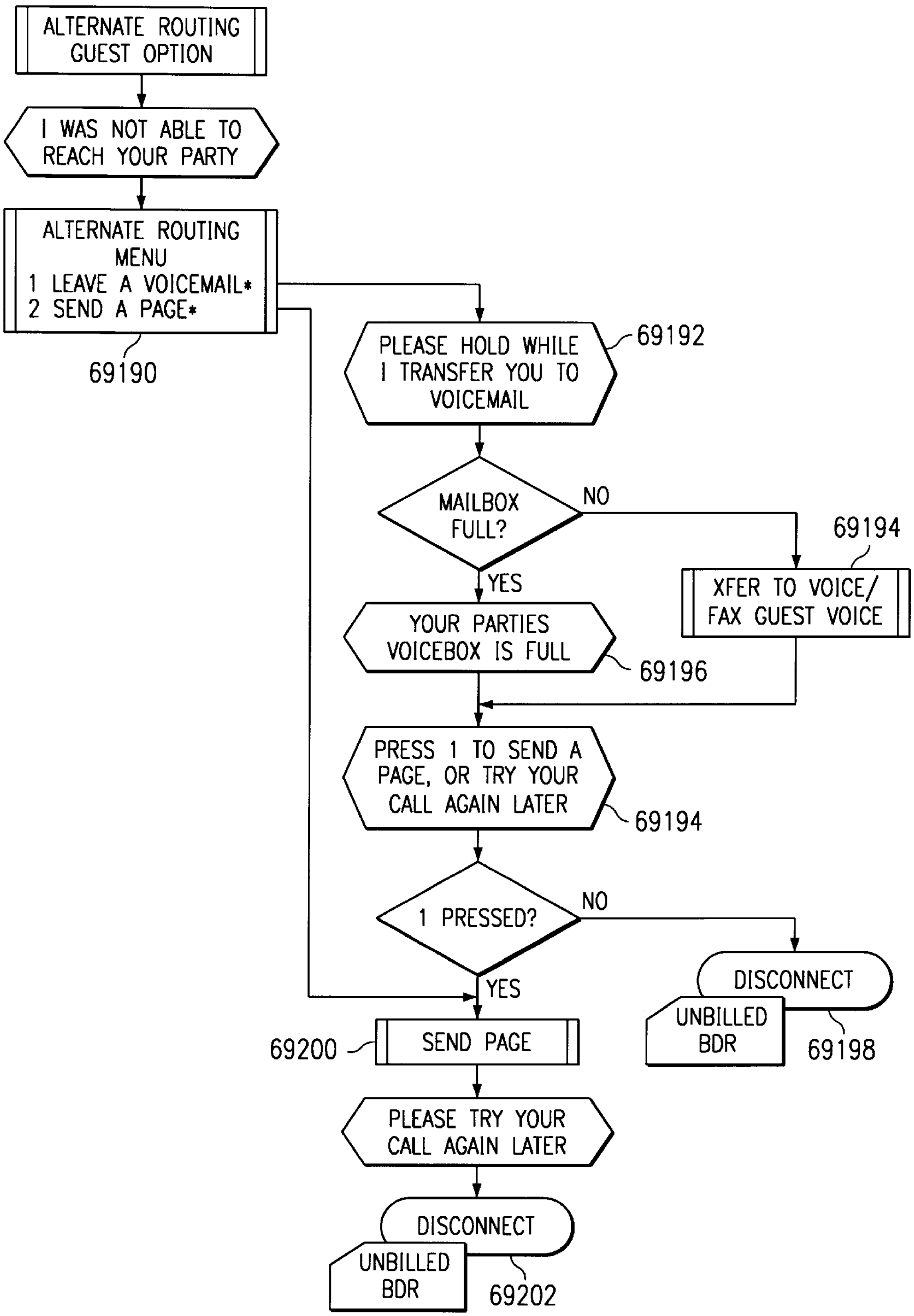

FIG. 69N depicts the ARU Alternate Routing routine. The ARU performs this routine to route calls that cannot be routed to the subscriber. If the subscriber has indicated that such unrouted calls are to be routed to his or her paging service, the ARU in Step 69170 plays a recording indicating that the caller may send a page. The ARU then in Step 69172 performs the ARU Send Page routine that has been described with respect to FIG. 69M. If the page was unsuccessful, the ARU plays a message indicating the failure and disconnects the caller in Step 69174. If the subscriber has indicated that unrouted calls are to be routed to voice mail, the ARU in Step 69173 plays a recording indicating that the caller may leave a voice mail message. If the subscriber's mailbox is not full, the ARU performs the ARU Xfer to Voice/Fax Guest Voice routine. If that routine returns, the attempt to leave the voice mail was unsuccessful, and the ARU plays a message indicating the failure and disconnects the caller in Step 69184. If the mailbox is full, the ARU plays a recording informing the caller of that condition and then disconnects the caller in Step 69184. If the subscriber has indicated a "guest option," the ARU in Step 69180 performs the ARU Alternate Routing Guest Option routine of FIG. 69O; otherwise the ARU disconnects the caller in Step 69182.

FIG. 69O depicts the ARU Alternate Routing Guest Option routine. This routine permits the guest to select whether to leave a voice mail or send a page is the subscriber is unreachable. The ARU in Step 69190 presents the caller with a menu of available routing options, here, '1' to leave a voice mail, and '2' to send a page. If the caller request to send a page, then the ARU in Step 69200 performs the ARU Send Page routine of FIG. 69M. If the Send Page routine fails, the ARU plays a diagnostic recording to the caller and disconnects the caller in Step 69202. If the caller requests to leave a voice mail, the ARU checks to see whether the subscriber mailbox is full. If the mailbox is not full, the ARU performs the ARU Xfer to Voice/Fax Guest Voice routine of FIG. 69K. If the routine returns, that indicates that it was not successful. In that case, or if the mailbox was full, the ARU plays a prerecorded message indicating that the voicemail could not be sent, and in Step 69195 prompts the caller to indicate whether he would like to send a page instead. If the caller selects an option to send a page, the ARU performs the ARU Send Page routing in Step 69200, as if the caller had initially selected that option. If the ARU Send Page routine is not successful, the ARU plays a diagnostic message and disconnects the caller in Step 69202.

Figure 69P:
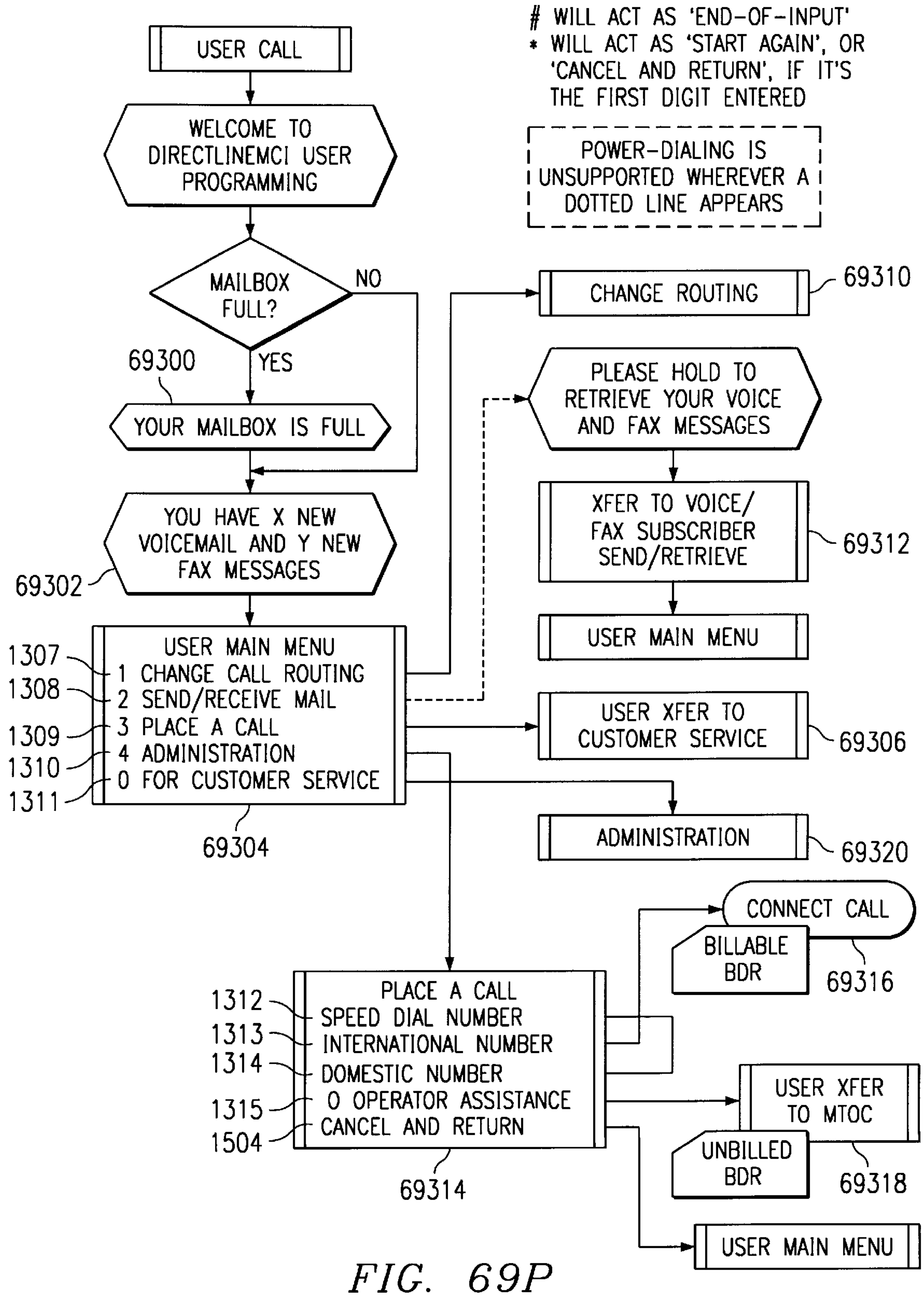

FIG. 69P depicts the main menu for the ARU User Call routine for processing a call from a subscriber. This routine is performed as Step 69052 in the ARU Guest Menu routine as depicted in FIG. 69D, if the caller enters a valid passcode. After playing an introductory welcome greeting, the ARU checks to see if the subscriber's mailbox is full. If the mailbox is full, the ARU plays a message informing the subscriber of this condition in Step 69300. After playing this warning, or if the mailbox is not full, the ARU in Step 69302 plays a status recording informing the subscriber of the number of new voicemail messages and fax messages stored for the subscriber.

In Step 69304, the ARU plays a menu for the subscriber. In the example shown, item '1' corresponds to a request to change call routing; item '2' corresponds to a request to send or retrieve mail; item '3' corresponds to a request to place a call; item '4' corresponds to a request for the administration menu; and item '0' corresponds to a request to be transferred to customer service.

If the subscriber selects the option to change call routing, the ARU in Step 69310 performs the ARU Change Routing routine, described below with respect to FIG. 69T. If the subscriber selects the option to send and retrieve mail, the ARU plays a prerecorded message asking the subscriber to hold and then in Step 69312 performs the ARU Xfer to Voice/Fax Subscriber Send/Retrieve routine, described with respect to FIG. 69Q, below. If the subscriber selects the option to place a call, the ARU in Step 69314 presents the subscriber with a menu querying the type of call desired to be placed. If the subscriber responds with an international or domestic telephone number, or with a previously specified speed-dial number corresponding to an international or domestic telephone number, the ARU in Step 69316 connects the call. If the subscriber requests operator assistance, the ARU in Step 69318 performs the ARU User Xfer to MOTC routine to transfer the subscriber to the operator. If the subscriber cancels the call request, the ARU returns to Step 69304. If, from the main menu presented in Step 69304, the ARU performs the Administration routine, described below with respect to FIG. 69P. If the subscriber requests customer service, the ARU performs the ARU User Xfer to Customer Service routine of FIG. 69AH, described below.

Figure 69Q:
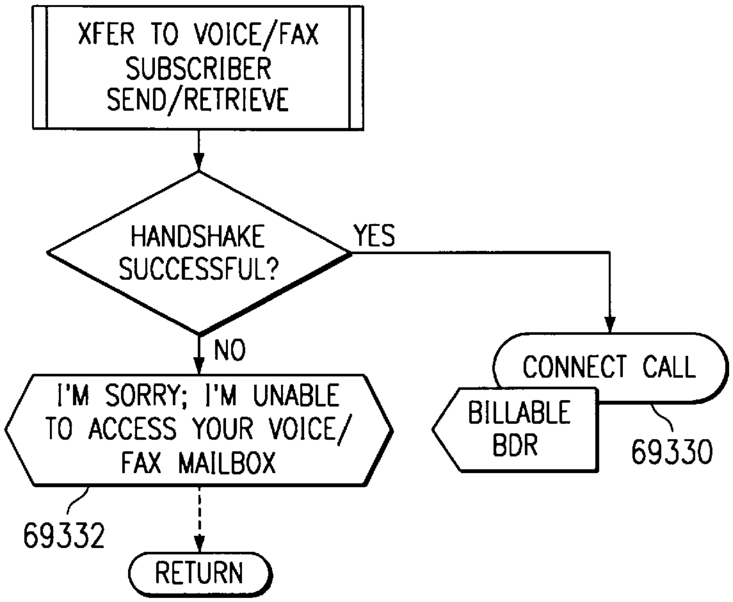

FIG. 69Q depicts the ARU Xfer to Voice/Fax Subscriber Send/Receive routine, which connects the subscriber to the VFP to send and retrieve voice mail messages. The ARU attempts to acquire a handshake with the VFP. If the handshake is successful, the ARU connects the call in Step 69330. If unsuccessful, the ARU plays an error message in Step 69332 and exits.

Figure 69R:
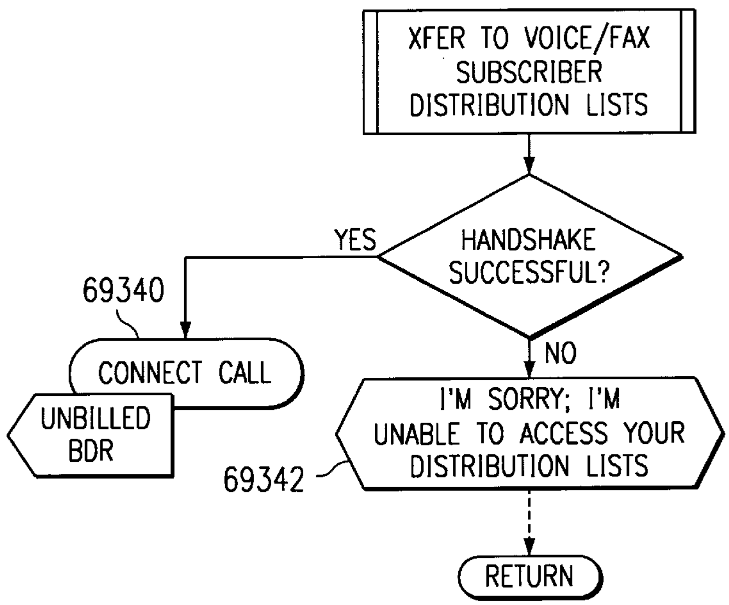

FIG. 69R depicts the ARU Xfer to Voice/Fax Subscriber Send/Receive routine, which connects the subscriber to the VFP to manage the subscriber's distribution lists. The ARU attempts to acquire a handshake with the VFP. If the handshake is successful, the ARU connects the call in Step 69340. If unsuccessful, the ARU plays an error message in Step 69342 and exits.

Figure 69S:
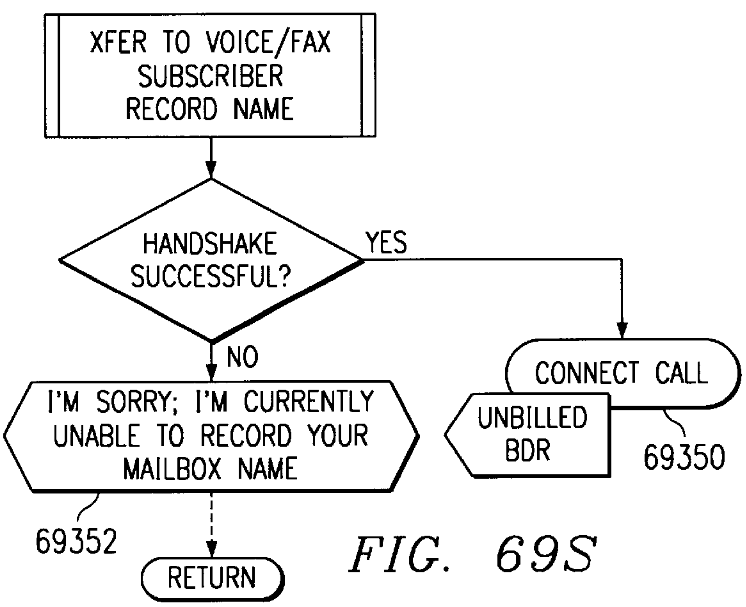

FIG. 69S depicts the ARU Xfer to Voice/Fax Subscriber Record Name routine, which connects the subscriber to the VFP to record the name that will be used in VFP-originated messages identifying the subscriber. The ARU attempts to acquire a handshake with the VFP. If the handshake is successful, the ARU connects the call in Step 69350. If unsuccessful, the ARU plays an error message in Step 69352 and exits. The routines of FIGS. 69Q, 69R, and 69S are similar except for the service requested of the VFP and the contents of the error message played to the subscriber.

Figure 69T:
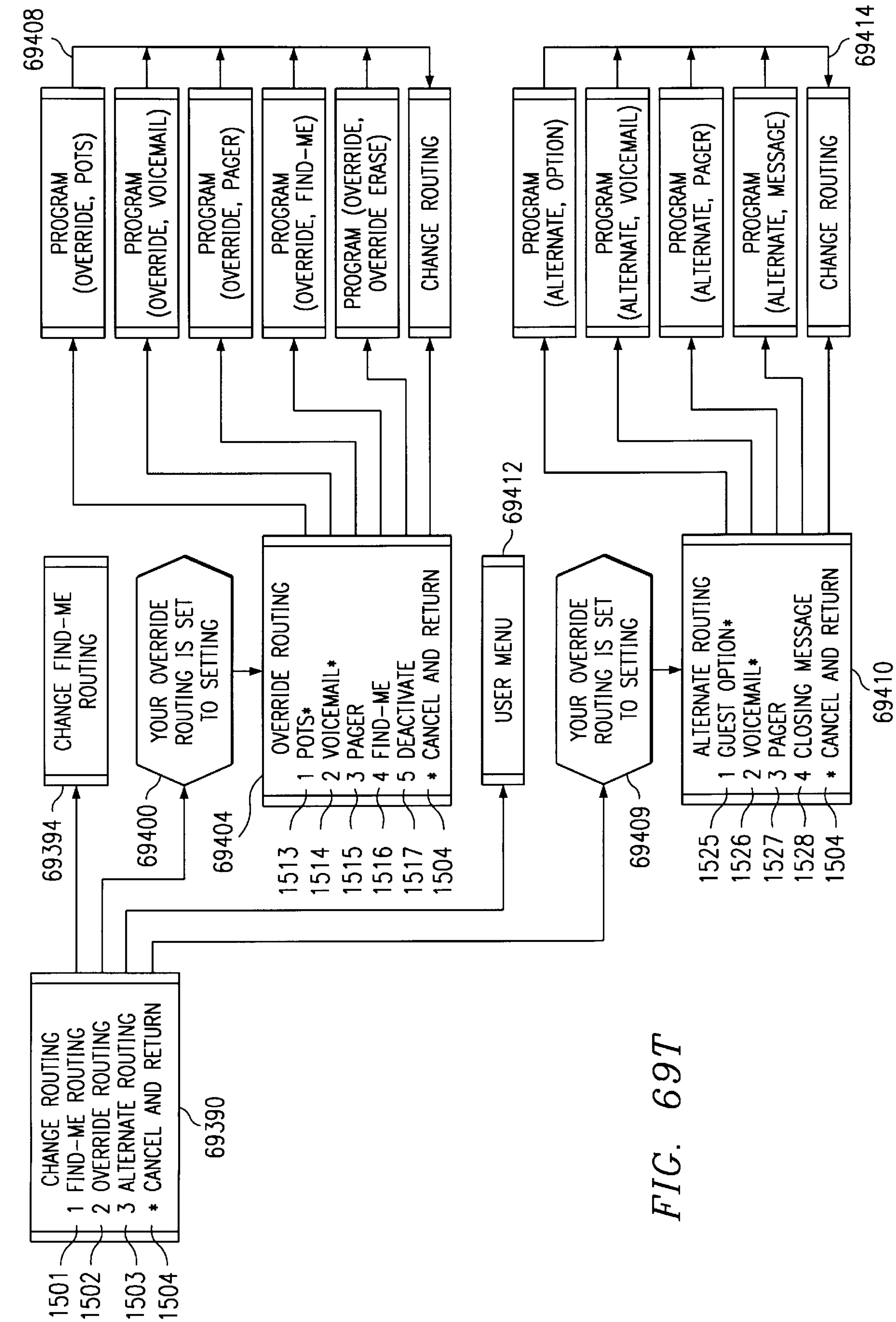

FIG. 69T depicts the ARU Change Routing routine, by which the subscriber modifies the routing options associated with his or her service. In Step 69390, the ARU presents a menu of options to the subscriber. If the subscriber selects the option for Find-Me routing, the ARU performs the ARU Change Find-Me Routing routine, described below with respect to FIG. 69U. If the subscriber selects the option for Override routing, the ARU in Step 69400 plays a message indicating the subscriber's present override routing setting and in Step 69404 presents the subscriber with a menu to select a new option. If the subscriber selects a change in option, the ARU performs, as Step 69408, the ARU Program routine to set the override option as specified, by passing the parameters of "override" and the selected option. If the subscriber selects the "Cancel" option, the ARU returns to Step 69390.

If, from the ARU Change Routing menu of Step 69390 the subscriber selects the "Alternate Routing" option, the ARU in Step 69409 plays a message indicating the subscriber's present alternate routing setting and in Step 69410 presents the subscriber with a menu to select a new option. If the subscriber selects a change in option, the ARU performs, as Step 69414, the ARU Program routine to set the alternate option as specified, by passing the parameters of "alternate" and the selected option. If the subscriber selects the "Cancel" option, the ARU returns to Step 69390.

If, from the Change Routing menu of Step 69390, the subscriber selects the "cancel and return" option, the ARU in Step 69412 returns to the user menu of FIG. 69P.

Figure 69U:
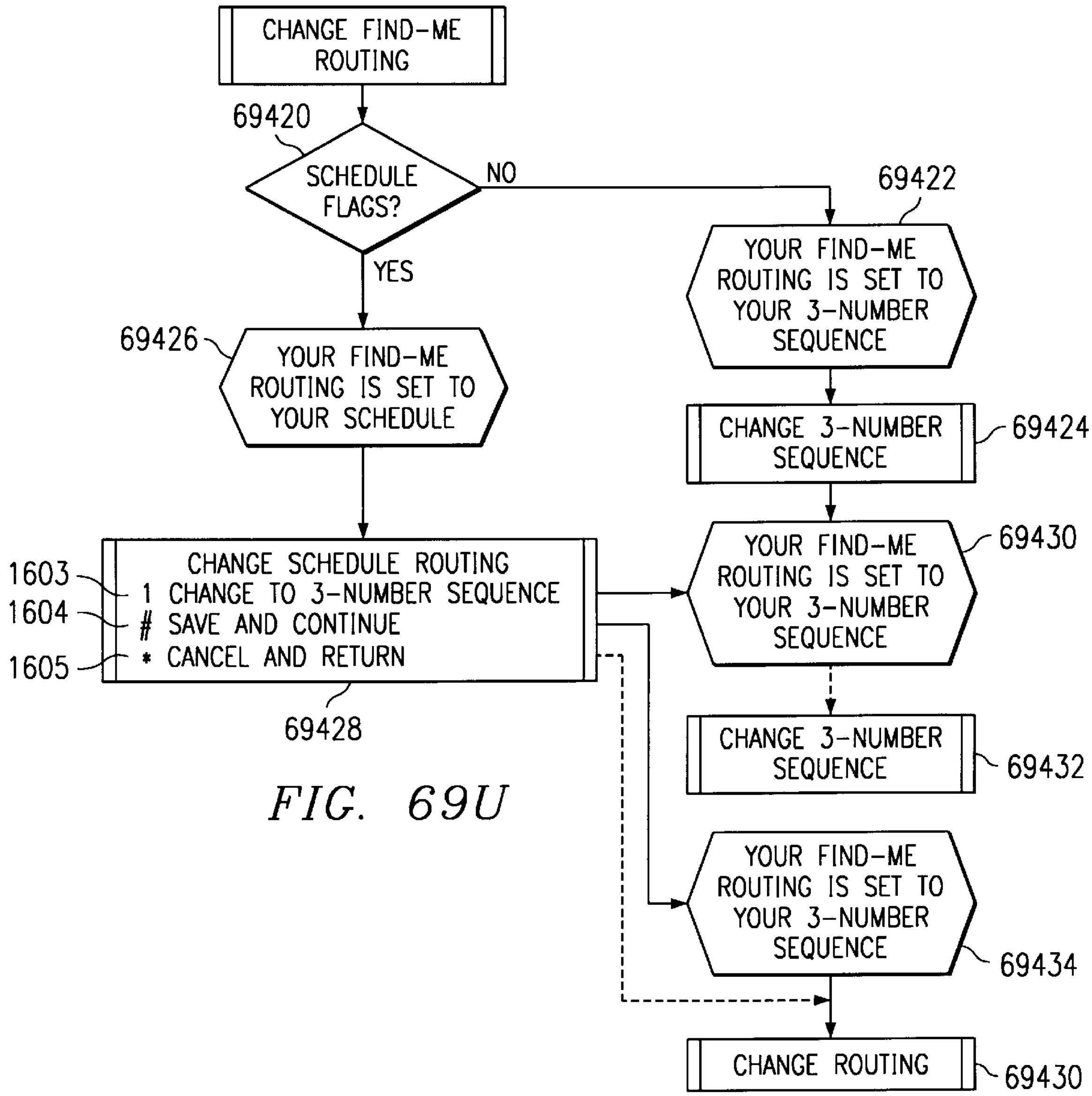

FIG. 69U depicts the ARU Change Find-Me Routing routine. In Step 69420, the ARU checks to see whether the subscriber's Find-Me routing is by schedule. If not, in Step 69422, the ARU plays a message indicating that the routing is set to attempt three successive telephone numbers, and in Step 69424 performs the ARU Change 3-Number Sequence routine, which is described below with respect to FIG. 69V. If the subscriber's Find-me routing is by schedule, the ARU in Step 69426 plays a message indicating that the subscriber's Find-Me routing is currently set by schedule, and in Step 69428 presents the subscriber with a Change Schedule Routing menu. If the subscriber selects the option to change to 3-Number routing, the ARU in Step 69430 plays a message that the routing is set to 3-Number sequence and in Step 69432 performs the ARU Change 3-number Sequence routine of FIG. 69V. If the subscriber selects the Save and Continue option, the ARU in Step 69434 plays a message that the subscriber's Find-Me routing is set to routing by schedule, and in Step 69436 performs the ARU Change Routing routine. Step 69436 and the ARU Change Routing routine are also performed if the subscriber selects the option to cancel and return.

Figure 69X:
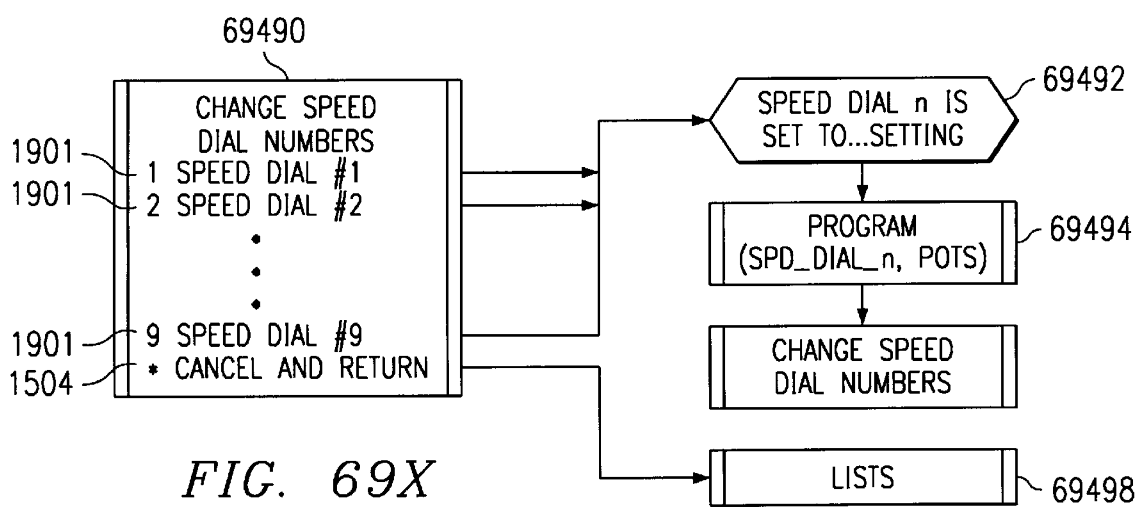
Figure 69V:
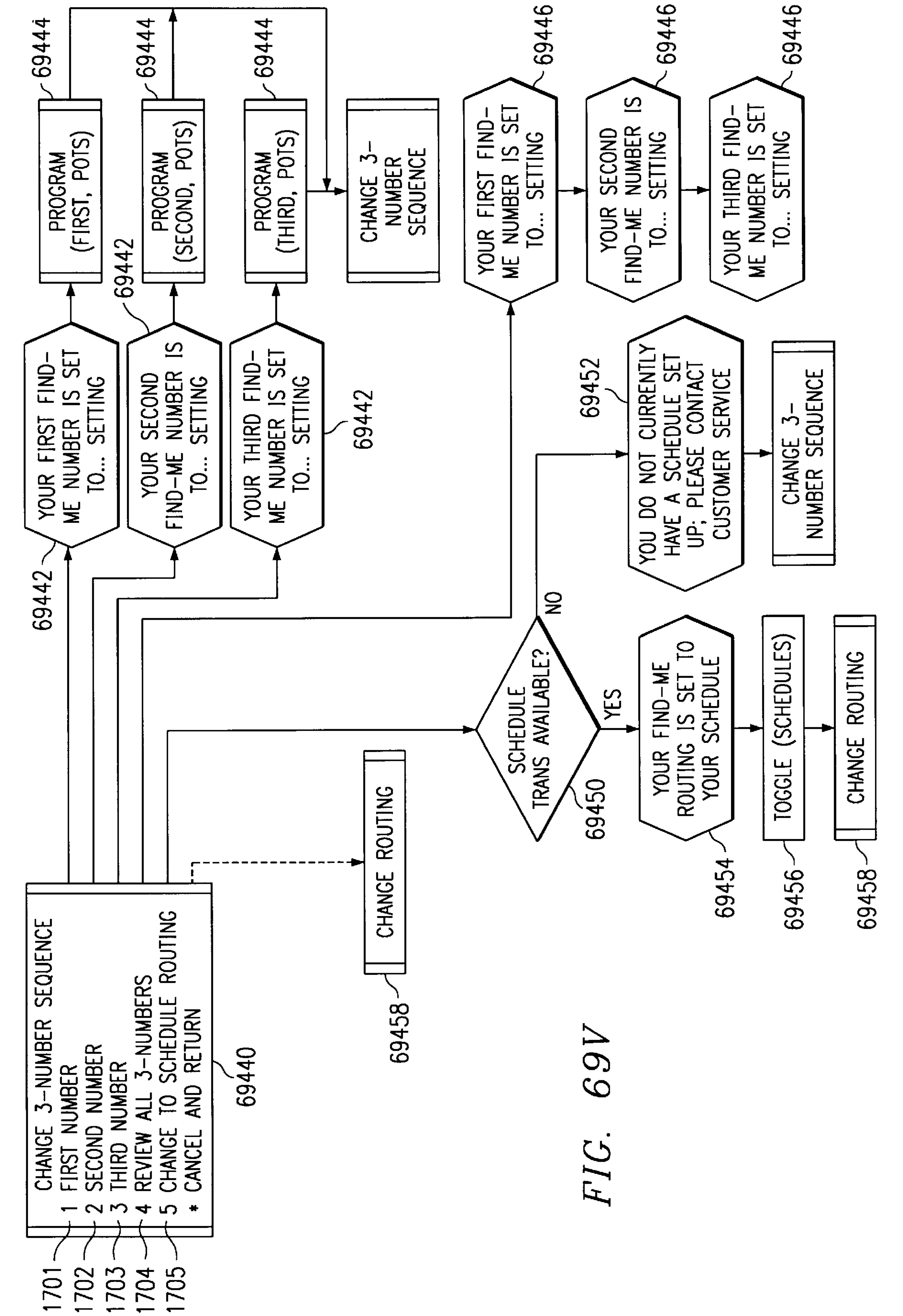

FIG. 69V depicts the ARU Change 3-Number Sequence routine, which permits the subscriber to alter contents and order of the three alternate numbers used by the ARU Find-Me routine of FIGS. 69E and 69F. In Step 69440, the ARU presents the subscriber with a menu of options. If the subscriber selects an option to change one of the three telephone numbers, the ARU in Step 69442 plays a recorded message indicating the current setting for the number, and then in Step 69444 performs the Program routine, passing to the routine a parameter identifying the number to be changed and indicating the POTS number to which it is to be changed. The ARU then returns to Step 69440. If the subscriber selects an option to review the current settings, the ARU in Step 69446 plays a series of messages disclosing the settings for each of the three numbers. The ARU then returns to Step 69440.

If the subscriber selects an option to change the schedule routing, the ARU in Step 69450 checks whether the subscriber is eligible for schedule routing. If so, in Step 69454 the ARU plays a message indicating that the Find-Me routing is set to the subscriber's schedule and in Step 69456 toggles the schedule setting to enable it. After toggling the setting, the ARU in Step 69450 returns to the ARU Change Routing routine of FIG. 69T. If schedule routing is not an option for this subscriber, the ARU plays a diagnostic message indicating that schedule routing is not available and that the subscriber may contact Customer Service to obtain the option. The ARU then returns to Step 69440.

If the subscriber selects an option indicating cancel and return, the ARU returns to the ARU Change Routing routine of FIG. 69T.

Figure 69W:
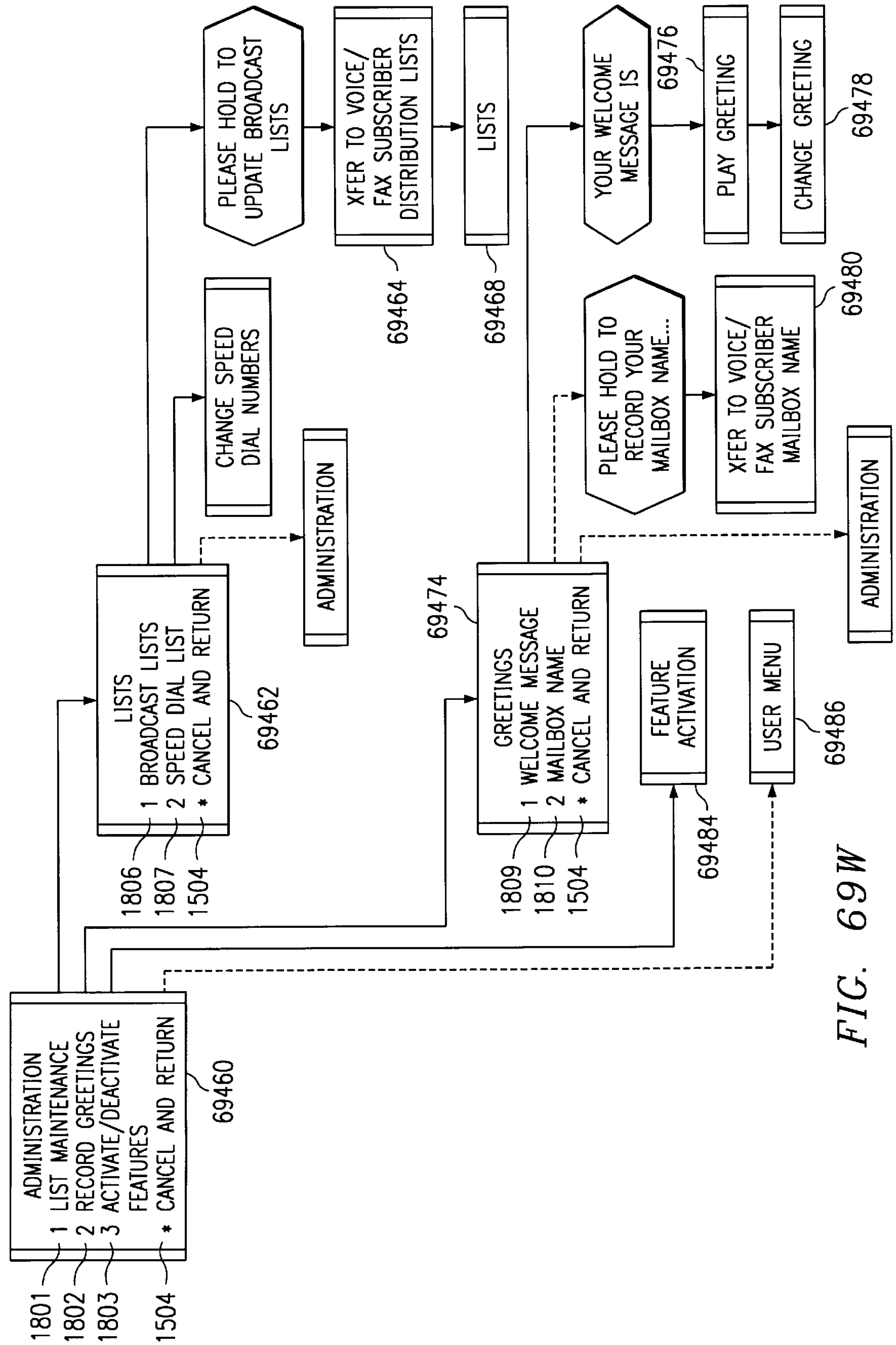

FIG. 69W depicts the ARU Administration routine. In Step 69460, the ARU provides the subscriber with a menu of options. In the example shown, item '1' corresponds to a request to maintain the subscriber's broadcast or speed-dial lists; item '2' corresponds to a request to record a greeting; and item '3' corresponds to a request to activate or deactivate features. If the subscriber requests list maintenance the ARU, in Step 69462 presents the subscriber with a menu of options. If the subscriber selects an option to maintain his or her broadcast lists, the ARU in Step 69464 performs the ARU Xfer to Voice/Fax Subscriber Distribution Lists routine of FIG. 69R. After performing that routine, the ARU in Step 69468 performs the ARU Lists routine of FIG. 69W. If the subscriber selects the option to maintain the speed-dial list, the ARU in Step 69470 performs the ARU Change Speed-Dial Numbers routine of FIG. 69X. If the subscriber selects an option to cancel and return, the ARU returns to Step 69460.

If, in response to the menu presented in Step 69460, the subscriber selects an option to record greetings, the ARU in Step 69474 presents the subscriber with a menu of options. In the example depicted, item '1' corresponds to a request to modify the subscriber's welcome message; item '2' corresponds to a request to modify the name associated with subscriber's mailbox. If the subscriber selects the option to modify the welcome message, the ARU in Step 69476 performs the ARU Play Greeting routine of FIG. 69B to play the current welcome message, and in Step 69478 performs the ARU Change Greeting routine of FIG. 69Y. If the subscriber selects an option to modify the mailbox name, the ARU plays a message requesting the subscriber to hold and in Step 69480 perform the ARU Xfer to Voice/Fax Subscriber Mailbox Name routine, described previously with respect to FIG. 69S. After performing this routine, the ARU returns to Step 69474. If the subscriber, in response to the menu presented in Step 69474, indicates that the request to modify greetings should be canceled (e.g., by pressing the asterisk button), the ARU returns to Step 69460.

If, in response to the menu presented in Step 69460, the subscriber selects an option to activate or deactivate features, the ARU in Step 69484 performs the ARU Feature Activation routine, which is described below with respect to FIG. 69Z. If the subscriber instead indicates that the request to modify greetings should be canceled (e.g., by pressing the asterisk button), the ARU returns to the ARU User Menu routine, which is depicted as Step 69304 in FIG. 69P.

FIG. 69X depicts the ARU Change Speed Dial Numbers routine. In Step 69490, the ARU provides the subscriber with a menu of options corresponding to particular speed dial numbers. For example, item '1' corresponds to the first speed dial number, item '2' corresponds to the second speed-dial number, etc., through item '9', which corresponds to the ninth speed-dial number. When the subscriber selects one of these options, the ARU in Step 69492 plays a message indicating the current setting for the selected speed-dial number. In Step 69494, the ARU performs the ARU Program routine, described below with respect to FIG. 69AA, specifying parameters of "Spd_Dial_n" to indicate the speed dial number to being programmed (where n is replaced by a digit corresponding to the number of the addressed speed dial button) and the POTS number to which the specified speed dial number is to be set. The ARU then returns to Step 69490. If the subscriber selects an option (indicated in the example as an asterisk) to cancel the Change Speed Dial Numbers request, the ARU returns to Step 69462 as depicted in FIG. 69W.

Figure 69Y:
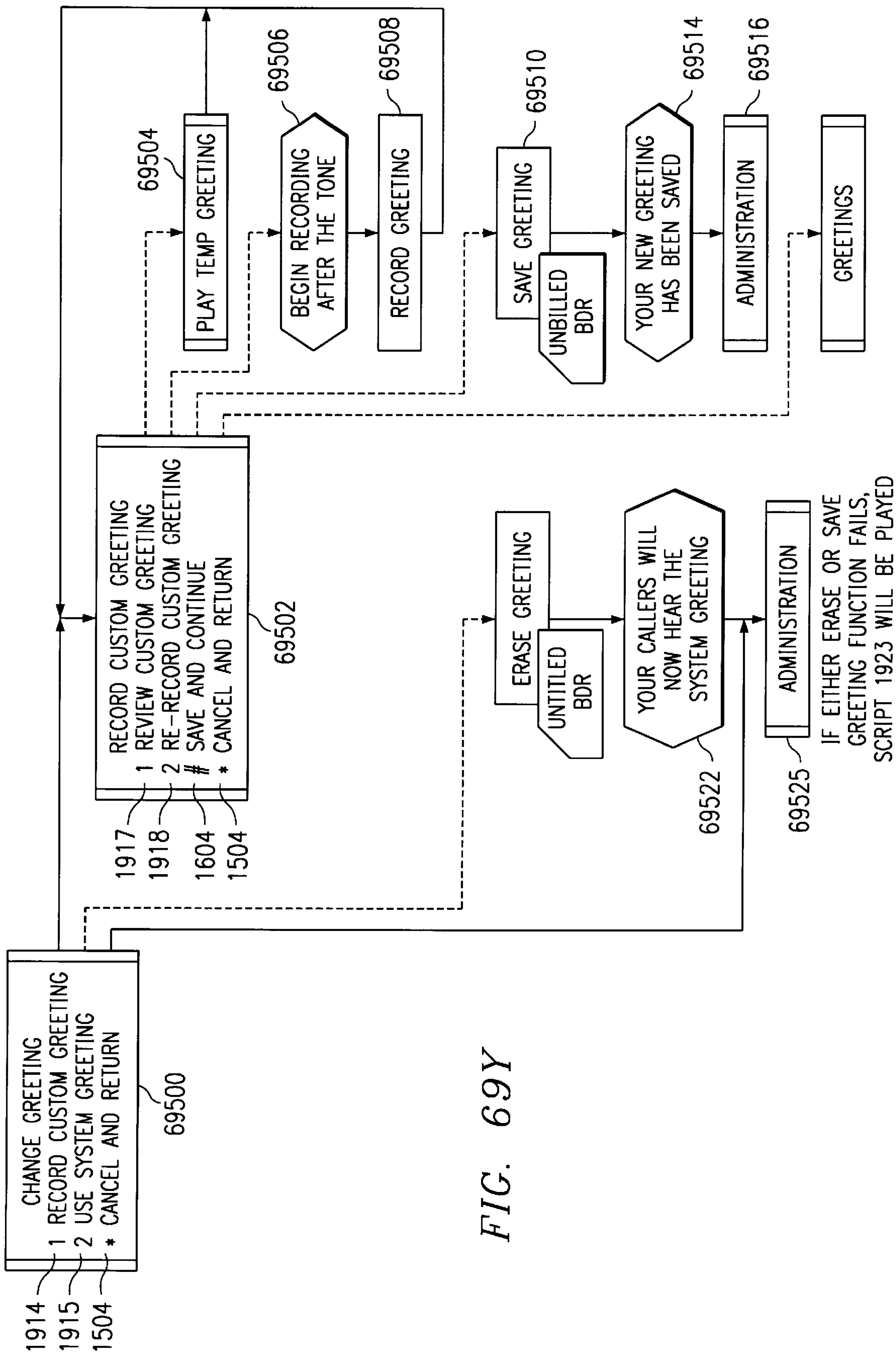

FIG. 69Y depicts the ARU Change Greeting routine. In Step 69500, the ARU presents a menu to the subscriber corresponding to available options. For example, item '1' corresponds to a request to record a custom greeting, and item '2' corresponds to a request to use the standard system greeting. If the subscriber selects the option to record a custom greeting, the ARU in Step 69502 presents a menu of options related to the customized greetings. In the example shown, item '1' corresponds to a request to review the present contents of the subscriber's custom greeting and item '2' corresponds to a request to replace the currently recorded custom greeting with a new recorded custom greeting. The octothorp ('#') corresponds to a request to save the contents of the greetings, and the asterisk ('*') corresponds to a request to cancel and return.

If the subscriber selects an option to review the present contents of the subscriber's custom greeting, the ARU in Step 69504 performs the ARU Play Temp Greeting routine, previously described with respect to FIG. 69C, and returns to Step 69502. If the subscriber selects an option to replace the currently recorded custom greeting with a new recorded custom greeting, the ARU in Step 69506 prompts the subscriber to begin recording the new greeting and in Step 69506 records the new greeting. After recording the greeting, the ARU returns to Step 69502. After recording a greeting, a subscriber may request that the newly recorded greeting be saved. If the subscriber selects saving the greeting, the ARU in Step 69510 saves the recorded greeting to disk, overwriting the previous contents of the greeting file, and in Step 69514 plays a message indicating that the new greeting has been stored. After storing the greeting, the ARU performs the ARU Administration routine previously described with respect to FIG. 69W. If, in response to the menu presented by the ARU in Step 69502, the subscriber cancels the request to modify greetings, the ARU in Step 69518 performs the ARU Greetings routine, previously described with respect to FIG. 69W.

If, in response to the menu presented in Step 69500, the subscriber selects an option to use the system greeting (i.e., a default greeting that does not identify the subscriber), then the ARU in Step 69520 erases any previously-recorded greeting and in Step 69522 plays a prerecorded message that callers will now hear the system greeting instead of a personalized greeting. The ARU then returns in Step 69525 to the ARU Administration routine, previously described with respect to FIG. 69W. The ARU also returns in Step 69525 if the subscriber selects an option to cancel and return.

Figure 69Z:
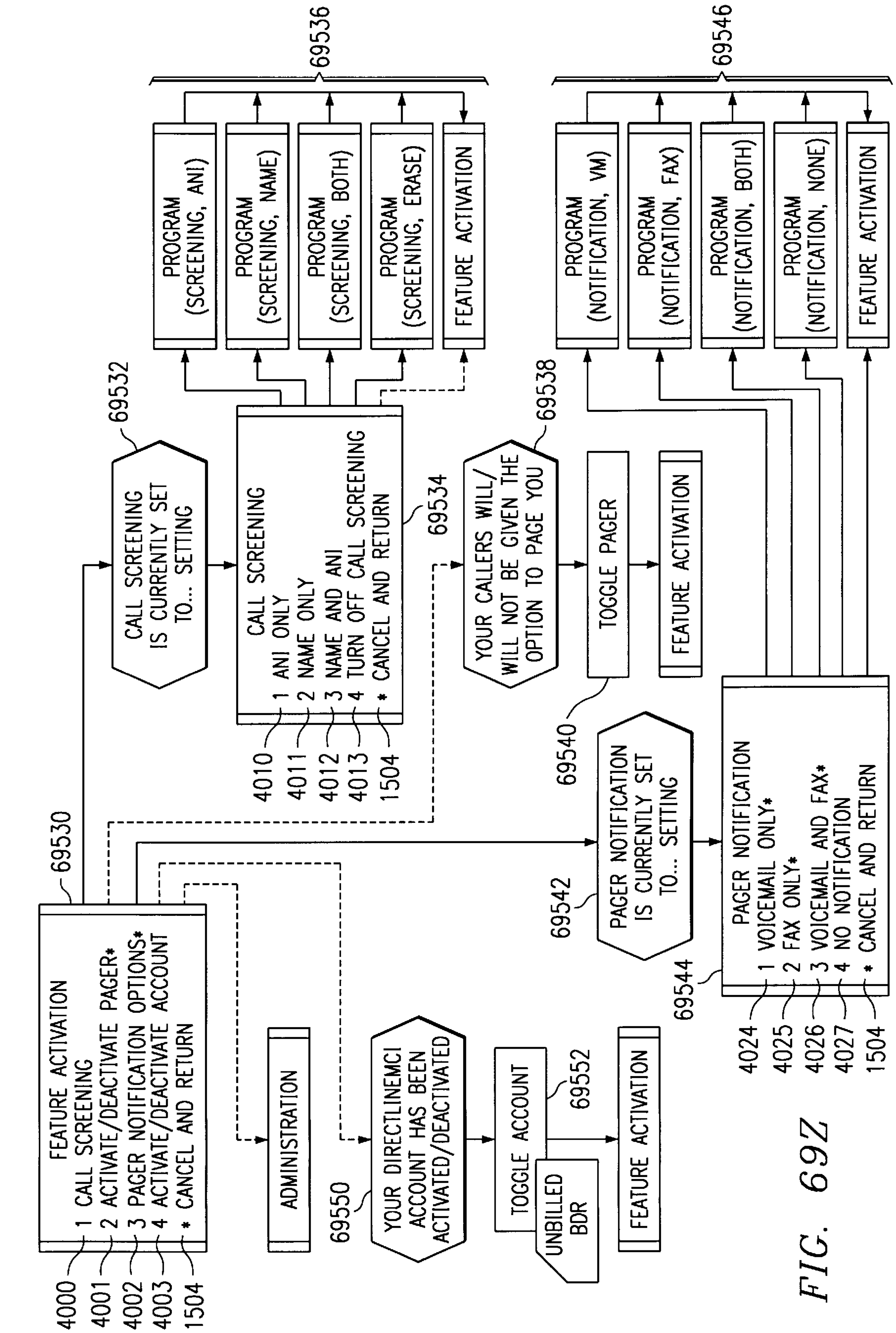
Figure 69A:
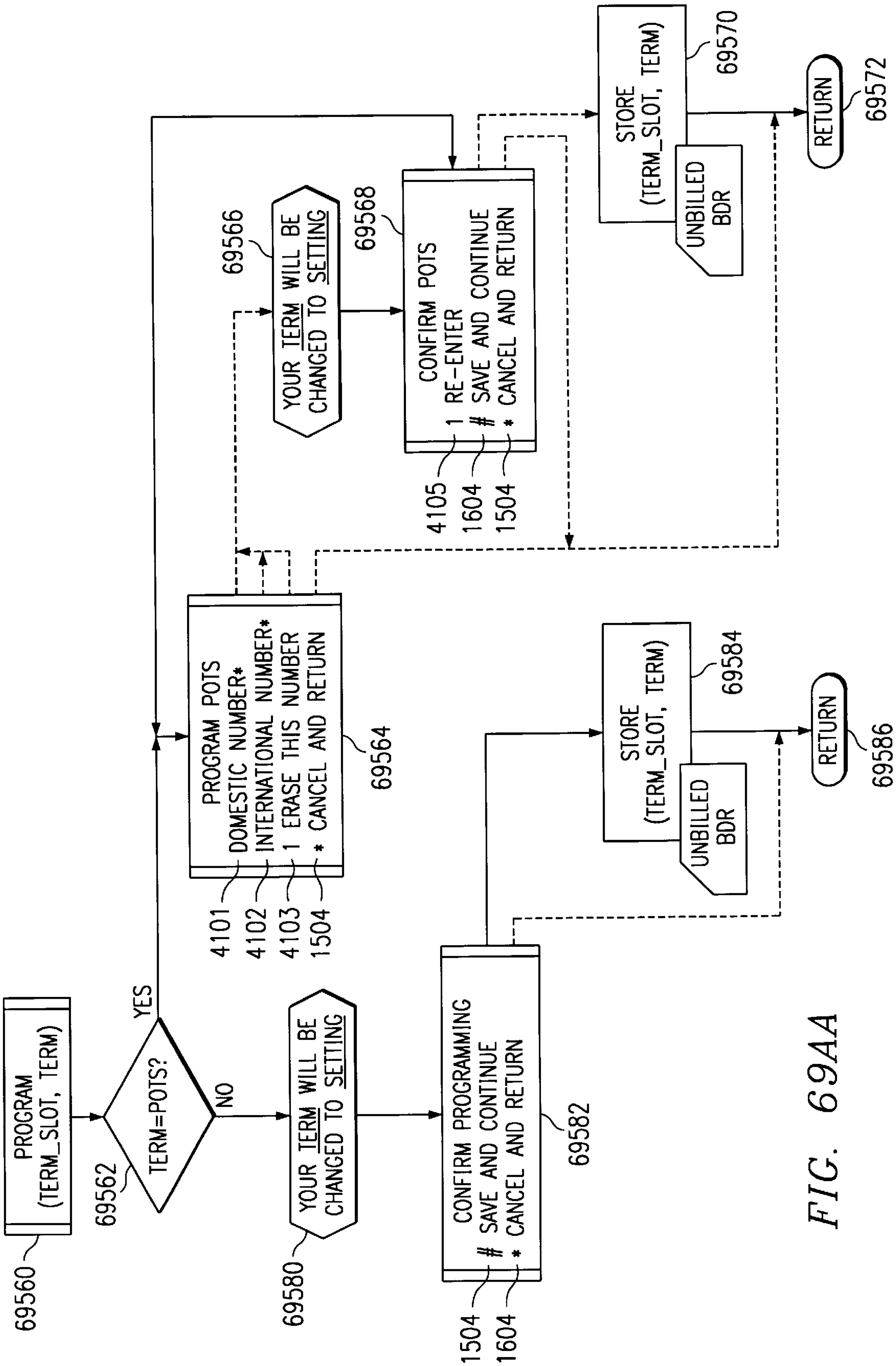
Figure 69A:
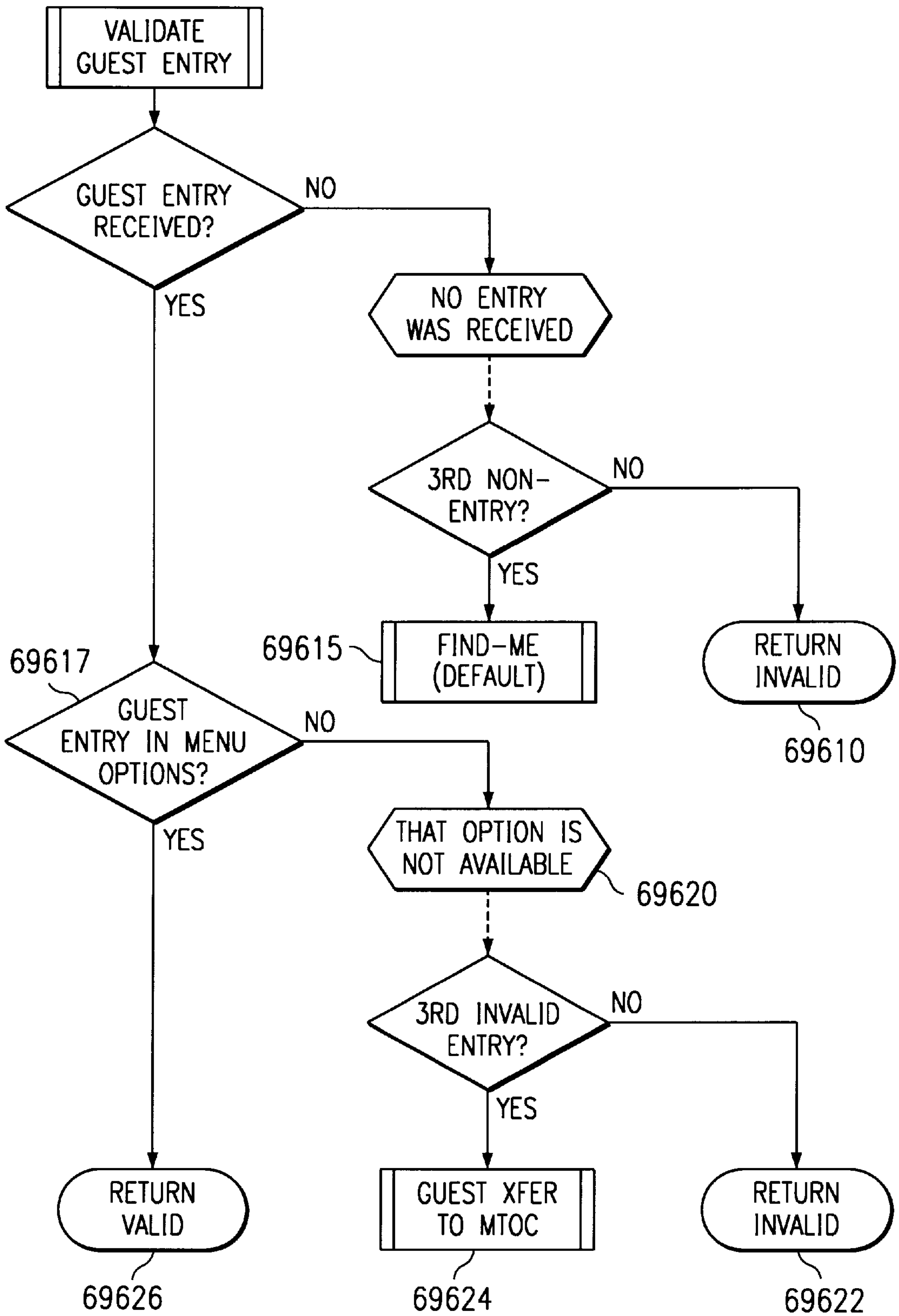
Figure 69A:
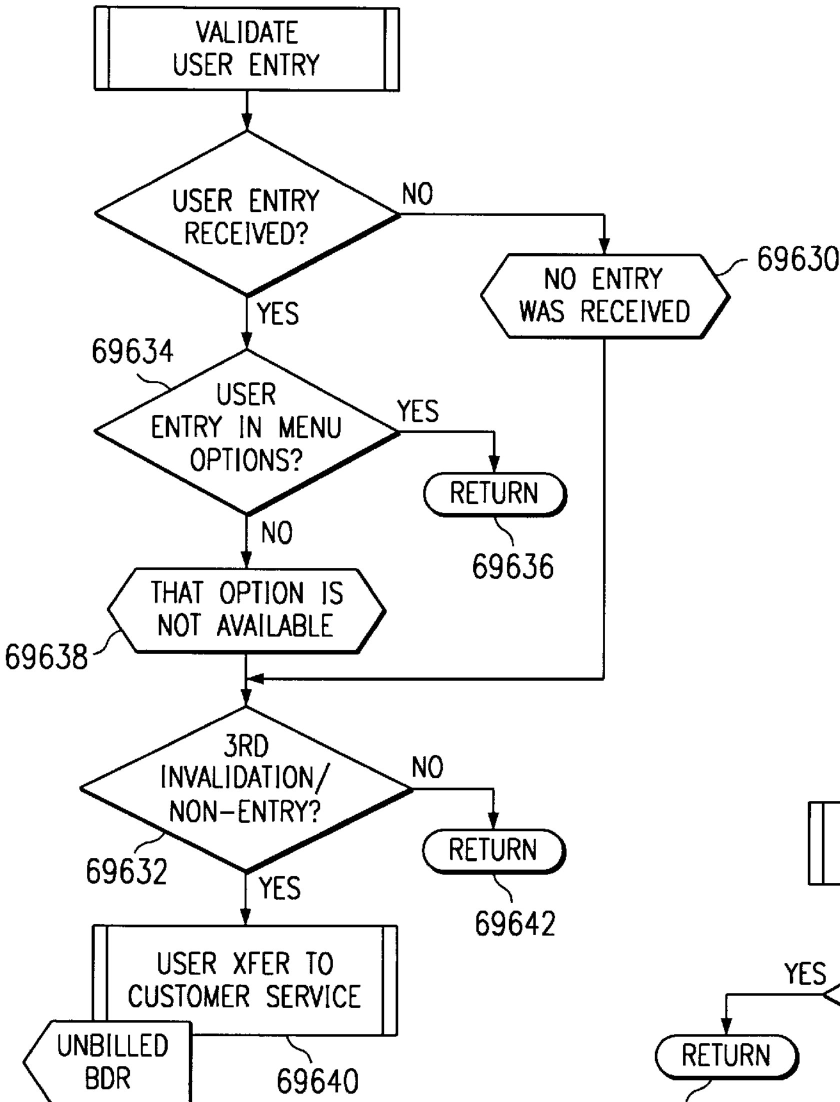
Figure 69A:
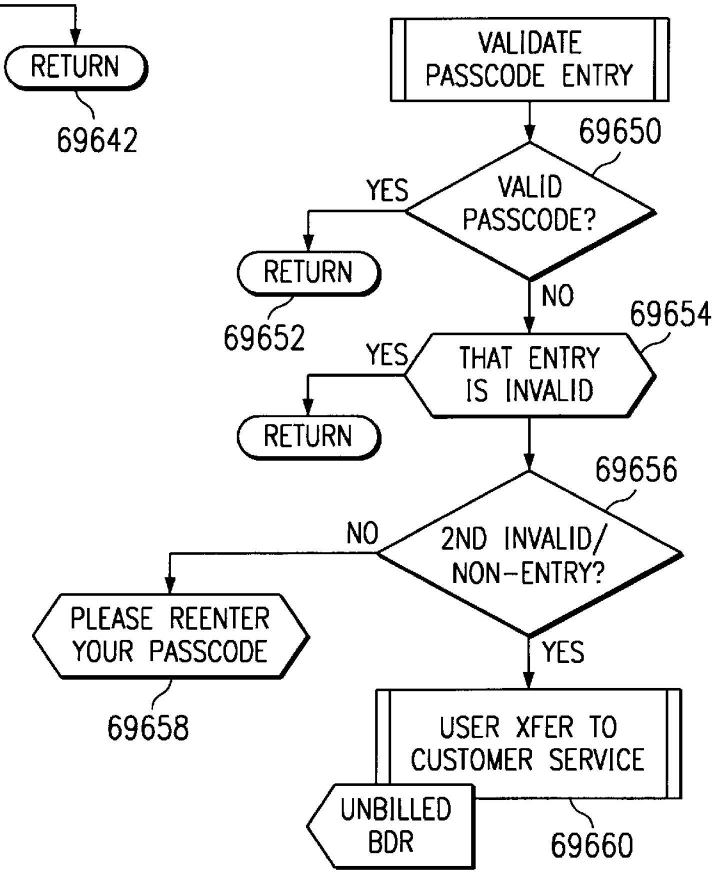
Figure 69A:
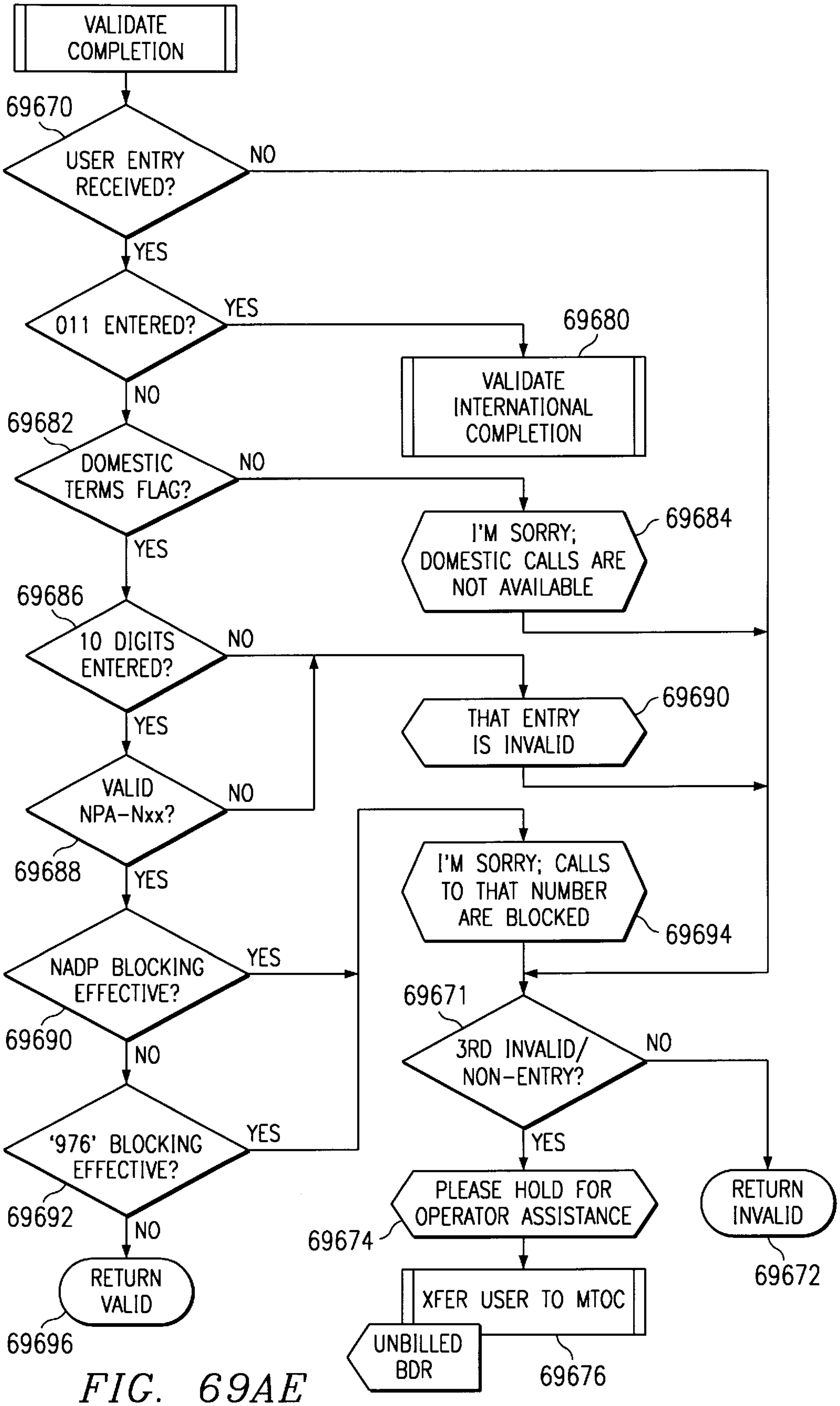
Figure 69A:
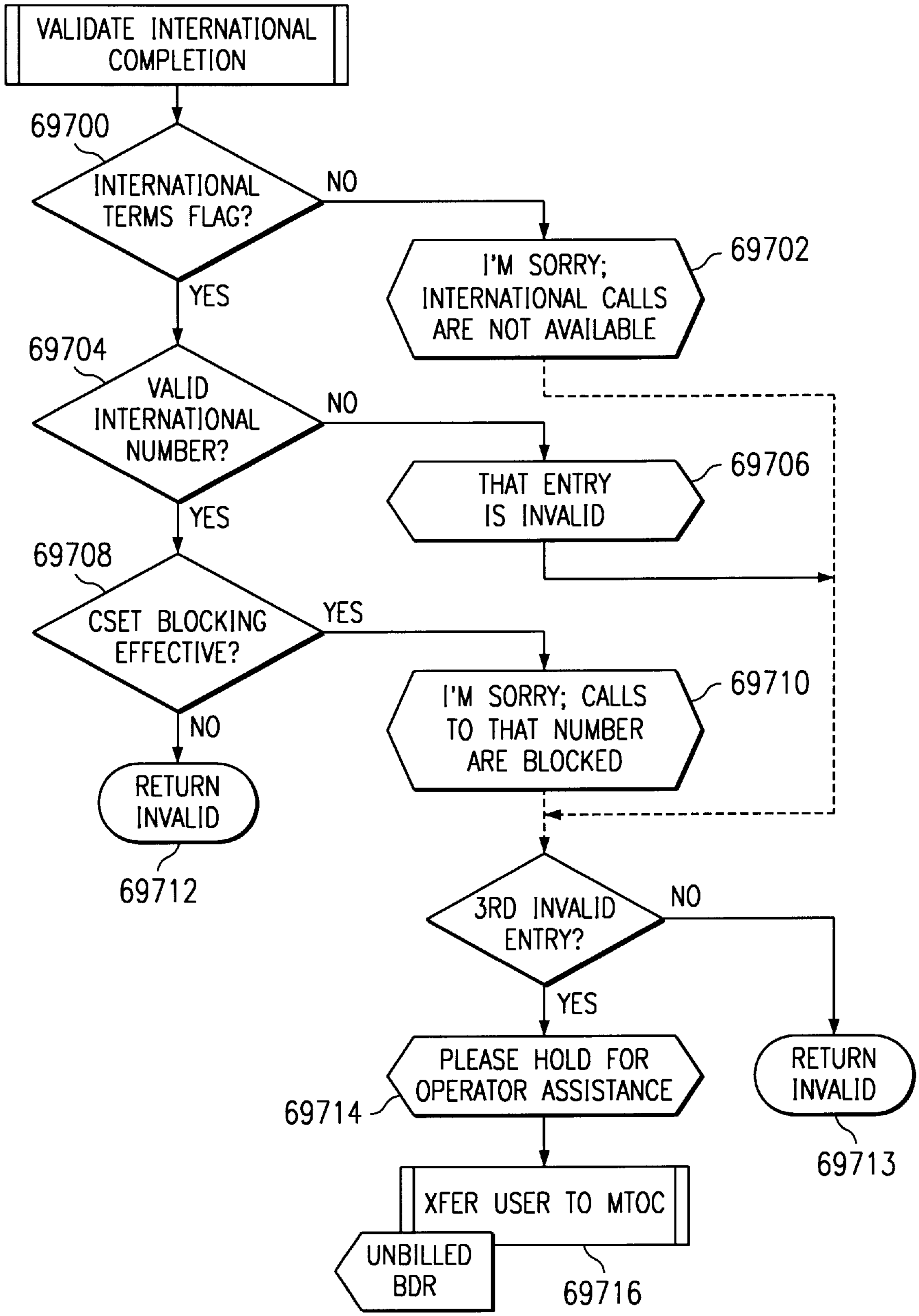
Figure 69A:
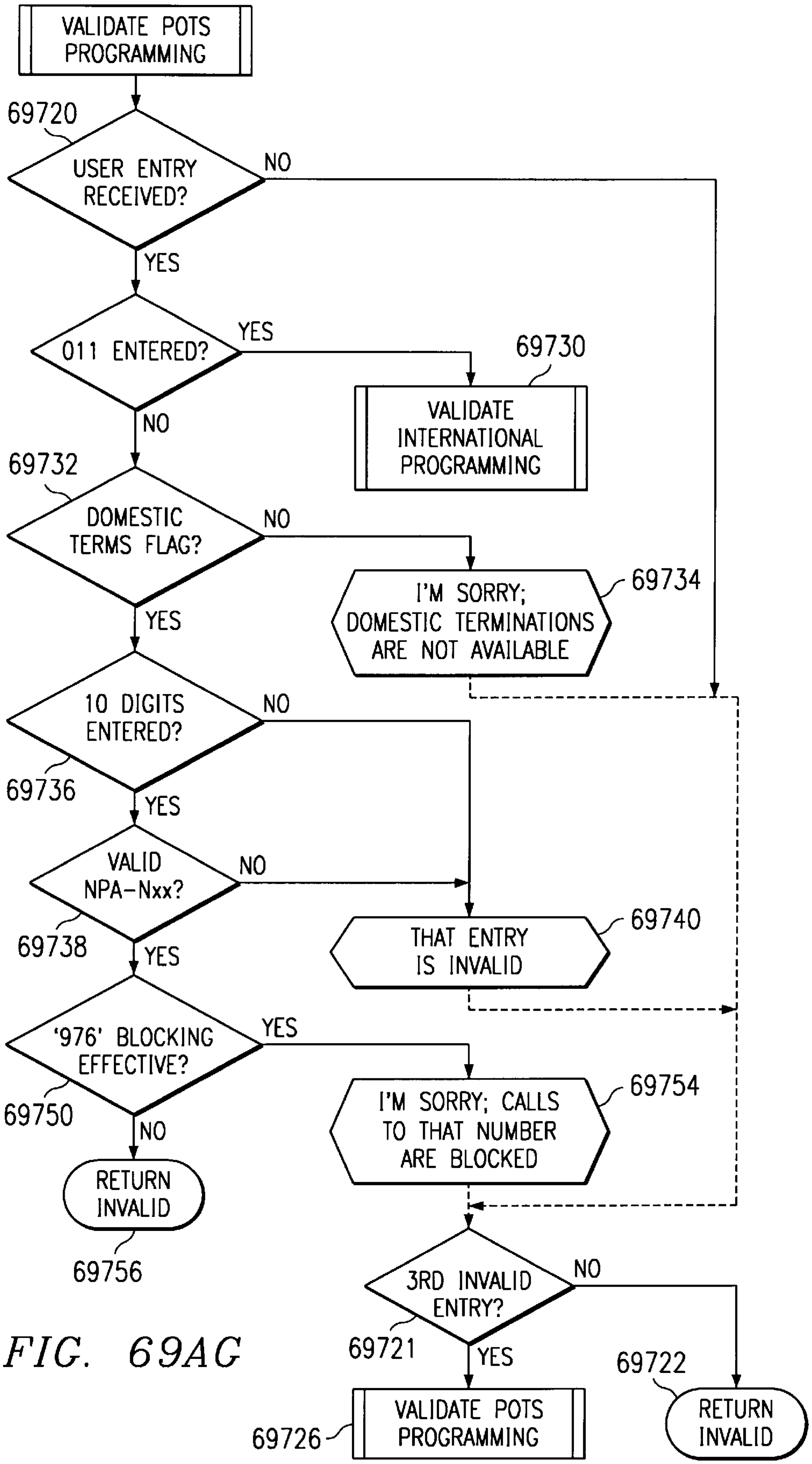
Figure 69A:
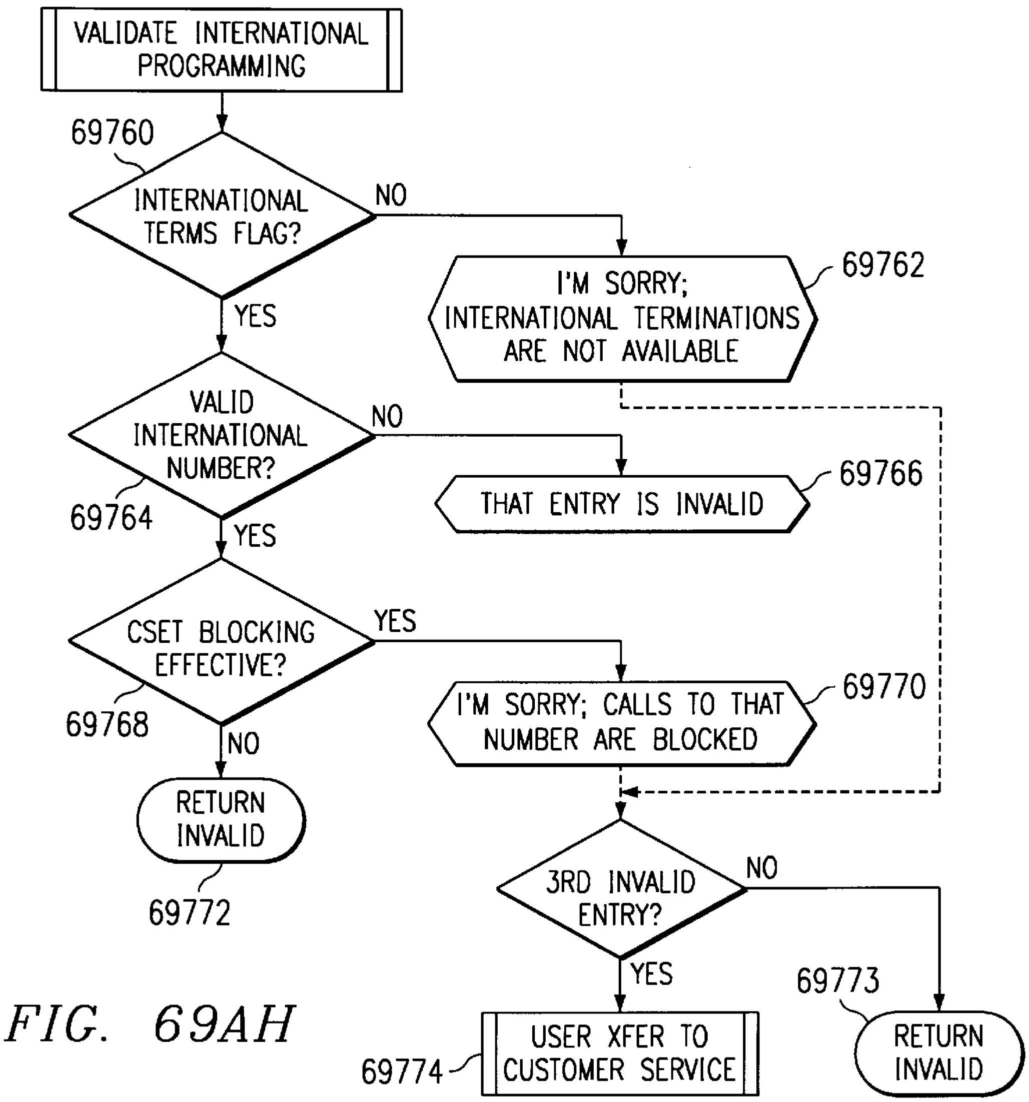
Figure 69A:
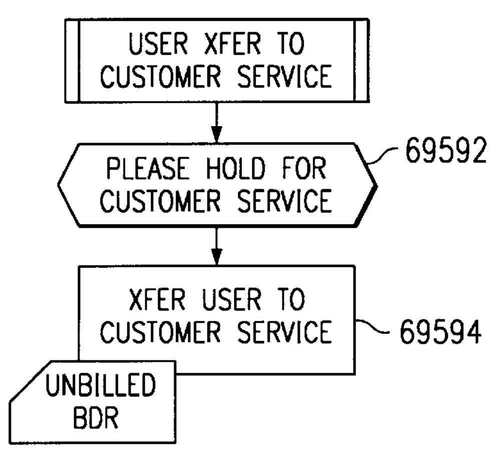

FIG. 69Z depicts the ARU Feature Activation routine. In Step 69530, the ARU presents a menu to the subscriber corresponding to available options. For example, item '1' corresponds to a request to set the Call Screening option; item '2' corresponds to a request to activate or deactivate a pager recipient; option '3' corresponds to an request to set pager notification; and option '4' corresponds to a request to activate or deactivate an account. If the subscriber selects the call screening option, the ARU in Step 69532 plays a recording indicating the current setting of the call screening option. In Step 69534, the ARU presents the subscriber with a list of options relating to call screening. In this example, item '1' corresponds to a request to select screening by ANI (telephone number) only; item '2' corresponds to a request to select screening by name only; item '3' corresponds to select screening by both ANI and name; and item '4' corresponds to a request to turn call screening off completely. If the subscriber selects one of these options, the ARU in Step 69536 performs the ARU Program routine, described below with respect to FIG. 69AA, passing it a first parameter to indicate that the screening option is desired to be altered, and a second parameter indicating the value to which the option should be set. Following Step 69536, the ARU returns to Step 69530. Likewise, if the subscriber selects a cancel and return option in Step 69534, the ARU returns to Step 69530.

If the subscriber selects an option to activate or deactivate a pager, the ARU in Step 69538 plays a recorded message indicating the new status of the pager notification option. In Step 69540, the ARU toggles the current status of the pager option (i.e., enables the option if it is currently disabled, or disables the option on if it is currently enabled). After the toggle, the ARU returns to Step 69530.

If the subscriber selects the pager notification option, the ARU in Step 69542 plays a recording indicating the current setting of the call screening option. In Step 69544, the ARU presents the subscriber with a list of options relating to pager notification. In this example, item '1' corresponds to a request to select notification by pager only of incoming voicemails; item '2' corresponds to a request to select notification by pager only of incoming faxes; item '3' corresponds to select request to select notification by pager both for incoming voicemails and for incoming faxes; and item '4' corresponds to a request to turn call pager notification completely. If the subscriber selects one of these options, the ARU in Step 69546 performs the ARU Program routine, described below with respect to FIG. 69AA, passing it a first parameter to indicate that the pager notification option is desired to be altered, and a second parameter indicating the value to which the option should be set.

Following Step 69546, the ARU returns to Step 69530. Likewise, if the subscriber selects a cancel and return option in Step 69544, the ARU returns to Step 69530.

If the subscriber selects an option in Step 69530 to activate or deactivate his or her account, the ARU in Step 69550 plays a recorded message indicating the new account status. In Step 69552, the ARU toggles the current status of the account option (i.e., activates the option if it is currently deactivated, or deactivates the option on if it is currently activated). After the toggle, the ARU returns to Step 69530.

If the subscriber in Step 69530 selects the cancel and return option, the ARU returns to the ARU Administration routine, described above with respect to FIG. 69W.

FIG. 69AA depicts the ARU Program routine, which is performed by the ARU to set options selected by the subscriber. As shown in Step 69560, the Program routine takes as input two parameters: Term_Slot, which identifies the option whose value is being altered, and Term, whose value indicates the value to which the option addressed by Term_Slot is being set. In Step 69562, the ARU checks the type of value specified in Term. If the term value is a POTS identifier (i.e. a telephone number, such as a telephone number being programmed into a speed-dial number, as in Step 69494 in FIG. 69X), the ARU in Step 69564 prompts the subscriber to enter a POTS number. If the subscriber enters a domestic or international number, or an option ('1' in the example shown) to erase a previously stored POTS value, the ARU in Step 69566 plays a message indicating the new setting to which the addressed slot will be changed. In Step 69568, the ARU prompts the subscriber to correct the number by reentering a new number, to confirm the request, or to cancel the request. If the subscriber selects the option to correct the number, the ARU returns to Step 69564. If the subscriber confirms the request, the ARU in Step 69570 stores the Term parameter value as the variable addressed by the Term_Slot parameter. If the subscriber cancels the request, the ARU returns to the calling routine in Step 69572. The ARU also returns to the calling routine in Step 69572 if the subscriber selects a cancel option when prompted for a POTS number in Step 69564.

If the Term value is not a POTS identifier, the ARU in Step 69580 plays a message that informs the subscriber that the addressed option is about to be changed. In Step 69582, the ARU prompts the subscriber to confirm or cancel the request. If the subscriber opts to confirm the request, the ARU in Step 69584 stores the Term parameter value as the variable addressed by the Term_Slot parameter and returns to the calling routine in Step 69572. If the subscriber cancels the request, the ARU returns to the calling routine in Step 69572 without storing the value.

FIG. 69AI depicts the ARU User Xfer to Customer Service routine. In Step 69592, the ARU plays a prerecorded message to the subscriber asking the subscriber to hold. In Step 69594, the ARU then transfers the subscriber to customer service.

FIG. 69AB depicts the ARU Validate Guest Entry routine. This routine is used by the ARU to determine whether an attempt by a guest to use the VFP guest facilities is valid. The ARU permits up to 3 attempts for the guest to enter his or her identification information. For the first two invalid attempts, the ARU, in Step 69610, returns a status that the guest entry was invalid. On a third attempt, the ARU in Step 69615 performs the ARU Find-Me routine of FIGS. 69E and 69F. If a guest entry was received, the ARU in Step 69617 checks to see whether a guest entry was one of the available choices on the applicable menu. If not, the ARU in Step 69620 plays a recorded message that the guest entry option is not available. If this is the third invalid entry, the ARU in Step 69624 performs the ARU Guest Xfer to MTOC routine of FIG. 69H. If it is the first or second invalid entry, the routine in Step 69622 returns with an indication that the guest entry was invalid. If the ARU determines in Step 69617 that the guest entry was a proper menu option, it returns a valid status in Step 69626.

FIG. 69AC depicts the ARU Validate User Entry routine, which is used by the ARU to validate an attempt by a subscriber to use subscriber services of the VFP. If no user entry is received, the ARU in Step 69630 plays a diagnostic message that no entry was received. If an entry was received, the ARU checks in Step 69634 whether the menu to which the subscriber was responding includes an option for user entry. If so, the ARU returns a valid status in Step 69636. If not, the ARU in Step 69638 plays a diagnostic message that that option is not available. If either no entry was received or the entry was not valid for the menu, the ARU in Step 69632 checks to see whether this is the third failure to specify subscriber information. If so, the ARU in Step 69640 performs the ARU User Xfer to Customer Service routine of FIG. 89AI. If this is the first or second failed entry, the ARU returns an invalid status in Step 69642.

FIG. 69AD depicts the ARU Validate Passcode Entry routine, which is used by the ARU to authenticate a passcode entered by a subscriber. In Step 69650, the ARU checks to see whether the passcode enters matches the passcode for the specific subscriber. If so, in Step 69652 the ARU returns with a valid status. If the entry is not valid, the ARU in Step 69654 plays a recorded message that the entry is not valid. The ARU allows two attempts to specify a valid passcode. In Step 69656, the ARU checks to see whether this is the second attempt to enter a passcode. If this is the second attempt, the ARU in Step 69660 performs the ARU User Xfer to Customer Service routine, which is described above with respect to FIG. 69AI. If this is not the second failure, the ARU in Step 69658 prompts the subscriber to enter a valid passcode and returns to Step 69650.

FIG. 69AE depicts the ARU Validate Completion routine, used by the ARU to validate the entry of a valid telephone number. In Step 69670 the ARU checks to see whether a valid user entry had been received. If not, the ARU checks to see if this is the third invalid entry attempted. If not, the ARU in Step 69672 returns an indicator that no valid entry was received. If this is the third attempt, in Step 69674, the ARU plays a message and in Step 69676 performs the ARU Xfer User to MTOC routine, which is described above with respect to FIG. 69H.

If a valid user entry was received, the ARU checks to see whether a telephone number entered begins with "011." If so, the ARU in Step 69680 performs the ARU Validate International Completion routine of FIG. 69AF. In Step 69682, the ARU checks to see whether the domestic terms flag has been set by the subscriber. If not, the ARU in Step 69684 plays a diagnostic message that domestic calls are not available, and proceeds to Step 69671. In Step 69686, the ARU checks to see whether a ten-digit number was entered, and in Step 69688 checks to see whether a valid MPA-Nxx number was entered. If number entered was not a ten-digit valid MPA-Nxx number, the ARU in Step 69690 plays a diagnostic message and proceeds to Step 69671. In Step 69690, the ARU checks to see whether NADP blocking is effective for this subscriber, and in Step 69692, the ARU checks to see whether 976 blocking is effective for this subscriber. If either blocking is effective, the ARU in Step 69694 plays a diagnostic message indicating that calls to the addressed number are blocked and proceeds to Step 69671.

Otherwise, the ARU in Step 69696 returns with a status that the number entered is valid.

FIG. 69AF depicts the ARU Validate International Completion routine. In Step 69700, the ARU checks to see whether the subscriber is configured to place international calls. If not, the ARU plays a diagnostic message in Step 69702. In Step 69704, the ARU checks to see whether the number entered is syntactically valid as an international dialing number. If not, the ARU in Step 69706 plays a diagnostic message. In Step 69708, the ARU checks to see whether Cset blocking will block the specified number. If so, the ARU in Step 69710 plays a diagnostic message. If no error conditions were found, the ARU returns a valid status in Step 69712. If errors were found the ARU in Step 69713 returns an invalid status. If three failed attempts have been made to enter a number, the ARU plays a status message in Step 69714 and transfers the subscriber to the operator instep 69716.

FIG. 69AG depicts the ARU Validate POTS Programming routine, used by the ARU to ensure that only a valid telephone number is stored for use by call routing. In Step 69720 the ARU checks to see whether a valid user entry had been received. If not, the ARU checks to see if this is the third invalid entry attempted. If not, the ARU in Step 69722 returns an indicator that no valid entry was received. If this is the third attempt, in Step 69676 performs the ARU User Xfer to Customer Service routine, which is described above with respect to FIG. 69AI.

If a valid user entry was received, the ARU checks to see whether a telephone number entered begins with "011." If so, the ARU in Step 69730 performs the ARU Validate International Completion routine of FIG. 69AF. In Step 69732, the ARU checks to see whether the domestic terms flag has been set by the subscriber. If not, the ARU in Step 69734 plays a diagnostic message that domestic calls are not available, and proceeds to Step 69721. In Step 69736, the ARU checks to see whether a ten-digit number was entered, and in Step 69738 checks to see whether a valid MPA-Nxx number was entered. If neither was entered, the ARU in Step 69740 plays a diagnostic message and proceeds to Step 69721. In Step 69750, the ARU checks to see whether 976 blocking is effective for this subscriber. If so, the ARU in Step 69754 plays a diagnostic message indicating that calls to the addressed number are blocked and proceeds to Step 69721. Otherwise, the ARU in Step 69756 returns with a status that the number entered is valid.

FIG. 69AH depicts the ARU Validate International Programming routine used by the ARU to assure that only a valid telephone number is stored for use by call routing. In Step 69760, the ARU checks to see whether the subscriber is configured to place international calls. If not, the ARU plays a diagnostic message in Step 69762. In Step 69764, the ARU checks to see whether the number entered is syntactically valid as an international dialing number. If not, the ARU in Step 69766 plays a diagnostic message. In Step 69768, the ARU checks to see whether Cset blocking will block the specified number. If so, the ARU in Step 69770 plays a diagnostic message. If no error conditions were found, the ARU returns a valid status in Step 69772. If errors were found, the ARU in Step 69773 returns an invalid status. If three failed attempts have been made to enter a number, the ARU plays a status message in Step 69774 and transfers the subscriber to the operator in Step 69776.

Figure 70A:
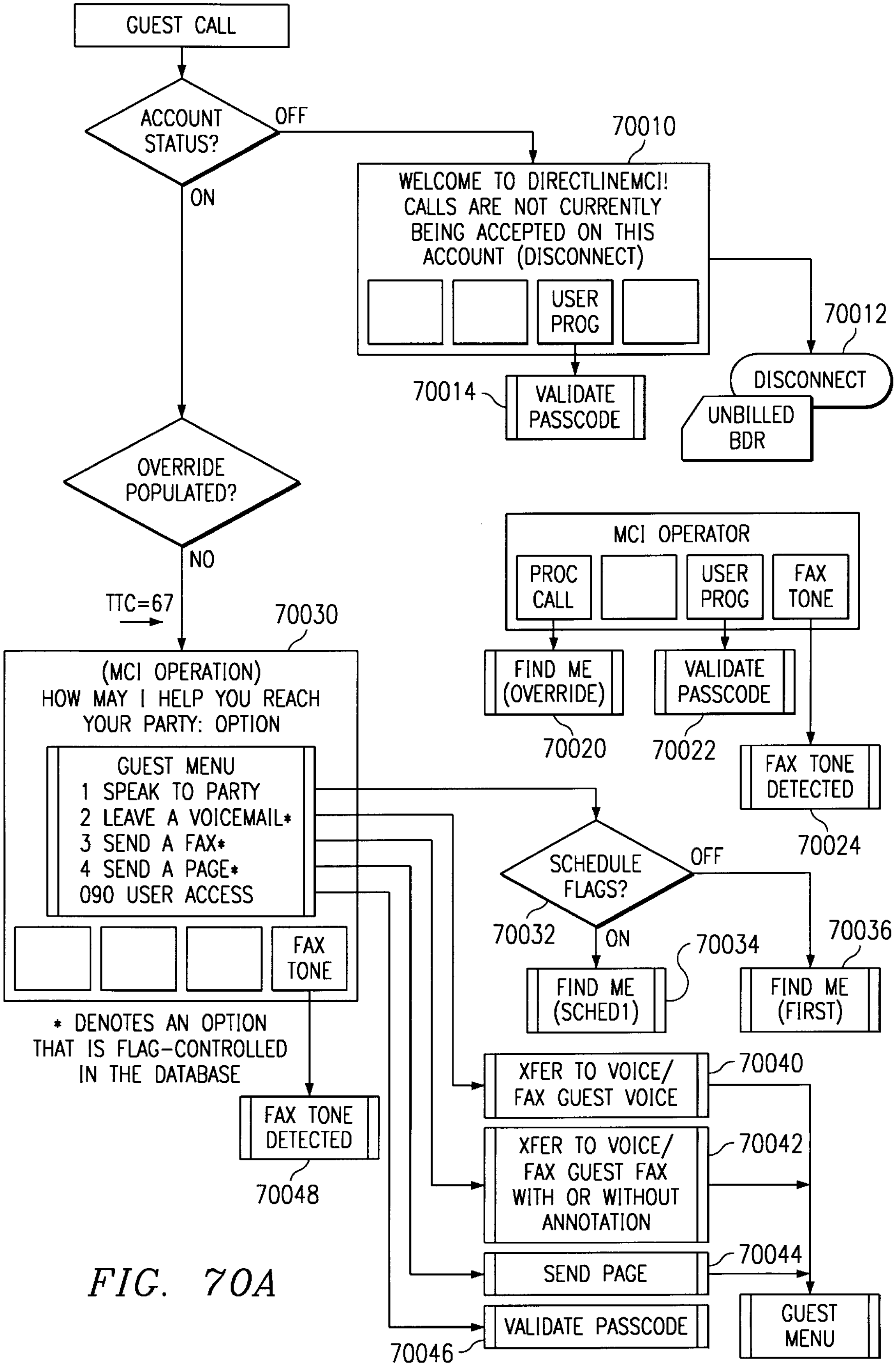
FIGS. 70A–70R are console call flow charts further showing software implementation in accordance with a preferred embodiment.
Figure 70B:
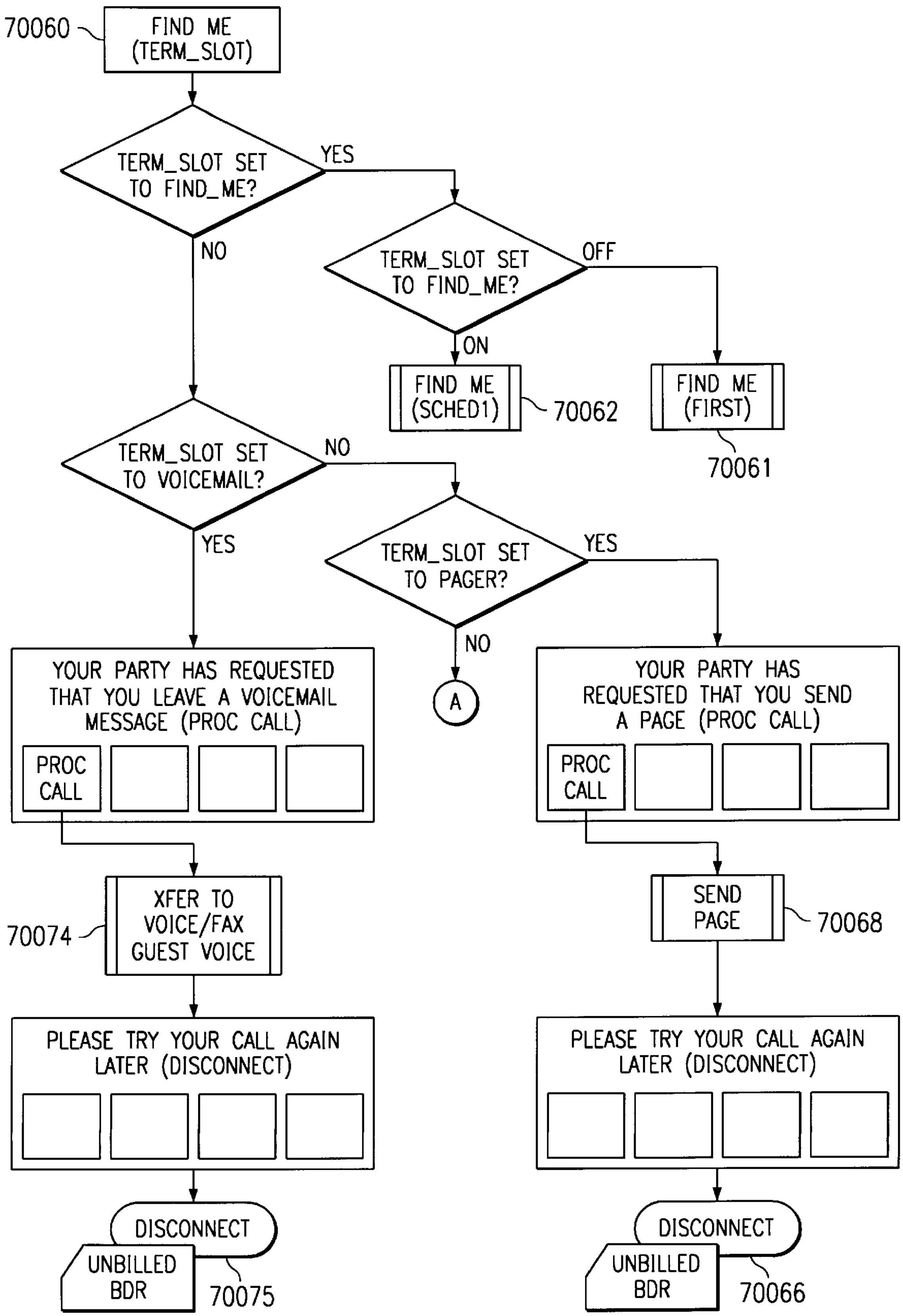
Figure 70C:
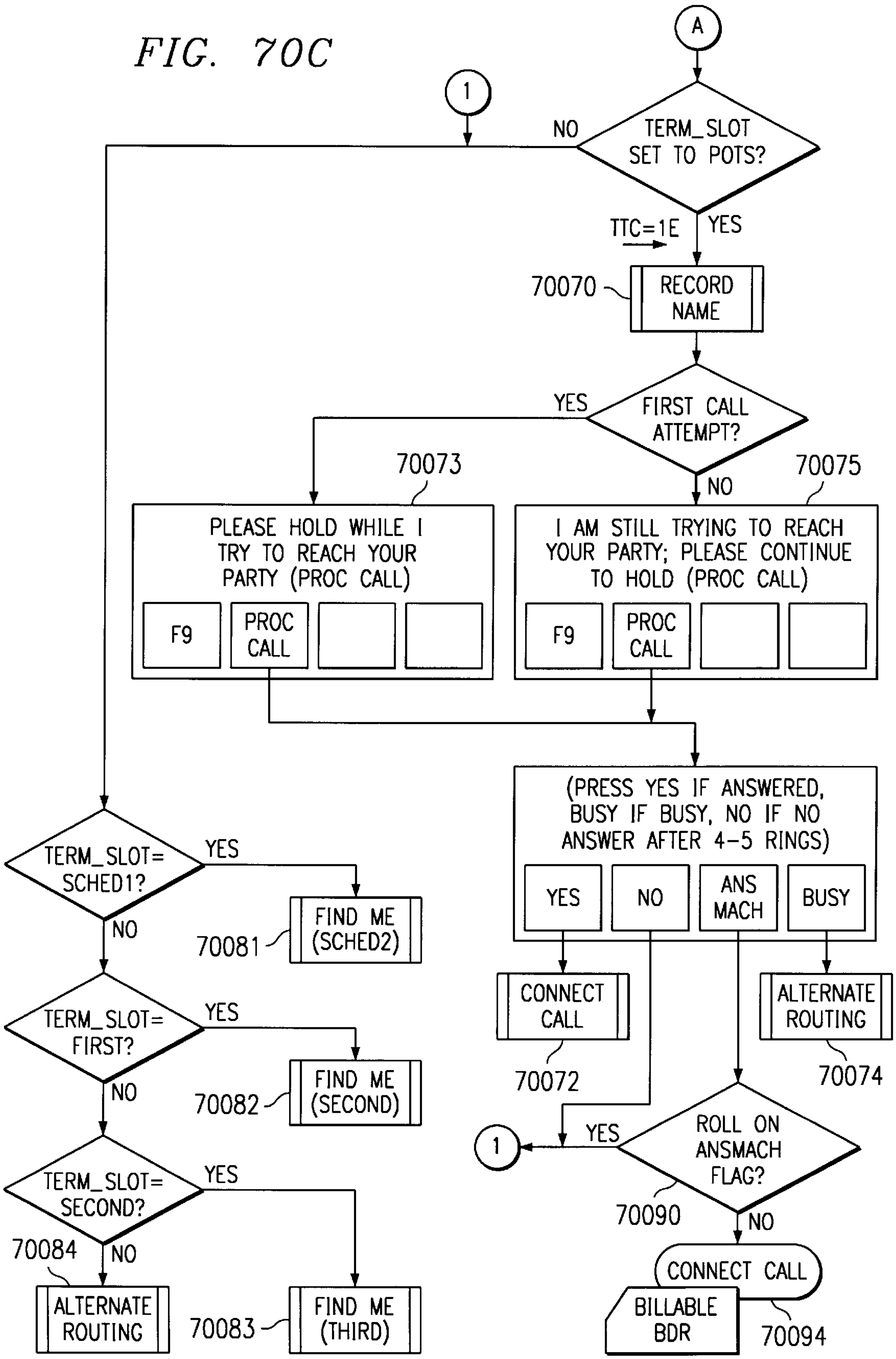
Figure 70D:
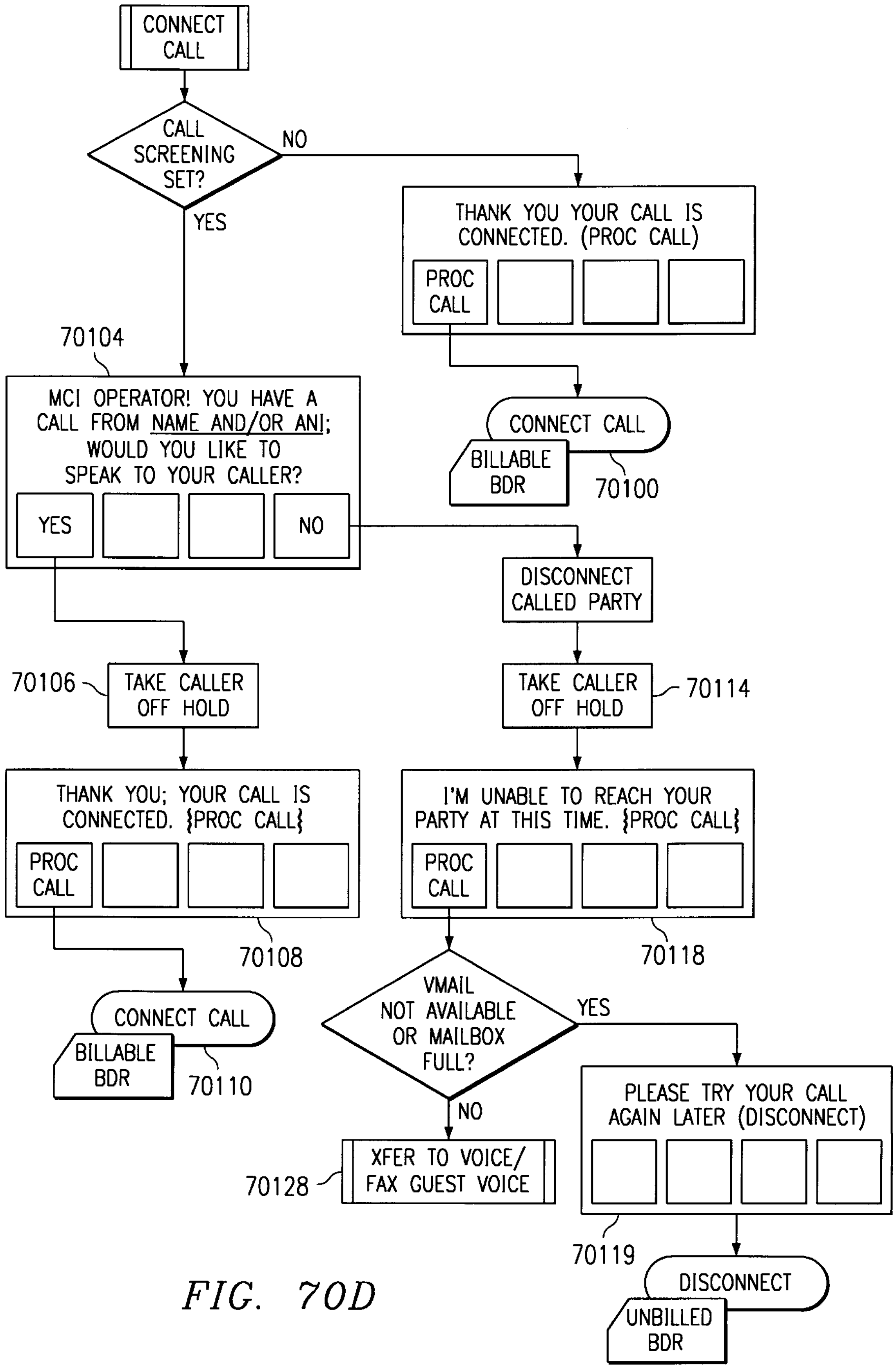
Figure 70E:
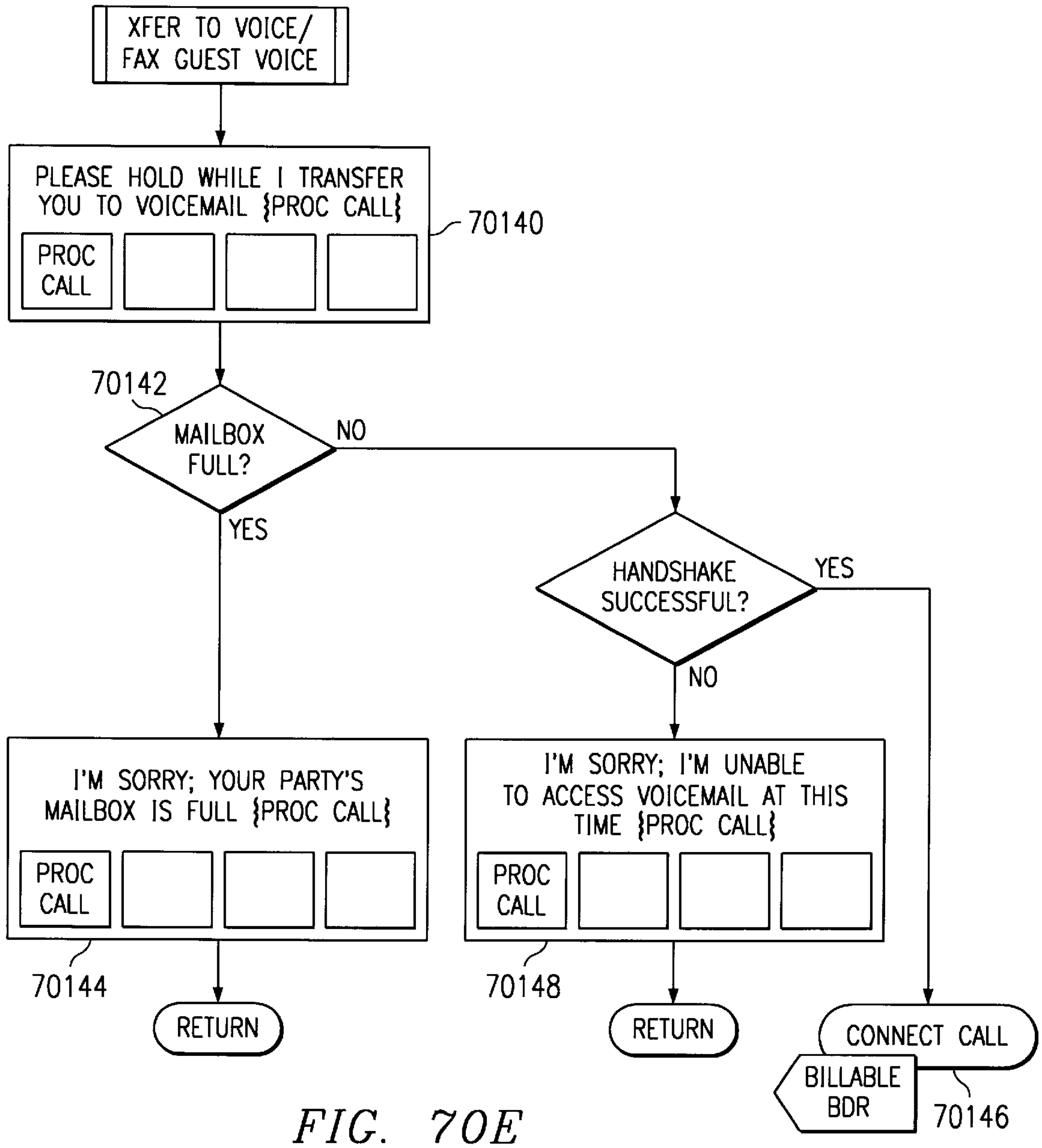
Figure 70F:
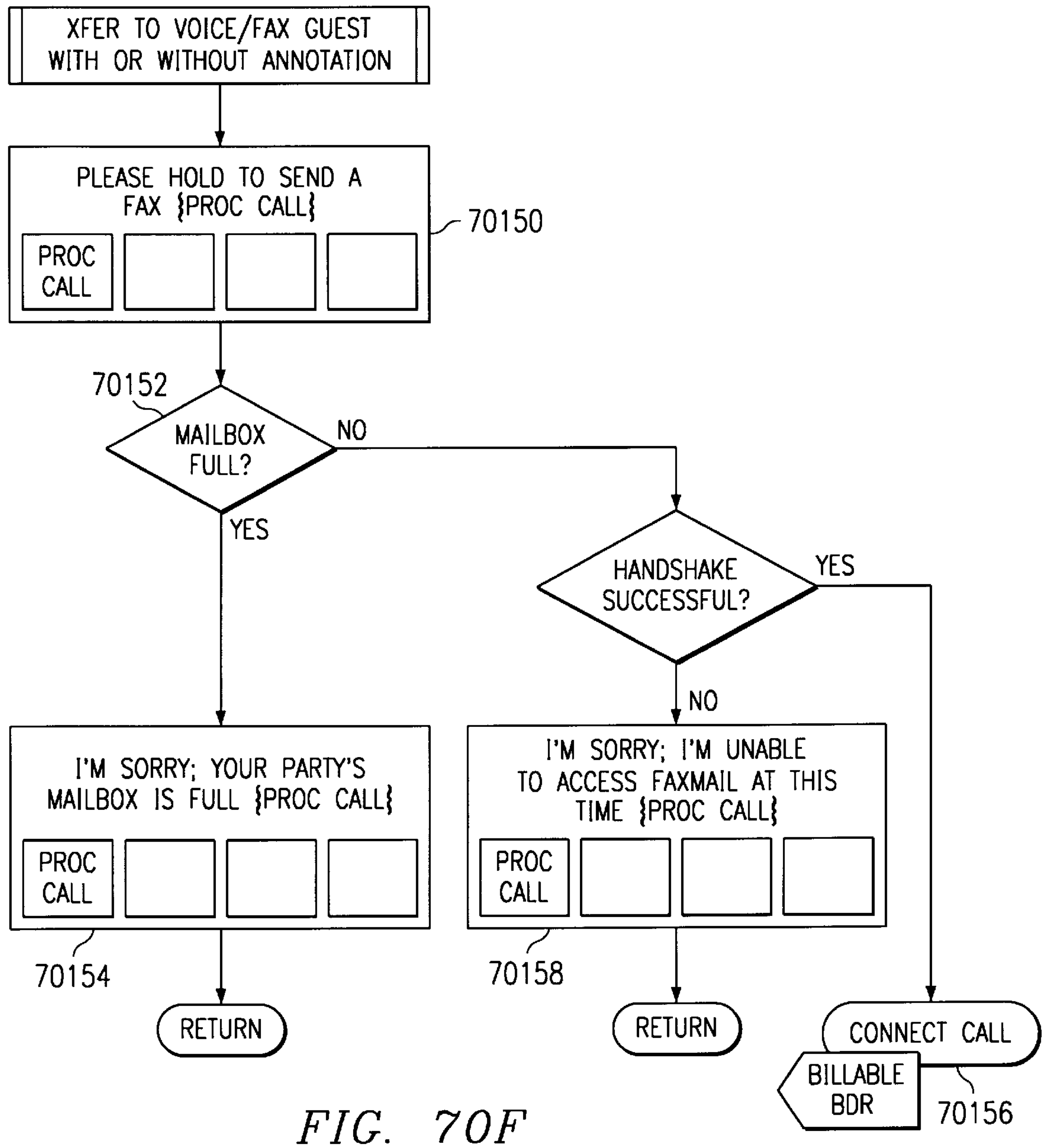
Figure 70G:
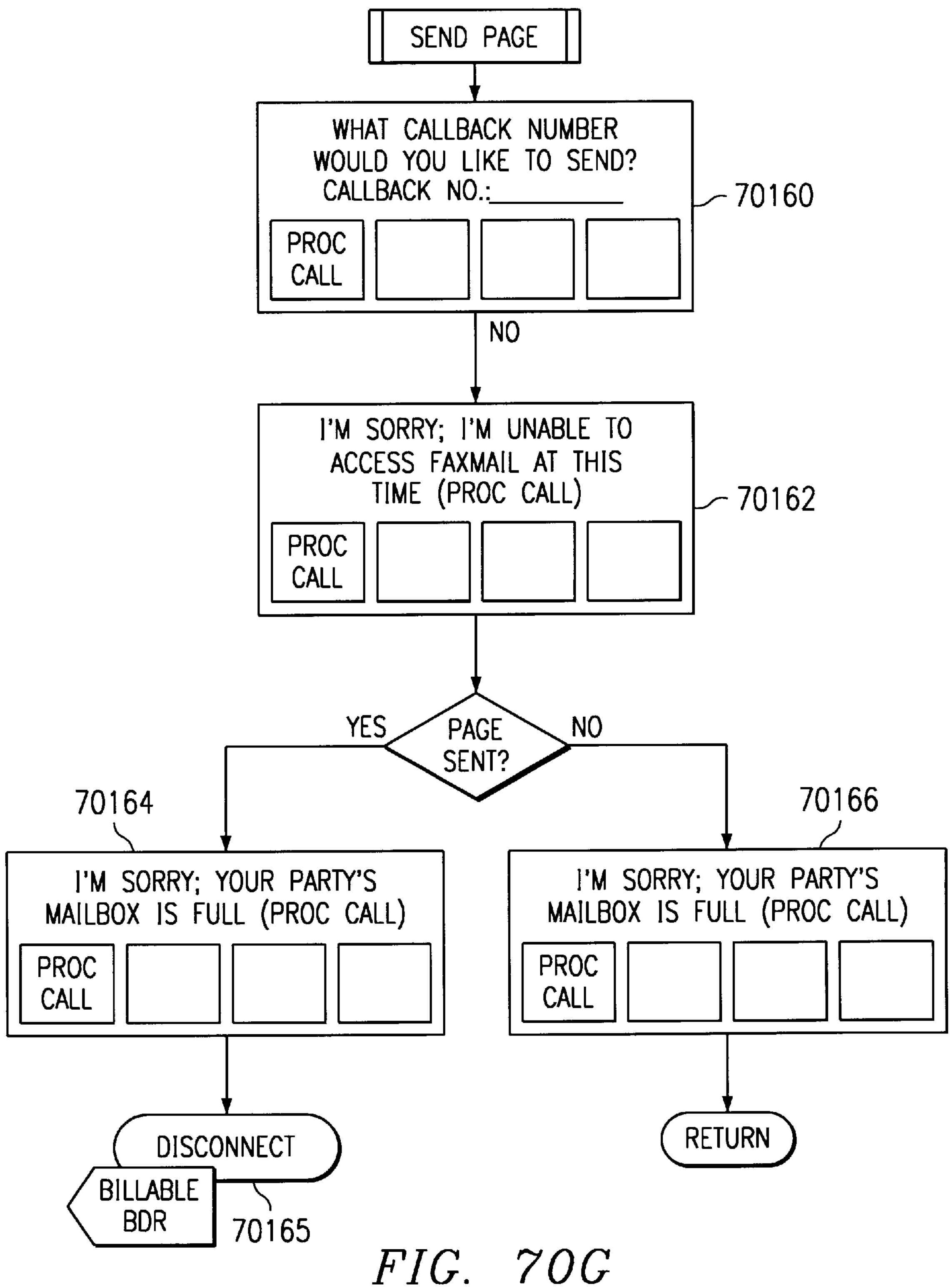
Figure 70H:
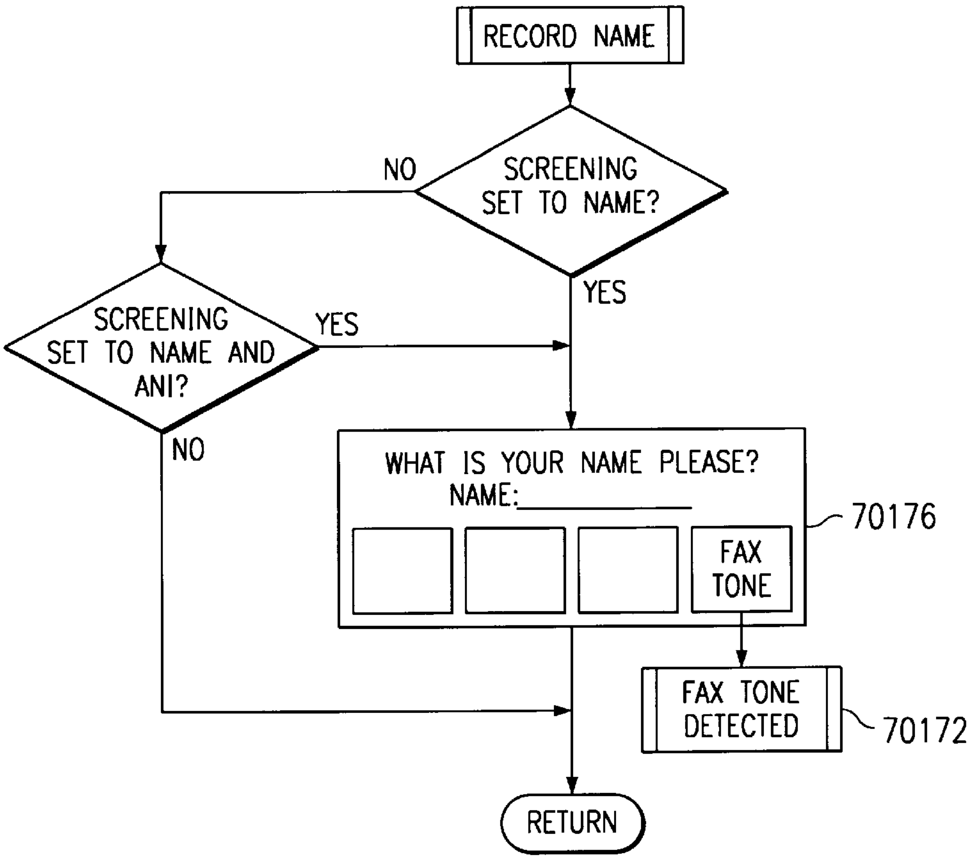
Figure 70M:
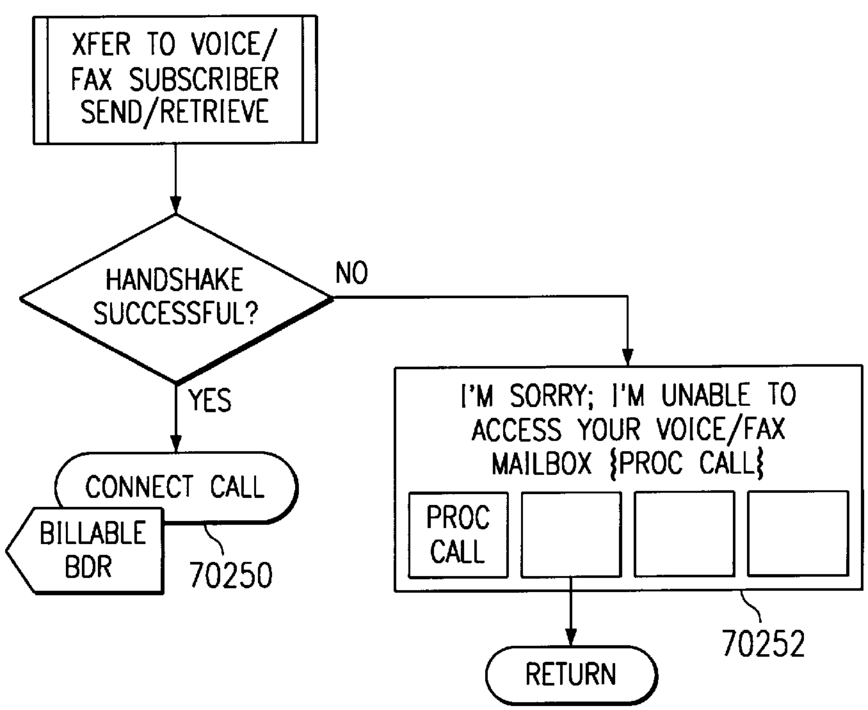
Figure 70I:
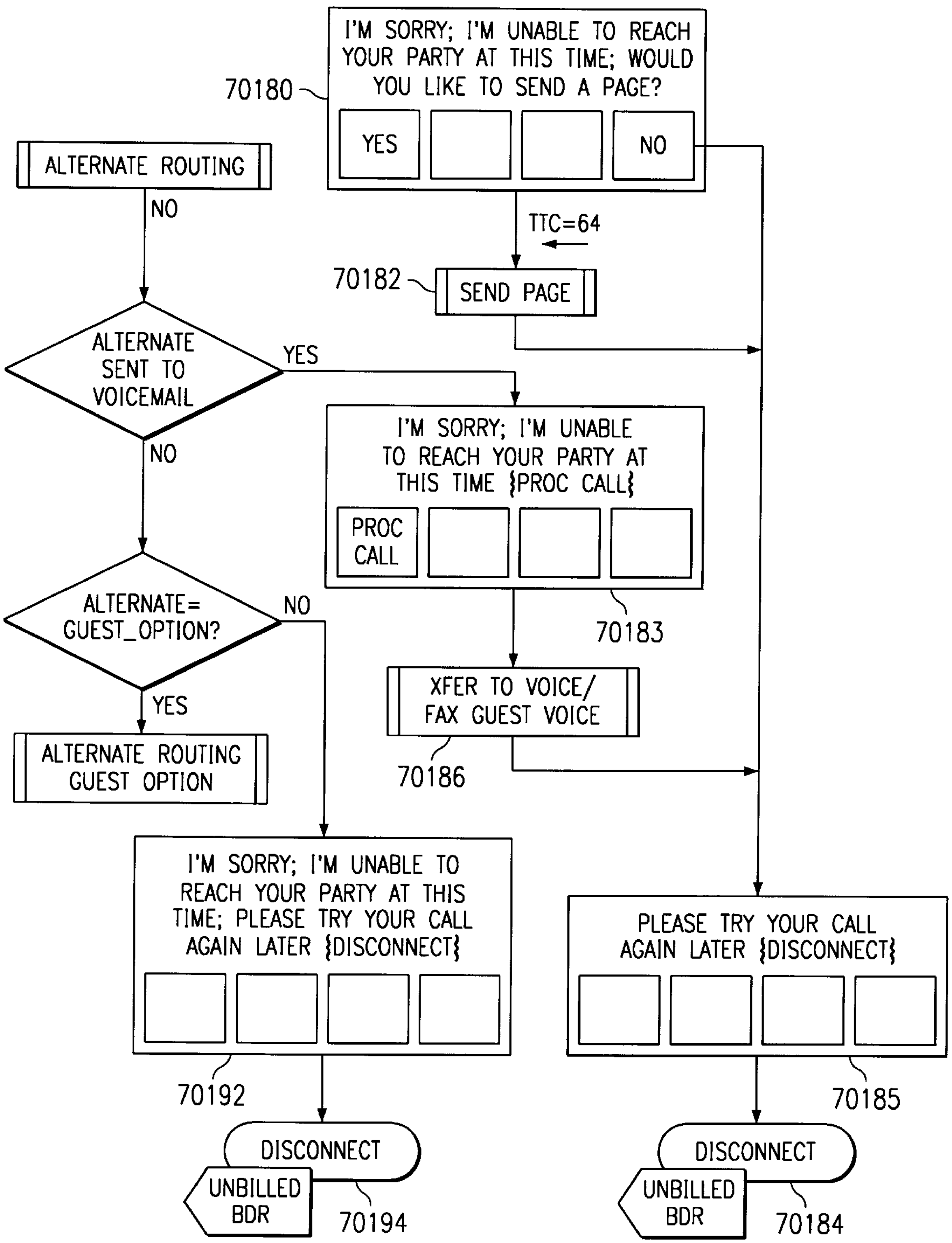
Figure 70J:
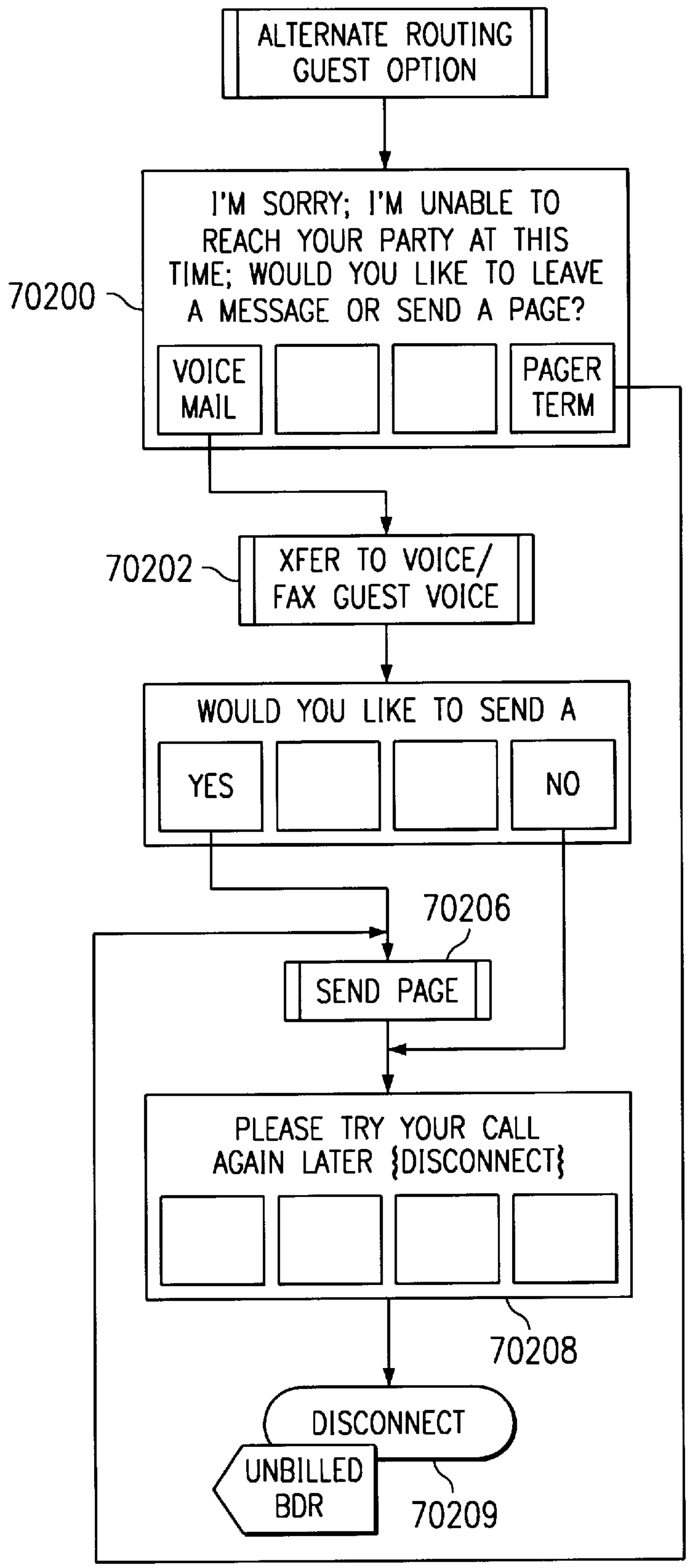
Figure 70K:
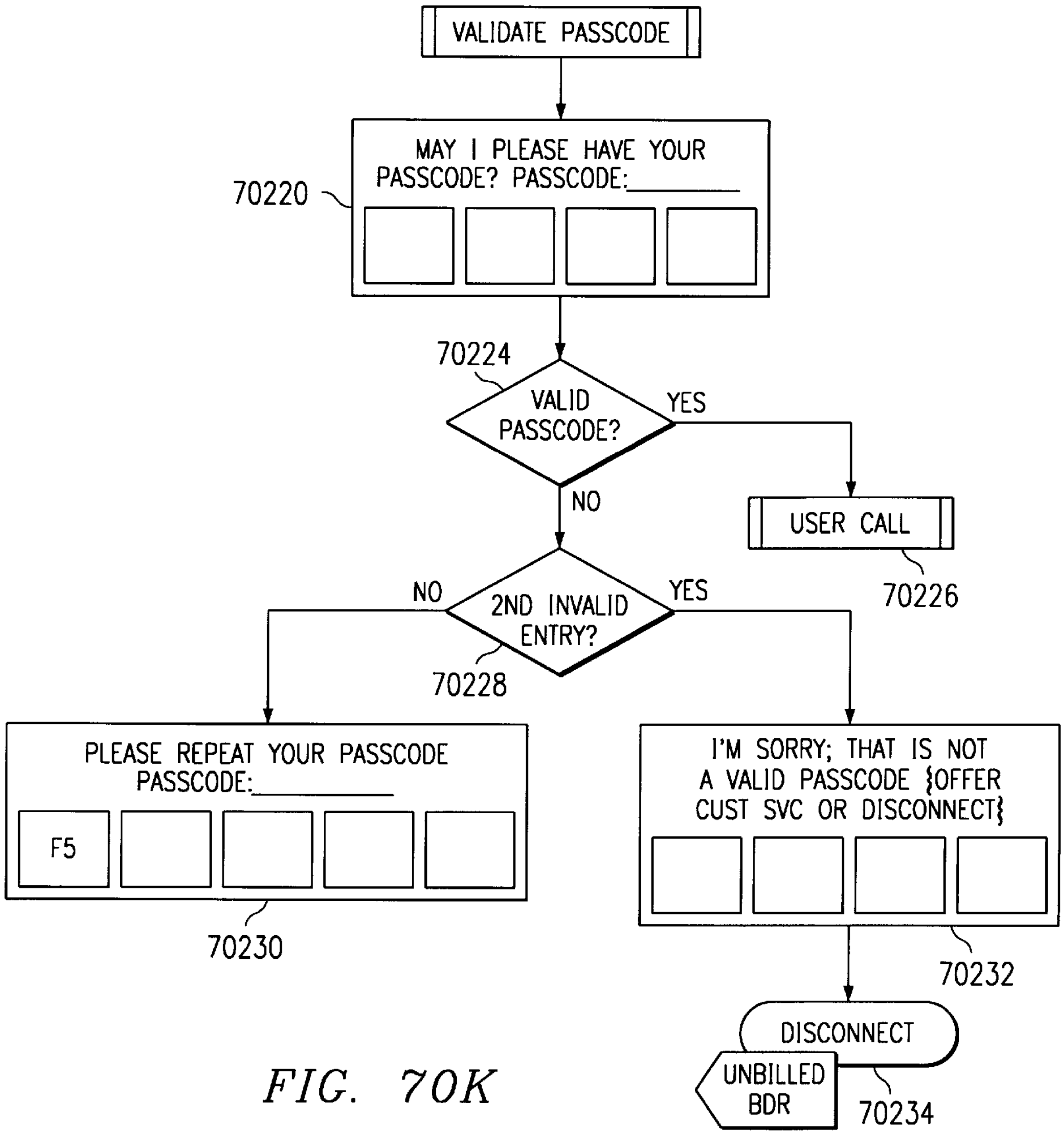
Figure 70L:
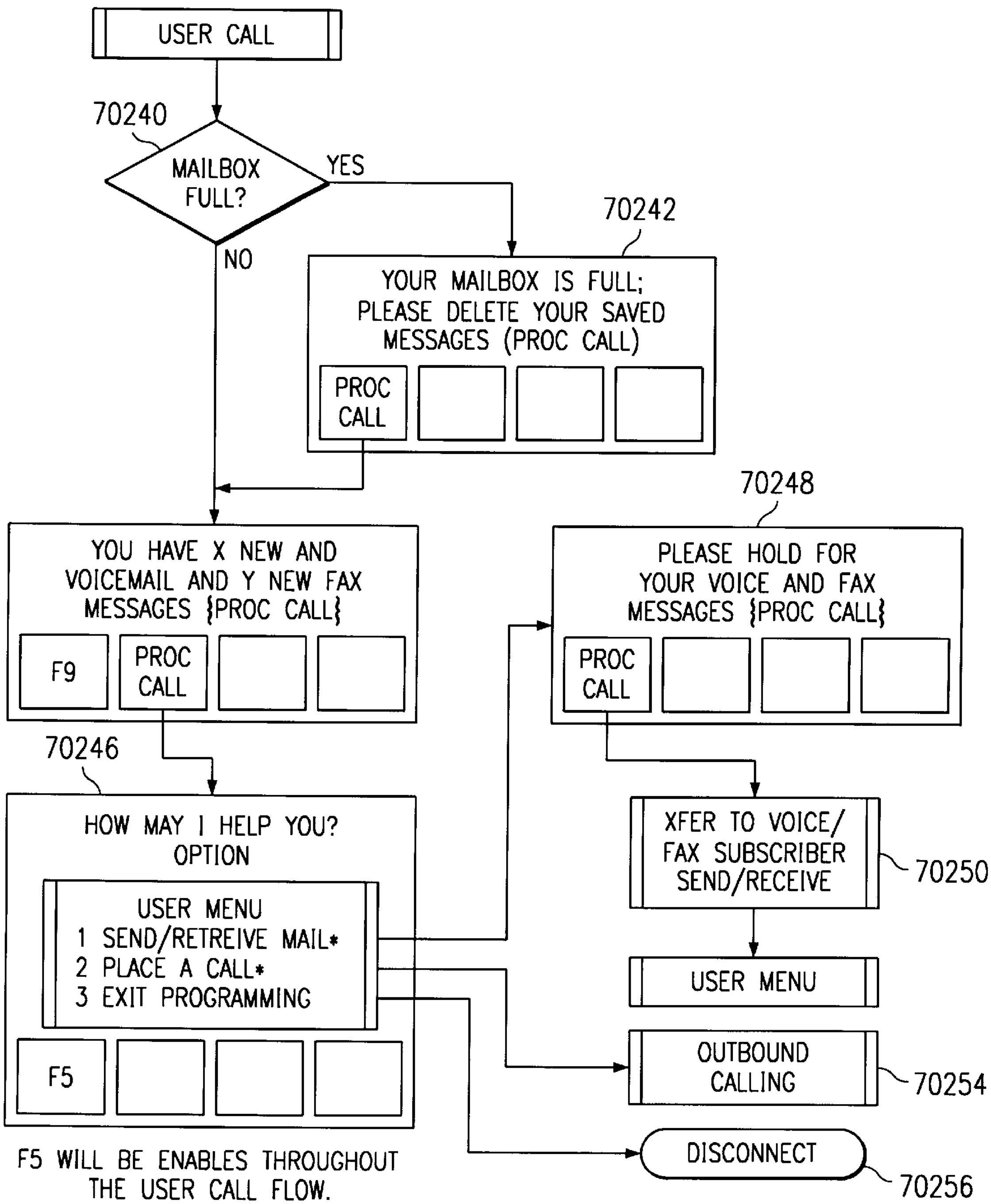
Figure 70N:
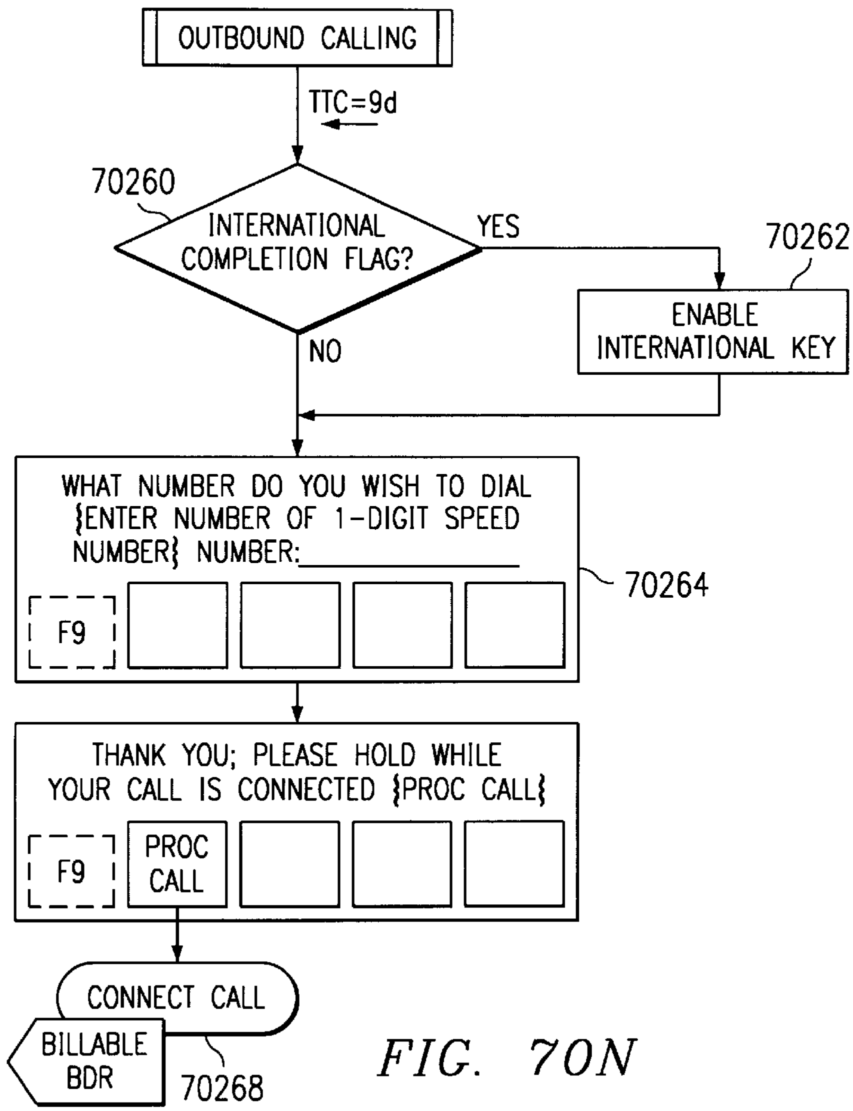
Figure 70O:
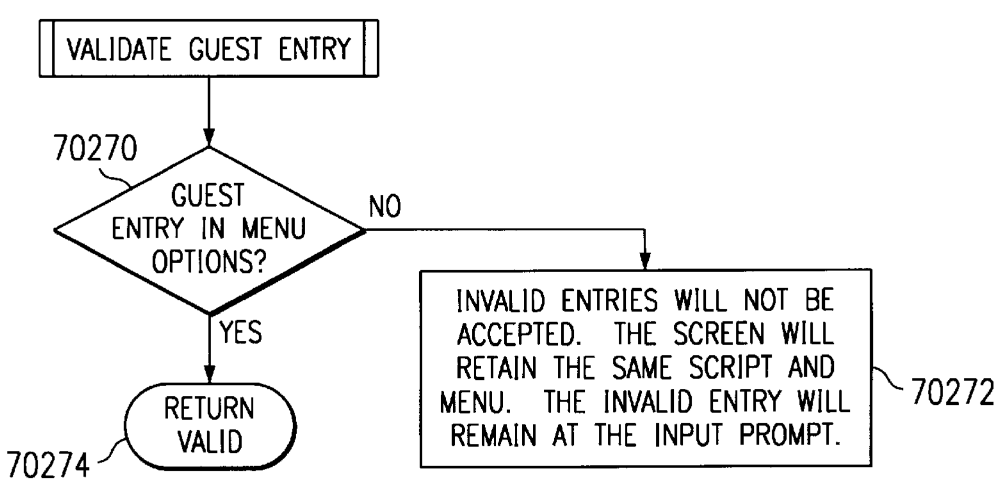
Figure 70P:
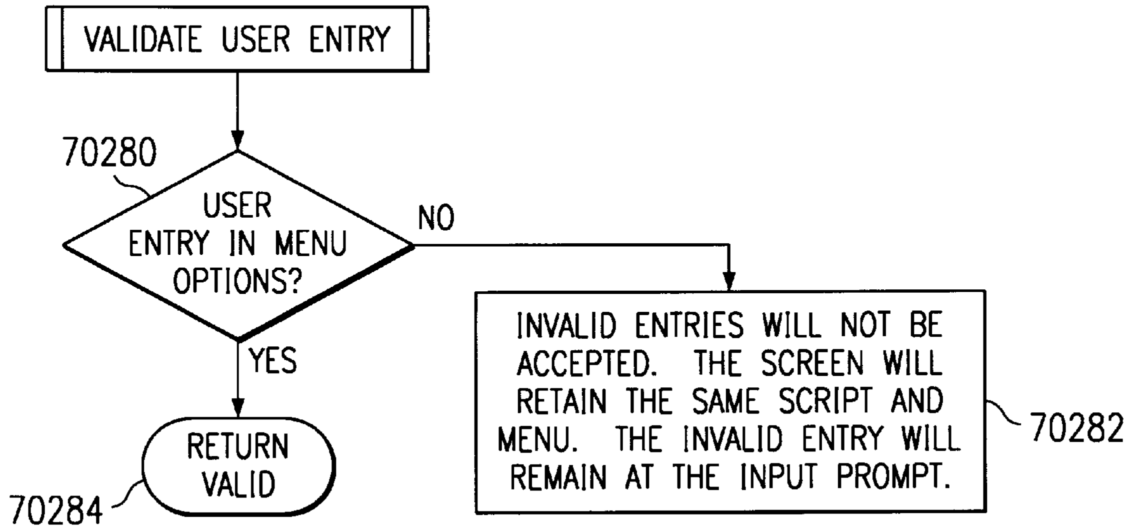
Figure 70S:
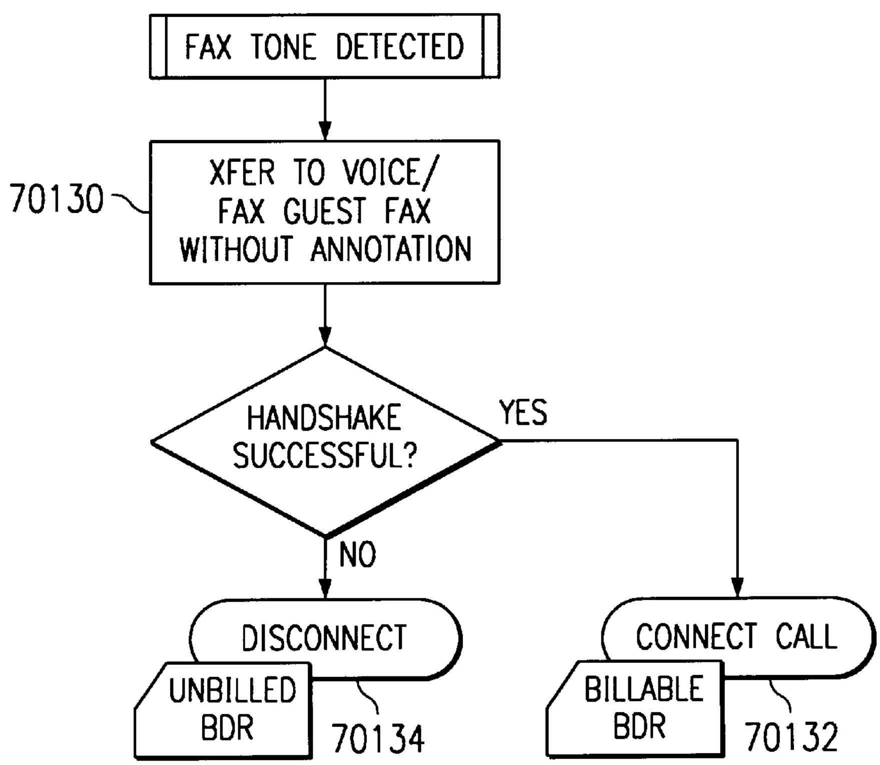

FIGS. 70A through 70S depict automated console call flow charts showing software implementation of the direct-line MCI product described above and are useful for a further understanding of the invention. A console call flow differs from an ARU call flow in that the console, while automated, is manned by an individual who may act in response to requests made by a caller. This permits a caller without DTMF-enabled equipment to utilize the product. DTMF data provided by the caller will be processed, but the availability of a human operator permits many of the available operations to be performed without the use of DTMF input. Data may be provided by the caller by directly entering it on a keypad, if any, or it may be entered by the human operator in accordance with voice responses provided by the caller.

FIG. 70A depicts the starting point for processing of an automated console call into an account. As a call initiates, it is assumed to be a guest call. If the account is not currently online, the automated console in Step 70010 plays a message indicating that calls cannot be accepted for the account. Unless the caller indicates to the operator that he has a passcode, the console in Step 70012 disconnects the call. If the caller provides the operator with a passcode, the operator in Step 70014 initiates the Console Validate Passcode routine, which is described below with respect to FIG. 70K.

If the account is currently online, the console checks to see whether the subscriber has indicated an override for incoming calls. If so, the console routes the call to the operator in Step 70018. If the caller is generating a fax tone, the console in Step 70024 performs the Console Fax Tone Detected routine, described below with respect to FIG. 70S. If the caller provides the operator with a passcode, the operator in Step 70026 initiates the Console Validate Passcode routine, which is described below with respect to FIG. 70K. Otherwise, the call is processed as an incoming call for the subscriber, and the console in Step 70020 performs the Console Find Me routine, which is described below with respect to FIG. 70BC. The console supplies the 'override' parameter to the Console Find Me routine invocation.

If override has not been specified, the console in Step 70030 presents an audible menu to the caller. In the example shown, item '1' corresponds to a request to speak to a subscriber; item '2' corresponds to a request to leave a voice mail message for a subscriber; item '3' corresponds to a request to send a fax to a subscriber; and item '4' corresponds to a request to page a subscriber. In addition, a subscriber may provide his or her passcode to gain access to the console as a subscriber.

If the caller requests to speak to a subscriber, the console in Step 70032 checks the schedule flags associated with the caller's profile. If the subscriber's profile indicates a schedule, the console in Step 69034 performs the Console Find Me routine of FIGS. 70B and 70C, using "Sched1" as the parameter. If the subscriber's profile does not indicate a schedule, the console in Step 69036 performs the Console Find Me routine using "First" as the parameter. The Console Find Me routine is discussed in further detail with respect to FIGS. 70B and 70C, below.

If the caller requests to leave a voice mail message, the console in Step 70040 performs the Console Xfer to Voice/Fax Guest routine, described below with respect to FIG. 70E. If the caller requests to send a fax, the console in Step 70042 performs the Console Xfer to Voice/Fax Guest w/ or w/out Annotation routine, describe below with respect to FIG. 70F. After performing this routine, the console returns to the guest menu in Step 70030. If the caller requests to leave a voice mail message, the console in Step 70040 performs the Console Send Page routine, described below with respect to FIG. 70G. After performing any of the routines of Steps 70040, 70042 or 70044, the console returns to the guest menu in Step 70030.

If the caller provides a passcode, the console in Step 70046 performs the Console Validate Passcode routine, which is described with respect to FIG. 70K, below. If the console detects a fax tone on the incoming call, the console in Step 70048 performs the Console Fax Tone Detected routine, which is described below with respect to FIG. 70S.

FIGS. 70B and 70C depict the operation of the Console Find Me routine. As shown in Step 70060, the Console Find Me routine takes a single parameter Term_Slot, which is set by the caller and used by the console to choose among alternative courses of action. If Term_Slot is set to "Find Me", this indicates that the console is to use the default method of determining the subscriber's current number. This value may be set, for example, for override or default processing. If the subscriber's profile includes schedule flags, the console performs the Console Find Me routine using the Sched1 parameter as shown in Step 70062; if not, the console performs the Find Me routine using the first telephone number in the list of numbers for the subscriber, as shown in Step 70061.

If Term_Slot is set to "Voicemail," the console plays a message to the caller that the subscriber has requested that the caller leave a voice mail message, and in Step 70074 performs the Console Xfer to Voice/Fax Guest Voice routine, as depicted in FIG. 70E. That routine returns if unsuccessful, in which case a message is played indicating that the caller should try the call later, and the caller is disconnected in Step 70075.

If Term_Slot is set to "Pager," the console plays a message to the caller that the subscriber has requested that the caller leave a request to page the subscriber. The console then performs the Console Send Page routine, which is described with respect to FIG. 70G, below. That routine returns if unsuccessful, in which case a message is played indicating that the caller should try the call later, and the caller is disconnected in Step 70066.

If Term_Slot is set to any POTS value (such as Sched1, Sched2, First, Second, or Third) that indicates that the subscriber has specified that incoming calls are to be sent using the standard telephone system, and the console has been directed to use the particular scheduled or selected telephone number. In Step 70070, the console performs the Console Record Name routine to acquire a digital recording of the caller's identification. The Console Record Name routine is described in detail with respect to FIG. 70H, below. The console in Steps 70073 and 70075 plays an appropriate message for the caller (e.g., "Please hold while I try to reach your party" on the first attempt, and "I am still trying to reach your party; please continue to hold" for subsequent attempts).

If the call is answered by an individual, the console in Step 70072 performs the Console Connect Call routine, which is discussed below with respect to FIG. 70D, to connect the caller. If the call is answered by an answering machine, the console in Step 70090 checks to see whether the subscriber has requested that the console roll over to the next alternative number upon encountering an answering machine. If not, the console in Step 70094 connects the call. If the subscriber has selected rollover, the console selects the next number in rotation to call and re-performs the Console Find Me routine using the newly-selected number, as shown in steps 70081, 70082 and 70083.

If the line called is busy, or if no more numbers to check remain, the console in Step 70074 performs the Console Alternate Routing routine of FIG. 70I.

FIG. 70D depicts the Console Connect Call routine. If the subscriber has not requested call screening, the console in Step 70100 connects the call to the subscriber. If the subscriber has selected call screening, the console in Step 70104 plays an informational message to the subscriber, identifying the caller by name and by ANI, if available. If the subscriber opts to take the call, the console in Step 70106 takes the caller off hold and in Step 70108 plays a message indicating that the call is being connected, which it performs in Step 70110. If the subscriber declines to take the call, the console in Step 70114 takes the caller off hold and in Step 70118 plays a recording to the calling party indicating that it was unable to reach the subscriber and optionally prompting the caller to leave a voice mail message. If no mailbox is available, the console in Step 70119 plays a diagnostic message and disconnects the caller in Step 70120. If a mailbox is available and able to receive messages, the console in Step 70128 performs the Console Xfer to Voice/Fax Guest Voice routine of FIG. 70E. After this routine has been performed, the console in Step 70119 plays a message asking the caller to call back later, and disconnects in Step 70120.

FIG. 70S depicts the Console Fax Tone Detected routine. In Step 70130, the console attempts to acquire a handshake with the VFP. If the handshake is successful, the console connects the call in Step 70132. If unsuccessful, the console disconnects the caller in Step 69132 and exits.

FIG. 70E depicts the Console Xfer to Voice/Fax Guest Voice routine, which connects the caller to the VFP to leave a voice mail message. The console plays a status message in Step 70140 and checks to see whether the subscriber's mailbox is full in Step 70142. If the mailbox is full, the console plays a diagnostic message in Step 70144 and returns. If the mailbox is not full, the console attempts to acquire a handshake with the VFP. If the handshake is successful, the console connects the call in Step 70146. If unsuccessful, the console plays an error message in Step 70148 and returns.

FIG. 70F depicts the Console Xfer to Voice/Fax Guest Fax w/ or w/out Annotation routine, which connects the caller to the VFP to transmit a fax. The console plays a status message in Step 70150 and checks to see whether the subscriber's mailbox is full in Step 70152. If the mailbox is. full, the console plays a diagnostic message in Step 70154 and returns. If the mailbox is not full, the console attempts to acquire a handshake with the VFP. If the handshake is successful, the console connects the call in Step 70156. If unsuccessful, the console plays an error message in Step 70148 and returns. The routines of FIGS. 70E and 70F are similar except for the service requested of the VFP and the contents of the error message played to the caller.

FIG. 70G depicts the Console Send Page routine, which initiates a call to the subscriber's paging service. In Step 70160 the console prompts the caller to provide the telephone number that should be provided to the addressed pager. In Step 70162, the console plays a status recording to the caller, asking him or her to hold while the page is sent. If the page is successfully sent, the console in Step 70164 plays a status message indicating that the page has been sent and in Step 70165 disconnects the call. If the call to the paging service is unsuccessful, the console in Step 70166 plays a message indicating the failure and returns, enabling the console to present the caller with additional options.

FIG. 70H depicts the Console Record Name routine. This routine is used to record the name of the caller if the subscriber has specified call screening, either by name or by name and ANI. If the subscriber has specified call screening by name of by name and ANI, the console in Step 70170 prompts the caller to supply a name, and records the audible response. If a fax tone is detected during the recording process, the console in Step 70172 performs the Console Fax Tone Detected routine; otherwise, the routine returns.

FIG. 70I depicts the Console Alternate Routing routine. The console performs this routine to route calls that cannot be routed to the subscriber. If the subscriber has indicated that such unrouted calls are to be routed to his or her paging service, the console in Step 70180 plays a recording indicating that the caller may send a page. If the caller elects to send a page, the console in Step 70182 performs the Console Send Page routine that has been described with respect to FIG. 70G. If the page was unsuccessful, the console in Step 70185 plays a message indicating the failure and disconnects the caller in Step 70184. If the subscriber has indicated that unrouted calls are to be routed to voice mail, the console in Step 70183 plays a recorded message indicating that the caller may leave a voice mail message. If the caller elects to leave a voicemail, the console in Step 70186 performs the Console Xfer to Voice/Fax Guest Voice routine that has been described with respect to FIG. 70E. If the voicemail was unsuccessful, the console in Step 70185 plays a message indicating the failure and disconnects the caller in Step 70184.

If the subscriber has indicated a "guest option," the console in Step 69190 performs the Console Alternate Routing Guest Option routine of FIG. 70J; otherwise the console plays a diagnostic message in Step 69192 and disconnects the caller in Step 69194.

FIG. 70J depicts the Console Alternate Routing Guest Option routine. This routine permits the guest to select whether to leave a voice mail or send a page if the subscriber is unreachable. The console in Step 70200 presents the caller with a menu of available routing options; here, either to leave a voice mail or to send a page. If the caller requests to send a voice mail, then the console in Step 70202 performs the Console Xfer to Voice/Fax Guest Voice routine of FIG. 70E. If that routine returns a return code indicative of an unsuccessful event, then the console plays a prerecorded message indicating that the voicemail could not be sent, and in Step 70204 prompts the caller to indicate whether he would like to send a page instead. If the caller, in response to either the prompt of Step 70200 or the prompt of Step 70204, requests to send a page, the console in Step 70206 performs the Console Send Page routine of FIG. 70G. If the Console Send Page routine returns (indicating the page could not be sent), or if the caller declines to send a page in response to the prompt of Step 70204, the console plays a diagnostic message in Step 70208 and disconnects the caller in Step 70209.

FIG. 70K depicts the Console Validate Passcode Entry routine, which is used by the console to authenticate a passcode provided by a subscriber. In Step 70220, the caller is prompted for a passcode. In Step 70224, the console checks to see whether the passcode provided matches the passcode for the specific subscriber. If so, in Step 70226 the console performs the Console User Call routine, described below with respect to FIG. 70L. The console allows two attempts to specify a valid passcode. In Step 70228, the console checks to see whether this is the second failed attempt to provide a passcode. If this is the second attempt, the console in Step 70232 informs the caller that the passcode is not valid, and offers to connect the caller to customer service. If the caller elects not to be connected to customer service, the caller is disconnected in Step 70234. If this is the first failed attempt, the console in Step 70230 prompts the subscriber to provide a valid passcode and returns to Step 70224.

FIG. 70L depicts the Console User Call routine. In Step 70240, the console checks to see whether the subscriber's mailbox is full. If so, in Step 70242, the console plays a warning message to the subscriber. Regardless of whether the mailbox is full, the console in Step 70244 plays a status message for the subscriber informing the subscriber of the number of voicemail messages and faxes in the mailbox. On Step 70246, the console provides a menu of options to the subscriber. In the example shown, option '1' corresponds to a request to send or retrieve mail; '2' corresponds to a request to place a call; and '3' corresponds to a request to exit. If the subscriber selects the option to send or retrieve mail, the console in Step 70248 plays a hold message and then performs the Console Xfer to Voice/Fax Subscriber Send/Retrieve routine of FIG. 70M. After that routine has completed, the console again returns to Step 70246. If the subscriber selects an option to place a call, the console performs the Console Outbound Calling routine, which is described below with respect to FIG. 70N. If the subscriber selects the Exit Programming option, the console disconnects the call.

FIG. 70M depicts the Console Xfer to Voice/Fax Subscriber Send/Receive routine, which connects the subscriber to the VFP to send and retrieve voice mail messages. The console attempts to acquire a handshake with the VFP. If the handshake is successful, the console connects the call in Step 70250. If unsuccessful, the console plays an error message in Step 70252 and exits.

FIG. 70N depicts the Console Outbound Calling routine, by which a subscriber may place an outgoing call. In Step 70260, the console checks to see whether the subscriber is configured to place international calls. If so, the console in Step 70262 enables the international call key, enabling non-domestic calls to be made. In Step 70264, the subscriber is prompted for a telephone number. The console connects the subscriber to the outgoing call in Step 70268.

FIG. 70O depicts the Console Validate Guest Entry routine. This routine is used by the console to determine whether an attempt by a guest to use the VFP guest facilities is valid. The console in Step 70270 checks to see whether a guest entry was one of the available choices on the applicable menu. If not, the entry is not accepted, and the console maintains the same menu, as shown in Step 70272. If guest entry is a proper menu option, the console returns a valid status in Step 70274.

FIG. 70P depicts the Console Validate User Entry routine, which is used by the console to validate an attempt by a subscriber to use subscriber services of the VFP. The console in Step 70280 checks to see whether user entry is one of the available choices on the applicable menu. If not, the entry is not accepted, and the console maintains the same menu, as shown in Step 70282. If user entry is a proper menu option, the console returns a valid status in Step 70284.

Figure 70Q:
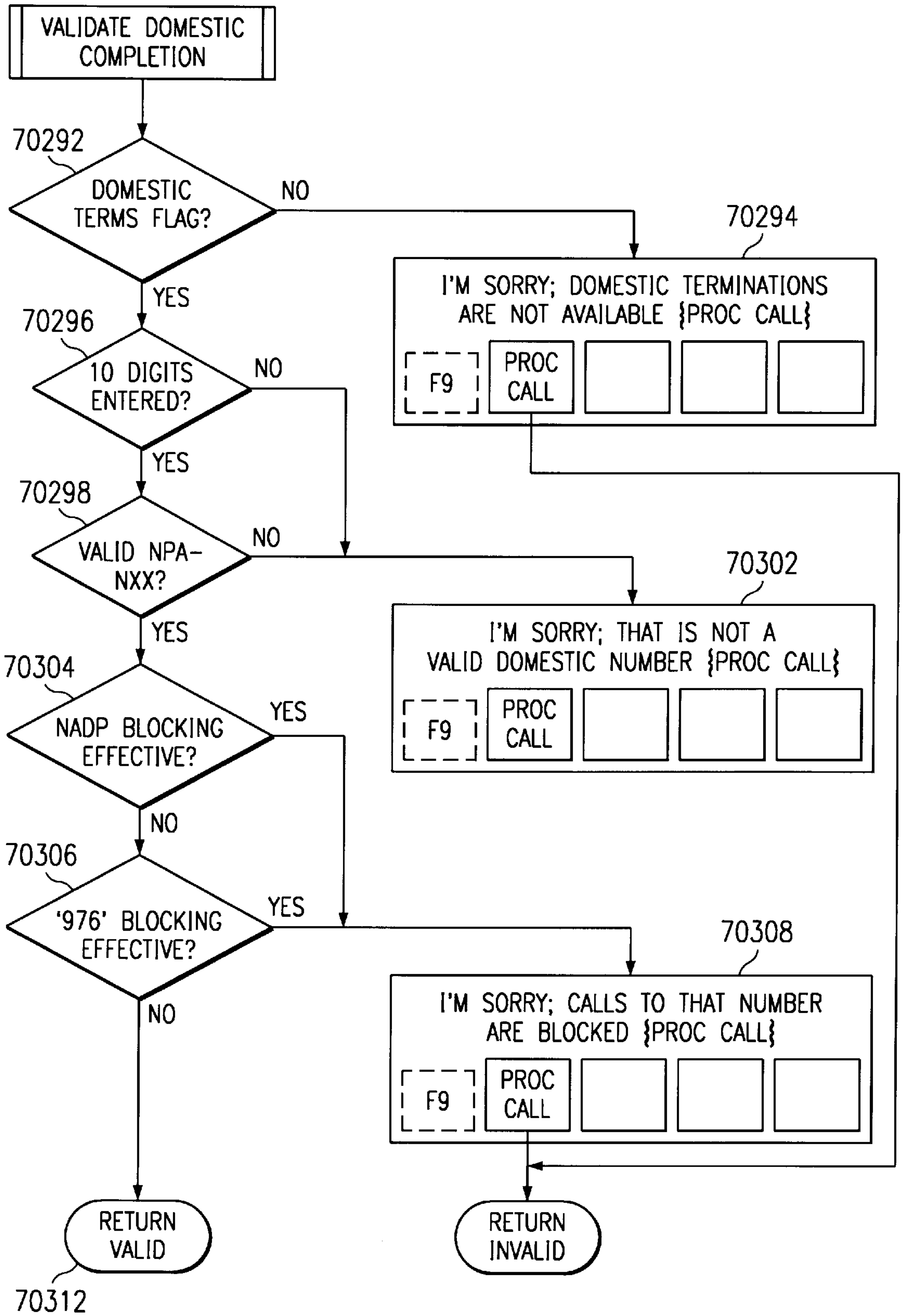

FIG. 70Q depicts the Console Validate Completion routine, used by the console to validate the entry of a valid telephone number. In Step 70292, the console checks to see whether the domestic terms flag has been set by the subscriber. If not, the console in Step 70294 plays a diagnostic message that domestic calls are not available, and in Step 70310 returns with an indication that the number provided is not valid. In Step 70296, the console checks to see whether a ten-digit number was provided, and in Step 70298 checks to see whether a valid MPA-Nxx number was provided. If number provided was not a ten-digit valid MPA-Nxx number, was provided, the console in Step 70302 plays a diagnostic message and in Step 70310 returns with an indication that the number provided is not valid. In Step 70304, the console checks to see whether NADP blocking is effective for this subscriber, and in Step 70306, checks to see whether 976 blocking is effective for this subscriber. If either form of blocking is effective, the console in Step 70308 plays a diagnostic message indicating that calls to the addressed number are blocked and in Step 70310 returns with an indication that the number provided is not valid. Otherwise, the console in Step 70312 returns with a status that the number provided is valid.

Figure 70R:
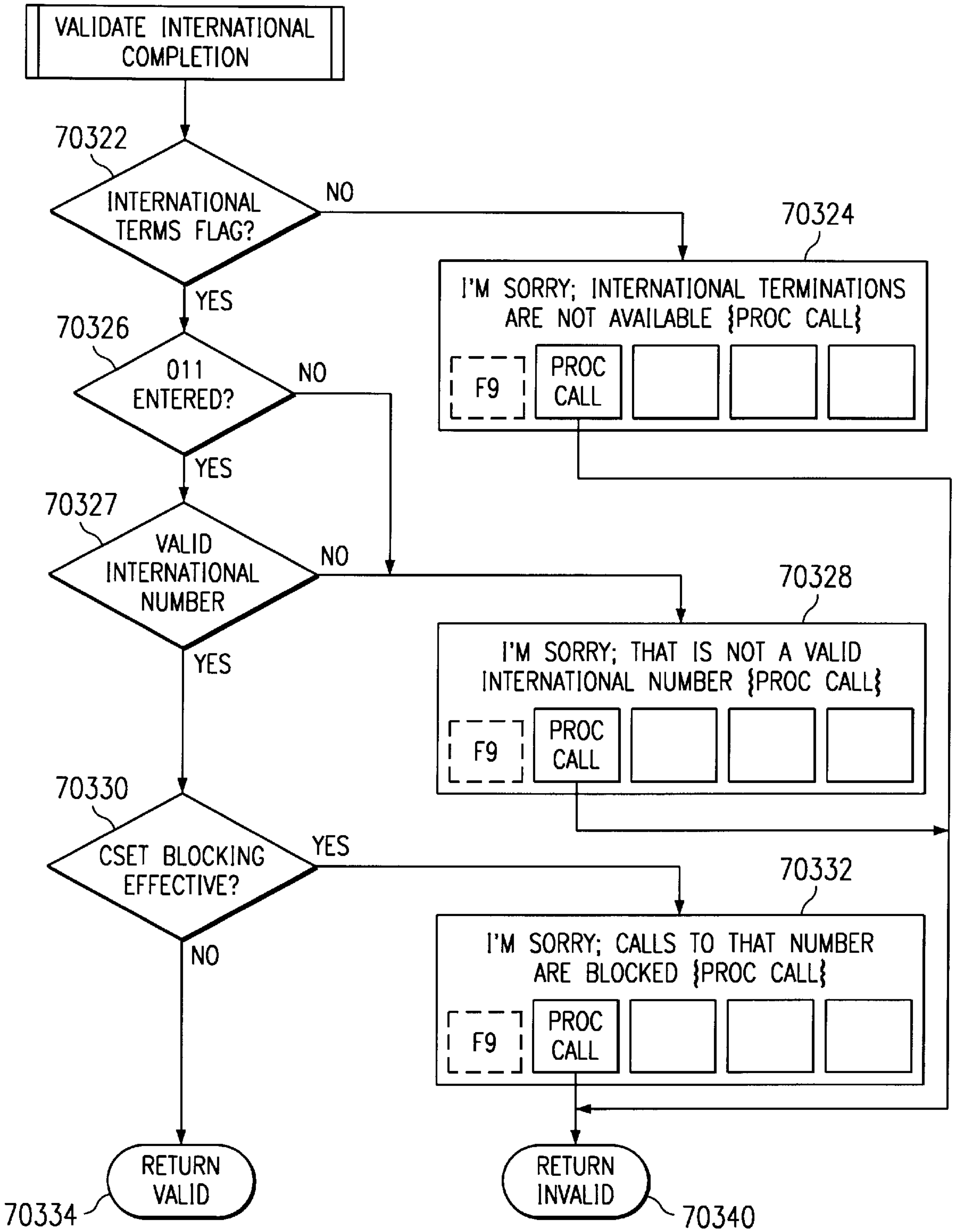

FIG. 70R depicts the Console Validate International Completion routine. In Step 70322, the console checks to see whether the subscriber is configured to place international calls. If not, the console plays a diagnostic message in Step 70324 and in Step 70340 returns with an indication that the number provided is not valid. In Step 70326, the console checks to see whether the number begins with the "011" prefix indicating an international number, and in Step 70327, the console checks to see whether the number provided is syntactically valid as an international dialing number. If the number does not begin with "011" or is not syntactically valid, the console in Step 70328 plays a diagnostic message and in Step 70340 returns with an indication that the number provided is not valid.

In Step 70330, the console checks to see whether Cset blocking will block the specified number. If so, the console in Step 70332 plays a diagnostic message. If no error conditions were found, the console returns a valid status in Step 70334.

Implementation of the improved directline MCI product as described above has the following impacts on billing procedures.

directlineMCI domestic Bill Type: 15
directlineMCI international Bill Type: 115
directlineMCI Call Types:

| Call Type | Call Description |
|---|---|
| 52 | Transfer to Customer Service |
| 138 | User Call Completion |
| 139 | User Administration Call |
| 140 | Guest termination to programmed number |
| 141 | Guest termination to voicemail |
| 142 | Guest termination to billing number (and defaults, see below) |
| 143 | Pager termination |
| 144 | Message delivery |
| 145 | Guest termination to Fax |
| 146 | Guest termination to Inactive Account |
| 147 | User termination to voice / fax mail |
| 178 | Op Assist User Call Completion |
| 179 | Op Assist Guest Termination to programmed number |
| 336 | Op Assist Guest Termination to Billing number |
| 337 | Op Assist Guest Termination to voicemail |
| 338 | Op Assist Guest Termination to Pager |
| 339 | Op Assist Guest Termination to Fax |
| 340 | Op Assist User Termination to voice/fax platform |

Billing Detail Records and OSR's for billing, and SCAI messaging for reorigination, are populated as follows for the various directlineMCI Call Types:

Bill Type 115 is not applicable for BDR's generated by the VFP (Call Types 144); because all these calls are originated at the VFP, they are all be billed as domestically originated, using Bill Type 15.

Guest termination to Inactive Account

| | |
|---|---|
| Billable Call? | N |
| Bill Type: | 15 OR 115 |
| Call Type: | 146 |
| Terminating Number: | Blank |
| Billing Number number* + 0000 | Account |
| Originating Number | Originating ANI |
| Termination Method | 02 |
| Termination Status | 00** |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - call completion

| | |
|---|---|
| Billable Call | N |
| Bill Type: | 15 OR 115 |
| Call Type: | 140 OR 142 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - call completion (Console)

| | |
|---|---|
| Billable Call | N |
| Bill Type: | 15 OR 115 |
| Call Type: | 179 OR 336 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

A Guest Disconnect BDR may have a different Call Type, depending on at what point in the call flow the disconnect came Guest Disconnect - voicemail completion

| | |
|---|---|
| Billable Call | N |
| Bill Type: | 15 OR 115 |
| Call Type: | 141 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - voicemail completion (Console)

-continued

| | |
|---|---|
| Billable Call | N |
| Bill Type: | 15 OR 115 |
| Call Type: | 337 |
| Terminating Number: | Blank |
| Billing Number | Account number |
| + 0000 | |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - fax completion

| | |
|---|---|
| Billable Call | N |
| Bill Type: | 15 OR 115 |
| Call Type: | 145 |
| Terminating Number: | Blank |
| Billing Number | Account number |
| + 0000 | |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - fax completion (Console)

| | |
|---|---|
| Billable Call | N |
| Bill Type: | 15 OR 115 |
| Call Type: | 339 |
| Terminating Number: | Blank |
| Billing Number | Account number |
| + 0000 | |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - pager completion

| | |
|---|---|
| Billable Call | N |
| Bill Type: | 15 OR 115 |
| Call Type: | 140 OR 142 |
| Terminating Number: | Blank |
| Billing Number | Account number |
| + 0000 | |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Disconnect - call completion (Console)

| | |
|---|---|
| Billable Call | N |
| Bill Type: | 15 OR 115 |
| Call Type: | 179 OR 336 |
| Terminating Number: | Blank |

-continued

| | |
|---|---|
| Billing Number | Account number |
| + 0000 | |
| Originating Number | Originating ANI |
| Termination Method | 01 |
| Termination Status | 262 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest termination to Fax - Mailbox full

| | |
|---|---|
| Billable Call? | N |
| Bill Type: | 15 OR 115 |
| Call Type: | 145 |
| Terminating Number: | Fax |
| Routing Number | |
| Billing Number | Account number |
| + 0000 | |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | N |
| SCAI BNOA | 7C |

Guest termination to Fax - Mailbox full (Console)

| | |
|---|---|
| Billable Call? | N |
| Bill Type: | 15 OR 115 |
| Call Type: | 339 |
| Terminating Number: | Fax |
| Routing Number | |
| Billing Number | Account number |
| + 0000 | |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | N |
| SCAI BNOA | 7C |

Guest termination to Fax - Normal

| | |
|---|---|
| Billable Call? | Y - Match/Merge |
| Bill Type: | 15 OR 115 |
| Call Type: | 145 |
| Terminating Number: | Fax |
| Routing Number | |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest termination to Fax - Normal (Console)

| | |
|---|---|
| Billable Call? | Y - Match/Merge |
| Bill Type: | 15 OR 115 |
| Call Type: | 339 |
| Terminating Number: | Fax |
| Routing Number | |

-continued

| | |
|---|---|
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest termination to Voicemail

| | |
|---|---|
| Billable Call? | Y - Match/Merge |
| Bill Type: | 15 OR 115 |
| Call Type: | 141 |
| Terminating Number: Routing Number | Voicemail |
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest termination to Voicemail (Console)

| | |
|---|---|
| Billable Call? | Y - Match/Merge |
| Bill Type: | 15 OR 115 |
| Call Type: | 337 |
| Terminating Number: Routing Number | Voicemail |
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest Term to Closing Message

| | |
|---|---|
| Billable Call? | N |
| Bill Type: | 15 OR 115 |
| Call Type: | 140 OR 142 |
| Terminating Number: | Blank |
| Billing Number + 0000 | Account number |
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Closing Message (Console)

| | |
|---|---|
| Billable Call? | N |
| Bill Type: | 15 OR 115 |
| Call Type: | 179 OR 336 |
| Terminating Number: | Blank |
| Billing Number + 0000 | Account number |

-continued

| | |
|---|---|
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Closing Message - Voicemail handshake failure

| | |
|---|---|
| Billable Call? | N |
| Bill Type: | 15 OR 115 |
| Call Type: | 141 |
| Terminating Number: | Blank |
| Billing Number + 0000 | Account number |
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Closing Message - Voicemail handshake failure (Console)

| | |
|---|---|
| Billable Call? | N |
| Bill Type: | 15 OR 115 |
| Call Type: | 337 |
| Terminating Number: | Blank |
| Billing Number + 0000 | Account number |
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Closing Message - Fax handshake failure

| | |
|---|---|
| Billable Call? | N |
| Bill Type: | 15 OR 115 |
| Call Type: | 145 |
| Terminating Number: | Blank |
| Billing Number + 0000 | Account number |
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Closing Message - Fax handshake failure (Console)

| | |
|---|---|
| Billable Call? | N |
| Bill Type: | 15 OR 115 |
| Call Type: | 339 |
| Terminating Number: | Blank |
| Billing Number + 0000 | Account number |

-continued

| | |
|---|---|
| Originating Number | Originating ANI |
| Termination Method | 02 |
| Termination Status | 00 |
| Miscellaneous 1 | Account number |
| Miscellaneous 2 | |
| Miscellaneous 3 | |
| OSR-Only Flag | N |
| OSR Entry Code | 08 |
| SCAI OIR Flag | n/a |
| SCAI BNOA | n/a |

Guest Term to Billing Number

| | |
|---|---|
| Billable Call? | Y - |
| Match/Merge | |
| Bill Type: | 15 OR 115 |
| Call Type: | 142 |
| Terminating Number: | Billing Number |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest Term to Billing Number (Console)

| | |
|---|---|
| Billable Call? | Y - Match/Merge |
| Bill Type: | 15 OR 115 |
| Call Type: | 336 |
| Terminating Number: | Billing Number |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest term to Programmed Number

| | |
|---|---|
| Billable Call? | Y - |
| Match/Merge | |
| Bill Type: | 15 OR 115 |
| Call Type: | 140 |
| Terminating Number: | Programmed |
| number | |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest term to Programmed Number (Console)

| | |
|---|---|
| Billable Call? | Y - |
| Match/Merge | |
| Bill Type: | 15 OR 115 |
| Call Type: | 179 |
| Terminating Number: | Programmed |
| number | |
| Billing Number | Account number |

-continued

| | |
|---|---|
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 90 |
| SCAI OIR Flag | N |
| SCAI BNOA | 7C |

Guest Transfer to Operator

| | |
|---|---|
| Billable Call? | N |
| Bill Type: | 15 OR 115 |
| Call Type: | 140 OR 142 |
| Terminating Number: | Transfer Routing |
| Number | |
| Billing Number | Account number |
| + 0000 | |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | N |
| SCAI BNOA | 7C |

Guest termination to Pager

| | |
|---|---|
| Billable Call? | Y - BDR Only |
| Bill Type: | 15 OR 115 |
| Call Type: | 143 |
| Terminating Number: | Pager Routing |
| Number | |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | Callbacknumber |
| OSR-Only Flag | N |
| OSR Entry Code | 08 |
| SCAI OIR Flag | n/a |
| SCAI BNOA | n/a |

Guest termination to Pager (Console)

| | |
|---|---|
| Billable Call? | Y - BDR Only |
| Bill Type: | 15 OR 115 |
| Call Type: | 338 |
| Terminating Number: | Pager Routing |
| Number | |
| Billing Number | Account number |
| + 0000 | |
| Originating Number | Originating ANI |
| Termination Method | 00 |
| Termination Status | 257 |
| Miscellaneous 1 | Account number |
| Miscellaneous 2 | |
| Miscellaneous 3 | Callback |
| number | |
| OSR-Only Flag | N |
| OSR Entry Code | 08 |
| SCAI OIR Flag | n/a |
| SCAI BNOA | n/a |

User termination to voicemail - message retrieval

| | |
|---|---|
| Billable Call? | Y - Match/Merge |
| Bill Type: | 15 OR 115 |
| Call Type: | 147 |
| Terminating Number: | Voicemail |
| Routing Number | |

-continued

| | |
|---|---|
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 80 |
| SCAI OIR Flag | Y |
| SCAI BNOA | 7C |

User termination to voicemail - message retrieval (Console)

| | |
|---|---|
| Billable Call? | Y - Match/Merge |
| Bill Type: | 15 OR 115 |
| Call Type: | 340 |
| Terminating Number: Routing Number | Voicemail |
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 80 |
| SCAI OIR Flag | Y |
| SCAI BNOA | 7C |

User termination to voicemail - administration call

| | |
|---|---|
| Billable Call? | N |
| Bill Type: | 15 OR 115 |
| Call Type: | 147 |
| Terminating Number: Routing Number | Voicemail |
| Billing Number + 0000 | Account number |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | Y |
| SCAI BNOA | 7C |

User Call Completion

| | |
|---|---|
| Billable Call? Match/Merge | Y - |
| Bill Type: | 15 OR 115 |
| Call Type: | 138 |
| Terminating Number: Input/Speed Dial ANI | Customer |
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 80 |
| SCAI OIR Flag | Y |
| SCAI BNOA | 7C |

User Call Completion - Console

| | |
|---|---|
| Billable Call? Match/Merge | Y - |
| Bill Type: | 15 OR 115 |
| Call Type: | 178 |
| Terminating Number: Input/Speed Dial ANI | Customer |
| Billing Number + 0000 | Account number |
| Originating Number | Originating ANI |
| Termination Method | 00 |
| Termination Status | 257 |
| Miscellaneous 1 | Account number |
| Miscellaneous 2 | |
| Miscellaneous 3 | |
| OSR-Only Flag | N |
| OSR Entry Code | 80 |
| SCAI OIR Flag | Y |
| SCAI BNOA | 7C |

Subscriber Administration Call

| | |
|---|---|
| Billable Call? | N |
| Bill Type: | 15 OR 115 |
| Call Type: | 139 |
| Terminating Number: | Blank |
| Billing Number + 0000 | Account number |
| Originating Number | Originating ANI |
| Termination Method | 08 |
| Termination Status | 257 |
| Miscellaneous 1 | Account number |
| Miscellaneous 2 information | Programmed |
| Miscellaneous 3 | |
| OSR-Only Flag | N |
| OSR Entry Code | 08 |
| SCAI OIR Flag | n/a |
| SCAI BNOA | n/a |

Subscriber Disconnect - programming or no choice at User Menu

| | |
|---|---|
| Billable Call? | N |
| Bill Type: | 15 OR 115 |
| Call Type: | 139 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 information | Programmed |
| Miscellaneous 3 | |
| OSR-Only Flag | N |
| OSR Entry Code | 08 |
| SCAI OIR Flag | n/a |
| SCAI BNOA | n/a |

Subscriber Disconnect - No choice at User Menu (Console)

| | |
|---|---|
| Billable Call? | N |
| Bill Type: | 15 OR 115 |
| Call Type: | 340 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 information | Programmed |
| Miscellaneous 3 | |
| OSR-Only Flag | N |
| OSR Entry Code | 08 |
| SCAI OIR Flag | n/a |
| SCAI BNOA | n/a |

| Subscriber Disconnect - call completion | |
|---|---|
| Billable Call? | N |
| Bill Type: | 15 OR 115 |
| Call Type: | 138 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 | Programmed information |
| Miscellaneous 3 | |
| OSR-Only Flag | N |
| OSR Entry Code | 08 |
| SCAI OIR Flag | n/a |
| SCAI BNOA | n/a |

| Subscriber Disconnect - call completion (Console) | |
|---|---|
| Billable Call? | N |
| Bill Type: | 15 OR 115 |
| Call Type: | 178 |
| Terminating Number: | Blank |
| Billing Number + 0000 | Account number |
| Originating Number | Originating ANI |
| Termination Method | 01 |
| Termination Status | 262 |
| Miscellaneous 1 | Account number |
| Miscellaneous 2 | Programmed information |
| Miscellaneous 3 | |
| OSR-Only Flag | N |
| OSR Entry Code | 08 |
| SCAI OIR Flag | n/a |
| SCAI BNOA | n/a |

| User Transfer to Customer Service | |
|---|---|
| Billable Call? | N |
| Bill Type: | 70 |
| Call Type: | 52 |
| Terminating Number: | Transfer Routing Number |
| Billing Number + 0000 | Account number |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | N |
| SCAI BNOA | 7C |

| User Transfer to Operator | |
|---|---|
| Billable Call? | N |
| Bill Type: | 15 OR 115 |
| Call Type: | 138 |
| Terminating Number: | Transfer Routing Number |
| Billing Number + 0000 | Account number |
| Originating Number | Originating ANI |
| Termination Method | 03 |
| Termination Status | 257 |
| Miscellaneous 1 | Account number |
| Miscellaneous 2 | |
| Miscellaneous 3 | |
| OSR-Only Flag | N |
| OSR Entry Code | 08 |
| SCAI OIR Flag | N |
| SCAI BNOA | 7C |

*Account number refers to the user's 800/8xx access number
**Termination Status is suggested; other values may be more appropriate The following are the new directlineMCI scripts for the automated response unit (ARU), referencing the corresponding call flow diagram on which they appear:

| Call Flow Diagram | IV Number | ARU Script Number | Text |
|---|---|---|---|
| All | 7330001 | 1 | Press 1. |
| | 7330002 | 2 | Press 2. |
| | 7330003 | 3 | Press 3. |
| | 7330004 | 4 | Press 4. |
| | 7330005 | 5 | Press 5. |
| | 7330006 | 6 | Press 6. |
| | 7330007 | 7 | Press 7. |
| | 7330008 | 8 | Press 8. |
| | 7330009 | 9 | Press 9. |
| | 7330010 | 10 | Press 0. |
| | 7330011 | 11 | Press *. |
| | 7330012 | 12 | Press #. |
| 1 | 7330101 | 101 | I'm sorry, calls are not being accepted at this time. |
| 2 | 7330201 | 201 | Welcome to directlineMCI! |
| 3 | 7330301 | 301 | To speak to your party . . . |
| | 7330302 | 302 | To leave a voicemail message . . . |
| | 7330303 | 303 | To send a fax . . . |
| | 7330304 | 304 | To send a page . . . |
| | 7330306 | 306 | Please hold while I transfer you to voicemail. |
| | 7330307 | 307 | I'm sorry, your party's mailbox is full |
| | 7330308 | 308 | Please hold to send a fax. |
| 4 | 7330401 | 401 | Your party has requested that you leave a voicemail message. |
| | 7330403 | 403 | Your party has requested that you send a page. |
| | 7330404 | 404 | Please hold while I try to reach your party. |
| | 7330405 | 405 | I am still trying to reach your party. Please continue to hold |
| | 7330406 | 406 | I am unable to reach your party at this time. |
| 6 | 7330408 | 408 | May I please have your name? |
| | 7330409 | 409 | Please hold while I transfer you to the operator. |
| 7 | 7330701 | 701 | You have a call from . . . |
| | 7330702 | 702 | . . . at . . . |
| | 7330703 | 703 | . . . an undetermined location. |
| | 7330704 | 704 | . . . an international location. |
| 8 | 7330801 | 801 | To accept the call . . . |
| | 7330802 | 802 | To send your caller to voicemail . . . |
| | 7330803 | 803 | To have your caller try again later . . . |
| | 7330805 | 805 | Your caller will be asked to leave a voicemail message. |
| | 7330806 | 806 | Your caller will be asked to try again later. |
| | 7330807 | 807 | I'm sorry, your caller has disconnected. |
| | 7330809 | 809 | Please try your call again later. |
| 9 | 7330901 | 901 | I'm sorry, I am unable to access voicemail at this time. |
| | 7330902 | 902 | I'm sorry, I am unable to access faxmail at this time. |
| 10 | 7331001 | 1001 | Please enter your call-back number, followed by the # sign. |
| | 7331002 | 1002 | . . . will be sent |
| | 7331003 | 1003 | To re-enter your call-back number . . . |
| | 7331004 | 1004 | To continue . . . |
| | 7331006 | 1006 | No entry was received. |
| | 7331007 | 1007 | Thank you. Your page has been sent. |
| | 7331008 | 1008 | I'm sorry, I am unable to complete your page. |
| | 7331101 | 1101 | I was not able to reach your party. |
| 11 | 7331102 | 1102 | Please hold to send a page or try your call again later. |

-continued

| Call Flow Dia-gram | IV Number | ARU Script Number | Text |
|---|---|---|---|
| 12 | 7331207 | 1207 | To send a page, press 1; or, please try your call again later. |
| 13 | 7331301 | 1301 | Welcome to User Programming! |
| | 7331302 | 1302 | Your mailbox is full. Please delete your saved messages. |
| | 7331303 | 1303 | You have . . . |
| | 7331304 | 1304 | . . . new voicemail and . . . |
| | 7331305 | 1305 | . . . new fax messages. |
| | 7331306 | 1306 | . . . no . . . |
| | 7331307 | 1307 | To change your call routing . . . |
| | 7331308 | 1308 | To send or retrieve mail . . . |
| | 7331309 | 1309 | To place a call . . . |
| | 7331310 | 1310 | For account maintenance . . . |
| | 7331311 | 11311 | To reach customer service from any menu . . . |
| | 7331313 | 1313 | Please hold to retrieve your voice and fax messages. |
| | 7331314 | 1314 | For a domestic call, enter the area code and number. |
| | 7331315 | 1315 | For an international call, enter 0 1 1 and the number. |
| | 7331316 | 1316 | Please enter the phone or speed-dial number, followed by the # sign. |
| | 7331317 | 1317 | For operator assistance . . . |
| 14 | 7331401 | 1401 | I'm sorry, I am unable to access your voice/fax mailbox at this time. |
| | 7331403 | 1403 | I'm sorry, I am unable to access your distribution lists at this time. |
| | 7331404 | 1404 | I'm sorry, I am unable to record your mailbox name at this time. |
| 15 | 7331501 | 1501 | To change Find-Me routing . . . |
| | 7331502 | 1502 | To change override routing . . . |
| | 7331503 | 1503 | To change final routing . . . |
| | 7331504 | 1504 | To cancel and return to the previous menu . . . |
| | 7331507 | 1507 | Override routing is currently set to . . . |
| | 7331508 | 1508 | . . . voicemail. |
| | 7331509 | 1509 | . . . pager. |
| | 7331510 | 1510 | . . . your Find-Me sequence. |
| | 7331512 | 1512 | Your override routing is currently turned off. |
| | 7331513 | 1513 | To set override routing to a telephone number . . . |
| | 7331514 | 1514 | To set override routing to voicemail . . . |
| | 7331515 | 1515 | To set override routing to your pager . . . |
| | 7331516 | 1516 | To set override routing to your Find-Me sequence . . . |
| | 7331517 | 1517 | To turn off override routing . . . |
| | 7331519 | 1519 | Your final routing is currently set to . . . |
| | 7331520 | 1520 | . . . the voicemail or pager option. |
| | 7331523 | 1523 | . . . a closing message. |
| | 7331525 | 1525 | To set finalrouting to the voicemail or pager option . . . |
| | 7331526 | 1526 | To set finalrouting to your voicemail . . . |
| | 7331527 | 1527 | To set finalrouting to your pager . . . |
| | 7331528 | 1528 | To set finalrouting to a closing message . . . |
| 16 | 7331601 | 1601 | Your Find-Me routing is set to your schedule. |
| | 7331602 | 1602 | Your Find-Me routing is set to your three-number sequence. |
| | 7331604 | 1604 | To change to your three-number sequence . . . |
| | 7331606 | 1606 | To save and continue . . . |
| 17 | 7331701 | 1701 | To change your first number . . . |
| | 7331702 | 1702 | To change your second number . . . |
| | 7331703 | 1703 | To change your third number . . . |
| | 7331704 | 1704 | To review all three numbers . . . |
| | 7331705 | 1705 | To change to schedule routing . . . |
| | 7331708 | 1708 | Your first number is set to . . . |
| | 7331709 | 1709 | Your second number is set to . . . |
| | 7331710 | 1710 | Your third number is set to . . . |
| | 7331711 | 1711 | Your second number is currently not programmed. |

-continued

| Call Flow Dia-gram | IV Number | ARU Script Number | Text |
|---|---|---|---|
| | 7331712 | 1712 | Your third number is currently not programmed. |
| | 7331713 | 1713 | You do not have a schedule set up at this time. Please contact customer service. |
| 18 | 7331801 | 1801 | To create or update your lists. |
| | 7331802 | 1802 | To record your greeting or mailbox name . . . |
| | 7331803 | 1803 | To activate or deactivate features . . . |
| | 7331806 | 1806 | For broadcast lists . . . |
| | 7331807 | 1807 | For speed-dial numbers . . . |
| | 7331808 | 1808 | Please hold to update broadcast lists. |
| | 7331809 | 1809 | For your personal greeting . . . |
| | 7331810 | 1810 | For your mailbox name . . . |
| | 7331811 | 1811 | Please hold to record your mailbox name. |
| | 7331812 | 1812 | Your current greeting is . . . |
| 19 | 7331901 | 1901 | To change speed-dial number . . . |
| | 7331911 | 1911 | Speed-dial number . . . |
| | 7331912 | 1912 | . . . is set to . . . |
| | 7331913 | 1913 | . . . is currently not programmed. |
| | 7331914 | 1914 | To record a new greeting . . . |
| | 7331915 | 1915 | To use the system greeting . . . |
| | 7331916 | 1916 | Begin recording after the tone. |
| | 7331917 | 1917 | To review your greeting . . . |
| | 7331918 | 1918 | To re-record your greeting . . . |
| | 7331921 | 1921 | Your callers will now hear the system greeting. |
| | 7331922 | 1922 | Your new greeting has been saved. |
| 20 | 7334000 | 4000 | To set caller-screening . . . |
| | 7334001 | 4001 | To activate or deactivate your pager . . . |
| | 7334002 | 4002 | To set pager notification . . . |
| | 7334003 | 4003 | To activate or deactivate your account . . . |
| | 7334005 | 4005 | Caller-screening is set to . . . |
| | 7334006 | 4006 | Caller-screening is currently turned off. |
| | 7334007 | 4007 | . . . number only. |
| | 7334008 | 4008 | . . . name only. |
| | 7334009 | 4009 | . . . name and number. |
| | 7334010 | 4010 | To set caller-screening to number only . . . |
| | 7334011 | 4011 | To set caller-screening to name only . . . |
| | 7334012 | 4012 | To set caller-screening to name and number . . . |
| | 7334013 | 4013 | To turn off caller-screening . . . |
| | 7334015 | 4015 | Your callers will be given the option to page you. |
| | 7334016 | 4016 | Your callers will not be given the option to page you. |
| | 7334017 | 4017 | Your account has been activated. |
| | 7334018 | 4018 | Your account has been deactivated. |
| | 7334019 | 4019 | You are currently being paged for . . . |
| | 7334020 | 4020 | . . . new voicemail messages. |
| | 7334021 | 4021 | . . . new fax messages. |
| | 7334022 | 4022 | . . . new voicemail and fax messages. |
| | 7334023 | 4023 | Pager notification is currently turned off. |
| | 7334024 | 4024 | To be paged for voicemail messages . . . |
| | 7334025 | 4025 | To be paged for fax messages . . . |
| | 7334026 | 4026 | To be paged for voice and fax messages . . . |
| | 7334027 | 4027 | To turn off pager notification . . . |
| 21 | 7334101 | 4101 | For a domestic number, enter the area code and number. |
| | 7334102 | 4102 | For an international number, enter 0 1 1 and the number. |
| | 7334103 | 4103 | To erase this number . . . |
| | 7334105 | 4105 | To re-enter the number . . . |
| | 7334107 | 4107 | Your override routing will be deactivated. |
| | 7334108 | 4108 | Your override routing will be changed to . . . |
| | 7334111 | 4111 | Please hold for customer service. |
| | 7334112 | 4112 | Your finalrouting will be changed to . . . |
| | 7334116 | 4116 | Your first number will be changed to . . . |
| | 7334117 | 4117 | Your second number will be erased. |
| | 7334118 | 4118 | Your second number will be changed to . . . |
| | 7334119 | 4119 | Your third number will be erased. |
| | 7334120 | 4120 | Your third number will be changed to . . . |

-continued

| Call Flow Diagram | IV Number | ARU Script Number | Text |
|---|---|---|---|
| | 7334121 | 4121 | This speed-dial number will be erased. |
| | 7334122 | 4122 | This speed-dial number will be changed to . . . |
| | 7334123 | 4123 | Your caller-screening will be turned off. |
| | 7334124 | 4124 | Your caller-screening will be changed to . . . |
| | 7334128 | 4128 | Your pager notification will be turned off. |
| | 7334129 | 4129 | You will be paged for . . . |
| 22 | 7330309 | 309 | That option is not available. |
| 23 | 7330102 | 102 | That entry is invalid. |
| | 7330103 | 103 | Please re-enter your passcode. |
| 24 | 7334401 | 4401 | I'm sorry, domestic calls are not available. |
| | 7334403 | 4403 | I'm sorry, calls to that number are blocked. |
| 25 | 7332501 | 2501 | I'm sorry, international calls are not available. |
| 26 | 7332601 | 2601 | I'm sorry, you may not program a domestic number. |
| 27 | 7332701 | 2701 | I'm sorry, you may not program an international number. |

The following are the new directlineMCI scripts for the Console Application:

| Call Flow Diagram | Console Script Number | Text |
|---|---|---|
| 1 | 14160 | Welcome to directlineMCI<br>Calls are not currently being accepted on this account<br>{CourtesyClose} |
| | 22008 | MCI Operator!<br>How may I help you reach your party? |
| | 22005 | MCI Operator!<br>{Press User Prog if caller is account owner} |
| 2 | 22033 | Your party has requested that you leave a voicemail message; please hold<br>{Procedure Call} |
| | 22034 | Your party has requested that you send a page<br>{Procedure Call} |
| | 22037 | Please try your call again later<br>{CourtesyClose} |
| 3 | 22031 | Please hold while I try to reach your party.<br>{Procedure Call} |
| | 15848 | MCI Operator!<br>Please hold while I try to reach your party<br>{Proc Call} |
| | 15844 | I am still trying to reach your party; please continue to hold<br>{Proc Call} |
| | 15849 | MCI Operator!<br>I am still trying to reach your party; please continue to hold<br>{Proc Call} |
| | 33000 | {Press YES if answered, BUSY if busy, NO if no answer after 4–5 rings.ANSMACHforAnswer Machine.} |
| 4 | 22036 | This is the MCI Operator.<br>You have a call from NAME and/or ANI; would you like to speak to your caller? |
| | 15845 | I'm sorry, I'm unable to reach your party at this time<br>{Proc Call} |
| | 22032 | Thank you; your call is connected<br>{Proc Call} |
| 5 | 7115 | Please hold while I transfer you to voicemail<br>{Proc Call} |
| | 22900 | I'm sorry, your party's voice mailbox is full<br>{Procedure Call} |
| | 22104 | I'm sorry, I'm unable to access voicemail at this time<br>{Procedure Call} |

-continued

| Call Flow Diagram | Console Script Number | Text |
|---|---|---|
| | 22340 | Please hold to send a fax<br>{Procedure Call} |
| | 22105 | I'm sorry, I'm unable to access faxmail at this time<br>{Procedure Call} |
| 6 | 15865 | What callback number would you like to send? |
| | 15866 | MCI Operator!<br>What callback number would you like to send? |
| | 22375 | Please hold while your page is sent<br>{Procedure Call} |
| | 15863 | Your page has been sent. Thank you!<br>{Disconnect} |
| | 15693 | I'm sorry; I'm unable to complete your page<br>{Procedure Call} |
| | 22035 | What is your name, please? |
| 7 | 15860 | I'm sorry, I'm unable to reach your party at this time; would you like to send a page? |
| | 22040 | Would you like to send a page? |
| | 15842 | I'm sorry, I'm unable to reach your party at this time; please try your call again later<br>{Courtesy Close} |
| 8 | 22038 | I'm sorry, I'm unable to reach your party at this time; would you like to leave a voicemail message, or send a page? |
| 9 | 22003 | May I please have your passcode? |
| | 22102 | Please repeat your passcode |
| | 22017 | I'm sorry; that is not a valid passcode<br>{Offer Customer Service or disconnect} |
| 10 | 22901 | Your mailbox is full; please delete your saved messages<br>{Procedure Call} |
| | 22902 | You have X new voicemail and Y new fax messages<br>{Procedure Call} |
| | 22400 | How may I help you? |
| | 22904 | Please hold for your voice and fax messages.<br>{Procedure Call} |
| 11 | 22905 | I'm sorry; I'm unable to access your voice / fax mailbox<br>{Procedure Call} |
| | 22906 | What number do you wish to dial?<br>{Enter number or 1-digit Speed Dial number} |
| | 22908 | MCI Operator!<br>What number do you wish to dial?<br>{Enter number of 1-digit Speed Dial number} |
| | 22907 | Thank you; please hold while your call is connected<br>{Procedure Call} |
| 13 | 15063 | I'm sorry; domestic termination are not available<br>{Procedure Call} |
| | 15053 | I'm sorry; that is not a valid domestic number<br>{Procedure Call} |
| | 15057 | I'm sorry; calls to that number are blocked<br>{Procedure Call} |
| 14 | 15061 | I'm sorry; international termination are not available<br>{Procedure Call} |
| | 15051 | I'm sorry; that is not a valid international number<br>{Procedure Call} |
| | 16001 | (PressGENASSTtoprocessaNoD-DialCall} |

ARU impacts are described in detail below, as well as in the call flow diagrams.

User input

In general, throughout the call flow, at every opportunity for user/caller input, the possibility of response delay is minimized as much as possible.

Following are some examples:

During 'guest' portion of the call, the subscriber may enter '*', at which time the NIDS Audio Server (NAS) begins to collect 6 passcode digits, applying an inter-digit timeout.

During playing of the Guest Menu, a single key pressed results in an immediate response, unless the key pressed is the '*' key, at which point the NAS collects six passcode digits.

During playing of any User Menu, a single key pressed results in an immediate response, except in the Outbound Call menu. Because a domestic telephone number, an international telephone number, or a Speed Dial number can be entered here, the system allows the user to press '#', which indicates the end of dialed digits. The '#' is accepted whether it's entered following a single digit entry or a string of digits, i.e. a telephone number.

At any place in the call flow where the user is able to enter a domestic or international number, the '#' key must be accepted to indicate the end of dialed digits. This includes during programming of the First, Second or Third Find-Me numbers, Override Routing to POTS and Speed Dial numbers.

Where possible, the ability for the user to 'power dial' is built into the call flow. This means that, in the event that multiple keys are pressed, scripting is bypassed and the appropriate menu is reached.

One access method is supported for directlineMCI in this embodiment: 800/8xx number access, with no PIN. The PIN field in the database is defaulted to 0000.

Billed Number Screening (Fraud) Validation

All directlineMCI calls received are subject to a Billed Number Screening validation, to verify that the number has not been tagged as a Fraud risk. The lookup is into Category 5, Type 0; the flag checked is the Credit Card (Hot) flag. In the event that the number has been 'shut down', i.e. the Hot flag is set to 'Y', the application treats the call as an off-line account, but does not allow a subscriber to access programming options.

WorldPhone

Callers are able to access the directlineMCI platform via WorldPhone. In a preferred embodiment, these calls arrive at the directline platform with a pseudo-ANI in the Originating Number field of the SCAI message. This pseudo-ANI is associated with the specific Feature Group A (FGA) circuit on which the WorldPhone call extension was launched. In another embodiment, the true originating country information is forwarded to the directline platform; the Originating Number field is populated with the 3-digit Country Code.

In a preferred embodiment, the WorldPhone-originated directline call is billed as follows:

Calls originating via WorldPhone, and arriving at the directline platform with a pseudo-ANI as the origination, are billed as domestic, using Bill Type 15. The Originating Number field in the BDR is the FGA pseudo-ANI.

In another embodiment, the call is billed as follows:

The ARU and Console implement code to identify whether the Originating Number field contains a pseudo-ANI or true origination information. If the true Country Code origination information is provided, the application refers to its configuration files, where a WorldPhone pseudo-ANI is an optional entry. The existence of this item in the configuration file indicates to the application how the call should be billed.

If the application finds a WorldPhone pseudo-ANI in its config file, the call is billed as domestic, using Bill Type 15. The Calling Number in the BDR is set to that WorldPhone pseudo-ANI, and the application instructs the bridging switch to change its Originating Number to that same pseudo-ANI.

If the application does not find the WorldPhone pseudo-ANI in its config file, the call is billed as international, using Bill Type 115, and the Originating Number information is retained in the switch record. The BDR is populated with a 10-digit string: '191'+3-digit Country Code+'0000'.

Guest call routing is prescribed by the directlineMCI subscriber in several ways, as described in the following paragraphs:

Blocking checks for guest termination, based on origination, are included below.

Call Routing

Two options are provided to the user in defining Call Routing: the Find-Me sequence, and the Schedule sequence. With the exception of Schedule definition, the user has the ability to define Call Routing via DTMF.

3-Number Find-Me Sequence

If the user has chosen the Find-Me sequence for his Call Routing, the application launches a call to the user's Primary (First) programmed number. If a live answer is received, the guest caller is connected with the answering party. Call screening, described below, may be active, in which case the answering party must actively accept the call before it is connected. If the line at the First number is busy, the call is routed to the user's programmed Alternate Routing, described below. If no answer is detected after a configurable time, the application launches a call to the user's Secondary (Second) programmed number.

Answer treatment at the Second number is the same as for a call attempt to the First number with no answer resulting in a call attempt to the user's Tertiary (Third) number. Answer treatment at the Third number is the same, with no answer resulting in Alternate Routing.

If, at any point in this calling sequence, a termination slot is not programmed, the application skips that number in the sequence, and proceed to the next number, or Alternate Routing.

For any programmed international termination, the application looks up the terminating country code in the Country Code tables. If the Direct Dial Country flag is set to 'Y' for that country, the ARU transfers the call to the manual console (TTC=1e) for processing.

2-Level Schedule Sequence

If the user has chosen the Schedule sequence for his Call Routing, the application takes the Schedule 1 Trans and Schedule 2 Trans fields to use as keys into the 800 Translation database to retrieve schedule information. From the user's two schedule translations, and using the current day and time, the First and Second Schedule numbers are determined.

A call is launched to the First Schedule number, and answer treatment is as described in the Find-Me sequence, with no answer resulting in a call attempt to the Second Schedule number. Answer treatment at the Second Schedule number is the same, with no answer resulting in Alternate Routing.

Again, if at any point in the Schedule calling sequence, a terminating number cannot be found, the application skips that slot in the sequence, and proceeds to the next number, or Alternate Routing.

The user's schedule is set up during Order Entry, and is not user-updatable via DTMF. At Order Entry, the user is asked to define his schedule by Date, Day of Week, Time of Day (in 30 minute increments), and by Time Zone.

Override Routing

The option is available, via DTMF, for the user to disable the presentation of the Guest Menu by prescribing specific routing for all guest callers. Via Override Routing, the user is able to: route callers to a single telephone number, have callers leave a voicemail message, have callers page him, or route callers through his programmed Call Routing (Find-Me or Schedule).

If the user has programmed Override Routing to route to a telephone number, no answer at that number results in Alternate Routing treatment.

Alternate Routing

Alternate Routing allows the user to define, via DTMF, the treatment of a caller for whom an attempt to reach the subscriber has been made, but no answer was received. Alternate Routing options include Voicemail, Pager, Closing Message, or the Guest Option of Voicemail or Pager. The default for Alternate Routing, if not programmed, is the playing of the Closing Message.

Default Routing

The user is able to prescribe at Order Entry the treatment for a caller who, when presented the Guest Menu, does not respond after two attempts. The Default Routing options are: a transfer to the Operator (TTC=67), where the Guest menu is presented again, a telephone number, with no answer resulting in Alternate Routing, Voicemail, or Call Routing (Find-Me or Schedule). The default for Default Routing, if it's not programmed, is the Operator transfer.

Call Screening

The user may choose to have Call Screening invoked, to announce all guest callers. Call Screening options include pre-programming of Name Only, ANI Only, Name and ANI, and No Call Screening. The user has the ability to program Call Screening via DTMF.

When Name Only or Name and ANI screening is programmed, the caller's name is recorded. If the caller does not respond to the prompt, and nothing is recorded, the system will default to ANI Only screening. When an answer is received at a terminating telephone number, the caller's Name and/or ANI is played and the answering party is asked to accept or reject the call. If the call is accepted, the caller is connected. If Caller Screening includes ANI screening, and the originating number is a Country Code, the scripts ' . . . an international location' will be played in place of the ANI.

If the call is rejected, or no response is received from the answering party, the caller is asked to leave a voicemail message, or the Closing Message is played, if the user has not subscribed to Voicemail.

Timeout Parameters

Timeout values are defined, in seconds, in the directlineMCI database for the following termination:

| For this termination: | Use this timeout value: |
|---|---|
| First Find-Me | Primary Timeout |
| Second Find-Me | Secondary Timeout |
| Third Find-Me | Tertiary Timeout |
| Schedule 1 | Primary Timeout |
| Schedule 2 | Secondary Timeout |
| Override Routing, if telephone number | Override Timeout |
| Default Routing, if telephone number | Default Timeout |

These timeout values are defaulted to 25 (seconds), but the user is allowed to change them via Customer Service.

Call Connection times

Call connection delays, when a guest call to a programmed termination is completed, are minimized as much as possible.

Answer detection

For all call attempts to a telephone number, treatment on detection of an answering machine is defined by the Roll on Machine Detect flag (State flag, bit 9). If this flag is set to 'N', the caller is connected to the answering machine . If the flag is set to 'Y', the application routes to the next number in the calling sequence or Alternate Routing.

Current answer detection performance on the ISN is as follows: The NAS correctly detects a live answer at 99% reliability; a machine is correctly detected at 67% reliability.

For any Answer Detection responses not addressed specifically in this requirement, Fast-Busy for example, treatment is as described for a No Answer condition.

Programmed Number Validation

The user has the ability to program a telephone number in his First, Second, and Third Find-Me numbers, and Override Routing. Before a number is accepted for programming, the application makes the following validation checks:

Domestic numbers

The Domestic Terms flag (PIN bit 1) is examined to ensure that the user is authorized to program a domestic number The International Blocking database is queried, using Category 000, Type 002, and the programmed NPA, looking for a pattern match, to ensure that the programmed number is not a blocked Information/Adult Services number.

The Exchange Master is examined to determine whether the termination is an NADP number. If so, Country Set blocking is applied. The Pseudo-Country Code (PCC) associated with the programmed number is validated against the Country Set found in the directlineMCI Property Record. If that PCC is blocked, programming to that number is not allowed. International numbers.

The International Terms flag (PIN bit 2) is examined to ensure that the user is authorized to program a international number.

The Country Set from the directlineMCI Property Record is retrieved, and the application verifies that the programmed Country Code is not blocked for that Country Set.

Blocking checks for programming guest termination are included below.

The Call Flow diagram depicts the various situations for which a transfer to the Voice/Fax Platform (VFP) is necessary. A transfer is implemented using the routing number in the Voicemail Route Number field of the customer record.

In order to 'mask' some of the delay in call extension to the VFP, the call is extended before the 'please hold' script is played to the caller. Call extension delay is reduced additionally by removing inter-digit timeouts, as described previously. After launching a call and playing the script, the application awaits answer detection, at which time the user's directlineMCI access number (800/8xx 1 number) is outpulsed to the VFP, followed by a '*', then a single mode digit, which indicates to the VFP the type of transfer to process, followed by a '#'. The mode indicator is one of the values, described in the table that follows. To ensure that the information has been received and validated by the VFP, the application awaits the playing of two DTMF '00' tones from the VFP, then the caller is connected.

| Mode indicator | Transfer type |
|---|---|
| 1 | Guest voicemail |
| 2 | Guest fax with voice annotation |
| 3 | Guest fax without annotation |
| 4 | User voice/fax retrieval |

-continued

| Mode indicator | Transfer type |
|---|---|
| 5 | User list maintenance |
| 6 | User recording of mailbox name |

A VFP transfer attempt is considered failed if two handshake attempts have failed. If a Guest transfer to voice or faxmail fails during Override, Default, or Alternate Routing, the guest caller is asked to try his call again later. If a Guest transfer fails on a Guest Menu choice, the menu will be presented again. If a user transfer to voice or faxmail fails, a script will be played, informing the user of the failure, and the user is returned to the previous menu.

A guest fax transfer without annotation occurs when, at the outset of the call, fax tone is detected. Fax tone detection is independent of the presentation of the welcome message, so the length of the greeting has no effects on the reliable detection of fax tones.

When a user accesses User Programming, the application presents the count of new voicemail messages, new fax messages, and a full mailbox message, if applicable. The application queries this information from the VFP via the VFP_Trans Service.

The user also has the ability to define, via DTMF, whether he would like a pager notification of new voice and fax messages. Pager notification options are: Voicemail notification, Fax notification, notification of both Voicemail and Fax, and No notification. Pager notification settings are stored in the Page on Vmail flag (PIN bit 15) and Page on Fax flag (PIN bit 16).

Paging

The option to page the subscriber is one of the choices presented at the guest menu. In addition, the guest may be asked to send a page, according to the user's programmed Override or Alternate Routing.

In sending a page, the application requests the callback number from the caller. The user's customer record contains the following information used in processing the page: the Pager Access Number, used in launching the call to the pager company, the user's Pager PIN, and the Pager Type, which points to a configurable dial string for communicating the page information. The dial string provides the timeout value for waiting for answer detection, the delay following answer detection, the number of PIN digits to DTMF, and any termination characters needed, for example '#'.

If a caller disconnects after entering a callback number, the page is completed and billed.

Pager types supported are as follows:

| Pager Type | Pager Company | Pager dial string | Pager Access Number |
|---|---|---|---|
| 1 | SkyTel/MTel | A180T32R7D#ED# | 6019609560 |
| 2 | AirTouch | A180T32R7D#ED# | 6019609560 |
| 3 | Mobile Media | A180T32R7D#ED# | 6019609560 |
| 4 | AirSignal/McCaw | A180T32R7D#ED# | 6019609560 |
| 5 | American Paging | A180T32R7D#ED# | 6019609560 |
| 6 | Mobile Comm | A180T136R6T18ET32 | 8009464646* |
| 7 | MCI Page | A180T136R7T18ET32 | 8006247243* |
| 8 | MCI Word | A180T136R7T18ET32 | 8006247243* |

*800-access numbers will be routed via the DAP-looparound at the bridging switches.

The user has the ability to enable/disable the presentation of pager as a guest menu option. When pager is disabled, it is not presented at the Guest Menu, nor is it presented to the user in programming Override or Alternate Routing. The Guest Option of Voicemail or Pager also is removed from Alternate Routing programming choices. If Override Routing is set to Pager, and pager has been turned off, the call is handled as if Override were not populated. If Alternate Routing is set to Pager, and pager has been turned off, the caller is routed to voicemail, if he has it, or the closing message is presented. These are the default treatments for Override and Alternate Routing. The Pager On/Off flag (State bit 13) is where the pager's enabled/disabled status is stored.

In addition to the pager enable/disable ability, the user can define pager notification options, as described in the Voicemail/Faxmail section of this description. The VFP performs pages for notification of new voice and fax messages, and supports those pager types supported by the ISN. The status Pager On/Off flag has no impact on pager notification; the user is required to set Pager Notification to No Notification, in order to receive no notification of new messages.

Outbound Dialing

The user has the ability to make a call, billing the call to his directlineMCI account. This option is presented at the Main User Programming menu. Outbound calling options include: Domestic termination, dependent on the Domestic Completion flag (State bit 4), International termination, dependent on the International Compilations flag (State bit 5), and programmed Speed Dial termination, dependent on the Speed Dial Completion flag (State bit 6).

For any requested international completion, the application looks up the terminating country code in the Country Code tables. If the Direct Dial Country flag is set to 'Y' for that country, the ARU transfers the call to the manual console (TTC=9d) for processing.

The following validation checks are made before a call is completed for a subscriber:

Domestic numbers

The Domestic Compilations flag must be set to 'Y'

The International Blocking database is queried, using Category 000, Type 002, and the programmed NPA, looking for a pattern match, to ensure that the programmed number is not a blocked Information/Adult Services number.

The Exchange Master is examined to determine whether the termination is an NANP number. If so, Country Set blocking is applied using the Country Set found in the directline AuthCode Property record. In the case of a subscriber calling in from an international location, the Country Sets from both the Property Record of the originating country and from the directlineMCI Property Record are retrieved, and the application verifies that the PCC is not blocked for either Country Set. The Property Record for an originating country is looked up using '191'+3-digit Country Code+'0000' as key into the Property Record database.

International numbers

The International Compilations flag must be set to 'Y'

The Country Set from the directlineMCI Property Record is retrieved, and the application verifies that the destination Country Code is not blocked for that Country Set. In the case of an international origination, the Country Sets from both the Property Record of the originating country and from the directlineMCI Property Record are retrieved, and the application verifies that the destination Country Code is not blocked for either Country Set.

Blocking checks for user call compilations, based on origination, and for programming Speed Dial numbers, are included below.

Reorigination

A caller may reoriginate from a call completion, either to the VFP or a telephone number, by pressing the # key for 2 seconds. The switch verifies that reorigination is permitted for that call, and if so, it delivers the caller back to the ISN.

The status of a reoriginating caller is derived from the value in the Val Stat field of the BDR of the original call. The following table defines possible values for that field and what each value indicates:

| Val Stat Value | Caller Type | Disposition of Original Call | Reoriginatable? |
|---|---|---|---|
| 200 | Subscriber | Call Completion | Y |
| 201 | Subscriber | Voice Mail | Y |
| 202 | Subscriber | Fax * | n/a |
| 100 | Guest | Off-Line | N |
| 101 | Guest | Primary | N |
| 102 | Guest | Secondary | N |
| 103 | Guest | Tertiary | N |
| 104 | Guest | Override | N |
| 105 | Guest | Closing Message | N |
| 112 | Guest | Voice Mail | N |
| 113 | Guest | Pager | N |
| 114 | Guest | Fax | N |

* Unused - Currently there is no differentiation between subscriber access to voice mail and subscriber access to fax mail; it will be indicated with a Val Stat of 201

Additionally, # Reorigination is made available to the subscriber from completion to the voice mail/fax mail platform. This is done with two changes to the data populated in the switch record (OSR), as indicated in the Billing section.

Subscriber reorigination

A subscriber reorigination is identified as such via the Val Stat field of the original call, and the User Programming menu is presented. A subscriber who has completed to the voice/faxmail platform or to a telephone number is allowed to reoriginate.

Console Impact

Console impacts are described in detail in the following sections, as well as in the call flow diagrams.

ARU Transfers

The Console receives transfers from the ARU for the following reasons. Treatment for these transfers is indicated in the Console call flow diagrams.

| TTC | Transfer Reason | Text |
|---|---|---|
| 1e | Guest Call completion requiring Operator assistance | 'Guest call requires Operator assistance' |
| 64 | Third non-entry at pager callback number prompt | 'Pager callback number not entered properly' |
| 67 | Request or timeout at Guest Menu | 'Requested transfer or time-out at Main menu' |
| 9d | Subscriber call completion requiring Operator assistance | 'Subscriber call requires Operator assistance' |

Access Method

Refer to the Access Method section in ARU Impacts.

Direct Calling

Refer to the Direct Calling section in ARU Impacts, with the following exception:

Default Routing

Default Routing does not have an impact on the Console, except when it's been programmed or defaulted to Operator Transfer. In this case, the call will be handled as a new call, with the Guest Menu presented.

Voicemail/Faxmail

Refer to the Voicemail/Faxmail section in ARU Impacts.

Paging

Refer to the Paging section in ARU Impacts.

Outbound Dialing

Refer to the Outbound Dialing section in ARU Impacts.

Reorigination

Refer to the Reorigination section in ARU Impacts.

Flag Dependencies

Flag dependencies are shown in the following table:

| Diagram | Menu | Menu Item | Dependencies |
|---|---|---|---|
| 3 | Guest Menu | Leave a voicemail message | VMail Flag |
| | | Send a fax | Fax Termination Flag |
| | | Send a page | Pager Termination Flag AND Pager On/Off Flag |
| | | (Passcode) | Program (Follow-Me) Flag |
| 13 | User Main Menu | Change Call Routing | Find-Me Flag AND (Domestic TerminationsFlag OR International Termination Flag OR Vmail Flag OR Pager Termination Flag) |
| | | Send/Retrieve Mail | VMail Flag OR Fax Termination Flag |
| | | Place a Call | Domestic Completion Flag OR International Completion Flag OR Speed Dial Completion. Flag |
| | | Administration | Vmail Flag OR Fax Termination Flag OR Speed Dial Programming Flag OR Greeting Recording OR Call Screening Programming Flag OR Pager Termination Flag OR Avail Programming Flag |
| | Place a Call | Speed Dial Number | Speed Dial Compilations Flag |
| | | Domestic Number | Domestic Compilations Flag |
| | | International Number | International Compilations Flag |
| 15 | Change Routing | Find-Me Routing | Domestic TerminationsFlag OR International Termination Flag |
| | | Override Routing | Domestic TerminationsFlag OR International Termination Flag OR |

-continued

| Diagram | Menu | Menu Item | Dependencies |
|---|---|---|---|
| | | | Vmail Flag OR Pager Termination Flag |
| | | Alternate Routing | Vmail Flag OR Pager Termination Flag |
| | Override Routing | POTS | Domestic Termination is Flag OR International Termination Flag |
| | | Voicemail | Vmail Flag |
| | | Pager | Pager Termination Flag |
| | | Find-Me | Domestic TerminationsFlag OR International Termination Flag |
| | Alternate Routing | Guest Option | Vmail Flag AND Pager Termination Flag |
| | | Voicemail | Vmail Flag |
| | | Pager | Pager Termination Flag |
| 17 | Change 3-Number Sequence | First Number | Domestic TerminationsFlag OR International Termination Flag |
| | | Second Number | Domestic TerminationsFlag OR International Termination Flag |
| | | Third Number | Domestic TerminationsFlag OR International Termination Flag |
| | | Change to Schedule Routing | Schedule 1 Flag AND Schedule 2 Flag |
| 18 | Administration | List Maintenance | VMail Flag OR Fax Termination Flag OR Speed Dial Programming Flag |
| | | Record Greetings | Greeting Recording Flag OR Vmail Flag OR Fax Termination Flag |
| | | Activate/Deactivate Features | Call Screening Programming Flag OR Pager Termination Flag OR VMail Flag OR Fax Termination Flag OR Avail Programming Flag |
| | Lists | Broadcast Lists | VMail Flag OR Fax Termination Flag |
| | | Speed Dial Lists | Speed Dial Programming Flag |
| | Greetings | Welcome | Greeting Recording Flag |
| | | Mailbox Name | VMail Flag OR Fax Termination Flag |
| 20 | Feature Activation | Call Screening | Call Screening Programming Flag |
| | | Activate/Deactivate Pager | Pager Termination Flag |
| | | Pager Notification Options | Pager Termination Flag AND (VMail Flag OR Fax Termination Flag) |
| | | Activate/Deactivate Account | Available Programming Flag |
| | Pager Notification | Voicemail Only | VMail Flag |
| | | Fax Only | Fax Termination Flag |
| | | Voicemail and Fax | VMail Flag AND Fax Termination Flag |
| 21 | Program | Domestic number | Domestic Flag |
| | | International number | International Flag |

Blocking Checks

This description does not include flags checks; it discusses Country Set, 'Adult Services' (976), and Inter-NANP Blocking. Where needed, a default ANI Property record is used for Country Set Blocking.

976 blocking is implemented as follows:

The International Blocking database is queried, using Category 000, Type 002, and the programmed NPA, looking for a pattern match, to ensure that the programmed number is not a blocked Information/Adult Services number. If a match is found, the call/programming is not allowed.

Inter-NANP blocking is implemented as follows:

The Exchange Master is examined to determine whether the termination is an NANP number. If so, the Intra-NANP flag is checked to see if it's set to 'Y'. If it is, the Intra-Country flag for the originating number is checked. If the Intra-Country flag for the originating number is also set to 'Y', the call is blocked. If not, the call is allowed. In short, if the Intra-Country flags of both the originating and terminating numbers are 'Y', the call is blocked; if either one is set to 'N', the call is allowed.

Country Set blocking is implemented as follows:

The Country Set(s) of the directlineMCI Property record, and possibly the originating ANI/country, as indicated below, are validated against the Country Code of the termination. If the terminating country is blocked in any of the Country Sets, the call is blocked.

Guest Call Completion

| Termination G OriginationB | Domestic | NANP | International |
|---|---|---|---|
| Domestic | Inter-NANP (Allow) | Inter-NANP (Allow) Cset Blocking using Term PCC, Orig ANI & Auth Csets | Cset Blocking using Term CC, Orig ANI* & Auth Csets |
| NANP | Inter-NANP (Allow) | Inter-NANP (Block) | Cset Blocking using Term CC, Orig ANI & Auth Csets |
| International | Allow | Cset Blocking using Term PCC, Orig CC and Auth Csets | Cset Blocking using Term CC, Orig CC and Auth Csets |

User Call Completion

| Termination G OriginationB | Domestic | NANP | International |
|---|---|---|---|
| Domestic | Domestic Comp Flag Inter-NANP (Allow) 976 Blocking | Domestic Comp Flag Inter-NANP (Allow) 976 Blocking Cset Blocking using Term PCC, Orig ANI & Auth Csets | International Comp Flag Cset Blocking using Term CC, Orig ANI & Auth Csets |
| NANP | Domestic Comp Flag Inter-NANP (Allow) 976 Blocking | Domestic Comp Flag Inter-NANP (Block) 976 Blocking | International Comp Flag Cset Blocking using Term CC, Orig ANI & Auth Csets |
| International | Domestic Comp Flag 976 Blocking | Domestic Comp Flag 976 Blocking Cset Blocking using Term PCC, Orig CC and Auth Csets | International Comp Flag Cset Blocking using Term CC, Orig CC and Auth Csets |

Programming Routing

| Termination G OriginationB | Domestic | NANP | International |
|---|---|---|---|
| N/A | Domestic Flag 976 Blocking | Domestic Flag 976 Blocking Cset Blocking using Term PCC, Auth Cset | International Flag Cset Blocking using Term CC, Auth Cset |

Programming Speed Dial Numbers

| Termination G Origination B | Domestic | NANP | International |
|---|---|---|---|
| N/A | Domestic Comp Flag 976 Blocking | Domestic Comp Flag 976 Blocking Cset Blocking using Term PCC, Auth Cset | International Comp Flag Cset Blocking using Term CC, Auth Cset |

XIX. INTERNET FAX

A. Introduction

A large percentage of calls on the PSTN are Fax calls. These calls send digital information encoded and modulated for analog transmission to the phone company's central office (CO). At the CO the analogue signal is digitized for continuous transmission across the PSTN at 64 Kbps. At the destination CO the digital signal is converted to analogue for transmission to the recipient Fax machine. Continuous transmission of international Fax traffic results in high utilization of scarce transmission capacity and incurs the high cost of international direct dial phone service.

B. Details

Currently, there is an increased interest in sending fax and voice over the Internet. In the past, facsimiles tended to be on the periphery of the network and did not utilize the intelligence inherent in the Internet. A preferred embodiment transparently routes faxes over the internet rather than tying up the telephone network. A network subsidized with appropriate logic can sense a fax call by sensing tones on the line. Then, the call can be directed to another piece of hardware or software that would then perform a fax over the Internet. The network performs routing by utilizing the destination fax machines phone number as an address. Then, by accessing the DAP, the appropriate gateway can be selected to route the call to the appropriate destination based on the phone number. This is accomplished by sending a routing request to the DAP. The DAP selects the destination gateway by one of several methods. One method may be by point of origin. That is, by table lookup a particular point of origin is assigned a particular destination gateway. Another method could be by a load balancing technique. The network logic can transparently detect normal telephone network activities and transmit them over the internet without affecting their integrity. One embodiment employs a double dialing scenario similar to the current telephone credit card. The first number is utilized to designate how the call was to be routed, while the second telephone number is used to route the call to the destination address like any other telephone call once the appropriate gateway was identified.

The detailed logic associated with the alternative routing of faxes on the Internet is accomplished by monitoring calls on trunk groups. Typically, a company or other organization will purchase capacity on a trunk line that can be utilized exclusively to service the requirements of the organization. The trunk group of a preferred embodiment is modified with appropriate sensing hardware which can be a hybrid network, such as, or including a Digital Signal Processor (DSP) to divert faxes destined for predetermined carriers over a data network such as an internet or an X.25 network instead of the public switched network. The monitoring of the calls coming into a specific trunk group is performed transparently.

The trunk group comes into a bridging switch which diverts calls to an intelligent network. The intelligent network detects if the call is being directed to a particular country or city that is targeted for special routing treatment over the internet or another data network instead of the PSTN. If the call is not targeted for one of the country or city codes of interest the call is routed normally across the PSTN to its destination.

Dropping down one more level of detail, when the call comes into an MCI switch, the switch launches a DAP query requesting a route for the call. The DAP analyzes the call based on the number dialed and other profile information, and routes the call to a fax done detection system. The fax tone detection system listens for fax CNG tone and if it detects a CHG tone, then a second phone call is placed to a fax internet gateway. When the fax internet gateway answers, the first and second call are bridged together at a bridging switch.

The required modification is to screen incoming calls by destination. For predetermined target destinations, the intelligent network holds the call for additional processing. This is accomplished according to a preferred embodiment illustrated in FIG. 52B. In that figure, an originating user's fax machine F1, is connected via switch 5260 to the phone line. Switch 5260 connects the call via switch 5261 and places a routing request to the DAP 5262 for routing data query purposes. The DAP is connected to a routing database such as a Long Term Regulatory Routing Database. The trunk is also connected to appropriate logic, only the Fax Tone Detector (FTD) is shown, at 5263. That logic includes logic to route fax calls destined for predetermined countries to a fax gateway 5264 via switches 5261 and 5265 to an alternate data network 5266 to a fax gateway 5267 in the predetermined country. For countries other than the predetermined country, the switch 5261 will send the call by way of the PSTN.

Figure 52B:
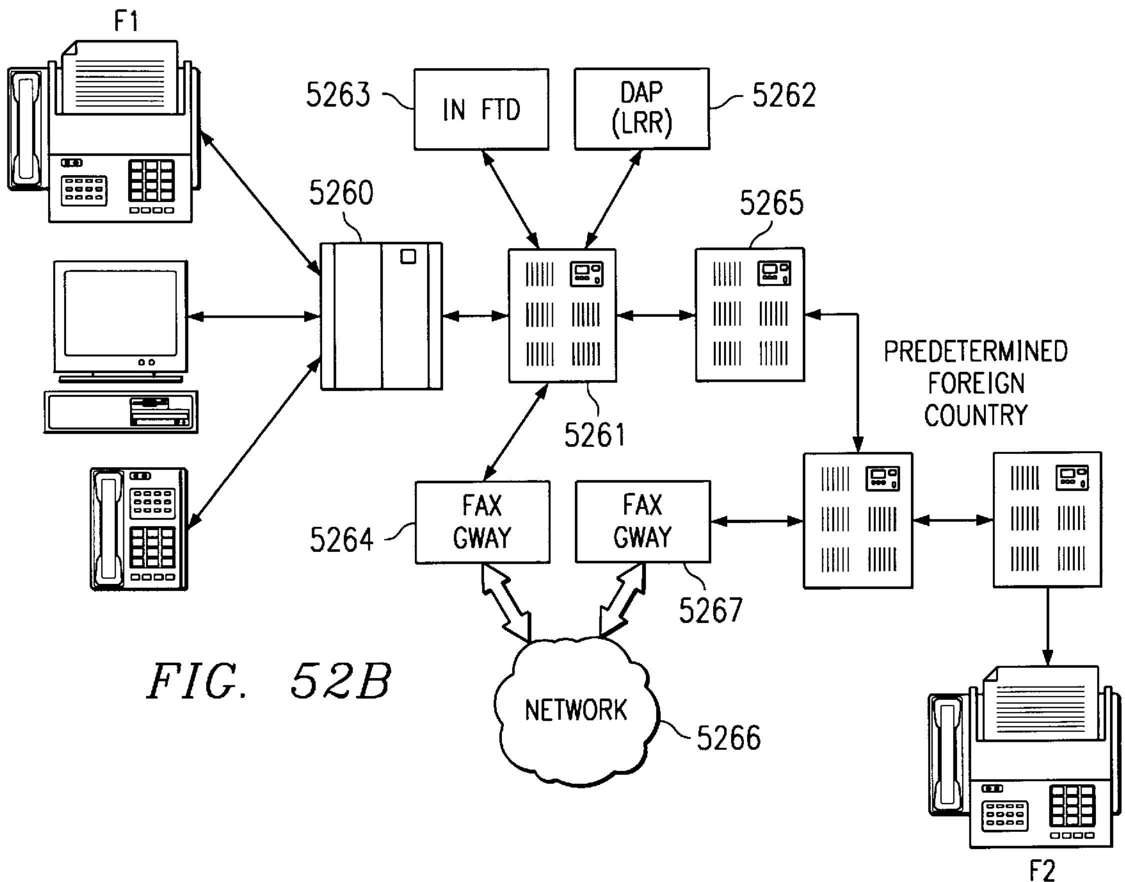
Figure 52C:
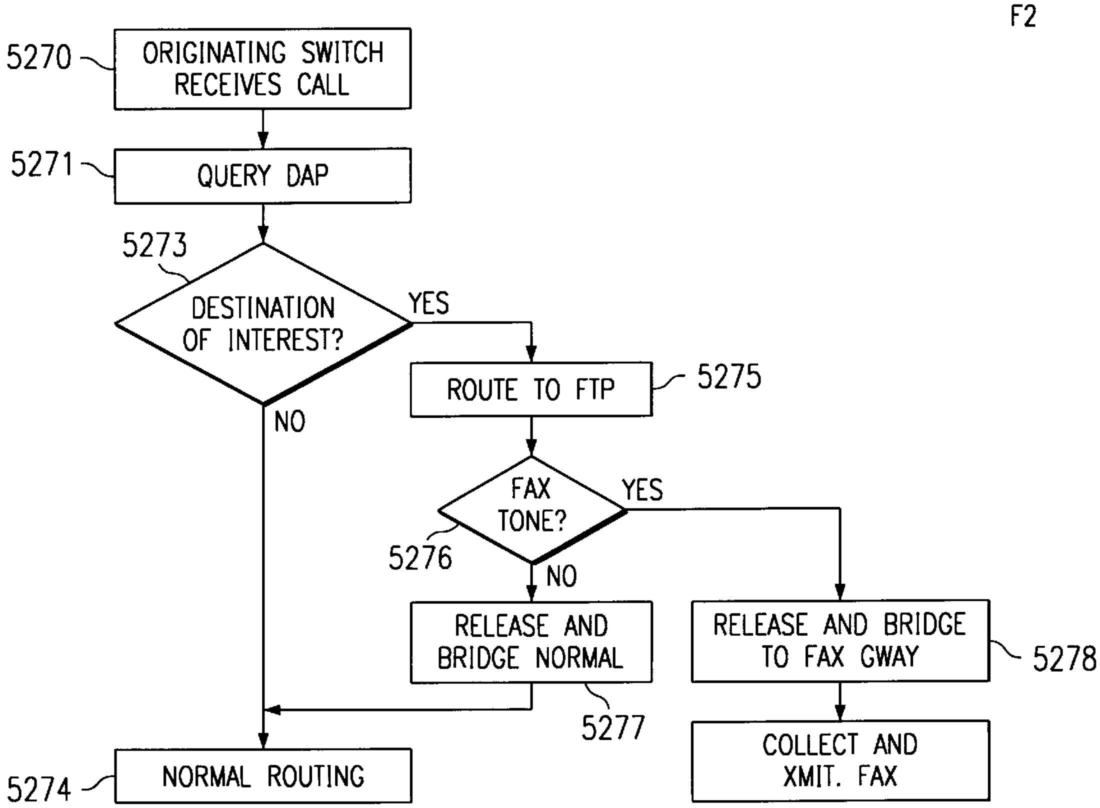

Operation of the above embodiment of FIG. 52B is seen with respect to the flow chart of FIG. 52C. At step 5270 of the flow chart, the originating switch 5261 of FIG. 52B receives the call. The call can be from a telephone, a PC, a fax machine F1, or other suitable device. Using the destination information associated with the call, the DAP is queried via Switch 5261 at step 5271. The DAP looks up the routing information and a decision is made at step 5273 whether the destination is one of the predetermined countries, cities, or other locations of interest. If not, the call is handled through normal routing as in step 5274.

If the call is for a predetermined destination of interest it is routed to the FTP as in step 5275. The FTP then determines whether this call is a fax call at step 5276. This may be done by attempting to detect a CNG tone by well known means. In one method of accomplishing this a timer can be used. If a CNG tone is not detected within a specified time period the call is assumed not to be a fax call. It is then released and bridged through normal routing over the PSTN as at step 5277. If a CNG tone is detected, the call is released and bridged to fax gateway 5264 as at step 5278, the call is collected and the fax is transmitted over the alternate data network 5266 over which it is sent to fax gateway 5267 and then on to fax machine F2 at the destination point.

This may have further routing via a domain name that may have several countries. The Domain Name Server will distribute calls amongst several destinations via a lookup table. A gateway will be located in a destination country and a TCP/IP session is set up with the gateway for control purposes. The data may be passed TCP or UDP based on the particular network characteristics. In any case, the dialed digits are passed to the origin gateway which forwards the digits to the destination gateway where the phone number is dialed.

The destination gateway then dials the destination number and engages a fax machine at the other end. The system utilizes two pairs of fax modems to convert a telephony signal to packets and back. Fax modems like any other modems negotiate for baud rate, but they do it each time a page is transmitted. Each side specifies its capabilities and they negotiate what speed they can support. First, start the transfer of fax information, then an ACK is transmitted after each page and finally the baud rate is renegotiated at 300 baud (LCD). Finally, the messages are received at the distant modem and the packet is repackaged as a fax package. At the end of every page, there is a renegotiating of baud rate based on error rate, and, if there are too many errors, the faxes will renegotiate to a lower speed before resending and/or retransmitting the page.

In accordance with a preferred embodiment, the system detects that the destination telephone circuit has been connected before transmitting fax information. The overhead associated with this processing requires the following detriments to normal fax processing.

1) Increased postdial delay; and
2) Actual transmission of the fax may take five percent longer.

XX. INTERNET SWITCH TECHNOLOGY

A. An Embodiment

The problem with current switched networks is that when you have a LEC connected via legislated feature group D trunks, providing inexpensive access is difficult because access charges are dictated by the LEC.

Therefore, if the Internet access is provided via a service which utilizes feature group D trunks, the cost passed on to the consumer is exorbitant. If the feature group D trunks are bypassed, and a dedicated network is provided, ie., the LEC is connected directly to a modem pool which provides access to the Internet, a second tier of problems arises. These problems include: scalability, survivability and inefficiency of design. Further, a modem would be necessary for each DS0 purchased from the LEC. All of these problems are solved by the architecture discussed below.

Scalability is addressed by the CBLs described in FIG. 1C because the modem pool can be adjusted to meet the network traffic requirements. The CBLs can be adjusted to meet the requirements of the particular community of interest. In a dedicated network, a one-to-one relationship exists between CBLs and entries in a modem pool. Then, if a modem fails, the ability to service users is directly affected by the ability to utilize modems. By eliminating the direct correlation between the modem pools and the CBLs, the DAP can map calls to dynamic resources obtained through the network wherever they reside. This design is more efficient than any current architecture. A detailed discussion of this architecture ensues below.

The third problem which was overcome by a preferred embodiment was a direct result of solving the previous two problems. A method for routing a call in the network was required when only an origination indication is provided by a LEC. An embodiment incorporating the functionality of a hotline provides a solution to this problem. When an origination is detected on an incoming trunk (circuit) for which the hotline functionality is enabled, a database lookup is performed as an internal process of a switch's routing database. This database lookup results in a preliminary dialing plan (i.e. a 7 or 10 digit number) that will be used to determine the destination of the call. The hotline function resides in the switch, but it was not integrated into routing capability which exploited the DAP and allowed a switch to formulate a DAL procedure request without any calling information (ADF transaction) to the DAP. The request is transmitted over an X.25 protocol link, a local area network, an Optical Connection Three (OC3) ATM network, a frame relay, SMDS or other communication link to the DAP for processing. The DAP performs additional database lookups to determine the appropriate destination (in this case, it would be the SWitch ID (SWID) and Terminating Trunk Group (TTG) that corresponds with the trunk connection to the Modem Pool). The hotline is a foundation in the design that overcame the problems described above.

Figure 71:
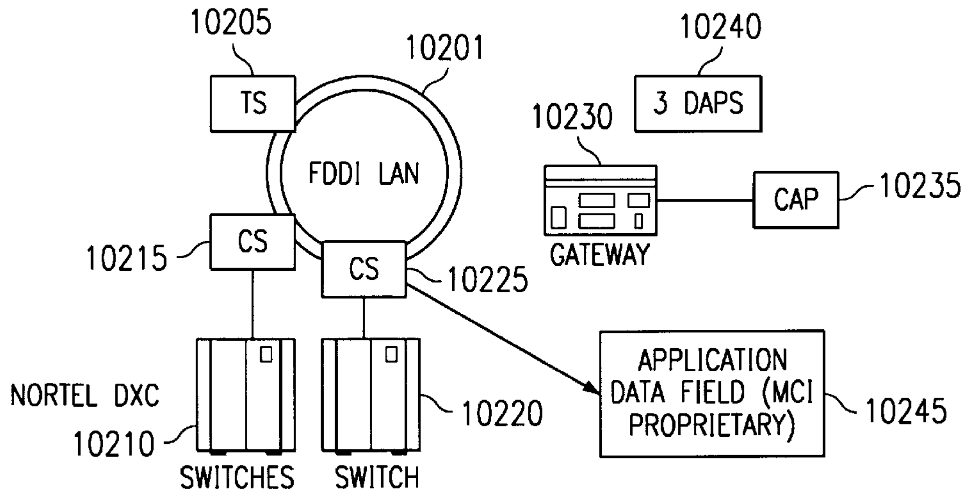
FIG. 71 illustrates a typical customer configuration for a VNET to VNET system in accordance with a preferred embodiment.

FIG. 71 depicts a typical customer configuration of a hybrid network for carrying private network services, such as VNET, Vision or other media while providing local dial access, private dialing plans over shared or dedicated access. The combination of the FDDI LAN 10201, the transaction servers 10205, and the communication servers 10215 and 10225 are collectively referred to as a DAP. A local area network such as Fiber Distributed Data Interface (FDDI) LAN 10201 is used to connect various communication devices. In the configuration depicted, Transaction Server (TS) 10205 is connected to the LAN 10201. Telephony switches such as switch 10210 and switch 10220 are connected to LAN 10201 through Communication Servers (CS) 10215 and 10225, respectively. In the example shown, CS 10225 communicates with the switches utilizing a protocol termed Application Data Field (ADF) 10245. Gateway 10230 connects to the LAN 10201 and provides communication between the Customer Access Processor (CAP). The CAP 10235 is typically a microprocessor such as the Intel Pentium, RISC or Motorola 68xxx family. The DAP would send a transaction query to the CAP. The CAP performs a database lookup to return routing instruction based upon, for example, the status of how many operators are available at a particular customer service center. The CAP returns a response that indicates how a call should be routed based upon that database lookup. The DAP uses that information basically as an extension of its own database. The DAP would then interpret the information received from the CAP 10235 and translate it into routing information that the switch requires to route the call to where the customer required.

Figure 72:
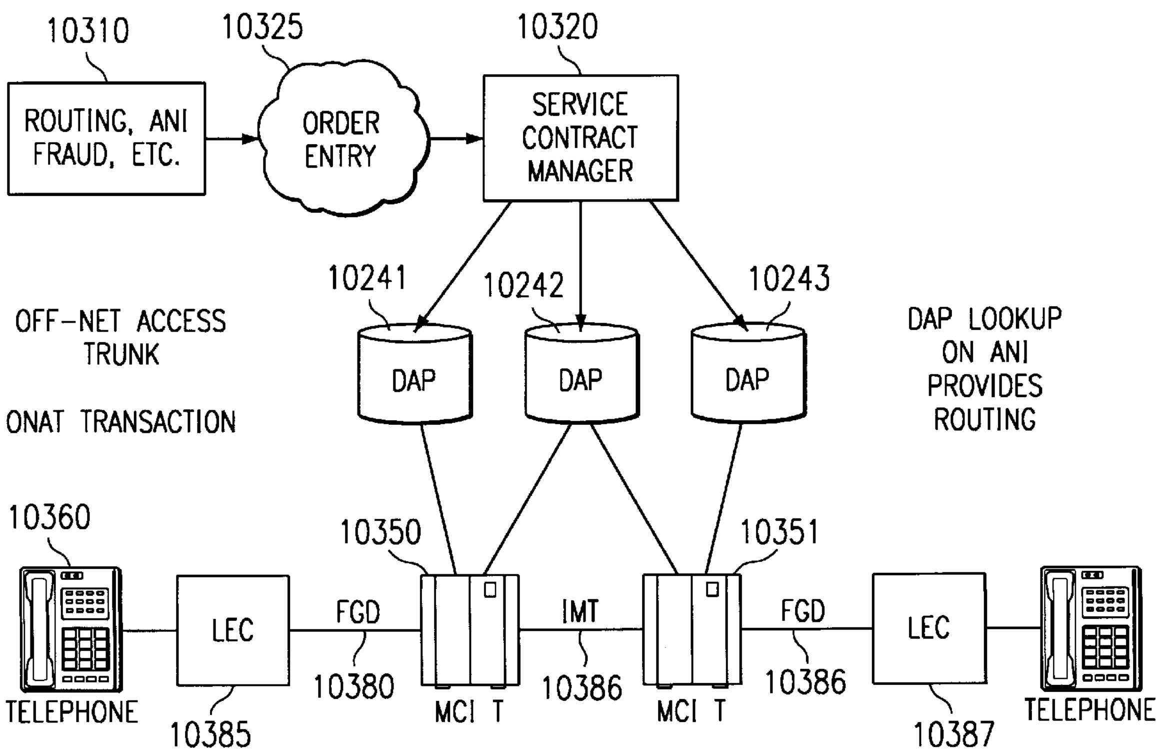
FIG. 72 illustrates the operation of DAPs in accordance with a preferred embodiment.

FIG. 72 depicts the operation of DAPs 10240, individually labeled as DAPs 10241, 10242 and 10243. Routing and customer profile information is entered into the order entry system 10235 after validation and the information is routed to the Service Control Manager (SCM) 10230. SCM 10320 sends the routing and customer profile information to each of the DAPs in the network.

For example, if a problem arises with Windows95, a customer would call 1-800-FIX-WIN95. The call enters the network at Originating Switch 10350 which would initiate a transaction to a DAP 10241-3 querying for appropriate routing information for the call. The queried DAP recognizes the number, creates a transaction and routes it to the appropriate gateway 10230 that is connected to the appropriate CAP 10235 (in this case the CAP associated with the Microsoft company). The CAP 10235 receives the transaction and determines that the customer service center in New York is swamped, but the customer service center in California is not very busy (time of day could account for the reason in this case). The CAP 10235 would send a response back to the queried DAP 10241-3 (via the gateway 10230) indicating that this particular 1-800-FIX-WIN95 call should be routed to the California customer service center. The selected DAP 10241-3 translates the transaction information into a specific Switch ID (SWID) and a specific Terminating Trunk Group (TTG) that corresponds to the route out of the MCI network necessary to arrive at the California customer service center. The selected DAP 10241-3 transmits this response information to the originating switch 10350 which routes the original call to 1-800-FIX-WIN95 to the correct Terminating switch 10351, as indicated in the DAP response via the SWID.

The terminating switch 10351 then determines the correct Terminating Trunk Group (TTG) utilizing information transmitted via SS7 network created from a parameter in the original DAP response, and routes the call to the California customer service center. When a call is routed through a switch, it is passed via a Direct Access Line (DAL) connection such as DAL 10386 to the customer PBX 10387 which delivers the call to the target telephone 10361.

Figure 73:
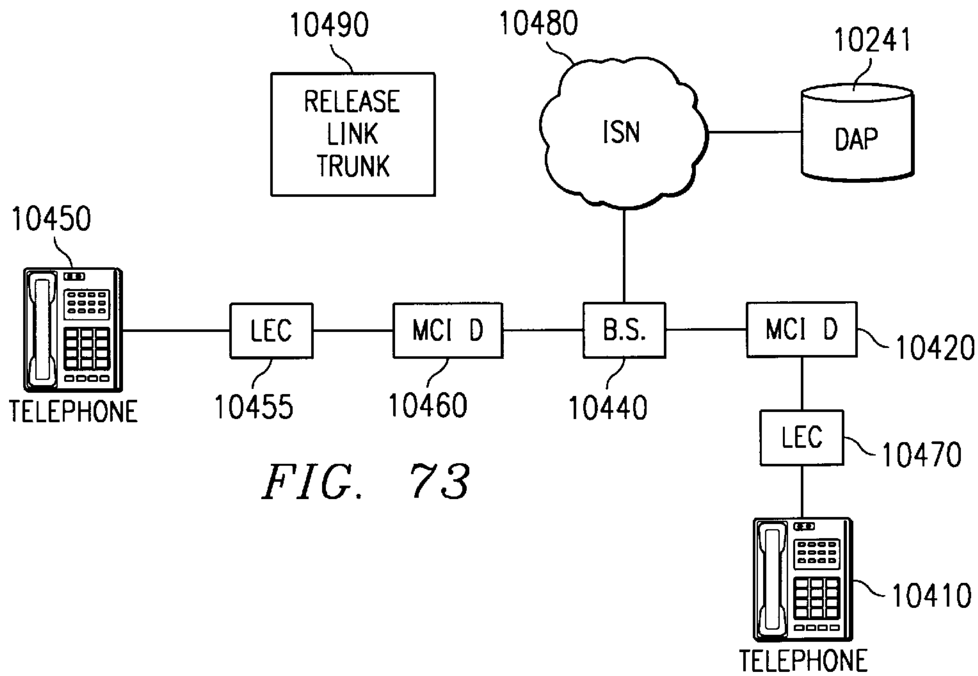
FIG. 73 illustrates the process by which a telephone connects to a release link trunk for 1-800 call processing in accordance with a preferred embodiment.

FIG. 73 depicts the process by which a telephone connects to a release link trunk for 1-800 call processing. A telephone such as telephone 10410 is connected to local exchange carrier (LEC) 10415. The user of telephone 10410 uses the telephone keypad to enter a 1-800 number, which causes LEC 10415 to route the call to MCI Originating switch 10420. In order to process the 1-800 request, switch 10420 must communicate with ISN 10480. Switch 10420 therefore connects the call to bridging switch 10440, which is connected to Intelligent Service Network 10480 via a release link trunk 10490. Bridging switch 10440 passes the DAP request with the 1-800 information to ISN 10480, which passes it to the addressed DAP 10241. DAP 10241 examines the 1-800 request and selects the appropriate release link trunk 10490, which it connects to MCI D switch 10420, which in turn is connected to the LEC 10415 which is ultimately connected to telephone 10410, thereby completing the call. ANI is a standard term in the industry that refers to Automatic Number Identification (ANI). ANI can be used to complete the call. This is the information that the MCI network receives from the LEC To identify where the call originated from. In simple terms, it would be your home phone number if you originated the call. It could also be the payphone number that a credit card caller originated from, so it is not always used to determine to whom to bill the call.

A similar process may be used to connect telephone 10450 through LEC 10455 to a switch 10460 utilizing a bridging switch 10440 to bridge the call to the release link trunk 10490 through ISN 10480.

Figure 74:
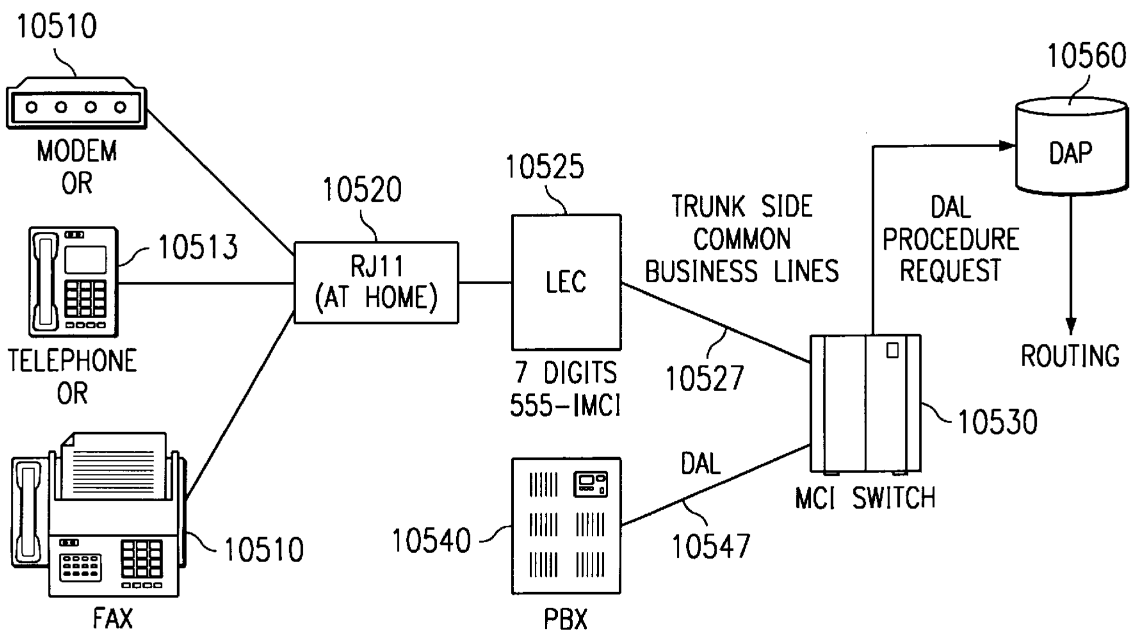
FIG. 74 illustrates the customer side of a DAP procedure request in accordance with a preferred embodiment.

FIG. 74 depicts the customer side of a DAP procedure request. In the home and small office environment, devices such as modem 10510, telephone 10515 and fax 10510 are plugged into a standard RJ11 jack 10520, which is connected to the local exchange carrier. Local exchange carrier 10525 connects to switch 10530 via common business lines 10527. In a large office environment, an office equipped with a PBX 10540 may connect to switch 10530 via dedicated access line (DAL) 10547, without the involvement of the local carrier. Switch 10530 issues DAL procedure request to DAP 10560, which selects routing 10570 for the call, as will be more fully described with respect to FIG. 75.

Figure 75:
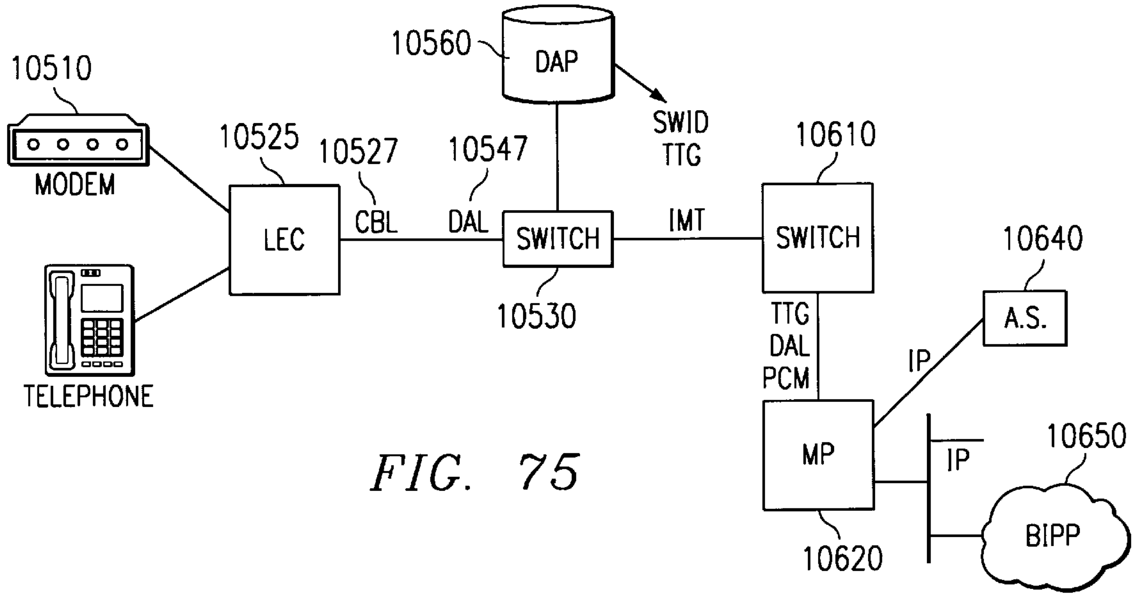
FIG. 75 illustrates operation of the switch 10530 to select a particular number or "hotline" for a caller in accordance with a preferred embodiment.

FIG. 75 depicts operation of the switch 10530 to select a particular number or "hotline" for a caller. Switch 10530 accepts an incoming call from CBL 10527 or DAL 10547, and contacts DAP 10560 for instructions on routing the call. DAP 10560 returns routing information encoded in the form of a pseudo-telephone number. The pseudo telephone number has the same format as an ordinary telephone number but instead encodes a 3-digit switch identifier (SWID) and a file number of a file that identifies a desired Terminating Trunk Group (TTG) . Switch 10530 contacts the switch 10610 identified by the SWID and passes to it the file number. Switch 10610 uses the TTG to select the appropriate modem pool 10620 to complete the connection. The modem pool in turn provides an Internet Protocol (IP) connection 10630 to such services as authentication service 10640 and to Basic Internet Protocol Platform (BIPP) 10650. The BIPP 10650 is composed of packet switches, such as ATM switches, that transfer IP packets from one node to another. Authentication service 10640 optionally performs security functions to authenticate the calling party and to prevent unauthorized access to the Internet. It may also be used to formulate billing information necessary to ensure proper reconciliation for customers that access the Internet via the TTG hotline. The provision of this hotline function enables routing of the call through switches 10530 and 10610 without the use of expensive FGD links such as the FGD 10380 depicted in FIG. 72.

Figure 76:
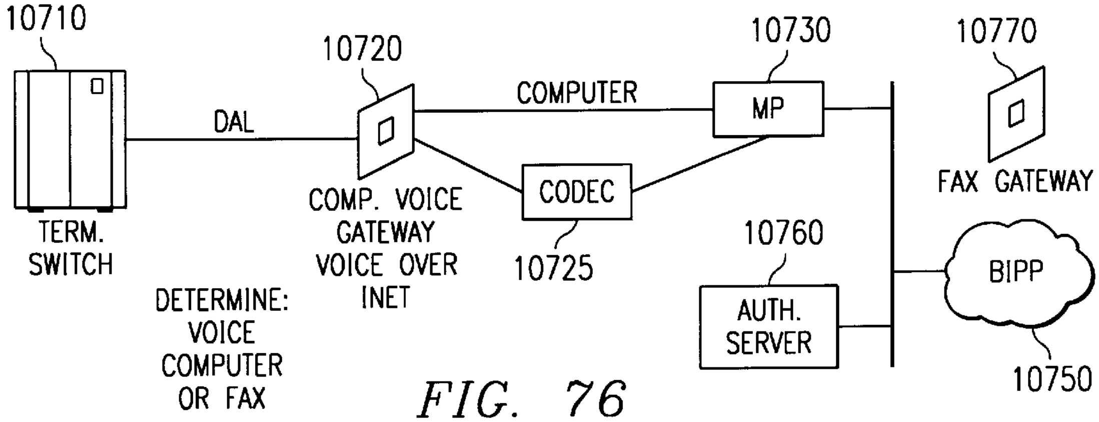
FIG. 76 illustrates the operation of a computer-based voice gateway for selectively routing telephone calls through the Internet in accordance with a preferred embodiment.

FIG. 76 depicts the operation of a gateway for selectively routing telephone calls through the Internet. Terminal switch 10710 connects to an ARU 10720 to request routing information. ARU 10720 interrogates the properties of the call to determine whether it is a candidate for Internet routing. If the call is a modem call, the call is routed to modem pool 10730. From modem pool 10730, the call may then be routed to Basic Internet Protocol Platform 10750 to provide Internet access to the modem call. The modem call is optionally authenticated by authentication service 10760. If the call is a fax call, the call is routed to modem pool 10730. From modem pool 10730, the call may then be routed to Basic Internet Protocol Platform 10750 and from there to fax gateway 10770. As with a modem call, a fax call is optionally authenticated by authentication service 10760.

If the call to be routed is a voice call, ARU 10720 waits for the user to dial a calling card number and a destination telephone number. ARU 10720 interrogates the destination number to determine whether the destination telephone is an international call or a domestic call. Domestic calls are returned to the termination switch 10710 for conventional routing. International calls are encoded as data by providing the analog voice signal to coder/decoder (or "codec") 10725. Codec 10725, having encoded the signal as digital data then routes the call through modem pool 10730 and Basic Internet Protocol Platform 10750.

In an alternate embodiment, when the call is delivered to the ISN by the network switch, an SS7 ISUP message is routed to the resident ISN switch. That switch is called a DMS-ACD. ACD stands for Automatic Call Distributor. The ACD takes an incoming SS7 ISUP message and converts it to SCAI (Switch/ComputerApplication Interface). On the opposite side of the ACD is a device called an ISN-AP (Intelligent Services Network-Adjunct Processor). SCAI is the language spoken between the ACD and the ISN-AP. So, there are two interfaces: on the inbound side from the network to the ACD a SS7 ISUP, and on the outbound side from the ACD to the ISN-AP a SCAI. These are simply two different signaling protocols.

When the call arrives at the ACD from the network, the ACD doesn't automatically know where to route the call. The ACD receives its instructions from the ISN-AP. To do that, the ACD takes the ISUP signaling parameters received from the network and converts them to SCAI protocol format and sends a SCAI message to the ISN-AP.

Specifically, the SCAI message is called DV_Call_Received (DV means Data/Voice. When the ISN-AP receives this message it looks at the Called Party Number (CPN) field within the SCAI message and, based on that number, determines where in the ISN the ACD should route the call. When the ISN-AP has made the decision, the ISN-AP builds a DV_Call_Received_RR (a response to the previous message—RR means Return Result). Within the RR message are instructions to the ACD regarding the ACD port to which the call should be terminated.

For this service, the ACD is instructed to terminate the call to the ACD ports connected to the ARU 10720. When the call arrives at the ARU 10720, there are two things that can happen:

1) If the caller has dialed the access number from an:
  a) telephone or
  b) fax machine, that caller will hear a voice prompt that says "Press 1 for voice, or press 2 for fax."

2) If the caller has dialed the access number using a PC modem, that caller likely won't hear any announcement. What will happen is that a ARU timer will expire. Expiration of that timer indicates to the ARU that this call is from a modem.

The call flow for these scenarios can be confusing, so let's consider them one at a time.

If a caller has called from a telephone, then at the ARU 10720 voice prompt, the caller will press 1 (for voice service). At that time, the ARU 10720 will collect further information about the caller. This feature is a modified version of existing calling card services that telephone companies offer today. The ARU 10720 first collects the card number, then collects the number the caller wishes to terminate to. After capturing this information, the ARU 10720 sends the data across the ISN Local Area Network (LAN) to a validation data base. In addition to verifying the calling card number, the data base also ensures that the terminating number is within the allowed dialing plan for the card holder.

Once the card information is verified, the ARU 10720 will then determine if the terminating number is domestic or international. If the terminating number is domestic, the ARU 10720 will release the call from the ISN back into the voice network where the call will be routed to its intended destination. If the terminating number is international, the call will be routed to a device called a CODEC (COde DECode) resident at a BIPP site. The purpose of the CODEC is to convert the voice signal to data for routing over the Internet using UDP/IP.

In an alternate embodiment, if the caller has called from a fax machine, at the ARU 10720 voice prompt, the caller will press 2 indicative of a request for fax service. At that time, the ARU 10720 will route the call to a fax platform that is a guaranteed fax service 10770 for those who don't have the time or patience to wait for a terminating fax number to become available, or for those who need assistance delivering an international fax. An embodiment collects information about the caller and terminating number, then instructs the caller to begin the send process. The fax service 10770 captures the fax and stores it for delivery at a later time.

If a caller has dialed via a PC modem, then at the ARU 10720 voice prompt, the caller will likely not hear any announcement. This is intended. It is possible that the caller may hear the ARU 10720 announcement via the PC speaker or modem, but the caller is unable to make an entry at the ARU 10720 and will ultimately time-out (as described above), indicating to the ARU 10720 that this call originated from a PC modem. The ARU 10720 releases the call back into the network for termination to a Modem Pool (MP) 10730 at one of MCI's BIPP 10750 sites.

Figure 77:
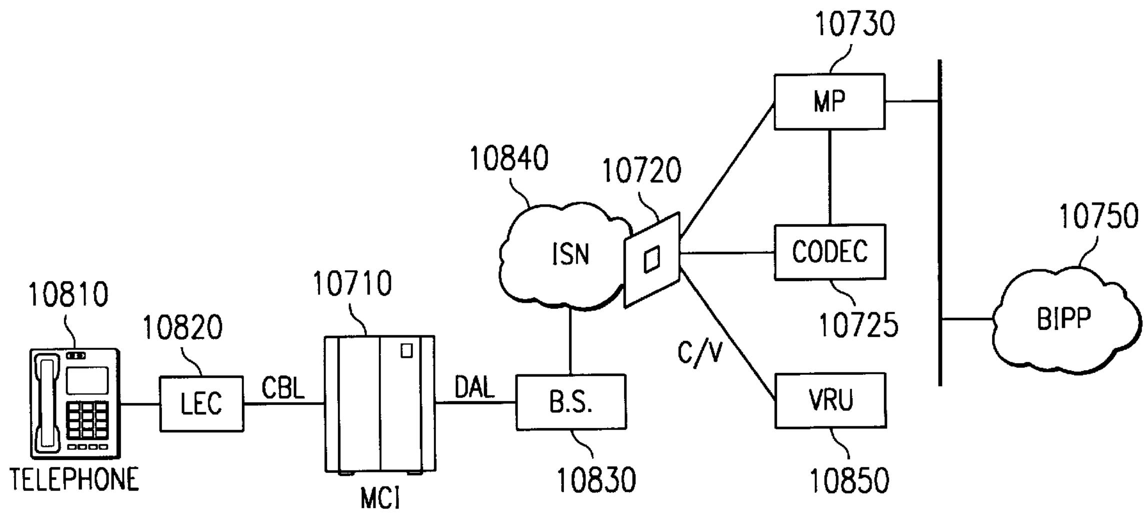
FIG. 77 illustrates the operation of the VRU of FIG. 76 deployed in a centralized architecture in accordance with a preferred embodiment.

FIG. 77 depicts the operation of the ARU of FIG. 76 deployed in a centralized architecture. Telephone 10810 communicates through local exchange 10820 to switch 10710. Switch 10710 connects through bridge switch 10830 to Intelligent Services Network (ISN) 10840 to ARU 10720. ARU 10720 controls the call routing either directly to the modem pool 10730, via codec 10725 to the BIPP 10750 or to a fax server.

Figure 78:
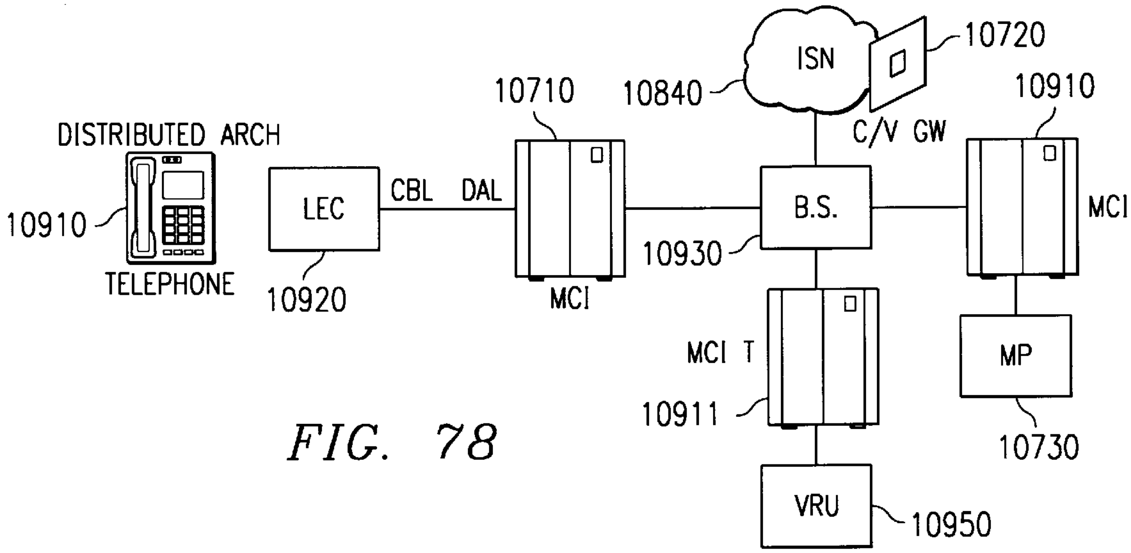
FIG. 78 illustrates the operation of the VRU of FIG. 76 deployed in a distributed architecture in accordance with a preferred embodiment.

FIG. 78 depicts the operation of the ARU of FIG. 77 deployed in a distributed architecture. Telephone 10910 communicates through local exchange 10920 to switch 10710. Switch 10710 connects through bridge switch 10930 to intelligent service network 10840 to ARU 10720. ARU 10720 operates under control of voice response unit 10950, connected through switch 10911 and bridge switch 10930 to control the call routing either through switch 10912 to modem pool 10730, or via a codec. The ARU must be placed in the ISN, but the other pieces (i.e., ARUs 10850 and 10950, modem pool 10730 and codec 10725) may be placed anywhere in the network.

Figure 79A:
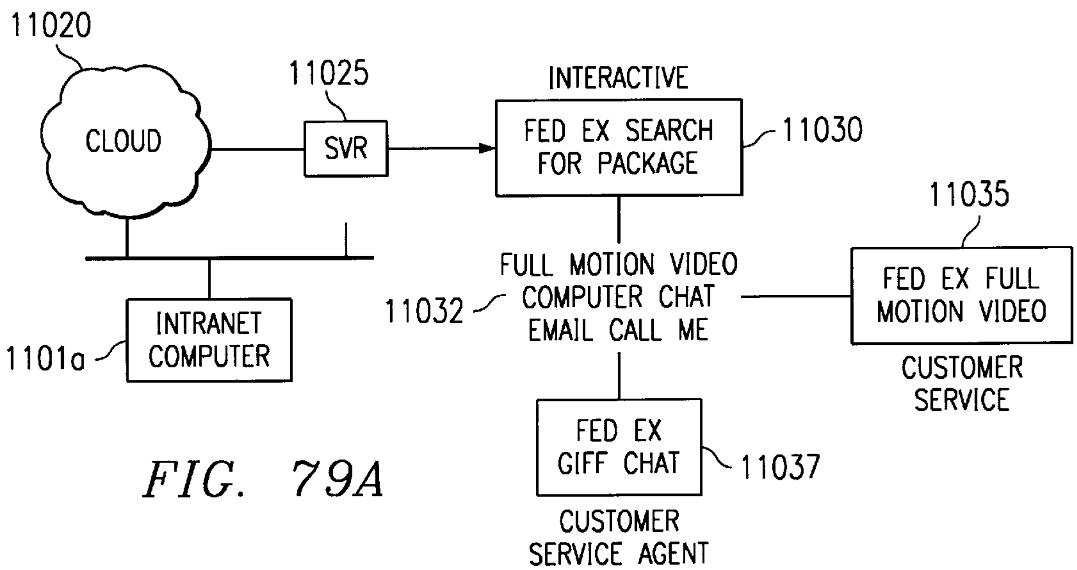
FIGS. 79A and 79B illustrate the operation of sample applications for Internet call routing in accordance with a preferred embodiment.
Figure 79B:
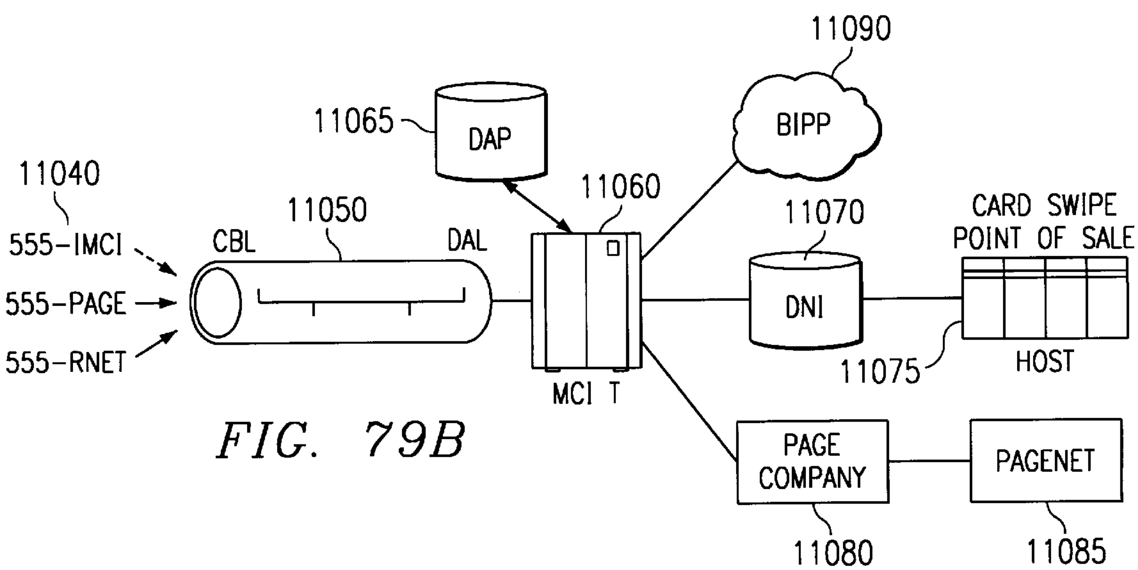

FIGS. 79A and 79B depict the operation of sample applications for Internet call routing. FIG. 79A depicts a sample application for customer service. Intranet computer 11010 connects to the Internet 11020 as described above, and thereby connects to a server computer 11025. Server computer 11025, through designation of an Internet resource, such as a packing shipping service provider 11030, via a Uniform Resource Locator permits a user of Intranet computer 11010 to query the provider 11030. Through internal functions shown as 11032, provider 11030 may provide in response to user interactions such resources as a full motion video display 11035 from its customer service department, or direct interactive conversations with a customer service representative 11037.

FIG. 79B depicts a number of applications for caller-initiated consumer transactions. A consumer calling a predetermined number 11040 (such as 555-IMCI, 555-PAGE or 555-RNET) may be routed to a particular transaction processor through the use of common business line (CBL) 11050. CBL 11050 connects to switch 11060. Switch 11060 calls DAP 11065, which analyzes the incoming call using Automatic Number Identification (ANI) to determine the identity of the caller. Based on the identity of the caller in combination with the number called, DAP 11065 directs switch 11060 to direct calls to 555-IMCI, for example, to Data Network Interface (DNI) 11070. DNI 11070 serves as an interface between the switch network and a database host 11075 capable of processing point-of-sale debit and credit card transactions. In addition to routing the call based on the target telephone number, the ANI data is used to identify the caller to the database host 11075. Similarly, a call to 555-PAGE may be routed to the PBX of a paging service company 11080, and the ANI data used to select a particular paging service 11085 offered by the company. Finally, calls to 555-RNET may be used to provide connection to the Basic Internet Protocol Platform 11090, as previously described.

Figure 80:
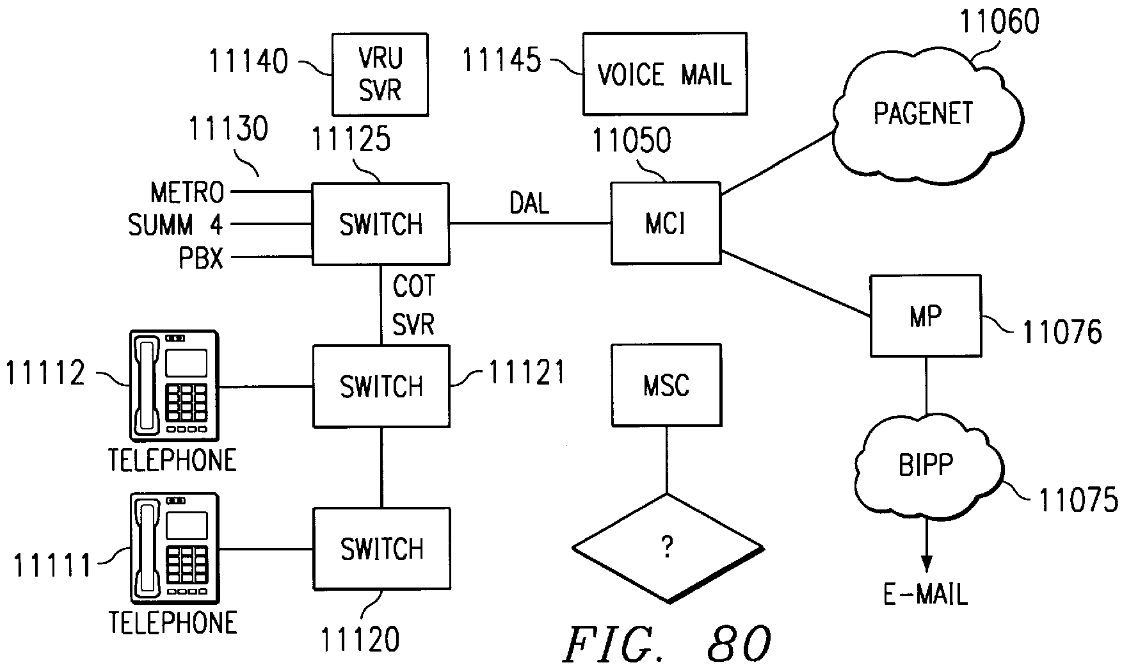
FIG. 80 illustrates a configuration of a switching network offering voice mail and voice response unit services, as well as interconnection into a service provider, in accordance with a preferred embodiment.

FIG. 80 illustrates a configuration of a switching network offering voice mail and voice response unit services, as well as interconnection into a service provider, in accordance with a preferred embodiment. Telephones 11111 and 11112 enter the network via switches 11120 and 11121 respectively, Switch 11121, in addition to offering network entry to telephone 11112, provides an intermediate link for switch 11120. Switch 11125 provides interconnection for switch 11121, as well as accepting direct input such as PBXs 11130. Switch 11125 provides connections to voice response unit server 11140 and to voice mail server 11145. In addition, switch 11125 connects to service provider server 11150 through Dial Access Line 11155. Service provider 11150 further routes incoming calls according to service requested and authenticity to paging service 11060 or to email service 11070 using BIPP 11075 connected through modem pool 11076.

B. Another Embodiment

Figure 81:
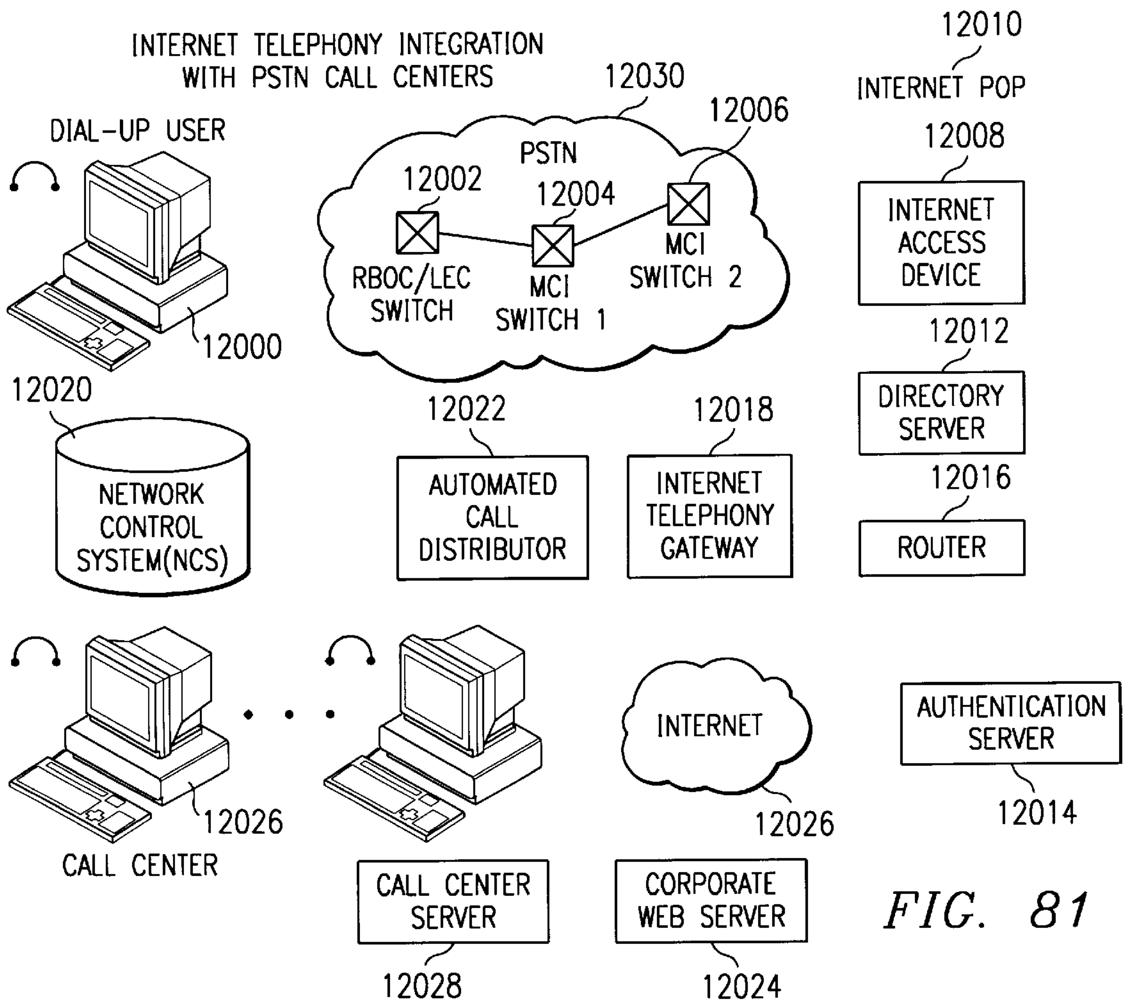
FIG. 81 illustrates an inbound shared Automated Call Distributor (ACD) call with data sharing through a database in accordance with a preferred embodiment.

FIG. 81 illustrates an inbound shared Automated Call Distributor (ACD) call with data sharing through a database in accordance with a preferred embodiment. A dial-up internet user 12000 uses a computer modem to dial a telephone number. The telephone call is routed from the RBOC/LEC Switch 12002 to MCI Switch 1 12004. MCI Switch 1 12004 queries the Network Control System (NCS) 12020 to ask for a route for the given ANI and dialed telephone number. The NCS 12020 returns a terminating address, instructing MCI Switch 1 12004 to route the call to a trunk group on MCI Switch 2 12006.

MCI Switch 2 12006 completes the call to the Internet Access Device 12008. The modem in the dial-up user's computer 12000 and the Internet Access Device 12008 establish a data session, and data packets are exchanged according to the Point to Point Protocol (PPP). From the Internet Access Device 12008, PPP packets are translated to Internet Protocol (IP) packets and sent on the internet, represented by 12026. Similarly, the Internet Access Device 12008 receives IP packets from the internet 12026 and sends them to the dial-up user 12000.

Before packets are allowed to pass freely through the Internet Access Device 12008, the dial-up user 12000 is authenticated. This is done using the username/password method, or the challenge/response method.

In the username/password method, the Internet Access Device 12008 prompts the dial-up user 12000 to enter a user name. The dial-up user 12000 types a user name into the computer, and the user name is transported from the dial-up user 12000 to the Internet Access Device 12008. The Internet Access Device 12008 then prompts the dial-up user 12000 to enter a password. The dial-up user 12000 types a password into the computer, and the password is transported from the dial-up user 12000 to the Internet Access Device 12008. Once the user name and password are received, the Internet Access Device 12008 sends an authentication request, containing the user name and password, to the Authentication Server 12014. The Authentication Server 12014 checks the user name/password against a database of valid user name/password pairs. If the entered user name/password are in the database, the Authentication Server 12014 sends an "user authenticated" message back to the Internet Access Device 12008. If the entered user name/password are not in the database, the Authentication Server 12014 sends a "user not authenticated" message back to the Internet Access Device 12008.

In the challenge/response method, the Internet Access Device 12008 prompts the dial-up user 12000 to enter a user name. The dial-up user 12000 types a user name into the computer, and the user name is transported from the dial-up user 12000 to the Internet Access Device 12008. The Internet Access Device 12008 then prompts the dial-up user 12000 to with a challenge, which is a sequence of digits. The dial-up user 12000 computes a response to the challenge by entering the challenge digits and a shared secret key into response-generation program. The shared secret key is known only to the dial-up user 12000 and the Authentication Server 12014. The dial-up user 12000 types in the computed response, and the response is transported from the dial-up user 12000 to the Internet Access Device 12008. The Internet Access Device 12008 sends an authentication message, containing the user name, the challenge, and the response, to the Authentication Server 12014. The Authentication Server reads the user name, finds the shared secret key for that user name, and uses the shared secret key and the challenge digits to compute the response. The computed response is compared to the response given by the dial-up user 12000. If the responses match, a "user authenticated" message is sent from the Authentication Server 12014 to the Internet Access Device 12008. If the responses do not match, a "user not authenticated" message is sent from the Authentication Server 12014 to the Internet Access Device 12008.

Whether the user name/password or challenge/response methods of authentication are used, the rest of this description assumes a "user authenticated" message is sent from the Authentication Server 12014 to the Internet Access Device 12008, and IP packet communication is allowed to flow freely through the Internet Access Device 12008.

The dial-up user 12000 starts a web browser and browses web pages from the Corporate Web Server 12024. The Corporate Web Server 12024 records the web pages viewed by the dial-up user 12000 in the Call Center Server 12028 using a unique identifier. The dial-up user 12000 may also submit information to the Corporate Web Server 12024 by filling out Hypertext Markup Language (HTML) forms and submitting the information to the Corporate Web Server 12024. The Corporate Web Server 12024 deposits this information in the Call Center Server 12028 using the same unique identifier.

The dial-up user 12000 browses another web page, upon which an icon is displayed along with text indicating that the user can talk to an agent by clicking on the icon. Clicking on the icon results in a download of a Multipart Internet Mail Extensions (MIME) file from the Corporate Web Server 12024 to the dial-up user's 12000 web browser. The MIME file contains an alphanumeric string identifying the destination for a resulting phone call, called a user-identifier. The browser invokes a helper application or browser plug-in to handle the file of the designated MIME type. The helper application reads the MIME file, and launches a query with the MIME file contents from the dial-up user 12000 to the Directory Server 12012. The Directory Server 12012 translates the alphanumeric string from the MIME file into the destination IP Address of the destination Internet Telephony Gateway 12018, and sends a message containing the IP Address back to the dial-up user's 12000 helper application. The helper application then launches an internet telephony call to the Internet Telephony Gateway's 12018 IP Address, providing to the Internet Telephony Gateway 12018 the alphanumeric string from the MIME file, as a part of the call setup.

The Internet Telephony Gateway 12018 translates the given alphanumeric string into a destination telephone number, and dials the destination telephone number on it's telephone network interface to MCI Switch 2 12006. MCI Switch 2 12006 queries the NCS 12020 with the dialed telephone number, requesting routing instructions. The NCS 12020 determines the appropriate route and sends routing instructions back to MCI Switch 2 12006 to route the call to a particular trunk group on MCI Switch 1 12004. The call is routed to MCI Switch 1 12004, and then the call is completed to the Automated Call Distributor (ACD) 12022. When the ACD 12022 answers the call, the Internet Telephony Gateway 12018 completes a constant audio path between the ACD 12022 and the Dial-up user 12000, with the audio from the ACD to the Internet Telephony Gateway being circuit-switched PCM audio, and the audio from the Internet Telephony Gateway to the Dial-up user being packetized encoded digital audio, using any audio codec.

When the call is delivered to the ACD 12022, the unique record identifier is delivered to the ACD via telephone network signaling mechanisms. When an agent in the call center 12026 receives the call, the unique record identifier is displayed for the agent, and the call information entered by the dial-up user 12000 is retrieved from the Call Center Server 12028.

XXI. BILLING

Another embodiment in accordance with this invention relates generally to telecommunication networks, and more specifically, to switches of a telecommunication network that generate call records using a flexible and expandable record format and generates a unique call identifier for each telephone call that traverses the network.

A typical telecommunication network comprises multiple telecommunication switches located throughout a geographical area. When a user makes a call, the call may be routed through one or more switches before reaching its destination.

Figure 82:
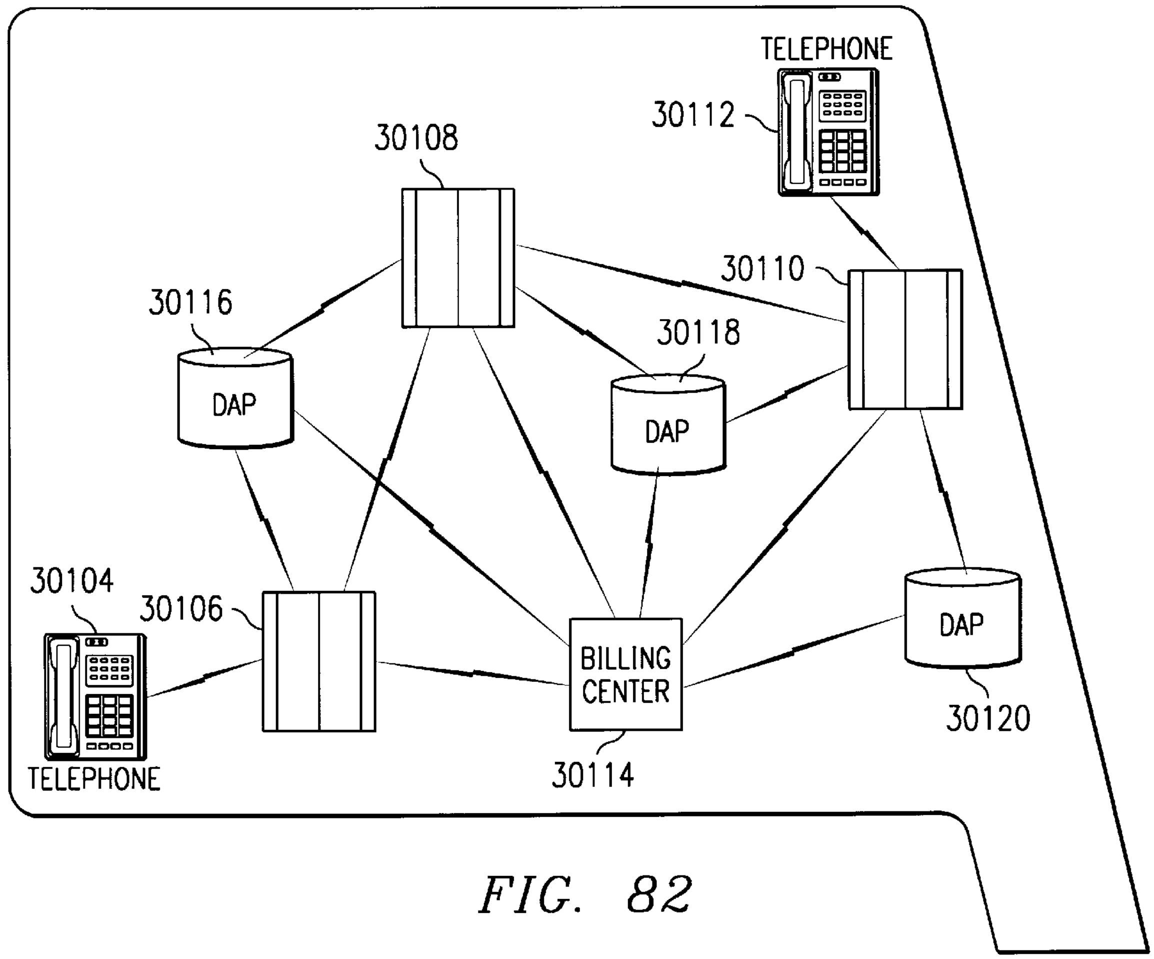
FIG. 82 is a block diagram of an exemplary telecommunications system in accordance with a preferred embodiment.

FIG. 82 illustrates an exemplary telecommunications system 30102 across the United States. For purposes of illustration, a caller 30104 places a call from Los Angeles, Calif. to a party 30112 located in New York City, N.Y. Such a call is typically transmitted across three (3) switches: the Los Angeles, Calif. switch 30106; the Chicago, Ill. switch 30108; and the New York City, N.Y. switch 30110. In this scenario, the originating switch is the Los Angeles, Calif. switch 30106, and the terminating switch is the New York City, N.Y. switch 30110.

Each of the switches, 30106–30110, is connected to two (2) or more Data Access Points (DAP) 30116–30120, for instance a primary DAP 30116–30120 and a backup DAP 30116–30120. A DAP 30116–30120 is a facility that receives requests for information from the switches 30106–30110, processes the requests, and returns the requested information back to the requesting switch 30106–30110. The switches 30106–30110 use information from the DAPs 30116–30120 to process calls through the network.

When a call passes through one of the switches, 30106–30110, that switch creates a call record. The call record contains information on the call, including but not limited to: routing, billing, call features, and trouble shooting information. After the call is terminated, each switch 30106–30110 that processed the call completes the associated call record. The switches 30106–30110 combine multiple call records into a billing block.

When a switch 30106–30110 fills the billing block, the switch 30106–30110 sends the billing block to a billing center 30114. Thus, the billing center 30114 receives one billing block from each switch 30106–30110 that handled the call, which in this case would be three billing blocks. The billing center 30114 searches each billing block and retrieves the call record associated with the call, thereby retrieving one call record per switch 30106–30110 that handled the call. The billing center 30114 then uses one or more of the retrieved call records to generate a billing entry. The billing center 30114 is also connected to each DAP 30116–30120 to retrieve information regarding a switch 30106–30110 or call record.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location, which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record causes unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises when using only local switch time in that there is no accommodation for time changes due to daylight savings time. In addition, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision, such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

There is also a need to match all of the call records associated with a specific telephone call. For example, for proper billing and cost control, it is necessary for the billing center to match the originating switch's call record to the terminating switch's call record. Also, for troubleshooting and security purposes, it may be necessary to trace a specific telephone call through the network with ease in order to isolate problem areas.

Therefore, there is a need for switches of a telecommunications network to uniquely identify each telephone call that traverses the network, thereby uniquely identifying all of the call records associated with a specific telephone call.

A. An Embodiment

1. Call Record Format

An embodiment solves the problem of providing a flexible and expandable call record format by implementing both a small and a large call record format. In particular, the embodiment implements a default 32-word call record format, plus an expanded 64-word call record format. An embodiment uses a 32-word call record format for the typical telephone call, which comprises the majority of all telephone calls, and uses a 64-word call record format when additional information is needed regarding the call. This implementation provides the flexibility needed to efficiently manage varying data requirements of a given call record. New call features can be developed and easily incorporated into the variable call record format of the present invention.

This embodiment also records timepoints in the epoch time format. The embodiment records the origination time of a call in epoch time format, and the remaining timepoints are offsets, or the number of seconds, from that origination time. This embodiment solves the problems associated with converting to and from daylight savings time because daylight savings time is a local time offset and does not affect the epoch time. Furthermore, the timepoints in epoch time format require less space in the call record than they do in local switch time format.

The epoch time format may represent coordinated universal time (UTC), as determined at Greenwich, England, which has a time zone of zero (0) local switch time, or any other time. Epoch time is only a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

2. Network Call Identifier

This embodiment solves the problem of uniquely identifying each telephone call and all of the call records associated with a specific telephone call by providing a unique identifier to each call record. It generates a network call identifier (NCID) that is assigned to each call record at the point of call origination, that is, the originating switch generates an NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This embodiment also provides the switch capability of discarding a received NCID and generating a new NCID. A switch discards a received NCID if the NCID format is invalid or unreliable, thereby ensuring a valid unique identifier to be associated with each call going through the network. For instance, an NCID may be unreliable if generated by third party switches in the telecommunications network.

This embodiment relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The embodiment also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 83:
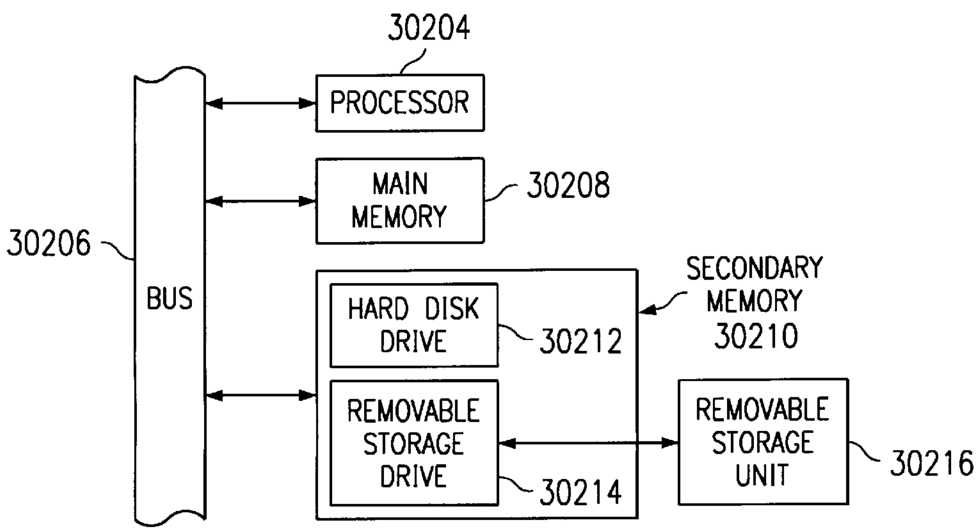
FIG. 83 is a block diagram of an exemplary computer system in accordance with a preferred embodiment.

The chosen embodiment is computer software executing within a computer system. FIG. 83 shows an exemplary computer system. The computer system 30202 includes one or more processors, such as a processor 30204. The processor 30204 is connected to a communication bus 30206.

The computer system 30202 also includes a main memory 30208, preferably random access memory (RAM), and a secondary memory 30210. The secondary memory 30210 includes, for example, a hard disk drive 30212 and/or a removable storage drive 30214, representing a floppy disk drive, a magnetic tape drive, a compact disk drive, etc. The removable storage drive 30214 reads from and/or writes to a removable storage unit 30216 in a well known manner.

Removable storage unit 30216, also called a program storage device or a computer program product, represents a floppy disk, magnetic tape, compact disk, etc. The removable storage unit 30216 includes a computer usable storage medium having therein stored computer software and/or data.

Computer programs (also called computer control logic) are stored in main memory 30208 and/or the secondary memory 30210. Such computer programs, when executed, enable the computer system 30202 to perform the functions of the present invention as discussed herein. In particular, the computer programs, when executed, enable the processor 30204 to perform the functions of the present invention. Accordingly, such computer programs represent controllers of the computer system 30202.

B. Another Embodiment

Another embodiment is directed to a computer program product comprising a computer readable medium having control logic (computer software) stored therein. The control logic, when executed by the processor 30204, causes the processor 30204 to perform the functions as described herein.

Another embodiment is implemented primarily in hardware using, for example, a hardware state machine. Implementation of the hardware state machine so as to perform the functions described herein will be apparent to persons skilled in the relevant arts.

1. Call Record Format

This embodiment provides the switches of a telecommunication network with nine (9) different record formats. These records include: Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). Each record is 32 words in length, and the expanded version of each record is 64 words in length.

Example embodiments of the nine (9) call record formats discussed herein are further described in FIGS. 82–86. The embodiments of the call records of the present invention comprise both 32-word and 64-word call record formats. It would be apparent to one skilled in the relevant art to develop alternative embodiments for call records comprising a different number of words and different field definitions. Table 301 of the Appendix contains an example embodiment of the CDR and PNR call record formats. FIG. 84 shows a graphical representation of the CDR and PNR call record formats. Table 302 of the Appendix contains an example embodiment of the ECDR and EPNR call record formats. FIGS. 85A and 85B show a graphical representation of the ECDR and EPNR call record formats. Table 303 of the Appendix contains an example embodiment of the OSR and POSR call record formats. FIG. 86 shows a graphical representation of the OSR and POSR call record format. Table 304 of the Appendix contains an example embodiment of the EOSR and EPOSR call record formats. FIGS. 87(A) and 87(B) show a graphical representation of the EOSR and EPOSR call record formats. Table 305 of the Appendix contains an embodiment of the SER record format. FIG. 88 shows a graphical representation of the SER record format.

The CDR and PNR, and thereby the ECDR and EPNR, are standard call record formats and contain information regarding a typical telephone call as it passes through a switch. The CDR is used for a non-VNET customer, whereas the PNR is used for a VNET customer and is generated at switches that originate VNET calls. The fields of these two records are identical except for some field-specific information described below.

The OSR and POSR, and thereby the EOSR and EPOSR, contain information regarding a telephone call requiring operator assistance and are generated at switches or systems actually equipped with operator positions. A switch completes an OSR for a non- VNET customer and completes a POSR for a private VNET customer. These records are only generated at switches or systems that have the capability of performing operator services or network audio response system (NARS) functions. The formats of the two (2) records are identical except for some field-specific information described below. A SER is reserved for special events such as the passage of each hour mark, time changes, system recoveries, and at the end of a billing block. The SER record format is also described in more detail below.

Figure 89A:
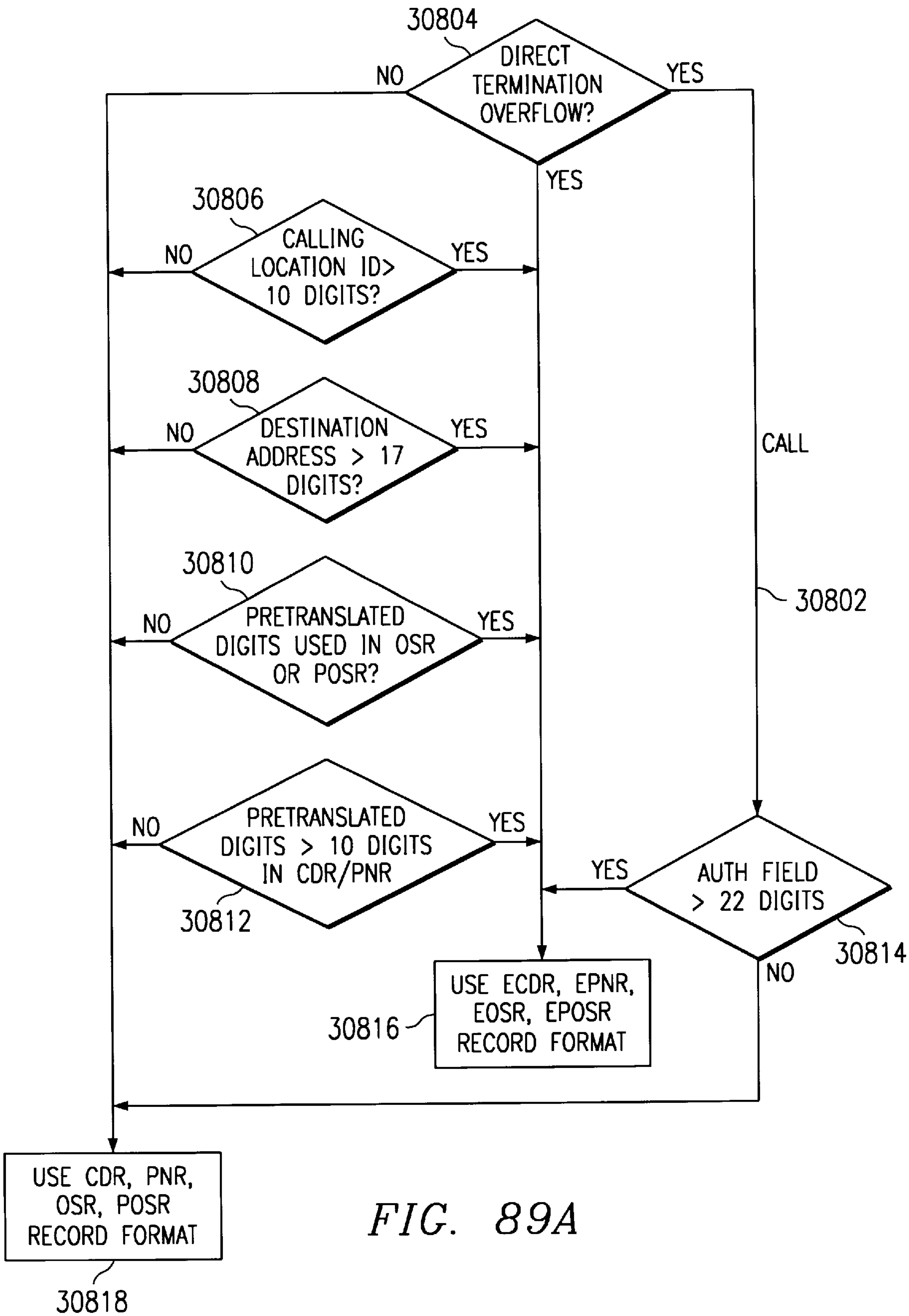
FIGS. 89(A) and 89(B) are control flow diagrams illustrating the conditions under which a switch uses the expanded record format in accordance with a preferred embodiment.
Figure 89B:
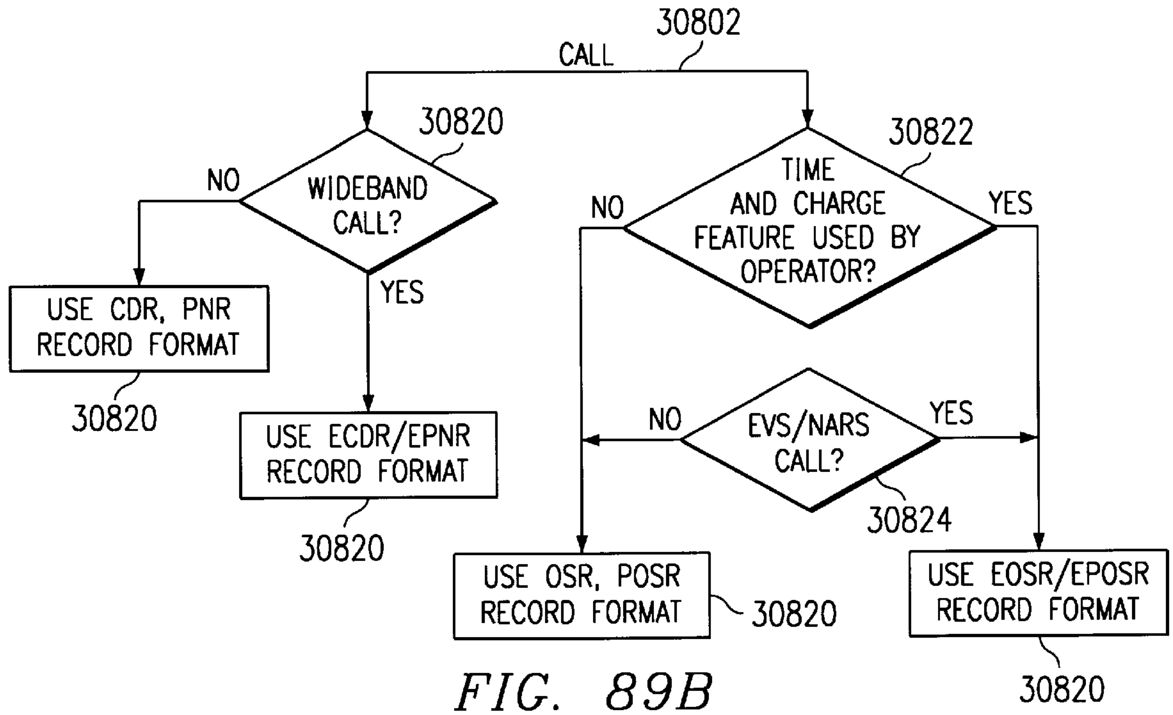

FIGS. 89(A) and 89(B) collectively illustrate the logic that a switch uses to determine when to use an expanded version of a record format. A call 30202 comes into a switch 30106–30110 (called the current switch for reference purposes; the current switch is the switch that is currently processing the call), at which time that switch 30106–30110 determines what call record and what call record format (small/default or large/expanded) to use for the call's 30802 call record. In this regard, the switch 30106–30110 makes nine (9) checks for each call 30802 that it receives. The switch 30106–30110 uses an expanded record for a call 30802 that passes any check as well as for a call 30802 that passes any combination of checks.

The first check 30804 determines if the call is involved in a direct termination overflow (DTO) at the current switch 30106–30110. For example, a DTO occurs when a customer makes a telephone call 30802 to an 30800 number and the original destination of the 800 number is busy. If the original destination is busy, the switch overflows the telephone call 30802 to a new destination. In this case, the switch must record the originally attempted destination, the final destination of the telephone call 30802, and the number of times of overflow. Therefore, if the call 30802 is involved in a DTO, the switch 30106–30110 must complete an expanded record (ECDR, EPNR, EOSR, EPOSR) 30816.

The second check 30806 made on a call 30802 by a switch 30106–30110 determines if the calling location of the call 30802 is greater than ten (10) digits. The calling location is the telephone number of the location from where the call 30802 originated. Such an example is an international call which comprises at least eleven (11) digits. If the calling location is greater than ten (10) digits, the switch records the telephone number of the calling location in an expanded record (ECDR, EPNR, EOSR, EPOSR) 30816.

A switch 30106–30110 makes a third check 30808 on a call 30802 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 30816.

A switch 30106–30110 makes a fourth check 30810 on a call 30802 to determine if the pre-translated digits field is used with an operated assisted service call. The pre-translated digits are the numbers of the call 30802 as dialed by a caller if the call 30202 must be translated to another number within the network. Therefore, when a caller uses an operator service, the switch 30106–30110 records the dialed numbers in expanded record (EOSR, EPOSR) 30816.

In a fifth check 30812 on a call 30802, a switch 30106–30110 determines if the pre-translated digits of a call 30802 as dialed by a caller without operator assistance has more than ten (10) digits. If there are more than ten (10) pre-translated digits, the switch 30106–30110 records the dialed numbers in expanded record (ECDR, EPNR) 30816.

In a sixth check 30814 on a call 30802, a switch 30106–30110 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 30106–30110 records the billing information in an expanded record (ECDR, EPNR, EOSR, EPOSR) 30816.

In a seventh check 30820 on a call 30802, a switch 30106–30110 determines if the call 30802 is a wideband call. A wideband call is one that requires multiple transmission lines, or channels. For example, a typical video call requires six (6) transmission channels one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 30828.

In an eighth check 30822 on a call 30802, a switch 30106–30110 determines if the time and charges feature was used by an operator. The time and charges feature is typically used in a hotel scenario when a hotel guest makes a telephone call using the operator's assistance and charges the call 30802 to her room. After the call 30802 has completed, the operator informs the hotel guest of the charge, or cost, of the call 30802. If the time and charges feature was used with a call 30802, the switch 30106–30110 records the hotel guest's name and room number in an expanded record (EOSR, EPOSR) 30832.

The ninth, and final, check 30824 made on a call 30802 by a switch 30106–30110 determines if the call 30802 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVS/NARS call 30802, the NARS switch 30106–30110 records the customer's menu selections in an expanded record (EOSR, EPOSR) 30832.

If none of the checks 30804–30824 return a positive result, then the switch 30106–30110 uses the default record format (OSR, POSR) 30830. Once the checks have been made on a call, a switch generates and completes the appropriate call record. Call record data is recorded in binary and Telephone Binary Coded Decimal (TBCD) format. TBCD format is illustrated below:

0000=TBCD-Null
0001=digit 1
0010=digit 2
0011=digit 3
0100=digit 4
0101=digit 5
0110=digit 6
0111=digit 7
1000=digit 8
1001=digit 9
1010=digit 0
1011=special digit 1 (DTMF digit A)
1100=special digit 2 (DTMF digit B)
1101=special digit 3 (DTMF digit C)
1110=special digit 4 (DTMF digit D)
1111=special digit 5 (Not Used)

All TBCD digit fields must be filled with TBCD-Null, or zero, prior to data being recorded. Where applicable, dialed digit formats conform to these conventions:

N=digits 2–9
X=digits 0–9
Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments from a particular date/time in history. The embodiment of the present invention uses a date/time of midnight (00:00 am UTC) on Jan. 1, 1976, but this serves as an example and is not a limitation. It would be readily apparent to one skilled in the relevant art to implement an epoch time based on another date/time. In the records, Timepoint 1 represents the epoch time that is the origination time of the call 30802. The other timepoint stored in the records are the number of seconds after Timepoint 1, that is, they are offsets from Timepoint 1 that a particular timepoint occurred. All of the timepoint fields must be filled in with "0's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time, which in this embodiment is UTC. The Time offset is a number reflecting the switch time relative to the UTC, that is, the offset due to time zones and, if appropriate, daylight savings time changes. There are three factors to consider when evaluating time change relative to UTC. First, there are time zones on both sides of UTC, and therefore there may be both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Third, there are many areas of the world that have time zones that are not in exact one-hour increments. For example, Australia has one time zone that has a thirty (30) minute difference from the two time zones on either side of it, and Northern India has a time zone that is fifteen (15) minutes after the one next to it. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.

i) Epoch Time+(Sign Bit*Time Offset)=Local Switch Time ii) Local Switch Time−(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours*60 minutes/hour=360 minutes). See FIG. 86 for more details on the SER record format. When recording Timepoint 1 in the call record, the switch multiplies the Time Offset by 60, because there is 60 seconds in each 1 minute increment, and determines whether the offset is positive or negative by checking the Sign Bit. This example results in a value of −21,600 (−1*360 minutes*60 seconds/minute=−21,600 seconds). Using equation (ii) from above, if the local switch time were midnight, the corresponding epoch time might be, for example, 1,200,000,000. Subtracting the Time Offset of −21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 90:
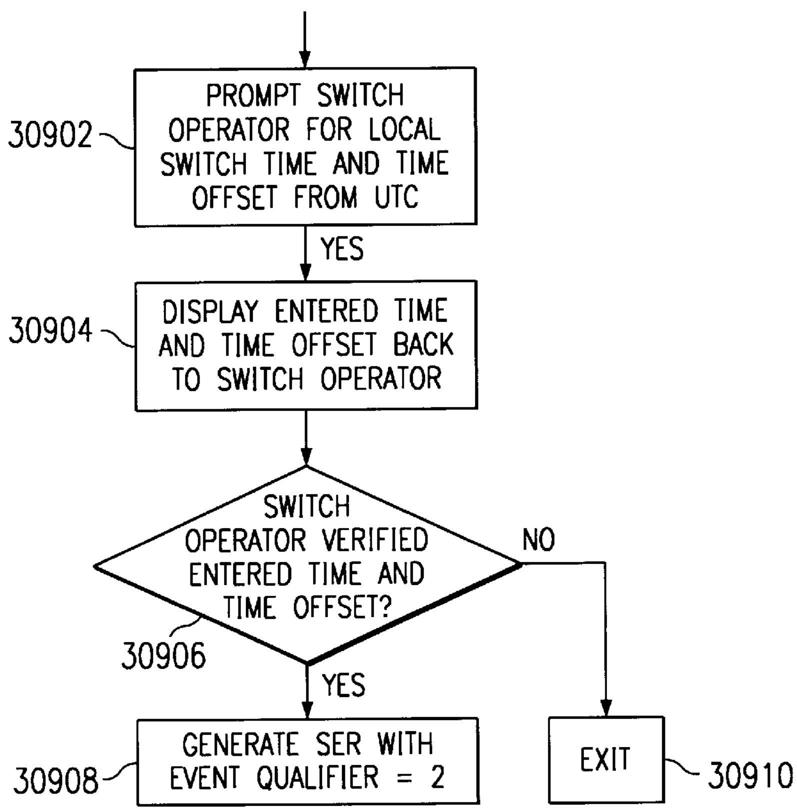
FIG. 90 is a control flow diagram illustrating the Change Time command in accordance with a preferred embodiment.

Two commands are used when changing time. First, FIG. 90 illustrates the control flow of the Change Time command 30900, which changes the Local Switch Time and the Time Offset. In FIG. 90, after a switch operator enters the Change Time command, the switch enters step 30902 and prompts the switch operator for the Local Switch Time and Time Offset from UTC. In step 30902 the switch operator enters a new Local Switch Time and Time Offset. Continuing to step 30904, the new time and Time Offset are displayed back to the switch operator. Continuing to step 30906, the switch operator must verify the entered time and Time Offset before the actual time and offset are changed on the switch. If in step 30906 the switch operator verifies the changes, the switch proceeds to step 30908 and generates a SER with an Event Qualifier equal to two which identifies that the change was made to the Local Switch Time and Time Offset of the switch. The billing center uses the SER for its bill processing. The switch proceeds to step 30910 and exits the command. Referring back to step 30906, if the switch operator does not verify the changes, the switch proceeds to step 30910 and exits the command without updating the Local Switch Time and Time Offset. For more information on SER, see FIG. 86.

Figure 91:
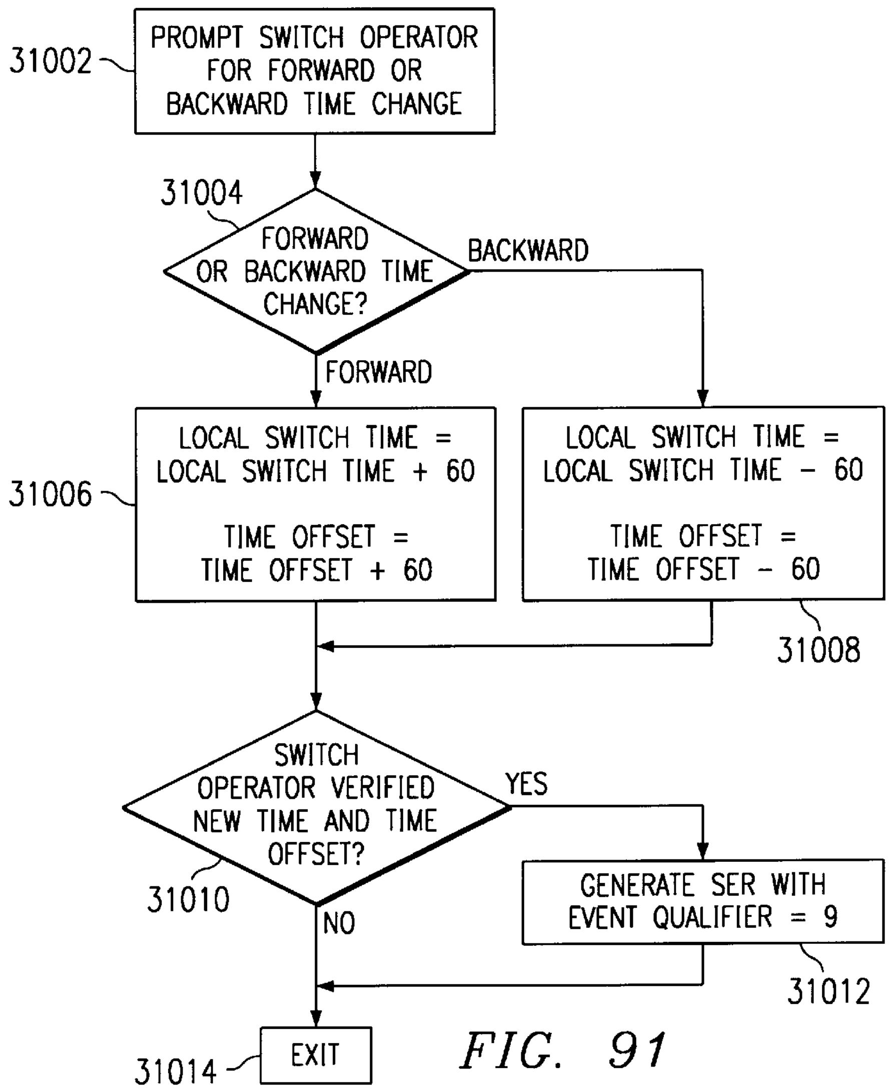
FIG. 91 is a control flow diagram illustrating the Change Daylight Savings Time command in accordance with a preferred embodiment.

FIG. 91 illustrates the control flow for the Change Daylight Savings Time command 31000 which is the second command for changing time. In FIG. 91, after a switch operator enters the Change Daylight Savings Time command, the switch enters step 31002 and prompts the switch operator to select either a Forward or Backward time change. Continuing to step 31004, the switch operator makes a selection. In step 31004, if the switch operator selects the Forward option, the switch enters step 31006. In step 31006, the switch sets the Local Switch Time forward one hour and adds one hour (count of 60) to the Time Offset. The switch then proceeds to step 31010. Referring back to step 31004, if the switch operator selects the Backward option, the switch sets the Local Switch Time back one hour and subtract one hour (count of 60) from the Time Offset. The switch then proceeds to step 31010.

In step 31010, the switch operator must verify the forward or backward option and the new Local Switch Time and Time Offset before the actual time change takes place. If in step 31010, the switch operator verifies the new time and Time Offset, the switch proceeds to step 31012 and generates a SER with an Event Qualifier equal to nine which changes the Local Switch Time and Time Offset of the switch. The switch proceeds to step 31014 and exits the command. Referring back to step 31010, if the switch operator does not verify the changes, the switch proceeds to step 31014 and exits the command without updating the Local Switch Time and Time Offset.

After the successful completion of a Change Daylight Savings Time Command, the billing records are affected by the new Time Offset. This embodiment allows the epoch time, used as the billing time, to increment normally through the daylight savings time change procedure, and not to be affected by the change of Local Switch Time and Time Offset.

2. Network Call Identifier

An embodiment provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits): This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID.

ii) Originating Trunk Group (14 bits): This field represents the originating trunk group as defined in the 32/64-word call record format described above.

iii) Originating Port Number (19 bits): This field represents the originating port number as defined in the 32/64-word call record format described above.

iv) Timepoint 1 (32 bits): This field represents the Timepoint 1 value as defined in the 32/64-word call record format described above.

v) Sequence Number (3 bits): This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format. Each switch records the NCID in either the 32 or 64-word call record format. Regarding the 32-word call record format, intermediate and terminating switches will record the NCID in the AuthCode field of the 32-word call record if the AuthCode filed is not used to record other information. In this case, the Originating Switch ID is the NCS Switch D, not the alphanumeric Switch ID as recorded in the SER call record. If the AuthCode is used for other information, the intermediate and terminating switches record the NCID in the 64-word call record format. In contrast, originating switches do not use the AuthCode field when storing an NCID in a 32-word call record. Originating switches record the subfields of the NCID in the corresponding separate fields of the 32-word call record. That is, the Originating Switch ID is stored as an alphanumeric Switch ID in the Switch ID field of the SER call record; the Originating Trunk Group is stored in the Originating Trunk Group field of the 32-word call record; the Originating Port Number is stored in the Originating Port field of the 32-word call record; the Timepoint 1 is stored in the Timepoint 1 field of the 32-word call record; the Sequence Number is stored in the NCID Sequence Number field of the 32-word call record. The 32-word call record also includes an NCID Location (NCIDLOC) field to identify when the NCID is recorded in the AuthCode field of the call record. If the NCID Location field contains a '1,' then the AuthCode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32-word call record.

Regarding the 64-word call record format, the expanded call record includes a separate field, call the NCID field, to store the 82 bits of the NCID. This call record is handled the same regardless of whether an originating, intermediate, or terminating switch stores the NCID. In the 64-word call record format, the Originating Switch ID is the NCS Switch ID, not the alphanumeric Switch ID as recorded in the SER call record.

Figure 92:
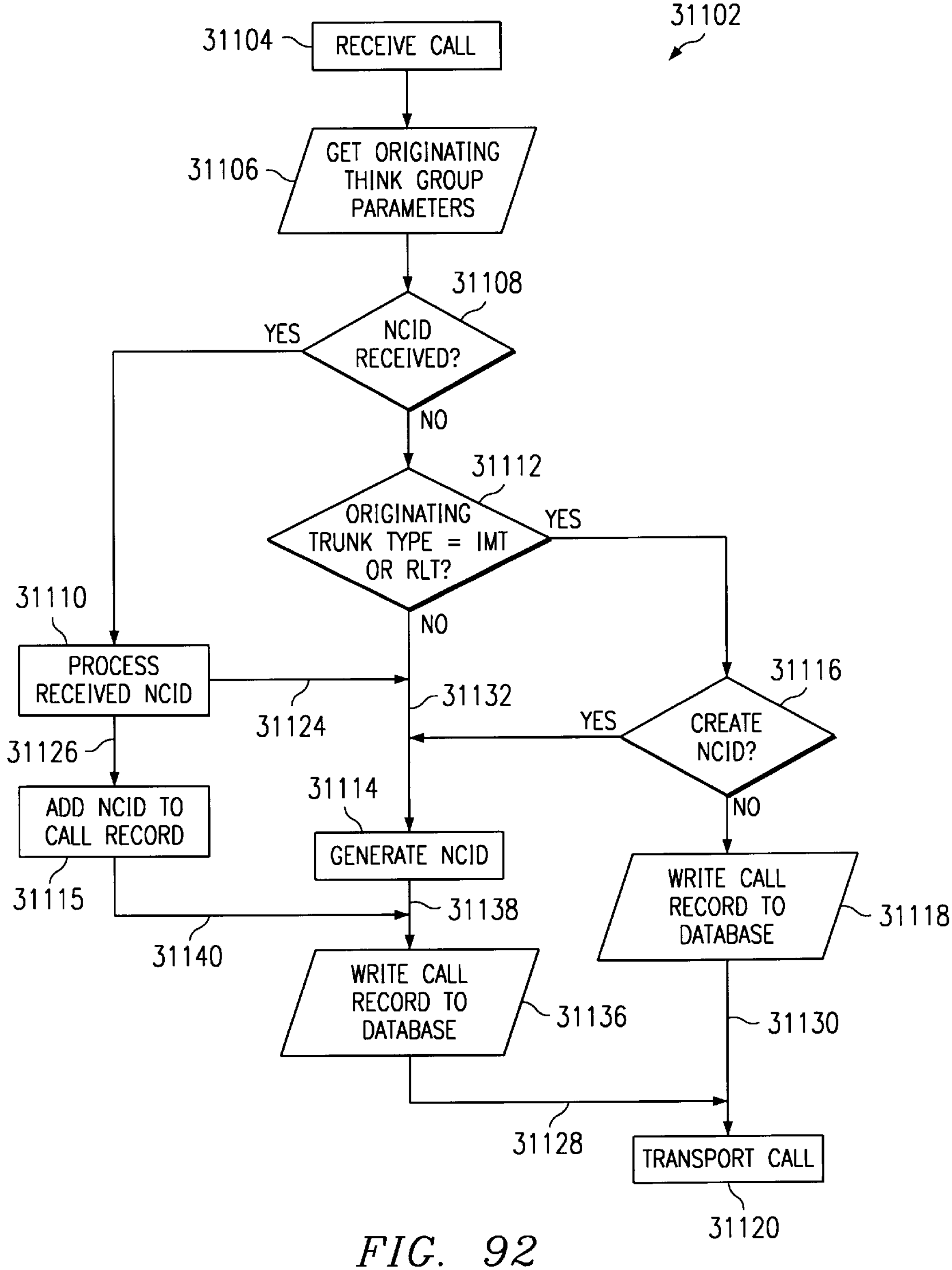
FIG. 92 is a control flow diagram illustrating the Network Call Identifier (NCID) switch call processing in accordance with a preferred embodiment.

FIG. 92 illustrates the control flow of the Network Call Identifier switch call processing. A call 30202 comes into a switch 30106–30110 (called the current switch for reference purposes; the current switch is the switch that is currently processing the call) at step 31104. In step 31104, the current switch receives the call 30202 and proceeds to step 31106. In step 31106, the current switch accesses a local database and gets the trunk group parameters associated with the originating trunk group of the call 30202. After getting the parameters, the current switch proceeds to step 31108. In step 31108, the current switch determines if it received an NCID with the call 30202. If the current switch did not receive an NCID with the call 30202, the switch continues to step 31112.

In step 31112, the switch analyzes the originating trunk group parameters to determine the originating trunk group type. If the originating trunk group type is an InterMachine Trunk (IMT) or a release link trunk (RLT), then the switch proceeds to step 31116. An IMT is a trunk connecting two normal telecommunication switches, whereas a RLT is a trunk connecting an intelligent services network (ISN) platform to a normal telecommunication switch. When the current switch reaches step 31116, the current switch knows that it is not an originating switch and that it has not received an NCID. In step 31116, the current switch analyzes the originating trunk group parameters to determine whether it is authorized to create an NCID for the call 30202. In step 31116, if the current switch is not authorized to create an NCID for the call 30202, the current switch proceeds to step 31118. When in step 31118, the current switch knows that it is not an originating switch, it did not receive an NCID for the call 30202, but is not authorized to generate an NCID. Therefore, in step 31118, the current switch writes the call record associated with the call 30202 to the local switch database and proceeds to step 31120. In step 31120, the current switch transports the call 30202 out through the network with its associated NCID. Step 31120 is described below in more detail.

Referring again to step 31116, if the current switch is authorized to create an NCID for the call 30202, the current switch proceeds to step 31114. In step 31114, the current switch generates a new NCID for the call 30202 before continuing to step 31136. In step 31136, the current switch writes the call record, including the NCID, associated with the call 30202 to the local switch database and proceeds to step 31120. In step 31120, the current switch transports the call 30202 out through the network with its associated NCID. Step 31120 is described below in more detail.

Referring again to step 31112, if the current switch determines that the originating trunk group type is not an IMT or RLT, the current switch proceeds to step 31114. When reaching step 31114, the current switch knows that it is an originating switch and, therefore, must generate a NCID for the call 30202. Step 31114 is described below in more detail. After generating a NCID in step 31114, the current switch proceeds to step 31136 to write the call record, including the NCID, associated with the call 30202 to the local database. After writing the call record, the current switch proceeds to step 31120 to transport the call out through the network with its associated NCID. Step 31120 is also described below in more detail.

Referring again to step 31108, if the current switch determines that it received an NCID with the call 30202, the current switch proceeds to step 31110. In step 31110, the current switch processes the received NCID. In step 31110, there are two possible results. First, the current switch may decide not to keep the received NCID thereby proceeding from step 31110 to step 31114 to generate a new NCID. Step 31110 is described below in more detail. In step 31114, the current switch may generate a new NCID for the call 30202 before continuing to step 31136. Step 31114 is also described below in more detail. In step 31136, the current switch writes the call record associated with the call 30202 to the local database. The current switch then proceeds to step 31120 and transports the call 30202 out through the network with its associated NCID. Step 31120 is also described below in more detail.

Referring again to step 31110, the current switch may decide to keep the received NCID thereby proceeding from step 31110 to step 31115. In step 31115, the current switch adds the received NCID to the call record associated with the call 30202. Steps 31110 and 31115 are described below in more detail. After step 31115, the current switch continues to step 31136 where it writes the call record associated with the call 30202 to the local database. The current switch then proceeds to step 31120 and transports the call 30202 out through the network with its associated NCID. Step 31120 is also described below in more detail.

Figure 93:
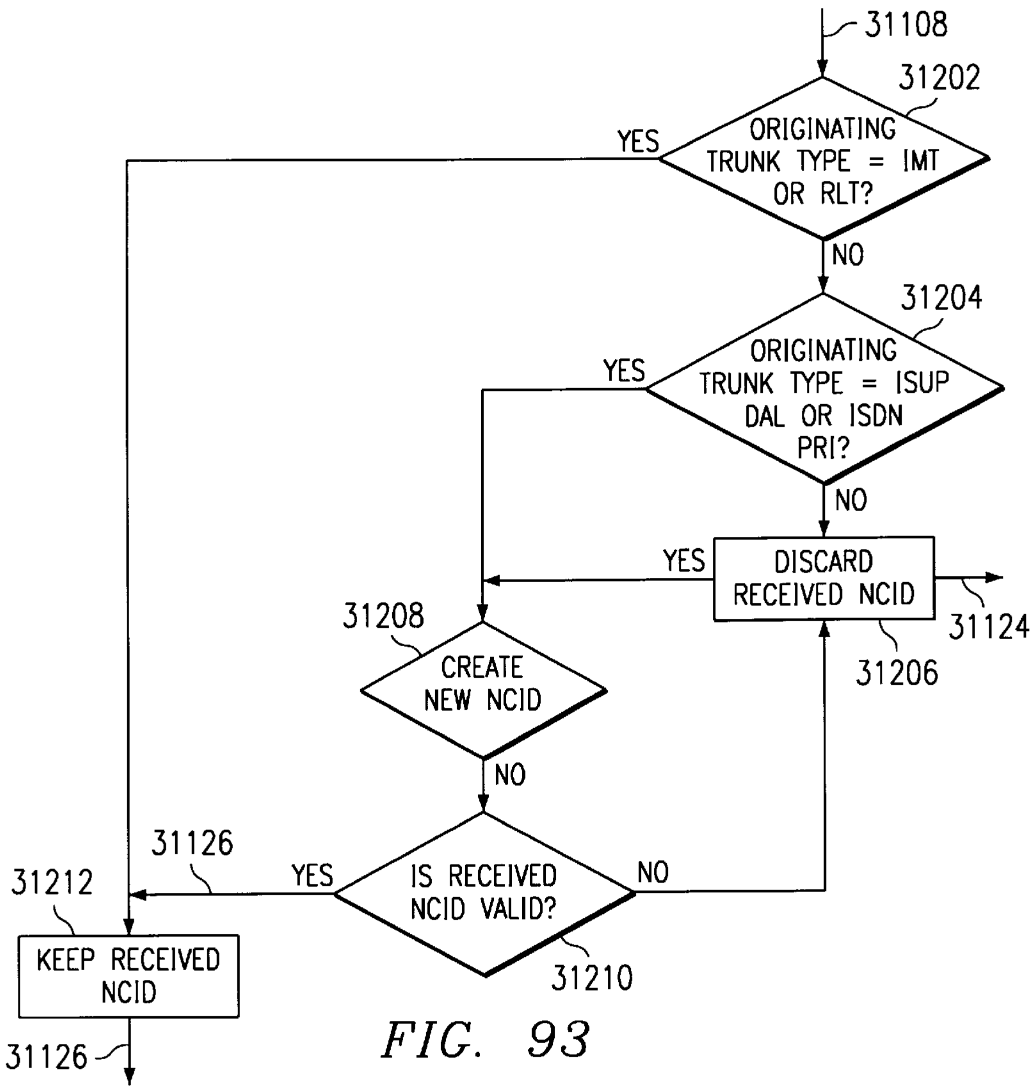
FIG. 93 is a control flow diagram illustrating the processing of a received Network Call Identifier in accordance with a preferred embodiment.

FIG. 93 illustrates the control logic for step 31110 which processes a received NCID. The current switch enters step 31202 of step 31110 when it determines that an NCID was received with the call 30202. In step 31202, the current switch analyzes the originating trunk group parameters to determine the originating trunk group type. If the originating trunk group type is an IMT or RLT, then the current switch proceeds to step 31212. When in step 31212, the current switch knows that it is not an originating switch and that it received an NCID for the call 30202. Therefore, in step 31212, the current switch keeps the received NCID and exits step 31110, thereby continuing to step 31115 in FIG. 92, after which the current switch will store the received NCID in the call record and transport the call.

Referring again to step 31202, if the originating trunk group type is not an IMT or RLT, the current switch proceeds to step 31204. In step 31204, the current switch determines if the originating trunk group type is an Integrated Services User Parts Direct Access Line (ISUP DAL) or an Integrated Services Digital Network Primary Rate Interface (ISDN PRI). ISUP is a signaling protocol which allows information to be sent from switch to switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 31204, if the current switch determines that the trunk group type is not an ISUP DAL or ISDN PRI, the current switch proceeds to step 31206. When in step 31206, the current switch knows that it received an NCID that was not generated by a switch that is part of the telecommunication network or by a switch that is a customer of the network. Therefore, in step 31206, the current switch discards the received NCID because it is an unreliable NCID. From step 31206, the current switch exits step 31110, thereby continuing to step 31114 in FIG. 92 where the current switch will create a new NCID and transport that NCID with the call 30202.

Referring back to step 31204, if the current switch determines that the originating trunk group type is an ISUP DAL or ISDN PRI, the current switch continues to step 31208. When in step 31208, the current switch knows that it received an NCID from a customer trunk group. Therefore, the current switch analyzes the originating trunk group parameters to determine whether it is authorized to create a new NCID for the call 30202. The current switch may be authorized to create a new NCID and overwrite the NCID provided by the customer to ensure that a valid NCID corresponds to the call 30202 and is sent through the network. In step 31208, if the current switch is not authorized to create a new NCID for the call 30202, the current switch proceeds to step 31210. In step 31210, the current switch checks the validity of the received NCID, for example, the NCID length. If the received NCID is invalid, the current switch proceeds to step 31206. In step 31206, the current switch discards the invalid NCID. From step 31206, the current switch exits step 31110, thereby continuing to step 31114 in FIG. 92 where the current switch will create a new NCID and transport that NCID with the call 30202.

Referring again to step 31210, if the current switch determines that the received NCID is valid, the current switch proceeds to step 31212. In step 31212 the current switch keeps the received NCID and exits step 31110, thereby continuing to step 31115 in FIG. 92 where the current switch will store the received NCID in the call record and transport the call.

Figure 94A:
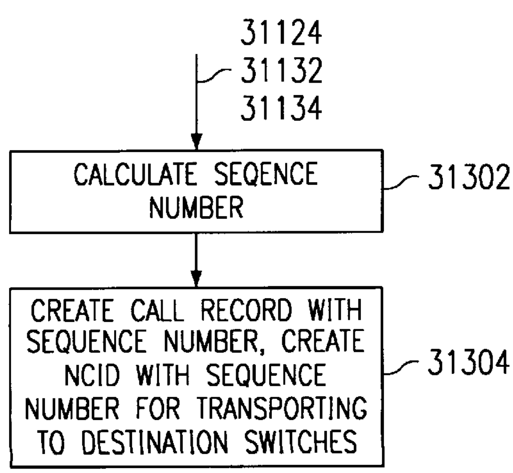
FIG. 94(A) is a control flow diagram illustrating the generation of a Network Call Identifier in accordance with a preferred embodiment.

FIG. 94A illustrates the control logic for step 31114 which generates an NCID. The current switch enters step 31302 when an NCID must be created. In step 31302, the current switch will calculate a sequence number. The sequence number represents the number of calls which have occurred on the same port number with the same Timepoint 1 value. The first call has a sequence number value of '0,' after which the sequence number will increase incrementally for each successive call that originates on the same port number with the same Timepoint 1 value. After creating the sequence number in step 31302, the current switch proceeds to step 31304. In step 31304, the current switch creates a call record for the call 30202, including in it the call's 30202 newly created NCID. After the call record has been created, the current switch exits step 31114 and proceeds to step 31136 in FIG. 92 where the current switch writes the call record to the local switch database.

Figure 94B:
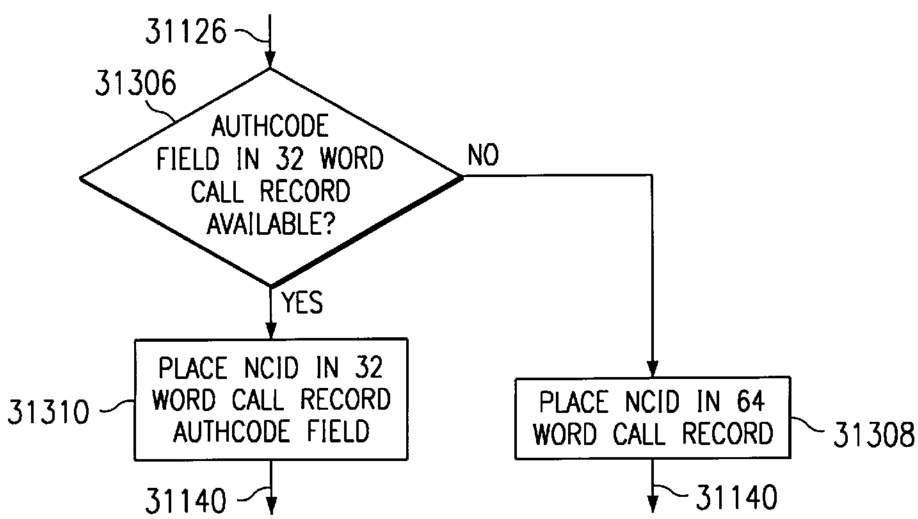
FIG. 94(B) is a control flow diagram illustrating the addition of a Network Call Identifier to a call record in accordance with a preferred embodiment.

FIG. 94B illustrates the control logic for step 31115 which adds a received NCID to the call record associated with the call 30202. Upon entering step 31115, the current switch enters step 31306. When in step 31306, the current switch knows that it has received a valid NCID from an intermediate or terminating switch, or from a customer switch. In step 31306, the current switch determines if the AuthCode field of the 32-word call record is available for storing the NCID. If the AuthCode field is available, the current switch proceeds to step 31310. In step 31310, the current switch stores the NCID in the AuthCode field of the 32-word call record. The current switch must also set the NCID Location field to the value '1' which indicates that the NCID is stored in the AuthCode field. After step 31310, the current switch exits step 31115 and continues to step 31136 in FIG. 92 where the current switch writes the call record to the local switch database.

Referring again to step 31306, if the AuthCode field is not available in the 32-word call record, the current switch proceeds to step 31308. In step 31308, the current switch stores the NCID in the NCID field of the 64-word call record. After step 31308, the current switch exits step 31115 and continues to step 31136 in FIG. 92 where the current switch writes the call record to the local switch database.

Figure 95:
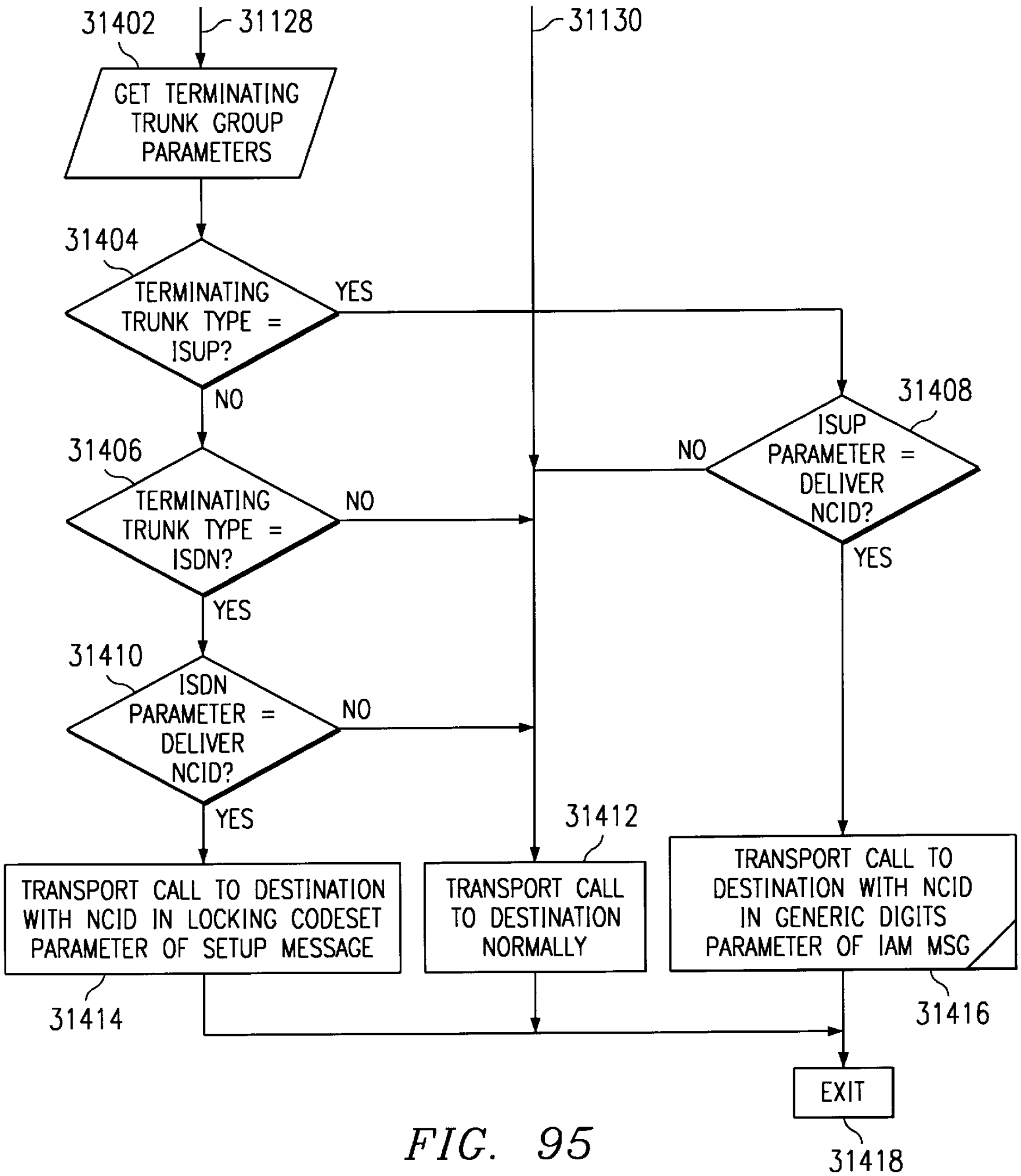
FIG. 95 is a control flow diagram illustrating the transport of a call in accordance with a preferred embodiment.

FIG. 95 illustrates the control logic for step 31120 which transports the call from the current switch. There are two entry points for this control logic: steps 31402 and 31412. Upon entering step 31402 from step 31136 on FIG. 92, the current switch knows that it has created an NCID or has received a valid NCID. In step 31402, the current switch accesses a local database and gets the trunk group parameters associated with the terminating trunk group for transporting the call 30202. After getting the parameters, the current switch proceeds to step 31404. In step 31404, the current switch determines the terminating trunk group type. If the terminating trunk is an ISUP trunk, the current switch proceeds to step 31408. In step 31408, the current switch analyzes the parameters associated with the ISUP trunk type to determine whether or not to deliver the NCID to the next switch. If the current switch is authorized to deliver the NCID, the current switch proceeds to step 31416. In step 31416, the current switch transports the call to the next switch along with a SS7 initial address message (IAM). The NCID is transported as part of the generic digits parameter of the IAM. The IAM contains setup information for the next switch which prepares the next switch to accept and complete the call 30202. The format of the generic digits parameter is shown below in Table 306:

TABLE 306

Generic Digits Parameter:
Code: 11000001
Type: 0

| Byte #, Bit # | Description |
|---|---|
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 30202 and the IAM, the current switch proceeds to step 31418, thereby exiting the switch processing.

Referring again to step 31408, if the current switch is not authorized to deliver the NCID to the next switch in an IAM message, the current switch proceeds to step 31412. In step 31412, the current switch transports the call 30202 to the next switch under normal procedures which consists of sending an IAM message to the next switch without the NCID recorded as part of the generic digits parameter. After transporting the call 30202, the current switch proceeds to step 31418, thereby exiting the switch processing.

Referring again to step 31404, if the current switch determines that the terminating trunk is not an ISUP, the current switch proceeds to step 31406.

In step 31406, the current switch determines if the terminating trunk group is an ISDN trunk (the terminating trunk group is dedicated to one network customer). If the terminating trunk group is an ISDN, the current switch proceeds to step 31410. In step 31410, the current switch analyzes the parameters associated with the ISDN trunk group type to determine whether or not to deliver the NCID to the next switch. If the current switch is authorized to deliver the NCID, the current switch proceeds to step 31414. In step 31414, the current switch transports the call to the next switch along with a setup message. The setup message contains setup information for the next switch which prepares the next switch to accept and complete the call 30202. The NCID is transported as part of the locking shift codeset 6 parameter of the setup message. The format of the locking shift codeset 6 parameter is shown below in Table 307:

TABLE 307

Locking Shift Codeset 6 Parameter:
Code: 11000001
Type: 0

| Byte #, Bit # | Description |
|---|---|
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 30202 and the setup message, the current switch proceeds to step 31418, thereby exiting the switch processing.

Referring again to step 31410, if the current switch determines that it does not have authority to deliver the NCID to the next switch in a setup message, the current switch proceeds to step 31412. In step 31412, the current switch transports the call 30202 to the next switch under normal procedures which consists of sending a setup message to the next switch without the NCID recorded as part of the locking shift codeset 6 parameter. After transporting the call 30202, the current switch proceeds to step 31418, thereby exiting the switch processing.

Referring again to step 31412, this step is also entered from step 31118 on FIG. 92 when the current switch did not receive an NCID, is an intermediate or terminating switch, and is not authorized to create an NCID. In this case, in step 31412, the current switch also transports the call 30202 to the next switch under normal procedures which consists of sending an IAM or setup message to the next switch without the NCID recorded as part of the parameter. After transporting the call 30202, the current switch proceeds to step 31418, thereby exiting the switch processing.

A system and method for the switches of a telecommunications network to generate call records for telephone calls using a flexible and expandable record format. Upon receipt of a telephone call, a switch in the network analyzes the telephone call to determine whether the default call record is sufficiently large to store call record information pertaining to the telephone call, or whether the expanded call record must be used to store the call information pertaining to the telephone call. After determining which call record to use, the switch generates the default or expanded call record. The switch sends a billing block, comprised of completed call records, to a billing center upon filling an entire billing block.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

APPENDIX

| Word #, Bit # | Description |
|---|---|
| Table 301 - CDR/PNR Record Format: | |
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPNR<br>8 = EOSR<br>9 = EPOSR<br>10–15 = Not Used |
| Word 0, bits 4–15 | Call Disconnect ID (CDID): Identifies the call record. Each call record has a unique ID number. These 12 bits contain the 12 least significant bits of the CDID. |
| Word 1, bits 0–15<br>Word 2, bits 0–15 | Timepoint 1 (TP1): A binary count of the number of seconds that occurred between midnight (UTC) on January 1, 1976, and the time that the incoming call was detected by the switch. |
| Word 3, bits 0–12 | Timepoint 3 (TP3): A binary count of the number of seconds between Timepoint 1 and the time the outgoing signaling protocol was completed; that is, the number of seconds that it took for the switch to connect to the outgoing trunk. |
| Word 3, bits 13–15<br>Word 4, bits 0–9 | Timepoint 6 (TP6): A binary count of the number of seconds between timepoint 1 and the time Answer Supervision was detected or received. This is the time that it took for the call to be answered by the person or audio system being called. |
| Word 4, bits 10–15<br>Word 5, bits 0–15 | Timepoint 7 (TP7): A binary count of the number of seconds between timepoint 1 and the time that the originating or |

APPENDIX-continued

| Word #, Bit # | Description |
|---|---|
| | terminating party disconnected whichever is first. |
| Word 6, bits 0–15<br>Word 7, bits 0 | Originating Port (OP): The absolute port number of the originating trunk. Originating trunk is the line on which the call came to the switch. |
| Word 7, bits 1–15<br>Word 8, bits 0–1 | Terminating Port (TP): The absolute port number of the last terminating trunk seized for an outgoing call attempt. The terminating trunk is the last line on which the call is transmitted. |
| Word 8, bits 2–14 | Originating Trunk Group (OTG): A binary number expressing the Originating Trunk Group number of the originating trunk. An originating trunk group is a group of ports coming from the same location. |
| Word 8, bits 15<br>Word 9, bits 0–11 | Terminating Trunk Group (TTG): A binary number expressing the Terminating Trunk Group number of the Terminating trunk. A terminating trunk group is a group of ports going to the same location. If a call fails because no trunks are available, record the last trunk group number that was attempted. |
| Word 9, bits 12–15 | Timepoint 3 qualifier (TP3Q): Contains the outpulsed call disposition qualifier which provides the telephone number of the person making the call to the person being called. The person being called needs to have signed up for the "ANI Delivery" service and have a display device for displaying the caller's telephone number.<br>0 = Default<br>1 = ANI/CSI was delivered<br>2 = DNIS was delivered<br>3 = ANI/CSI and DNIS were delivered<br>4–5 = Not Used<br>6 = NCT<br>7 = NCT, ANI/CSI was delivered<br>8 = NCT, DNIS was delivered<br>9 = NCT, ANI/CSI and DNIS was delivered<br>10 = NCT Tandem<br>11–15 = Not Used |
| Word 10, bits 0–1 | Timepoint 6 qualifier (TP6Q): Contains the answer supervision qualifier indicating the way in which the telephone call was answered.<br>0 = Hardware detected an Answer<br>1 = Software detected Voice<br>2 = Not Used<br>3 = Operator/NARS detected an Answer<br>*Not Used in CDR/PNR |
| Word 10, bits 2–7 | Action Code (AC): The switch provides an action code which indicates the type of destination address, or what type of telephone number was called, or an error code.<br>0 = Default<br>1 = 7-digit number without overflow<br>2 = 7-digit number with overflow<br>3 = DDD number<br>4 = IDDD number<br>5 = Switch generated Action Code<br>6 = Incoming exclusion failure<br>7 = ID code failure<br>8 = Unexpected error occurs in the NCS/DAP<br>9 = Misdialed number and the NCS/DAP is unable to translate the dialed number<br>10 = 10-digit number without overflow<br>11 = 10-digit number with overflow<br>12 = National with overflow<br>13 = International with overflow<br>14 = ANI not found<br>15 = NPA-NXXX not found<br>16 = Pilot number not found<br>17 = Associated partition not found<br>18 = ADF format error<br>19 = Switch ID not found<br>20 = 800 number not found<br>21 = 800 number out of band<br>22 = 800 number no longer in service<br>23 = Invalid ID code<br>24 = Range privilege<br>25 = 7-digit number not in database<br>26 = 10-digit exclusion feature<br>27 = 900 number not found<br>28 = 900 number out of band<br>29 = 900 number no longer in service<br>30 = NCS network management blocked<br>31 = NCS Gate Denial |

APPENDIX-continued

| Word #, Bit # | Description |
|---|---|
| | 32 = FlexSTC, Overflow Not Allowed<br>33 = FlexSTC, Overflow Allowed<br>34 = SAC Number Not Found<br>35 = SAC Number Out of Band<br>36 = 700 Number Not Found<br>37 = 700 Number Out of Band<br>38 = ICR designated Out of Band<br>39 = NCT - Reversed Call Direction<br>40–49 = Not Used<br>50 = Flexible Direct Termination Call without overflow<br>51 = Flexible Direct Termination Call with overflow<br>52 = Outbound VNet without overflow<br>53 = Outbound IVNet with overflow<br>54 = Global Switch Profile Not Found<br>55 = ANI Index Provided by DAP<br>56–62 = Not Used<br>63 = International Inbound AAP |
| Word 10, bits 8–11 | Originating Trunk Class (OTC): Indicates what type of originating trunk was accessed.<br>0 = ONAL (FG-A)<br>1 = ONAT (FG-B, FG-C, FG-D, CAMA, LAMA)<br>2 = DAL, VNET CAMA, FGS-DAL)<br>3 = IMT (Inband or SS7)<br>4 = International Circuit (R1, R2, #5, #6, #7)<br>5 = ISDN PRI<br>6 = OST<br>7–15 = Not Used<br>FG = Feature Group |
| Word 10, bits 12–15 | Terminating Trunk Class (TTC): Indicates what type of terminating trunk was accessed.<br>0 = ONAL (FG-A)<br>1 = ONAT (FG-B, FG-C, FG-D, CAMA, LAMA)<br>2 = DAL, VNET CAMA, FGS-DAL)<br>3 = IMT (Inband or SS7)<br>4 = International Circuit (R1, R2, #5, #6, #7)<br>5 = ISDN PRI<br>6 = OST<br>7–15 = Not Used<br>FG = Feature Group |
| Word 11, bits 0–7 | Information Digits (ID): The switch receives these digits from the originating trunk group indicating the type of telephone on which the telephone call originated, such as a home telephone, pay telephone, or prison telephone. |

| | FG-B Direct, CAMA | FG-D | MCI IMT | #5 | #6 |
|---|---|---|---|---|---|
| bits 0–3: | TBCD Null | X | X | TBCD Null | X |
| bits 4–7: | X | X | X | X | X |

| Word #, Bit # | Description |
|---|---|
| Word 11, bits 8–15 | Automatic Number Identification (ANI) Index Number: The index number is obtained from the ANI Index Table for all calls except 800 calls. The ANI number is looked up to determine whether the caller is a VNet customer or not. If the caller is a VNet caller, the index number is used to look up the destination address. |
| Word 12, bits 0–15<br>Word 13, bits 0–15<br>Word 14, bits 0–7 | Call Location ID (CLI): Represents the 10 digits from where the call came. If switch receives more than 10 digits, record them in the ECDR/EPNR. There are nine (9) types of calling locations:<br>1. VNet CAMA DAL originations: If CSI is available, prefix the CSI with filed HNPA and HNXX information, if available, and record. Use NOCLI value of 7.<br>2. FG-C originations: If ANI or CSI information is not available and the number is in the 00Y + NXX + XXXX format, record the 00Y in CLI1-3, and record the OSID/OTG in CLI4-10. Use NOCLI value of 8.<br>3. Inband FG-D Originations: Record the ANI that was received starting with CLI1. Use NOCLI value of 1.<br>4. SS7 FG-D Originations: Record the charge number, if available. If not available, record the calling party number. Use NOCLI value of 2 or 3.<br>5. International originations: Record the country code and the national number of the calling party. Use NOCLI of 9.<br>6. SS7 IMTs Originations: Record the following information in this order of importance: 1) charge number, 2) calling party number, 3) OSID/OTG from generic digits. Use NOCLI of 2, 3, or 8.<br>7. SS7 Reseller Originations: The CLI field is filled with TBCD-Nulls.<br>8. SS7 Private Network Originations: The CLI field is filled with- |

APPENDIX-continued

| Word #, Bit # | Description |
|---|---|
| | TBCD-Nulls.<br>9. PRI Organizations: Record the calling party number received in the ISDN setup message.<br>The format: |

| | 1–10 digit ANI | OSID/OTG | Incoming Int'l |
|---|---|---|---|
| Word 12, bits 0–3 | CLIl | TBCD Null | X(CC) |
| Word 12, bits 4–7 | CLI2 | TBCD Null | X(CC) |
| Word 12, bits 8–11 | CLI3 | TBCD Null | X(CC) |
| Word 12, bits 12–15 | CLI4 | X(OSID) | X(NN) |
| Word 13, bits 0–3 | CLI5 | X(OSID) | X(NN) |
| Word 13, bits 4–7 | CLI6 | X(OSID) | X(NN) |
| Word 13, bits 8–11 | CLI7 | X(OTG) | X(NN) |
| Word 13, bits 12–15 | CLI8 | X(OTG) | X(NN) |
| Word 14, bits 0–3 | CLI9 | X(OTG) | X(NN) |
| Word 14, bits 4–7 | CLI10 | X(OTG) | X(NN) |

CC = Customer Connect
NN = National Number
OSID = Originating Switch NSC ID (000–999)
OTG = Originating Trunk Group (0000–8191)

| Word #, Bit # | Description |
|---|---|
| Word 14, bits 8–15<br>Word 15, bits 0–15<br>Word 16, bits 0–15<br>Word 17, bits 0–15<br>Word 18, bits 0–15<br>Word 19, bits 0–15 | Authorization Codes: Represents 22 digits of who gets billed for the call which includes one or more of the following and/or an optional Supplementary Code:<br><br>1. Authorization Code - Contains the authorization code digits. AUTH1–AUTH5 records the dialed or filed authorization codes, afterwhich is recorded an optional variable 14 digit security code, SEC1–SEC4, comprised of TBCD digits 0–9 and A–D. After the last digit, record a TBCD-Null, afterwhich record any supplementary code digits, SUPP1–SUPP12. Record TBCD-Null in any unused byte. Authorization Code format: |

| | | 5 digit Auth Code | 6 digit Auth Code | 7 digit Auth Code |
|---|---|---|---|---|
| Word 14, bits 8–11 | A1 | AUTH1 | AUTH1 | AUTH1 |
| Word 14, bits 12–15 | A2 | AUTH2 | AUTH2 | AUTH2 |
| Word 15, bits 0–3 | A3 | AUTH3 | AUTH3 | AUTH3 |
| Word 15, bits 4–7 | A4 | AUTH4 | AUTH4 | AUTH4 |
| Word 15, bits 8–11 | A5 | AUTH5 | AUTH5 | AUTH5 |
| Word 15, bits 12–15 | A6 | SEC1 | AUTH6 | AUTH6 |
| Word 16, bits 0–3 | A7 | SEC2 | SEC1 | AUTH7 |
| Word 16, bits 4–7 | A8 | SEC3 | SEC2 | SEC1 |
| Word 16, bits 8–11 | A9 | SEC4 | SEC3 | SEC2 |
| Word 16, bits 12–15 | A10 | TBCP-Null | SEC4 | SEC3 |
| Word 17, bits 0–3 | A11 | SUPP1 | TBCD-Null | SEC4 |
| Word 17, bits 4–7 | A12 | SUPP2 | SUPP1 | TBCD-Null |
| Word 17, bits 8–11 | A13 | SUPP3 | SUPP2 | SUPP1 |
| Word 17, bits 12–15 | A14 | SUPP4 | SUPP3 | SUPP2 |
| Word 18, bits 0–3 | A15 | SUPP5 | SUPP4 | SUPP3 |
| Word 18, bits 4–7 | A16 | SUPP6 | SUPP5 | SUPP4 |
| Word 18, bits 8–11 | A17 | SUPP7 | SUPP6 | SUPP5 |
| Word 18, bits 12–15 | A18 | SUPP8 | SUPP7 | SUPP6 |
| Word 19, bits 0–3 | A19 | SUPP9 | SUPP8 | SUPP7 |
| Word 19, bits 4–7 | A20 | SUPP10 | SUPP9 | SUPP8 |
| Word 19, bits 8–11 | A21 | SUPP11 | SUPP10 | SUPP9 |
| Word 19, bits 12–15 | A22 | SUPP12 | SUPP11 | SUPP10 |

2. Calling Station ID (CSI) - Contains the digits of the calling station identifier. The CSI digits will be recorded starting at Al. A TBCD-Null is recorded after the last CSI digit, followed by Supplemental Code digits. Unused bytes contain a TBCD-Null.
Calling Station ID format:

| | | 7 digit CSI | 10 digit CSI |
|---|---|---|---|
| Word 14, bits 8–11 | A1 | X | X |
| Word 14, bits 12–15 | A2 | X | X |
| Word 15, bits 0–3 | A3 | X | X |
| Word 15, bits 4–7 | A4 | X | X |
| Word 15, bits 8–11 | A5 | X | X |
| Word 15, bits 12–15 | A6 | X | X |
| Word 16, bits 0–3 | A7 | X | X |
| Word 16, bits 4–7 | A8 | TBCD-Null | X |
| Word 16, bits 8–11 | A9 | SUPP1 | X |
| Word 16, bits 12–15 | A10 | SUPP2 | X |
| Word 17, bits 0–3 | A11 | SUPP3 | TBCD-Null |
| Word 17, bits 4–7 | A12 | SUPP4 | SUPP1 |

APPENDIX-continued

| Word #, Bit # | Description | | | |
|---|---|---|---|---|
| | Word 17, bits 8–11 | A13 | SUPP5 | SUPP2 |
| | Word 17, bits 12–15 | A14 | SUPP6 | SUPP3 |
| | Word 18, bits 0–3 | A15 | SUPP7 | SUPP4 |
| | Word 18, bits 4–7 | A16 | SUPP8 | SUPP5 |
| | Word 18, bits 8–11 | A17 | SUPP9 | SUPP6 |
| | Word 18, bits 12–15 | A18 | SUPP10 | SUPP7 |
| | Word 19, bits 0–3 | A19 | SUPP11 | SUPP8 |
| | Word 19, bits 4–7 | A20 | SUPP12 | SUPP9 |
| | Word 19, bits 4–11 | A21 | SUPP11 | SUPP10 |
| | Word 19, bits 12–15 | A22 | SUPP12 | SUPP11 |
| | 3. Supplementary Codes - Supplemental Codes are recorded starting in A1. Unused bytes contain TBCD-Null. Supplementary Code format: | | | |
| | | | 800/900 VNet Supp. Codes | |
| | Word 14, bits 8–11 | A1 | SUPP1 | |
| | Word 14, bits 12–15 | A2 | SUPP2 | |
| | Word 15, bits 0–3 | A3 | SUPP3 | |
| | Word 15, bits 4–7 | A4 | SUPP4 | |
| | Word 15, bits 8–11 | A5 | SUPP5 | |
| | Word 15, bits 12–15 | A6 | SUPP6 | |
| | Word 16, bits 0–3 | A7 | SUPP7 | |
| | Word 16, bits 4–7 | A8 | SUPP8 | |
| | Word 16, bits 8–11 | A9 | SUPP9 | |
| | Word 16, biis 12–15 | A10 | SUPP10 | |
| | Word 17, bits 0–3 | A11 | SUPP11 | |
| | Word 17, bits 4–7 | A12 | SUPP12 | |
| | Word 17, bits 8–11 | A13 | SUPP13 | |
| | Word 17, bits 12–15 | A14 | SUPP14 | |
| | Word 18, bits 0–3 | A15 | SUPP15 | |
| | Word 18, bits 4–7 | A16 | SUPP16 | |
| | Word 18, bits 8–11 | A17 | SUPP17 | |
| | Word 18, bits 12–15 | A18 | SUPP18 | |
| | Word 19, bits 0–3 | A19 | SUPP19 | |
| | Word 19, bits 4–7 | A20 | SUPP20 | |
| | Word 19, bits 8–11 | A21 | SUPP21 | |
| | Word 19, bits 12–15 | A22 | SUPP22 | |
| | 4. VNet Remote Access - If the caller accesses VNet services through the Remote Access Service, the access number is recorded starting at A1. A TBCD-Null is recorded after the last digit followed by any Supplemental Codes. Unused bytes contain TBCD-Null. VNet Remote Access format: | | | |
| | Word 14, bits 8–11 | A1 | X | |
| | Word 14, bits 12–15 | A2 | X | |
| | Word 15, bits 0–3 | A3 | X | |
| | Word 15, bits 4–7 | A4 | X | |
| | Word 15, bits 8–11 | A5 | X | |
| | Word 15, bits 12–15 | A6 | X | |
| | Word 16, bits 0–3 | A7 | X | |
| | Word 16, bits 4–7 | A8 | X | |
| | Word 16, bits 8–11 | A9 | X | |
| | Word 16, bits 12–15 | A10 | X | |
| | Word 17, bits 0–3 | A11 | TBCD-Null | |
| | Word 17, bits 4–7 | A12 | SUPP1 | |
| | Word 17, bits 8–11 | A13 | SUPP2 | |
| | Word 17, bits 12–15 | A14 | SUPP3 | |
| | Word 15, bits 0–3 | A15 | SUPP4 | |
| | Word 18, bits 4–7 | A16 | SUPP5 | |
| | Word 18, bits 8–11 | A17 | SUPP6 | |
| | Word 18, bits 12–15 | A18 | SUPP7 | |
| | Word 19, bits 0–3 | A19 | SUPP8 | |
| | Word 19, bits 4–7 | A20 | SUPP9 | |
| | Word 19, bits 8–11 | A21 | SUPP10 | |
| | Word 19, bits 12–15 | A22 | SUPP11 | |
| | 5. Calling Party Number - The calling party number is recorded for SS7 FGD call originations received with a charge number and a calling party number. Record the SS7 calling party number in A1–10. A TBCD-Null is recorded after the last digit, followed by supplementary codes. Unused bytes contain TBCD-Null. Calling party number format: | | | |
| | Word 14, bits 8–11 | A1 | N | |
| | Word 14, bits 12–15 | A2 | X | |
| | Word 15, bits 0–3 | A3 | X | |
| | Word 15, bits 4–7 | A4 | N | |
| | Word 15, bits 8–11 | A5 | X | |
| | Word 15, bits 12–15 | A6 | X | |

APPENDIX-continued

| Word #, Bit # | Description |
|---|---|
| | Word 16, bits 0–3 A7 N<br>Word 16, bits 4–7 A8 X<br>Word 16, bits 8–11 A9 X<br>Word 16, bits 12–15 A10 X<br>Word 17, bits 0–3 A11 TBCD-Null<br>Word 17, bits 4–7 A12 SUPP1<br>Word 17, bits 8–11 A13 SUPP2<br>Word 17, bits 12–15 A14 SUPP3<br>Word 18, bits 0–3 A15 SUPP4<br>Word 18, bits 4–7 A16 SUPP5<br>Word 18, bits 8–11 A17 SUPP6<br>Word 18, bits 12–15 A18 SUPP7<br>Word 19, bits 0–3 A19 SUPP8<br>Word 19, bits 4–7 A20 SUPP9<br>Word 19, bits 8–11 A21 SUPP10<br>Word 19, bits 12–15 A22 SUPP11 |
| | 6. Credit Card Number - Record the commercial credit card or presubcribed credit card number starting in A1. The PIN digits of a valid presubscribed credit card number are masked out by writing TBCD-A over the 4 PIN digits. A TBCD-Null is recorded after the last digit, followed by supplementary codes. Unused bytes contain TBCD-Null. Credit card number format: |
| | Word 14, bits 8–11 A1 X<br>Word 14, bits 12–15 A2 x<br>Word 15, bits 0–3 A3 X<br>Word 15, bits 4–7 A4 X<br>Word 15, bits 8–11 A5 X<br>Word 15, bits 12–15 A6 X<br>Word 16, bits 0–3 A7 X<br>Word 16, bits 4–7 A8 X<br>Word 16, bits 8–11 A9 X<br>Word 16, bits 12–15 A10 X<br>Word 17, bits 0–3 A11 X<br>Word 17, bits 4–7 A12 X<br>Word 17, bits 8–11 A13 X<br>Word 17, bits 12–15 A14 X<br>Word 18, bits 0–3 A15 X<br>Word 18, bits 4–7 A16 X<br>Word 18, bits 8–11 A17 X<br>Word 18, bits 12–15 A18 X<br>Word 19, bits 0–3 A9 X<br>Word 19, bits 4–7 A20 TBCD-Null<br>Word 19, bits 8–11 A21 SUPP1<br>Word 19, bits 12–15 A22 SUPP2 |
| | 7. 14 Digit MCI/VNet Cards - The 14 digit calling card/VNet card number is recorded starting in A1 with the last 4 PIN digits masked out by writing TBCD-A for those digits. A TBCD-Null is written after the last digit, followed by supplemental codes. Unused bytes contain TBCD-Null. Calling card/VNet card format: |
| | Word 14, bits 8–11 A1 X<br>Word 14, bits 12–15 A2 X<br>Word 15, bits 0–3 A3 X<br>Word 15, bits 4–7 A4 X<br>Word 15, bits 8–11 A5 X<br>Word 15, bits 12–15 A6 X<br>Word 16, bits 0–3 A7 X<br>Word 16, bits 4–7 A8 X<br>Word 16, bits 8–11 A9 X<br>Word 16, bits 12–15 A10 X<br>Word 17, bits 0–3 A11 TBCD-A<br>Word 17, bits 4–7 A12 TBCD-A<br>Word 17, bits g–11 A13 TBCD-A<br>Word 17, bits 12–15 A14 TBCD-A<br>Word 18, bits 0–3 A15 TBCD-Null<br>Word 18, bits 4–7 A16 SUPP1<br>Word 18, bits 8–11 A17 SUPP2<br>Word 18, bits 12–15 A18 SUPP3<br>Word 19, bits 0–3 A19 SUPP4<br>Word 19, bits 4–7 A20 SUPP5<br>Word 19, bits 8–11 A21 SUPP6<br>Word 19, bits 12–15 A22 SUPP7 |
| | 8. Telecommunications/PTT Cards - The 23 digits, or less, of the telecommunications card is recorded starting in A1. A TBCD-Null is recorded after the last digit, followed by supplemental codes. Unused bytes contain TBCD-Null. Telecommunications card format: |
| | Word 14, bits 8–11 A1 X |

APPENDIX-continued

| Word #, Bit # | Description |
|---|---|
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 X |
| | Word 17, bits 4–7 A12 X |
| | Word 17, bits 8–11 A13 X |
| | Word 17, bits 12–15 A14 X |
| | Word 18, bits 0–3 A15 X |
| | Word 18, bits 4–7 A16 X |
| | Word 19, bits 8–11 A17 X |
| | Word 19, bits 12–15 A18 X |
| | Word 19, bits 0–3 A19 X |
| | Word 19, bits 4–7 A20 X |
| | Word 19, bits 8–11 A21 X |
| | Word 19, bits 12–15 A22 X |
| | 9. OSID and OTG - For international inbound VNet or SAC calls, the OSID and OTG are recorded as received from the SS7 Generic Digits parameter. After the parameters are recorded, the remaining bytes contain TBCD-Null. OSID and OTG format: |
| | Word 14, bits 8–11 A1 X (OSID) |
| | Word 14, bits 12–15 A2 X (OSID) |
| | Word 15, bits 0–3 A3 X (OSID) |
| | Word 15, bits 4–7 A4 X (OTG) |
| | Word 15, bits 8–11 A5 X (OTG) |
| | Word 15, bits 12–15 A6 X (OTG) |
| | Word 16, bits 0–3 A7 X (OTG) |
| | Word 16, bits 4–7 A8 TBCD-Null |
| | Word 16, bits 8–11 A9 TBCD-Null |
| | Word 16, bits 12–15 A10 TBCD-Null |
| | Word 17, bits 0–3 A11 TBCD-Null |
| | Word 17, bits 4–7 A12 TBCD-Null |
| | Word 17, bits 8–11 A13 TBCD-Null |
| | Word 17, bits 12–15 A14 TBCD-Null |
| | Word 18, bits 0–3 A15 TBCD-Null |
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | OSID = Originating Switch ID |
| | OTG = Originating Trunk Group |
| | 10. Business Group ID - For some SS7 trunk groups, a business group ID is received in a SS7 parameter and is recorded in A1–A6. After the last digit, a TBCD-Null is recorded followed by any supplemental codes. Unused bytes contain TBCD-Null. |
| | Word 14, bits 8–11 A1 X |
| | Word 14, bits 12–15 A2 X |
| | Word 15, bits 0–3 A3 X |
| | Wor4 15, bits 4–7 A4 X |
| | Word 15, bits 8–11 A5 X |
| | Word 15, bits 12–15 A6 X |
| | Word 16, bits 0–3 A7 TBCD-Null |
| | Word 16, bits 4–7 A8 SUPP1 |
| | Word 16, bits 8–11 A9 SUPP2 |
| | Word 16, bits 12–15 A10 SUPP3 |
| | Word 17, bits 0–3 A11 SUPP4 |
| | Word 17, bits 4–7 A12 SUPP5 |
| | Word 17, bits 8–11 A13 SUPP6 |
| | Word 17, bits 12–15 A14 SUPP7 |
| | Word 18, bits 0–3 A15 SUPP8 |
| | Word 18, bits 4–7 A16 SUPP9 |
| | Word 18, bits 8–11 A17 SUPP10 |
| | Word 18, bits 12–15 A18 SUPP11 |
| | Word 19, bits 0–3 A19 SUPP12 |
| | Word 19, bits 4–7 A20 SUPP13 |
| | Word 19, bits 8–11 A21 SUPP14 |
| | Word 19, bits 12–15 A22 SUPP15 |
| | 11. Network Information - For some SS7 trunk groups, a network information ID is received in a SS7 parameter and is recorded in |

APPENDIX-continued

| Word #, Bit # | Description |
|---|---|
| | A1–A4. After the last digit, a TBCD-Null is recorded followed by any supplemental codes. Unused bytes contain TBCD-Null. |

| | | |
|---|---|---|
| Word 14, bits 8–11 | A1 | N |
| Word 14, bits 12–15 | A2 | X |
| Word 15, bits 0–3 | A3 | X |
| Word 15, bits 4–7 | A4 | N |
| Word 15, bits 8–11 | A5 | TBCD-Null |
| Word 15, bits 12–15 | A6 | SUPP1 |
| Word 16, bits 0–3 | A7 | SUPP2 |
| Word 16, bits 4–7 | A8 | SUPP3 |
| Word 16, bits 8–11 | A9 | SUPP4 |
| Word 16, bits 12–15 | A10 | SUPP5 |
| Word 17, bits 0–3 | A11 | SUPP6 |
| Word 17, bits 4–7 | A12 | SUPP7 |
| Word 17, bits 8–11 | A13 | SUPP8 |
| Word 17, bits 12–15 | A14 | SUPP9 |
| Word 18, bits 0–3 | A15 | SUPP10 |
| Word 18, bits 4–7 | A16 | SUPP11 |
| Word 15, bits 8–11 | A17 | SUPP12 |
| Word 18, bits 12–1:5 | A18 | SUPP13 |
| Word 19, bits 0–3 | A19 | SUPP14 |
| Word 19, bits 4–7 | A20 | SUPP15 |
| Word 19, bits 8–11 | A21 | SUPP16 |
| Word 19, bits 12–1:5 | A22 | SUPP17 |

12. Network Call Identifier (NCID) - If the NCID is recorded in the "A" field, it will be recorded in binary beginning with A1. The Entry Code field will be indicative of the call processing associated with the particular call or "0". If the NCID is recorded in the NCID field of a 64 word call record, the Entry Code will also be indicative of the call processing associated with the particular call or "0". The NCID is comprised of the following:
Originating Switch ID
Originating Trunk Group
Originating Port Number
Timepoint One
NCID Sequence Number

| Word #, Bit # | Description |
|---|---|
| Word 20, bits 0–15<br>Word 21, bits 0–15<br>Word 22, bits 0–15<br>Word 23, bits 0–15<br>Word 24, bits 0–3 | Destination Address: This is the seventeen digits of the destination address which is the number being called. If more than 17 digits is required, use ECDR/EPNR format. Unused bytes contain TBCD-Null. |

| | | 7-digit | 10–digit | DDD | IDDD |
|---|---|---|---|---|---|
| Word 20, bits 0–3 | D1 | N | N | N | CC |
| Word 20, bits 4–7 | D2 | X | X | X | CC |
| Word 20, bits 8–11 | D3 | X | X | X | CC |
| Word 20, bits 12–15 | D4 | X | N | N | NN |
| Word 21, bits 0–3 | D5 | X | X | X | NN |
| Word 21, bits 4–7 | D6 | X | X | X | NN |
| Word 21, bits 8–11 | D7 | X | X | X | NN |
| Word 21, bits 12–15 | D8 | X (TSID) | X | NN | |
| Word 22, bits 0–3 | D9 | X (TSID) | X | NN | |
| Word 22, bits 4–7 | D10 | X (TSID) | X | NN | |
| Word 22, bits 8–11 | D11 | X (TTG) | X (TSID) | T-Null | NN |
| Word 22, bits 12–15 | D12 | X (TTG) | X (TSID) | T-Null | NN |
| Word 23, bits 0–3 | D13 | X (TTG) | X (TSID) | T-Null NN | |
| Word 23, bits 4–7 | D14 | X (TTG) | X (TSID) | T-NUll | NN |
| Word 23, bits 8–11 | D15 | T-Null | X (TTG) | T-Null | NN |
| Word 23, bits 12–15 | D16 | T-Null | X (TTG) | T-Null | T-Null |
| Word 24, bits 0–3 | D17 | T-Null | X (TTG) | T-Null | T-Null |

CC = Customer Carrier
NN = National Number
TSID = Teminating Switch ID
TTG = Terminating Trunk Group

| Word #, Bit # | Description |
|---|---|
| Word 24, bits 4–15<br>Word 25, bits 0–15<br>Word 26, bits 0–11 | Pretranslated Digits: This represents the digits as dialed by the caller which may or may not be the Destination Address. The pretranslated digits are only recorded if a translation of the number occurs. If the dialed number is the destination number, and is not translated to another number, this field contains TBCD-Nulls. If there are more than 10 digits, use the ECDR/EPNR format. |

| | | 10 digit VNet, SAC DNIS, or Hotline | 00Y SAC Code | 7 digit VNet or Hotline | IDDD 10 digit (example) |
|---|---|---|---|---|---|
| Word 24, bits 4–7 | PTD1 | N | 0 | N | N |

APPENDIX-continued

| Word #, Bit # | Description |
|---|---|
| | Word 24, bits 8–11 PTD2 X 0 X N |
| | Word 24, bits 12–15 PTD3 X Y X N |
| | Word 25, bits 0–3 PTD4 N N X N |
| | Word 25, bits 4–7 PTD5 X X X N |
| | Word 25, bits 8–11 PTD6 X X X N |
| | Word 25, bits 12–15 PTD7 X X X N |
| | Word 26, bits 0–3 PTD8 X X TBDC-Null N |
| | Word 26, bits 4–7 PTD9 X X TBDC-Null N |
| | Word 26, bits 8–11 PTD10 X X TBDC-Null N |
| Word 26, bits 12–15 | Not Used. |
| Word 27, bits 0–3 | Feature Code (FC): The switch determines a feature code for the call which indicates whether a specific type of data line is required for the call such as a higher quality line for facsimile transmissions.<br>0 = Default<br>1 = FAX<br>2 = NARS<br>3 = Data Call<br>4 = Switched DS1 (HSCS)<br>5 = Switched DS3 (HSCS)<br>6–8 = Not Used<br>9 = NX64<br>10 = Offnet Routing<br>11 = AAP Call (Used in Gateway Toll Ticket Conversion)<br>12 = Card Gate Denial<br>13 = Forum Dial In audio/video conference<br>14 = Concert Freephone<br>15 = Not Used |
| Word 27, bits 4–7 | Terminating Network Code (TNC): Indicates the terminating facilities to be used for the remainder of the path of the call. For example, an indicator for no satellite transmission.<br>0 = Default<br>1 = No Routing Restrictions<br>2 = Avoid Satellite<br>3 = Route via DS1<br>4 = Route via DS1 and avoid satellite<br>5 = Route via Protected Facilities Required<br>6 = Route via Protected Facilities Preferred<br>7–15 = Not Used |
| Word 27, bits 8–11 | Network Access Type (NAT): Indicates which type of network access was used as defined at the originating switch on the network; that is, how the caller gained access to the network. The types of access are:<br>0 = Default<br>1 = 800 call<br>2 = Credit Card Access<br>3 = Operator Assistance Access<br>4 = VNET Remote Access<br>5 = BPP Access<br>6 = FGD Cut-Through Access<br>7–15 = Not Used |
| Word 27, bits 12–15 | Timepoint 7 Qualifier (TP7Q): Contains the call's first disconnect qualifier, that is, how the call was terminated. The types of disconnection are:<br>0 = Calling party disconnects<br>1 = Calling party disconnects<br>2 = Calling party reorigination<br>3 = Switch initiated (ex. switch error cut off the call)<br>4 = All Routes Busy<br>5 = Disconnected due to a long ring; ring timer exceeded<br>6 = Call disconnected due to network invoked transfer<br>7 = Feature/Service Interaction<br>8–15 = Not Used |
| Word 28, bits 0–6 | Entry Code (EC): Indicates the type of call processing that took place and what type of information is recorded in the Authorization Code field. If more than one entry code is received, record the last one. The following codes are valid:<br>0 = Default<br>1 = Person-to-Person (P-P)<br>2 = Station-to-Station (S-S)<br>3 = Third Party Billing (3rd party number recorded)<br>4 = P-P collect (bill to called party)<br>5 = S-S collect (bill to called party)<br>6 = MCI card or VNet card (S-S)<br>7 = BOC inward dialing without call completion<br>8 = general assistance<br>9 = BOC/LEC card |

APPENDIX-continued

| Word #, Bit # | Description |
| --- | --- |
| | 10 = Presubsribed credit card<br>11 = PTT card<br>12 = Directory Assistance<br>13 = Commercial Credit Card<br>14 = BOC inward dialing with call completion<br>15 = MCI card or VNet card (P-P)<br>16–19 = Not Used<br>20 = ANI validation (screened pass/fail)<br>21 = Auth Validation (filed or dialed)<br>22 = Not Used<br>23 = 700 Service Access Code (overrides #20)<br>24 = 500, 800 Service Access Code (overrides #20)<br>25 = 900 Service Access Code (overrides #20)<br>26–28 = Not Used<br>29 = Operator Release Timer Expired<br>30 = EVS/NARS - Disconnect message referral (DMR) without referral<br>31 = EVS/NARS - DMR with referral to MCI number<br>32 = EVS/NARS - DMR with referral to non-MCI number<br>33 = EVS/NARS - DMR with referral and call extension (CE) to MCI number<br>34 = EVS/NARS - DMR with referral and CE to non-MCI number<br>35 = EVS/NARS - Customized Message Announcement (CMA) with CE<br>36 = EVS/NARS - CMA without CE<br>37 = EVS/NARS - Enhanced Call Routing (ECR)<br>38–41 = EVS/NARS - Reserved<br>42–47 = Not Used<br>48 = GETS card<br>49 = Not Used<br>50 = Billed to international number<br>51 = Calling station ID information recorded<br>52 = Supplemental code only recorded<br>53 = VNet remote access number recorded<br>54 = SS7 calling party number recorded<br>55 = OSID and OTG recorded<br>56 = DNIS recorded<br>57 = Business group ID recorded<br>58 = Network information recorded<br>59 = BG + Nail + OSID/OTG<br>60 = Card Number + Null + OSID/OTG<br>61 = VNet RA + Null + OSID/OTG<br>62 = VNet RA + Null + OSID/OTG<br>63 = Network Call Transfer (NCT)<br>64–79 = Reserved<br>80–89 = Reserved<br>90–99 = Reserved<br>100 = 18C It's Me PIN S/S<br>101 = 18C It's Me Global S/S<br>102 = 18C It's Me ANI S/S<br>103 = 18C It's Me NPA S/S<br>104 = 18C It's Me Messenger S/S<br>105 = 18C It's Me Messenger PIN S/S<br>106 = 18C It's Me Messenger Global S/S<br>107 = 18C BOC Card S/S<br>108 = 18C MCI Card SIS<br>109 = Aos Messenger S/S<br>110 = International Messenger S/S<br>111 = International Speed Dial<br>112–127 = Not Used |
| Word 28, bits 7–9 | Prefix Digits (PD): Represents the prefix digits of the called number. These digits tell the switch how to process the call.<br>0 = No prefix digits received<br>1 = 0 – (operator assisted)<br>2 = 0 + (domestic CDOS)<br>3 = 01 + (international CDOS)<br>4 = 011 + IDDD<br>5 = 1+ DDD<br>6 = 0 + operator assisted, subscriber address<br>7 = *XX where XX = 0–9, Star Card |
| Word 28, bits 10–12 | NDID (NCS/DAP ID): Indicates whether the switch processed the call or if one of the databases, such as NCS/DAP, was queried for information for services, including but not limited to, VNET, Calling Card, 800, and 900 calls. The NDID further indicates the ID of the NCS/DAP that was involved in the last transaction attempt. |

APPENDIX-continued

| Word #, Bit # | Description |
|---|---|
| | 0 = Switch call processing<br>1 = NCS/DAP 1<br>2 = NCS/DAP 2<br>3 = NCS/DAP 3<br>4–5 = Not Used<br>6 = Received from operator platform via RLT<br>7 = TCAP to NCS/DAP |
| Word 28, bits 13–15 | Division ID (DIVID): Contains the division ID for credit card calls, including the telecommunication system's card. The DIVID is received from the NCS/DAP for the card number validation. If no information is received by the switch, record the default value of '0.'<br>0 = No division ID specified<br>1 = Division ID1<br>2 = Division ID2<br>3 = Division ID3<br>4 = Division ID4<br>5 = Division ID5<br>6 = Division ID6<br>7 = Division ID7 |
| Word 29, bit 0 | Distant Overflow (DO): When set to 1 in the originating switch's call record, indicates that a direct termination overflow (DTO) transaction was attempted at an intermediate or terminating switch in order to get the final destination address digits for this call. |
| Word 29, bit 1 | Not Used. |
| Word 29, bit 2 | Customer Connect (CC): Indicates whether to use timepoint 6 or timepoint 3 to calculate the call duration.<br>0 = use Time Point 6, *F to calculate the call duration<br>1 = Use Time Point 3, *C to calculate the call duration |
| Word 29, bit 3 | Inter-Network (IN): Indicates whether or not a call is originating from one customer/network and is terminating to a different customer/network. The default setting = 0; bit set to 1 if a business group or Netinfo parameter is received from the NCS/DAP. |
| Word 29, bit 4 | Not Used. |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set to "0" in all other cases. |
| Word 29, bit 6 | Call Direction (CD): Indicates whether the call originated in the domestic or international network.<br>0 = Call origination occurred in the Domestic Network<br>1 = Call origination occurred in the International Network |
| Word 29, bit 7 | Destination (DE): Indicates when a call is expected to terminate to an international destination<br>0 = Default, NANP; Domestic VNet, or any other calls which are not expected to terminate to an international destination<br>1 = Calls expected to terminate to an international destination |
| Word 29, bit 8 | Dedicated Termination (DT): Indicates that a 10-digit shared network number was completed to a dedicated destination. If the terminating trunk class (TTC) in the call record is equal to 3 or 7, then it is considered to be a direct termination trunk. |
| Word 29, bits 9–10 | Not Used. |
| Word 29, bit 11 | Satellite (SA): indicates that a satellite circuit was involved in the call. The default setting is 0; bit set to 1 indicates that a satellite was involved in the call. The bit is set when the incoming trunk group is classmarked as satellite equipped, when the SAT digit on an incoming inband IMT Call shows that a satellite circuit is involved in the connection, or when the SS7 Nature of Connection parameter indicates that a satellite trunk was previously used. This is used for trouble-shooting purposes, and not for billing. |
| Word 29, bits 12–15 | Nature Of Calling Location ID (NOCLI): A binary value that identifies what data is recorded in the Call Location ID. The Calling Location ID field will contain the information that is referenced in the NOCLI.<br>0 = Not Used<br>1 = ANI from Inbound trunk<br>2 = SS7 charge number<br>3 = SS7 calling party number<br>4 = original called number<br>5 = Pseudo ANI created at this switch<br>6 = CSI from originating trunk<br>7 = Filed NPA-NXX trunk group information plus CSI<br>8 = NNN + OSID + OTG or 00Y + OSID + OTG (N = TBCD-Null)<br>9 = Country Code + national number<br>10 = No CLI record |

APPENDIX-continued

| Word #, Bit # | Description |
|---|---|
| | 11 = Redirecting Number<br>12 = CLI received from Operator platform via RLT<br>13 = ANI of NCT originator<br>14–15 = Not Used |
| Word 30, bits 0–15 | Carrier Number (CN): Represents the carrier number provided on FG-B or FG-D originations, or the carrier number received over an SS7 IMT. If only three digits are used, then they are recorded in CN2–CN4 and CN1 will contain a TBCD-Null. This field also contains the last four digits of the specific 800 number assigned to VISA cards (9595). It will also contain the last four digits of the MCI card access number regardless of the access facility. Examples of carrier numbers are: MCI = 222, ATT = 288, and Friends = 333. |

| | | FGB/FGD 3 digit CIC | FGB/D 4 digit CIC | visa card |
|---|---|---|---|---|
| Word 30, bits 0–3 | CN1 | TBCD-Null | X | 9 |
| Word 30, bits 4–7 | CN2 | X | X | 5 |
| Word 30, bits 8–11 | CN3 | X | X | 9 |
| Word 30, bits 12–15 | CN4 | X | X | 5 |

| | | SS7 TNS | MCI card | VNet card |
|---|---|---|---|---|
| Word 30, bits 0–3 | CN1 | X | 1 | 1 |
| Word 30, bits 4–7 | CN2 | X | 0 | 1 |
| Word 30, bits 8–11 | CN3 | X | 2 | 1 |
| Word 30, bits 12–15 | CN4 | X | 2 | 1 |

| Word #, Bit # | Description |
|---|---|
| Word 31, bits 0–3 | Authorization Code ID Field (ACIF): Contains the Authorization-Code Identification Field for recording a card number status. This field indicates whether the card number (calling card or credit card) is good or bad.<br>0 = Seven digit authcode file (default)<br>1 = 1st or only five digit authcode file<br>2 = 2nd five digit file<br>3 = 3rd five digit file<br>4 = 4th five digit file<br>5 = 5th five digit file<br>6 = Six digit authcode file<br>7 = Range restriction failure (invalid address digits)<br>8 = Positive Commercial Credit Card/89 Card/M Card Validation<br>9 = Not Used<br>10 = MCI Card/Visa Card invalid or not assigned. Disallowed.<br>11 = BOC billing number assignod but blocked<br>12 = BOC billing number usage exceeded<br>13 = Not Used<br>14 = Default authorization of MCI Card/VISA Card if response timeout from NCS/DAP<br>15 = MCI Card/VISA Card authorized by NCS/DAP |
| Word 31, bits 4–10 | Release Code: Used with timepoint 7 qualifier to determine from which direction the release message came. The code indicates why one of the parties hung up, for example, normal release = 16, and no circuit available = 34.<br>1 = Unallocated number<br>2 = No route to specified network<br>3 = No route to destination<br>4 = Send special information tone<br>5 = Misdialed trunk prefix<br>16 = Normal clearing<br>17 = User Busy<br>18 = No user responding<br>19 = No user responding (user alerted)<br>21 = Call rejected<br>22 = Number changed<br>27 = Destination out of service<br>28 = Address incomplete<br>29 = Facility rejected<br>31 = Normal - unspecified<br>34 = No circuit available<br>38 = Network out of order<br>41 = Temporary failure<br>42 = Switching equipment congestion<br>44 = Requested channel not available<br>47 = Resource unavailable - unspecified<br>50 = Requested facility not subscribed<br>55 = Incoming calls barred within CUG<br>57 = Bearer capability not authorized |

APPENDIX-continued

| Word #, Bit # | Description |
|---|---|
| | 58 = Bearer capability not available<br>63 = Service or option not available<br>65 = Bearer capability not implemented<br>69 = Requested facility not implemented<br>70 = Only restricted digital information bearer capability is available<br>79 = Service or option not implemented<br>87 = Called user not member of CUG<br>88 = Incompatible destination<br>91 = Invalid transit network selector<br>95 = Invalid message - unspecified<br>97 = Message type non-existent or not implemented<br>99 = Parameter non-existent or not implemented - discarded<br>102 = Recovery on timer expired<br>103 = Parameter non-existent or not implemented - passed on<br>111 = Protocol error - unspecified<br>127 = Interworking - unspecified |
| Word 31, bits 11–13 | NCID Sequence Number: Represents the number of calls which have occurred on the same port number with the same Timepoint 1 value. The first call will have the sequence number set to '0'. This value will increase incrementally for each successive call which originates on the same port number which has the same Timepoint 1 value. Range = 0–7. |
| Word 31, bit 14 | NCID Location (NCIDLOC): This bit identifies when the NCID is recorded in the Authcode field of the call record. The NCID is recorded in the Authcode field of the call record at intermediate and terminating switches if the Authcode field is not being used to record other information. If the Authcode field is being used to record other information, the NCID is recorded in the "NCID" field of the 64 word call record.<br>0 = NCID is not recorded in the Authcode field (default)<br>1 = NCID is recorded in the Authcode field |
| Word 31, bit 15 | Remote ANI Screened (RS): This bit is set to '1' if the NPA of the ANI is not listed in the switch's Local-Service-Area table, and the ANI was sent to the DAP for ANI index screening purposes. This bit is set to '0' if the switch sent the ANI to the DAP for ANI index screening purposes and no response is received from the DAP or if normal switch ANI screening occurs.<br>0 = ANI was not screened by the DAP (default)<br>1 = ANI was screened by the DAP |
| Table 302 - ECDR/EPNR Record Format: | |
| Words 0–11, bits 0–15 | Same as CDR/PNR format. |
| Word 12, bits 0–15<br>Word 13, bits 0–15<br>Word 14, bits 0–15<br>Word 15, bits 0–11 | Calling Location ID: Contains 1–15 digits of the originating station line. This is the ANI number of the calling party. If 1 to 15 ANI or CSI digits are received, they are recorded in order starting with CLI1. Unused bytes contain TBCD-Null. If no ANI or CSI is available, record the OSID/OTG in CLI4-10, except where noted. If nothing is recorded in the CLI field, use a NOCLI value of 10. This field contains 1 of the following nine formats:<br>1. VNet CAMA DAL originations: If CSI is available, prefix the CSI with filed HNPA and HNXX information, if available, and record. Use NOCLI value of 7.<br>2. FG-C Originations: If ANI or CSI information is not available and the number is in the 00Y + NXX-XXXX format, record the 00Y code that was received in CLI1-3, and record the OSID/OTG in CLI4-10. Use NOCLI value of 8.<br>3. Inband FG-D Originations: Record the ANI that was received starting with CLI. Use NOCLI value of 1.<br>4. SS7 FG-D Originations: Record the charge number, if available. If the charge number is not available, record the calling party number. Use NOCLI value of 2 or 3.<br>5. International Originations: Record the country code and national number of the calling party. Use NOCLI value of 9.<br>6. SS7 IMTs Originations: Record the following information in this order of importance: 1) charge number, 2) calling party number, 3) OSD/OTG from generic digits. Use NOCLI value of 2, 3, or 8.<br>7. SS7 Reseller Originations: The CLI field will be filled with TBCD Nulls.<br>8. SS7 Private Network Originations: The CLI field will be filled with TBCD Nulls.<br>9. PRI Originations: Record the calling party number received in the ISDN setup message.<br>The format:<br>1–15 digit<br>ANI/CSI |

APPENDIX-continued

| Word #, Bit # | Description |
|---|---|

| | | (13 digit example) | OSID/OTG | Incoming Int'l |
|---|---|---|---|---|
| Word 12, bits 0–3 | CLI1. | X | TBCD-Null | X(CC) |
| Word 12, bits 4–7 | CLI2 | X | TBCD-Null | X(CC) |
| Word 12, bits 8–11 | CLI3 | X | TBCD-Null | X(CC) |
| Word 12, bits 12–15 | CLI4 | X | X(OSID) | X(NN) |
| Word 13, bits 0–3 | CLI5 | X | X(OSID) | X(NN) |
| Word 13, bits 4–7 | CLI6 | X | X(OSTD) | X(NN) |
| Word 13, bits 8–11 | CLI7 | X | X(OTG) | X(NN) |
| Word 13, bits 12–15 | CLI8 | X | X(OTG) | X(NN) |
| Word 14, bits 0–3 | CLI9 | X | X(OTG) | X(NN) |
| Word 14, bits 4–7 | CLI10 | X | X(OTG) | X(NN) |
| Word 14, bits 8–11 | CLI11 | X | TBCD-Null | X(NN) |
| Word 14, bits 12–15 | CLI12 | X | TBCD-Null | X(NN) |
| Word 15, bits 0–3 | CLI13 | X | TBCD-Null | X(NN) |
| Word 15, bits 4–7 | CLI14 | TBCD-Null | TBCD-Null | X(NN) |
| Word 15, bits 8–11 | CLI15 | TBCD-Null | TBCD-Null | X(NN) |

CC = Customer Connect
NN = National Number
OSID = Originating Switch ID (000–999)
OTG = Originating Trunk Group (0000–8191)

| Word #, Bit # | Description |
|---|---|
| Word 15, bits 12–15 | Authorization Code (Auth Code): Same as CDR/PNR format Auth |
| Word 16, bits 0–15 | Code, but represents 45 digits. |
| Word 17, bits 0–15 | |
| Word 18, bits 0–15 | 1. Authorization Codes: |
| Word 19, bits 0–15 | |
| Word 20, bits 0–15 | |
| Word 21, bits 0–15 | |
| Word 22, bits 0–15 | |
| Word 23, bits 0–15 | |
| Word 24, bits 0–15 | |
| Word 25, bits 0–15 | |
| Word 26, bits 0–15 | |

| | | 5 digit | 6 digit | 7 digit |
|---|---|---|---|---|
| Word 15, bits 12–15 | A1 | AUTH1 | AUTH1 | AUTH1 |
| Word 16, bits 0–3 | A2 | AUTH2 | AUTH2 | AUTH2 |
| Word 16, bits 4–7 | A3 | AUTH3 | AUTH3 | AUTH3 |
| Word 16, bits 8–11 | A4 | AUTH4 | AUTH4 | AUTH4 |
| Word 16, bits 12–15 | A5 | AUTH5 | AUTH5 | AUTH5 |
| Word 17, bits 0–3 | A6 | SEC1 | AUTH6 | AUTH6 |
| Word 17, bits 4–7 | A7 | SEC2 | SEC1 | AUTH7 |
| Word 17, bits 8–11 | A8 | SEC3 | SEC2 | SEC1 |
| Word 17, bits 12–15 | A9 | SEC4 | SEC3 | SEC2 |
| Word 18, bits 0–3 | A10 | T-Null | SEC4 | SEC3 |
| Word 18, bits 4–7 | A11 | SUPP1 | T-Null | SEC4 |
| Word 18, bits 8–11 | A12 | SUPP2 | SUPP1 | T-Null |
| Word 18, bits 12–15 | A13 | SUPP3 | SUPP2 | SUPP1 |
| Word 19, bits 0–3 | A14 | SUPP4 | SUPP3 | SUPP2 |
| Word 19, bits 4–7 | A15 | SUPP5 | SUPP4 | SUPP3 |
| Word 19, bits 8–11 | A16 | SUPP6 | SUPP5 | SUPP4 |
| Word 19, bits 12–15 | A17 | SUPP7 | SUPP6 | SUPP5 |
| Word 20, bits 0–3 | A18 | SUPP8 | SUPP7 | SUPP6 |
| Word 20, bits 4–7 | A19 | SUPP9 | SUPP8 | SUPP7 |
| Word 20, bits 8–11 | A20 | SUPP10 | SUPP9 | SUPP8 |
| Word 20, bits 12–15 | A21 | SUPP11 | SUPP10 | SUPP9 |
| Word 21, bits 0–3 | A22 | SUPP12 | SUPP11 | SUPP10 |
| Word 21, bits 4–7 | A23 | SUPP13 | SUPP12 | SUPP11 |
| Word 21, bits 8–11 | A24 | SUPP14 | SUPP13 | SUPP12 |
| Word 21, bits 12–15 | A25 | SUPP15 | SUPP14 | SUPP13 |
| Word 22, bits 0–3 | A26 | SUPP16 | SUPP15 | SUPP14 |
| Word 22, bits 4–7 | A27 | SUPP17 | SUPP16 | SUPP15 |
| Word 22, bits 8–11 | A28 | SUPP18 | SUPP17 | SUPP16 |
| Word 22, bits 12–15 | A29 | SUPP19 | SUPP18 | SUPP17 |
| Word 23, bits 0–3 | A30 | SUPP20 | SUPP19 | SUPP18 |
| Word 23, bits 4–7 | A31 | SUPP21 | SUPP20 | SUPP19 |
| Word 23, bits 8–11 | A32 | SUPP22 | SUPP21 | SUPP20 |
| Word 23, bits 12–15 | A33 | SUPP23 | SUPP22 | SUPP21 |
| Word 24, bits 0–3 | A34 | SUPP24 | SUPP23 | SUPP22 |
| Word 24, bits 4–7 | A35 | SUPP25 | SUPP24 | SUPP23 |
| Word 24, bits 8–11 | A36 | SUPP26 | SUPP25 | SUPP24 |
| Word 24, bits 12–15 | A37 | SUPP27 | SUPP26 | SUPP25 |
| Word 25, bits 0–3 | A38 | SUPP28 | SUPP27 | SUPP26 |
| Word 25, bits 4–7 | A39 | SUPP29 | SUPP28 | SUPP27 |
| Word 25, bits 8–11 | A40 | SUPP30 | SUPP29 | SUPP28 |
| Word 25, bits 12–15 | A41 | T-Null | SUPP30 | SUPP29 |
| Word 26, bits 0–3 | A42 | T-Null | T-Null | SUPP30 |
| Word 26, bits 4–7 | A43 | T-Null | T-Null | T-Null |
| Word 26, bits 8–11 | A44 | T-Null | T-Null | T-Null |

APPENDIX-continued

| Word #, Bit # | Description | | | | |
|---|---|---|---|---|---|
| | Word 26, bits 12–15 | A45 | T-Null | T-Null | T-Null |
| | T-Null = TBCD-Null | | | | |
| | 2. Calling Station ID (CSI): | | | | |
| | | | 7 digit | 1-10 digit | |
| | Word 15, bits 12–15 | A1 | X | X | |
| | Word 16, bits 0–3 | A2 | X | X | |
| | Word 16, bits 4–7 | A3 | X | X | |
| | Word 16, bits 8–11 | A4 | X | X | |
| | Word 16, bits 12–15 | A5 | X | X | |
| | Word 17, bits 0–3 | A6 | X | X | |
| | Word 17, bits 4–7 | A7 | X | X | |
| | Word 17, bits 8–11 | A8 | TBCD-Null | X | |
| | Word 17, bits 12–15 | A9 | SUPP1 | X | |
| | Word 18, bits 0–3 | A10 | SUPP2 | X | |
| | Word 18, bits 4–7 | A11 | SUPP3 | TBCD-Null | |
| | Word 18, bits 8–11 | A12 | SUPP4 | SUPP1 | |
| | Word 18, bits 12–15 | A13 | SUPP5 | SUPP2 | |
| | Word 19, bits 0–3 | A14 | SUPP6 | SUPP3 | |
| | Word 19, bits 4–7 | A15 | SUPP7 | SUPP4 | |
| | Word 19, bits 8–11 | A16 | SUPP8 | SUPP5 | |
| | Word 19, bits 12–15 | A17 | SUPP9 | SUPP6 | |
| | Word 20, bits 0–3 | A18 | SUPP10 | SUPP7 | |
| | Word 20, bits 4–7 | A19 | SUPP11 | SUPP8 | |
| | Word 20, bits 8–11 | A20 | SUPP12 | SUPP9 | |
| | Word 20, bits 12–15 | A21 | SUPP13 | SUPP10 | |
| | Word 21, bits 0–3 | A22 | SUPP14 | SUPP11 | |
| | Word 21, bits 4–7 | A23 | SUPP15 | SUPP12 | |
| | Word 21, bits 8–11 | A24 | SUPP16 | SUPP13 | |
| | Word 21, bits 12–15 | A25 | SUPP17 | SUPP14 | |
| | Word 22, bits 0–3 | A26 | SUPP18 | SUPP15 | |
| | Word 22, bits 4–7 | A27 | SUPP19 | SUPP16 | |
| | Word 22, bits 8–11 | A28 | SUPP20 | SUPP17 | |
| | Word 22, bits 12–15 | A29 | SUPP1 | SUPP18 | |
| | Word 23, bits 0–3 | A30 | SUPP22 | SUPP19 | |
| | Word 23, bits 4–7 | A31 | SUPP23 | SUPP20 | |
| | Word 23, bits 8–11 | A32 | SUPP24 | SUPP21 | |
| | Word 23, bits 12–15 | A33 | SUPP25 | SUPP22 | |
| | Word 24, bits 0–3 | A34 | SUPP26 | SUPP23 | |
| | Word 24, bits 4–7 | A35 | SUPP27 | SUPP24 | |
| | Word 24, bits g–11 | A36 | SUPP28 | SUPP25 | |
| | Word 24, bits 12–15 | A37 | SUPP29 | SUPP26 | |
| | Word 25, bits 0–3 | A38 | SUPP30 | SUPP27 | |
| | Word 25, bits 4–7 | A39 | TBCD-Null | SUPP28 | |
| | Word 25, bits 8–11 | A40 | TBCD-Null | SUPP29 | |
| | Word 25, bits 12–15 | A41 | TBCD-Null | SUPP30 | |
| | Word 26, bits 0–3 | A42 | TBCD-Null | TBCD-Null | |
| | Word 26, bits 4–7 | A43 | TBCD-Null | TBCD-Null | |
| | Word 26, bits 8–11 | A44 | TBCD-Null | TBCD-Null | |
| | Word 26, bits 12–15 | A45 | TBCD-Null | TBCD-Null | |
| | 3. Supplemental Codes: | | | | |
| | Word 15, bits 12–15 | A1 | SUPP1 | | |
| | Word 16, bits 0–3 | A2 | SUPP2 | | |
| | Word 16, bits 4–7 | A3 | SUPP3 | | |
| | Word 16, bits 8–11 | A4 | SUPP4 | | |
| | Word 16, bits 12–15 | A5 | SUPP5 | | |
| | Word 17, bits 0–3 | A6 | SUPP6 | | |
| | Word 17, bits 4–7 | A7 | SUPP7 | | |
| | Word 17, bits 8–11 | A8 | SUPP8 | | |
| | Word 17, bits 12–15 | A9 | SUPP9 | | |
| | Word 18, bits 0–3 | A10 | SUPP10 | | |
| | Word 18, bits 4–7 | A11 | SUPP11 | | |
| | Word 18, bits 8–11 | A12 | SUPP12 | | |
| | Word 18, bits 12–15 | A13 | SUPP13 | | |
| | Word 19, bits 0–3 | A14 | SUPP14 | | |
| | Word 19, bits 4–7 | A15 | SUPP15 | | |
| | Word 19, bits 8–11 | A16 | SUPP16 | | |
| | Word 19, bits 12–15 | A17 | SUPP17 | | |
| | Word 20, bits 0–3 | A18 | SUPP18 | | |
| | Word 20, bits 4–7 | A19 | SUPP19 | | |
| | Word 20, bits 8–11 | A20 | SUPP20 | | |
| | Word 20, bits 12–15 | A21 | SUPP21 | | |
| | Word 21, bits 0–3 | A22 | SUPP22 | | |
| | Word 21, bits 4–7 | A23 | SUPP23 | | |
| | Word 21, bits 8–11 | A24 | SUPP24 | | |

APPENDIX-continued

| Word #, Bit # | Description | | |
|---|---|---|---|
| | Word 21, bits 12–15 | A25 | SUPP25 |
| | Word 22, bits 0–3 | A26 | SUPP26 |
| | Word 22, bits 4–7 | A27 | SUPP27 |
| | Word 22, bits 8–11 | A28 | SUPP28 |
| | Word 22, bits 12–15 | A29 | SUPP29 |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 4. VNet Remote Access and Calling Party Number: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | SUPP1 |
| | Word 18, bits 12–15 | A13 | SUPP2 |
| | Word 19, bits 0–3 | A14 | SUPP3 |
| | Word 19, bits 4–7 | A15 | SUPP4 |
| | Word 19, bits 8–11 | A16 | SUPP5 |
| | Word 19, bits 12–15 | A17 | SUPP6 |
| | Word 20, bits 0–3 | A18 | SUPP7 |
| | Word 20, bits 4–7 | A19 | SUPP8 |
| | Word 20, bits 8–11 | A20 | SUPP9 |
| | Word 20, bits 12–15 | A21 | SUPP10 |
| | Word 21, bits 0–3 | A22 | SUPP11 |
| | Word 21, bits 4–7 | A23 | SUPP12 |
| | Word 21, bits 8–11 | A24 | SUPP13 |
| | Word 21, bits 12–15 | A25 | SUPP14 |
| | Word 22, bits 0–3 | A26 | SUPP15 |
| | Word 22, bits 4–7 | A27 | SUPP16 |
| | Word 22, bits 8–11 | A28 | SUPP17 |
| | Word 22, bits 12–15 | A29 | SUPP18 |
| | Word 23, bits 0–3 | A30 | SUPP19 |
| | Word 23, bits 4–7 | A31 | SUPA20 |
| | Word 23, bits 8–11 | A32 | SUPP21 |
| | Word 23, bits 12–15 | A33 | SUPP22 |
| | Word 24, bits 0–3 | A34 | SUPP33 |
| | Word 24, bits 4–7 | A35 | SUPP24 |
| | Word 24, bits 8–11 | A36 | SUPP25 |
| | Word 24, bits 12–15 | A37 | SUPP26 |
| | Word 25, bits 0–3 | A38 | SUPP27 |
| | Word 25, bits 4–7 | A39 | SUPP28 |
| | Word 25, bits 8–11 | A40 | SUPP29 |
| | Word 25, bits 12–15 | A41 | SUPP30 |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 5. Credit Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |

APPENDIX-continued

| Word #, Bit # | Description | | |
|---|---|---|---|
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | X |
| | Word 19, bits 0–3A | A14 | X |
| | Word 19, bits 4–7 | A15 | X |
| | Word 19, bits 8–11 | A16 | X |
| | Word 19, bits 12–15 | A17 | X |
| | Word 20, bits 0–3 | A18 | X |
| | Word 20, bits 4–7 | A19 | X |
| | Word 20, bits 8–11 | A20 | TBCD-Null |
| | Word 20, bits 12–15 | A21 | SUPP1 |
| | Word 21, bits 0–3 | A22 | SUPP2 |
| | Word 21, bits 4–7 | A23 | SUPP3 |
| | Word 21, bits 8–11 | A24 | SUPP4 |
| | Word 21, bits 12–15 | A25 | SUPP5 |
| | Word 22, bits 0–3 | A26 | SUPP6 |
| | Word 22, bits 4–7 | A27 | SUPP7 |
| | Word 22, bits 8–11 | A28 | SUPP8 |
| | Word 22, bits 12–15 | A29 | SUPP9 |
| | Word 23, bits 0–3 | A30 | SUPP10 |
| | Word 23, bits 4–7 | A31 | SUPP11 |
| | Word 23, bits 8–11 | A32 | SUPP12 |
| | Word 23, bits 12–15 | A33 | SUPP13 |
| | Word 24, bits 0–3 | A34 | SUPP14 |
| | Word 24, bits 4–7 | A35 | SUPP15 |
| | Word 24, bits 8–11 | A36 | SUPP16 |
| | Word 24, bits 12–15 | A37 | SUPP17 |
| | Word 25, bits 0–3 | A38 | SUPP18 |
| | Word 25, bits 4–7 | A39 | SUPP19 |
| | Word 25, bits 8–11 | A40 | SUPP20 |
| | Word 25, bits 12–15 | A41 | SUPP21 |
| | Word 26, bits 0–3 | A42 | SUPP22 |
| | Word 26, bits 4–7 | A43 | SUPP23 |
| | Word 26, bits 8–11 | A44 | SUPP24 |
| | Word 26, bits 12–15 | A45 | SUPP25 |
| | 6. 14 Digit MC VNet Calling Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-A |
| | Word 18, bits 8–11 | A12 | TBCD-A |
| | Word 18, bits 12–15 | A13 | TBCD-A |
| | Word 19, bits 0–3 | A14 | TBCD-A |
| | Word 19, bits 4–7 | A15 | TBCD-Null |
| | Word 19, bits 8–11 | A16 | SUPP1 |
| | Word 19, bits 12–15 | A17 | SUPP2 |
| | Word 20, bits 0–3 | A18 | SUPP3 |
| | Word 20, bits 4–7 | A19 | SUPP4 |
| | Word 20, bits 8–11 | A20 | SUPP5 |
| | Word 20, bits 12–15 | A21 | SUPP6 |
| | Word 21, bits 0–3 | A22 | SUPP7 |
| | Word 21, bits 4–7 | A23 | SUPP8 |
| | Word 21, bits 8–11 | A24 | SUPP9 |
| | Word 21, bits 12–15 | A25 | SUPP10 |
| | Word 22, bits 0–3 | A26 | SUPP11 |
| | Word 22, bits 4–7 | A27 | SUPP12 |
| | Word 22, bits 8–11 | A28 | SUPP13 |
| | Word 22, bits 12–15 | A29 | SUPP14 |
| | Word 23, bits 0–3 | A30 | SUPP15 |
| | Word 23, bits 4–7 | A31 | SUPP16 |
| | Word 23, bits 8–11 | A32 | SUPP17 |
| | Word 23, bits 12–15 | A33 | SUPP18 |
| | Word 24, bits 0–3 | A34 | SUPP19 |
| | Word 24, bits 4–7 | A35 | SUPP20 |
| | Word 24, bits 8–11 | A36 | SUPP21 |
| | Word 24, bits 12–15 | A37 | SUPP22 |

APPENDIX-continued

| Word #, Bit # | Description | | |
|---|---|---|---|
| | Word 25, bits 0–3 | A38 | SUPP23 |
| | Word 25, bits 4–7 | A39 | SUPP24 |
| | Word 25, bits 8–11 | A40 | SUPP25 |
| | Word 25, bits 12–15 | A41 | SUPP26 |
| | Word 26, bits 0–3 | A42 | SUPP27 |
| | Word 26, bits 4–7 | A43 | SUPP28 |
| | Word 26, bits 8–11 | A44 | SUPP29 |
| | Word 26, bits 12–15 | A45 | SUPP30 |
| | 7. OSD/OTG: | | |
| | Word 15, bits 12–15 | A1 | X (OSID) |
| | Word 16, bits 0–3 | A2 | X (OSID) |
| | Word 16, bits 4–7 | A3 | X (OSID) |
| | Word 16, bits 8–11 | A4 | X (OTG) |
| | Word 16, bits 12–15 | A5 | X (OTG) |
| | Word 17, bits 0–3 | A6 | X (OTG) |
| | Word 17, bits 4–7 | A7 | X (OTG) |
| | Word 17, bits 8–11 | A8 | TBCD-Null |
| | Word 17, bits 12–15 | A9 | TBCD-Null |
| | Word 18, bits 0–3 | A10 | TBCD-Null |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits g–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits g–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | OSID = Originating Switch ID | | |
| | OTG = Originating Trunk ID | | |
| | 8. Telecommunication/PTT Cards: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | X |
| | Word 19, bits 0–3 | A14 | |
| | Word 19, bits 4–7 | A15 | X |
| | Word 19, bits 8–11 | A16 | X |
| | Word 19, bits 12–15 | A17 | X |
| | Word 20, bits 0–3 | A18 | X |

APPENDIX-continued

| Word #, Bit # | Description | | |
|---|---|---|---|
| | Word 20, bits 4–7 | A19 | X |
| | Word 20, bits 8–11 | A20 | X |
| | Word 20, bits 12–15 | A21 | X |
| | Word 21, bits 0–3 | A22 | X |
| | Word 21, bits 4–7 | A23 | X |
| | Word 21, bits 8–11 | A24 | TBCD-Null |
| | Word 21, bits 12–15 | A25 | SUPP1 |
| | Word 22, bits 0–3 | A26 | SUPP2 |
| | Word 22, bits 4–7 | A27 | SUPP3 |
| | Word 22, bits 8–11 | A28 | SUPP4 |
| | Word 22, bits 12–15 | A29 | SUPP5 |
| | Word 23, bits 0–3 | A30 | SUPP6 |
| | Word 23, bits 4–7 | A31 | SUPP7 |
| | Word 23, bits 8–11 | A32 | SUPP8 |
| | Word 23, bits 12–15 | A33 | SUPP9 |
| | Word 24, bits 0–3 | A34 | SUPP10 |
| | Word 24, bits 4–7 | A35 | SUPP11 |
| | Word 24, bits 8–11 | A36 | SUPP12 |
| | Word 24, bits 12–15 | A37 | SUPP13 |
| | Word 25, bits 0–3 | A35 | SUPP14 |
| | Word 25, bits, 4–7 | A39 | SUPP15 |
| | Word 25, bits 8–11 | A40 | SUPP16 |
| | Word 25, bits 12–15 | A41 | SUPP17 |
| | Word 26, bits 0–3 | A42 | SUPP18 |
| | Word 26, bits 4–7 | A43 | SUPP19 |
| | Word 26, bits 8–11 | A44 | SUPP20 |
| | Word 26, bits 12–15 | A45 | SUPP21 |
| | 9. Business Group ID: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | TBCD-Null |
| | Word 17, bits 8–11 | A8 | SUPP1 |
| | Word 17, bits 12–15 | A9 | SUPP2 |
| | Word 18, bits 0–3 | A10 | SUPP3 |
| | Word 18, bits 4–7 | A11 | SUPP4 |
| | Word 18, bits 8–11 | A12 | SUPP5 |
| | Word 18, bits 12–15 | A13 | SUPP6 |
| | Word 19, bits 0–3 | A14 | SUPP7 |
| | Word 19, bits 4–7 | A15 | SUPP8 |
| | Word 19, bits 8–11 | A16 | SUPP9 |
| | Word 19, bits 12–15 | A17 | SUPP10 |
| | Word 20, bits 0–3 | A18 | SUPP11 |
| | Word 20, bits 4–7 | A19 | SUPP12 |
| | Word 20, bits 8–11 | A20 | SUPP13 |
| | Word 20, bits 12–15 | A21 | SUPP14 |
| | Word 21, bits 0–3 | A22 | SUPP15 |
| | Word 21, bits 4–7 | A23 | SUPP16 |
| | Word 21, bits 8–11 | A24 | SUPP17 |
| | Word 21, bits 12–15 | A25 | SUPP18 |
| | Word 22, bits 0–3 | A26 | SUPP19 |
| | Word 22, bits 4–7 | A27 | SUPP20 |
| | Word 22, bits 8–11 | A28 | SUPP21 |
| | Word 22, bits 12–15 | A29 | SUPP22 |
| | Word 23, bits 0–3 | A30 | SUPP23 |
| | Word 23, bits 4–7 | A31 | SUPP24 |
| | Word 23, bits 8–11 | A32 | SUPP25 |
| | Word 23, bits 12–15 | A33 | SUPP26 |
| | Word 24, bits 0–3 | A34 | SUPP27 |
| | Word 24, bits 4–7 | A35 | SUPP28 |
| | Word 24, bits 8–11 | A36 | SUPP29 |
| | Word 24, bits 12–15 | A37 | SUPP30 |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 11. Network Information: | | |
| | Word 15, bits 12–15 | A1 | X |

APPENDIX-continued

| Word #, Bit # | Description |
| --- | --- |
| | Word 16, bits 0–3 A2 X |
| | Word 16, bits 4–7 A3 X |
| | Word 16, bits 8–11 A4 X |
| | Word 16, bits 12–15 A5 TBCD-Null |
| | Word 17, bits 0–3 A6 SUPP1 |
| | Word 17, bits 4–7 A7 SUPP2 |
| | Word 17, bits 8–11 A8 SUPP3 |
| | Word 17, bits 12–15 A9 SUPP4 |
| | Word 18, bits 0–3 A10 SUPP5 |
| | Word 18, bits 4–7 A11 SUPP6 |
| | Word 18, bits 8–11 A12 SUPP7 |
| | Word 18, bits 12–15 A13 SUPP8 |
| | Word 19, bits 0–3 A14 SUPP9 |
| | Word 19, bits 4–7 A15 SUPP10 |
| | Word 19, bits 8–11 A16 SUPP11 |
| | Word 19, bits 12–15 A17 SUPP12 |
| | Word 20, bits 0–3 A18 SUPP13 |
| | Word 20, bits 4–7 A19 SUPP14 |
| | Word 20, bits 8–11 A20 SUPP15 |
| | Word 20, bits 12–15 A21 SUPP16 |
| | Word 21, bits 0–3 A22 SUPP17 |
| | Word 21, bits 4–7 A23 SUPP18 |
| | Word 21, bits 8–11 A24 SUPP19 |
| | Word 21, bits 12–15 A25 SUPP20 |
| | Word 22, bits 0–3 A26 SUPP21 |
| | Word 22, bits 4–7 A27 SUPP22 |
| | Word 22, bits 8–11 A28 SUPP23 |
| | Word 22, bits 12–15 A29 SUPP24 |
| | Word 23, bits 0–3 A30 SUPP25 |
| | Word 23, bits 4–7 A31 SUPP26 |
| | Word 23, bits 8–11 A32 SUPP27 |
| | Word 23, bits 12–15 A33 SUPP28 |
| | Word 24, bits 0–3 A34 SUPP29 |
| | Word 24, bits 4–7 A35 SUPP30 |
| | Word 24, bits 8–11 A36 TBCD-Null |
| | Word 24, bits 12–15 A37 TBCD-Null |
| | Word 25, bits 0–3 A38 TBCD-Null |
| | Word 25, bits 4–7 A39 TBCD-Null |
| | Word 25, bits 8–11 A40 TBCD-Null |
| | Word 25, bits 12–15 A41 TBCD-Null |
| | Word 26, bits 0–3 A42 TBCD-Null |
| | Word 26, bits 4–7 A43 TBCD-Null |
| | Word 26, bits 8–11 A44 TBCD-Null |
| | Word 26, bits 12–15 A45 TBCD-Null |
| | 12. Network Call Identifier (NCID) - If the NCID is recorded in the "A" field, it will be recorded in binary beginning with A1. The Entry Code field will be indicative of the call processing associated with the particular call or "0". If the NCID is recorded in the NCID field of a 64 word call record, the Entry Code will also be indicative of the call processing associated with the particular call or "0". The NCID is comprised of the following:<br>Originating Switch ID<br>Originating Trunk Group<br>Originating Port Number<br>Timepoint One<br>NCID Sequence Number |
| Word 27, bits 0–3 | Feature Code (FC): Same as CDR/PNR format. |
| Word 27, bits 4–7 | Terminating Network Code (TNC): Same as CDR/PNR format. |
| Word 27, bits 8–11 | Network Access Type (NAT): Same as CDR/PNR format. |
| Word 27, bits 12–15 | Timepoint 7 Qualifier (TP&Q): Same as CDR/PNR format. |
| Word 28, bits 0–6 | Entry Code (EC): Same as CDR/PNR format. |
| Word 28, bits 7–9 | Prefix Digits (PD): Same as CPR/PNR format. |
| Word 28, bits 10–12 | NCS/DAP ID (NDID): Same as CDR/PNR format. |
| Word 28, bits 13–15 | Division ID (DIVID): Same as CDR/PNR format. |
| Word 29, bit 0 | Distant Overflow (DO): Same as CDR/PNR format. |
| Word 29, bit 1 | MCI Network Overflow (MNO): This bit indicates whether or not the Cause parameter that initiated overflow was generated due to MCI network detected conditions versus Reseller or Customer Location detected circumstances. This bit is set to 1 if the MNO subfield of the MBCSI parameter is set to 1 which indicates that the cause parameter that initiated overflow was generated due to MCI network detected conditions. This bit is set to 0 if the MNO subfield of the MBCSI parameter is set to 0 which indicates that the cause parameter that initiated overflow was generated due to a LEC, BOC, or Reseller condition. |
| Word 29, bit 2 | Customer Connect (cc): Same as CDR/PNR format. |
| Word 29, bit 3 | Inter-Network (IN): Same as CDR/PNR format. |

APPENDIX-continued

| Word #, Bit # | Description |
|---|---|
| Word 29, bit 4 | Reported Overflow (RO): Same as CDR/PNR format. |
| Word 29, bit 5 | Not Used. |
| Word 29, bit 6 | Call Direction (CD): Same as CDR/PNR format. |
| Word 29, bit 7 | Destination (DE): Same as CDR/PNR format. |
| Word 29, bit 8 | Dedicated Termination (DT): Same as CDR/PNR format. |
| Word 29, bits 9–10 | Not Used. |
| Word 29, bit 11 | Satellite (SA): Same as CDR/PNR format. |
| Word 29, bits 12–15 | Nature of Calling Location ID (NOCLI): Same as CDR/PNR format. |
| Word 30, bits 0–15 | Carrier Number (CN): Same as CDR/PNR format. |
| Word 31, bits 0–3 | Authorization Code ID (ACIF): Same as CDR/PNR format. |
| Word 31, bits 4–10 | Release Code (RC): Same as CDR/PNR format. |
| Word 31, bits 11–13 | NCID Sequence Number: Same as CDR/PNR format. |
| Word 31, bit 14 | NCID Location (NCIDLOC): Same as CDR/PNR format. |
| Word 31, bit 15 | Remote ANI Screened (RS): Same as CDR/PNR format. |
| Word 32, bits 0–15 | Not Used. |
| Word 33, bits 0–15 | |
| Word 34, bits 0–15<br>Word 35, bits 0–15<br>Word 36, bits 0–15<br>Word 37, bits 0–15<br>Word 38, bits 0–15<br>Word 39, bits 0–15<br>Word 40, bits 0–3 | Destination Address (DA): Records up to 25 digits of the destination address in TBCD format in the sequence that they are received or translated to, starting with D1. Unused bytes contain TBCD-Null. |

| | | 7-digit | 10-digit | DDD | IDDD |
|---|---|---|---|---|---|
| Word 34, bits 0–3 | D1 | N | N | N | CC |
| Word 34, bits 4–7 | D2 | X | X | X | CC |
| Word 34, bits 8–11 | D3 | X | X | X | CC |
| Word 34, bits 12–15 | D4 | X | N | N | NN |
| Word 35, bits 0–3 | D5 | X | X | X | NN |
| Word 35, bits 4–7 | D6 | X | X | X | NN |
| Word 35, bits 8–11 | D7 | X | X | X | NN |
| Word 35, bits 12–15 | D8 | X(TSID) | X | X | NN |
| Word 36, bits 0–3 | D9 | X(TSID) | X | X | NN |
| Word 36, bits 4–7 | D10 | X(TSID) | X | X | NN |
| Word 36, bits 8–11 | D11 | X(TTG) | X(TSID) | T-Null | NN |
| Word 36, bits 12–15 | D12 | X(TTG) | X(TSID) | T-Null | NN |
| Word 37, bits 0–3 | D13 | X(TTG) | X(TSID) | T-Null | NN |
| Word 37, bits 4–7 | D14 | X(TTG) | X(TTG) | T-Null | NN |
| Word 37, bits 8–11 | D15 | T-Nutl | X(TTG) | T-Null | NN |
| Word 37, bits 12–15 | D16 | T-Null | X(TTG) | T-Null | T-Null |
| Word 38, bits 0–3 | D17 | T-Null | X(TTG) | T-Null | T-Null |
| Word 38, bits 4–7 | D18 | T-Null | T-Null | T-Null | T-Null |
| Word 38, bits 8–11 | D19 | T-Null | T-Null | T-Null | T-Null |
| Word 38, bits 12–15 | D20 | T-Null | T-Null | T-Null | T-Null |
| Word 39, bits 0–3 | D21 | T-Null | T-Null | T-Null | T-Null |
| Word 39, bits 4–7 | D22 | T-Null | T-Null | T-Null | T-Null |
| Word 39, bits 8–11 | D23 | T-Null | T-Null | T-Null | T-Null |
| Word 39, bits 12–15 | D24 | T-Null | T-Null | T-Null | T-Null |
| Word 40, bits 0–3 | D25 | T-Null | T-Null | T-Null | T-Null |

CC = Customer Connect
NN = National Number
TSID = Terminating Switch ID
TTG = Terminating Trunk ID
T-Null = TBCD-Null

| | | 18-digit |
|---|---|---|
| Word 34, bits 0–3 | D1 | N |
| Word 34, bits 4–7 | D2 | N |
| Word 34, bits 8–11 | D3 | N |
| Word 34, bits 12–15 | D4 | N |
| Word 35, bits 0–3 | D5 | N |
| Word 35, bits 4–7 | D6 | N |
| Word 35, bits 8–11 | D7 | N |
| Word 35, bits 12–15 | D8 | N |
| Word 36, bits 0–3 | D9 | N |
| Word 36, bits 4–7 | D10 | N |
| Word 36, bits 8–11 | D11 | N |
| Word 36, bits 12–15 | D12 | N |
| Word 37, bits 0–3 | D13 | N |
| Word 37, bits 4–7 | D14 | N |
| Word 37, bits 8–11 | D15 | N |
| Word 37, bits 12–15 | D16 | N |
| Word 38, bits 0–3 | D17 | N |
| Word 38, bits 4–7 | D18 | N |
| Word 38, bits 8–11 | D19 | X(TSID) |

APPENDIX-continued

| Word #, Bit # | Description |
|---|---|
| | Word 38, bits 12–15 D20 X(TSID) |
| | Word 39, bits 0–3 D21 X(TSID) |
| | Word 39, bits 4–7 D22 X(TTG) |
| | Word 39, bits 8–11 D23 X(TTG) |
| | Word 39, bits 12–15 D24 X(TTG) |
| | Word 40, bits 0–3 D25 X(TTG) |
| | TSID = Terminating Switch ID |
| | TTG = Terminating Trunk ID |
| Word 40, bits 4–15<br>Word 41, bits 0–15<br>Word 42, bits 0–15<br>Word 43, bits 0–15 | Pretranslated Digits (PTD): Represents up to 15 digits of a number that is the translation of a number dialed by the caller. |

| | | 10 digit VNet, SAC DNIS, or Hotline | 00Y SAC Code | 7 digit VNet or SNS | VNet/ IDDD 15 digit (example) |
|---|---|---|---|---|---|
| Word 40, bits 4–7 | PTD1 | N | 0 | N | N |
| Word 40, bits 8–11 | PTD2 | X | 0 | X | N |
| Word 40, bits 12–15 | PTD3 | X | Y | X | N |
| Word 41, bits 0–3 | PTD4 | N | N | X | N |
| Word 41, bits 4–7 | PTD5 | X | X | X | N |
| Word 41, bits 8–11 | PTD6 | X | X | X | N |
| Word 41, bits 12–15 | PTD7 | X | X | X | N |
| Word 42, bits 0–3 | PTD8 | X | X | T-Null | N |
| Word 42, bits 4–7 | PTD9 | X | X | T-Null | N |
| Word 42, bits 8–11 | PTD10 | X | X | T-Null | N |
| Word 42, bits 12–15 | PTD11 | T-Null | T-Null | T-Null | N |
| Word 43, bits 0–3 | PTD12 | T-Null | T-Null | T-Null | N |
| Word 43, bits 4–7 | PTD13 | T-Null | T-Null | T-Null | N |
| Word 43, bits 8–11 | PTD14 | T-Null | T-NUll | T-Null | N |
| Word 43, bits 12–15 | PTD15 | T-Null | T-Null | T-Null | N |

T-Null = TBCD-Null

| Word #, Bit # | Description |
|---|---|
| Word 44, bits 0–7 | Enhanced International Routing (EIR) Call Type: Contains the EIR call type ID as received from the DAP in the NCS billing information parameter or from the operator in the NCS billing information ISUP RLT parameter. Recorded in binary. |
| Word 44, bits 8–14 | Overflow Cause Value (OVFVAL): This field is the binary equivalent of the first cause value received or formatted in-switch. This value is taken from the cause value subfield in the cause parameter that initiated overflow. |
| Word 44, bit 15 | Counts As Bid (CB): This field is used with the EIR feature. The bit is set to '1' or '0' as per the information received from the DAP in the CB field of the NCS billing information parameter or from the operator in the NCS billing information ISUP RLT parameter.<br>0 = Does not count as bid (default)<br>1 = Counts as bid |
| Word 45, bits 0–3 | Overflow Cause Location (OVFCL): This field is the binary equivalent to the value recorded from the first cause location received or formatted in-switch. This information is taken from the cause location subfield in the cause parameter that initiated overflow. |
| Word 45, bits 4–15<br>Word 46, bits 0–15<br>Word 47, bits 0–15<br>Word 48, bits 0–15 | Desired Terminating Address (DTA): These 15 bytes contain the originally intended or "desired" termination before overflow was triggered. They contain either: 1) the desired terminating switch id and trunk group for calls that were sent to a DTC termination, 2) a national number, or 3) international number based on what the action code returned from the DAP for the desired termination. |

| | | DTC DTSID + DTTG | DDD |
|---|---|---|---|
| Word 45, bits 4–7 | DTA1 | 0 | N |
| Word 45, bits 8–11 | DTA2 | X(DTSID1) | X |
| Word 45, bits 12–15 | DTA3 | X(DTSID2) | X |
| Word 46, bits 0–3 | DTA4 | X(DTSID3) | N |
| Word 46, bits 4–7 | DTA5 | 0 | X |
| Word 46, bits 8–11 | DTA6 | X(DTTG1) | X |
| Word 46, bits 12–15 | DTA7 | X(DTTG2) | X |
| Word 47, bits 0–3 | DTA8 | X(DTTG3) | X |
| Word 47, bits 4–7 | DTA9 | X(DTTG4) | X |
| Word 47, bits 8–11 | DTA10 | TBCD-Null | X |
| Word 47, bits 12–15 | DTA11 | TBCD-Null | TBCD-Null |
| Word 48, bits 0–3 | DTA12 | TBCD-Null | TBCD-Null |
| Word 48, bits 4–7 | DTA13 | TBCD-Null | TBCD-Null |
| Word 48, bits 8–11 | DTA14 | TBCD-Null | TBCD-Null |

APPENDIX-continued

| Word #, Bit # | Description | | | |
|---|---|---|---|---|
| | Word 48, bits 12–15 | DTA15 | TBCD-Null | TBCD-Null |
| | DTSID = Desired Termination Switch ID | | | |
| | DTTG = Desired Termination Trunk Group | | | |
| | | | IDDD (example) | DTC (future) |
| | Word 45, bits 4–7 | DTA1 | CC | X(DTSID1) |
| | Word 45, bits 8–11 | DTA2 | CC | X(DTSID2) |
| | Word 45, bits 12–15 | DTA3 | CC | X(DTSID3) |
| | Word 46, bits 0–3 | DTA4 | NN | X(DTSID4) |
| | Word 46, bits 4–7 | DTA5 | NN | X(DTTG1) |
| | Word 46, bits 8–11 | DTA6 | NN | X(DTTG2) |
| | Word 46, bits 12–15 | DTA7 | NN | X(DTTG3) |
| | Word 47, bits 0–3 | DTA8 | NN | X(DTTG4) |
| | Word 47, bits 4–7 | DTA9 | NN | X(DTTG5) |
| | Word 47, bits 8–11 | DTA10 | NN | TBCD-Null |
| | WOrd 47, bits 12–15 | DTA11 | NN | TBCD-Null |
| | Word 48, bits 0–3 | DTA12 | NN | TBCD-Null |
| | Word 48, bits 4–7 | DTA13 | NN | TBCD-Null |
| | Word 48, bits 8–11 | DTA14 | NN | TBCD-Null |
| | Word 48, bits 12–15 | DTA15 | TBCD-Null | TBCD-Null |
| | CC = Customer Connect | | | |
| | DTSID = Desired Termination Switch ID | | | |
| | DTTG = Desired Termination Trunk Group | | | |
| | NN = National Number | | | |
| Word 49, bits 0–6 | Overflow Count (OVFC): Indicates the total number of intermediate overflow attempts before successful termination was achieved. This value is incremented each time the DAP is accessed for overflow information. | | | |
| Word 49, bits 7–12 | Desired Termination Action Code (DTAC): This field represents the action code which was received from the DAP in the first response. This information is used to identify the type of information which is recorded in the DTA field. | | | |
| Word 49, bit 13 | Not Used. | | | |
| Word 49, bits 14–15<br>Words 50–54, bits 0–15 | Network Call Identifier (NCID): Contains the binary representation of the NCID. The NCID is recorded here at intermediate and terminating switches if the Authcode field is being used to record other information. The NCID is created at the originating switch and is passed to intermediate and terminating switches. The format of the NCID is:<br>Originating Switch ID (OSID)<br>Originating Trunk Group (OTG)<br>Originating Port (OP).<br>Timepoint 1 (TPI)<br>NCID Sequence Number | | | |
| Words 55–58, bits 0–15<br>Word 59, bits 0–10 | Not Used. | | | |
| Word 59, bits 11–13 | User to User Type (UUS Type): Contains a binary representation used to identify the type of User to User services being utilized. If this field is set to '0' and the UUIE Count field is set to a value other than '0', then non-call associated User to User information is being transferred.<br>0 = No message or call associated UUS invoked (default)<br>1 = MA-UUI only<br>2 = CA-TSC at call setup only<br>3 = CA-TSC after call setup only<br>4 = CA-TSC at call setup and CA-TSC after call setup<br>5 = MA-UUI and CA-TSC at call setup<br>6 = MA-UUI and CA-TSC after call setup<br>7 = MA-UUI and CA-TSC at call setup and CA-TSC after call setup | | | |
| Word 59, bits 14–15<br>Word 60, bits 0–13 | User to User Information Element Count (UUIE Count): Contains the binary count of UUIE delivered in either direction per TSC. Both the originating and terminating switches shall maintain a counter to count the number of UUIE delivered on a per call basis. Each switch shall count all UUIE in either direction whether delivered or not. The billed party shall be responsible for paying for the UUIE transport. If the count reaches the maximum value of 65535, it will hold at this value until a new call record is created. The beared channel will be disconnected one the maximum count is reached. | | | |
| Word 60, bits 14–15 | Overflow Case Coding Standard (OVFCS): Contains the binary equivalent of the first coding standard received or formatted in-switch. This value is taken from the coding standard subfield in the cause parameter that initiated overflow. It will not be overwritten by subsequent coding standards received or in-switch formatted values. This field is used for enhanced overflow calls | | | |

APPENDIX-continued

| Word #, Bit # | Description |
|---|---|
| | only. |
| Word 61, bits 0–15<br>Word 62, bits 0–7 | Originating NX64 Bitmap: Records the port number that corresponds with the originating control channel of the call in the originating port in the CDR/PNR. This bitmap is used to identify the subsequent channels in the same T1 timespan that are used in the call. A particular bit is set to indicate if this channel was used on the call. The number of bits that are set is used to identify the number N in an NX64 call. |
| Word 62, bits 8–15<br>Word 63, bits 0–15 | Terminating NX64 Bitmap: Record the port number that corresponds to the terminating control channel of the call in the terminating port in the CDR/PNR. This bitmap will be used to identify the subsequent channels in the same T1 span that are used in the call. A particular bit is set to indicate if this channel was used on the call. The number of bits that are set is used to identify the number N in an NX64 call. In general, each channel transmits at 64 Kbits/second, and if a customer needs more than one channel, this bitmap indicates which channels are used in the call. |
| Table 303 OSR/POSR Record Format: | |
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPOSR<br>8 = EOSR<br>9= EPOSR<br>10–15 = Not Used |
| Word 0, bits 4–15 | Call Disconnect ID (CDID): Identifies the call record. Each call record has a unique ID number. These 12 bits contain the 12 least significant bits of the CDID. |
| Word 1, bits 0–15<br>Word 2, bits 0–15 | Timepoint 1 (TP1): A binary count of the number of seconds that occurred between midnight (UTC) on January 1, 1976, and the time that the incoming call was detected by the switch. |
| Word 3, bits 0–12 | Timepoint 4 (TP4): A binary count of the number of seconds between Timepoint 1 and the time the operator position was seized by the switch. |
| Word 3, bits 13–15<br>Word 4, bits 0–0 | Timepoint 6 (TP6): A binary count of the number of seconds between timepoint 1 and the time Answer Supervision was detected or received. This is the time that it took for the call to be answered by the person or audio system being called. |
| Word 4, bits 10–15<br>Word 5, bits 0–15 | Timepoint 7 (TP7): A binary count of the number of seconds between timepoint 1 and the time that the originating or terminating party disconnected whichever is first. |
| Word 6, bits 0–15<br>Word 7, bit 1 | Originating Port (OP): The absolute port number of the originating trunk. Originating trunk is the line on which the call came to the switch. |
| Word 7, bits 2–15<br>Word 8, bits 0–1 | Terminating Port (TP): The absolute port number of the last terminating trunk seized for an outgoing call attempt. The terminating trunk is the last line on which the call is transmitted. |
| Word 8, bits 2–14 | Originating Trunk Group (OTG): A binary number expressing the Originating Trunk Group number of the originating trunk. An originating trunk group is a group of ports coming from the same location. |
| Word 8, bit 15<br>Word 9, bits 0–11 | Terminating Trunk Group (TTG): A binary number expressing the Terminating Trunk Group number of the Terminating trunk. A terminating trunk group is a group of ports going to the same location. If a call fails because no trunks are available, record the last trunk group number that was attempted. |
| Word 9, bits 12–15 | Timepoint 3 qualifier (TP3Q): Contains the outpulsed call disposition qualifier which provides the telephone number of the person making the call to the person being called. The person being called needs to have signed up for the “ANI Delivery” service and have a display device for displaying the caller’s telephone number.<br>0 = Default<br>1 = ANI/CSI was deiivered<br>2 = DNIS was delivered<br>3 = AN/CSI and DNIS were delivered<br>4–5 = Not Used<br>6 = NCT<br>7 = NCT, AN/CSI was delivered<br>8 = NCT, DNIS was delivered<br>9 = NCT, ANI/CSI and DNIS was delivered |

APPENDIX-continued

| Word #, Bit # | Description |
|---|---|
| | 10 = NCT Tandem<br>11–15 = Not Used |
| Word 10, bits 0–1 | Timepoint 6 qualfier (TP6Q): Contains the answer supervision qualfier indicating the way in which the telephone call was answered.<br>0 = Hardware detected an Answer<br>1 = Software detected Voice<br>2 = Not Used<br>3 = Operator/NARS detected an Answer |
| Word 10, bits 2–7 | Action Code (AC): The switch provides an action code which indicates the type of destination address, or what type of telephone number was called, or an error code.<br>0 = Default<br>1 = 7-digit number without overflow<br>2 = 7-digit number with overflow<br>3 = DDD number<br>4 = IDDD numher<br>5 = Switch generated Action Code<br>6 = Incoming exclusion failure<br>7 = ID code failure<br>8 = Unexpected error occurs in the NCS/DAP<br>9 = Misdialed number and the NCS/DAP is unable to translate the dialed number<br>10 = 10–digit number without overflow<br>11 = 1-digit number with overflow<br>12 = National with overflow<br>13 = International with overflow<br>14 = ANI not found<br>15 = NPA-NXXX not found<br>16 = Pilot number not found<br>17 = Associated partition not found<br>18 = ADF format error<br>19 = Switch ID not found<br>20 = 800 number not found<br>21 = 800 number out of band<br>22 = Not Used<br>23 = Invalid ID code<br>24 = Range privilege<br>25 = 7-digit number not in database<br>26 = 10-digit exclusion feature<br>27 = 900 number not found<br>28 = 900 number out of band<br>29 = Not Used<br>30 = NCS network management blocked<br>31 = NCS Gate Denial<br>32 = FlexSTC, Overflow Not Allowed<br>33 = FlexSTC, Overflow Allowed<br>34 = SAC Number Not Found<br>35 = SAC Number Out of Band<br>36 = 700 Number Not Found<br>37 = 700 Number Out of Band<br>38 = ICR designated Out of Band<br>39 = NCT - Reversed call direction<br>40–48 = Not Used<br>49 = Information Call<br>50 = Flexible Direct Termination Call without overflow<br>51 = Flexible Direct Termination Call with overflow<br>52 = Outbound IVNet without overflow<br>53 = Outbound IVNet with overflow<br>54 = Global Switch Profile not found<br>55 = ANI Index Provided by DAP<br>56–62 = Not Used<br>63 = International Inbound APP |
| Word 10, bits 8–11 | Originating Trunk Class (OTC): Indicates what type of originating trunk was accessed.<br>0 = ONAL (FG-A)<br>1 = ONAT (FG-B, FG-C, FG-D, CAMA, LAMA)<br>2 = DAL, VNET CAMA, FGS-DAL)<br>3 = IMT (Inband or SS7)<br>4 = International Circuit (R1, R2, #5, #6, #7)<br>5 = ISDN PRI<br>6 = OST<br>7–15 = Not Used |
| Word 10, bits 12–15 | Terminating Trunk Class (TTC): Indicates what type of terminating trunk was accessed.<br>0 = ONAL (FG-A)<br>1 = ONAT (FG-B, FG-C, FG-D, CAMA, LAMA) |

APPENDIX-continued

| Word #, Bit # | Description |
|---|---|
| | 2 = DAL, VNET CAMA, FGS-DAL)<br>3 = IMT (Inband or SS7)<br>4 = International Circuit (R1, R2, #5, #6, #7)<br>5 = ISDN PRI<br>6 = OST<br>7–15 = Not Used<br>FG = Feature Group |
| Word 11, bits 0–7 | Information Digits (ID): The switch receives these digits from the originating trunk group indicating the type of telephone on which the telephone call originated, such as a home telephone, pay telephone, or prison telephone. |

| | FG-B Direct, CAMA | FG-D | MCI IMT | #5 | #6 |
|---|---|---|---|---|---|
| bits 0–3: | TBCD Null | X | X | TBCD Null | X |
| bits 4–7: | X | X | X | X | X |

| Word #, Bit # | Description |
|---|---|
| Word 11, bits 8–11 | Originating NACC (ONACC): This field contains the North American Coding Convention code which is received in the incoming digit stream to the operator switch. This code identifies the type of assistance required for inbound international calls.<br>0 = default<br>1 = 121 (Assistance without call completion)<br>2 = 131 (Directory assistance)<br>3 = 151 (Assistance with call completion)<br>4 = 160 (Manual transit)<br>5 = 191 (Call USA)<br>6–15 = Not Used |
| Word 11, bits 12–15 | Terminating NACC (TNACC): This field contains the North American Coding Convention code which is transmitted in the incoming digit stream to another operator switch. This code identifies the type of assistance required at the next operator switch.<br>0 = default<br>1 = 121 (Assistance without call completion)<br>2 = 131 (Directory assistance)<br>3 = 151 (Assistance with call completion)<br>4 = 160 (Manual transit)<br>5 = 191 (Call USA)<br>6–15 = Not Used |
| Word 12, bits 0–15<br>Word 13, bits 0–15<br>Word 14, bits 0–7 | Call Location ID (CLI): Represents the 10 digits from where the call came. If switch receives more than 10 digits, record them in the ECDR/EPOSR.<br>1. VNet CAMA DAL originations: If CSI is available, prefix the CSI with filed HNPA and HNXX information, if available, and record. Use NOCLI value of 7.<br>2. FG-C originations: If ANI or CSI information is not available and the number is in the 00Y + NXX + XXXX format, record the 00Y in CLI 1–3, and record the OSID/OTG in CLI4-10. Use NOCLI value of 8.<br>3. Inband FG-D Originations: Record the ANI that was received starting with CLI1. Use NOCLI value of 1.<br>4. SS7 FG-D Originations: Record the charge number, if available. If not available, record the calling party number. Use NOCLI value of 2 or 3.<br>5. International originations: Record the country code and the national number of the calling party. Use NOCLI of 9.<br>6. SS7 IMTs Originations: Record the following information in this order of importance: 1) charge number, 2) calling party number, 3) OSID/OTG from generic digits. Use NOCLI of 2, 3, or 8.<br>7. SS7 Reseller Originations: The CLI field is filled with TBCD-Nulls.<br>8. SS7 Private Network Originations: The CLI field is filled with TBCD-Nulls.<br>9. PRI Orgaaizations: Record the calling party number received in the ISPN setup message.<br>The format: |

| | 1-10 digit ANI | OSID/OTG | Incoming Int'l |
|---|---|---|---|
| Word 12, bits 0–3 | CLI1 | TBCD Null | X(CC) |
| Word 12, bits 4–7 | CLI2 | TBCD Null | X(CC) |
| Word 12, bits 8–11 | CLI3 | TBCD Null | X(CC) |
| Word 12, bits 12–15 | CLI4 | X(OSID) | X(N |
| Word 43, bits 0–3 | CLI5 | X(OSID) | X(NN) |
| Word 13, bits 4–7 | CLI6 | X(OSID) | X(N |
| Word 13, bits 8–11 | CLI7 | X(OTG) | X(NN) |

APPENDIX-continued

| Word #, Bit # | Description | | | | |
|---|---|---|---|---|---|
| | Word 13, bits 12–15 | CLI8 | X(OTG) | X(NN) | |
| | Word 14, bits 0–3 | CLI9 | X(OTG) | X(NN) | |
| | Word 14, bits 4–7 | CLI10 | X(OTG) | X(NN) | |
| | CC = Customer Connect | | | | |
| | NN = National Number | | | | |
| | OSID = Originating Switch NSC ID (000–999) | | | | |
| | OTG = Originating Trunk Group (0000–8191) | | | | |
| Word 14, bits 8–15<br>Word 15, bits 0–15<br>Word 16, bits 0–15<br>Word 17, bits 0–15<br>Word 18, bits 0–15<br>Word 19, bits 0–15 | Authorization Codes: Represents 22 digits of who gets billed for the call which includes one or more of the following and/or an optional Supplementary Code:<br><br>1. Authorization Code - Contains the authorization code digits. AUTH1–AUTH5 records the dialed or filed authorization codes, afterwhich is recorded an optional variable 14 digit security code, SEC1–SEC4, comprised of TBCD digits 0–9 and A–D. After the last digit, record a TBCD-Null, afterwhich record any supplementary code digits, SUPP1-SUPP12. Record TBCD-Null in any unused byte. Authorization Code format: | | | | |
| | | | 5 digit Auth Code | 6 digit Auth Code | 7 digit Auth Code |
| | Word 14, bits 8–11 | A1 | AUTH1 | AUTH1 | AUTH1 |
| | Word 14, bits 12–15 | A2 | AUTH2 | AUTH2 | AUTH2 |
| | Word 15, bits 0–3 | A3 | AUTH3 | AUTH3 | AUTH3 |
| | Word 15, bits 4–7 | A4 | AUTH4 | AUTH4 | AUTH4 |
| | Word 15, bits 8–11 | A5 | AUTH5 | AUTH5 | AUTH5 |
| | Word 15, bits 12–15 | A6 | SEC1 | AUTH6 | AUTH6 |
| | Word 16, bits 0–3 | A7 | SEC2 | SEC1 | AUTH7 |
| | Word 16, bits 4–7 | A8 | SEC3 | SEC2 | SEC1 |
| | Word 16, bits 8–11 | A9 | SEC4 | SEC3 | SEC2 |
| | Word 16, bits 12–15 | A10 | TBCD-Null | SEC4 | SEC3 |
| | Word 17, bits 0–3 | A11 | SUPP1 | TBCD-Null | SEC4 |
| | Word 17, bits 4–7 | A12 | SUPP2 | SUPP1 | TBCD-Null |
| | Word 17, bits 8–11 | A13 | SUPP3 | SUPP2 | SUPP1 |
| | Word 17, bits 12–15 | A14 | SUPP4 | SUPP3 | SUPP2 |
| | Word 18, bits 0–3 | A15 | SUPP5 | SUPP4 | SUPP3 |
| | Word 18, bits 4–7 | A16 | SUPP6 | SUPP5 | SUPP4 |
| | Word 18, bits 8–11 | A17 | SUPP7 | SUPP6 | SUPP5 |
| | Word 18, bits 12–15 | A18 | SUPP8 | SUPP7 | SUPP6 |
| | Word 19, bits 0–3 | A19 | SUPP9 | SUPP8 | SUPP7 |
| | Word 19, bits 4–7 | A20 | SUPP10 | SUPP9 | SUPP8 |
| | Word 19, bits 8–11 | A21 | SUPP11 | SUPP10 | SUPP9 |
| | Word 19, bits 12–15 | A22 | SUPP12 | SUPP11 | SUPP10 |
| | 2. Calling Station ID (CSI) - contains the digits of the calling station identifier. The CSI digits will be recorded starting at A1. A TBCD-Null is recorded after the last CSI digit, followed by Supplemental Code digits. Unused bytes contain a TBCD-Null. Calling Station ID format: | | | | |
| | | | 7 digit CSI | 10 digit CSI | |
| | Word 14, bits 8–11 | A1 | X | X | |
| | Word 14, bits 12–15 | A2 | X | X | |
| | Word 15, bits 0–3 | A3 | X | X | |
| | Word 15, bits 4–7 | A4 | X | X | |
| | Word 15, bits 8–11 | A5 | X | X | |
| | Word 15, bits 12–15 | A6 | X | X | |
| | Word 16, bits 0–3 | A7 | X | X | |
| | Word 16, bits 4–7 | A8 | TBCD-Null | X | |
| | Word 16, bits 8–11 | A9 | SUPP1 | X | |
| | Word 16, bits 12–15 | A10 | SUPP2 | X | |
| | Word 17, bits 0–3 | A11 | SUPP3 | TBCD-Null | |
| | Word 17, bits 4–7 | A12 | SUPP4 | SUPP1 | |
| | Word 17, bits 8–11 | A13 | SUPP5 | SUPP2 | |
| | Word 17, bits 12–15 | A14 | SUPP6 | SUPP3 | |
| | Word 18, bits 0–3 | A15 | SUPP7 | SUPP4 | |
| | Word 18, bits 4–7 | A16 | SUPP8 | SUPP5 | |
| | Word 18, bits 8–11 | A17 | SUPP9 | SUPP6 | |
| | Word 18, bits 12–15 | A18 | SUPP10 | SUPP7 | |
| | Word 19, bits 0–3 | A19 | SUPP11 | SUPP8 | |
| | Word 19, bits 4–7 | A20 | SUPP12 | SUPP9 | |
| | Word 19, bits 8–11 | A21 | SUPP13 | SUPP10 | |
| | Word 19, bits#12–15 | A22 | SUPP14 | SUPP11 | |
| | 3. Supplementary Codes - Supplemental Codes are recorded starting in A1. Unused bytes contain TBCD-Null. Supplementary Code format: | | | | |
| | | | 800/900 VNet | | |

APPENDIX-continued

| Word #, Bit # | Description |
|---|---|
| | Supp. Codes |
| | Word 14, bits 8–11 A1 SUPP1 |
| | Word 14, bits 12–15 A2 SUPP2 |
| | Word 15, bits 0–3 A3 SUPP3 |
| | Word 15, bits 4–7 A4 SUPP4 |
| | Word 15, bits 8–11 A5 SUPP5 |
| | Word 15, bits 12–15 A6 SUPP6 |
| | Word 16, bits 0–3 A7 SUPP7 |
| | Word 16, bits 4–7 A8 SUPP8 |
| | Word 16, bits 8–11 A9 SUPP9 |
| | Word 16, bits 12–15 A10 SUPP10 |
| | Word 17, bits 0–3 A11 SUPP11 |
| | Word 17, bits 4–7 A12 SUPP12 |
| | Word 17, bits 8–11 A13 SUPP13 |
| | Word 17, bits 12–15 A14 SUPP14 |
| | Word 18, bits 0–3 A15 SUPP15 |
| | Word 18, bits 4–7 A16 SUPP16 |
| | Word 18, bits 8–11 A17 SUPP17 |
| | Word 18, bits 12–15 A18 SUPP18 |
| | Word 19, bits 0–3 A19 SUPP19 |
| | Word 19, bits 4–7 A20 SUPP20 |
| | Word 19, bits 8–11 A21 SUPP21 |
| | Word 19, bits 12–15 A22 SUPP2 |
| | 4. VNet Remote Access - If the caller accesses VNet services through the Remote Access Service, the access number is recorded starting at A1. A TBCD-Null is recorded after the last digit followed by any Supplemental Codes Unused bytes contain TBCD-Null. VNet Remote Access format: |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-Null |
| | Word 17, bits 4–7 A12 SUPP1 |
| | Word 17, bits 8–11 A13 SUPP2 |
| | Word 17, bits 12–15 A14 SUPP3 |
| | Word 18, bits 0–3 A15 SUPP4 |
| | Word 18, bits 4–7 A16 SUPP5 |
| | Word 18, bits 8–11 A17 SUPP6 |
| | Word 18, bits 12–15 A18 SUPP7 |
| | Word 19, bits 0–3 A19 SUPP8 |
| | Word 19, bits 4–7 A20 SUPP9 |
| | Word 19, bits 8–11 A21 SUPP10 |
| | Word 19, bits 12–15 A22 SUPP11 |
| | 5. Calling Party Number - The calling party number is recorded for SS7 FGD call originations received with a charge number and a calling party number. Record the SS7 calling party number in A1–10. A TBCD-Null is recorded after the last digit, followed by supplementary codes. Unused bytes contain TBCD-Null. Calling party number format: |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-Null |
| | Word 17, bits 4–7 A12 SUPP1 |
| | Word 17, bits 8–11 A13 SUPP2 |
| | Word 17, bits 12–15 A14 SUPP3 |
| | Word 18, bits 0–3 A15 SUPP4 |
| | Word 18, bits 4–7 A16 SUPP5 |
| | Word 18, bits 8–11 A17 SUPP6 |
| | Word 18, bits 12–15 A18 SUPP7 |
| | Word 19, bits 0–3 A19 SUPP8 |
| | Word 19, bits 4–7 A20 SUPP9 |

APPENDIX-continued

| Word #, Bit # | Description |
|---|---|
| | Word 19, bits 8–11 A21 SUPP10 |
| | Word 19, bits 12–15 A22 SUPP11 |
| | 6. Credit Card Number - Record the commercial credit card or presubscribed credit card number starting in A1. The PIN digits of a valid presubscribed credit card number are masked out by writing TBCD-A over the 4 PIN digits. A TBCD-Null is recorded after the last digit, followed by supplementary codes. Unused bytes contain TBCD-Null. Credit card number format: |
| | Word 14, bits 8–11 A1 X |
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 X |
| | Word 17, bits 4–7 A12 X |
| | Word 17, bits 8–11 A13 X |
| | Word 17, bits 12–15 A14 X |
| | Word 18, bits 0–3 A15 X |
| | Word 18, bits 4–7 A16 X |
| | Word 18, bits 8–11 A17 X |
| | Word 18, bits 12–15 A18 X |
| | Word 19, bits 0–3 A19 X |
| | Word 19, bits 4–7 A20 TBCD-Null |
| | Word 19, bits 8–11 A21 SUPP1 |
| | Word 19, bits 12–15 A22 SUPP2 |
| | 7. 14 Digit MCI/VNet Cards - The 14 digit calling card/VNet card number is recorded starting in A1 with the last 4 PIN digits masked out by writing TBCD-A for those digits. A TBCD-Null is written after the last digit, followed by supplemental codes. Unused bytes contain TBCD-Null. Calling card/VNet card format: |
| | Word 14, bits 8–11 A1 X |
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-A |
| | Word 17, bits 4–7 A12 TBCD-A |
| | Word 17, bits 8–11 A13 TBCD-A |
| | Word 17, bits 12–15 A14 TBCD-A |
| | Word 18, bits 0–3 A15 TBCD-Null |
| | Word 18, bits 4–7 A16 SUPP1 |
| | Word 18, bits 8–11 A17 SUPP2 |
| | Word 18, bits 12–15 A18 SUPP3 |
| | Word 19, bits 0–3 A19 SUPP4 |
| | Word 19, bits 4–7 A20 SUPP5 |
| | Word 19, bits 8–11 A21 SUPP6 |
| | Word 19, bits 12–15 A22 SUPP7 |
| | 8. Telecommunications/PTT Cards - The 23 digits, or less, of the telecommunications card is recorded starting in A1. A TBCD-Null is recorded after the last digit, followed by supplemental codes. Unused bytes contain TBCD-Null. Telecommunications card format: |
| | Word 14, bits 8–11 A1 X |
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 X |
| | Word 17, bits 4–7 A12 X |
| | Word 17, bits 8–11 A13 X |
| | Word 17, bits 12–15 A14 X |
| | Word 18, bits 0–3 A15 X |

APPENDIX-continued

| Word #, Bit # | Description |
|---|---|
| | Word 18, bits 4–7 A16 X |
| | Word 18, bits 8–11 A17 X |
| | Word 18, bits 12–15 A18 X |
| | Word 19, bits 0–3 A19 X |
| | Word 19, bits 4–7 A20 X |
| | Word 19, bits 8–11 A21 X |
| | Word 19, bits 12–15 A22 X |
| | 9. OSID and OTG - For international inbound VNet or SAC calls, the OSID and OTG are recorded as received from the SS7 Generic Digits parameter. After the parameters are recorded, the remaining bytes contain TBCD-Null. OSID and OTG format: |
| | Word 14, bits 8–11 A1 X (OSID) |
| | Word 14, bits 12–15 A2 X (OSID) |
| | Word 15, bits 0–3 A3 X (OSID) |
| | Word 15, bits 4–7 A4 X (OTG) |
| | Word 15, bits 8–11 A5 X (OTG) |
| | Word 15, bits 12–15 A6 X (OTG) |
| | Word 16, bits 0–3 A7 X (OTG) |
| | Word 16, bits 4–7 A8 TBCD-Null |
| | Word 16, bits 8–11 A9 TBCD-Null |
| | Word 16, bits 12–15 A10 TBCD-Null |
| | Word 17, bits 0–3 A11 TBCD-Null |
| | Word 17, bits 4–7 A12 TBCD-Null |
| | Word 17, bits 8–11 A13 TBCD-Null |
| | Word 17, bits 12–15 A14 TBCD-Null |
| | Word 18, bits 0–3 A15 TBCD-Null |
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | OSID = Originating Switch Group (000–999) |
| | OTG = Originating Trunk Group (0000–8191) |
| | 10. Business Group ID - For some SS7 trunk groups, a business group ID is received in a SS7 parameter and is recorded in A1–A6. After the last digit, a TBCD-Null is recorded followed by any supplemental codes. Unused bytes contain TBCD-Null. |
| | Word 14, bits 8–11 A1 X |
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 TBCD-Null |
| | Word 16, bits 4–7 A8 SUPP1 |
| | Word 16, bits 8–11 A9 SUPP2 |
| | Word 16, bits 12–15 A10 SUPP3 |
| | Word 17, bits 0–3 A11 SUPP4 |
| | Word 17, bits 4–7 A12 SUPP5 |
| | Word 17, bits 8–11 A13 SUPP6 |
| | Word 17, bits 12–15 A14 SUPP7 |
| | Word 18, bits 0–3 A15 SUPP8 |
| | Word 18, bits 4–7 A16 SUPP9 |
| | Word 18, bits 8–11 A17 SUPP10 |
| | Word 18, bits 12–15 A18 SUPP11 |
| | Word 19, bits 0–3 A19 SUPP12 |
| | Word 19, bits 4–7 A20 SUPP13 |
| | Word 19, bits 8–11 A21 SUPP14 |
| | Word 19, bits 12–15 A22 SUPP15 |
| | 11. Network Information - For some SS7 trunk groups, a network information ID is received in a SS7 parameter and is recorded in A1–A4. After the last digit, a TBCD-Null is recorded followed by any supplemental codes. Unused bytes contain TBCD-Null. |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 TBCD-Null |
| | Word 15, bits 12–15 A6 SUPP1 |
| | Word 16, bits 0–3 A7 SUPP2 |
| | Word 16, bits 4–7 A8 SUPP3 |
| | Word 16, bits 8–11 A9 SUPP4 |
| | Word 16, bits 12–15 A10 SUPP5 |
| | Word 17, bits 0–3 A11 SUPP6 |
| | Word 17, bits 4–7 A12 SUPP7 |

APPENDIX-continued

| Word #, Bit # | Description |
|---|---|
| | Word 17, bits 8–11 A13 SUPP8 |
| | Word 17, bits 12–15 A14 SUPP9 |
| | Word 18, bits 0–3 A15 SUPP10 |
| | Word 18, bits 4–7 A16 SUPP11 |
| | Word 18, bits 8–11 A17 SUPP12 |
| | Word 18, bits 12–15 A18 SUPP13 |
| | Word 19, bits 0–3 A19 SUPP14 |
| | Word 19, bits 4–7 A20 SUPP15 |
| | Word 19, bits 8–11 A21 SUPP16 |
| | Word 19, bits 12–15 A22 SUPP17 |
| | 12. BOC Card: The BOC/LEC Card Number is recorded in A1–A10 with the remaining bytes containing TBCD-Null. |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-Null |
| | Word 17, bits 4–7 A12 TBCD-Null |
| | Word 17, bits 8–11 A13 TBCD-Null |
| | Word 17, bits 12–15 A14 TBCD-Null |
| | Word 18, bits 0–3 A15 TBCD-Null |
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | 13. Third Party Numbers: If a call is billed to a third party NANP number, record the number in A1–A10 with the remaining bytes containing TBCD-Null. |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-Null |
| | Word 17, bits 4–7 A12 TBCD-Null |
| | Word 17, bits 8–11 A13 TBCD-Null |
| | Word 17, bits 12–15 A14 TBCD-Null |
| | Word 18, bits 0–3 A15 TBCD-Null |
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word l9, bits 8–11 A21 TBCD-Null |
| | Word 19, bits 12–15 A22 TBCD-Null |
| | 14. International Numbers: If a Call is billed to an international number, record tbe starting number in A1. Unused bytes contain TBCD-Null. |
| | Word 14, bits 8–11 A1 X (CC) |
| | Word 14, bits 12–15 A2 X (CC) |
| | Word 15, bits 0–3 A3 X (CC) |
| | Word 15, bits 4–7 A4 X (NN) |
| | Word 15, bits 8–11 A5 X (NN) |
| | Word 15, bits 12–15 A6 X (NN) |
| | Word 16, bits 0–3 A7 X (NN) |
| | Word 16, bits 4–7 A8 X (NN) |
| | Word 16, bits 8–11 A9 X (NN) |
| | Word 16, bits 12–15 A10 X (NN) |
| | Word 17, bits 0–3 A11 X (NN) |
| | Word 17, bits 4–7 A12 X (NN) |
| | Word 17, bits 8–11 A13 X (NN) |
| | Word 17, bits 12–15 A14 X (NN) |
| | Word 18, bits 0–3 A15 X (NN) |

APPENDIX-continued

| Word #, Bit # | Description |
|---|---|
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | CC = Customer Connect |
| | NN = National Number |
| | 15. LAN Sequence Numbers: If a call is handled by a LAN, and billable information cannot be transported back to the billing switch, then the LAN records all of the billable information in a Billing Detail Record (BDR) and sends back a LAN sequence number to the switch. The LAN sequence number is recorded in A1–A16 with the remaining bytes containing TBCD-Null. |
| | Word 14, bits 8–11 A1 X |
| | Word 14, bits 12–15 A2 X |
| | Word 15, bits 0–3 A3 X |
| | Word 15, bits 4–7 A4 X |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 X |
| | Word 17, bits 4–7 A12 X |
| | Word 17, bits 8–11 A13 X |
| | Word 17, bits 12–15 A14 X |
| | Word 18, bits 0–3 A15 X |
| | Word 18, bits 4–7 A16 X |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | 16. DNIS: The DNIS may be recorded as received from the SS7 generic address parameter, such as with EVS/NARS processed calls. |
| | Word 14, bits 8–11 A1 N |
| | Word 14, bits 12–15 A2 X |
| | Word 15, bits 0–3 A3 X |
| | Word 15, bits 4–7 A4 N |
| | Word 15, bits 8–11 A5 X |
| | Word 15, bits 12–15 A6 X |
| | Word 16, bits 0–3 A7 X |
| | Word 16, bits 4–7 A8 X |
| | Word 16, bits 8–11 A9 X |
| | Word 16, bits 12–15 A10 X |
| | Word 17, bits 0–3 A11 TBCD-Null |
| | Word 17, bits 4–7 A12 TBCD-Null |
| | Word 17, bits 8–11 A13 TBCD-Null |
| | Word 17, bits 12–15 A14 TBCD-Null |
| | Word 18, bits 0–3 A15 TBCD-Null |
| | Word 18, bits 4–7 A16 TBCD-Null |
| | Word 18, bits 8–11 A17 TBCD-Null |
| | Word 18, bits 12–15 A18 TBCD-Null |
| | Word 19, bits 0–3 A19 TBCD-Null |
| | Word 19, bits 4–7 A20 TBCD-Null |
| | Word 19, bits 8–11 A21 TBCD-Null |
| | Word 19, bits 12–15 A22 TBCD-Null |
| | 17. Network Call Identifier (NCID): If the NCID is recorded in the "A" field, it is recorded in binary beginning with A1. The entry code will indicate the call processing associated with the particular call or '0.' If the NCID is recorded in the NCID field a 64-word call record, the entry code will also indicate the call processing associated with the particular call or '0.' The NCID comprises the following: |
| | Originating Switch ID |
| | Originating Trunk Group |
| | Originating Port Number |
| | Timepoint 1 |
| | NCID Sequence Number |
| Word 20, bits 0–15<br>Word 21, bits 0–15<br>Word 22, bits 0–15 | Destination Address: This is the seventeen digits of the destination address which is the domestic or international number being called, or an operator number format. In the POSR, if the dialed |

APPENDIX-continued

| Word #, Bit # | Description |
|---|---|
| Word 23, bits 0–15<br>Word 24, bits 0–3 | number was translated by the NCS/DAP or LAN, the translated number will be recorded. If more than 17 digits is required, use EOSR/EPOSR format. Unused bytes contain TBCD-Null. |

| | | 7-digit | 10-digit | DDD | IDDD |
|---|---|---|---|---|---|
| Word 20, bits 0–3 | D1 | N | N | N | CC |
| Word 20, bits 4–7 | D2 | X | X | X | CC |
| Word 20, bits 8–11 | D3 | X | X | X | CC |
| Word 20, bits 12–15 | D4 | X | N | N | NN |
| Word 21, bits 0–3 | D5 | X | X | X | NN |
| Word 21, bits 4–7 | D6 | X | X | X | NN |
| Word 21, bits 8–11 | D7 | X | X | X | NN |
| Word 21, bits 12–15 | D8 | X(TSID) | X | X | NN |
| Word 22, bits 0–3 | D9 | X(TSID) | X | X | NN |
| Word 22, bits 4–7 | D10 | X(TSID) | X | X | NN |
| Word 22, bits 8–11 | D11 | X(TTG) | X(TSID) | T-Null | NN |
| Word 22, bits 12–15 | D12 | X(TTG) | X(TSID) | T-Null | NN |
| Word 23, bits 0–3 | D13 | X(TTG) | X(TSID) | T-Null | NN |
| Word 23, bits 4–7 | D14 | X(TTG) | X(TTG) | T-Null | NN |
| Word 23, bits 8–11 | D15 | T-Null | X(TTG) | T-Null | NN |
| Word 23, bits 12–15 | D16 | T-Null | X(TTG) | T-Null | T-Null |
| Word 24, bits 0–3 | D17 | T-Null | X(TTG) | T-Null | T-Null |

CC = Customer Connect
NN = National Number
TSID = Terminating Switch ID
TTG = Terminating Trunk Group

| | | BOC Inward Dialing | Op-to-Op Domestic/ Int'l | Op-to-Op Manual Transit |
|---|---|---|---|---|
| Word 20, bits 0–3 | D1 | N | X(CC) | X(CC) |
| Word 20, bits 4–7 | D2 | 0/1 | X(CC) | X(CC) |
| Word 20, bits 8–11 | D3 | X | X(CC) | X(CC) |
| Word 20, bits 12–15 | D4 | X(ATC) | TBCD-Null | 1 |
| Word 21, bits 0–3 | D5 | X(ATC) | TBCD-Null | 6 |
| Word 21, bits 4–7 | D6 | X(ATC) | TBCD-Null | 0 |
| Word 21, bits 8–11 | D7 | X(S11) | TBCD-Null | TBCD-Null |
| Word 21, bits 12–15 | D8 | X(S12) | TBCD-Null | TBCD-Null |
| Word 22, bits 0–3 | D9 | X(S13) | TBCD-Null | TBCD-Null |
| Word 22, bits 4–7 | D10 | X(S14) | TBCD-Null | TBCD-Null |
| Word 22, bits 8–11 | D11 | X(S15) | TBCD-Null | TBCD-Null |
| Word 22, bits 12–15 | D12 | TBCD-Null | TBCD-Null | TBCD-Null |
| Word 23, bits 0–3 | D13 | TBCD-Null | TBCD-Null | TBCD-Null |
| Word 23, bits 4–7 | D14 | TBCD-Null | TBCD-Null | TBCD-Null |
| Word 23, bits 8–11 | D15 | TBCD-Null | TBCD-Null | TBCD-Null |
| Word 23, bits 12–15 | D16 | TBCD-Null | TBCD-Null | TBCD-Null |
| Word 24, bits 0–3 | D17 | TBCD-Null | TBCD-Null | TBCD-Null |

| Word #, Bit # | Description |
|---|---|
| Word 24, bits 4–15<br>Word 25, bits 0–1 | Operator ID Number (OPIN): Contains the operator id number of the operator that handled the call. |
| Word 25, bit 2 | Not Used. |
| Word 25, bits 3–15 | Timepoint 5 (TPS): A binary count of the number of seconds between the time TP1 occurred and the time that the operator stopped handling the call and releases the position. If the call is transferred to other operators, the value contained in this field shall express the release time of the last operator providing the service. |
| Word 26, bits 0–15 | Room Number (RN): Contains the last four digits of the Calling Station ID (CSI) when a call originates from a hotel, a university, or any other community identified by only a main telephone number. The CSI shall be obtained from the originating signalling information, or verbally by the operator who enters the information manually into the OSR. |
| Word 27, bits 0–3 | Feature Code (FC): The switch determines a feature code for the call which indicates whether a specific type of data line is required for the call such as a higher quality line for facsimile transmissions.<br>0 = Default<br>1 = FAX<br>2 = NARS<br>3 = Data Call<br>4 = Switched DSI (HSCS)<br>5 = Switched DS3 (HSCS)<br>6–8 = Not Used<br>9 = NX64<br>10 = Offnet Routing<br>11 = AAP Call (Used in Gateway Toll Ticket Conversion)<br>12 = Card Gate Denial |

APPENDIX-continued

| Word #, Bit # | Description |
|---|---|
| | 13 = Forum Dial out audio/video conference<br>14 = Concert Freephone<br>15 = Not Used |
| Word 27, bits 4–7 | Terminating Network Code (TNC): Indicates the terminating facilities to be used for the remainder of the path of the call. For example, an indicator for no satellite transmission.<br>0 = Default<br>1 = No Routing Restrictions<br>2 = Avoid Satellite<br>3 = Route via DS1<br>4 = Route via DS1 and avoid satellite<br>5 = Route via Protected Facilities Required<br>6 = Route via Protected Facilities Preferred<br>7–15 = Not Used |
| Word 27, bits 8–11 | Network Access Type (NAT): Indicates which type of network access was used as defined at the originating switch on the network; that is, how the caller gained access to the network. The types of access are:<br>0 = Default<br>1 = 800 call<br>2 = Credit Card Access<br>3 = Operator Assistance Access<br>4 = VNET Remote Access<br>5 = Billed party preference (BPP) Access<br>6 = FGD Cut-Through Access<br>7–15 = Not Used |
| Word 27, bits 12–15 | Timepoint 7 Qualifier (TP7Q): Contains the call's first disconnect qualfier; that is, how the call was terminated. The types of disconnection are:<br>0 = Calling party disconnects<br>1 = Called party disconnects<br>2 = Calling party reorigination<br>3 = Switch initiated (ex. switch error cut off the call)<br>4 = All Routes Busy<br>5 = Disconnected due to a long ring; ring timer exceeded<br>6–15= Not Used |
| Word 28, bits 0–6 | Entry Code (EC): Indicates the type of call processing that took place and what type of information is recorded in the Authorization Code field. If more than one entry code is received, record the last one. The following codes are valid:<br>0 = Default<br>1 = Person-to-Person (P-P)<br>2 = Station-to-Station (S-S)<br>3 = Third Party Billing (3rd party number recorded)<br>4 = P-P collect (bill to called party)<br>5 = S-S collect (bill to called party)<br>6 = MCI card or VNet card (S-S)<br>7 = BOC inward dialing without call completion<br>8 = general assistance<br>9 = BOC/LEC card<br>10 = Presubscribed credit card<br>11 = PTT card<br>12 = Directory Assistance<br>13 = Commercial Credit Card<br>14 = BOC inward dialing with call completion<br>15 = MCI card or VNet card (P-P)<br>16–19 = Not Used<br>20 = ANI validation (screened pass/fail)<br>21 = Auth Validation (filed or dialed)<br>22 = Not Used<br>23 = 700 Service Access Code (overrides #20)<br>24 = 500, 800 Service Access Code (overrides #20)<br>25 = 900 Service Access Code (overrides #20)<br>26–28 = Not Used<br>29 = Operator Release Timer Expired<br>30 = EVS/NARS - Disconnect message referral (DMR) without referral<br>31 = EVS/NARS DMR with referral to MCI number<br>32 = EVS/NARS - DMR with referral to non-MCI number<br>33 = EVS/NARS - DMR with referral and call extension (CE) to MCI number<br>34 = EVS/NARS - DMR with referral and CE to non-MCI number<br>35 = EVS/NARS - Customized Message Announcement (CMA) with CE<br>36 = EVS/NARS - CMA without CE<br>37 = EVS/NARS - Enhanced Call Routing (ECR) |

APPENDIX-continued

| Word #, Bit # | Description |
|---|---|
| | 38–41 = EVS/NARS - Reserved<br>42–47 = Not Used<br>48 = GETS card<br>49 = Not Used<br>50 = Billed to international number<br>51 = Calling station ID information recorded<br>52 = Supplemental code only recorded<br>53 = VNet remote access number recorded<br>54 = SS7 calling party number recorded<br>55 = OSID and OTG recorded<br>56 = DNIS recorded<br>57 = Business group ID recorded<br>58 = Network information recorded<br>59 = BG + Null + OSID/OTG<br>60 = Card Number + Null + OSID/OTG<br>61 = VNet RA + Null + OSID/OTG<br>62 = VNet RA + Null + OSID/OTG<br>63 = Network Call Transfer (NCT)<br>64–79 = Reserved<br>80–89 = Reserved<br>90–99 = Reserved<br>100 = 18C It's Me PIN S/S<br>101 = 18C It's Me Global S/S<br>102 = 18C It's Me ANI S/S<br>103 = 18C It's Me NPA S/S<br>104 = 18C Messenger S/S<br>105 = 18C Messenger PIN S/S<br>106 = 18C Messenger Global S/S<br>107 = 18C BOC Card S/S<br>108 = 18C MCI Card S/S<br>109 = Aos Messenger S/S<br>110 = International Messenger<br>111 = International Speed Dial<br>112–127 = Not Used |
| Word 28, bits 7–9 | Prefix Digits (PD): Represents the prefix digits of the called number. These digits tell the switch how to process the call.<br>0 = No prefix digits received<br>1 = 0 – (operator assisted)<br>2 = 0 + (domestic CDOS)<br>3 = 01 + (international CDOS)<br>4 = 01 1 + IDDD<br>5 = 1 + DDD<br>6 = 0 + operator assisted, subscriber address<br>7 = *XX where XX = 0–9, Star Card |
| Word 28, bits 10–12 | NDID (NCS/DAP ID): Indicates whether the switch processed the call or if one of the databases, such as NCS/DAP, was queried for information for services, including but not limited to, VNET, Calling Card, 800, and 900 calls. The NDID further indicates the ID of the NCS/DAP that was involved in the last transaction attempt.<br>0 = Switch call processing<br>1 = NCS/DAP 1<br>2 = NCS/DAP 2<br>3 = NCS/DAP 3<br>4–5 = Not Used<br>6 = Received from operator platform via RLT<br>7 = TCAP to NCS/DAP |
| Word 28, bits 13–15 | Division ID (DIVID): Contains the division ID for credit card calls, including the telecommunication system's card. The DIVID is received from the NCS/DAP for the card number validation. If no information is received by the switch, record the default value of '0'.<br>0 = No division ID specified<br>1 = Division ID1<br>2 = Division ID2<br>3 = Division ID3<br>4 = Division ID4<br>5 = Division ID5<br>6 = Division ID6<br>7 = Division ID7 |
| Word 29, bit 0 | Distant Overflow (DO): When set to 1 in the originating switch's call record, indicates that a direct termination overflow (DTO) transaction was attempted at an intermediate or terminating switch in order to get the final destination address digits for this call. |
| Word 29, bit 1 | Not Used. |
| Word 29, bit 2 | Customer Connect (CC): Indicates whether to use timepoint 6 or timepoint 3 to calculate the call duration. |

APPENDIX-continued

| Word #, Bit # | Description |
|---|---|
| | 0 = Use Time Point 6, *F to calculate the call duration<br>1 = Use Time Point 3, *C to calculate the call duration |
| Word 29, bit 3 | Inter-Network (IN): Indicates whether or not a call is originating from one customer/network and is terminating to a different customer/network. The default setting = 0; bit set to 1 if a business group or Netinfo parameter is received from the NCS/DAP. |
| Word 29, bit 4 | Not Used |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set "0" in all other cases. |
| Word 29, bit 6 | Call Direction (CD): Indicates whether the call originated in the domestic or international network.<br>0 = Call origination occurred in the Domestic Network<br>1 = Call origination occurred in the International Network |
| Word 29, bit 7 | Destination (DE): Indicates when a call is expected to terminate to an international destination.<br>0 = Default, NANP, Domestic VNet, or any other calls which are not expected to terminate to an international destination<br>1 = Calls expected to terminate to an international destination |
| Word 29, bit 8 | Dedicated Termination (DT): Indicates that a 10-digit shared network number was completed to a dedicated destination. If the terminating trunk Class (TTC) in the call record is equal to 3 or 7, then it is considered to be a direct termination trunk. |
| Word 29, bit 9 | Person-to-Person (PP): This bit is set to 1 if the operator authorizes a person-to-person call. This bit is used in combination with the entry codes to determine the nature of the call. |
| Word 29, bit 10 | Transferred Bit (XB): This bit is set to 1 if the call has been transferred from one operator position or ARU to another. |
| Word 29, bit 11 | Satellite (SA): Indicates that a satellite circuit was involved in the call. The default setting is 0; bit set to 1 indicates that a satellite was involved in the call. The bit is set when the incoming trunk group is classmarked as satellite equipped, when the SAT digit on an incoming inband IMT call shows that a satellite circuit is involved in the connection, or when the SS7 Nature of Connection parameter indicates that a satellite trunk was previously used. This is used for trouble-shooting purposes, and not for billing. |
| Word 29, bits 12–15 | Nature Of Calling Location ID (NOCLI): A binary value that identifies what data is recorded in the Call Location ID. The Calling Location ID field will contain the information that is referenced in the NOCLI.<br>0 = Not Used<br>1 = ANI from Inbound trunk<br>2 = SS7 charge number<br>3 = SS7 calling party number<br>4 = original called number<br>5 = Pseudo ANI created at this switch<br>6 = CSI from originating trunk<br>7 = Filed NPA-NXX trunk group information plus CSI<br>8 = NNN + OSID + OTG or 00Y + OSID + OTG (N = TBCD-Null)<br>9 = Country Code + national number<br>10 = No CLI record<br>11 = Redirecting Number<br>12 = CLI received from Operator platform via RLT<br>13 = ANI of NCT Originator<br>14–15 = Not Used |
| Word 30, bits 0–15 | Carrier Number (CN): Represents the carrier number provided on FG-B or FG-D originations, or the carrier number received over an SS7 IMT. If only three digits are used, then they are recorded in CN2–CN4 and CN1 will contain a TBCD-Null. This field also contains the last four digits of the specific 800 number assigned to VISA cards (9595). It will also contain the last four digits of the MCI card access number regardless of the access facility. Examples of carrier numbers are: MCI = 222, ATT = 288, and Friends = 333. |

| | | FGB/FGD 3 digit CIC | FGB/D 4 digit CIC | visa card |
|---|---|---|---|---|
| Word 30, bits 0–3 | CN1 | Null | X | 9 |
| Word 30, bits 4–7 | CN2 | X | X | 5 |
| Word 30, bits 8–11 | CN3 | X | X | 9 |
| Word 30, bits 12–15 | CN4 | X | X | 5 |

APPENDIX-continued

| Word #, Bit # | Description |
|---|---|
| | |

| | | SS7 TNS | MCI card | VNet card |
|---|---|---|---|---|
| Word 30, bits 0–3 | CN1 | X | 1 | 1 |
| Word 30, bits 4–7 | CN2 | X | 0 | 1 |
| Word 30, bits 8–11 | CN3 | X | 2 | 1 |
| Word 30, bits 12–15 | CN4 | X | 2 | 1 |

| Word #, Bit # | Description |
|---|---|
| Word 31, bits 0–3 | Authorization Code ID Field (ACIF): Contains the Authorization Code Identification Field for recording a card number status. This field indicates whether the card number (calling card or credit card) is good or bad.<br>0 = Seven digit authcode file<br>1 = 1st or only five digit authcode file<br>2 = 2nd five digit file<br>3 = 3rd five digit file<br>4 = 4th five digit file<br>5 = 5th five digit file<br>6 = Six digit authcode file<br>7 = Range restriction failure (invalid address digits)<br>8 = Positive Commercial Credit Card/89 Card/M Card Validation<br>9 = Not Used<br>10 = MCI Card/Visa Card invalid or not assigned. Disallowed.<br>11 = BOC billing number assigned but blocked<br>12 = BOC billing number usage exceeded<br>13 = Not Used<br>14 = Default authorization of MCI Card/VISA Card if response timeout from NCS/DAP<br>15 = MCI Card/VISA Card authorized by NCS/DAP |
| Word 31, bits 4–10 | Release Code: Used with timepoint 7 qualifier to determine from which direction the release message came. The code indicates why one of the parties hung up, for example, normal release = 16, and no circuit available = 34.<br>1 = Unallocated number<br>2 = No route to specified network<br>3 = No route to destination<br>4 = Send special information tone<br>5 = Misdialed trunk prefix<br>16 = Normal clearing<br>17 = User Busy<br>18 = No user responding<br>19 = No user responding (user alerted)<br>21 = Call rejected<br>22 = Number changed<br>27 = Destination out of service<br>28 = Address incomplete<br>29 = Facility rejected<br>31 = Normal - unspecified<br>34 = No circuit available<br>38 = Network out of order<br>41 = Temporary failure<br>42 = Switching equipment congestion<br>44 = Requested channel not available<br>47 = Resource unavailable - unspecified<br>50 = Requested facility not subscribed<br>55 = Incoming calls barred within CUG<br>57 = Bearer capability not authorized<br>58 = Bearer capability not available<br>63 = Service or option not available<br>65 = Bearer capability not implemented<br>69 = Requested facility not implemented<br>70 = Only restricted digital information bearer capability is available<br>79 = Service or option not implemented<br>87 = Called user not member of CUG<br>88 = Incompatible destination<br>91 = Invalid transit network selector<br>95 = Invalid message - unspecified<br>97 = Message type non-existent or not implemented<br>99 = Parameter non-existent or not implemented - discarded<br>102 = Recovery on timer expired<br>103 = Parameter non-existent or not implemented - passed on<br>111 = Protocol error - unspecified<br>127 = Interworking - unspecified |
| Word 31, bits 11–13 | NCID Sequence Number: Represents the number of calls which have occurred on the same port number with the same Timepoint 1 value. The first call will have the sequence number set to '0'. This value will increase incrementally for each successive call |

APPENDIX-continued

| Word #, Bit # | Description |
|---|---|
| | which originates on the same port number which has the same Timepoint 1 value. Range = 0–7. |
| Word 31, bit 14 | NCID Location (NCIDLOC): This bit identifies when the NCID is recorded in the Authcode field of the call record. The NCID is recorded in the Authcode field of the call record at intermediate and terminating switches if the Authcode field is not being used to record other information. If the Authcode field is being used to record other information, the NCID is recorded in the "NCID" field of the 64 word call record.<br>0 = NCID is not recorded in the Authcode field (default)<br>1 = NCID is recorded in the Authcode field |
| Word 31, bit 15 | Remote ANI Screened (RS): This bit is set to '1' if the NPA of the ANI is not listed in the switch's Local-Service-Area table, and the ANI was sent to the DAP for ANI index screening purposes. This bit is set to '0' if the switch sent the ANI to the DAP for ANI index screening purposes and no response is received from the DAP or if normal switch ANI screening occurs.<br>0 = ANI was not screened by the DAP (default)<br>1 = ANI was screened by the DAP |
| Words 0–11, bits 0–15 | Same as OSR/POSR format. |
| Word 12, bits 0–15<br>Word 13, bits 0–15<br>Word 14, bits 0–15<br>Word 15, bits 0–11 | Calling Location ID: Contains 1–15 digits of the originating station line. This is the ANI number of the calling party. If 1 to 15 ANI or CSI digits are received, they are recorded in order starting with CLI1. Unused bytes contain TBCD-Null. If no ANI or CSI is available, record the OSID/OTG in CLI4-10, except where noted. If nothing is recorded in the CLI field, use a NOCLI value of 10. This field contains 1 of the following nine formats:<br>1. VNet CAMA DAL originations: If CSI is available, prefix the CSI with filed HNPA and HNXX information, if available; and record. Use NOCLI value of 7.<br>2. FG-C Originations: If ANI or CSI information is not available and the number is in the 00Y + NXX-XXXX format, record the 00Y code that was received in CLI1–3, and record the OSID/OTG in CLI4–10. Use NOCLI value of 8.<br>3. Inband FG-D Originations: Record the ANI that was received starting with CL1. Use NOCLI value of 1.<br>4. SS7 FG-D Originations: Record the charge number, if available. If the charge number is not available, record the calling party number. Use NOCLI value of 2 or 3.<br>5. International Originations: Record the country code and national number of the calling party. Use NOCLI value of 9.<br>6. SS7 IMTs Originations: Record the following information in this order of importance: 1) charge number, 2) calling party number, 3) OSID/OTG from generic digits. Use NOCLI value of 2, 3, or 8.<br>7. SS7 Reseller Originations: The CLI field will be filled with TBCD Nulls.<br>8. SS7 Private Network Originations: The CLI field will he filled with TBCD Nulls.<br>9. PRI Originations: Record the calling party number received in the ISDN setup message.<br>The format: |

| | | 1–15 digit ANI/CSI (13 digit example) | OSID/OTG | Incoming Int'l |
|---|---|---|---|---|
| Word 12, bits 0–3 | CLI1 | X | TBCD-Null | X(CC) |
| Word 12, bits 4–7 | CLI2 | X | TBCD-Null | X(CC) |
| Word 12, bits 8–11 | CLI3 | X | TBCD-Null | X(CC) |
| Word 12, bits 12–15 | CLI4 | X | X(OSID) | X(NN) |
| Word 13, bits 0–3 | CLI5 | X | X(OSID) | X(NN) |
| Word 13, bits 4–7 | CLI6 | X | X(OSD) | X(NN) |
| Word 13, bits 8–11 | CLI7 | X | X(OTG) | X(NN) |
| Word 13, bits 12–15 | CLI8 | X | X(OTG) | X(NN) |
| Word 14, bits 0–3 | CLI9 | X | X(OTG) | X(NN) |
| Word 14, bits 4–7 | CLI10 | X | X(OTG) | X(NN) |
| Word 14, bits 8–11 | CLI11 | X | TBCD-Null | X(NN) |
| Word 14, bits 12–15 | CLI12 | X | TBCD-Null | X(NN) |
| Word 15, bits 0–3 | CLI13 | X | TBCD-Null | X(NN) |
| Word 15, bits 4–7 | CLI14 | TBCD-Null | TBCD-Null | X(NN) |
| Word 15, bits 8–11 | CLI15 | TBCD-Null | TBCD-Null | X(NN) |

CC = Customer Connect
NN = National Number
OSID = Originating Switch ID
OTG = Originating Trunk Group

| | |
|---|---|
| Word 15, bits 12–15 | Authorization Code (Auth Code): Same as OSR/POSR format |

APPENDIX-continued

| Word #, Bit # | Description |
|---|---|
| Word 16, bits 0–15 | Auth Code, but represents 45 digits. |
| Word 17, bits 0–15 | |
| Word 18, bits 0–15 | |
| Word 19, bits 0–15 | |
| Word 20, bits 0–15 | |
| Word 21, bits 0–15 | |
| Word 22, bits 0–15 | |
| Word 23, bits 0–15 | |
| Word 24, bits 0–15 | |
| Word 25, bits 0–15 | |
| Word 26, bits 0–15 | |

1. Authorization Codes:

| | | 5 digit | 6 digit | 7 digit |
|---|---|---|---|---|
| Word 15, bits 12–15 | A1 | AUTHI | AUTHI | AUTH1 |
| Word 16, bits 0–3 | A2 | AUTH2 | AUTH2 | AUTH2 |
| Word 16, bits 4–7 | A3 | AUTH3 | AUTH3 | AUTH3 |
| Word 16, bits 8–11 | A4 | AUTH4 | AUTH4 | AUTH4 |
| Word 16, bits 12–15 | A5 | AUTH5 | AUTH5 | AUTH5 |
| Word 17, bits 0–3 | A6 | SEC1 | AUTH6 | AUTH6 |
| Word 17, bits 4–7 | A7 | SEC2 | SEC1 | AUTH7 |
| Word 17, bits 8–11 | A8 | SEC3 | SEC2 | SEC1 |
| Word 17, bits 12–15 | A9 | SEC4 | SEC3 | SEC2 |
| Word 18, bits 0–3 | A10 | T-Null | SEC4 | SEC3 |
| Word 18, bits 4–7 | A11 | SUPP1 | T-Null | SEC4 |
| Word 18, bits 8–11 | A12 | SUPP2 | SUPP1 | T-Null |
| Word 18, bits 12–15 | A13 | SUPP3 | SUPP2 | SUPP1 |
| Word 19, bits 0–3 | A14 | SUPP4 | SUPP3 | SUPP2 |
| Word 19, bits 4–7 | A15 | SUPP5 | SUPP4 | SUPP3 |
| Word 19, bits 8–11 | A16 | SUPP6 | SUPP5 | SUPP4 |
| Word 19, bits 12–15 | A17 | SUPP7 | SUPP6 | SUPP5 |
| Word 20, bits 0–3 | A18 | SUPP8 | SUPP7 | SUPP6 |
| Word 20, bits 4–7 | A19 | SUPP9 | SUPP8 | SUPP7 |
| Word 20, bits 8–11 | A20 | SUPP10 | SUPP9 | SUPP8 |
| Word 20, bits 12–15 | A21 | SUPP11 | SUPP10 | SUPP9 |
| Word 21, bits 0–3 | A22 | SUPP12 | SUPP11 | SUPP10 |
| Word 21, bits 4–7 | A23 | SUPP13 | SUPP12 | SUPP11 |
| Word 21, bits 8–11 | A24 | SUPP14 | SUPP13 | SUPP12 |
| Word 21, bits 12–15 | A25 | SUPP15 | SUPP14 | SUPP13 |
| Word 22, bits 0–3 | A26 | SUPP16 | SUPP15 | SUPP14 |
| Word 22, bits 4–7 | A27 | SUPP17 | SUPP16 | SUPP15 |
| Word 22, bits 8–11 | A28 | SUPP18 | SUPP17 | SUPP16 |
| Word 22, bits 12–15 | A29 | SUPP19 | SUPP18 | SUPP17 |
| Word 23, bits 0–3 | A30 | SUPP20 | SUPP19 | SUPP18 |
| Word 23, bits 4–7 | A31 | SUPP21 | SUPP20 | SUPP19 |
| Word 23, bits 8–11 | A32 | SUPP22 | SUPP21 | SUPP20 |
| Word 23, bits 12–15 | A33 | SUPP23 | SUPP22 | SUPP21 |
| Word 24, bits 0–3 | A34 | SUPP24 | SUPP23 | SUPP22 |
| Word 24, bits 4–7 | A35 | SUPP25 | SUPP24 | SUPP23 |
| Word 24, bits 8–1 | A36 | SUPP26 | SUPP25 | SUPP24 |
| Word 24, bits 12–15 | A37 | SUPP27 | SUPP26 | SUPP25 |
| Word 25, bits 0–3 | A38 | SUPP28 | SUPP27 | SUPP26 |
| Word 25, bits 4–7 | A39 | SUPP29 | SUPP28 | SUPP27 |
| Word 25, bits 8–11 | A40 | SUPP30 | SUPP29 | SUPP28 |
| Word 25, bits 12–15 | A41 | T-Null | SUPP30 | SUPP29 |
| Word 26, bits 0–3 | A42 | T-Null | T-Null | SUPP30 |
| Word 26, bits 4–7 | A43 | T-Null | T-Null | T-Null |
| Word 26, bits 8–11 | A44 | T-Null | T-Null | T-Null |
| Word 26, bits 12–15 | A45 | T-Null | T-Null | T-Null |

T-Null = TBCD-Null

2. Calling Station ID (CSI):

| | | 7 digit | 1–10 digit |
|---|---|---|---|
| Word 15, bits 12–15 | A1 | X | X |
| Word 16, bits 0–3 | A2 | X | X |
| Word 16, bits 4–7 | A3 | X | X |
| Word 16, bits 8–11 | A4 | X | X |
| Word 16, bits 12–15 | A5 | X | X |
| Word 17, bits 0–3 | A6 | X | X |
| Word 17, bits 4–7 | A7 | X | X |
| Word 17, bits 8–11 | A8 | TBCD-Null | X |
| Word 17, bits 12–15 | A9 | SUPP1 | X |
| Word 18, bits 0–3 | A10 | SUPP2 | X |
| Word 18, bits 4–7 | A11 | SUPP3 | TBCD-Null |
| Word, 18, bits 8–11 | A12 | SUPP4 | SUPP1 |
| Word 18, bits 12–15 | A13 | SUPP5 | SUPP2 |
| Word 19, bits 0–3 | A14 | SUPP6 | SUPP3 |
| Word 19, bits 4–7 | A15 | SUPP7 | SUPP4 |
| Word 19, bits 8–11 | A16 | SUPP8 | SUPP5 |
| Word 19, bits 12–15 | A17 | SUPP9 | SUPP6 |
| Word 20, bits 0–3 | A18 | SUPP10 | SUPP7 |
| Word 20, bits 4–7 | A19 | SUPP11 | SUPP8 |

APPENDIX-continued

| Word #, Bit # | Description | | | |
|---|---|---|---|---|
| | Word 20, bits 8–11 | A20 | SUPP12 | SUPP9 |
| | Word 20, bits 12–15 | A21 | SUPP13 | SUPP10 |
| | Word 21, bits 0–3 | A22 | SUPP14 | SUPP11 |
| | Word 21, bits 4–7 | A23 | SUPP15 | SUPP12 |
| | Word 21, bits 8–11 | A24 | SUPP16 | SUPP13 |
| | Word 21, bits 12–15 | A25 | SUPP17 | SUPP14 |
| | Word 22, bits 0–3 | A26 | SUPP18 | SUPP15 |
| | Word 22, bits 4–7 | A27 | SUPP19 | SUPP16 |
| | Word 22, bits 8–11 | A28 | SUPP20 | SUPP17 |
| | Word 22, bits 12–15 | A29 | SUPP21 | SUPP18 |
| | Word 23, bits 0–3 | A30 | SUPP22 | SUPP19 |
| | Word 23, bits 4–7 | A31 | SUPP23 | SUPP20 |
| | Word 23, bits 8–11 | A32 | SUPP24 | SUPP21 |
| | Word 23, bits 12–15 | A33 | SUPP25 | SUPP22 |
| | Word 24, bits 0–3 | A34 | SUPP26 | SUPP23 |
| | Word 24, bits 4–7 | A35 | SUPP27 | SUPP24 |
| | Word 24, bits 8–11 | A36 | SUPP28 | SUPP25 |
| | Word 24, bits 12–15 | A37 | SUPP29 | SUPP26 |
| | Word 25, bits 0–3 | A38 | SUPP30 | SUPP27 |
| | Word 25, bits 4–7 | A39 | TBCD-Null | SUPP28 |
| | Word 25, bits 8–11 | A40 | TBCD-Null | SUPP29 |
| | Word 25, bits 12–15 | A41 | TBCD-Null | SUPP30 |
| | Word 26, bits 0–3 | A42 | TBCD-Null | TBCD-Null |
| | Word 26, bits 4–7 | A43 | TBCD-Null | TBCD-Null |
| | Word 26, bits 8–11 | A44 | TBCD-Null | TBCD-Null |
| | Word 26, bits 12–15 | A45 | TBCD-Null | TBCD-Null |
| | 3. Supplemental Codes: | | | |
| | Word 15, bits 12–15 | A1 | SUPP1 | |
| | Word 16, bits 0–3 | A2 | SUPP2 | |
| | Word 16, bits 4–7 | A3 | SUPP3 | |
| | Word 16, bits 8–11 | A4 | SUPP4 | |
| | Word 16, bits 12–15 | A5 | SUPP5 | |
| | Word 17, bits 0–3 | A6 | SUPP6 | |
| | Word 17, bits 4–7 | A7 | SUPP7 | |
| | Word 17, bits 8–11 | A8 | SUPP8 | |
| | Word 17, bits 12–15 | A9 | SUPP9 | |
| | Word 18, bits 0–3 | A10 | SUPP10 | |
| | Word 18, bits 4–7 | A11 | SUPP11 | |
| | Word 18, bits 8–11 | A12 | SUPP12 | |
| | Word 18, bits 12–15 | A13 | SUPP13 | |
| | Word 19, bits 0–3 | A14 | SUPP14 | |
| | Word 19, bits 4–7 | A15 | SUPP15 | |
| | Word 19, bits 8–11 | A16 | SUPP16 | |
| | Word 19, bits 12–15 | A17 | SUPP17 | |
| | Word 20, bits 0–3 | A18 | SUPP18 | |
| | Word 20, bits 4–7 | A19 | SUPP19 | |
| | Word 20, bits 8–11 | A20 | SUPP20 | |
| | Word 20, bits 12–15 | A21 | SUPP21 | |
| | Word 21, bits 0–3 | A22 | SUPP22 | |
| | Word 21, bits 4–7 | A23 | SUPP23 | |
| | Word 21, bits 8–11 | A24 | SUPP24 | |
| | Word 21, bits 12–15 | A25 | SUPP25 | |
| | Word 22, bits 0–3 | A26 | SUPP26 | |
| | Word 22, bits 4–7 | A27 | SUPP27 | |
| | Word 22, bits 8–11 | A28 | SUPP28 | |
| | Word 22, bits 12–15 | A29 | SUPP29 | |
| | Word 23, bits 0–3 | A30 | TBCD-Null | |
| | Word 23, bits 4–7 | A31 | TBCD-Null | |
| | Word 23, bits 8–11 | A32 | TBCD-Null | |
| | Word 23, bits 12–15 | A33 | TBCD-Null | |
| | Word 24, bits 0–3 | A34 | TBCD-Null | |
| | Word 24, bits 4–7 | A35 | TBCD-Null | |
| | Word 24, bits 8–11 | A36 | TBCD-Null | |
| | Word 24, bits 12–15 | A37 | TBCD-Null | |
| | Word 25, bits 0–3 | A38 | TBCD-Null | |
| | Word 25, bits 4–7 | A39 | TBCD-Null | |
| | Word 25, bits 8–11 | A40 | TBCD-Null | |
| | Word 25, bits 12–15 | A41 | TBCD-Null | |
| | Word 26, bits 0–3 | A42 | TBCD-Null | |
| | Word 26, bits 4–7 | A43 | TBCD-Null | |
| | Word 26, bits 8–11 | A44 | TBCD-Null | |
| | Word 26, bits 12–15 | A45 | TBCD-Null | |
| | 4. VNet Remote Access and Calling Party Number: | | | |
| | Word 15, bits 12–15 | A1 | N | |
| | Word 16, bits 0–3 | A2 | X | |

APPENDIX-continued

| Word #, Bit # | Description | | |
|---|---|---|---|
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | SUPP1 |
| | Word 18, bits 12–15 | A13 | SUPP2 |
| | Word 19, bits 0–3 | A14 | SUPP3 |
| | Word 19, bits 4–7 | A15 | SUPP4 |
| | Word 19, bits 8–11 | A16 | SUPP5 |
| | Word 19, bits 12–15 | A17 | SUPP6 |
| | Word 20, bits 0–3 | A18 | SUPP7 |
| | Word 20, bits 4–7 | A19 | SUPP8 |
| | Word 20, bits 8–11 | A20 | SUPP9 |
| | Word 20, bits 12–15 | A21 | SUPP10 |
| | Word 21, bits 0–3 | A22 | SUPP11 |
| | Word 21, bits 4–7 | A23 | SUPP12 |
| | Word 21, bits 8–11 | A24 | SUPP13 |
| | Word 21, bits 12–15 | A25 | SUPP14 |
| | Word 22, bits 0–3 | A26 | SUPP15 |
| | Word 22, bits 4–7 | A27 | SUPP16 |
| | Word 22, bits 8–11 | A28 | SUPP17 |
| | Word 22, bits 12–15 | A29 | SUPP18 |
| | Word 23, bits 0–3 | A30 | SUPP19 |
| | Word 23, bits 4–7 | A31 | SUPP20 |
| | Word 23, bits 8–11 | A32 | SUPP21 |
| | Word 23, bits 12–15 | A33 | SUPP22 |
| | Word 24, bits 0–3 | A34 | SUPP23 |
| | Word 24, bits 4–7 | A35 | SUPP24 |
| | Word 24, bits 8–11 | A36 | SUPP25 |
| | Word 24, bits 12–15 | A37 | SUPP26 |
| | Word 25, bits 0–3 | A38 | SUPP27 |
| | Word 25, bits 4–7 | A39 | SUPP28 |
| | Word 25, bits 8–11 | A40 | SUPP29 |
| | Word 25, bits 12–15 | A41 | SUPP30 |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 5. Calling Party Number: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | SUPP1 |
| | Word 18, bits 12–15 | A13 | SUPP2 |
| | Word 19, bits 0–3 | A14 | SUPP3 |
| | Word 19, bits 4–7 | A15 | SUPP4 |
| | Word 19, bits 8–11 | A16 | SUPP5 |
| | Word 19, bits 12–15 | A17 | SUPP6 |
| | Word 20, bits 0–3 | A18 | SUPP7 |
| | Word 20, bits 4–7 | A19 | SUPP8 |
| | Word 20, bits 8–11 | A20 | SUPP9 |
| | Word 20, bits 12–15 | A21 | SUPP10 |
| | Word 21, bits 0–3 | A22 | SUPP11 |
| | Word 21, bits 4–7 | A23 | SUPP12 |
| | Word 21, bits 8–11 | A24 | SUPP13 |
| | Word 21, bits 12–15 | A25 | SUPP14 |
| | Word 22, bits 0–3 | A26 | SUPP15 |
| | Word 22, bits 4–7 | A27 | SUPP16 |
| | Word 22, bits 8–11 | A28 | SUPP17 |
| | Word 22, bits 12–15 | A29 | SUPP18 |
| | Word 23, bits 0–3 | A30 | SUPP19 |
| | Word 23, bits 4–7 | A31 | SUPP20 |
| | Word 23, bits 8–11 | A32 | SUPP21 |

APPENDIX-continued

| Word #, Bit # | Description | | |
|---|---|---|---|
| | Word 23, bits 12–15 | A33 | SUPP22 |
| | Word 24, bits 0–3 | A34 | SUPP23 |
| | Word 24, bits 4–7 | A35 | SUPP24 |
| | Word 24, bits 8–11 | A36 | SUPP25 |
| | Word 24, bits 12–15 | A37 | SUPP26 |
| | Word 25, bits 0–3 | A35 | SUPP27 |
| | Word 25, bits 4–7 | A39 | SUPP28 |
| | Word 25, bits 8–11 | A40 | SUPP29 |
| | Word 25, bits 12–15 | A41 | SUPP30 |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 6. Credit Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | X |
| | Word 19, bits 0–3 | A14 | X |
| | Word 19, bits 4–7 | A15 | X |
| | Word 19, bhs 8–11 | A16 | X |
| | Word 19, bits 12–15 | A17 | X |
| | Word 20, bits 0–3 | A18 | X |
| | Word 20, bits 4–7 | A19 | X |
| | Word 20, bits 8–11 | A20 | TBCD-Null |
| | Word 20, bits 12–15 | A21 | SUPP1 |
| | Word 21, bits 0–3 | A22 | SUPP2 |
| | Word 21, bits 4–7 | A23 | SUPP3 |
| | Word 21, bits 8–11 | A24 | SUPP4 |
| | Word 21, bits 12–15 | A25 | SUPP5 |
| | Word 22, bits 0–3 | A26 | SUPP6 |
| | Word 22, bits 4–7 | A27 | SUPP7 |
| | Word 22, bits 8–11 | A28 | SUPP8 |
| | Word 22, bits 12–15 | A29 | SUPP9 |
| | Word 23, bits 0–3 | A30 | SUPP10 |
| | Word 23, bits 4–7 | A31 | SUPP11 |
| | Word 23, bits 8–11 | A32 | SUPP12 |
| | Word 23, bits 12–15 | A33 | SUPP13 |
| | Word 24, bits 0–3 | A34 | SUPP14 |
| | Word 24, bits 4–7 | A35 | SUPP15 |
| | Word 24, bits 8–11 | A36 | SUPP16 |
| | Word 24, bits 12–15 | A37 | SUPP17 |
| | Word 25, bits 0–3 | A38 | SUPP18 |
| | Word 25, bits 4–7 | A39 | SUPP19 |
| | Word 25, bits 8–l 1 | A40 | SUPP20 |
| | Word 25, bits 12–15 | A41 | SUPP21 |
| | Word 26, bits 0–3 | A42 | SUPP22 |
| | Word 26, bits 4–7 | A43 | SUPP23 |
| | Word 26, bits 84 1 | A44 | SUPP24 |
| | Word 26, bits 12–15 | A45 | SUPP25 |
| | 7. 14 Digit MCI/VNet Calling Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-A |
| | Word 18, bits 8–11 | A12 | TBCD-A |
| | Word 18, bits 12–15 | A13 | TBCD-A |
| | Word 19, bits 0–3 | A14 | TBCD-A |
| | Word 19, bits 4–7 | A15 | TBCD-Null |

APPENDIX-continued

| Word #, Bit # | Description | | |
|---|---|---|---|
| | Word 19, bits 8–11 | A16 | SUPP1 |
| | Word 19, bits 12–15 | A17 | SUPP2 |
| | Word 20, bits 0–3 | A18 | SUPP3 |
| | Word 20, bits 4–7 | A19 | SUPP4 |
| | Word 20, bits 8–11 | A20 | SUPP5 |
| | Word 20, bits 12–15 | A21 | SUPP6 |
| | Word 21, bits 0–3 | A22 | SUPP7 |
| | Word 21, bits 4–7 | A23 | SUPP8 |
| | Word 21, bits 8–11 | A24 | SUPP9 |
| | Word 21, bits 12–15 | A25 | SUPP10 |
| | Word 22, bits 0–3 | A26 | SUPP11 |
| | Word 22, bits 4–7 | A27 | SUPP12 |
| | Word 22, bits 8–11 | A28 | SUPP13 |
| | Word 22, bits 12–15 | A29 | SUPP14 |
| | Word 23, bits 0–3 | A30 | SUPP15 |
| | Word 23, bits 4–7 | A31 | SUPP16 |
| | Word 23, bits 8–11 | A32 | SUPP17 |
| | Word 23, bits 12–15 | A33 | SUPP18 |
| | Word 24, bits 0–3 | A34 | SUPP19 |
| | Word 24, bits 4–7 | A35 | SUPP20 |
| | Word 24, bits 8–11 | A36 | SUPP21 |
| | Word 24, bits 12–15 | A37 | SUPP22 |
| | Word 25, bits 0–3 | A38 | SUPP23 |
| | Word 25, bits 4–7 | A39 | SUPP24 |
| | Word 25, bits 8–11 | A40 | SUPP25 |
| | Word 25, bits 12–15 | A41 | SUPP26 |
| | Word 26, bits 0–3 | A42 | SUPP27 |
| | Word 26, bits 4–7 | A43 | SUPP28 |
| | Word 26, bits 8–11 | A44 | SUPP29 |
| | Word 26, bits 12–15 | A45 | SUPP30 |
| | 8. OSID/OTG: | | |
| | Word 15, bits 12–15 | A1 | X (OSID) |
| | Word 16, bits 0–3 | A2 | X (OSID) |
| | Word 16, bits 4–7 | A3 | X (OSID) |
| | Word 16, bits 8–11 | A4 | X (OTG) |
| | Word 16, bits 12–15 | A5 | X (OTG) |
| | Word 17, bits 0–3 | A6 | X (OTG) |
| | Word 17, bits 4–7 | A7 | X (OTG) |
| | Word 17, bits 8–11 | A8 | TBCD-Null |
| | W6rd 17, bits 12–15 | A9 | TBCD-Null |
| | Word 18, bits 0–3 | A10 | TBCD-Null |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits #2–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |

APPENDIX-continued

| Word #, Bit # | Description | | |
|---|---|---|---|
| | OSID = Originating Switch ID (000–999) | | |
| | OTG = Originating Trunk: ID (0000–8191) | | |
| | 9. Telecommunication/PTT Cards: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | X |
| | Word 19, bits 0–3 | A14 | X |
| | Word 19, bits 4–7 | A15 | X |
| | Word 19, bits 8–11 | A16 | X |
| | Word 19, bits 12–15 | A17 | X |
| | Word 20, bits 0–3 | A18 | X |
| | Word 20, bits 4–7 | A19 | X |
| | Word 20, bits 8–11 | A20 | X |
| | Word 20, bits 12–15 | A21 | X |
| | Word 21, bits 0–3 | A22 | X |
| | Word 21, bits 4–7 | A23 | X |
| | Word 21, bits 8–11 | A24 | TBCD-Null |
| | Word 21, bits 12–15 | A25 | SUPP1 |
| | Word 22, bits 0–3 | A26 | SUPP2 |
| | Word 22, bits 4–7 | A27 | SUPP3 |
| | Word 22, bits 8–11 | A28 | SUPP4 |
| | Word 22, bits 12–15 | A29 | SUPP5 |
| | Word 23, bits 0–3 | A30 | SUPP6 |
| | Word 23, bits 4–7 | A31 | SUPP7 |
| | Word 23, bits 8–11 | A32 | SUPP8 |
| | Word 23, bits 12–15 | A33 | SUPP9 |
| | Word 24, bits 0–3 | A34 | SUPP10 |
| | Word 24, bits 4–7 | A35 | SUPP11 |
| | Word 24, bits 8–11 | A36 | SUPP12 |
| | Word 24, bits 12–15 | A37 | SUPP13 |
| | Word 25, bits 0–3 | A38 | SUPP14 |
| | Word 25, bits 4–7 | A39 | SUPP15 |
| | Word 25, bits 8–11 | A40 | SUPP16 |
| | Word 25, bits 12–15 | A41 | SUPP17 |
| | Word 26, bits 0–3 | A42 | SUPP18 |
| | Word 26, bits 4–7 | A43 | SUPP19 |
| | Word 26, bits 8–11 | A44 | SUPP20 |
| | Word 26, bits 12–15 | A45 | SUPP21 |
| | 10. Business Group ID: | | |
| | Word 15, bits 12–15 | A1 | X |
| | Word 16, bits 0–3 | A2 | X |
| | Word 15, bits 4–7 | A3 | X |
| | Word 15, bits 8–11 | A4 | X |
| | Word 16, bits 12–15 | A5 | X |
| | Word 17, bits 0–3 | A6 | X |
| | Word 17, bits 4–7 | A7 | TBCD-Null |
| | Word 17, bits 8–11 | A8 | SUPP1 |
| | Word 17, bits 12–15 | A9 | SUPP2 |
| | Word 18, bits 0–3 | A10 | SUPP3 |
| | Word 18, bits 4–7 | A11 | SUPP4 |
| | Word 18, bits 8–11 | A12 | SUPP5 |
| | Word 18, bits 12–15 | A13 | SUPP6 |
| | Word 19, bits 0–3 | A14 | SUPP7 |
| | Word 19, bits 4–7 | A15 | SUPP8 |
| | Word 19, bits 8–11 | A16 | SUPP9 |
| | Word 19, bits 12–15 | A17 | SUPP10 |
| | Word 20, bits 0–3 | A18 | SUPP11 |
| | Word 20, bits 4–7 | A19 | SUPP12 |
| | Word 20, bits 8–11 | A20 | SUPP13 |
| | Word 20, bits 12–15 | A21 | SUPP14 |
| | Word 21, bits 0–3 | A22 | SUPP15 |
| | Word 21, bits 4–7 | A23 | SUPP16 |
| | Word 21, bits 8–11 | A24 | SUPP17 |
| | Word 21, bits 12–15 | A25 | SUPP18 |
| | Word 22, bits 0–3 | A26 | SUPP19 |

APPENDIX-continued

| Word #, Bit # | Description | | |
|---|---|---|---|
| | Word 22, bits 4–7 | A27 | SUPP20 |
| | Word 22, bits 8–11 | A28 | SUPP21 |
| | Word 22, bits 12–15 | A29 | SUPP22 |
| | Word 23, bits 0–3 | A30 | SUPP23 |
| | Word 23, bits 4–7 | A31 | SUPP24 |
| | Word 23, bits 8–11 | A32 | SUPP25 |
| | Word 23, bits 12–15 | A33 | SUPP26 |
| | Word 24, bits 0–3 | A34 | SUPP27 |
| | Word 24, bits 4–7 | A35 | SUPP28 |
| | Word 24, bits 8–11 | A36 | SUPP29 |
| | Word 24, bits 12–15 | A37 | SUPP30 |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 11. Network Information: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | TBCD-NUl1 |
| | Word 17, bits 0–3 | A6 | SUPP1 |
| | Word 17, bits 4–7 | A7 | SUPP2 |
| | Word 17, bits 8–11 | A8 | SUPP3 |
| | Word 17, bits 12–15 | A9 | SUPP4 |
| | Word 18, bits 0–3 | A10 | SUPP5 |
| | Word 18, bits 4–7 | A11 | SUPP6 |
| | Word 18, bits 8–11 | A12 | SUPP7 |
| | Word 18, bits 12–15 | A13 | SUPP8 |
| | Word 19, bits 0–3 | A14 | SUPP9 |
| | Word 19, bits 4–7 | A15 | SUPP10 |
| | Word 19, bits 8–11 | A16 | SUPP11 |
| | Word 19, bits 12–15 | A17 | SUPP12 |
| | Word 20, bits 0–3 | A18 | SUPP13 |
| | Word 20, bits 4–7 | A19 | SUPP14 |
| | Word 20, bits 8–11 | A20 | SUPP15 |
| | Word 20, bits 12–15 | A21 | SUPP16 |
| | Word 21, bits 0–3 | A22 | SUPP17 |
| | Word 21, bits 4–7 | A23 | SUPP18 |
| | Word 21, bits 8–11 | A24 | SUPP19 |
| | Word 21, bits 12–15 | A25 | SUPP20 |
| | Word 22, bits 0–3 | A26 | SUPP21 |
| | Word 22, bits 4–7 | A27 | SUPP22 |
| | Word 22, bits 8–11 | A28 | SUPP23 |
| | Word 22, bits 12–15 | A29 | SUPP24 |
| | Word 23, bits 0–3 | A30 | SUPP25 |
| | Word 23, bits 4–7 | A31 | SUPP26 |
| | Word 23, bits 8–11 | A32 | SUPP27 |
| | Word 23, bits 12–15 | A33 | SUPP28 |
| | Word 24, bits 0–3 | A34 | SUPP29 |
| | Word 24, bits 4–7 | A35 | SUPP30 |
| | Word 24, bits 8–11 | A36 | TBCD-Null |
| | Word 24, bits 12–15 | A37 | TBCD-Null |
| | Word 25, bits 0–3 | A38 | TBCD-NULL |
| | Word 25, bits 4–7 | A39 | TBCD-NUll |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 12. BOC/LEC Card: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |

APPENDIX-continued

| Word #, Bit # | Description | | |
|---|---|---|---|
| | Word 18, bits 0–3 | A10 | X |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 13. Third Party Number: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-NUI1 |

APPENDIX-continued

| Word #, Bit # | Description | | |
|---|---|---|---|
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 14. International Number: | | |
| | Word 15, bits 12–15 | A1 | X(CC) |
| | Word 16, bits 0–3 | A2 | X(CC) |
| | Word 16, bits 4–7 | A3 | X(CC) |
| | Word 16, bits 8–11 | A4 | X(NN) |
| | Word 16, bits 12–15 | A5 | X(NN) |
| | Word 17, bits 0–3 | A6 | X(NN) |
| | Word 17, bits 4–7 | A7 | X(NN) |
| | Word 17, bits 8–11 | A8 | X(NN) |
| | Word 17, bits 12–15 | A9 | X(NN) |
| | Word 18, bits 0–3 | A10 | X(NN) |
| | Word 18, bits 4–7 | A11 | X(NN) |
| | Word 18, bits 8–11 | A12 | X(NN) |
| | Word 18, bits 12–15 | A13 | X(NN) |
| | Word 19, bits 0–3 | A14 | X(NN) |
| | Word 19, bits 4–7 | A15 | X(NN) |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | CC = Customer Connect | | |
| | NN = National Number | | |
| | 15. LAN Sequence Number: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |

APPENDIX-continued

| Word #, Bit # | Description | | |
|---|---|---|---|
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 16. DNIS: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 17. Network Call Identifier (NCID): If the NCID is recorded in the "A" field, it is recorded in binary beginning with A1. The entry code will indicate the call processing associated with the particular call or '0.' If the NCID is recorded in the NCID field of a 64-word call record, the entry code will also indicate the call | | |

APPENDIX-continued

| Word #, Bit # | Description |
|---|---|
| | processing associated with the particular call or '0.' The NCID comprises the following:<br>Originating Switch ID<br>Originating Trunk Group<br>Originating Port Number<br>Timepoint 1<br>NCID Sequence Number |
| Word 27, bits 0–3 | Feature Code (FC): Same as OSR/POSR format. |
| Word 27, bits 4–7 | Terminating Network Code (TNC): Same as OSR/POSR format. |
| Word 27, bits 8–11 | Network Access Type (NAT): Same as OSR/POSR format. |
| Word 27, bits 12–15 | Timepoint 7 Qualifier (TP&Q): Same as OSR/POSR format. |
| Word 28, bits 0–6 | Entry Code (EC): Same as OSR/POSR format. |
| Word 28, bits 7–9 | Prefix Digits (PD): Same as OSR/POSR format |
| Word 28, bits 10–12 | NCS/DAP ID (NDID): Same as OSR/POSR format. |
| Word 28, bits 13–15 | Division ID (DIVID): Same as OSR/POSR format. |
| Word 29, bits 0 | Distant Overflow (DO): Same as OSR/POSR format. |
| Word 29, bit 1 | MCI Network Overflow (MNO): Same as OSR/POSR format. |
| Word 29, bit 2 | Customer Connect (CC): Same as OSR/POSR format. |
| Word 29, bit 3 | Inter-Network (IN): Same as OSR/POSR format. |
| Word 29, bit 4 | Not Used |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set to "0" in all other cases. |
| Word 29, bit 6 | Call Direction (CD): Same as OSR/POSR format. |
| Word 29, bit 7 | Destination (DE): Same as OSR/POSR format. |
| Word 29, bit 8 | Dedicated Termination (DT): Same as OSR/POSR format. |
| Word 29, bit 9 | Person-to-Person (PO): Same as OSR/POSR format. |
| Word 29, bit 10 | Transferred Bit (XB): Same as OSR/POSR format. |
| Word 29, bit 11 | Satellite (SA): Same as OSR/POSR format. |
| Word 29, bits 12–15 | Nature of Calling Location ID (NOCLI): Same as OSR/POSR format. |
| Word 30, bits 0–15 | Carrier Number (CN): Same as OSR/POSR format. |
| Word 3 1, bits 0–3 | Authorization Code ID (ACIF): Same as OSR/POSR format. |
| Word 31, bits 4–10 | Release Code (RC): Same as OSR/POSR format. |
| Word 31, bits 11–13 | NCID Sequence Number: Same as OSR/POSR format. |
| Word 31, bit 14 | NCID Location (NCIDLOC): Same as OSR/POSR format. |
| Word 31, bit 15 | Remote ANI Screened (RS): Same as OSR/POSR format. |
| Word 32, bits 0–15<br>Word 33, bits 0–15 | Time & Changes Guest Name (T&C Guest): Records the Time and Charges guest name that will be passed back to the switch from the operator service platform for the time and charges feature. The information is recorded as ASCII characters starting with the first character in word 32, bits 0–7. |
| Word 34, bits 0–15<br>Word 35, bits 0–15<br>Word 36, bits 0–15<br>Word 37, bits 0–15<br>Word 38, bits 0–15<br>Word 39, bits 0–15<br>Word 40, bits 0–3 | Destination Address (DA): Records up to 25 digits of the destination address in TBCD format in the sequence that they are received or translated to, starting with D1. Unused bytes contain TBCD-Null. |

| | | 7-digit | 10-digit | DDD | IDDD |
|---|---|---|---|---|---|
| Word 34, bits 0–3 | D1 | N | N | N | CC |
| Word 34, bits 4–7 | D2 | X | X | X | CC |
| Word 34, bits 8–11 | D3 | X | X | X | CC |
| Word 34, bits 12–15 | D4 | X | N | N | NN |
| Word 35, bits 0–3 | D5 | X | X | X | NN |
| Word 35, bits 4–7 | D6 | X | X | X | NN |
| Word 35, bits 8–11 | D7 | X | X | X | NN |
| Word 35, bits 12–15 | D8 | X(TSID) | X | X | NN |
| Word 36, bits 0–3 | D9 | X(TSID) | X | X | NN |
| Word 36, bits 4–7 | D10 | X(TSID) | X | X | NN |
| Word 36, bits 8–11 | D11 | X(TTG) | X(TSID) | T-Null | NN |
| Word 36, bits 12–15 | D12 | X(TTG) | X(TSID) | T-Null | NN |
| Word 37, bits 0–3 | D13 | X(TTG) | X(TSID) | T-Null | NN |
| Word 37, bits 4–7 | D14 | X(TTG) | X(TTG) | T-Null | NN |
| Word 37, bits 8–11 | D15 | T-Null | X(TTG) | T-Null | NN |
| Word 37, bits 12–15 | D16 | T-Null | X(TTG) | T-Null | T-Null |
| Word 38, bits 0–3 | D17 | T-Null | X(TTG) | T-Null | T-Null |
| Word 38, bits 4–7 | D18 | T-Null | T-Null | T-Null | T-Null |
| Word 38, bits 8–11 | D19 | T-Null | T-Null | T-Null | T-Null |
| Word 38, bits 12–15 | D20 | T-Null | T-Null | T-Null | T-Null |
| Word 39, bits 0–3 | D21 | T-Null | T-Null | T-Null | T-Null |
| Word 39, bits 4–7 | D22 | T-Null | T-Null | T-Null | T-Null |
| Word 39, bits 8–11 | D23 | T-Null | T-Null | T-Null | T-Null |
| Word 39, bits 12–15 | D24 | T-Null | T-Null | T-Null | T-Null |
| Word 40, bits 0–3 | D25 | T-Null | T-Null | T-Null | T-Null |

APPENDIX-continued

| Word #, Bit # | Description |
|---|---|
| | CC = Customer Connect<br>NN = National Number<br>TSID = Terminating Switch ID<br>TTG = Terminating Trunk ID<br>T-Null = TBCD-Null |

| | | 18-digit |
|---|---|---|
| Word 34, bits 0–3 | D1 | N |
| Word 34, bits 4–7 | D2 | N |
| Word 34, bits 8–11 | D3 | N |
| Word 34, bits 12–15 | D4 | N |
| Word 35, bits 0–3 | D5 | N |
| Word 35, bits 4–7 | D6 | N |
| Word 35, bits 8–11 | D7 | N |
| Word 35, bits 12–15 | D8 | N |
| Word 36, bits 0–3 | D9 | N |
| Word 36, bits 4–7 | D10 | N |
| Word 36, bits 8–11 | D11 | N |
| Word 36, bits 12–15 | D12 | N |
| Word 37, bits 0–3 | D13 | N |
| Word 37, bits 4–7 | D14 | N |
| Word 37, bits 8–11 | D15 | N |
| Word 37, bits 12–15 | D16 | N |
| Word 38, bits 0–3 | D17 | N |
| Word 38, bits 4–7 | D18 | N |
| Word 38, bits 8–11 | D19 | X (TSID) |
| Word 38, bits 12–25 | D20 | X (TSID) |
| Word 39, bits 0–3 | D21 | X (TSID) |
| Word 39, bits 4–7 | D22 | X (TTG) |
| Word 39, bits 8–11 | D23 | X (TTG) |
| Word 39, bits 12–15 | D24 | X (TTG) |
| Word 40, bits 0–3 | D25 | X (TTG) |

TSID = Terminating Switch ID
TTG = Terminating Trunk Group

| Word #, Bit # | Description |
|---|---|
| Word 40, bits 4–15<br>Word 41, bits 0–15<br>Word 42, bits 0–15<br>Word 43, bits 0–15 | Pretranslated Digits (PTD): Represents up to 15 digits of a number that is the translation on a number dialed by the caller. |

| | | 10 digit VNet, SAC DNIS, or Hotline | 00Y SAC Code | 7 digit VNet or SNS | VNet/ IDDD 15 digit (example) |
|---|---|---|---|---|---|
| Word 40, bits 4–7 | PTD1 | N | 0 | N | N |
| Word 40, bits 8–11 | PTD2 | X | 0 | N | N |
| Word 40, bits 12–15 | PTD3 | X | Y | X | N |
| Word 41, bits 0–3 | PTD4 | N | N | X | N |
| Word 41, bits 4–7 | PTD5 | X | X | X | N |
| Word 41, bits 8–11 | PTD6 | X | X | X | N |
| Word 41, bits 12–15 | PTD7 | X | X | X | N |
| Word 42, bits 0–3 | PTD8 | X | X | T-Null | N |
| Word 42, bits 4–7 | PTD9 | X | X | T-Null | N |
| Word 42, bits 8–11 | PTD10 | X | X | T-Null | N |
| Word 42, bits 12–15 | PTD11 | T-Null | T-Null | T-Null | N |
| Word 43, bits 0–3 | PTD12 | T-Null | T-Null | T-Null | N |
| Word 43, bits 4–7 | PTD13 | T-Null | T-Null | T-Null | N |
| Word 43, bits 8–11 | PTD14 | T-Null | T-Null | T-Null | N |
| Word 43, bits 12–15 | PTD15 | T-Null | T-Null | T-Null | N |

T-Null = TBCD-Null

| Word #, Bit # | Description |
|---|---|
| Word 44, bits 0–7 | Enhanced international Routing (EIR) Call Type: Contains the EIR call type ID as received from the DAP in the NCS billing information parameter or from the operator in the NCS billing information ISUP RLT parameter. It is recorded in binary, the default = '0.' |
| Word 44, bits 8–14 | Overflow Cause Value (OVFVAL): This field is the binary equivalent of the first cause value received or formatted in-switch. This value is taken from the cause value subfield in the cause parameter that initiated overflow. |
| Word 44, bit 15 | Counts As Bid (CB): Used with the EIR feature. This bit is set to '1' or '0' as per the information received from the DAP in the CB field of the NCS billing information parameter or from the operator in the NCS billing information ISUP RLT parameter.<br>0 = Does not count as bid (default)<br>1 = Counts as bid |
| Word 45, bits 0–3 | Overflow Cause Location (OVFCL): This field is the binary equivalent of the value recorded from the first cause location received or formatted in-switch. This information is taken from the cause location subfield in the cause parameter that initiated |

APPENDIX-continued

| Word #, Bit # | Description |
|---|---|
| | overflow. |
| Word 45, bits 4–15<br>Word 46, bits 0–15<br>Word 47, bits 0–15<br>Word 48, bits 0–15 | Desired Terminating Address (DTA): These 15 bytes contain the originally intended or "desired" termination before overflow was triggered. They contain either: 1) the desired terminating switch id and trunk group for calls that were sent to a DTC termination, 2) a national number, or 3) international number based on what the action code returned from the DAP for the desired termination. |

| | | DTC DTSID + DTTG | DDD |
|---|---|---|---|
| Word 45, bits 4–7 | DTA1 | 0 | N |
| Word 45, bits 8–11 | DTA2 | X (DTSID1) | X |
| Word 45, bits 12–15 | DTA3 | X (DTSID2) | X |
| Word 46, bits 0–3 | DTA4 | X (DTSID3) | N |
| Word 46, bits 4–7 | DTA5 | 0 | X |
| Word 46, bits 8–11 | DTA6 | X (DTTG1) | X |
| Word 46, bits 12–15 | DTA7 | X (DTTG2) | X |
| Word 47, bits 0–3 | DTA8 | X (DTTG3) | X |
| Word 47, bits 4–7 | DTA9 | X (DTTG4) | X |
| Word 47, bits 8–11 | DTA10 | TBCD-Null | X |
| Word 47, bits 12–15 | DTA11 | TBCD-Null | TBCD-Null |
| Word 48, bits 0–3 | DTA12 | TBCD-Null | TBCD-Null |
| Word 48, bits 4–7 | DTA13 | TBCD-Null | TBCD-Null |
| Word 48, bits 4–11 | DTA14 | TBCD-Null | TBCD-Null |
| Word 48, bits 12–15 | DTA15 | TBCD-Null | TBCD-Null |

DTSID = Desired Terminating Switch ID
DTTG = Desired Terminating Trunk Group

| | | IDDD (example) | DTC (future) |
|---|---|---|---|
| Word 45, bits 4–7 | DTA1 | CC | X (DTSID1) |
| Word 45, bits 8–11 | DTA2 | CC | X (DTSID2) |
| Word 45, bits 12–15 | DTA3 | CC | X (DTSID3) |
| Word 46, bits 0–3 | DTA4 | NN | X (DTSID4) |
| Word 46, bits 4–7 | DTA5 | NN | X (DTTG1) |
| Word 46, bits 8–11 | DTA6 | NN | X (DTTG2) |
| Word 46, bits 12–15 | DTA7 | NN | X (DTTG3) |
| Word 47, bits 0–3 | DTA8 | NN | X (DTTG4) |
| Word 47, bits 4–7 | DTA9 | NN | X (DTTGS) |
| Word 47, bits 8–11 | DTA10 | NN | TBCD-Null |
| Word 47, bits 12–15 | DTA11 | NN | TBCD-Null |
| Word 48, bits 0–3 | DTA12 | NN | TBCD-Null |
| Word 48, bits 4–7 | DTA13 | NN | TBCD-Null |
| Word 48, bits 8–11 | DTA14 | NN | TBCD-Null |
| Word 48, bits 12–15 | DTA15 | TBCD-Null | TBCD-Null |

CC = Customer Connect
NN = National Number
DTSID = Desired Terminating Switch ID
DTTG = Desired Termnating Trunk Group

| Word #, Bit # | Description |
|---|---|
| Word 49, bits 0–6 | Overflow Count (OVFC): Indicates the total number of intermediate overflow attempts before successful termination was achieved. This value is incremented each time the DAP is accessed for overflow information. |
| Word 49, bits 7–12 | Desired Termination Action Code (DTAC): This field represents the action code which was received from the DAP in the first response. This information is used to identify the type of information which is recorded in the DTA field. |
| Word 49, bit 13 | Not Used |
| Word 49, bits 14–15<br>Words 50–54, bits 0–15 | Network Call Identifier (NCID): Contains the binary representation of the NCID. The NCID is recorded here at intermediate and terminating switches if the Authcode field is being used to record other information. The NCID is created at the originating switch and is passed to intermediate and terminating switches. The format of the NCID is:<br>Originating Switch ID (OSID)<br>Originating Trunk Group (OTG)<br>Originating Port (OP)<br>Timepoint 1 (TP1)<br>NCID Sequence Number |
| Word 55, bits 0–15<br>Word 56, bits 0–15<br>Word 57, bits 0–15 | Time and Charges Room Number (T&C Room): This field records the time and charges room number that will be passed back to the switch from the operator service platform for the time and charges feature. The information is recorded as ASCII characters starting with the first character in word 53, bits 0–7. |
| Word 58, bits 0–15<br>Word 59, bits 0–15 | EVS Application Counter (EAC-1): This field records the EVS application counter values if an ARU is used in the call. The field |

APPENDIX-continued

| Word #, Bit # | Description |
|---|---|
| Word 60, bits 0–156 | contains the digits that were dialed by the customer in response to audio menu options. |
| Word 61, bits 0–13 | Operator ID Number (OPIN): This field contains the operator ID number of the operator that handled the call. |
| Word 61, bits 14–15 | Overflow Cause Coding Standard (OVFCS): Contains the binary equivalent of the first coding standard received or formatted in-switch. This value is taken from the coding standard subfield in the cause parameter that initiated overflow. It will not be overwritten by subsequent coding standards received or in-switch formatted values. This field is used for enhanced overflow calls only. |
| Word 62, bits 0–12 | Timepoint 5 (TPS): A binary count of the number of seconds between the time timepoint 1 occurred and the time that the operator stopped handling the call and releases the position. If the call is transferred to other operators, the value contained in this field shall express the release time of the last operator providing the service. |
| Word 62, bits 13–15 | Not Used. |
| Word 63, bits 0–15 | Room Number (RN): Contains the last four digits of the Calling Station ID (CSI) when a call originates from a hotel, a university, or any other community identified by only a main telephone number. The CSI shall be obtained from the originating signalling information, or verbally by the operator who enters the information manually into the OSR. |
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPOSR<br>8 = EOSR<br>9 = EPOSR<br>10–15 = Not Used |
| Word 0, bits 4–15 | Sync word: This word contains a minus two ($7776_8$). |
| Word 1, bits 0–15<br>Word 2, bits 0–15 | Call Disconnect ID (CDID): Identifies the call record. Each call record has a unique number. When a switch cold restart of reload occurs, the CDID is set to 0 and a Switch Event Record with an event code of 3 is written. When the CDID count rolls over, an event code of 10 SER is recorded. |
| Word 3, bits 0–15 | Switch ID (SWID): Contains the unique identifier of the current switch. the SWID consists of three (3) packed alphanumeric characters. The lead character may be any hex digit (0–F). The next two (2) characters are any number in a base 36 system. Base 36 symbols are 0–9, A–Z. The maximum octal number in the base 36 is $43_8$ which represents the letter Z. Values $44_8$ through $77_8$ are unused.<br>Word 3, bits 0–3 SWIDI (0–9, A–F)<br>Word 3, bits 4–9 SWID2 (0–9, A–Z)<br>Word 3, bits 10–15 SWID3 (0–9, A–Z) |
| Word 4, bits 0–7 | Switch Type (ST): Indicates the type of switch.<br>0 = default<br>1 = 580L SCX<br>2 = DEX-400<br>3 = CTSS-1000<br>4 = CTSS-4000<br>5 = DMS-250<br>6 = AXE-10<br>7 = DEX-600<br>8 = DMS-300<br>9 = DMS-TOPS<br>10 = DEX-600E<br>11 = AS20<br>12 = AS27<br>13 = EVS ARU<br>14–255 = Not Used |
| Word 4, bits 8–15 | Event Qualifier (EQ): Identifies the event causing the record.<br>0 = default<br>1 = Input command or automatic system update that changed date<br>2 = Input command or automatic system update that changed time<br>3 = System restart<br>4 = Hourly log (HH:00:00)<br>5 = Recovery Action<br>6 = End of billing data (End of File) |

APPENDIX-continued

| Word #, Bit # | Description |
|---|---|
| | 7 = Start of billing data (Start of File)<br>8 = NEMAS SRB blocking record (end of billing block)<br>9 = Daylight savings time changed (time and offset time changed)<br>10 = CDID LOG (CDID rolled over to 0)<br>11 = Not Used<br>12 = Blank SER (filler record for billing block)<br>13–255 = Not Used<br>An event code 7 SER will always be the first record in the call history data set.<br>An event code 8 SER will always be the last record in the call block and will be immediately proceeded by event code 6.<br>An event code 9 SER will be invoked by a man-machine command that invokes a Daylight Saving Time change.<br>An event code 10 SER will be written each time the Call Disconnect ID (CDID) rolls over from a maximum count to '0'. This event code will not be written for CDID rollovers due to system restarts. |
| Word 5, bits 0–15<br>Word 6, bits 0–15 | SER Event Time (SERET): Contains the epoch time of this SER and is used for event codes. |
| Word 7, bits 0–3 | Not Used |
| Word 7, bits 4–15 | First CDID (FCDID): Contains the last 12 bits of the CDID that was recorded in the first call record or SER in this billing block. This field is used in SER event code 8. |
| Word 8, bits 0–3 | Not Used |
| Word 8, bits 4–15 | Last CDID (LCDID): Contains the CDID that was recorded in the last call record or SER in this billing block. This field is used in SER 8. |
| Word 9, bits 0–3 | Not Used |
| Word 9, bits 4–15 | Next CDID (NCDID): Contains the CDID in the next call record or SER. This field is used in SER 8. |
| Word 10, bits 0–15 | NEMAS Blocking Sequence Number (NBSN): Contains the NEMAS blocking sequence number in event code 8 SERs. The first event code 8 SER within a call history file is set to a NBSN value of 0. The NBSN value is sequentially incremented in following event code 8 SERs. |
| Word 11, bits 0–15<br>Word 12, bits 0–15 | Previous Time (PT): Contains the epoch time of the time before a system time change was made. Used in SER 1, 2, and 9. |
| Word 13, bit 0 | Sign Bit (SB): Indicates whether the time offset is a negative or positive number. This field is used in all SERs.<br>0 = positive offset<br>1 = negative offset |
| Word 13, bits 1–10 | Time Offset (TO): Used to record the time offset from universal time (UTC) in one minute increments. This field is used in all SERs. |
| Word 13, bits 11–15<br>Word 14, bits 0–15<br>Word 15, bits 0–15 | Not Used. |
| Word 16, bits 0–15<br>Word 17, bits 0–15<br>Word 18, bits 0–15 | Software Load ID1-6: Contains 6 bytes of the software load identifier of the switch recording the billing. This field is written in EBCDIC format and contains the same data as the software load identifier that is recorded in the call history tape label |
| Word 19, bits 0–15 | Last Patch #1, #2: These 2 bytes contain the latest patch number/point release of the switch recording the billing. This field is written in EBCDIC format and contains the same data as the latest patch number/point release that is recorded in the call history tape label. The point release identifies the upgrade level of the current software load. Used in SER 7. |
| Word 20, bits 0–5 | Quantity CDR (QCDR): Contains the quantity of CDRs that were recorded in this billing block. Used only for event code 8 SERs. |
| Word 20, bits 6–11 | Quantity ECDR (QECDR): Contains the quantity of expanded CDRs that were recorded in this billing block. Used only for event code 8 SERs. |
| Word 20, bits 12–15 | Not Used |
| Word 21, bits 0–5 | Quantity PNR (QPNR): Contains the qualtity of PNRs that were recorded in this billing block. Used only for event code 8 SERs. |
| Word 21, bits 6–11 | Quantity EPNR (QEPNR): Contains the quantity of expanded PNRs that were recorded in this billing block. Used only for event code 8 SERs. |
| Word 21, bits 12–15 | Not Used |
| Word 22, bits 0–5 | Quantity OSR (QOSR): Contains the quantity of OSRs that were recorded in this billing block. Used only for event code 8 SERs. |
| Word 22, bits 6–11 | Quantity EOSR (QEOSR): Contains the quantity of expanded OSRs that were recorded in this billing block. Used only for event code 8 SERs. |
| Word 22, bits 12–15 | Not Used |
| Word 23, bits 0–5 | Quantity POSR (QPOSR): Contains the quantity of POSRs that. were recorded in this billing block. Used only for event code 8 |

APPENDIX-continued

| Word #, Bit # | Description |
|---|---|
| | SERs. |
| Word 23, bits 6–11 | Quantity EPOSR (QEPOSR): Contains the quantity of expanded POSRs that were recorded in this billing block. Used only for event code 8 SERs. |
| Word 23, bits 12–15 | Not Used |
| Word 24, bits 0–5 | Quantity SER (QSER): Contains the quantity of SERs that were recorded in this billing block. Used only for event code 8 SERs. |
| Word 24, bits 6–12 | Call History File Number (CHFN): Contains the call history file number as assigned when a call history file is opened at the switch. Used in all SERs. The first opened file contains a CHFN value of 0. Each new file opened in that same day shall increment the CHFN by one. When the Julian date changes (at midnight), the next file opened shall cause the CHFN to be reset back to zero. |
| Word 24, bits 13–14 | Not Used. |
| Word 24, bit 15 | SER 12 Used (SU): This bit is set in an SER 8 if the previous call record was a SER 12. |
| Word 25, bits 0–15<br>Word 26, bits 0–15 | CDR Throttle Start Time: Records the epoch time when CDR throttling started. Used in SER 8. |
| Word 27, bits 0–15<br>Word 28, bits 0–15 | CDR Throttle Stop Time: Records the epoch time when CDR throttling stopped. Used in SER 8. |
| Word 29, bits 0–11 | Not Used. |
| Word 29, bits 12–15 | Format Version: This field is filled with 1's to identify the 32/64 word format. The billing system must then look to Word 0, bits 0–3 to determine the type of call record used. |
| Word 30, bits 0–15<br>Word 31, bits 0–15 | Throttle Count: Used to record the number of CDRs that were not written during the time that CDR throttling was invoked. Used in SER 8. |

What is claimed is:

1. A method for media communication over a hybrid network which includes a switched network, a packet switched network, and a directory of internet protocol addresses for the packet switched network, the method comprising the steps of:

(a) establishing the media communication between a first party and the packet switched network utilizing the directory of internet protocol addresses for transmitting the media communication in a Real-time Transport Protocol (RTP) format, wherein the media communication includes video, audio and data information;

(b) transmitting the media communication via the packet switched network to at least one other party;

(c) receiving the media communication via the packet switched network from at least one other party; and (d) controlling the quality of transmission and reception to obtain predetermined levels of quality of service for the media communication.

2. The method as recited in claim 1, wherein the at least one party is registered in a directory of parties available for the media communication.

3. The method as recited in claim 1, wherein the media communication is transmitted through an operator.

4. The method as recited in claim 1, further comprising:

(a) transmitting the media communication through assistance of an operator if an operator is available;

(b) storing at least portions of the media communication in a storage location; and (c) transmitting the stored media communication to the party if no operator is available.

5. The method as recited in claim 1, further comprising:

(a) transmitting a second media communication of an operator;

(b) storing the second media communication in a storage location;

(c) transmitting the stored second media communication to the party if no operator is available; and (d) terminating the second media communication transmission when the operator becomes available.

6. The method as recited in claim 1, wherein the transmission and reception are controlled by a resource reservation protocol that reserves network resources along a communication path to obtain designated qualities of service for the media communication.

7. The method as recited in claim 1, wherein the first party can determine whether the at least one other party is available to receive the media communication by searching a directory of parties.

8. The method as recited in claim 1, wherein the media communication is a unicast media communication.

9. The method as recited in claim 1, wherein the media communication is a broadcast media communication.

10. The method as recited in claim 1, wherein the media communication is a multicast media communication.

11. An apparatus for media communication over a hybrid network which includes a switched network, a packet switched network and a directory of internet protocol addresses of the packet switched network, the apparatus comprising:

(a) a processor with control software that establishes a communication between a first party and the packet switched network utilizing the directory of internet protocol addresses for transmitting the media communication in a Real-time Transport Protocol (RTP) format, wherein the media communication includes video, audio and data information;

(b) a processor with control software that transmits the media communication via the packet switched network to at least one other party;

(c) a processor with control software that receives the media communication via the packet switched network from the at least one other party; and (d) a processor with control software that controls the quality of transmission and reception of the media communication to obtain predetermined levels of quality of service for the media communication by utilizing a resource reservation protocol.

12. The apparatus as recited in claim 11, wherein the at least one other party is registered in a directory of parties available for the media communication.

13. The apparatus as recited in claim 11, wherein the media communication is transmitted through an operator.

14. The apparatus as recited in claim 11, further comprising:

(a) a processor with control software that transmits the media communication through an operator;

(b) a processor with control software that stores at least portions of the media communication in a storage location; and (c) a processor with control software that transmits the stored media communication to the party if no operator is available.

15. The apparatus as recited in claim 11, further comprising:

(a) a processor with control software that transmits a second media communication of an operator;

(b) a processor with control software that stores the second media communication in a storage location;

(c) a processor with control software that transmits the stored second media communication to the party if no operator is available; and (d) a processor with control software that terminates the second media communication transmission when operator becomes available.

16. The apparatus as recited in claim 11, wherein the transmission and reception are controlled by a resource reservation protocol that reserves network resources along a communication path to obtain designated qualities of service for the media communication.

17. The apparatus as recited in claim 11, wherein the first party can determine whether the at least one other party is available to receive the media communication by searching a directory of parties available for the media communication.

18. The apparatus as recited in claim 11, wherein the media communication is a unicast media communication.

19. The apparatus as recited in claim 11, wherein the media communication is a broadcast media communication.

20. The apparatus as recited in claim 11, wherein the media communication is a multicast media communication.

21. A computer program embodied on a computer-readable medium for media communication over a hybrid network which includes a switched network, a packet switched network and a directory of internet protocol addresses of the packet switched network, the computer program comprising:

(a) first software that establishes a communication between a first party and the packet switched network utilizing the directory of internet protocol addresses for transmitting the media communication in a Real-time Transport Protocol (RTP) format, wherein the media communication includes video, audio and data information;

(b) second software that transmits the media communication via the packet switched network to at least one other party;

(c) third software that receives the media communication via the packet switched network from the at least one other party; and (d) fourth software that controls the quality of transmission and reception of the media communication to obtain predetermined levels of quality of service for the media communication by utilizing a resource reservation protocol.

22. The computer program as recited in claim 21, wherein the at least one other party is registered in a directory of parties available for the media communication.

23. The computer program as recited in claim 21, wherein the media communication is transmitted through an operator.

24. The computer program as recited in claim 21, further comprising:

(a) fifth software that transmits the media communication through an operator;

(b) sixth software that stores at least portions of the media communication in a storage location; and (c) seventh software that transmits the stored media communication to the party if no operator is available.

25. The computer program as recited in claim 21, further comprising:

(a) fifth software that transmits a second media communication of an operator;

(b) sixth software that stores the second media communication in a storage location;

(c) seventh software that transmits the stored second media communication to the party if no operator is available; and (d) eighth software that terminates the second media communication transmission when operator becomes available.

26. The computer program as recited in claim 21, wherein the transmission and reception are controlled by a resource reservation protocol that reserves network resources along a communication path to obtain designated qualities of service for the media communication.

27. The computer program as recited in claim 21, wherein the first party can determine whether the at least one other party is available to receive the media communication by searching a directory of parties available for the media communication.

28. The computer program as recited in claim 21, wherein the media communication is a unicast media communication.

29. The computer program as recited in claim 21, wherein the media communication is a broadcast media communication.

30. The computer program as recited in claim 21, wherein the media communication is a multicast media communication.

* * * * *